US009224096B2

(12) United States Patent
Oppenheimer

(10) Patent No.: US 9,224,096 B2
(45) Date of Patent: Dec. 29, 2015

(54) SYSTEM AND METHOD FOR ITEM SELF-ASSESSMENT AS BEING EXTANT OR DISPLACED

(71) Applicant: ImagiStar LLC, Rockville, MD (US)

(72) Inventor: Steven Charles Oppenheimer, Rockville, MD (US)

(73) Assignee: ImagiStar LLC, Rockville, MD (US)

( * ) Notice: Subject to any disclaimer, the term of this patent is extended or adjusted under 35 U.S.C. 154(b) by 38 days.

(21) Appl. No.: 13/879,403

(22) PCT Filed: Jan. 7, 2013

(86) PCT No.: PCT/US2013/020587
§ 371 (c)(1),
(2) Date: Apr. 18, 2013

(87) PCT Pub. No.: WO2013/103994
PCT Pub. Date: Jul. 11, 2013

(65) Prior Publication Data

US 2014/0089243 A1 Mar. 27, 2014

Related U.S. Application Data

(60) Provisional application No. 61/584,276, filed on Jan. 8, 2012.

(51) Int. Cl.
*G06F 21/00* (2013.01)
*G06N 5/02* (2006.01)
(Continued)

(52) U.S. Cl.
CPC *G06N 5/02* (2013.01); *G06F 21/50* (2013.01); *G06F 21/88* (2013.01); *G06Q 10/08* (2013.01); *H04W 4/021* (2013.01); *G06F 2221/2101* (2013.01); *G06F 2221/2111* (2013.01)

(58) Field of Classification Search
CPC ........................................ G06F 21/88
USPC ........................................ 726/35
See application file for complete search history.

(56) References Cited

U.S. PATENT DOCUMENTS 4,271,352 A 6/1981 Thomas
4,629,164 A 12/1986 Sommerville
(Continued)

FOREIGN PATENT DOCUMENTS

WO 2008020223 A1 2/2008

OTHER PUBLICATIONS

International Preliminary Report on Patentability, mailing date Aug. 28, 2014 (authorized officers Lee W. Young and Philippe Becamel) for International Application PCT/US2013/020587, Int. Filing Date Jan. 7, 2013, Priority Date Jan. 8, 2012, Applicant Steven Charles Oppenheimer. The present U.S. Appl. No. 13/879,403, is the U.S. National Stage of the above title PCT application. The International Preliminary Report on Patentability is attached.
(Continued)

*Primary Examiner* — Longbit Chai
(74) *Attorney, Agent, or Firm* — Steven C. Oppenheimer

(57) ABSTRACT

A portable item reporting device (200) is configured to be attached to and in substantial collocation with a portable item (100), or to be integrated into a portable item (100). The device (200) includes environmental sensors (210) to monitor item location, movement, ambient light, sounds, temperature, etc. The device (200) is configured to store usage expectation data (600) indicative of historical and/or expected item usage and environments when the item (100) is in normal use/storage associated with an authorized user (AU). The device (200) monitors current environmental conditions (104) surrounding and pertaining to the item. If the current environment (104) is inconsistent with expected conditions (600), the device (200) assesses that the item (100) is displaced (503.0), meaning either that the item (100) is in abnormal use or abnormal storage, or is under the control of an unauthorized user (UU) who is other than the authorized user (AU). Based on the assessment the device initiates a signal (372) or message (374) to an authorized user (AU) of the item (100), indicating that the item (100) usage/storage is displaced (503.0) or otherwise anomalous (503.2).

45 Claims, 104 Drawing Sheets

(51) Int. Cl.

| | |
|---|---|
| ***G06F 21/88*** | (2013.01) |
| ***G06F 21/50*** | (2013.01) |
| ***G06Q 10/08*** | (2012.01) |
| ***H04W 4/02*** | (2009.01) |

(56) References Cited

U.S. PATENT DOCUMENTS

| | | | | |
|---|---|---|---|---|
| 4,742,357 | A | 5/1988 | Rackley | |
| 5,166,884 | A | 11/1992 | Maney et al. | |
| 5,180,192 | A | 1/1993 | Herbert | |
| 5,576,692 | A | 11/1996 | Tompkins et al. | |
| 5,680,105 | A | 10/1997 | Hedrick | |
| 5,878,116 | A | 3/1999 | Scott | |
| 5,900,817 | A | 5/1999 | Olmassakian | |
| 5,955,952 | A | 9/1999 | Bergman et al. | |
| 6,259,367 | B1 | 7/2001 | Klein | |
| 6,321,091 | B1 | 11/2001 | Holland | |
| 6,609,656 | B1 | 8/2003 | Elledge | |
| 6,628,198 | B2 | 9/2003 | Fieschi et al. | |
| 6,774,811 | B2 | 8/2004 | Kaufman et al. | |
| 6,900,731 | B2 | 5/2005 | Kreiner et al. | |
| 6,925,562 | B2 | 8/2005 | Gulcu et al. | |
| 6,950,946 | B1 | 9/2005 | Droz et al. | |
| 6,956,475 | B1 | 10/2005 | Hill | |
| 7,016,687 | B1 | 3/2006 | Holland | |
| 7,027,808 | B2 | 4/2006 | Wesby | |
| 7,088,242 | B2 | 8/2006 | Aupperle et al. | |
| 7,176,801 | B2 | 2/2007 | Matsukawa et al. | |
| 7,194,278 | B1 | 3/2007 | Cook | |
| 7,230,534 | B2 | 6/2007 | Elledge | |
| 7,391,321 | B2 | 6/2008 | Twitchell, Jr. | |
| 7,391,326 | B2 * | 6/2008 | Puzio et al. | 340/572.1 |
| 7,394,380 | B2 | 7/2008 | Ballin et al. | |
| 7,420,465 | B2 | 9/2008 | Ritter | |
| 7,420,470 | B2 | 9/2008 | Koch et al. | |
| 7,479,877 | B2 | 1/2009 | Mortenson et al. | |
| 7,522,043 | B2 | 4/2009 | English et al. | |
| 7,552,031 | B2 | 6/2009 | Vock et al. | |
| 7,573,385 | B2 | 8/2009 | Tonelli | |
| 7,639,141 | B2 | 12/2009 | Elledge | |
| 7,652,576 | B1 | 1/2010 | Crossno et al. | |
| 7,755,490 | B2 | 7/2010 | Elledge | |
| 7,769,394 | B1 | 8/2010 | Zhu | |
| 7,786,861 | B2 | 8/2010 | Howarth et al. | |
| 7,873,985 | B2 | 1/2011 | Baum | |
| 7,885,999 | B2 | 2/2011 | St Marie | |
| 7,898,414 | B2 | 3/2011 | Spano | |
| 7,932,824 | B2 | 4/2011 | Flores et al. | |
| 8,264,352 | B2 | 9/2012 | Holley et al. | |
| 8,339,263 | B2 | 12/2012 | Paananen et al. | |
| 8,374,825 | B2 | 2/2013 | Vock et al. | |
| 8,392,296 | B2 | 3/2013 | Powers et al. | |
| 8,397,310 | B2 | 3/2013 | Parris et al. | |
| 8,402,559 | B2 | 3/2013 | Baum | |
| 2002/0003477 | A1 | 1/2002 | Roy, Jr. | |
| 2002/0073314 | A1 | 6/2002 | Bhat | |
| 2002/0143930 | A1 | 10/2002 | Babu et al. | |
| 2003/0034887 | A1 | 2/2003 | Crabtree et al. | |
| 2003/0043036 | A1 | 3/2003 | Merrem et al. | |
| 2003/0071728 | A1 | 4/2003 | McDonald et al. | |
| 2003/0214411 | A1 | 11/2003 | Walter et al. | |
| 2004/0019609 | A1 | 1/2004 | Orton, III et al. | |
| 2004/0085207 | A1 | 5/2004 | Kreiner et al. | |
| 2004/0178906 | A1 | 9/2004 | Vaughan et al. | |
| 2004/0230809 | A1 | 11/2004 | Lowensohn et al. | |
| 2005/0007251 | A1 | 1/2005 | Crabtree et al. | |
| 2005/0046567 | A1 | 3/2005 | Mortenson et al. | |
| 2005/0068170 | A1 | 3/2005 | Aupperle et al. | |
| 2005/0150952 | A1 | 7/2005 | Chung | |
| 2005/0200478 | A1 | 9/2005 | Koch et al. | |
| 2005/0206520 | A1 | 9/2005 | Decker et al. | |
| 2005/0222933 | A1 | 10/2005 | Wesby | |
| 2005/0237196 | A1 | 10/2005 | Matsukawa et al. | |
| 2005/0280546 | A1 | 12/2005 | Ganley et al. | |
| 2005/0285733 | A1 | 12/2005 | Gualdi et al. | |
| 2006/0055538 | A1 | 3/2006 | Ritter | |
| 2006/0111123 | A1 | 5/2006 | Nerat | |
| 2006/0132308 | A1 | 6/2006 | Stump et al. | |
| 2006/0145837 | A1 | 7/2006 | Horton et al. | |
| 2006/0161628 | A1 | 7/2006 | Nagy et al. | |
| 2006/0195428 | A1 | 8/2006 | Peckover | |
| 2006/0202840 | A1 | 9/2006 | Korbonski | |
| 2007/0109126 | A1 | 5/2007 | House | |
| 2007/0135984 | A1 | 6/2007 | Breed et al. | |
| 2007/0268139 | A1 | 11/2007 | Sweeney, II | |
| 2008/0035722 | A1 | 2/2008 | Feld | |
| 2008/0079581 | A1 | 4/2008 | Price | |
| 2008/0088462 | A1 | 4/2008 | Breed | |
| 2008/0129488 | A1 | 6/2008 | Hill | |
| 2008/0180244 | A1 | 7/2008 | Howarth et al. | |
| 2008/0186162 | A1 | 8/2008 | Rajan et al. | |
| 2008/0228602 | A1 | 9/2008 | Bauman et al. | |
| 2008/0291004 | A1 | 11/2008 | Regan et al. | |
| 2009/0013060 | A1 | 1/2009 | St Marie | |
| 2009/0014998 | A1 | 1/2009 | Tyrrell | |
| 2009/0043681 | A1 * | 2/2009 | Shoji et al. | 705/35 |
| 2009/0045958 | A1 | 2/2009 | Spano | |
| 2009/0111484 | A1 | 4/2009 | Koch et al. | |
| 2009/0153305 | A1 | 6/2009 | Ambrosetti | |
| 2009/0183266 | A1 | 7/2009 | Tan et al. | |
| 2009/0212941 | A1 | 8/2009 | Vock et al. | |
| 2009/0228991 | A1 | 9/2009 | Schneider et al. | |
| 2009/0253408 | A1 | 10/2009 | Fitzgerald et al. | |
| 2009/0253410 | A1 | 10/2009 | Fitzgerald et al. | |
| 2010/0107238 | A1 * | 4/2010 | Stedman et al. | 726/13 |
| 2010/0223245 | A1 | 9/2010 | Vermilye | |
| 2010/0225451 | A1 | 9/2010 | Gladstone | |
| 2010/0235888 | A1 | 9/2010 | Miyamoto | |
| 2010/0265131 | A1 | 10/2010 | Fabius | |
| 2011/0050412 | A1 | 3/2011 | Wittman et al. | |
| 2011/0050462 | A1 | 3/2011 | LaGreca | |
| 2011/0061018 | A1 | 3/2011 | Piratla et al. | |
| 2011/0070898 | A1 | 3/2011 | Sanjeev et al. | |
| 2011/0167125 | A1 | 7/2011 | Achlioptas | |
| 2012/0059693 | A1 | 3/2012 | Colodny et al. | |
| 2012/0154147 | A1 | 6/2012 | Cao et al. | |
| 2012/0171998 | A1 | 7/2012 | Kang | |
| 2012/0218103 | A1 | 8/2012 | Alves et al. | |
| 2012/0225633 | A1 | 9/2012 | Nichols | |
| 2012/0282884 | A1 | 11/2012 | Sun | |
| 2012/0311662 | A1 | 12/2012 | Abnous et al. | |
| 2013/0019304 | A1 | 1/2013 | Cai et al. | |
| 2013/0127617 | A1 | 5/2013 | Baade et al. | |
| 2014/0213301 | A1 | 7/2014 | Evans et al. | |

OTHER PUBLICATIONS

"The Tile Documents", Web pages pertaining to a consumer tracking device, 'The Tile' https://support.thetileapp.com/hc/en-us/articles/201161926-How-does-Tile-work-https://support.thetileapp.com/hc/en-us/articles/202207593-Tile-Manualhttps://support.thetileapp.com/hc/en-us/articles/203330127-Frequently-Asked-Questions-on-using-your-Tile.

"It Remembers, You Fold", article by Stephanie Rosenbloom, The New York Times, Feb. 25, 2014. Article on software for packing for trips.

"Q&A: Intel Tech Chief Rattner Peers Into the Future", by Eva Dou, Dec. 4, 2012, The Wall Street Journal, http://blogs.wsj.com/digits/2012/12/04/qa-intel-tech-chief-rattner-peers-into-the-future/ Discloses "contextually aware devices."

My StuffFinder, online marketing material for iPhone application, by Hollman Media, LLC, listing available via Apple, Inc. iTunes application, path AppStore > LifeStyle > Holtman Media LLC. Version 1.0 was posted Jul. 25, 2012. (Current version is 1.3 as of Jun. 13, 2013.) Discloses "StuffFinder provides a quick, easy, and fun way to "record" the location of today's most commonly misplaced and lost "items." These include cars, glasses, shoes, gloves, keys, and wallets. You can also record the location of your hotel, meeting spot, and up to four other user-defined items."

"Location sensing through Passive RFID", by Farheed Moeeni, Laboratory for the Study of Automatic Identification Computer &

(56) References Cited

OTHER PUBLICATIONS

Information Technology, Arkansas State University, published in Conjunction with Cyber Transporation & Logistic Conference, Apr. 2, 2008. Discloses "Estimating location through the features of a scene observed from a particular vantage point" (slide 12), and various methods of non-GPS location sensing, mainly RFID (througtout).
"Radio-frequency identification", from Wikipedia, http://en.wikipedia.org/wiki/RFID. Evolving, cumulative online collaborative document, numerous authors (not all identified by name), first created Jan. 15, 2003, 12:42. Downloaded Jun. 15, 2012, believed to correspond to version of Jun. 14, 2012, 9:18 (http://en.wikipedia.org/w/index.php?title=Radio-frequency_identification&dir=prev&offset=20110930014740&limit=500&action=history).
"Report: Apple Working on an iWatch", by Doug Gross, CNN, Feb. 2, 2013, www.cnn.com/2013/02/11/tech/mobile/apple-smart-watch/index.html. Discloses "a watch that uses Bluetooth technology to link up with the user's smartphone".
"Central Florida students create app to silence phones in class", by Tom Johnson, MyFox, Nov. 26, 2012, http://www.myfoxorlando.com/story/20189287/ringtone-manager-central-florida-students. Discloses: "The Android app allows students to input their class schedules at the beginning of a semester. Then, when the user is in class, the phone turns its ringer to silent. When class is over, the ringer automatically turns back on", and "Their next goal is to create a version for business people that will connect with calendar applications and turn ringers off during meetings."
"Shark Tank Phone Finder", by Christian Johan on Oct. 8, 2012, posted on PhoneHalo, http://phonehalo.com/shark-tank-phone-finder/ Discloses: "The Cobra Tag is a small device that attached to your keys, purse, or anything else you would like to protect. An app runs on the user's cell phone and will keep track of whatever the user has attached the Cobra Tag to!".
"Cobra Tag", online product advertisement by Cobra Electronics Corp., https://cobra.com/detail/cobra-tag.cfm. Identified as being crawled on the web as early as Nov. 3, 2011, by the WaybackMachine (http://web.archive.org/web/*/https://cobra.com/detail/cobra-tag.cfm). Attached version downloaded May 28, 2013. Discloses "A Cobra Tag™ sensor is attached to your keys, purse, computer bag, or any other item you want to protect from loss. The sensor communicates with the phone's free app and will remind you if you leave your phone or valuables behind."
"RidersEye—Real-time GPS-based security and tracking", online product advertisementby Spireon, Inc., http://www.riderseyegps.com/about-us.aspx. Identified as being crawled on the web as early as Nov. 3, 2011, by the WaybackMachine (http://web.archive.org/web/*/http://www.riderseyegps.com/about-us.aspx). Attached version downloaded Jun. 17, 2013. Discloses "In the unfortunate case of an actual theft, RidersEye™ becomes an indispensible tool for aiding the police in a quick and effective recovery."
"Mobile Superhero FAQs; What do I do if my devise is lost or stolen?", online product FAQ by YouGetItBack.com, http://www.yougetitback.com/mobileFAQs. Identified as being crawled on the web as early as Dec. 20, 2009, by the WaybackMachine (http://web.archive.org/web/*/http://www.yougetitback.com/mobileFAQs). Attahced version downloaded Mar. 20, 2013. Discloses "When you first become aware that your device is missing, you should immediately perform a Lock and Locate activity."
"Alert: Your Plant Needs Water", by Jessica E. Vascellaro, The Wall Street Journal, Sep. 10, 2012 (online), Sep. 11, 2012, p. B4 of U.S. Edition. Discloses "Imagine receiving an email when a load of laundry is completed, or a text message when a child opens the cookie jar one too many times. Such notifications have become possible thanks to a host of start-ups that are adding intelligence and communications capability to objects and appliances, giving them many attributes of computers and smartphones."
"Generation Smartphone", by Dan Siewiorek, IEEE Spectrum, posted Aug. 30, 2012, http://spectrum.ieee.org/consumer-electronics/gadgets/generation-smartphone/?utm_source. Discloses "the phone's sensors and machine-learning algorithms create light and sound "fingerprints" for each room" (p. 1).
"How to Make Your Lost Phone Findable", by David Pogue, The New York Times, posted Aug. 9, 2012, http://pogue.blogs.nytimes.com/2012/08/09/how-to-make-your-lost-phone-findable/.
"The International Search Report and the Written Opinion of the International Searching Authority" regarding International Application No. PCT/US 13/20587, Inventor Steven Charles Oppenheimer, International filing date Jan. 7, 2013, report dated Mar. 26, 2013, by Authorized Officer Lee W. Young.
Supplemental Partial European Search Report for Application No. EP 13 73 3544, Applicant Steven C. Oppenheimer, date of completion of research Sep. 11, 2015, place of Research, Munich, issued by the European Patent Office, 80298 Munich, Germany.

* cited by examiner

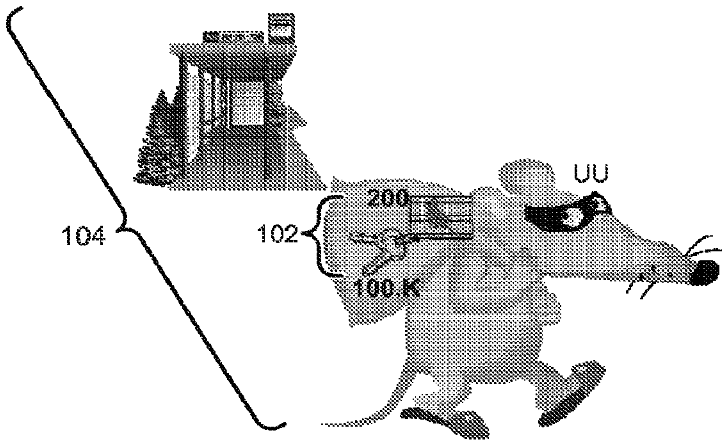
Item Status (501):
Authorized User Status (131) = 131.UU (or "UU" or "No" or "UnAuthorized User")
Item Possibly Displaced (503.0)
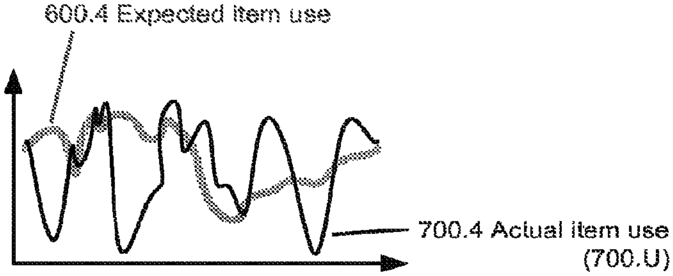
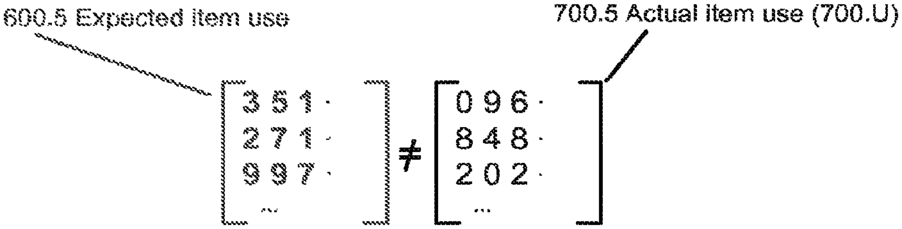
600.6 Expected item use
700.6 Actual item use (700.U)
Item_Location Within Region_1 ≠ {Region _3}
FIG. 1F

140

143

| **Expected Location (144)** | **Schema Category (140)** | **Locator Data (145)** |
|---|---|---|
| Washington, DC | Daily Life (140.DL) | *GPS1 |
| Greater DC Metro Area | Daily Life (140.DL) | *GPS2 |
| Jane's Home | Home Base (140.HB) | *GPS3 |
| Jane's Mixed Martial Arts Gym | Home Base (140.HB) | *GPS4 |
| Jane's Company | Home Base (140.HB) | *GPS5 |
| Jane's Office | Zone (140.Z) | *GPS5, *BEACON1 |
| Company Conference Room | Zone (140.Z) | *GPS5, *BEACON2 |
| Jane's College | Home Base (140.HB) | *GPS6 |
| Jane's Comp. Sci. Class | Zone (140.Z) | *GPS7 |

| | **Biometric User Authentication (152) (User "Signature")** | **IteMetrics -- User-Item Behavior Identifications (154)** | |
|---|---|---|---|
| | | **Morph(ology)IteMetrics (156)** | **Psy(cho)IteMetrics (158)** |
| **Usage of data by the BIRD** | To authenticate to a BIRD the authorized user when:<br>▪ The BIRD is put into use (start of day)<br>▪ At regular security intervals<br>▪ ID confirmation if BIRD detects possibility of anomalous usage | **Item IteMetrics are determined by—and may be distinctive of—the usage of a given user, and so are likely to correlate with behavior by a given user.**<br>▪ While an item is in use, used to determine a likelihood that the item is being used by an authorized user.<br>▪ The BIRD compares the real-time detected item IteMetrics with a set of stored, expected item IteMetrics associated with the current, authorized user, to determine if they match. | |
| **Examples** | ▪ Fingerprint<br>▪ Voice Print<br>▪ Eye Print (iris or retina)<br>▪ Facial Recognition<br>▪ Handwriting analysis<br>User-name/Password identification, while not strictly biometric, is included in this category. Entry may be via keyed entry or voice entry. | -- User movements when the user has the BIRD/item in hand or on person:<br>▪ User walk and/or run (stride length, timing, other gait characteristics)<br>▪ Hand and arm movements when item in hand<br>▪ User shifting motions (when standing or seated)<br>-- User voice print<br>-- Facial recognition<br>-- Ave. pulse, respiration | Associated with user habits or patterns of item usage:<br>▪ Motion/stationary<br>▪ Transportation motions (car, bicycle, etc.)<br>▪ Light exposure profile.<br>▪ Sound exposure profile.<br>▪ Temperature profile.<br>▪ Operations profile (for active item, and some enhanced passive items)<br>Item not necessarily on user's person at all times. |
| **Recognition time frame to obtain pertinent data** | Practically immediate.<br>User types in password in a few seconds; user places finger against scanner, identification takes seconds | Short-term: At least several seconds, but may be a minute, several minutes, or longer. More time may allow for more reliable identification. | Medium-to-long-term: In some cases significant portions of an hour, or longer than an hour, or even several hours. |
| **Detected by BIRD sensors or other BIRD input devices** | ▪ Biometrics (282B) (fingerprint, eye print)<br>▪ Local Input (keyboard) (282L) (password)<br>▪ Microphone (282M) (voice print)<br>▪ Camera (210C) (facial recognition) | ▪ Motion sensor (210M)<br>▪ Orientation sensor (210N)<br>▪ Optical sensor (210Opt)<br>▪ Audio sensor (210A)<br>▪ Surface pressure sensor (210SP)<br>▪ Moisture sensor (210U)<br>Other specialized sensors as applicable. | |
| **Human user involvement in obtaining the data and ID** | **Active:** User may take deliberate action to initiate ID activity, or may be prompted by BIRD to confirm ID. | **Passive:** Expectations for iteMetrics will typically be an element of item usage specifications. In normal operation, the BIRD routinely monitors item activity. The user goes about normal activity with the item, and no extra, deliberate user action is required to maintain monitoring. | |
| **Exemplarly representations in data storage** | ▪ Sample (fingerprint image, voice print sample, etc.); or<br>▪ Data structure capturing elements of sample (Fourier transform, etc.). | ▪ Specific parameters: Length of stride, timing of stride, etc., with allowed variances.<br>▪ Waveforms, other abstract data representations | ▪ Stochastic: % of time item exposed to light or not, % of time item stationary (not on user) or in motion (on user)<br>▪ Waveforms |
| **Consistency** | Highly consistent except for deliberate password changes, slow facial/voice changes with age, etc. | For a given user, typically, substantially the same or recognizably similar at some times and in all contexts. | May vary substantially from one usage context to another, different times of day, different locations, etc. |

FIG. 1J

Summary of Exemplary, Generalized ExD Criteria (170) for Identifying Possibilities of an Item as Being Lost, Misplaced, Misappropriated , Wandering, Stolen, or Extant Statuses (501)

172

| | Location - User characterizes location boundaries and detection contexts (123) | | | Personal (User) Motion (139) [1, 2] User defines stationary limits (133) in various detection contexts (123) | | | Hybrid | Authorized User (131)/IteMetrics (154) PsylteMetrics (158) in particular reflect habits of item usage, and may be identified by the authorized user. | |
|---|---|---|---|---|---|---|---|---|---|
| Item States (503) | In Bounds of Home Base (142) | In Bounds of Daily Life (144) | Out of Bounds (146) | In Motion (139.PM) | Stationary (139.StaT) | Stagnant (139.StG) | AWOL [3] (128) | Current User | Most Recent User |
| Extant (503.1) | Yes or... | Yes | | Yes | | | | AU [4] | |
| Extant (503.1) | Yes or... | Yes | | | Yes | | | | AU |
| Misplaced (503.0.2) | Yes | | | | | Yes or... | Yes | | AU |
| Lost (503.0.1) | | Yes or... | Yes | | | Yes or... | Yes | | AU |
| Wandering (503.0.5) | No [5] | n/a | Yes | Yes | | | n/a | AU [4] | |
| Misappropriated (503.0.3) / Stolen (503.0.4) [6] | Yes or... | Yes | | Yes | | | | Non-AU | |
| Misappropriated / Stolen [6] | Yes or... | Yes | | | Yes or... | Yes or... | | | Non-AU |
| Misappropriated / Stolen [6] | | | Yes | Yes or... | Yes or... | Yes | | Non-AU or Ambiguous | |

[1] An item left behind on public transportation (train, bus, etc.) may be in motion, but without any personal motion, and so is considered stationary.

[2] In Motion includes minimal motions associated with a person standing, seated, etc. Any indication that the item is on-person.
Stationary means the item has no signs of personal movement, and is not on the person of the user.
Stagnant means the item has been stationary for more than some allowed, designated amount of time.

[3] AWOL = Absent WithOut Leave. The item not at a home base location when it should be. ExD criteria (170) include detection contexts (123), which detection contexts are based on home base locations (140.HB), and the detection context time ranges (105)

[4] AU = Authorized User

[5] Applies only if item is restricted (designated for use only in a home base), and BIRD/item self-identifies as being outside of the home base.

[6] See discussion of methods to distinguish misappropriated items from stolen items.

FIG. 1L

Misappropriated vs. Stolen (MvS) Heuristics (180)
Summary of Exemplary Heuristics

182

| *Heuristic (180)* | *Summary Characteristics* | *Tends to Indicate* |
|---|---|---|
| **Purse Snatching (180.1)** | • abrupt acceleration of the item<br>• abrupt and distinctive change of iteMetrics<br>• defined panic movements | Stolen |
| **Pick-Pocket (180.2)** | • prior identification of the item as being in-pocket<br>• detection of removal from the pocket<br>• immediately following, a sudden change in iteMetrics<br>• near immediate placement of the item back in pocket or other enclosure, but with different pocket characteristics | Stolen |
| **Known-Associates (180.3)** | IteMetrics are indicative of a known associate of authorized user.<br>(BIRD has been previously programmed with IteMetrics for known associate(s).) | Misappropriated |
| **Extended-Time and/or Extended-Distance (180.4)** | • longer times away from authorized user<br>• longer distances from home base or daily life locations of authorized user | Stolen |
| **Age-Related (180.5)** | • iteMetrics indicative of child<br>• iteMetrics indicative of elderly | Misappropriated |
| **Active-Item Heuristics (180.6)** | Usage characteristics indicative of processing and usage by particular types of active items; and item-type-specific metrics for processing activity which is "close" to authorized usage, or "not close" to authorized usage. | Stolen or Misappropriated, depending on metric-specific behavioral "distance" from authorized usage |
| **Geographic or Situational Heuristics (180.7)** | • high-crime geographic location<br>• transfer of item to unauthorized user in an area of high people density<br>• transfer of item to unauthorized user in an isolated area or in relative darkness | Stolen |

| *Configuration Methods (190)* | *Summary / Comments / Examples* |
|---|---|
| **(190.1) Transfer of Usage Specifications from Item Owned by Borrower → Item Owned by Lender** | Usage specifications for the borrower are transferred from a BIRD associated with the borrower, to a BIRD associated with the lender. The lender's BIRD can now recognize the borrower as an authorized user via the borrower's iteMetrics. |
| 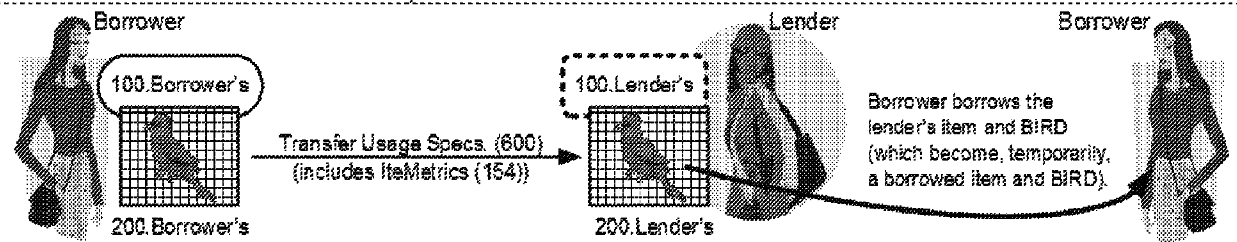 |  |
| **(190.1.S) Transfer of Usage Specifications from Similar-Item Owned by Borrower → Similar-Item Owned by Lender** | • Special case of method 190.1 (compare to 190.1.D)<br>• Since the two items (borrower's item and the lent item) are similar, both kinIteMetrics (156) and psyIteMetrics (158) are likely to be applicable to the borrowed item |
| **(190.1.D) Transfer of Usage Specifications from Item Owned by Borrower → Dis-Similar Item Owned by Lender** | • Special case of method 190.1 (compare to 190.1.S)<br>• Since the two items (borrower's item, and the lent item) are dissimilar, psyIteMetrics (158) are less likely to be useful in the borrowed item. The borrower's kinIteMetrics (156) are more likely to still be applicable to the borrowed item. |
| **(190.2) Training/Configuration of Borrowed Item by Borrower** | Lender pre-authorizes BIRD (200) to accept either direct configuration by borrower, or to be trained by borrower for borrower's iteMetrics. |
| **(190.3) Generic Usage Specifications for Generic Borrower** | Examples: Lender authorizes item for use by any person…<br>• … for limited time; • … within limited location(s).<br>• … with usage constraints (for example, limits on item operations for active items, etc.). |
| **(190.4) Generic Usage Specifications for Generic Class of Borrowers** | Similar to generic usage (190.3), but with limits on the class of borrowers.<br>• Example: Persons associated with an organization, as validated (by BIRD) from a borrower ID card, borrower biometric personal signature (thumbprint, iris scan), etc.<br>• Example: Persons whose iteMetrics fall within certain ranges (such as typical adult movements, thereby excluding kids). |

| Label | Description | Comments |
|---|---|---|
| **Items** | | |
| 100 | Items | Discussed throughout this document |
| 100.Pass | Passive items | Active items typically utilize processors for essential functions; passive items typically do not. |
| 100.Act | Active items | |
| 100.IT | Item which is part of an item team. | |
| 100.EIT | Item which is part of an extended item team | |
| 100.RFID | RFIDed-tagged item | An item with an attached/embedded RFID tag, possibly also a member of an item team. If otherwise lacking a BIRD, this is a particular case of an alternative-monitored item (100.altM). |
| 100.IT.RFID | RFIDed-team team member | |
| 100.altM | Alternatively-monitored item. In item lacking a BIRD, but still monitored by another BIRD. A specific instance is an RFID-tagged item (100.RFID). | |
| 100.C (1700) | Container item | Labeled as 100.C when discussed in its capacity as an item, not as a container |
| 100.psi | Person-scaled item | Hand-held and carryable items |
| 100.TR | Transportation vehicles | Cars, trucks, motorcycles, planes, boats |
| **BIRDs** | | |
| 200 | BIRD | Discussed throughout this document |
| 200.RC | Reduced configuration BIRD -- embodiments with limited components | |
| 200.Act | Active item BIRD, ABIRD | BIRD configured for use with an active item. May be external to the active item, or may be internal to (integrated into) the active item. |
| 200.Act.I | Internal ABIRD | |
| 200.Act.E | External ABIRD | |
| **BIRDed-items** | | |
| 102 | BIRDed-item: Item plus BIRD, tethered together or integrated into one structural/functional unit, configured for self-assessment as extant/normal or displaced/anomalous | |
| 102.Pass | BIRDed-passive-item | BIRD with a passive item |
| 102.Act | BIRDed-active item | ABIRD with an active item |
| 102.Act.E | BIRDed-active item with external ABIRD; special case of 102.Act | |
| 102.Act.I | BIRDed-active item with internal ABIRD; special case of 102.Act | |
| 102.IT, 102.EIT | Item team member | BIRDed item which is an item team member or extended item team member. |
| 102.PRI | Principal reporting item | See discussion under item teams |
| 102.ATP | Item-attached-to-person | Item routinely worn on person for sustained time |
| 102.FFP | Item-free-from-person | Item may routinely be on-person or off-person |
| **Item Teams** | | |
| 1400 | Item team | Group of cooperating BIRDed-items, typically in substantial and sustained mutual collocation |
| **Container Items** | | |
| 1700 (100.C) | Item used for holding or carrying other items | Labeled as 1700 when being discussed in its capacity as a container of other items |
| **Other** | | |
| 340, 100.Act.CP | Cell phone | Labeled as 340, 345 in reference to use as cell phone or computer, respectively. Labeled as 100.Act.X in reference to use as items self-assessing as extant/normal or displaced/anomalous. |
| 345, 100.Act.LC | Laptop computer or tablet computer | |

Figure 4B:
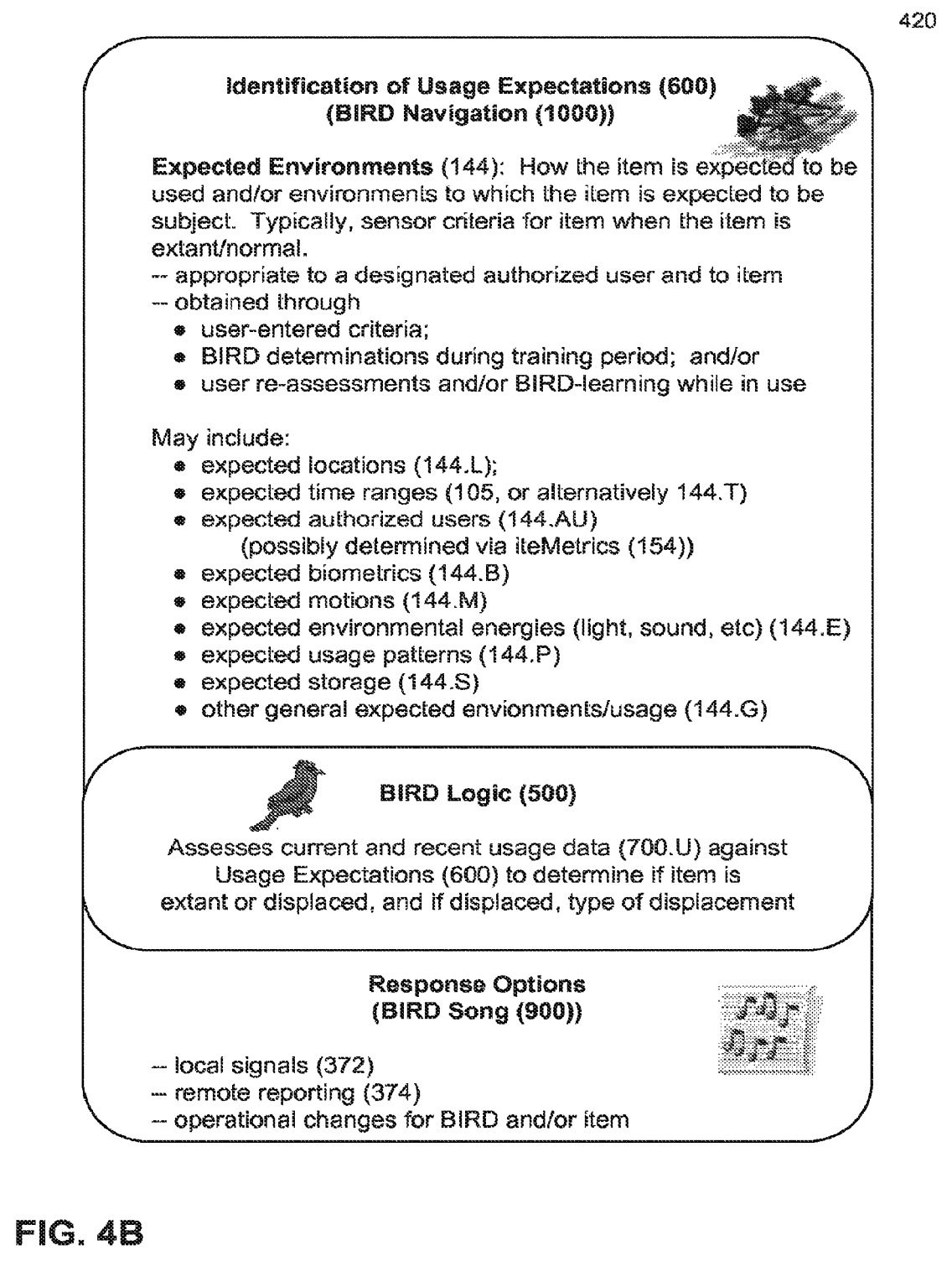

Identification of Usage Expectations (600)
(BIRD Navigation (1000))

Expected Environments (144): How the item is expected to be used and/or environments to which the item is expected to be subject. Typically, sensor criteria for item when the item is extant/normal.
-- appropriate to a designated authorized user and to item
-- obtained through
- user-entered criteria;
- BIRD determinations during training period; and/or
- user re-assessments and/or BIRD-learning while in use May include:
- expected locations (144.L);
- expected time ranges (105, or alternatively 144.T)
- expected authorized users (144.AU)
  (possibly determined via iteMetrics (154))
- expected biometrics (144.B)
- expected motions (144.M)
- expected environmental energies (light, sound, etc) (144.E)
- expected usage patterns (144.P)
- expected storage (144.S)
- other general expected envionments/usage (144.G)

BIRD Logic (500)

Assesses current and recent usage data (700.U) against Usage Expectations (600) to determine if item is extant or displaced, and if displaced, type of displacement

Response Options
(BIRD Song (900))

-- local signals (372)
-- remote reporting (374)
-- operational changes for BIRD and/or item

Exemplary BIRD Logic (500)

Key:

HB = Home Base
DL = Daily Life location
OOB = Out Of Bounds

AWOL = Absent Without Leave

AU = Authorized User
UU = Unauthorized User

---

Extant (503.1)
Lost (503.0.1)
Misplaced (503.0.2)
MisApp. = Misappropriated (503.0.3)
Stl = Stolen (503.0.4)
Wandering (503.0.5)

| Cluster \| Location (140) | 1 \| HB | 2 \| HB | 3 \| HB | 4 \| HB | 5 \| HB | 6 \| HB | 7 \| HB | 8 \| HB |
|---|---|---|---|---|---|---|---|---|
| On-P / Off-P (138, 139) | Motion | Motion | Motion | Motion | Stationary | Stationary | Stationary | Stationary |
| AWOL (128) | No | No | Yes | Yes | No | No | Yes | Yes |
| IteMetrics (154)/AU (131) | AU | UU | AU | UU | AU | UU | AU | UU |
| ***Assessed Item State*** | **Extant** | **MisApp/Stl** | **Wandering** | **MisApp/Stl** | **Extant** | **MisApp.** | **Misplaced** | **MisApp.** |

503.1 503.0.3 503.0.2

| Cluster \| Location | 9 \| HB | 10 \| HB | 11 \| HB | 12 \| HB |
|---|---|---|---|---|
| On-Person / Off-Person | Stagnant | Stagnant | Stagnant | Stagnant |
| AWOL | No | No | Yes | Yes |
| IteMetrics/AU | AU | UU | AU | UU |
| ***Assessed Item State*** | **Misplaced** | **MisApp.** | **Misplaced** | **MisApp.** |

| Cluster \| Location | 13 \| DL | 14 \| DL | 15 \| DL | 16 \| DL | 17 \| DL | 18 \| DL | 19 \| DL | 20 \| DL |
|---|---|---|---|---|---|---|---|---|
| On-Person / Off-Person | Motion | Motion | Motion | Motion | Stationary | Stationary | Stationary | Stationary |
| AWOL | No | No | Yes | Yes | No | No | Yes | Yes |
| IteMetrics/AU | AU | UU | AU | UU | AU | UU | AU | UU |
| ***Assessed Item State*** | **Extant** | **MisApp/Stl** | **Wandering** | **MisApp/Stl** | **Extant** | **MisApp/Stl** | **Wand/Lost** | **MisApp/Stl** |

| Cluster \| Location | 21 \| DL | 22 \| DL | 23 \| DL | 24 \| DL |
|---|---|---|---|---|
| On-Person / Off-Person | Stagnant | Stagnant | Stagnant | Stagnant |
| AWOL | No | No | Yes | Yes |
| IteMetrics/AU | AU | UU | AU | UU |
| ***Assessed Item State*** | **Lost** | **MisApp.** | **Lost** | **MisApp.** |

Status/State Clusters 505

| Cluster \| Location | 25 \| OOB | 26 \| OOB | 27 \| OOB | 28 \| OOB | 29 \| OOB | 30 \| OOB | 31 \| OOB | 32 \| OOB |
|---|---|---|---|---|---|---|---|---|
| On-Person / Off-Person | Motion | Motion | Motion | Motion | Stationary | Stationary | Stationary | Stationary |
| AWOL | No | No | Yes | Yes | No | No | Yes | Yes |
| IteMetrics/AU | AU | UU | AU | UU | AU | UU | AU | UU |
| ***Assessed Item State*** | **Query User** | **MisApp/Stl** | **Wandering** | **MisApp/Stl** | **Query User** | **MisApp/Stl** | **Wandering** | **MisApp/Stl** |

Item Statuses 501

Item State 503

| Cluster \| Location | 33 \| OOB | 34 \| OOB | 35 \| OOB | 36 \| OOB |
|---|---|---|---|---|
| On-Person / Off-Person | Stagnant | Stagnant | Stagnant | Stagnant |
| AWOL | No | No | Yes | Yes |
| IteMetrics/AU | AU | UU | AU | UU |
| ***Assessed Item State*** | **Lost** | **MisApp/Stl** | **Lost** | **MisApp/Stl** |

Exemplary BIRD Logic (500)

| Cluster ¦ Location | 1 ¦ HB | 5 ¦ HB | 13 ¦ DL | 17 ¦ DL | 7 ¦ HB | 9 ¦ HB | 11 ¦ HB | |
|---|---|---|---|---|---|---|---|---|
| On-Person / Off-Person | Motion | Stationary | Motion | Stationary | Stationary | Stagnant | Stagnant | |
| AWOL | No | No | No | No | Yes | No | Yes | |
| IteMetrics/AU | AU | AU | AU | AU | AU | AU | AU | |
| ***Assessed Item State*** | **Extant** | **Extant** | **Extant** | **Extant** | **Misplaced** | **Misplaced** | **Misplaced** | |

| Cluster ¦ Location | 21 ¦ DL | 23 ¦ DL | 33 ¦ OOB | 35 ¦ OOB | 3 ¦ HB | 15 ¦ DL | 27 ¦ OOB | 31 ¦ OOB |
|---|---|---|---|---|---|---|---|---|
| On-Person / Off-Person | Stagnant | Stagnant | Stagnant | Stagnant | Motion | Motion | Motion | Stationary |
| AWOL | No | Yes | No | Yes | Yes | Yes | Yes | Yes |
| IteMetrics/AU | AU | AU | AU | AU | AU | AU | AU | AU |
| ***Assessed Item State*** | **Lost** | **Lost** | **Lost** | **Lost** | **Wandering** | **Wandering** | **Wandering** | **Wandering** |

| Cluster ¦ Location | 6 ¦ HB | 8 ¦ HB | 10 ¦ HB | 12 ¦ HB | 22 ¦ DL | 24 ¦ DL | | |
|---|---|---|---|---|---|---|---|---|
| On-Person / Off-Person | Stationary | Stationary | Stagnant | Stagnant | Stagnant | Stagnant | | |
| AWOL | No | Yes | No | Yes | No | Yes | | |
| IteMetrics/AU | UU | UU | UU | UU | UU | UU | | |
| ***Assessed Item State*** | **MisApp.** | **MisApp.** | **MisApp.** | **MisApp.** | **MisApp.** | **MisApp.** | | |

| Cluster ¦ Location | 2 ¦ HB | 4 ¦ HB | 14 ¦ DL | 16 ¦ DL | 18 ¦ DL | 20 ¦ DL | 26 ¦ OOB | 28 ¦ OOB |
|---|---|---|---|---|---|---|---|---|
| On-Person / Off-Person | Motion | Motion | Motion | Motion | Stationary | Stationary | Motion | Motion |
| AWOL | No | Yes | No | Yes | No | Yes | No | Yes |
| IteMetrics/AU | UU | UU | UU | UU | UU | UU | UU | UU |
| ***Assessed Item State*** | **MisApp/Stl** | **MisApp/Stl** | **MisApp/Stl** | **MisApp/Stl** | **MisApp/Stl** | **MisApp/Stl** | **MisApp/Stl** | **MisApp/Stl** |

| Cluster ¦ Location | 30 ¦ OOB | 32 ¦ OOB | 34 ¦ OOB | 36 ¦ OOB | | 19 ¦ DL | | |
|---|---|---|---|---|---|---|---|---|
| On-Person / Off-Person | Stationary | Stationary | Stagnant | Stagnant | | Stationary | | |
| AWOL | No | Yes | No | Yes | | Yes | | |
| IteMetrics/AU | UU | UU | UU | UU | | AU | | |
| ***Assessed Item State*** | **MisApp/Stl** | **MisApp/Stl** | **MisApp/Stl** | **MisApp/Stl** | | **Wand/Lost** | | |

| Cluster ¦ Location | 25 ¦ OOB | 29 ¦ OOB |
|---|---|---|
| On-Person / Off-Person | Motion | Stationary |
| AWOL | No | No |
| IteMetrics/AU | AU | AU |
| ***Assessed Item State*** | **Query User** | **Query User** |

503.9

Key: HB = Home Base DL = Daily Life location OOB = Out Of Bounds
AWOL = Absent Without Leave
AU = Authorized User UU = Unauthorized User Extant (503.1) Lost (503.0.1) Misplaced (503.0.2) Stl = Stolen (503.0.4)
MisApp. = Misappropriated (503.0.3) Wandering (503.0.5)

FIG. 5C

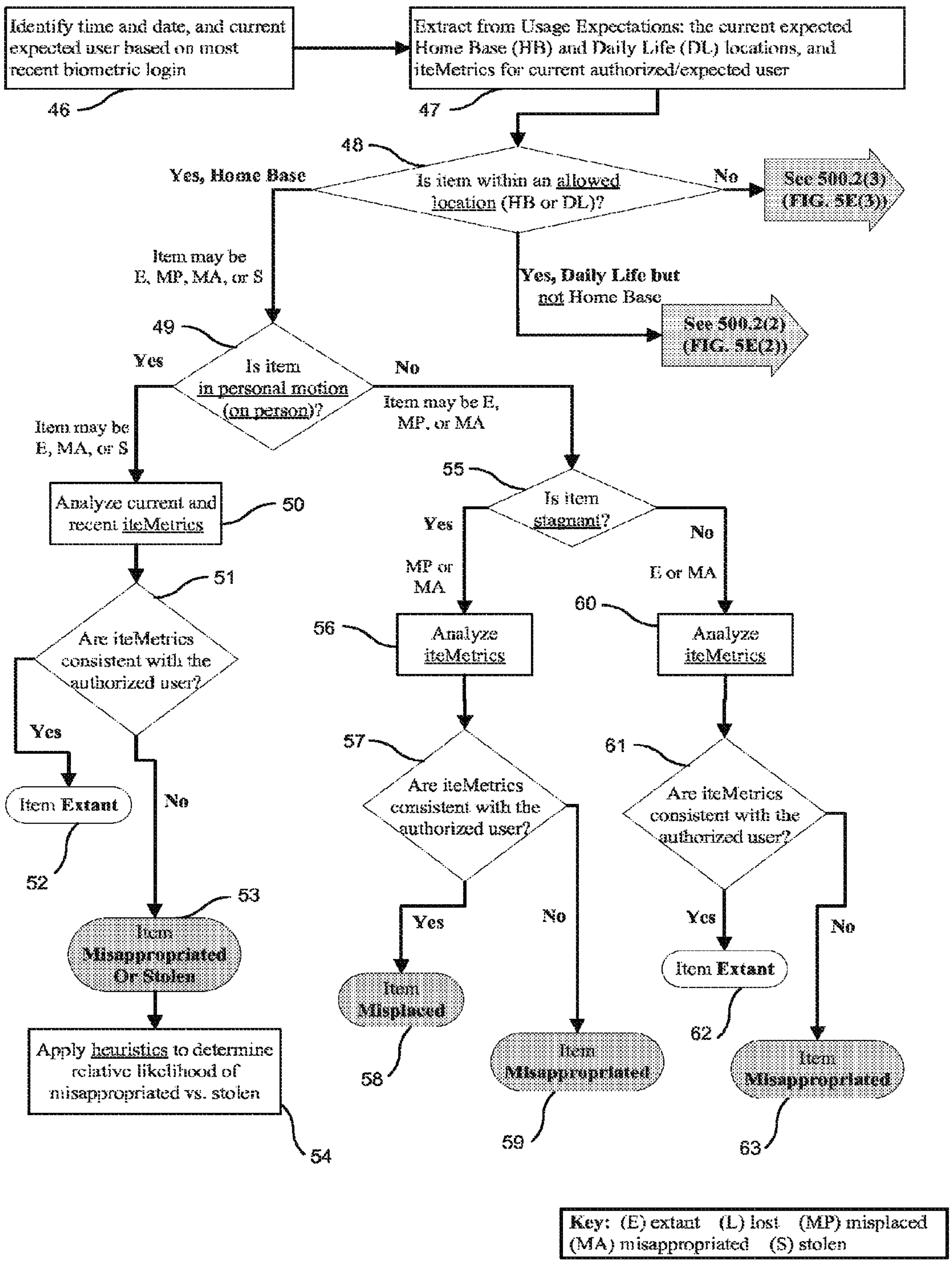
FIG. 5E(1)
500.3(1)[Meth]

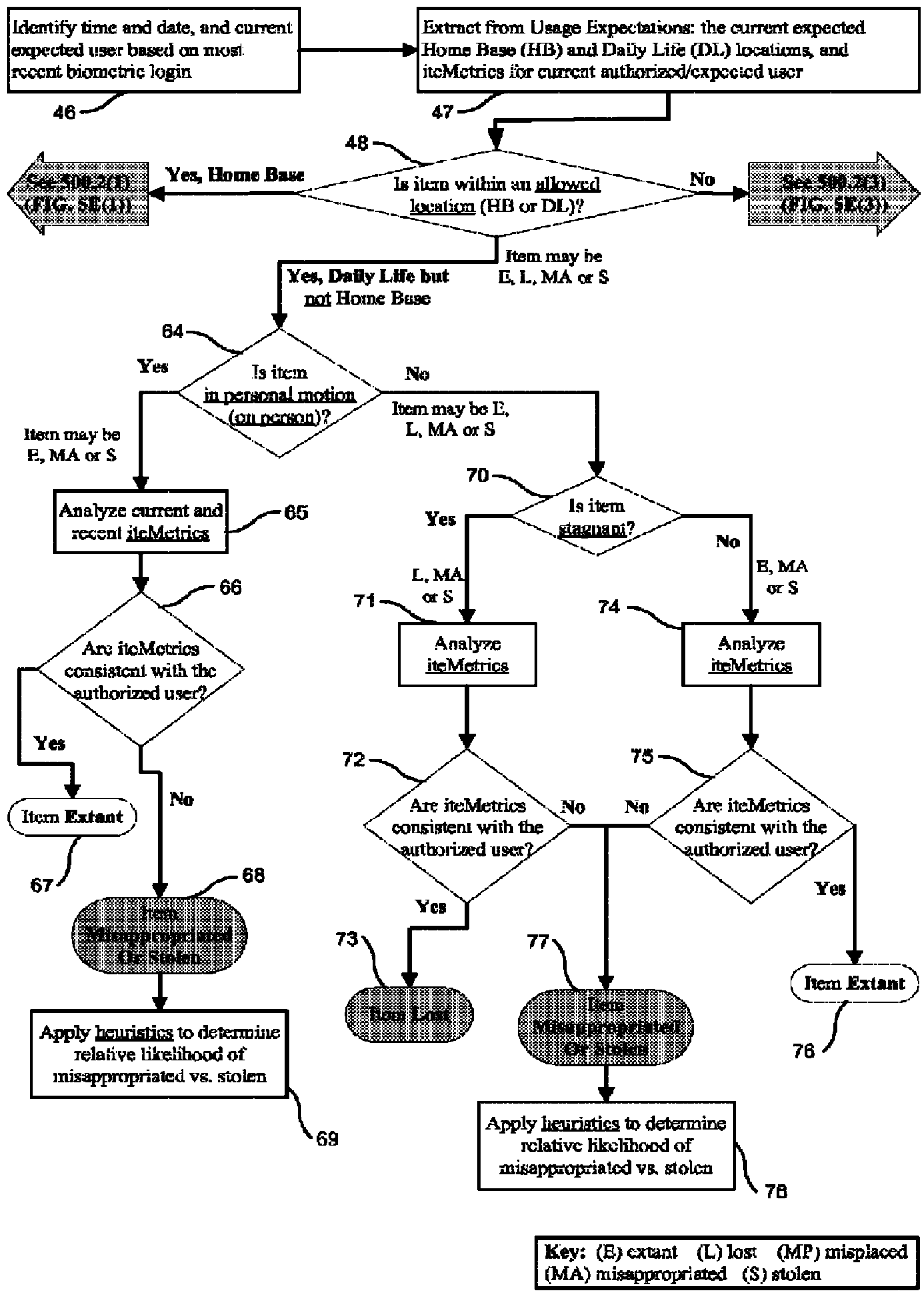
FIG. 5E(2)
500.3(2)[Meth]

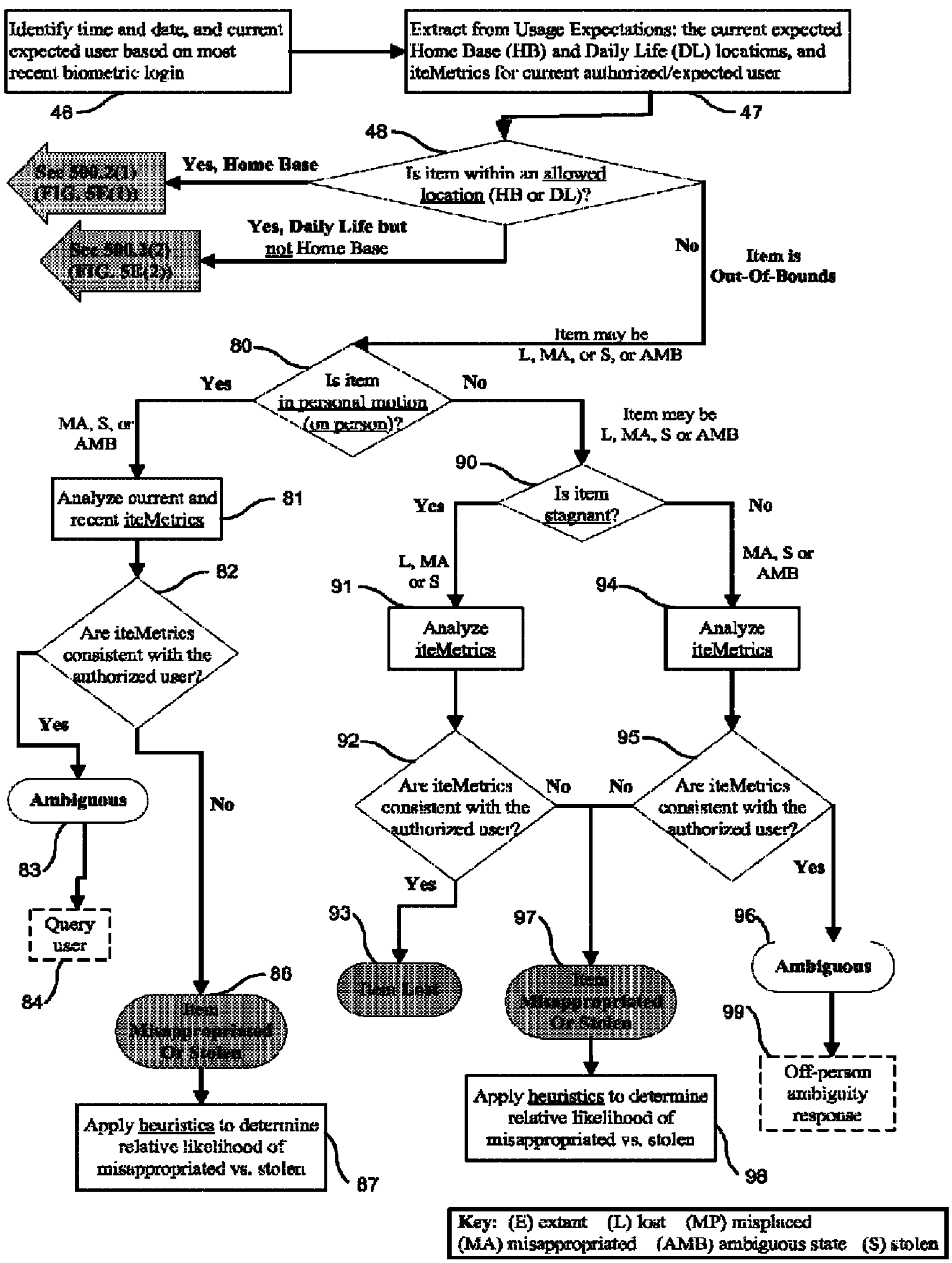
FIG. 5E(3)
500.3(3)[Meth]

Exemplary BIRD Logic (500)

Status/State Clusters 505

500.S1

| | S1.1 | S1.2 | S1.3 | S1.4 | S1.5 | S1.6 |
|---|---|---|---|---|---|---|
| AWOL (Absent Without Leave) (128) | No | No | No | Yes | Yes | Yes |
| On-Person/Off-Person (138, 139) | On | Stationary | Stagnant | On | Stationary | Stagnant |
| ***Assessed Item State*** | **Extant** | **Extant** | **Misplaced** | **Extant/ Wandering** | **Wandering/ Lost** | Lost |

Item Statuses 501

Item State 503

503.1 503.0.2 503.0.5 503.0.1

Key: AWOL = Absent Without Leave (128), has values of "Yes" or "No"
On = OnPerson (138.OnP, 139.UM) Stationary (138.OffP, 139.Stat) Stagnant (138.OffP, 139.StG)

Extant (503.1) Lost (503.0.1) Misplaced (503.0.2) Wandering (503.0.5)

FIG. 5F

Exemplary BIRD Logic (500)

Status/State Clusters 505

500.S2

| | S2.1 | S2.2 | S2.3 | S2.4 | S2.5 | S2.6 |
|---|---|---|---|---|---|---|
| IteMetrics (154) / AU (131) | AU | AU | AU | UU | UU | UU |
| On-Person/Off-Person (138, 139) | On | Stationary | Stagnant | On | Stationary | Stagnant |
| ***Assessed Item State*** | **Extant** | **Extant** | **Misplaced / Lost** | **Stolen / MisApp.** | **Stolen / MisApp.** | **Stolen / MisApp.** |

Item Statuses 501

Item State 503

503.1

503.0.2

503.0.1

503.0.3

503.0.4

Key: Authorized User Status (131) = AU (Authorized User) or UU (Unauthorized User)
On = OnPerson (138.OnP, 139.UM) Stationary (138.OffP, 139.Stat) Stagnant (138.OffP, 139.StG)

Extant (503.1) Lost (503.0.1) Misplaced (503.0.2) MisApp. = Misappropriated (503.0.3) Stl = Stolen (503.0.4)

FIG. 5H

Exemplary Item Usage Expectations 600

Location Usage Expectations 600.Loc

144.L

*Locations*

*Location 1*

| Name: | Type: | Definition Type: | Coordinates: | Zones: | Num. of Zones: | Zone Def: |
|---|---|---|---|---|---|---|
| Jane's Home | Home Base | Perimeter | *JHC1 | Yes | 5 | *JHZ1 |
| **Days:** | **Times** | **Times** | **% Time Flex** | **Flex Min** | **Max Step Out Time** | **Stagnancy** |
| 2-6; 1,7 | 2-6: 18:00-8:00 | 1,7: 00:00-24:00 | 10% | | 120 minutes | 9999 |

*Location 2*

| Name: | Type: | Definition Type: | Coordinates: | Zones: | Num. of Zones: | Zone Def: |
|---|---|---|---|---|---|---|
| Jane's Office | Home Base | Perimeter | *JHC2 | Yes | 4 | *JHZ2 |
| **Days:** | **Times** | **Times** | **% Time Flex** | **Flex Min** | **Max Step Out Time** | **Stagnancy** |
| 2-6 | 2-6: 18:00-8:00 | 1,7: 00:00-24:00 | 10% | | 60 minutes | 20 minutes |

*Location 3*

| Name: | Type: | Definition Type: | Coordinates: | Zones: | Num. of Zones: | Zone Def: |
|---|---|---|---|---|---|---|
| Jane's Daily Life | Daily Life | Radial | *JDL | No | n/a | n/a |
| **Days:** | **Times** | **Times** | **% Time Flex** | **Flex Min** | **Max Step Out Time** | **Stagnancy** |
| 2-6; 1,7 | 2-6: 18:00-8:00 | 1,7: 00:00-24:00 | | 50 minutes | 30 minutes | 5 minutes |

144.G, 144.P

144.CR

*Travel Routes*

| | TR1 | TR2 | TR3 | TR4 | TR5 |
|---|---|---|---|---|---|
| **Name:** | Jane General 1 | Jane General 2 | Jane Neighborhood | Jane Downtown | Jane Biking |
| **Type:** | Highway | Local Roads | Local Roads | Mass Transit | Local Roads |
| **Mode:** | Car | Car | Walking | Bus | Bike |
| **Coordinates:** | *TR1 | *TR2 | *TR3 | *TR4 | *TR5 |

FIG. 6A

Exemplary Item Usage Expectations 600 IteMetrics 154

156 MorphiteMetrics

144.M, 144.P, 144.AU

***Walking* (156.1)**
Spec. Type: Param.

| **Average Speed** | **Maximum Speed** | **Avg. Stride Length** | **Avg. Bounce Height** | **Avg. Sway** |
|---|---|---|---|---|
| 1.4 m/s | 1.7 m/s | 0.48 meters | 2.3 cm | 2.8 cm |
| **% of Time Walking** | **% of Time Standing** | **Standing Mot. Mag.** | **% of Time Seated** | **Seated Motion Mag.** |
| 28% | 10% | 3.6 | 72% | 1.7 |

***Arm & Hand Motions* (156.2)**
Spec. Type: Param.

| **Average Frequency** | **Avg. Lin. Velocity** | **Avg. Thrust** | **Avg. Angular Vel.** | **Avg. Torque** |
|---|---|---|---|---|
| 3.7 | 0.7 m/s | 0.4 m/s2 | 1.2 | 0.6 |

144.B, 144.AU

*Physiological Features (156.3)*
Spec Type: Waveforms

| ***Facial Profile*** | ***Voice Print*** | ***Finger Prints*** | ***Iris Scan*** | ***Physiological Signatures*** |
|---|---|---|---|---|
| *FP | *VP | *NP | *IS | *PS |

158 PsylteMetrics

144.L, 144.T, 144.M, 144.E, 144.S, 144.G, 144.P, 144.AU

Jane's Home

| Avg. % of Time On-Person | Avg. % of Time of Light Exposure | Avg. % Sound Exp. | Avg. Sound Exposure | Avg. Temp. |
|---|---|---|---|---|
| 5% | 53% | 12% | 35 dB | 75 F |

Jane's Office

| Avg. % of Time On-Person | Avg. % of Time of Light Exposure | Avg. % Sound Exp. | Avg. Sound Exposure | Avg. Temp. |
|---|---|---|---|---|
| 15% | 90% | 62% | 50 dB | 70 F |

Jane's Daily Life (non-Home Base)

| Avg. % of Time On-Person | Avg. % of Time of Light Exposure | Avg. % Sound Exp. | Avg. Sound Exposure | Avg. Temp. |
|---|---|---|---|---|
| 95% | 5% | 45% | 40 dB | 55 F |

FIG. 6B

Exemplary Supplemental Item Usage Expectations 600.S

600.S.10 Item stationary < 15 continuous minutes at a time

600.S.12 Item temperature > 60° F and Item temperature < 85° F

600.S.14 Item temperature !< 60° F and Item temperature !> 85° F for more than 5 continuous minutes 600.S.16 Item location within Defined_Region_1 or within Defined_Region_2
or along Defined_Route_1 or Within Building_1 or Within Building_3

600.S.18 Item location within Defined_Region_1 or within Defined_Region_2
or along Defined_Route_1 or Within Building_1 or Within Building_3
for at least 90% of a 10 hour period

---

600.S.20 Between 7 a.m. and 6 p.m.
Item stationary < 15 continuous minutes at a time 600.S.22 Between 7 a.m. and 6 p.m.
Item temp. > 60° F & Item temp. < 85° F at least 90% of the time 600.S.24 Between 7 a.m. and Noon on weekdays
Item location within Defined_Region_1 or within Defined_Region_2
at least 90% of the time
Between Noon and 5 p.m. on weekdays
Item location within or along Defined Route_1 or Within Building_1 or
Building_3 for 95% of the time 600.S.26 Between 7 a.m. and 6 p.m. on Mondays, Tuesdays, and Wednesdays
When Item location within Defined_Region_1 or within Defined_Region_2
Item in motion at least 90% of the time
When Item location along Defined Route_1 or Within Building_1 or
Building_3 Item never at rest more than 5 minutes at a time

---

600.S.28 Between 7 a.m. and Noon
Item location within Defined_Region_1 or within Defined_Region_2
and Item acceleration <= WalkingLevelAcceleration
Between Noon and 5 p.m.
Item location within or along Defined Route_1 or Within Building_1 or
Building_3 and Item acceleration <= WalkingLevelAcceleration
Between 5 p.m. and 6 p.m.
Item location within Building_4 and Item accel. <= RunningLevelAcc
Between 6 p.m. and 7 p.m. Item location along Defined Route_1
and Item acceleration <= DrivingLevelAcceleration
Between 7 p.m. and 8 p.m. Item location in Building_5 and Item Accel. = 0

| | | |
|---|---|---|
| Real-time Sensor Data | 700.R | Current, raw sensor data as delivered in substantially real-time by the sensors (210). May include, for example and without limitation:<br>• location data<br>• motion data<br>• raw audio data<br>• raw image data<br>• air pressure data<br>• surface pressure data<br>• chemical data<br>• electromagnetic data<br>• orientation data<br>• moisture and/or humidity data<br>• radiation data<br>• RFID signatures<br>• sonar and/or radar data<br>• vibration data<br>• radiation data |
| Historical Sensor Data | 700.H | A record of raw sensor data stretching for some time back from the present, possibly inclusive of the present. The extent of the stored data—seconds, minutes, hours, days—may be dependent on the intended use of the data. The BIRD (200) may store historical data dating back hours, days, weeks, or even longer. |
| Sensor Data | 700 | Both real-time sensor data and historical sensor data. |
| Processed Sensor Data | 700.P | One or more of the following elements:<br>• Average values; statistical values; maximum and minimum values; trend detection; patterns; threshold crossings; data correlations;<br>• identifications of environmental entities, including for example and without limitation: facial identification; voice identification; building and/or room locations; objects in the environment;<br>• waveform constructions; waveform decompositions (Fourier analysis, wavelet analysis);<br>• statistical item usage patterns;<br>• neural network models and other predictive models;<br>• IteMetrics (154), including either or both of morphIteMetrics (156) and psyIteMetrics (158);<br>• any other data resulting from the processing of sensor data (700). |
| Usage Data | 700.U | An aggregation of any and/or all of the above: real-time sensor data (700.R), historical sensor data (700.H), and/or processed sensor data (700.P), as required for comparison against usage expectations (600). |

| Date | Time | Location | Accel | Vel | Light | PSD1 |
|---|---|---|---|---|---|---|
| 9/5/2011 | 0:01 | GPS 1.0 | 0 | 0 | 0 | .02 |
| 9/5/2011 | 0:02 | GPS 1.0 | 0 | 0 | 0 | .07 |
| 9/5/2011 | 0:03 | GPS 1.0 | 0 | 0 | 0 | 0 |
| ... | ... | ... | ... | ... | ... | ... |
| 9/5/2011 | 7:03 | GPS 1.0 | 0 | 0 | 0.1 | .85 |
| 9/5/2011 | 7:04 | GPS 1.0 | 0 | 0 | 0.2 | .76 |
| 9/5/2011 | 7:05 | GPS 1.0 | 0 | 0 | 0.3 | .78 |
| ... | ... | ... | ... | ... | ... | ... |
| 9/5/2011 | 8:01 | GPS 1.1 | 0.1 | 0 | 0 | .24 |
| 9/5/2011 | 8:02 | GPS 1.2 | 0 | 0.5 | 0 | .28 |
| 9/5/2011 | 8:03 | GPS 1.1 | 0.1 | 0.2 | 0 | .32 |
| ... | ... | ... | ... | ... | ... | ... |
| 9/5/2011 | 8:31 | GPS 1.3 | 0.1 | 0.4 | 1.2 | .44 |
| 9/5/2011 | 8:32 | GPS 1.4 | 0.05 | 0.5 | 1.25 | .42 |
| 9/5/2011 | 8:33 | GPS 1.4 | 0.1 | 0 | 1.15 | .42 |
| ... | ... | ... | ... | ... | ... | ... |
| 9/5/2011 | 8:45 | GPS 2 | 1.4 | 4 | 1.2 | .66 |
| 9/5/2011 | 8:46 | GPS 3 | .3 | 4.3 | 1.15 | .87 |
| 9/5/2011 | 8:47 | GPS 4 | -0.5 | 3.5 | 1.22 | .98 |
| ... | ... | ... | ... | ... | ... | ... |
| 9/5/2011 | 8:55 | GPS 5.1 | 0.05 | 0.2 | 1.1 | .27 |
| 9/5/2011 | 8:56 | GPS 5.1 | 0.07 | 0.5 | 1.15 | .25 |
| 9/5/2011 | 8:57 | GPS 5.2 | 0.1 | 0.3 | 1.0 | .27 |
| ... | ... | ... | ... | ... | ... | ... |
| 9/5/2011 | 9:30 | GPS 5.3 | 0.01 | 0.03 | 0 | .65 |
| 9/5/2011 | 9:31 | GPS 5.3 | 0 | 0 | 0 | .78 |
| 9/5/2011 | 9:32 | GPS 5.3 | 0.02 | 0.01 | 0 | .43 |
| ... | ... | ... | ... | ... | ... | ... |
| 9/5/2011 | 10:05 | GPS 5.4 | 0.08 | 0.3 | 0 | .03 |
| 9/5/2011 | 10:06 | GPS 5.3 | -0.1 | 0.1 | 0 | .25 |
| 9/5/2011 | 10:07 | GPS 5.5 | 0.07 | 0.2 | 0 | .16 |

Key chain at home, out on table, motionless, at night. (705)

Key chain at home, out on table, motionless, at dawn. (710)

Key chain at home, in owner's pocket, owner moving about home. (715)

Key chain out as owner locks house door, then opens and starts car. (720)

Owner on the road, driving to job. (725)

Key chain out as owner turns off ignition, locks car, has keys out for entry to office, walks to entrance. (730)

Owner at work at desk, keys in pocket, minimal body movement while seated at desk. (735)

Owner walking about office. Keys remain in pocket. (740)

Between 0700, and 1800 Item temp. > 60° F & Item temp < 85° F (600.7)

Data Types (step 804): Time and Temperature

Data Scope (step 806): Current Value of Temperature, Current Time

Retrieve Values (step 808): Current Time, Current Temperature

Calculation Type (step 810): Data Validation

Calculations (step 812.0): Determine if current time is between 7 a.m. and 6 p.m. If "Yes", then use current value (812A) for Temperature Comparison (step 460): Determine if Current Temp. > 60 and Current Temp < 85 ("Yes" = Item okay, "No" = Item anomalous)

---

Between 0700 and 1800, for the Most Recent Hour
Item temp. > 60° F & Item temp. < 85° F at least 90% of the time (600.8)

Data Types (step 804): Time and Temperature

Data Scope (step 806): Current Time, Values of Temperature for up to 1 hour previous Calculation Type (step 808): % of time that the Temperature was within limits Retrieve Values (step 810): Current Time, Temperature Values up to 1 hour previous, but no earlier than 7 a.m.

Calculations (step 812.0, 812.4): Determine if current time between 7 a.m. and 6 p.m. If "Yes", then % of Temperature data values within the past hour that were between 60 and 85 degrees Comparison (step 460): Determine if calculated % is greater than or equal to 90% ("Yes" = Item okay, "No" = Item anomalous)

---

Between 0700 and 0800,
Correlation ( (Light Level < 0.1), (Acceleration < 0.01) ) >= 0.98 (600.9)

Data Types (step 804): Time, Ambient Light Level, Item Acceleration

Data Scope (step 806): Current Time, Values of Light Level and Acceleration for 7 a.m. to present time.

Calculation Type (step 808): Correlation Function

Retrieve Values (step 810): Current Time, Values of Light Level and Acceleration for 7 a.m. to present time.

Calculations (step 812.0, 812.9): Determine if current time between 7 a.m. and 6 p.m. If "Yes", then determine correlation between times when ambient Light Level is less than 0.1 and times when Acceleration is less than 0.01.

Comparison (step 460): Determine if correlation is greater than or equal to 0.98. ("Yes" = Item okay, "No" = Item anomalous)

872 <u>Motion API</u>

874 boolean Item_Is_In_Motion (float motionThreshold, float Duration)
int Percentage_Of_Time_Item_Is_In_Motion(float Duration)
int Percentage_Of_Time_Item_Is_In_Motion(time StartTime, time EndTime)
int Percentage_Of_Time_Item_Is_In_Motion(date D; time StartTime, time EndTime)

876 boolean Item_Is_Not_In_Motion (float motionThreshold, float Duration)
boolean Item_Is_Not_In_Motion(time StartTime, float Duration)
int Percentage_Of_Time_Item_Is_Not_In_Motion(float Duration)

878 float Acceleration_Of_Item(float Duration)
float Velocity_Of_Item(float Duration)
float Max_Acceleration(float Duration)
float Min_Acceleation (float Duration)
float Max_Velocity(float Duration)
float Min_Velocity(float Duration)

880 <u>Boundary API</u>

882 boolean Item_Is_Outside_Of_Boundary(boundary_data B)
boolean Item_Is_Outside_Of_Boundary(boundary_data B, float Duration)

884 int Percentage_Of_Time_Item_Is_Outside_Of_Boundary(boundary_data B)
int Percentage_Of_Time_Item_Is_Outside_Of_Boundary(time StartTime, time EndTime, boundary_data B)
int Percentage_Of_Time_Item_Is_Outside_Of_Boundary(float TimeDuration, boundary_data B)

886 <u>Visual APIs</u>

888 float Ambient_Light_Level(time StartTime, time EndTime)
float Ambient_Light_Level(float TimeDuration)
float Max_Ambient_Light_Level(time StartTime, time EndTime)
float Min_Ambient_Light_Level(time StartTime, time EndTime)

890 int Number_Of_Times_Ambient_Light_Level_Crosses_Threshold(time StartTime, time EndTime, float Threshold)
int Number_Of_Times_Ambient_Light_Level_Crosses_Threshold (float TimeDuration, float Threshold)

892 image GetCurrentImage()
boolean ImageMatch (image I1, imageI2, matchParameters M)

894 <u>Sound APIs</u> float Ambient_Sound_Level(time StartTime, time EndTime)
float Max_Ambient_Sound_Level(time StartTime, time EndTime)
int Number_Of_Times_Ambient_Sound_Level_Crosses_Threshold(time StartTime, time EndTime, float Threshold)
sound RecordSound(int NumSeconds)
boolean compareSounds(sound S1, soundS2, matchParameters S)

FIG. 8C

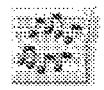

900

BIRD Song Decision Table (900.1)

| Contexts: / Conditions | Time Frame 1 C1 | C2 | C3 | Time Frame 2 C4 | C5 | C6 | Location 1 C7 | C8 | C9 | Location 2 C10 | C11 | C12 |
|---|---|---|---|---|---|---|---|---|---|---|---|---|
| if (item not in motion) > threshold minutes | X | X | | | | | X | X | X | | | |
| if (item in motion) > threshold minutes | | | | X | X | X | | | | | | |
| if (item outside allowed area) | | | X | | X | | | | | | | |
| if (item outside allowed area) > threshold minutes | X | | | | | X | | X | | X | X | |
| if (environment sound level) > threshold level | | X | X | | X | | | | | | X | |
| if (environment sound level) > threshold level for at least threshold time | | | | | | X | | | X | | | X |
| Sound local item alarm | X | X | X | X | | X | X | | | X | | |
| Send alert message to user alert center (cell phone, home PC, etc.) | | X | | | X | X | | X | X | X | X | X |

MessageItemAnomaly(anomaly A, signalling_method S, Target T, signaling_parameters P, alert_level L)

anomaly = type of anomaly signaling_method = phone call, internet communication, text message target = phone number, e-mail address, other message destination signalling parameters = message content alert level = probability/likelihood of actual anomaly, for example, "red, orange, yellow, blue", or a numeric scale (1 = lowest, 3 = intermediate, 5 = certain anomaly)

974

SignalItemAnomaly(anomaly A, signalling_method S, signaling_parameters P, alert_level L)

anomaly = type of anomaly signaling method = sound, visual, vibration signaling parameters = noise type, noise volume, noise duration, visual signal type, visual signal intensity, visual signal duration, vibration intensity, vibration duration alert level = probability/likelihood of actual anomaly, for example, "red, orange, yellow, blue", or a numeric scale (1 = lowest, 3 = intermediate, 5 = certain anomaly)

| BIRDed-Active Item (102.Act) | Exemplary Active Item Operations Evaluations (1350) to Distinguish Normal Usage from Anomalous Usage |
| --- | --- |
| Generic (applicable across more than one device type)<br>1352 | • Times of day item on or off<br>• % of time item on or off<br>• Frequency of usage by user at different times<br>• Power consumption at different times<br>• Correlation of on/off with specific locations<br>• Correlation of usage with specific locations<br>• Correlation of usage with item motion<br>• Correlation of usage with other environmental factors<br>• Correlation of power consumption with environmental factors<br>• Major / unauthorized hardware or firmware changes (SAM card replacement, hard drive replacement, BIOS chip replacement, etc.) |
| Cell Phone 1355<br><br>100.Act.CP | • Rate at which phone numbers added to or deleted from stored phone book.<br>• % of calls/text messages based on stored phone book #'s<br>• % of calls to toll free numbers<br>• % of calls to billable numbers<br>• % of calls/text messages local to current cell phone location |
| Laptop Computer 1360<br>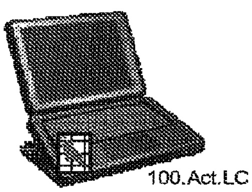<br>100.Act.LC | • Frequency of usage of different programs<br>• Times of day when different programs are used<br>• Relative usage of different programs<br>• Frequency / timing of access to different web sites / IP addresses<br>• Rate at which e-mail addresses are added to or deleted from stored address book<br>• % of e-mails to/from stored or previously used e-mail addresses<br>• Unauthorized/unexpected formatting of hard drive |
| GPS 1365<br>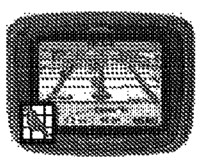<br>100.Act.GPS | • Removal from car where normally used (based on sensor data configured and interpreted to determine interior environment or other properties of car)<br>• Frequency at which user seeks directions to previously unvisited locations<br>• Frequency at which user re-uses directions to previously visited locations<br>• Travel to locations at specified distance apart from previously visited locations<br>• Usage at expected or unexpected times of day |
| Weapon (e.g., Stun Gun, Taser, etc.)<br>1370<br>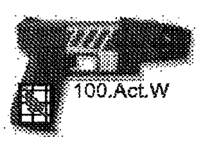<br>100.Act.W | • Weapon aimed at inappropriate target, for example a child, small animal, law enforcement officer, or the elderly (may required advanced, embedded visual and/or sound identification systems)<br>• Weapon discharged on inappropriate target (may required advanced sensing of electrical impedance or other electrical properties of target)<br>• Weapon discharged inappropriate number of times at same target in short time interval |

| Exemplary Statuses (501.Act) | Exemplary Internal Operations Features (1382) | Exemplary Status Values (1385) | Exemplary Associated States (503.Act) |
|---|---|---|---|
| **Physical Level (501.Act.P)** | | | |
| % Time Power On/Off | Power | In-Bounds / Out-of-Bounds | Power On, Power Off, External Power Control (power on/off privileges for user) |
| Power On/Off Schedule | Power | Consistent / Inconsistent | |
| Average Power Consumption | Power | Consistent / Inconsistent | |
| CPU Usage | CPU Activity | Consistent / Inconsistent | Boot level/BIOS Access |
| Average Memory Usage | Memory Access | Consistent / Inconsistent | System-specific controls |
| Hardware Features Settings | Misc. Hardware Features | Consistent / Inconsistent | |
| **Program (Executable) Level (501.Act.E)** | | | |
| Programs/Apps Accessed | Program Access | Normal Access / Unusual Access | Program and file access privileges and rights, including access to operating system-level features |
| Frequency of Program/App Use | Program Access | Normal Frequency / Unusual Freq. | |
| File/Data Access | File Access | Normal Access / Unusual Access | |
| Program Specific | Misc. Program Features | Values returned by programs | |
| **Communications Level (501.Act.C)** | | | |
| IP Addresses/URLs Accessed | IP Addresses/URLs | Consistent / Inconsistent | Access to communications data, including both:<br>-- call history, messaging history, and URL history;<br>-- call and messaging data access rights;<br>-- access privileges for outgoing communications<br>-- access privileges for incoming communications |
| IP Addresses/URLs Frequency | IP Addresses/URLs | Consistent / Inconsistent | |
| E-mail Addresses Accessed | E-mail Addresses | Consistent / Inconsistent | |
| IP Addresses/URLs Accessed | E-mail Addresses | Consistent / Inconsistent | |
| E-mail Addresses Received | E-mail Addresses | Consistent / Inconsistent | |
| IP Addresses/URLs Received | E-mail Addresses | Consistent / Inconsistent | |
| Phone Numbers Called | Phone Numbers | Consistent / Inconsistent | |
| Phone Numbers Call Frequ. | Phone Numbers | Consistent / Inconsistent | |
| Phone Numbers Received | Phone Numbers | Consistent / Inconsistent | |
| Phone Numbers Received Freq. | Phone Numbers | Consistent / Inconsistent | |

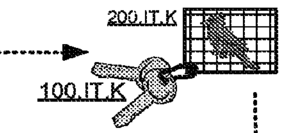

Tx 1405.T

1415 → Validation

| Item Team ID | Item ID | Sequence | Validation | Time | Location | Motion | Illumination |
|---|---|---|---|---|---|---|---|
| Sally1 | Keys | 1 | 8 | 08:01:00 | 355785 | 0.0 | 0.0 |
| Sally1 | Keys | 2 | 7 | 08:01:30 | 355785 | 0.0 | 0.0 |
| Sally1 | Keys | 3 | 1 | 08:02:00 | 355786 | 0.02 | 0.0 |
| Sally1 | Keys | 4 | 5 | 08:02:30 | 355787 | 0.03 | 0.1 |

1430.K

1431

1432

1400.1.S2 ⟨ 1430.K, 1430.W, 1430.CP ⟩ — Rx 1405.R →

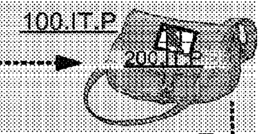

Tx 1405.T

1415 → Validation

| Item Team ID | Item ID | Sequence | Validation | Time | Location | Motion | Illumination |
|---|---|---|---|---|---|---|---|
| Sally1 | Purse | 1 | B | 08:01:00 | 355785 | 0.0 | 0.1 |
| Sally1 | Purse | 2 | E | 08:01:30 | 355785 | 0.0 | 0.1 |
| Sally1 | Purse | 3 | 3 | 08:02:00 | 355786 | 0.02 | 0.1 |
| Sally1 | Purse | 4 | 5 | 08:02:30 | 355787 | 0.01 | 0.1 |

1430.P

1434

1400.1.S3 ⟨ 1430.K, 1430.W, 1430.P ⟩ — Rx 1405.R →

Tx 1405.R

1415 → Validation

| Item Team ID | Item ID | Sequence | Validation | Time | Location | Motion | Illumination |
|---|---|---|---|---|---|---|---|
| Sally1 | CellPh | 1 | 2 | 08:01:00 | 355785 | 0.0 | 0.0 |
| Sally1 | CellPh | 2 | 9 | 08:01:30 | 355785 | 0.0 | 0.0 |
| Sally1 | CellPh | 3 | 9 | 08:02:00 | 355786 | 0.02 | 0.0 |
| Sally1 | CellPh | 4 | D | 08:02:30 | 355787 | 0.03 | 0.0 |

1430.CP

1436

1400.1.S4 ⟨ 1430.K, 1430.CP, 1430.P ⟩ — Rx 1405.R →

Tx 1405.R

1415 → Validation

| Item Team ID | Item ID | Sequence | Validation | Time | Location | Motion | Illumination |
|---|---|---|---|---|---|---|---|
| Sally1 | Wallet | 1 | 6 | 08:01:00 | 355785 | 0.0 | 0.0 |
| Sally1 | Wallet | 2 | 5 | 08:01:30 | 355785 | 0.0 | 0.0 |
| Sally1 | Wallet | 3 | 2 | 08:02:00 | 355786 | 0.02 | 0.0 |
| Sally1 | Wallet | 4 | A | 08:02:30 | 355787 | 0.03 | 0.0 |

| Suspect Item Team Member [102.IT.S] | Exemplary Item Team Behavior Evaluations [1417] to Determine Possible Anomalous Usage or Other Problems |
|---|---|
| Generic (applicable across more than one item type) 1440 | • Received signal strength of one item team member is lower than received signal strength from other item team members<br>• One or more item team members determine no signal is arriving from another item team member<br>• Low battery warning from an item team member<br>• Arrival time delay in packet from one item team member as compared to packet arrival time from other team members<br>• Persistent dropped packets by an item team member<br>• One or more item team members is (are) in significantly different location(s) from other item team members<br>• One or more item team members in significantly different state of motion from other item team members<br>• Erroneous validation field from an item team member<br>• Number of distinct item locations crosses a specified threshold (for example, items distributed across more than one distinct location, or more than two distinct locations)<br>• Significant differences in sensor readings which are expected to have substantially similar values (for example, one item detects much more/less sound than another) |
| Cell Phone 1442   | • Cell phone is remote from other items while cell phone is off<br>• Cell phone is remote from other items while not in use (not making a phone call, no texting, no apps in use) for more than a specified period of time |
| Keys 1444 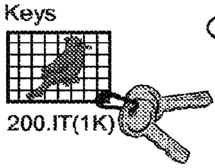  | • Keys remote from other items but not in motion for more than a specified period of time<br>• Keys remote from other items outside of designated time frames<br>• Keys remote from other items more than designated amount of time or more than designated number of times |
| Wallet 1446 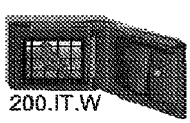  | • Wallet remote from other items but not in motion for more than a specified period of time<br>• Wallet remote from other items outside of designated time frames<br>• Wallet remote from other items more than designated amount of time or more than designated number of times |
| Purse 1448 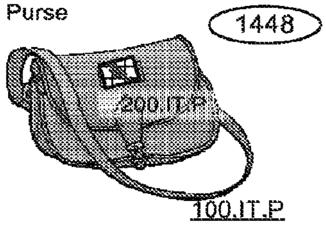  | • All other items or threshold number of items are in purse for longer than a specified period of time. ("In purse" status may be determined by a combination of sensor data, including collocation, limited or zero exposure to light, reduced ambient noise, common item motion, etc.)<br>• All other items or threshold number of items are out of purse for longer than a specified period of time. ("Out of purse" may be determined by a combination of sensor data, as above.) |

FIG. 14D

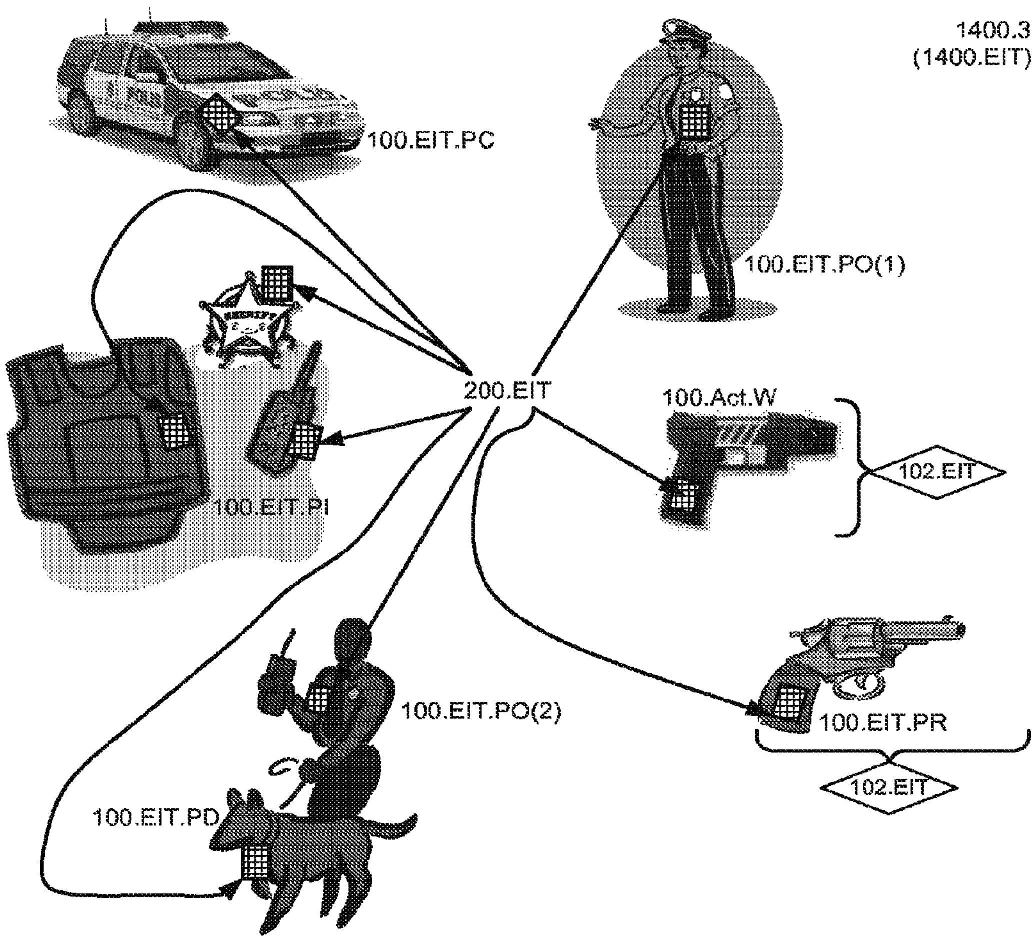

Exemplary "Mobile Police Item" Team Usage Expectations [1417.3]

- Police paraphernalia (walkie talkies, weapons, badges, bullet proof vests, etc.) should be within specified distances of either police Officer or police vehicle.
- Various police paraphernalia should be within specified distances of each other.
- Various police paraphernalia should be within no more than a specified number of locations.
- Various police paraphernalia should have shared motion characteristics with either police officer or police vehicle.
- Detection of gunshot noises by any paraphernalia triggers detection of police officer orientation and motion, leading to further determination of Officer status and welfare.
- Detection of motion and location of police animals, including in relation to motion and location of police officers and/or police vehicles.
- Sensor data from multiple BIRDS at different (but proximate) locations may be integrated to identify the location of environmental threats, such as gunfire.

FIG. 14G 1400.4 (1400.EIT)
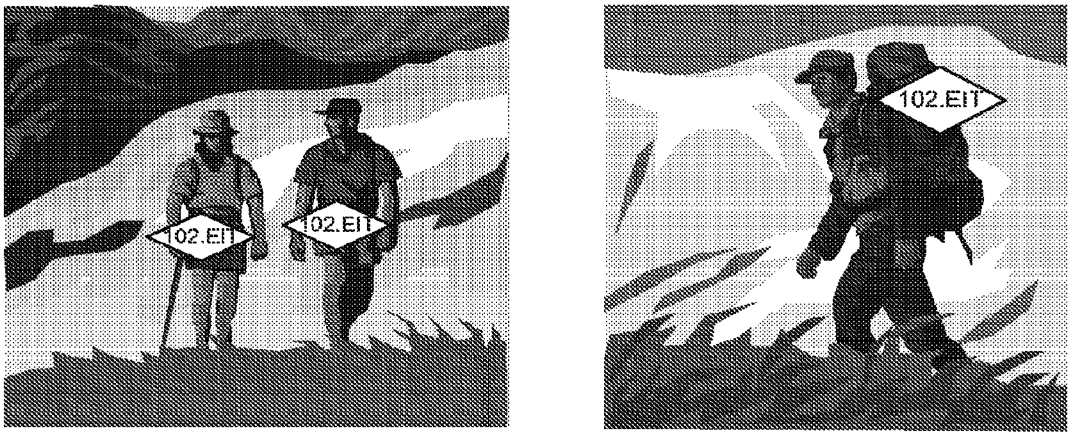
1400.5 (1400.EIT)
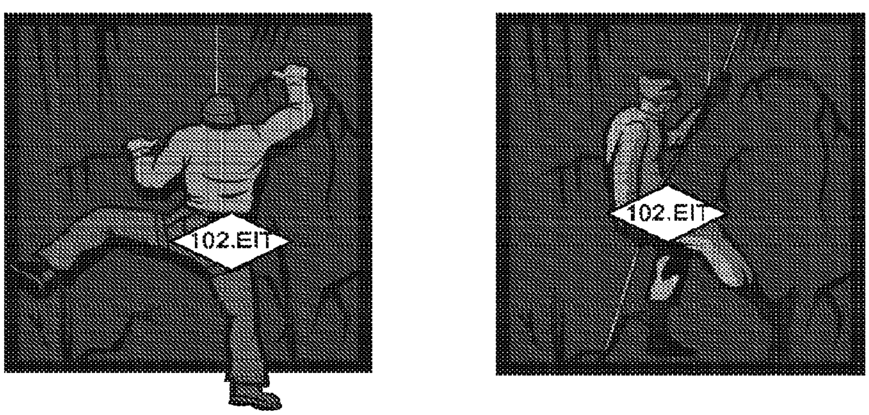
FIG. 14H

| Prediction Usage Factors 1620 | Usage Factor Data Source(s) 1625 |
|---|---|
| **1630 General Item Usage and Character** | |
| Item which user believes they may easily lose, misplace, or risk having stolen | User-specified |
| Item hand-carried vs. carried in pocket or purse | User-specified, or determined via pressure sensor data, sonar data |
| Item carried on person regularly or only occasionally | User-specified, or determined via analysis of long-term location data or motion data |
| When carried on person, item used constantly or infrequently | User-specified, or determined via analysis of long-term item usage pattern |
| Item large or small | User-specified |
| Item used routinely or only in conjunction with specific contexts or events (for example, rain) | User-specified, or determined via long-term correlation analysis (for example, usage vs. weather) |
| **1635 Item Location and Context** | |
| Approach to entrance or exits | Location data, entrance/exit data stream |
| Removal or insertion into storage | Audio data, optical data, sonar data, storage data streams |
| When leaving or boarding car | Location data |
| When leaving or boarding mass transit | Location data, mass transit data streams |
| When leaving or entering specific locations | Location data, site data streams |
| Low light level | Optical data |
| Crowd density | Audio and image sensors |
| Time of day | Clock data |
| Indoors vs. outdoors | Location data, audio data, optical data |
| **1640 Current Item Usage / Recent Usage** | |
| Item used more than usual | Comparison of current usage with stored analysis of long-term usage data |
| Item used less than usual | |
| Item used at unexpected times | |
| Item used at unexpected locations | |
| **1645 Item Storage / Placement** | |
| Item stored separately from other items | Location data, optical data, sonar data, storage data streams, usage data across multiple items in team |
| Item used separately from other items | |
| Item set down on table | Location data, optical data, sonar data, pressure data |
| Item set aside while in use | Location data, motion data, optical data, sonar data, pressure data, current usage data |
| **1650 User State / Condition** | |
| Possible lack of sleep | Determined via extended, ongoing usage of item(s) |
| Possible informal social environment or otherwise distracting environment | Determined via motion data, acceleration data, optical data, audio data, and possibly chemical sensor data. Suitable locations may also be preprogrammed by user. |

FIG. 16B

SYSTEM AND METHOD FOR ITEM SELF-ASSESSMENT AS BEING EXTANT OR DISPLACED

CROSS REFERENCE TO RELATED APPLICATIONS

This patent application claims priority to, and the benefit of, U.S. Provisional Patent Application Ser. No. 61/584,276, filed Jan. 8, 2012, entitled "System And Method For Item Self-Assessment As Being Lost, Misplaced, Stolen, Or In An Otherwise Anomalous State," which is hereby incorporated by reference in its entirety. This patent application claims priority to, claims the benefit of, and is the U.S. national phase filing of the international filing under the Patent Cooperation Treaty of PCT/US13/20587, filed Jan. 7, 2013, entitled "System And Method For Item Self-Assessment As Being Extant Or Displaced," which is hereby incorporated by reference in its entirety.

BACKGROUND OF THE INVENTION

1. Field of the Invention

The present disclosure pertains to the fields of sensing and monitoring, to computational intelligence, and to item tracking.

More particularly, the present disclosure pertains to applying computational intelligence to the self-monitoring of an item, object or device, when the device is associated with a particular user, to identify usage(s) or behavior(s), environmental context(s), or operational parameter(s) of the item, object or device.

More particularly, the present disclosure pertains to attaching local sensor(s) to a portable item, object, device, or container, or embedding local sensor(s) in a portable item, object, device, or container. The sensors(s) have suitable associated intelligent processing which is substantially collocated with the portable item, object, device, or container. The sensor(s) and intelligent processing are configured to determine a likelihood that the item, object, device, or container is lost, misplaced, misappropriated, wandering, or stolen, or otherwise in a context or use not appropriate for the item, object, device, or container.

2. Background Art

Persons routinely carry small, portable objects, devices, items, and various kinds of containers or packages about with them. Such portable items include, for example and without limitation, keys or key chains with multiple keys, wallets, computers, personal digital assistants (PDAs), cell phones, handbags, backpacks, purses, briefcases, tools, toolkits, eyeglasses, removable items of clothing (gloves, scarves), children's toys and other children's items, watches, suitcases and valises, and similar items. Specific documents and transactional tools, such as credit cards, debit cards, drivers licenses and passports, are also routinely carried or transported about, either along with, within, or apart from the other exemplary portable items listed above.

Unfortunately, it is a common experience that such items are easily lost or misplaced by an owner, or by other authorized or designated users.

In some cases a portable item is misplaced within a home or office environment, in the sense that an owner or other user has forgotten where the item was last placed, stored, or concealed. Thus the item is not actually lost, in the sense that the item is still within a domain controlled by the legitimate owner or user, and the item may be found again (typically when the owner is searching for a completely different item altogether). However, to the extent that the location of the item is forgotten, so that the item is misplaced, it is not accessible to the owner or other authorized user in a timely way.

In other instances, an item may be lost away from the home, office, or other normal place of storage or usage. Often such an item proves to be permanently lost.

In other instances an authorized user actually has an item on-person when it should not be on their person. For example, an authorized user may remove an item from a workplace, when the item is intended to remain at the workplace. Such an item may be said to be wandering.

Compounding the problem of lost items is that certain items may be objects of illicit confiscation by a non-owner or other inappropriate or unauthorized person, i.e., the items may be stolen. Other times, an item may be misappropriated, that is, picked up by accident by a known associate, friend, or family member of the authorized user.

In this document, the term displaced is sometimes used to describe an item which may be any of lost, misplaced, misappropriated, wandering, or stolen. At present, the means for identifying and retrieving displaced items are limited, and often non-technical. The options are to remember where the item is and go back to get it (and hope the item is, in fact, where it's remembered to be); to come across the item by accident; or hope that some other person finds the item and returns it to its proper owner.

In recent years, some technological solutions have emerged. For example, some cell phones now come with an application which enables an owner to send a message to the phone from a computer terminal. If the phone is lost, the owner can send a message asking the phone to identify its location to the cell phone network. Alternatively, a message can be sent to the phone requesting the phone emit an audio signal to identify its location to persons in proximity to the cell phone.

A disadvantage to this technical solution is that it only works for devices (for example, cell phones or other similarly equipped PDAs) which are already configured as communications devices, and which are typically configured as expensive, multipurpose communications devices. A further disadvantage is that the solution requires that the owner of the communications device actually be aware that the device is lost.

Often a communications device can in fact be lost for a substantial period of time before an owner even notices that the device is missing. During the time interval between when the device is lost and when the owner realizes the device is lost, the owner may have traveled a substantial distance from the communications device, or failed to take the device with them when needed for some purpose. Further, the longer a communications device is lost, and particularly if lost outside a home, office, or other preferred usage location, the greater the risk of the device either being stolen or running out of battery power.

Other existing solutions are geared solely towards rigidly defined location determinations, usually for items that are in storage or maintained in a confined facility. Such solutions may, for example, identify when an item or device crosses a specified boundary of a region where the item is supposed to remain. Examples include store security systems, which detect when security tags are carried across the threshold of the store. Further, an item may well be lost, misplaced or even stolen, even while still within the defined boundary or geographic area. Such systems are also typically not programmed to vary their expectations of where an item should be located according to changes in time or date. Most critically, however, these security systems rely at least partly upon sensors which are external to the item in question, and also rely upon an artificial intelligence which is not collocated with the item itself, meaning the item cannot self determine its state as lost, misplaced, misappropriated, wandering, or stolen.

Other existing solutions are geared solely towards items which already have, integral to their nature and functionality, built-in processing capabilities.

What is needed, then, is a system and method for portable items to have a computational intelligence (or, "artificial intelligence") which enables the portable items to self-assess, that is, self-identify, as being possibly lost, misplaced, misappropriated, wandering, or possibly stolen, even before an owner has identified that the item is lost, misplaced, misappropriated, wandering, or stolen. What is further needed is a system and method for portable items to self-assess/self-identify as being possibly lost, misplaced, misappropriated, wandering, or stolen based on criteria which are alternative to or in addition to location criteria.

When location criteria are appropriate, what is further needed is a system and method for portable items to self-assess/self-identify as being possibly lost, misplaced, misappropriated, wandering, or stolen based on more extended, enhanced, supplemental, or refined location criteria.

What is further needed is a system and method whereby a portable item not only has a computational intelligence by which to self-determine that it may be lost, misplaced, misappropriated, wandering, or stolen, but where the item then self-initiates signaling or communications with a legitimate owner or user, without requiring any previous prompting from the legitimate owner or user.

What is further needed is a system and method to associate and collocate, with portable items which do not conventionally have data processing, sensing, or communications elements associated with them, the necessary technical means (sensor(s), processor, and/or wireless communications systems) for substantially complete and independent self-assessment/self-identification of the item as having lost, misplaced, misappropriated, wandering, or stolen state, or a state of being extant, that is, not lost, misplaced, misappropriated, stolen, or wandering.

What is further needed is a system and method which is configured to be dynamically adaptable for association with different items.

What is further needed is a system and method which is configured to be dynamically adaptable for the identification of lost, misplaced, misappropriated, wandering, or stolen state of an item when the system and its associated physical item are intentionally, and appropriately, transferred from possession/control of a first person to the possession/control of a second person, where each person typically makes different use of the item or has different usage habits or patterns for the item.

What is further needed is a system and method which is configured to be dynamically adaptable for the identification not only of a possible lost, misplaced, misappropriated, wandering, or stolen state for an associated item, but also for the identification of a likelihood of other anomalous states, usages, conditions, or environments for the associated item.

BRIEF SUMMARY

This summary is presented for convenience only, to provide a brief and necessarily incomplete overview of the present system and method. It should not be viewed in any way as limiting, nor is it comprehensive, nor should the elements presented in this summary be construed as always being essential to the present system and method. The present system and method is taught and defined in more complete detail, and with additional embodiments and features, in the Detailed Description presented below, and in the appended Claims.

In one embodiment, the present system and method may be implemented via a reporting device which combines one or more environmental sensors, a processor, and communications and/or signaling elements. The reporting device is small enough and portable enough to be mechanically attached to, or coupled in close physical proximity to and substantial collocation with, or to be contained within other portable items, including for example and without limitation keys, key rings, wallets, cell phones, portable computers, recreational devices, tools, toys, purses, briefcases and the like. The reporting device is configured to detect environmental data, including for example and without limitation motion, light, sound, location, temperature and pressure.

A set of comparison parameters, generally referred to herein as usage expectations, are established in the reporting device, either by configuring the device through a computer-type interface, or by training the device, or both. The types of comparison parameters pertain to potential values which may be measured by the environmental sensors, including for example and without limitation an amount of motion, an amount of ambient light, a volume of sound, an expected location, an ambient temperature, and surface pressure on the item. At least some of the types of comparison parameters may be predefined as part of the design of the reporting device.

Defined values, and/or defined ranges or values for these comparison parameters, serve to establish expected values of the environmental data. The expected values (or ranges of values) may be predefined, or may be configured to be defined by an owner of an item on a case-by-case basis. The user configures the device based in part on an assumption that the portable items will be used in expected ways and in expected environments.

During actual use of the reporting device (referred to herein as field use), the device is attached to or coupled with an item. During actual use, it may turn out that the parameters measured in real-time by the sensors of the reporting device fall outside the expected values. In such an event, computational intelligence algorithms of the reporting device make an assessment that the associated item may be lost, misplaced, misappropriated, wandering, or stolen, or that the associated item is otherwise subject to anomalous usage. The reporting device is programmed to then send a message, or to then emit a signal, indicating that its associated item is not located where typically expected, or is not being used as typically expected, or is otherwise subject to what appears to be unexpected environment.

In an embodiment, when the reporting device identifies the item as very likely being extant (present when and where expected), the default reporting device response is no response, meaning no signal or report. In an alternative response, the reporting device may issue periodic indications that it is extant.

In one alternative embodiment, the reporting device is so configured so that rather than being designed for attachment to an item, the device is physically and/or functionally integrated into the item. For example, the reporting device may be integrated into a cell phone, PDA, or personal computer.

In another alternative embodiment, the reporting device may be configured to receive a signal or message. The received signal or message may instruct the reporting device to initiate a sensor scan and associated environmental analysis, or may instruct the reporting device to emit a return signal or message, irrespective of the results of any sensor scan.

In another alternative embodiment, a group of reporting devices may be attached to separate items. The reporting devices are configured to maintain constant, close-range or wireless contact with each other, forming reporting device teams. If one or more reporting devices are separated from the team, some or all of the other devices are configured to emit alerts or notifications.

In another alternative embodiment, determination by the computational intelligence that an item is, with some degree of probability, being used anomalously may be based on various analyses and interpretations of the sensor data.

These embodiments of the present system and method, and other embodiments as well, are discussed in greater detail in the detailed discussion presented below, and are illustrated as well in the accompanying drawings.

BIRD Nomenclature

The reporting devices described herein are referred to as portable item reporting devices. In turn, "Portable Item Reporting Device" is referred to herein by the acronym of BIRD. The applicable acronym would seem to be "PIRD." but "PIRD" sounds strange or worse, and there are no English synonyms for "portable" that begin with the letter 'B.' However, "BIRD" sounds beautiful and the letter 'B' looks much like the letter 'P.' Further, in both Danish and Norwegian, "portable" is "bærbare," as well as being "bärbara" in Swedish, so we find the letter "B" for portable after all.

Also, birds are generally pretty smart when it comes to finding their way home.

BRIEF DESCRIPTION OF THE DRAWINGS/FIGURES

The features and advantages of the present invention will become more apparent from the detailed description set forth below when taken in conjunction with the drawings. The skilled artisan will understand that the drawings, described below, are for illustration purposes only. The drawings are not intended to limit the scope of the present teachings, system, or method in any way.

In the drawings, like reference numbers indicate identical or functionally similar elements.

Suffixes:

In some instances, specific species within a type of element are identified via a subsidiary/secondary number or letter. In some instances, different species of a generic element type are labeled with different alphabetic suffixes or series of characters. For example, "items" in general are identified with element number "100," while specific items may be labeled as "100.W" (wallet), "100.M" (musical instruments), etc. In some instances, different instances of the same element are labeled with different numeric suffixes. For example, a first item may be "100.1." while a second item may be "100.2". However, variations have been made from these conventions where it serves the interests of clarity.

Similarly, different embodiments of a general method may have different numeric suffixes. For example, a general method may have different exemplary embodiments "500.2 [Meth]," "500.3[Meth]", "500.4[Meth]," etc. In other contexts, however, suffixes for method numbers may instead be used to identify separate steps within a single exemplary method. For example, a method "465" may have individual method steps "465.5," "465.10," "465.15," etc.

The use of suffixes will be apparent from context.

Series Numbers and Element Reference Numbers:

The drawings have been labeled with series numbers, for example, drawings 1A through 1N, drawings 2A through 2H, drawings 3A through 3E, etc.

In the drawings, the left-most digit or digits of an element's reference number may indicate the series of figures in which the element is first introduced.

In some cases, however, the left-most digit or digits of an element's reference number indicate a figure (or series of figures) which have a particular focus or extended discussion of the element. For example, BIRDs (200) are first introduced in conjunction with FIGS. 1A through 1O, but exemplary BIRD hardware architectures are discussed starting in FIG. 2A. "BIRDs" are therefore labeled as "200." For another example, "BIRD logic," labeled as "500," is introduced early in this document, but is described in greater detail and with more extended discussion (with suitable tables, flow charts, and so on) starting with FIG. 5B. Similar considerations apply to "usage expectations" ("600"). "sensor data" ("700") and "usage data" (700.U), "item teams" (1400), and to some other elements throughout this application.

It will be noted in particular that FIGS. 1A-1O contain numerous references to elements which are again discussed in greater detail later in the document.

Elements with More than One Reference Number:

Generally, a given element of the present system and method is provided with a consistent reference number or label throughout this document. However, selective exceptions have been made, where a particular type of element may have two or more distinctive roles or functions in the present system and method.

For example: Items which may be lost, misplaced, stolen, and so on, are generally labeled as "items (100)", with specific suffixes for different types of items. A cell phone, in its capacity as an item (100) which may be monitored by a BIRD (200) for possible loss or misplacement by a user, is labeled as "100.Act.CP." However, a cell phone which is used to itself monitor or configure BIRDs (200), is labeled as a "cell phone (340)." In practice, a single cell phone may function in both capacities (both being monitored by a BIRD (200), and also functioning to configure or control one or more BIRDs (200)).

For another example: Briefcases, suitcases, valises, backpacks and similar container items which may be monitored by a BIRD (200) for possible loss, misplacement, theft, and so on, have been assigned the general reference label "100.C", along with specific labels for some items (for example, "luggage (100.C)" or "luggage (100.LG)"). However, in their capacity as containers for other items—and in particular, in their capacity to incorporate their own distinctive BIRD elements which monitor for the presence within of appropriate interior items—such container items (100.C) are labeled as "containers (1700)." Here again, in actual use, a single container (briefcase, suitcase, purse, valise, backpack, and so on) may function in both capacities: both being monitored by an associated or integrated BIRD (200); and also itself functioning as a specialized BIRD (200) to monitor other items (100) which it contains within itself. Suitable labels "100.C" or "1700" are used, depending on the context.

LIST OF FIGURES

FIG. 1F illustrates exemplary methods by which an item with an associated BIRD may self-assess as possibly being displaced according to an embodiment of the present system and method.

FIG. 1I illustrates exemplary expected locations associated with categories from an exemplary location schema, according to an exemplary embodiment of the present system and method.

FIG. 1J is a table of biometric and iteMetric user identification schemas according to an exemplary embodiment of the present system and method.

FIG. 1L is a table summarizing exemplary, generalized criteria for determining a possibility that an item is at least one of extant, lost, misplaced, misappropriated, wander, or stolen, according to an exemplary embodiment of the present system and method.

FIG. 1M is a table summarizing exemplary heuristics for distinguishing when an item has been misappropriated vs. when an item has been stolen, according to an exemplary embodiment of the present system and method.

FIG. 1N is a table summarizing exemplary methods of configuring a BIRD for use with an item which is to be borrowed by a borrower, according to an exemplary embodiment of the present system and method.

FIG. 1O is a table summarizing some of the different exemplary embodiments of items, BIRDs, BIRDed-items, and related elements discussed in this document.

FIG. 4B is illustrates in summary form some BIRD algorithms, services, and modules.

FIG. 5E(2) is a second part of a flow chart of the exemplary method of BIRD logic of FIG. 5E(1).

FIG. 5E(3) is a third part of a flow chart of the exemplary method of BIRD logic of FIG. 5E(1).

Figure 5A:
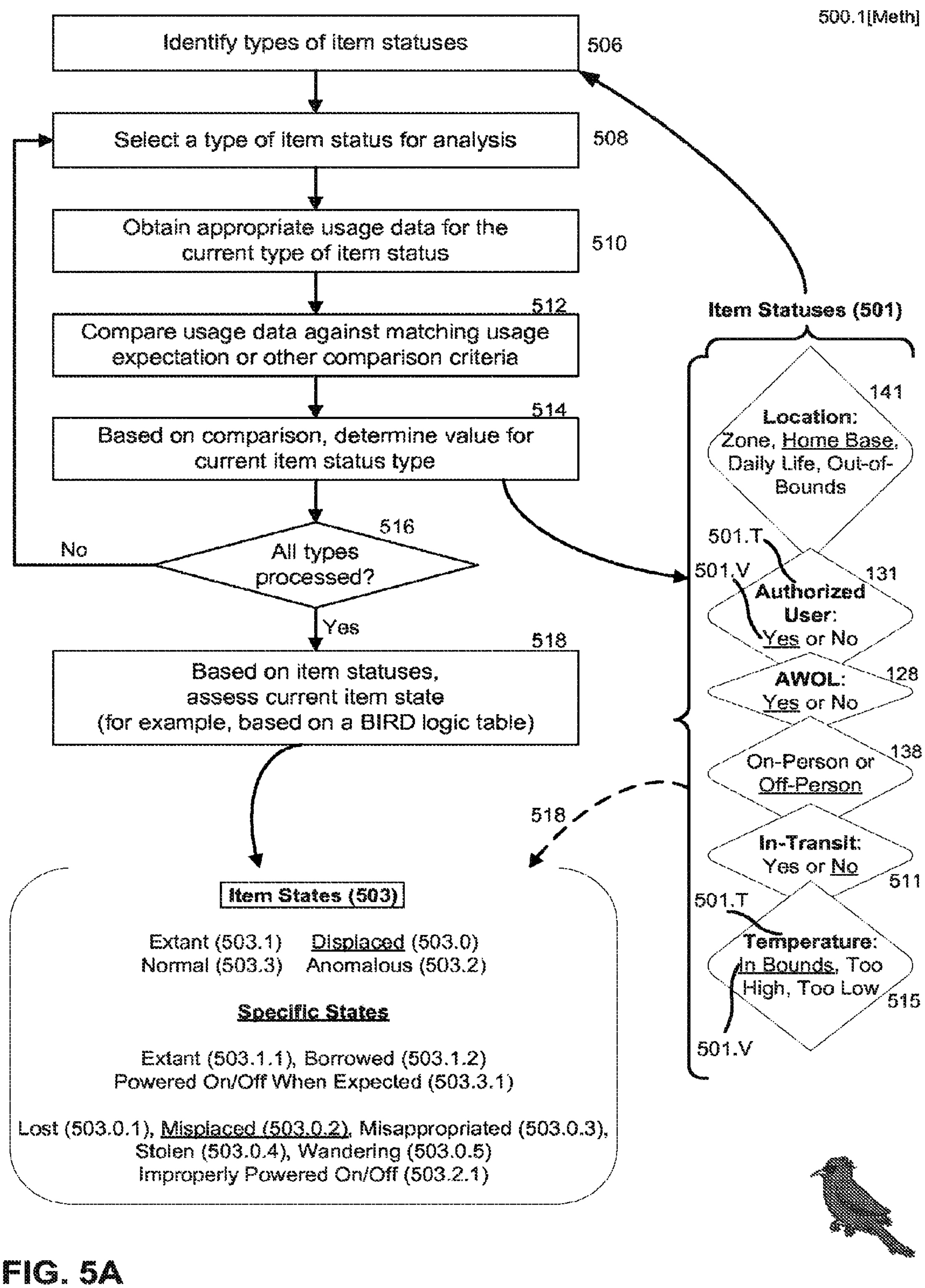
FIG. 5A is a flow chart of an exemplary method of BIRD logic.
Figure 5D:
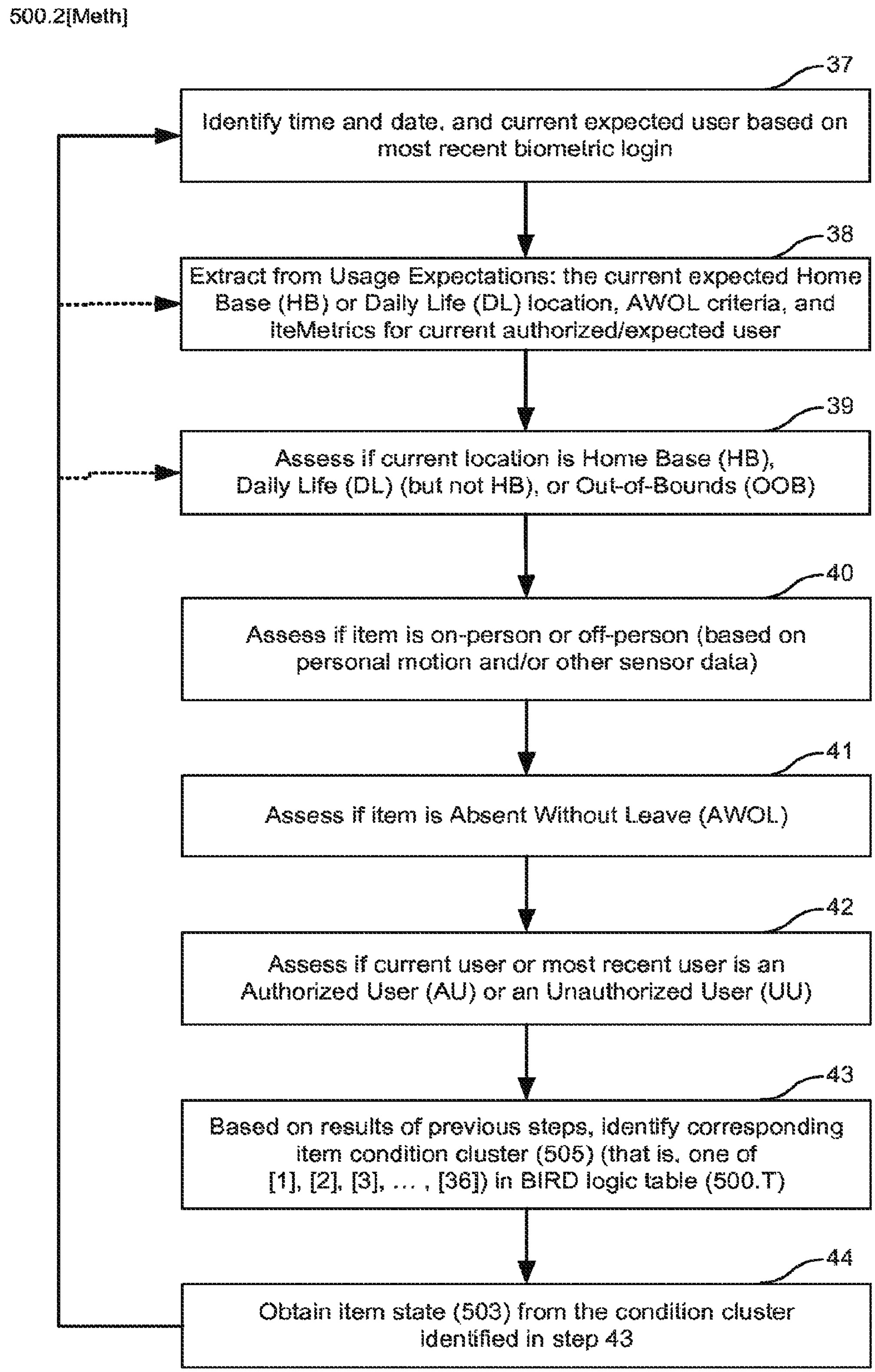
FIG. 5D is a flow chart of an exemplary method of BIRD logic.
Figure 5G:
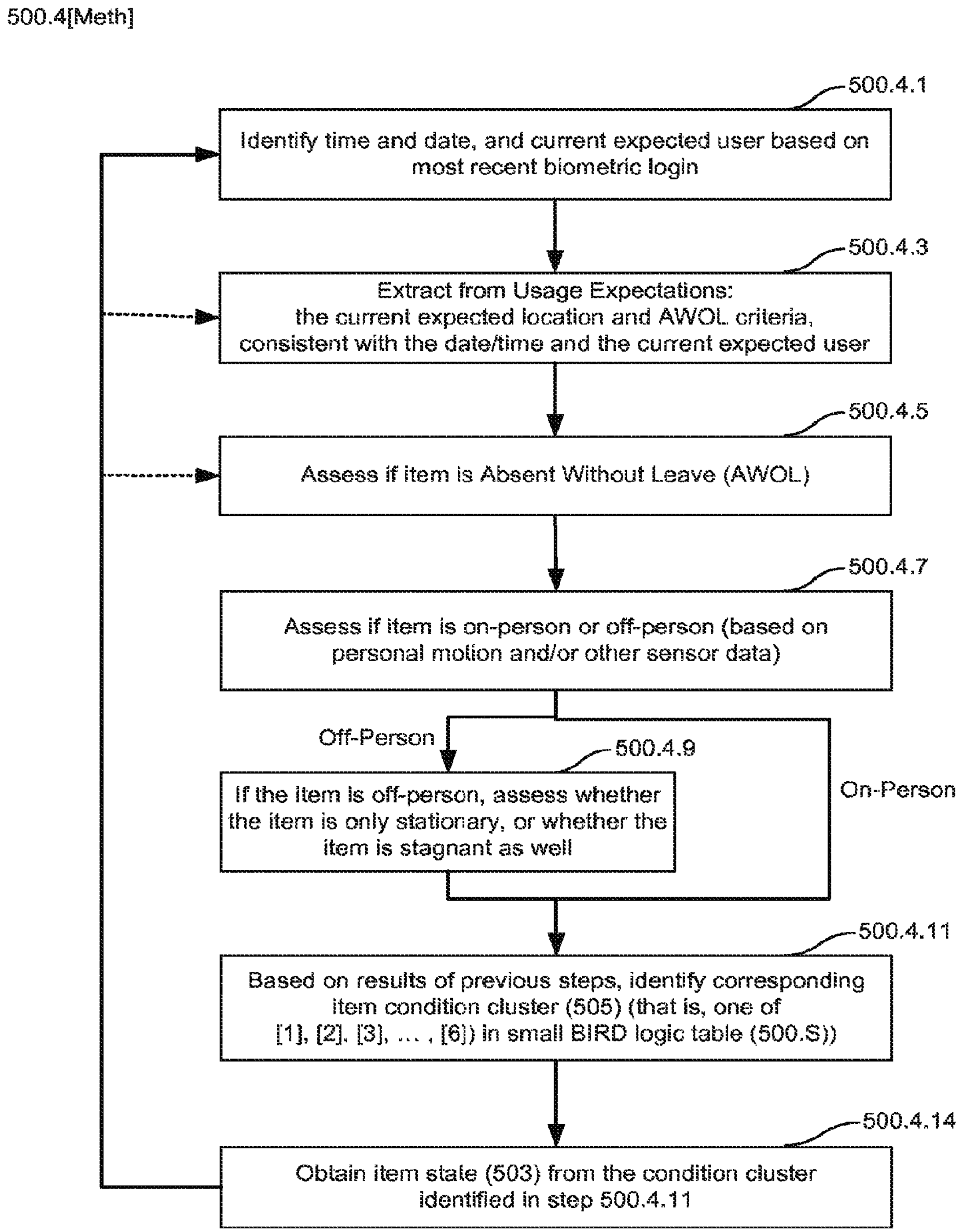
FIG. 5G is a flow chart of an exemplary method of BIRD logic.
Figure 5I:
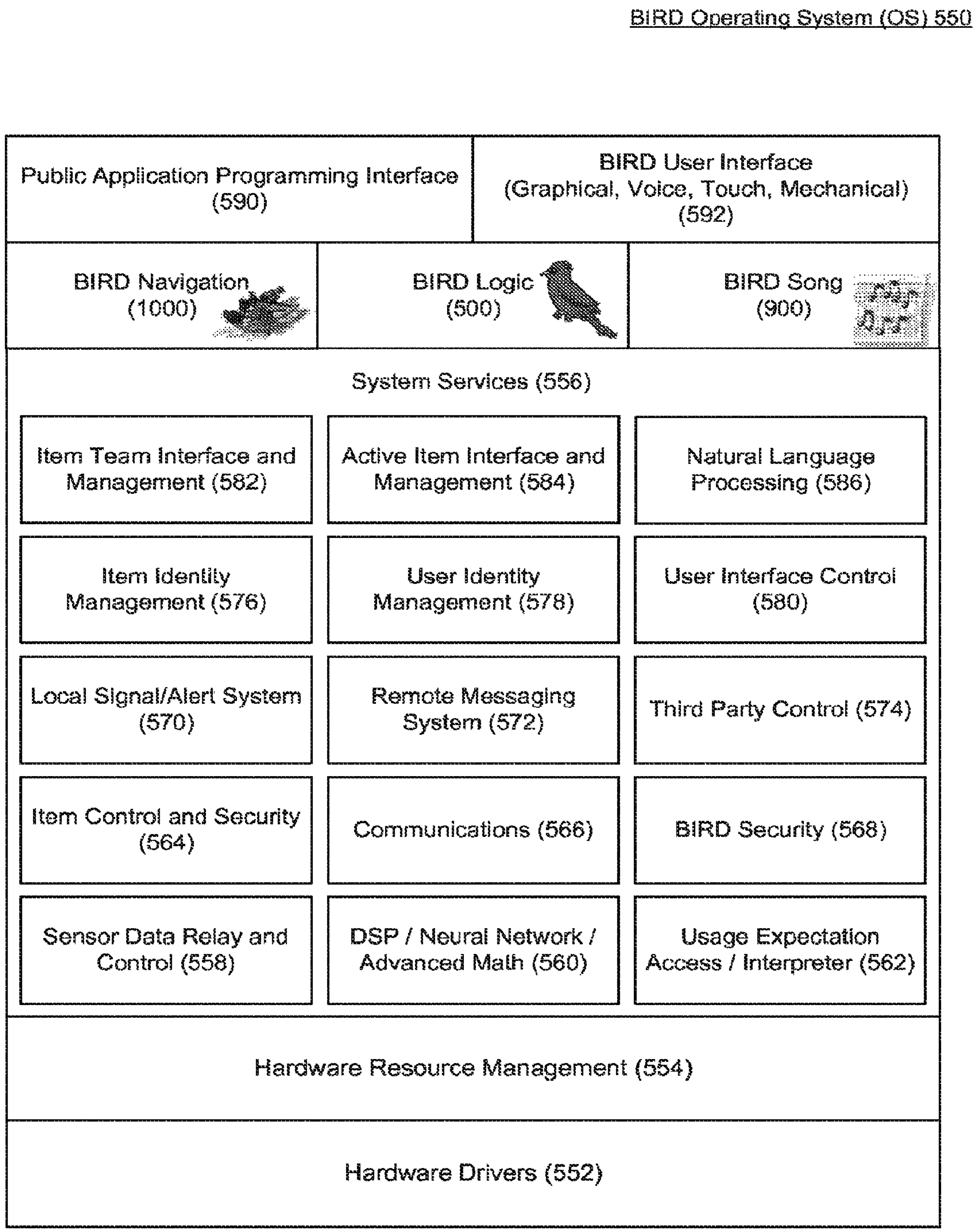
FIG. 5B is table of exemplary BIRD logic which offers exemplary associations of item statuses with item states.
FIG. 5C is table of exemplary BIRD logic which offers exemplary associations of item statuses with item states.
FIG. 5E(1) is a first part of a flow chart of an exemplary method of BIRD logic.
FIG. 5F is table of exemplary BIRD logic which presents exemplary associations of item statuses with item states.
FIG. 5H is table of exemplary BIRD logic which presents exemplary associations of item statuses with item states.

FIG. 5I presents a system diagram of an exemplary operating system for a BIRD.

FIG. 6A illustrates exemplary usage expectations pertaining to an authorized user's location expectations.

FIG. 6B illustrates exemplary usage expectations pertaining to an authorized user's iteMetrics.

FIG. 6C is a list of exemplary supplemental usage expectations.

Figure 6D:
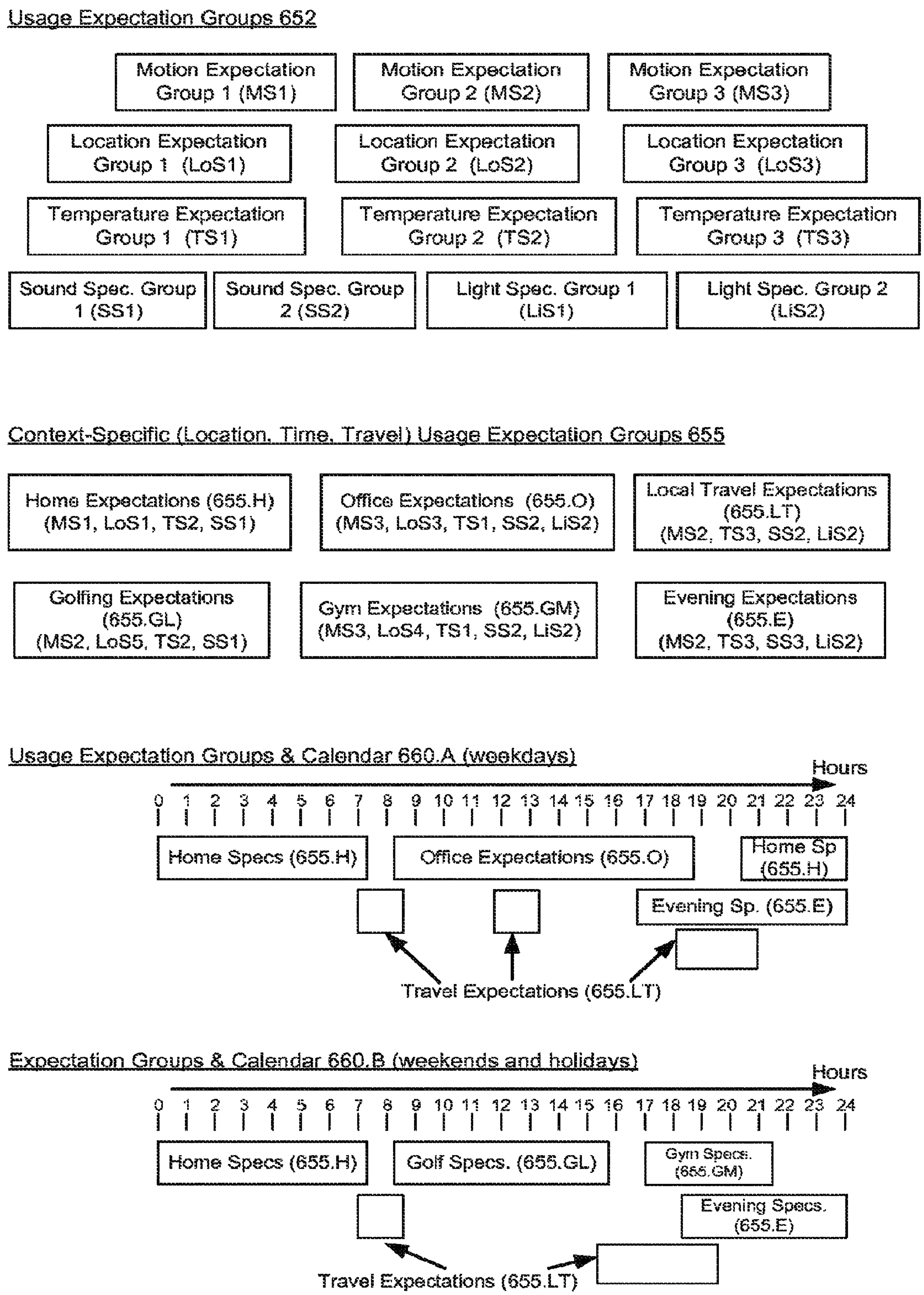

FIG. 6D is a diagram of exemplary usage expectation groups, context-specific expectation groups, and usage expectation groups associated with specific times of day.

Figure 6E:
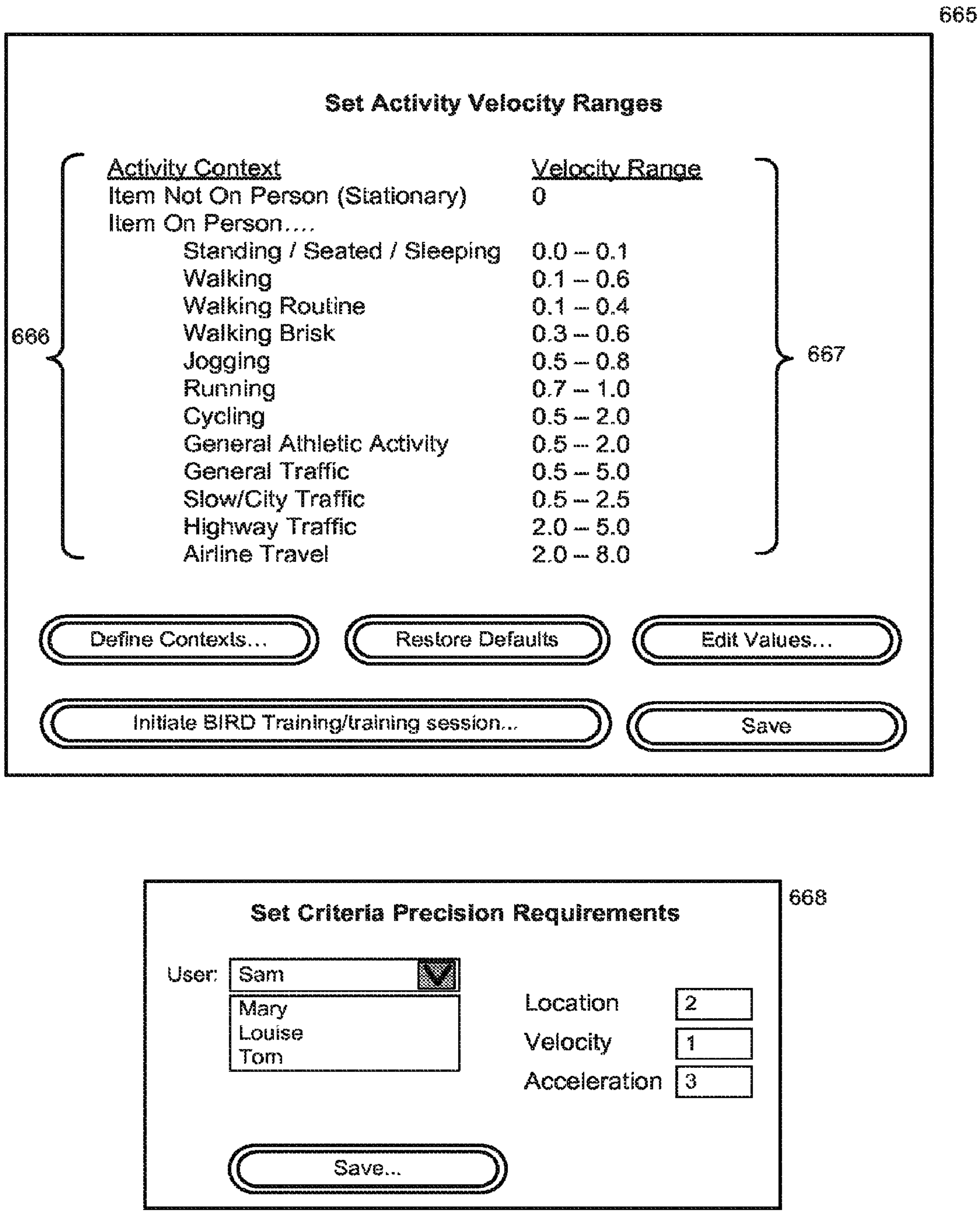

FIG. 6E is an illustration of exemplary dialog boxes associated with setting parameters for expected sensor data for an item.

Figure 6F:
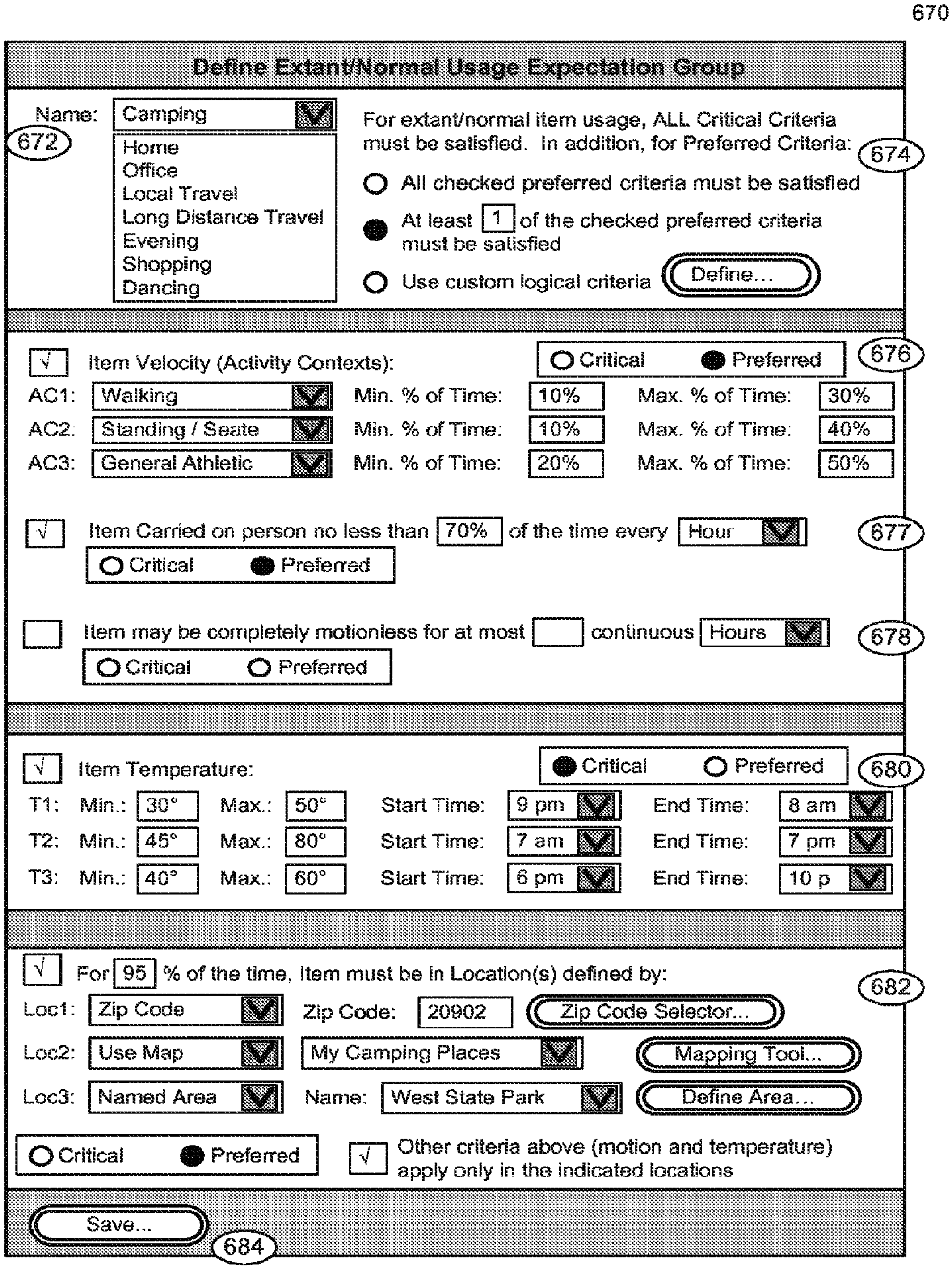

FIG. 6F is an illustration of an exemplary dialog boxes for defining usage expectations for an item.

FIG. 7A presents a table summarizing different exemplary types of sensor data.

FIG. 7B is an illustration of an exemplary historical environmental data log containing exemplary sensor data and usage data for an exemplary item.

Figure 8A:
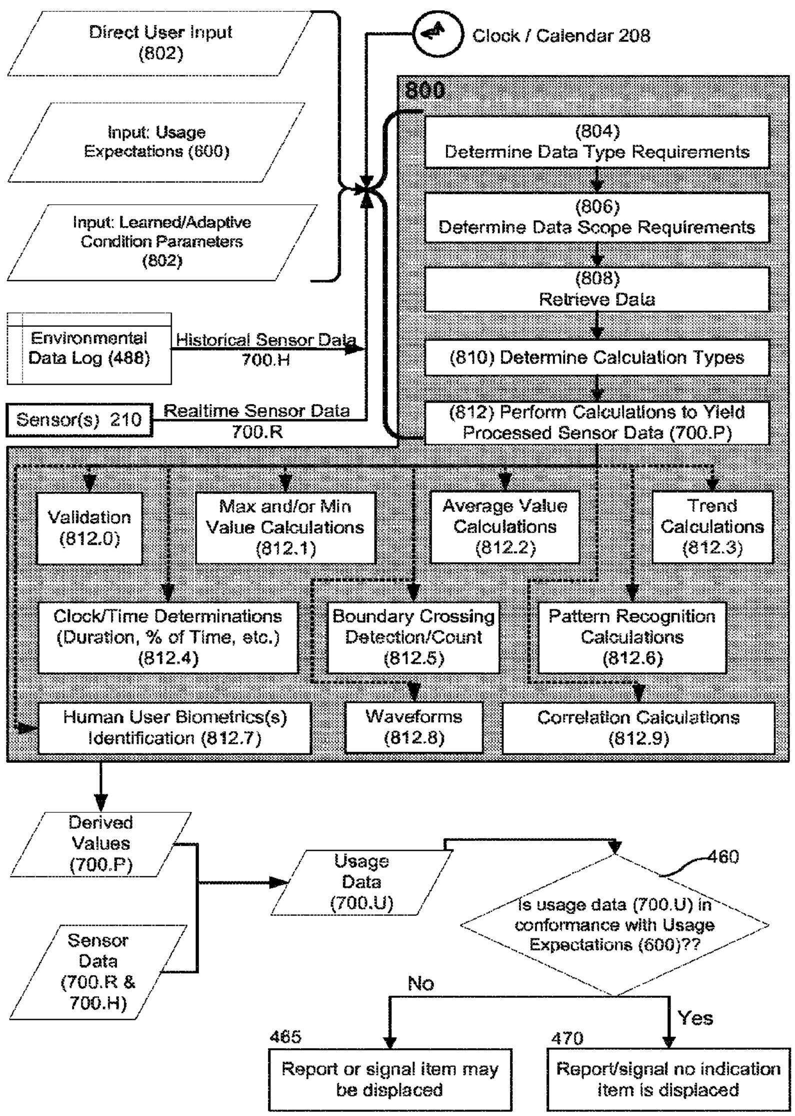

FIG. 8A is a hybrid flow-chart/data-source-diagram for an exemplary method for analyzing an item's environmental conditions and/or item usage expectations.

FIG. 8B lists exemplary usage expectations for items.

FIG. 8C is a list of exemplary functional calls for an exemplary application programming interface (API) for environmental sensing and environmental determinations.

FIG. 9A is an illustration of an exemplary decision for determining appropriate responses for displaced/anomalous item data.

Figure 9B:
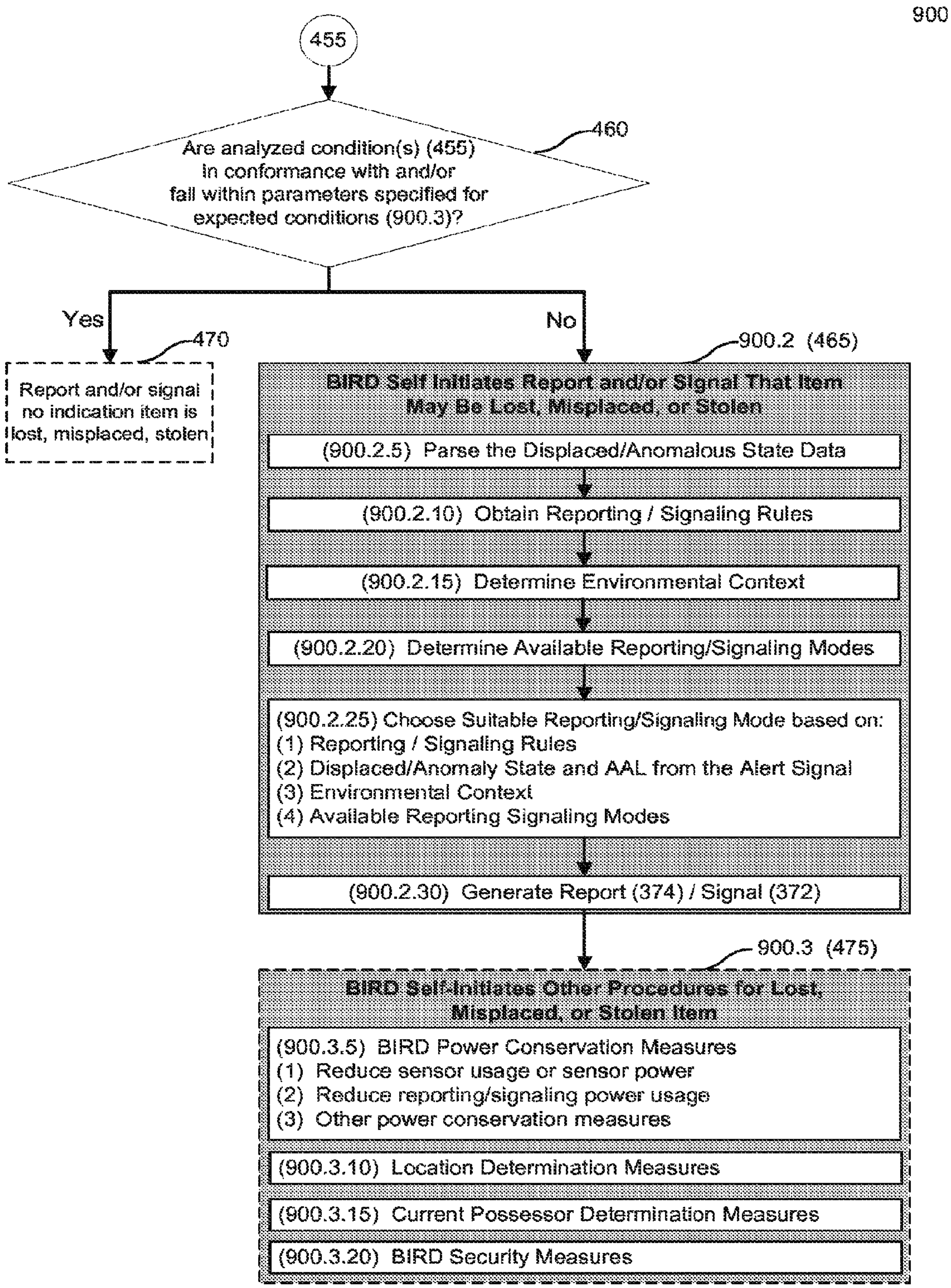

FIG. 9B is a flowchart of an exemplary method for reporting that an item may be displaced/anomalous and for initiating other procedures for a displaced item.

FIG. 9C is a list of exemplary functional calls for an exemplary application programming interface (API) for reporting and/or signaling determinations of a displaced/anomalous environment, context, or usage for an item.

Figure 10A:
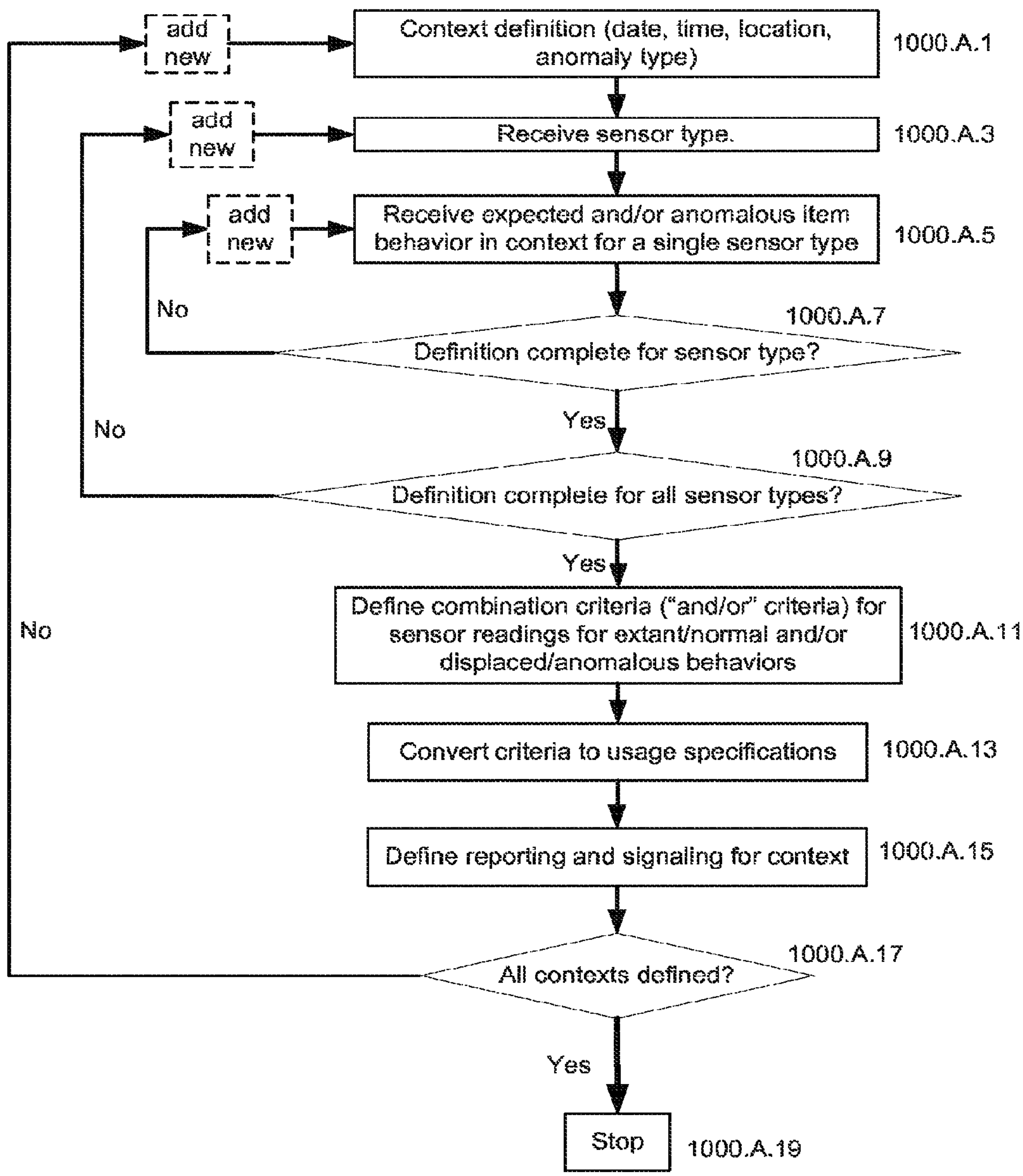

FIG. 10A is a flowchart of an exemplary method for establishing the usage expectations for an item.

Figure 10B:
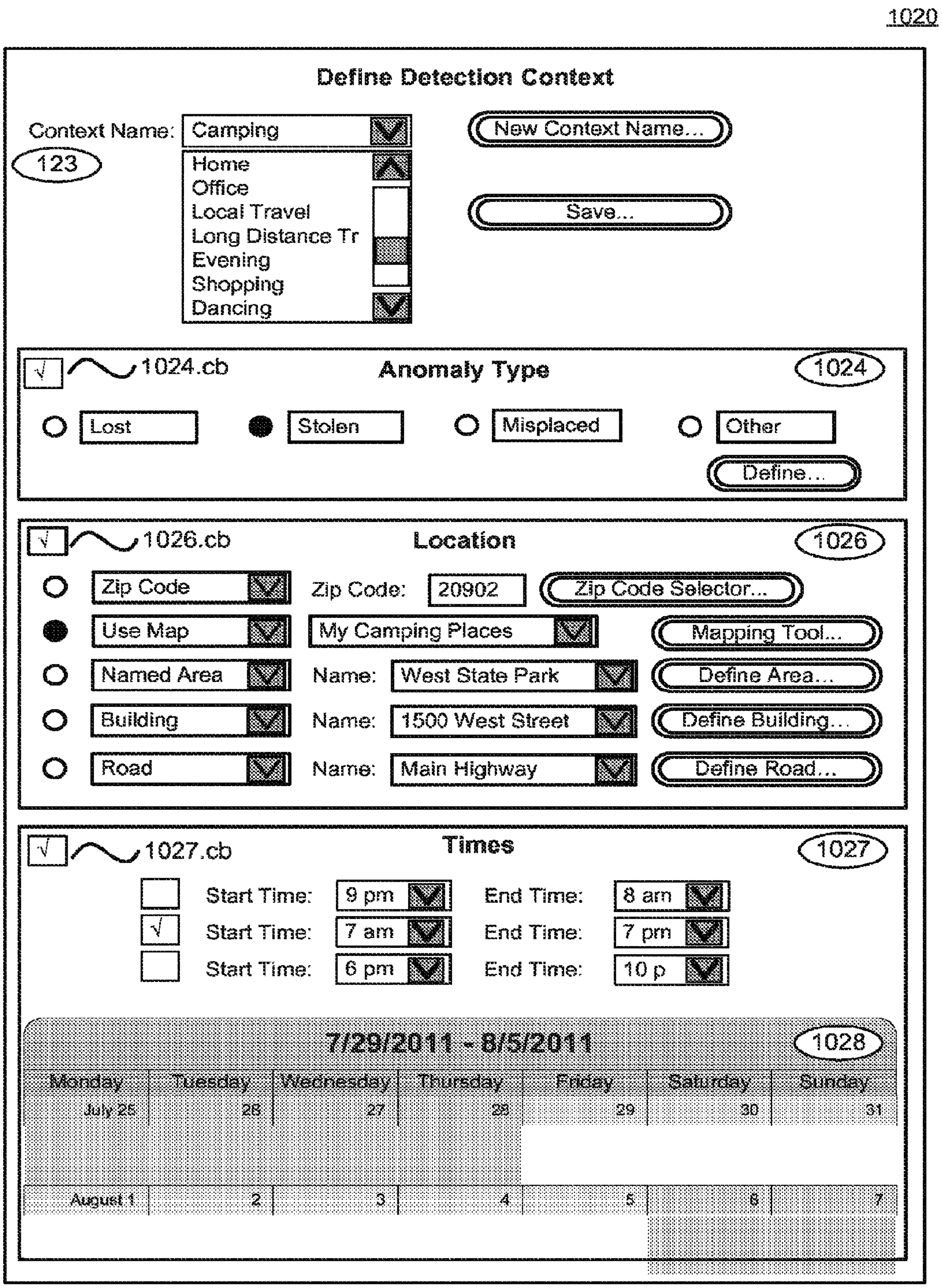

FIG. 10B illustrates an exemplary dialog box which may support the establishment of usage expectations for an item.

Figure 10C:
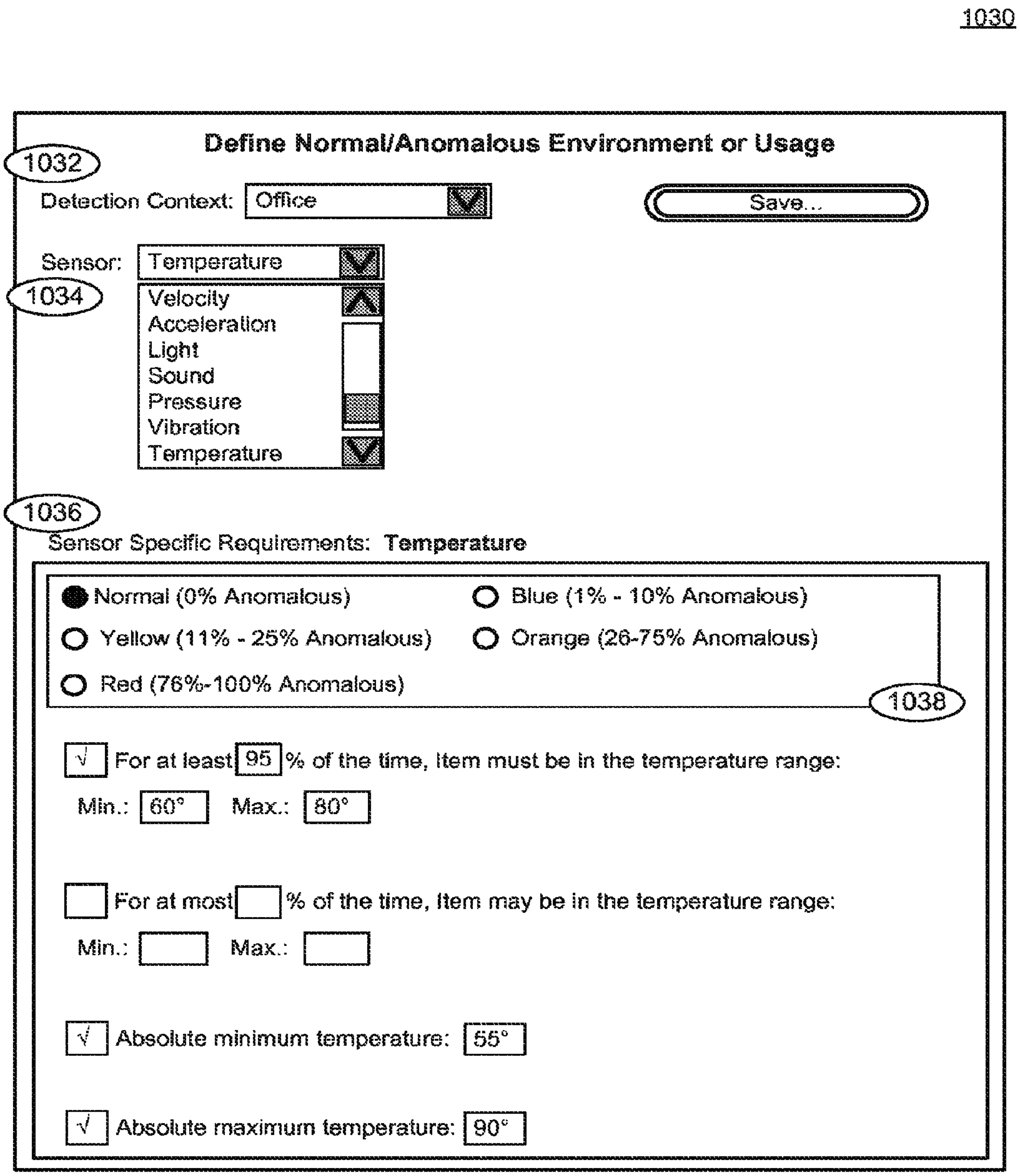

FIG. 10C illustrates an exemplary dialog box which may support the establishment of usage expectations for an item.

Figure 10D:
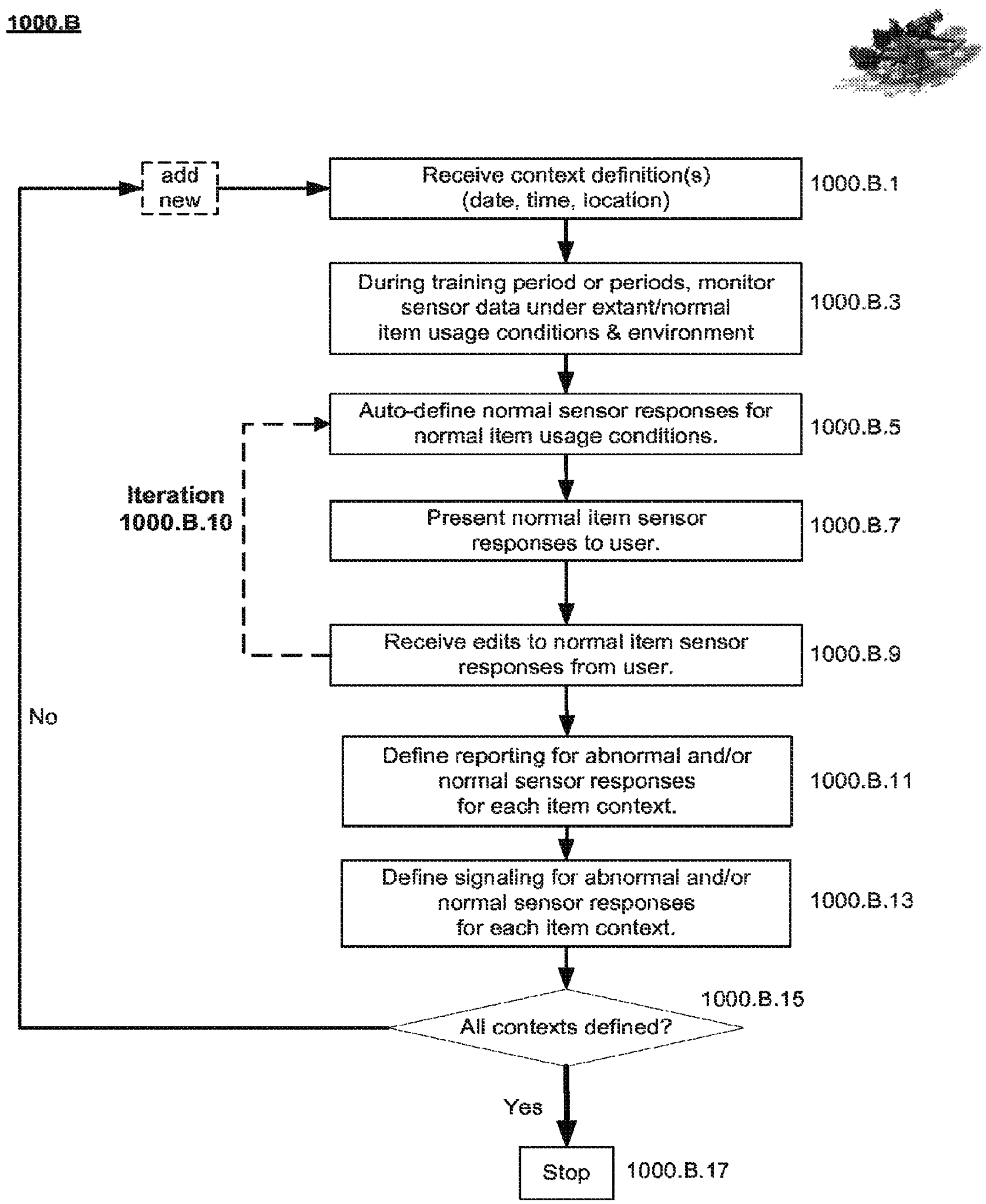

FIG. 10D is a flowchart of an exemplary method for establishing the usage expectations for an item.

Figure 10E:
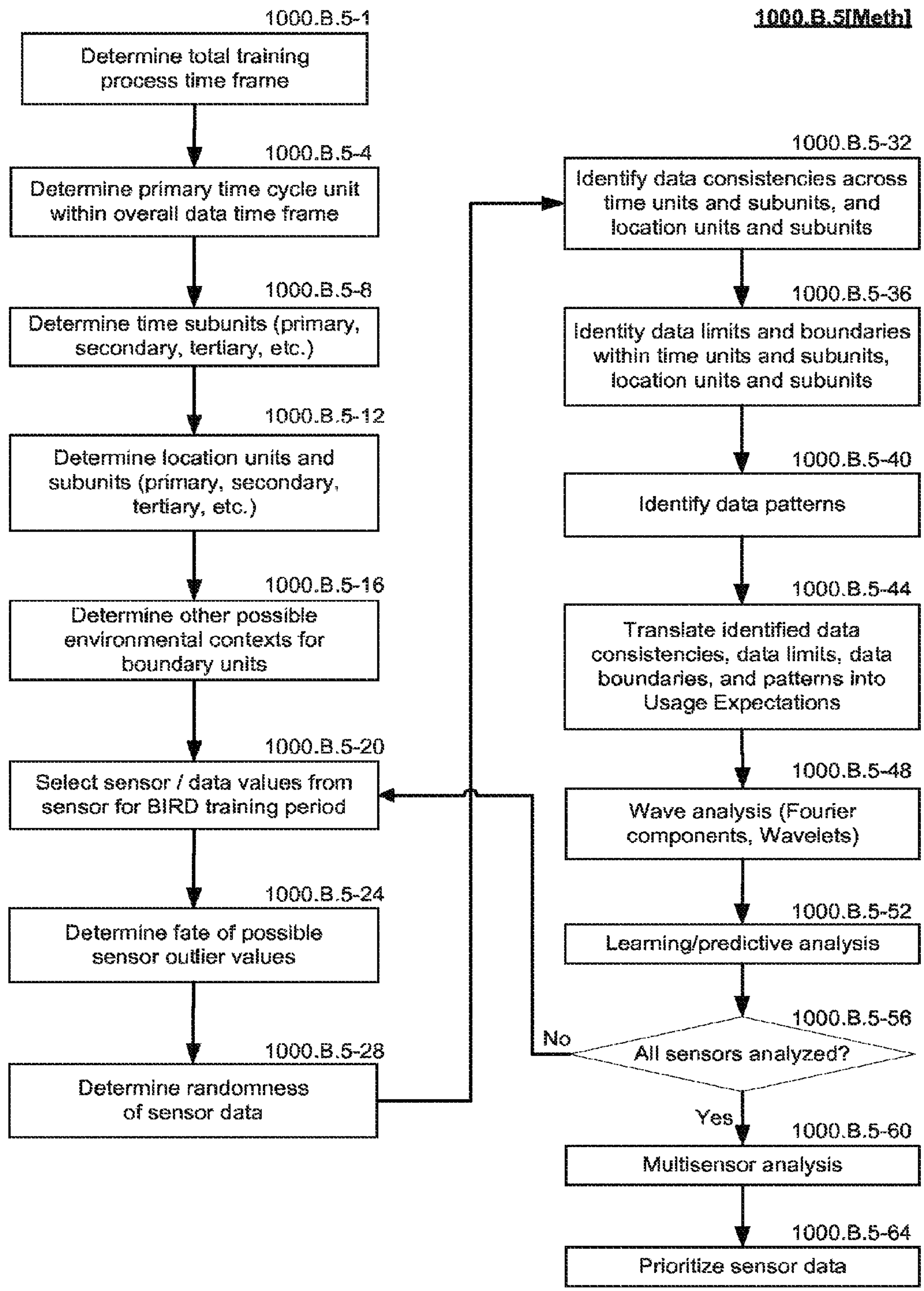

FIG. 10E is a flowchart of an exemplary method for determining normal or expected sensor responses for an item.

Figure 10F:
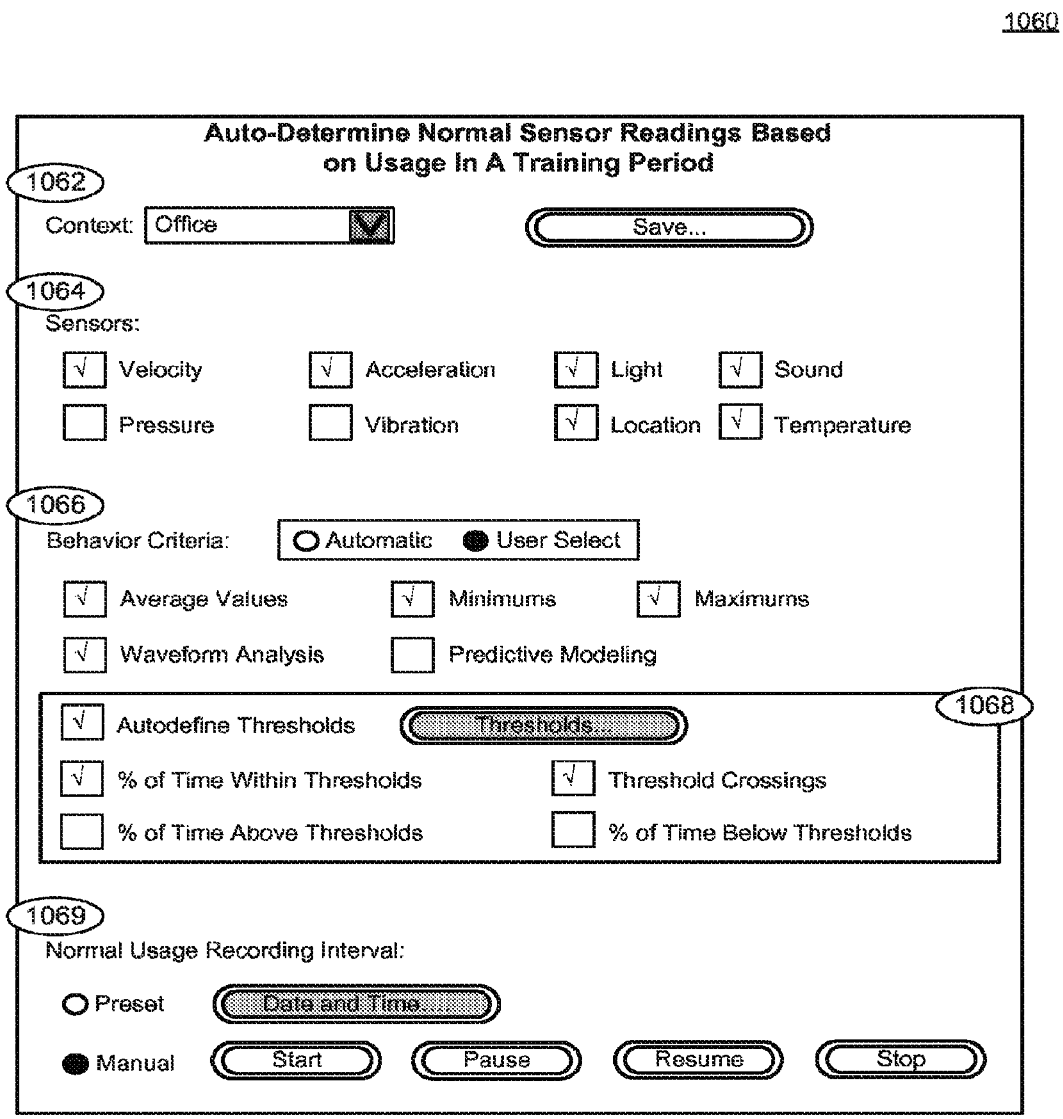

FIG. 10F illustrates an exemplary dialog box which may support the establishment of usage expectations for an item.

Figure 10G:
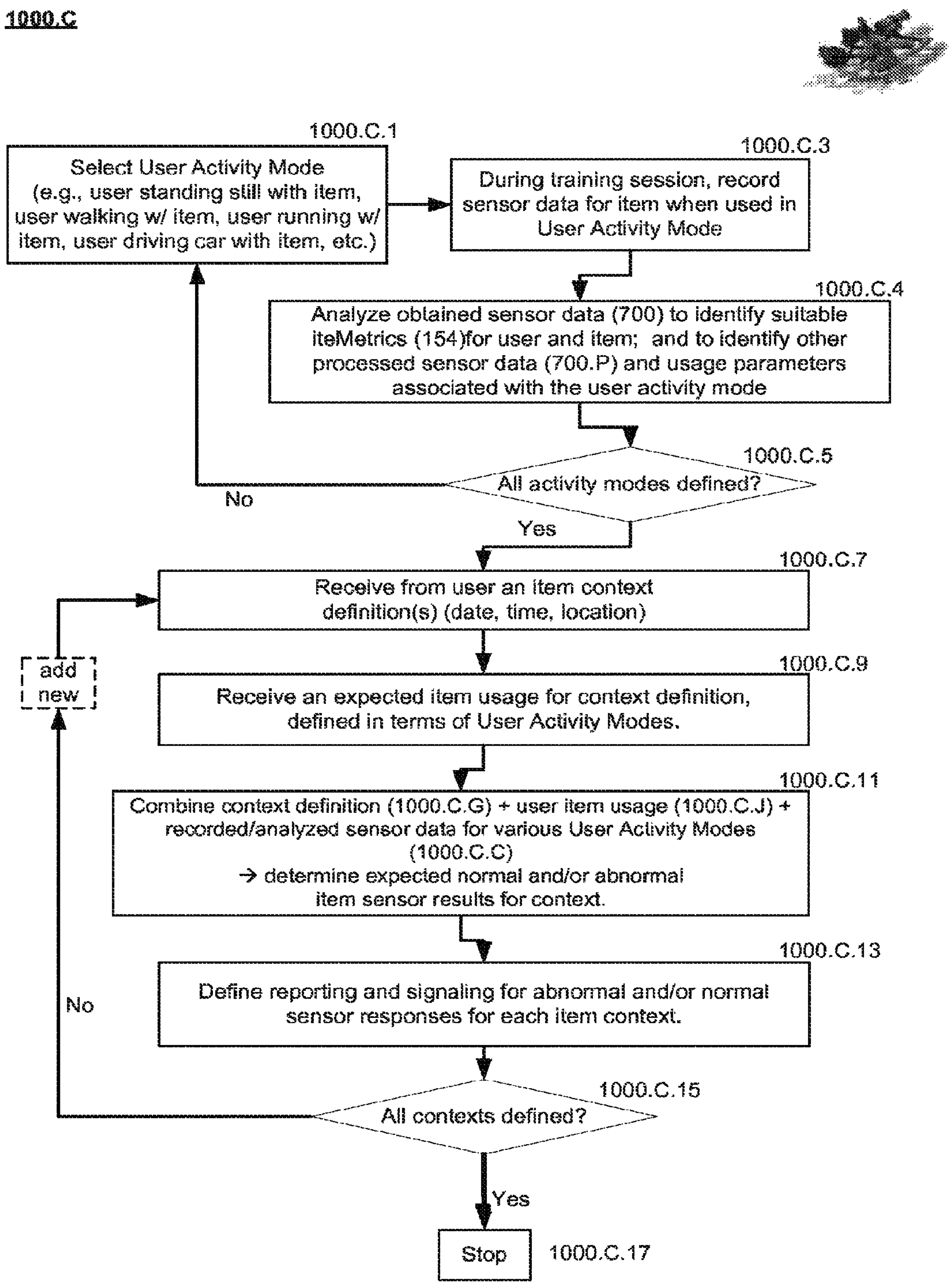

FIG. 10G is a flowchart of an exemplary method for establishing the usage expectations for an item.

Figure 10H:
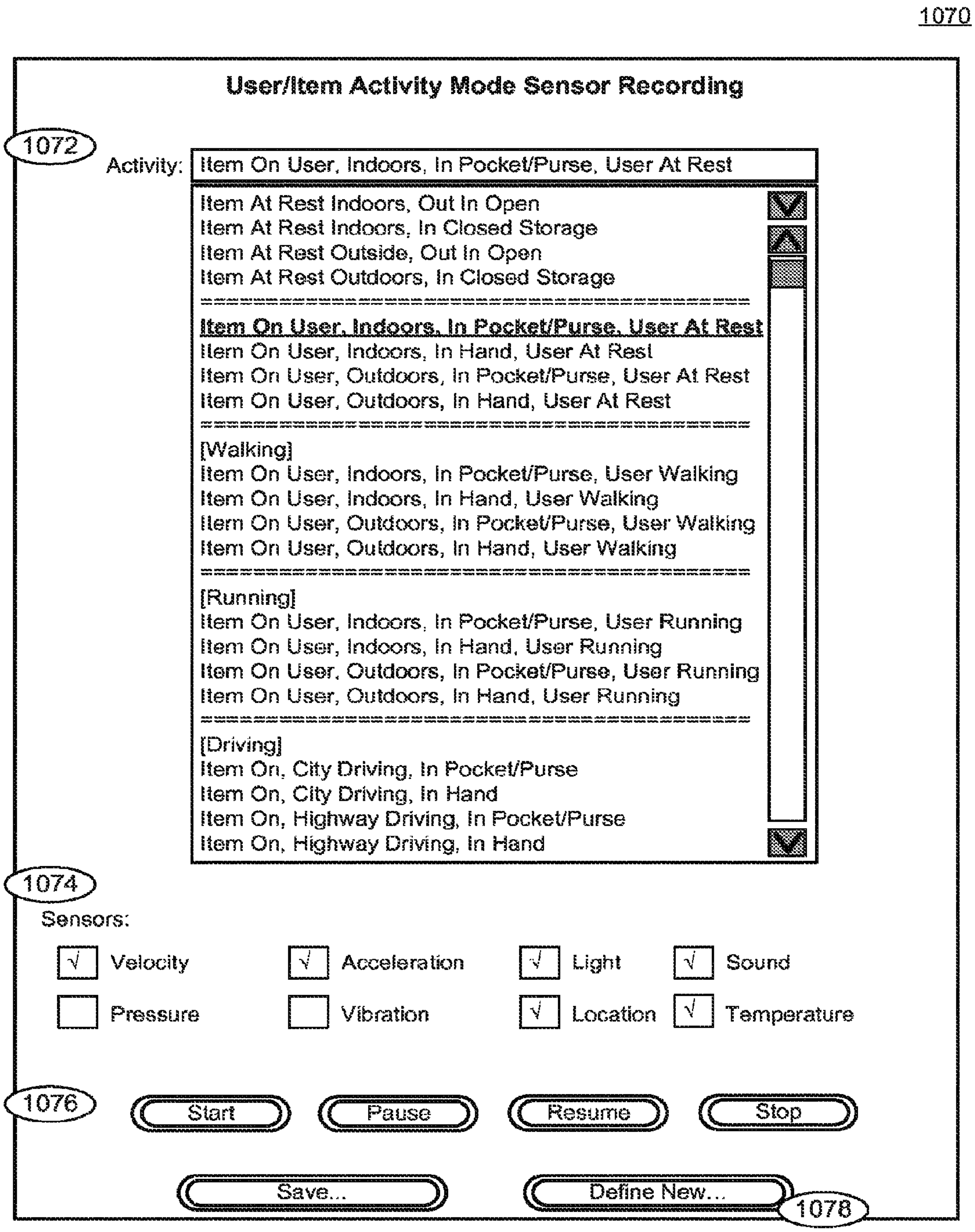

FIG. 10H illustrates an exemplary dialog box which may support the establishment of usage expectations for an item.

Figure 10I:
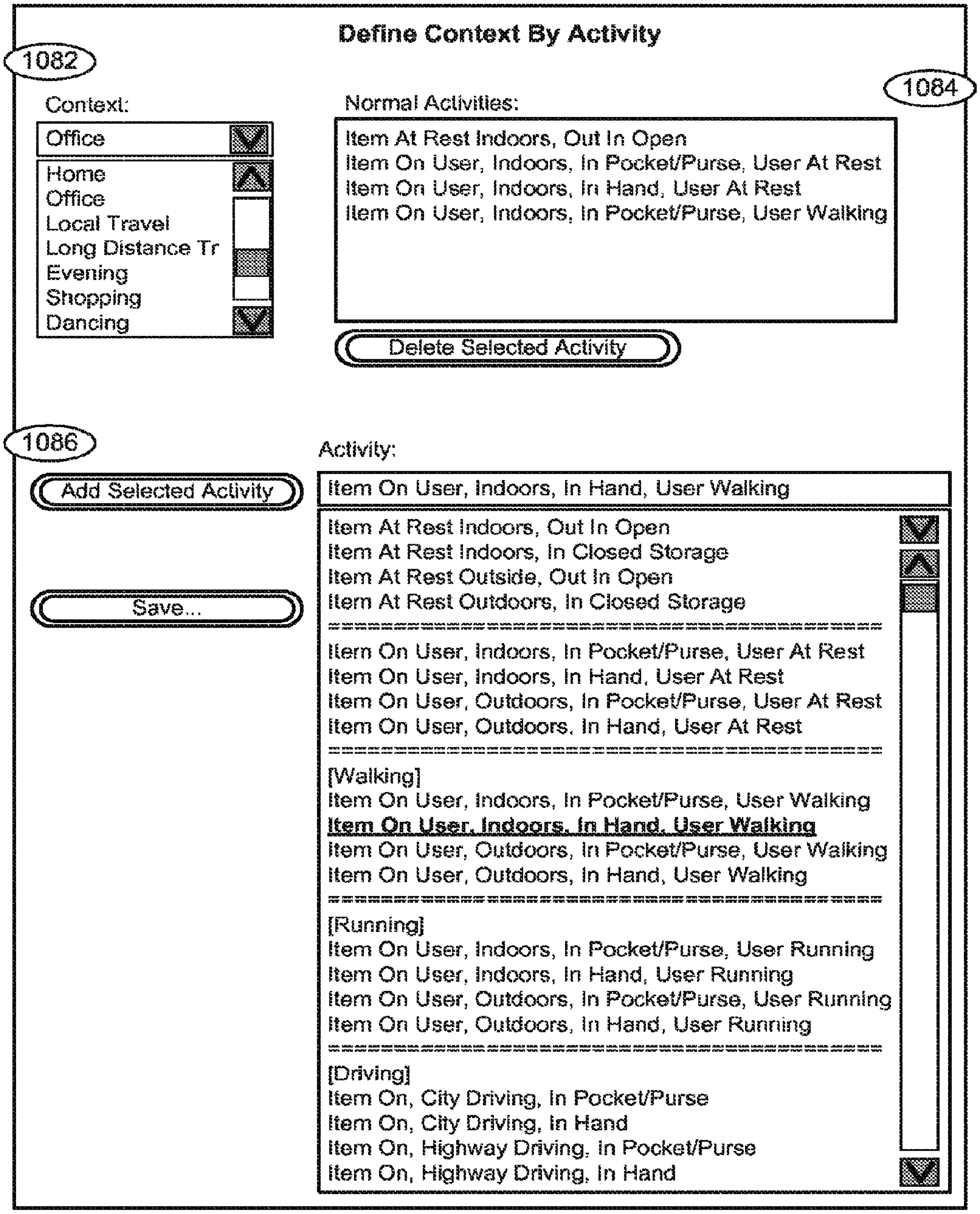

FIG. 10I illustrates an exemplary dialog box which may support the establishment of usage expectations for an item.

Figure 10J:
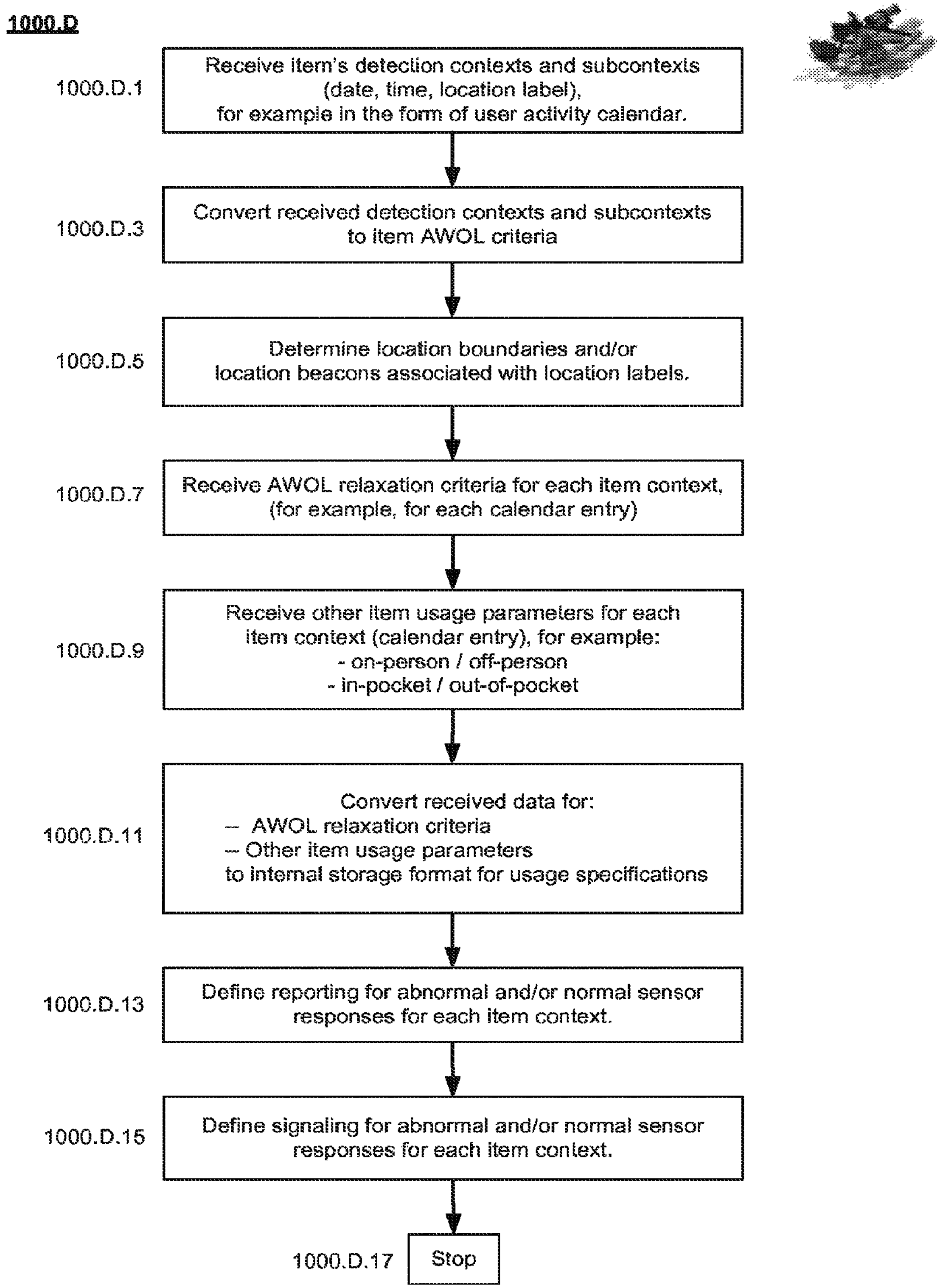

FIG. 10J is a flowchart of an exemplary method for establishing the usage expectations for an item.

Figure 10K:
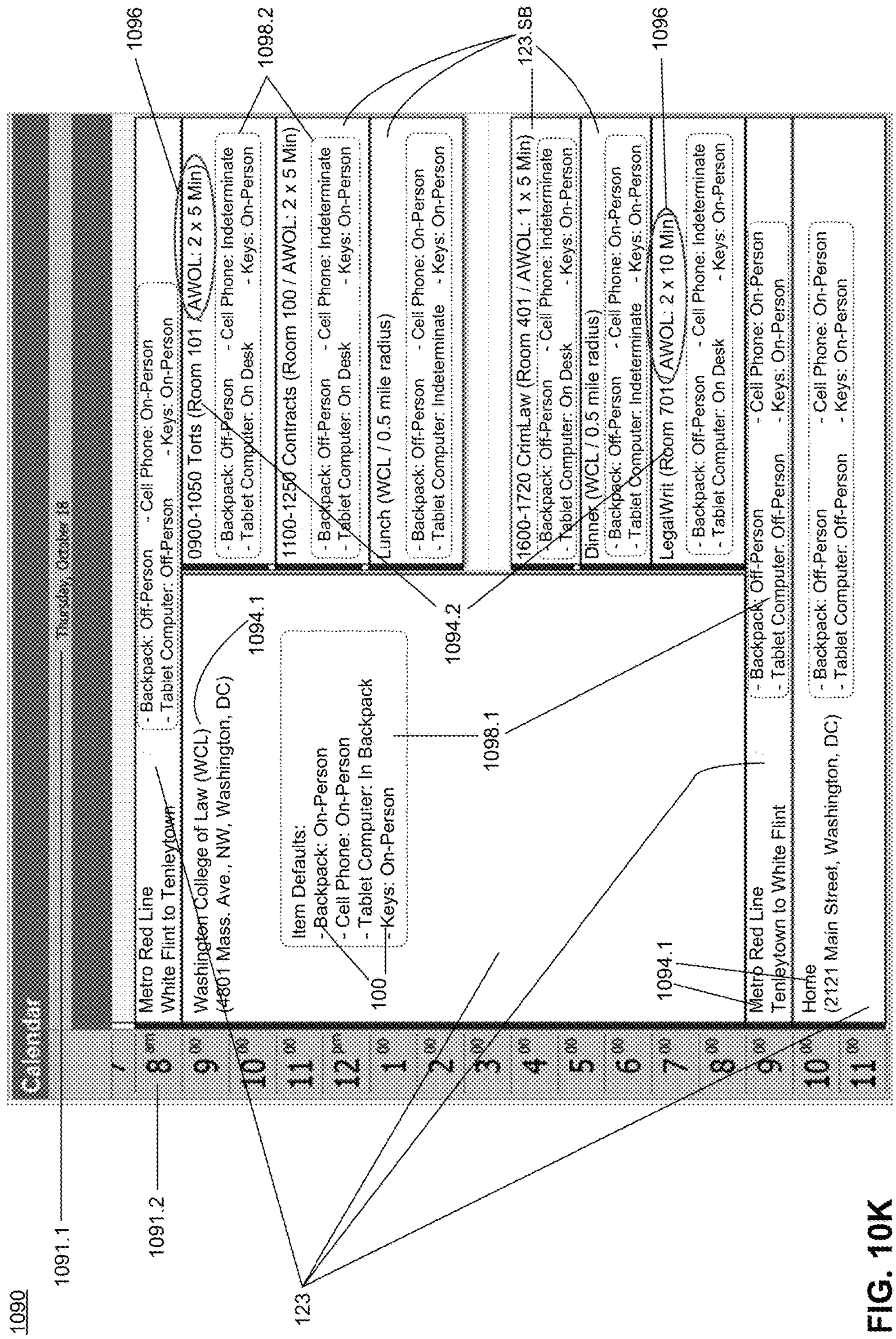

FIG. 10K illustrates an exemplary calendar which may support the establishment of usage expectations for an item.

Figure 11A:
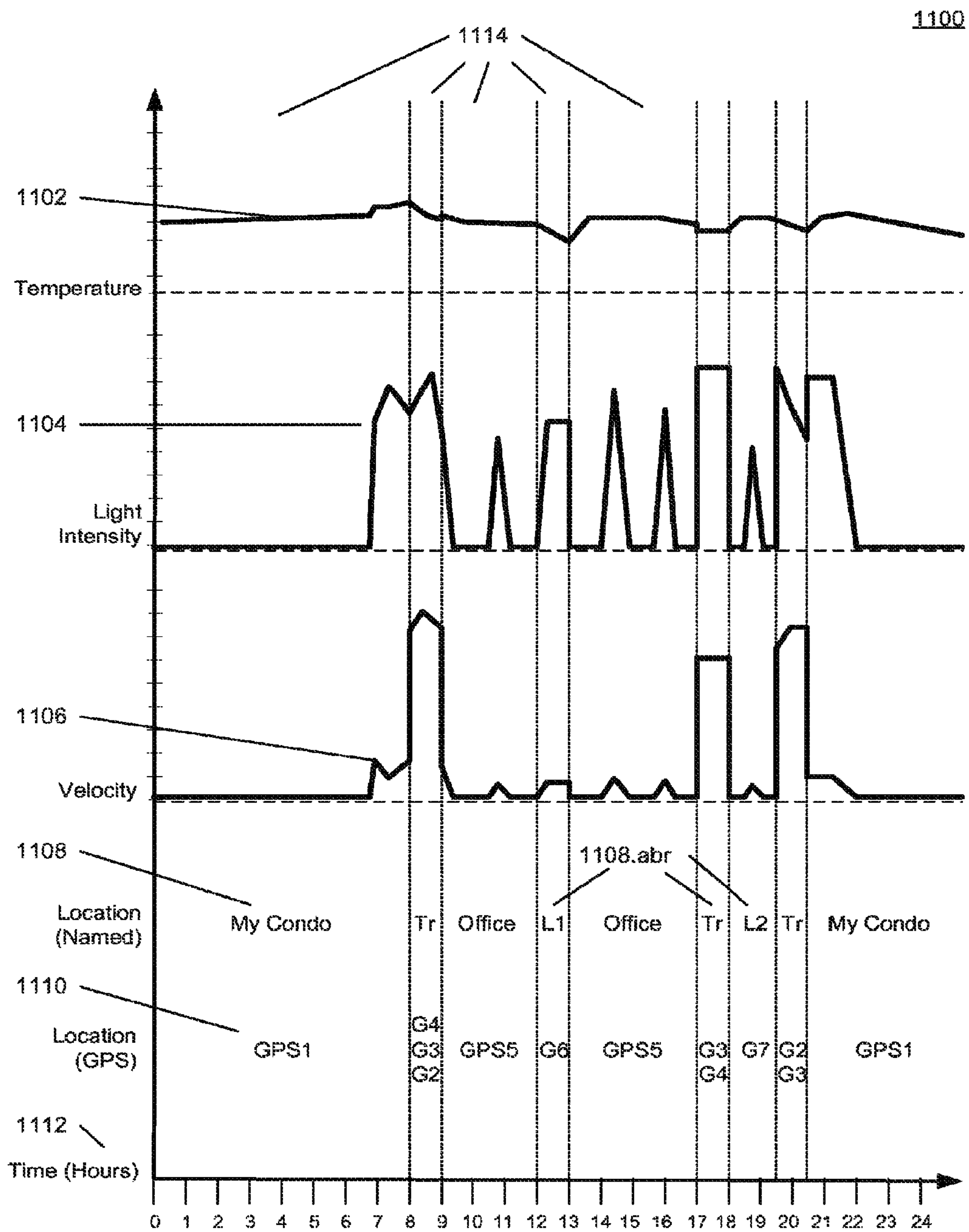

FIG. 11A is an exemplary plot of an exemplary sensor data which may be recorded by a BIRD for an associated item.

Figure 11B:
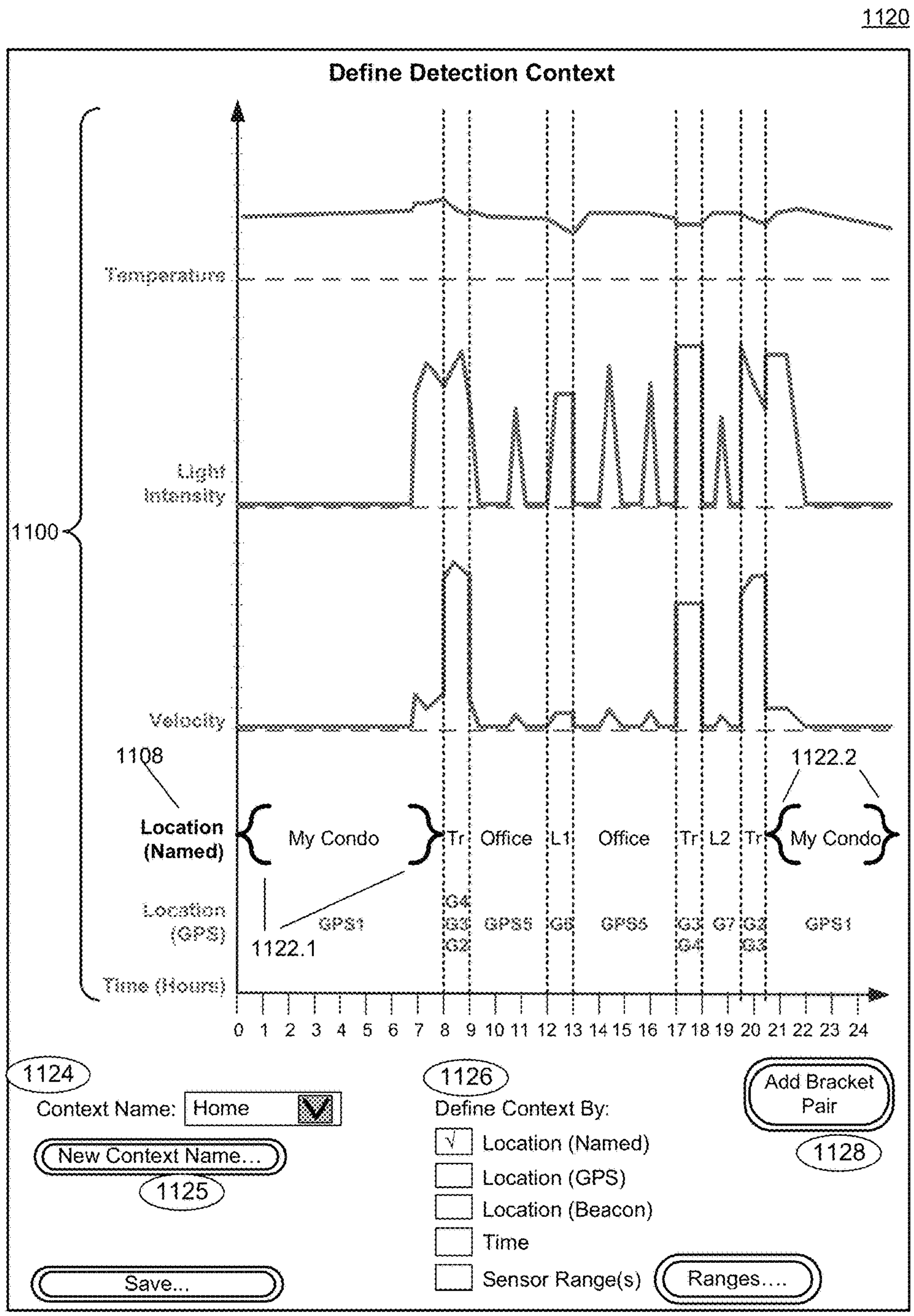

FIG. 11B is a drawing of an exemplary dialog box which may be used to define a detection context.

Figure 11C:
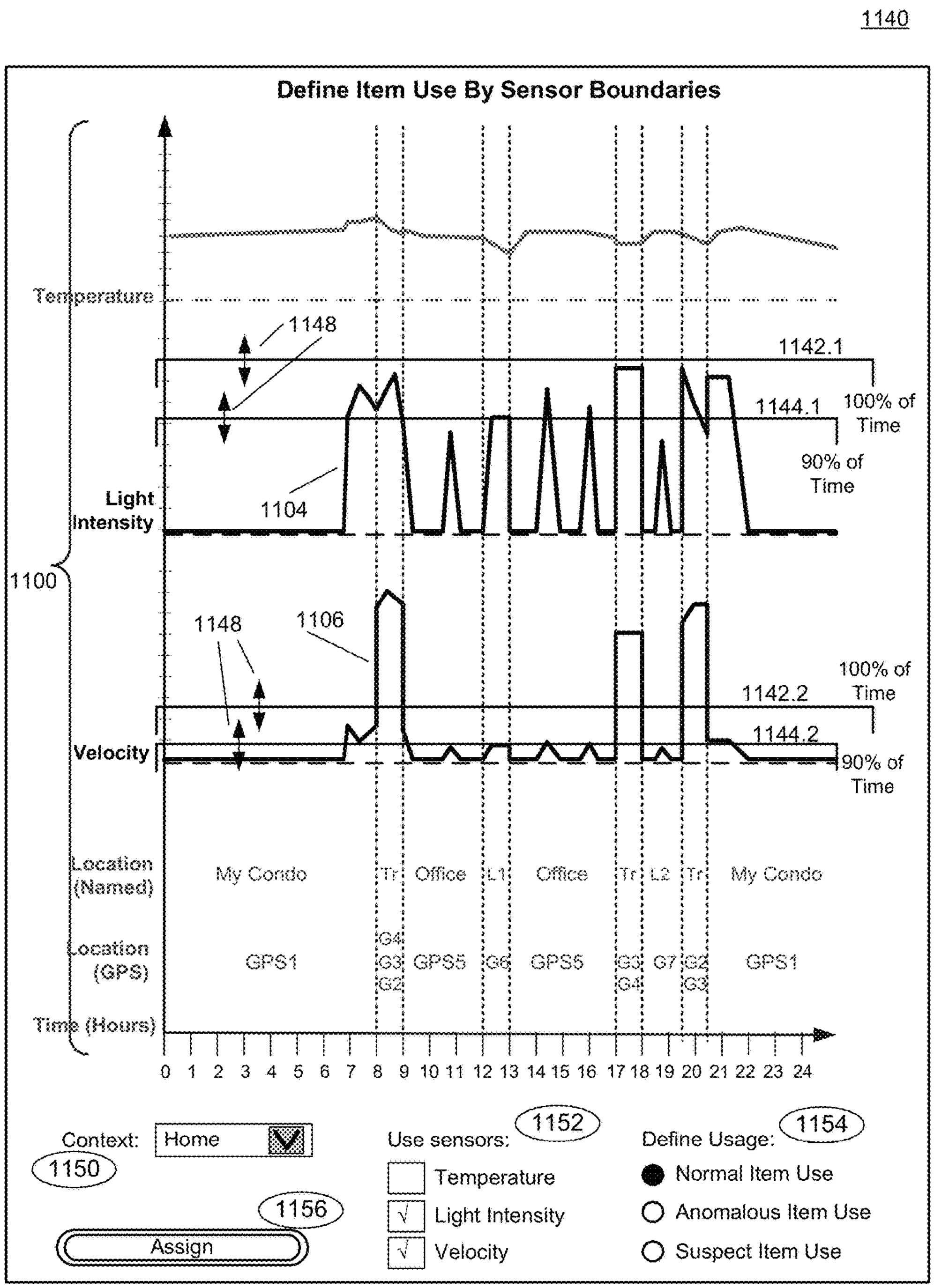

FIG. 11C is a drawing of an exemplary dialog box which may be used to define extant/normal or displaced/anomalous item usage.

Figure 12A:
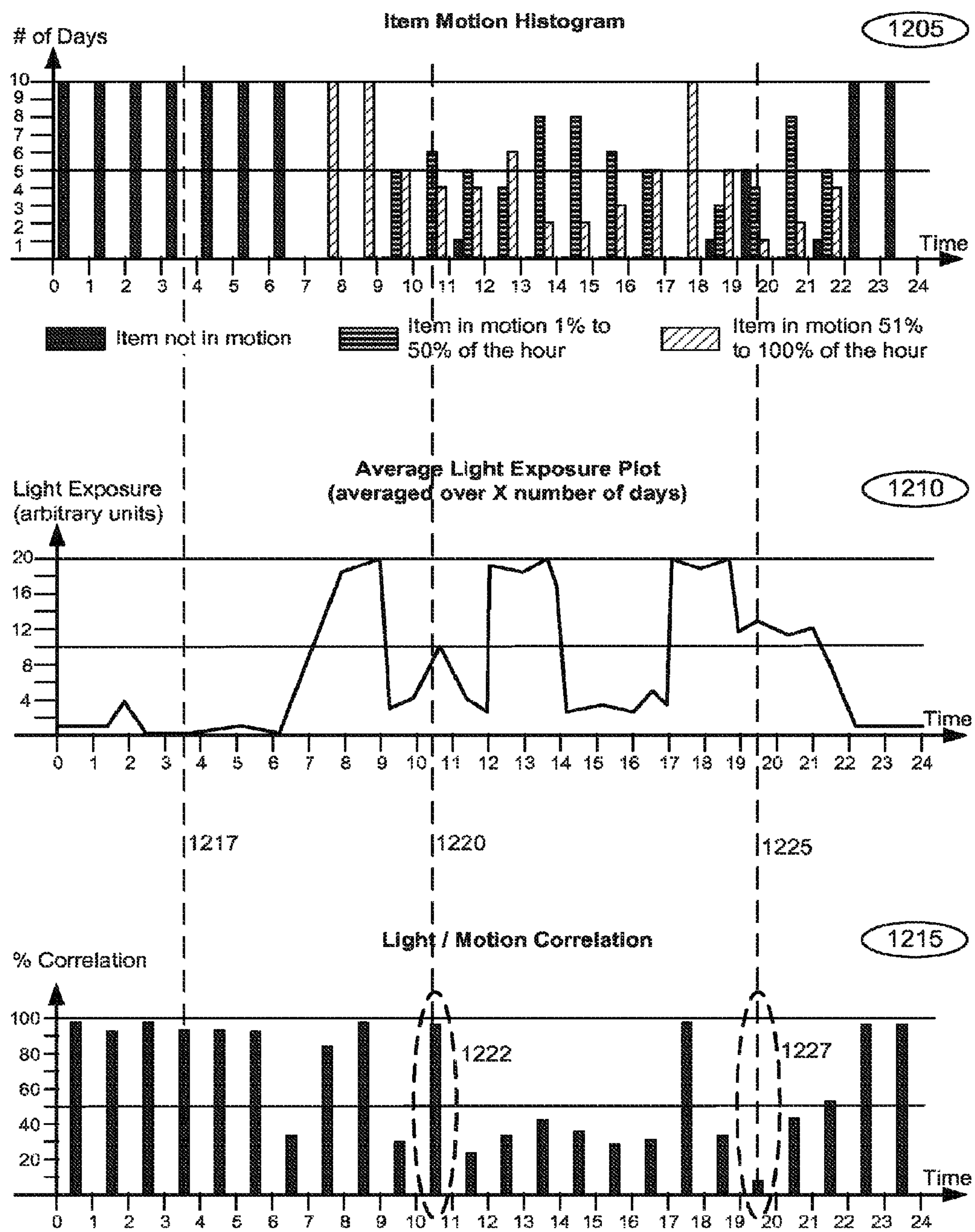

FIG. 12A is a drawing of several exemplary plots of exemplary data which may be used to determine item behavior, item behavioral patterns, and/or item behavior correlations.

Figure 12B:
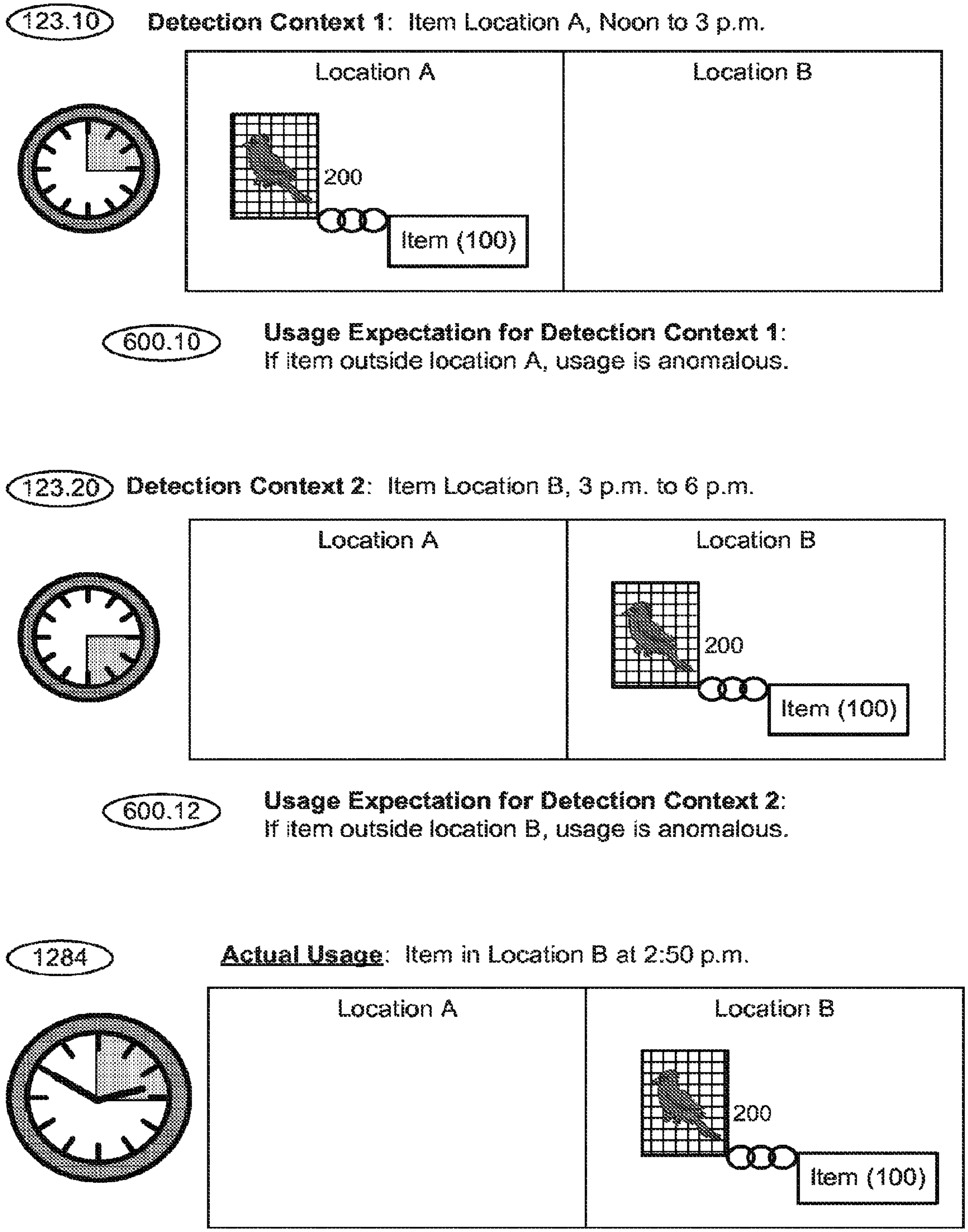

FIG. 12B is illustrates two detection contexts for an item and an actual usage of the item.

Figure 12C:
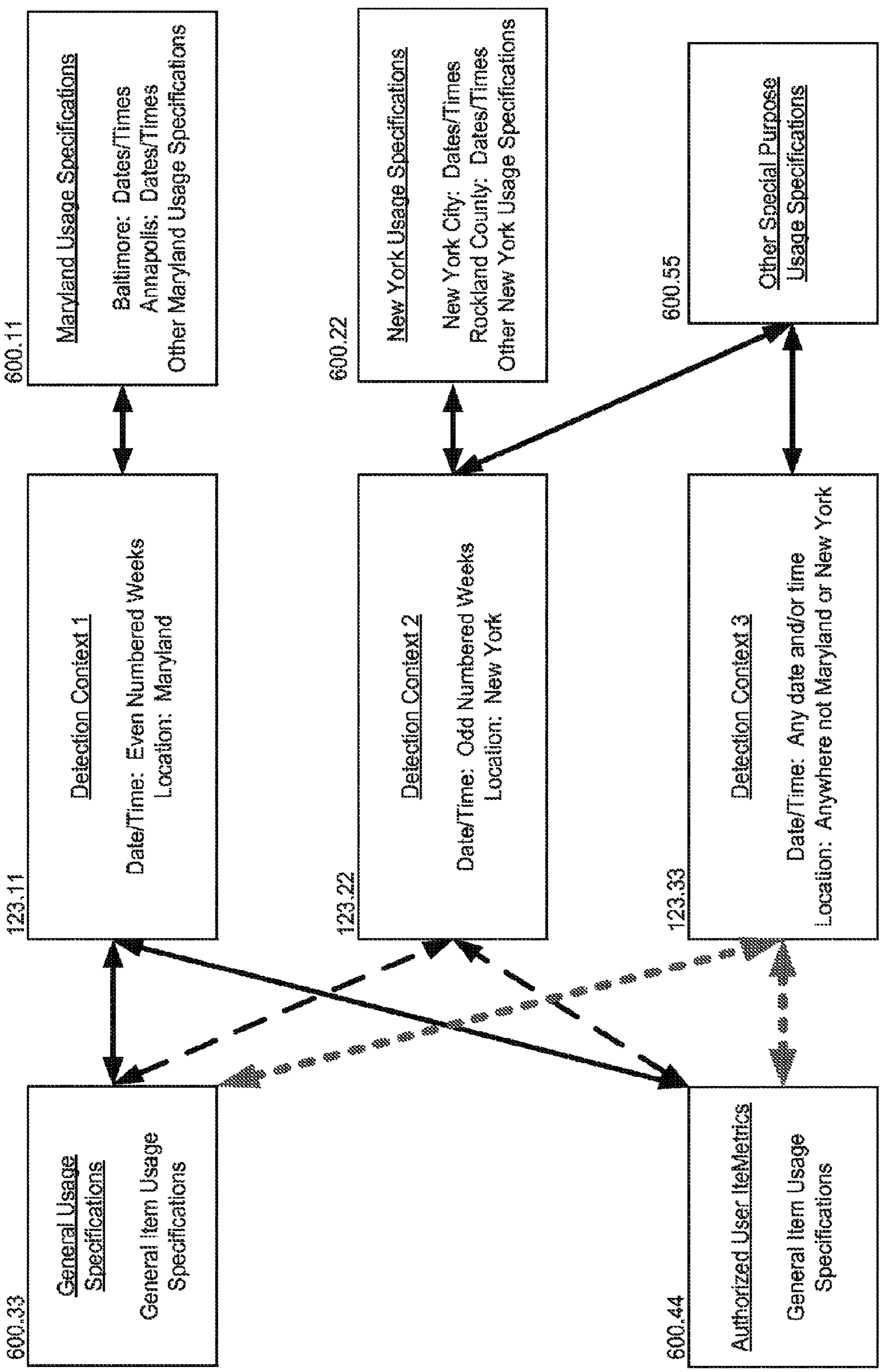

FIG. 12C illustrations three detection contexts for an item and four associated sets of usage expectations.

Figure 13A:
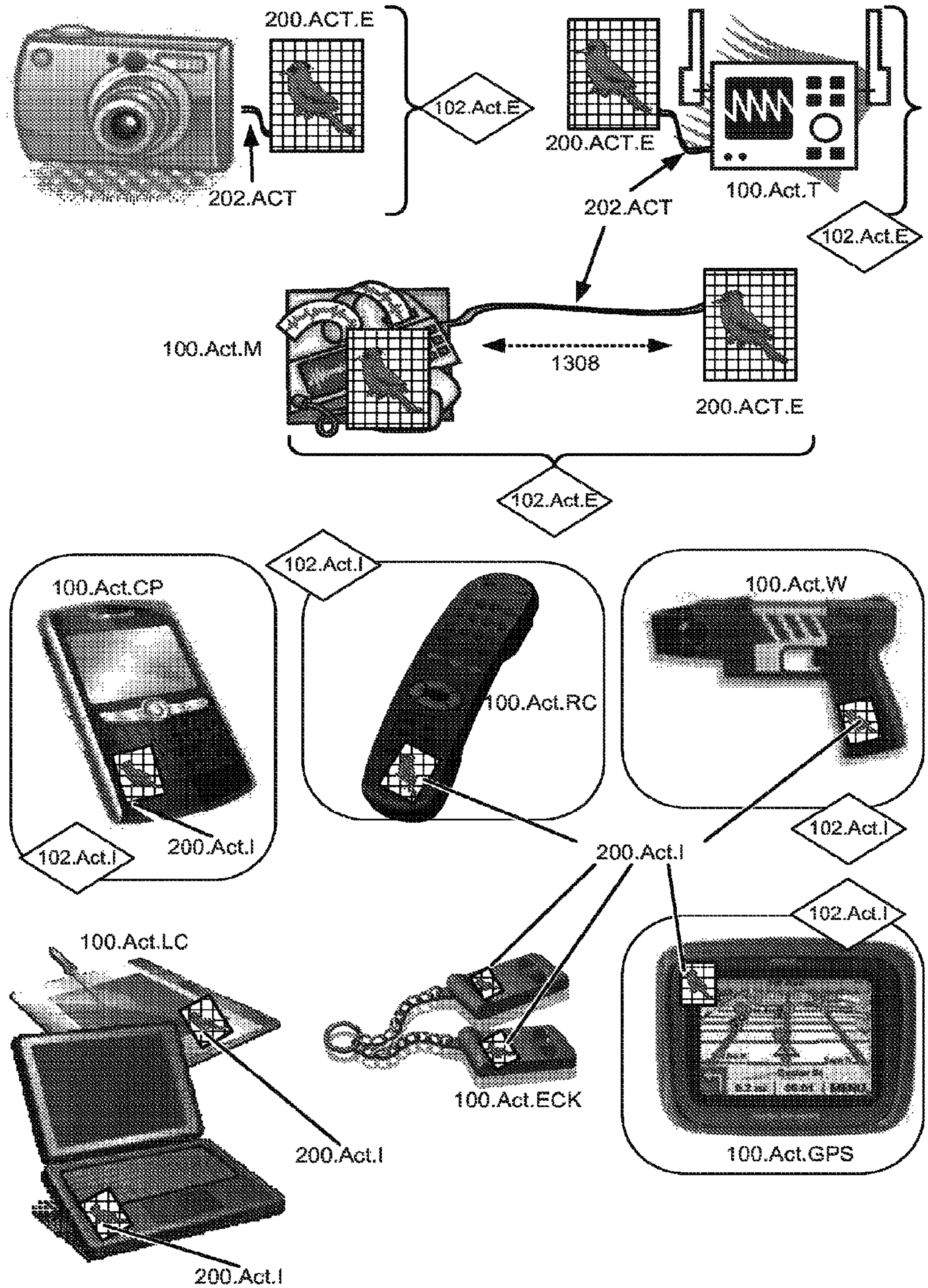

FIG. 13A illustrates several exemplary active items and associated BIRDs.

Figure 13B:
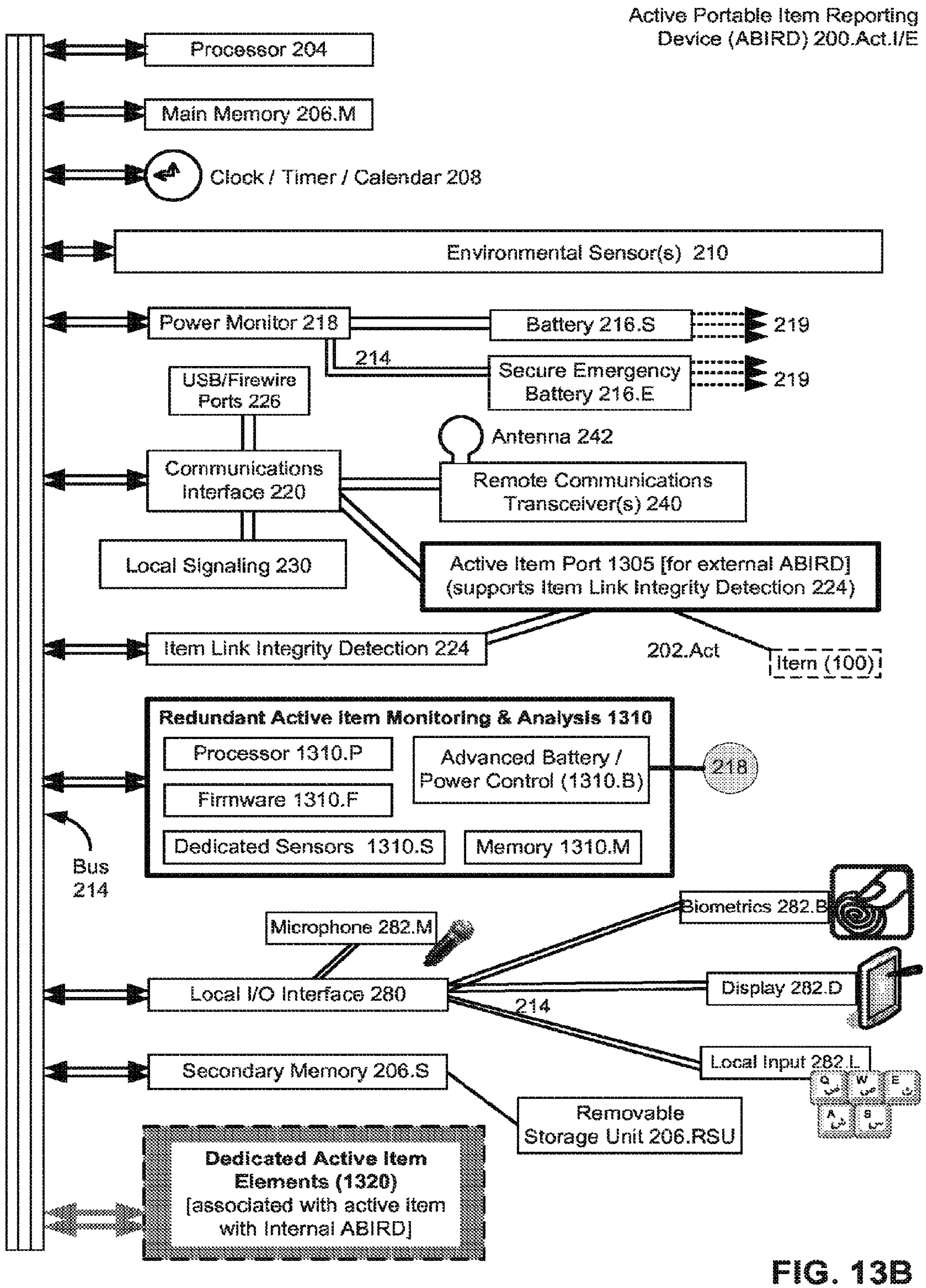

FIG. 13B is a system-level diagram of exemplary elements of an exemplary BIRD used in association with active items.

FIG. 13C lists exemplary item operational parameters which may be monitored and analyzed for various exemplary active items.

FIG. 13D presents a table of exemplary active item statuses, internal operations features, and states.

Figure 14A:
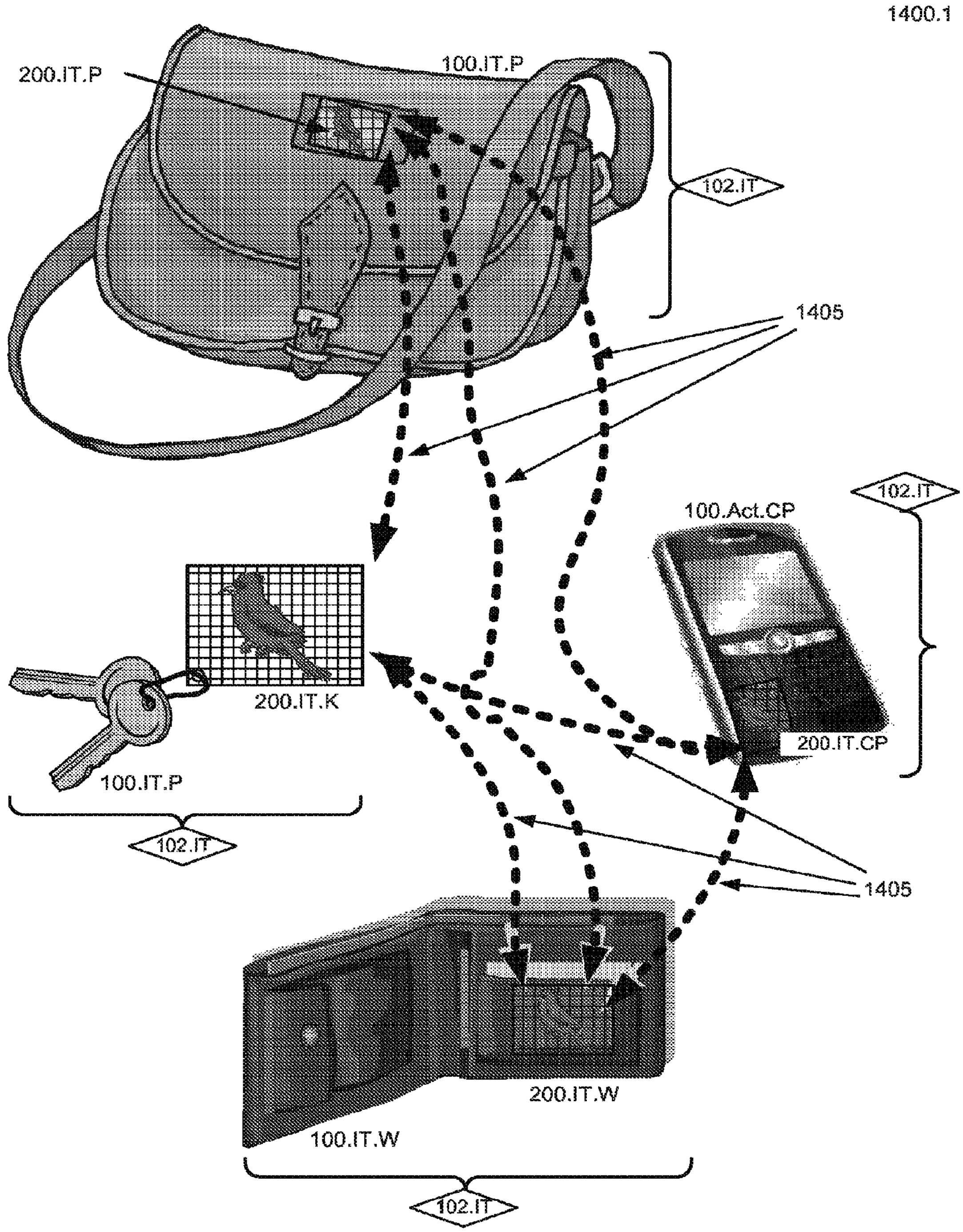

FIG. 14A illustrates exemplary elements a first exemplary item team.

Figure 14B:
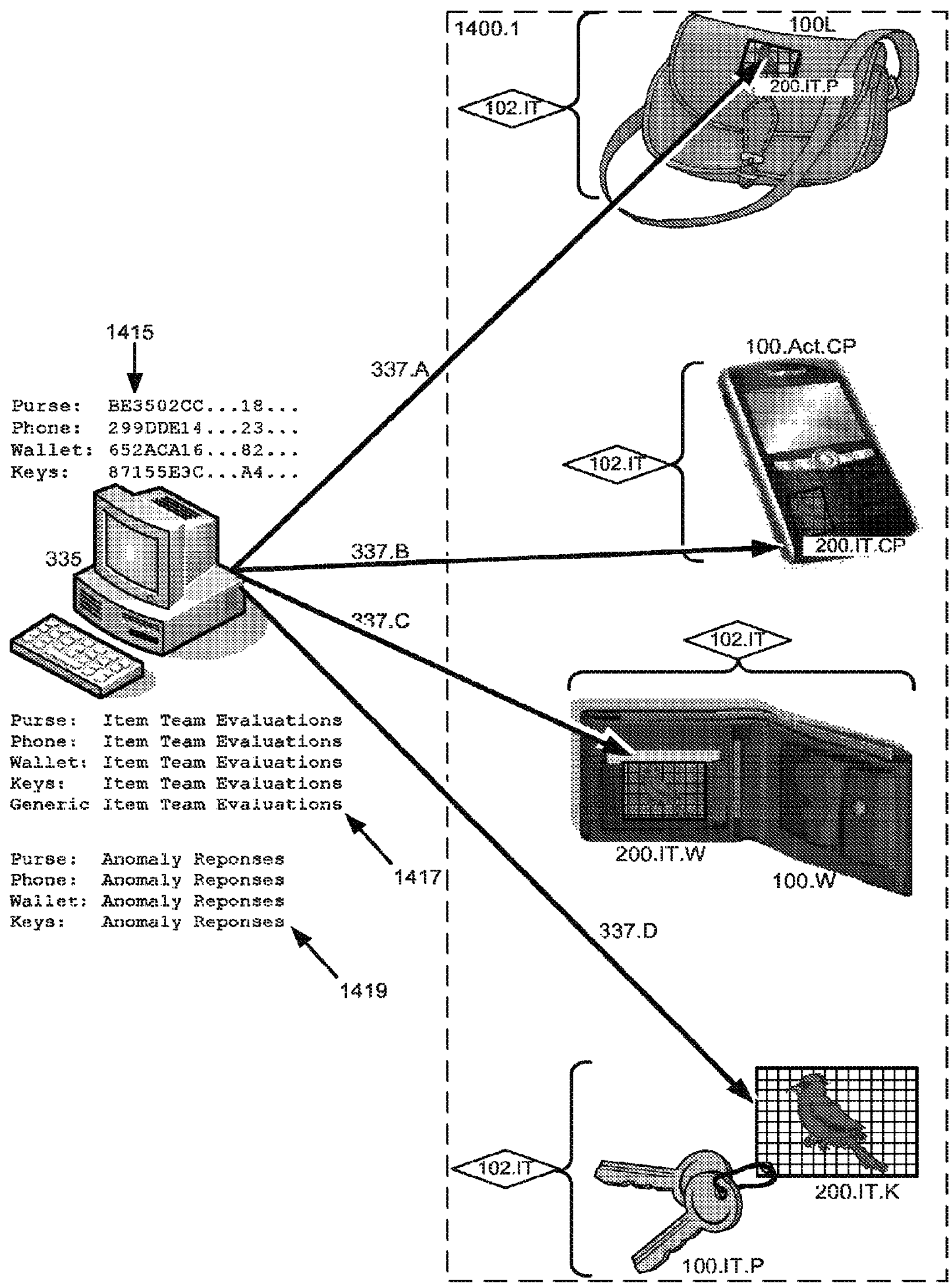

FIG. 14B illustrates exemplary elements of configuration and setup for an exemplary item team.

FIG. 14C illustrates exemplary elements of data communications between members of an exemplary item team.

FIG. 14D is an exemplary list of exemplary item team evaluations.

Figure 14E:
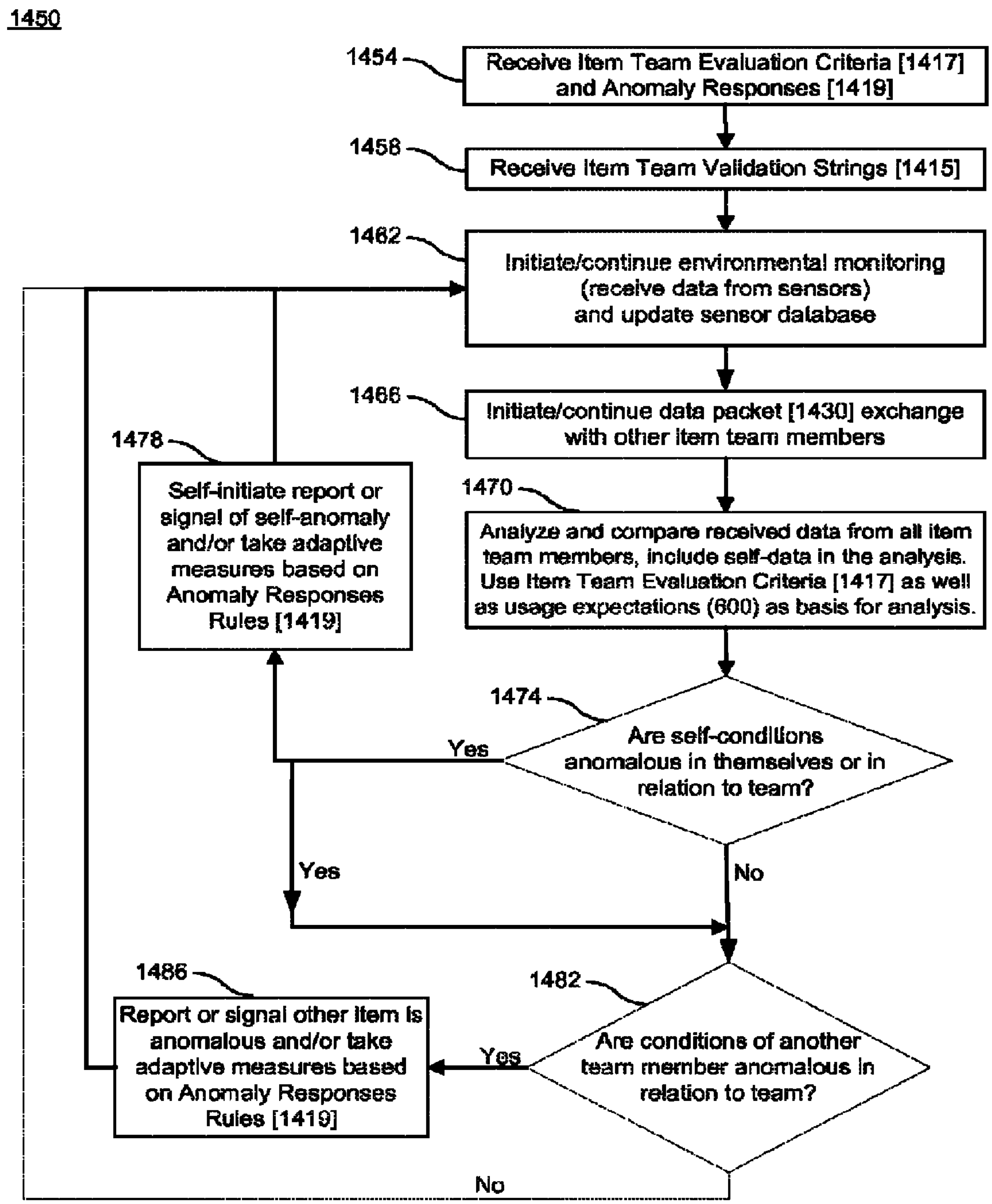

FIG. 14E is a flowchart of an exemplary method for self-monitoring by an item team.

Figure 14F:
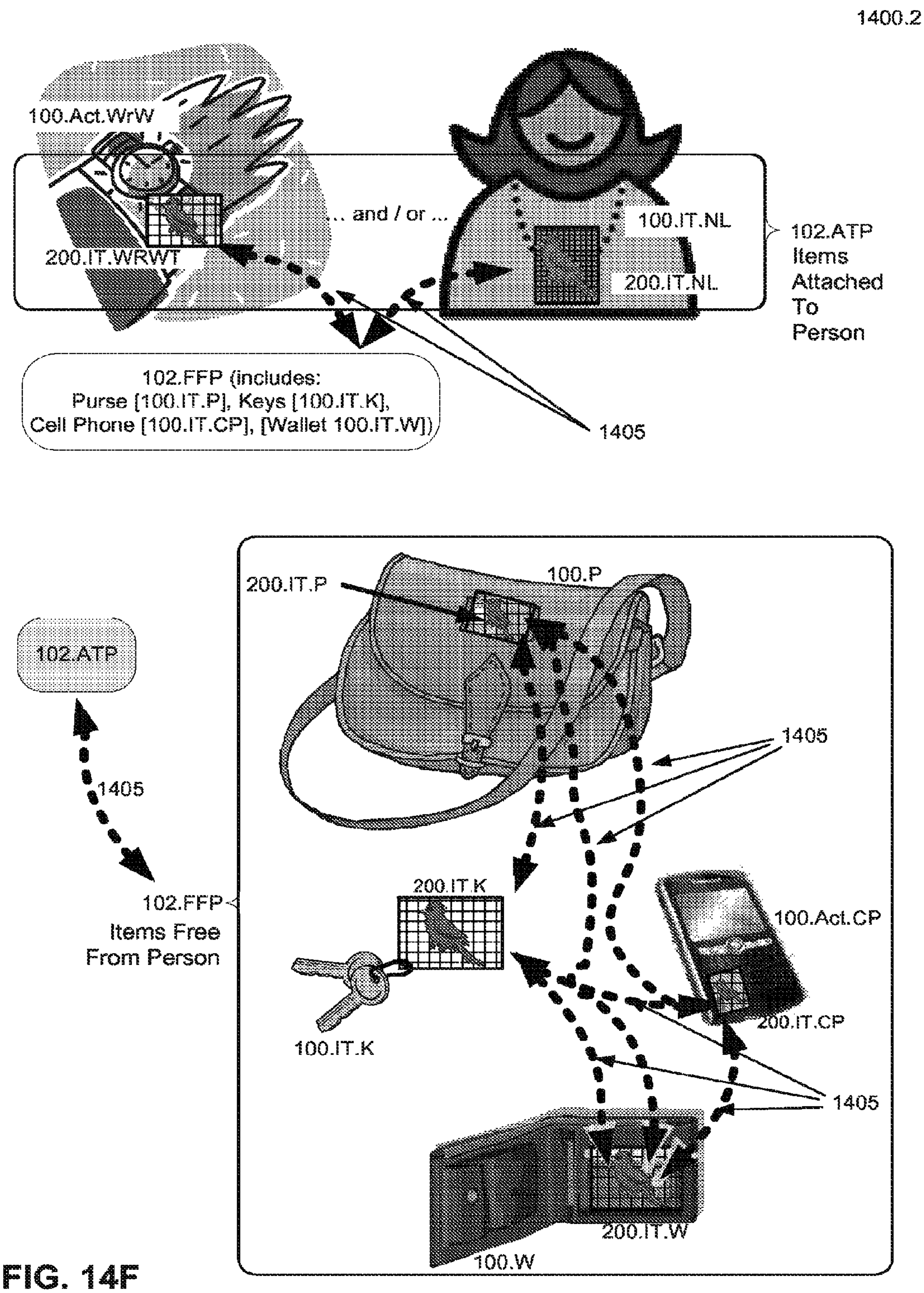

FIG. 14F illustrates exemplary elements a second exemplary item team.

FIG. 14G illustrates exemplary elements a third exemplary item team.

FIG. 14H illustrates exemplary elements of a fourth exemplary item team and a fifth exemplary item team.

Figure 14I:
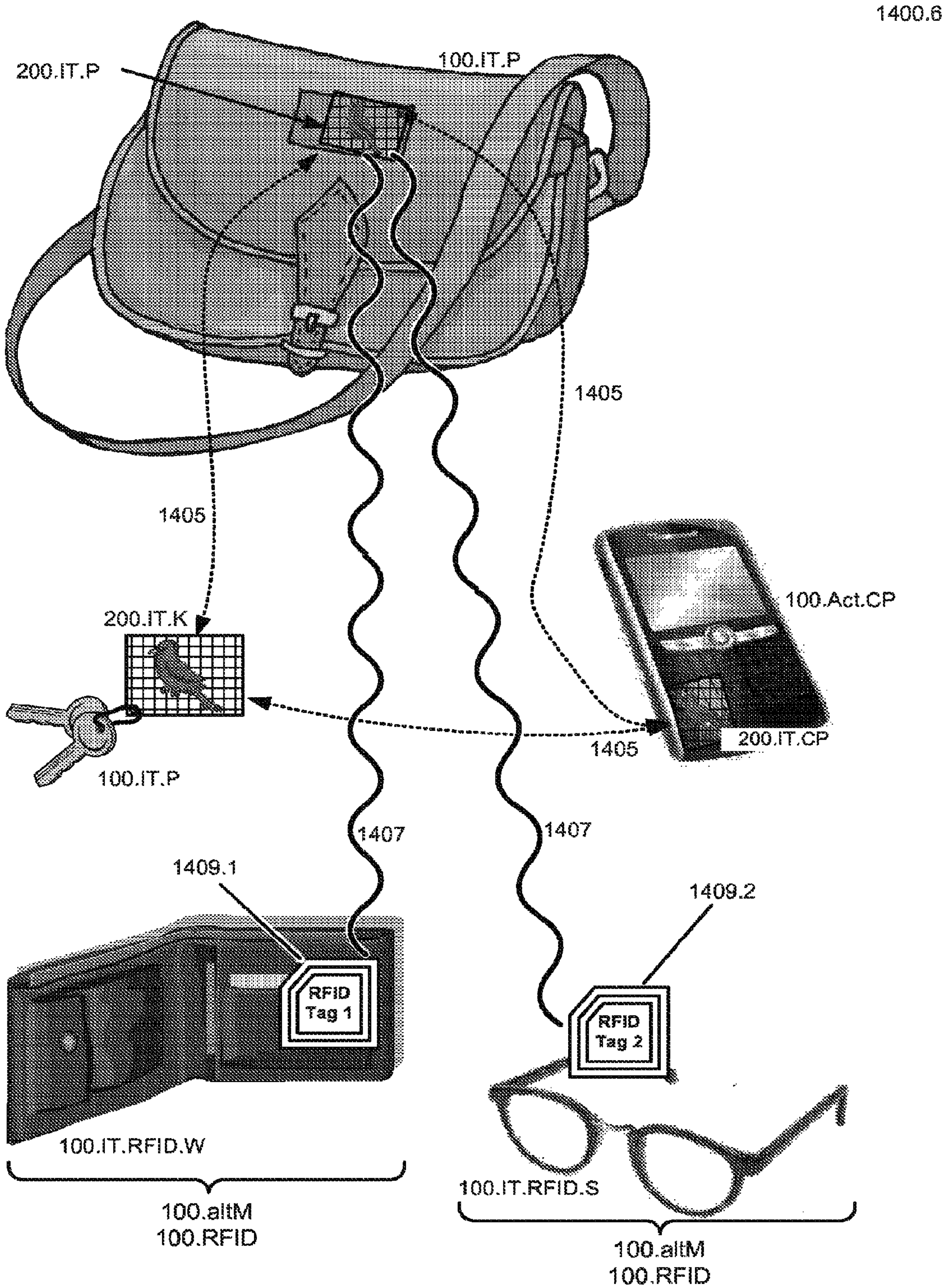

FIG. 14I illustrates exemplary elements of sixth exemplary item team employing RFID tags.

Figure 15A:
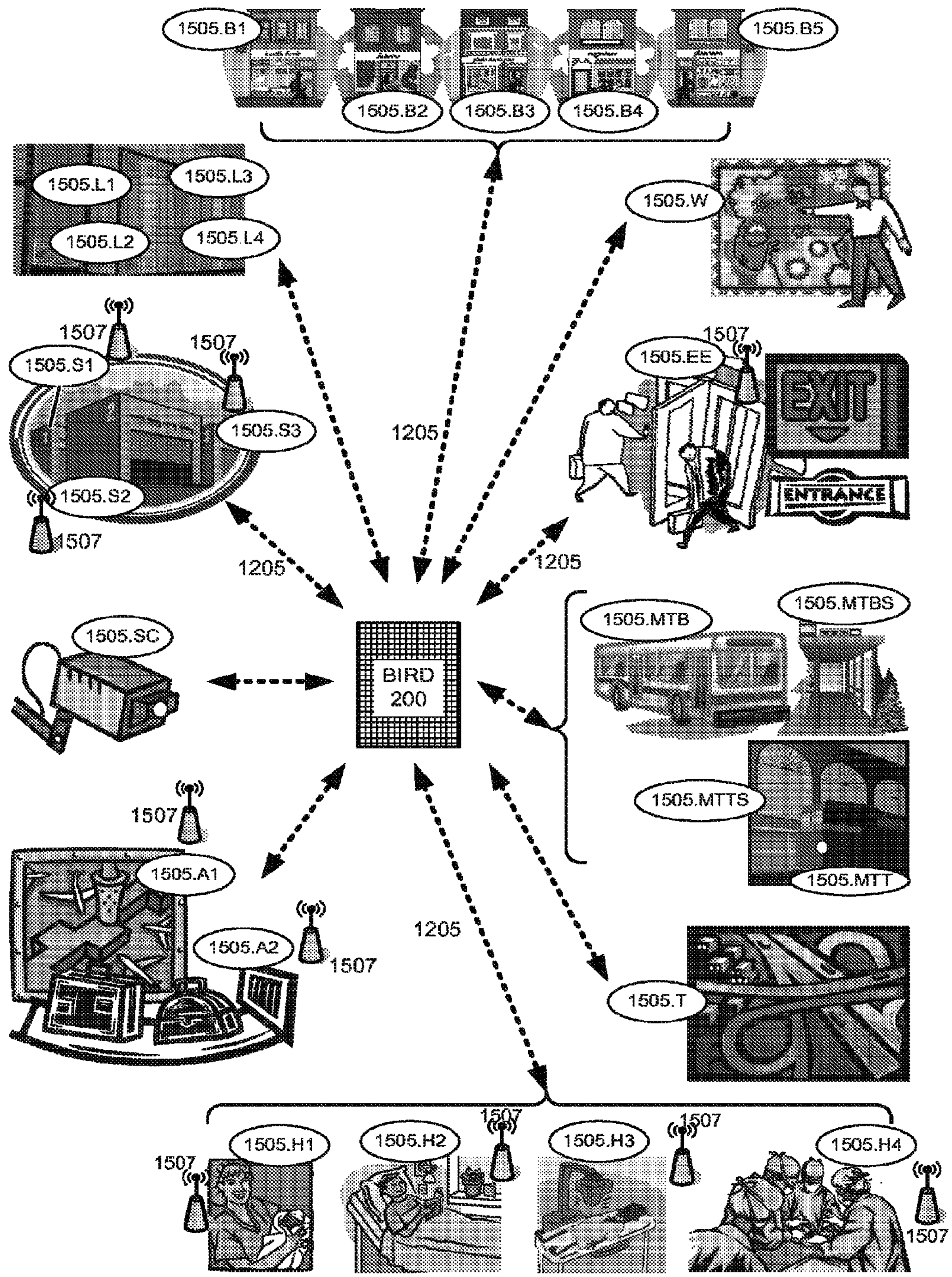

FIG. 15A illustrates exemplary sources of external data streams which may support operations of a BIRD.

Figure 15B:
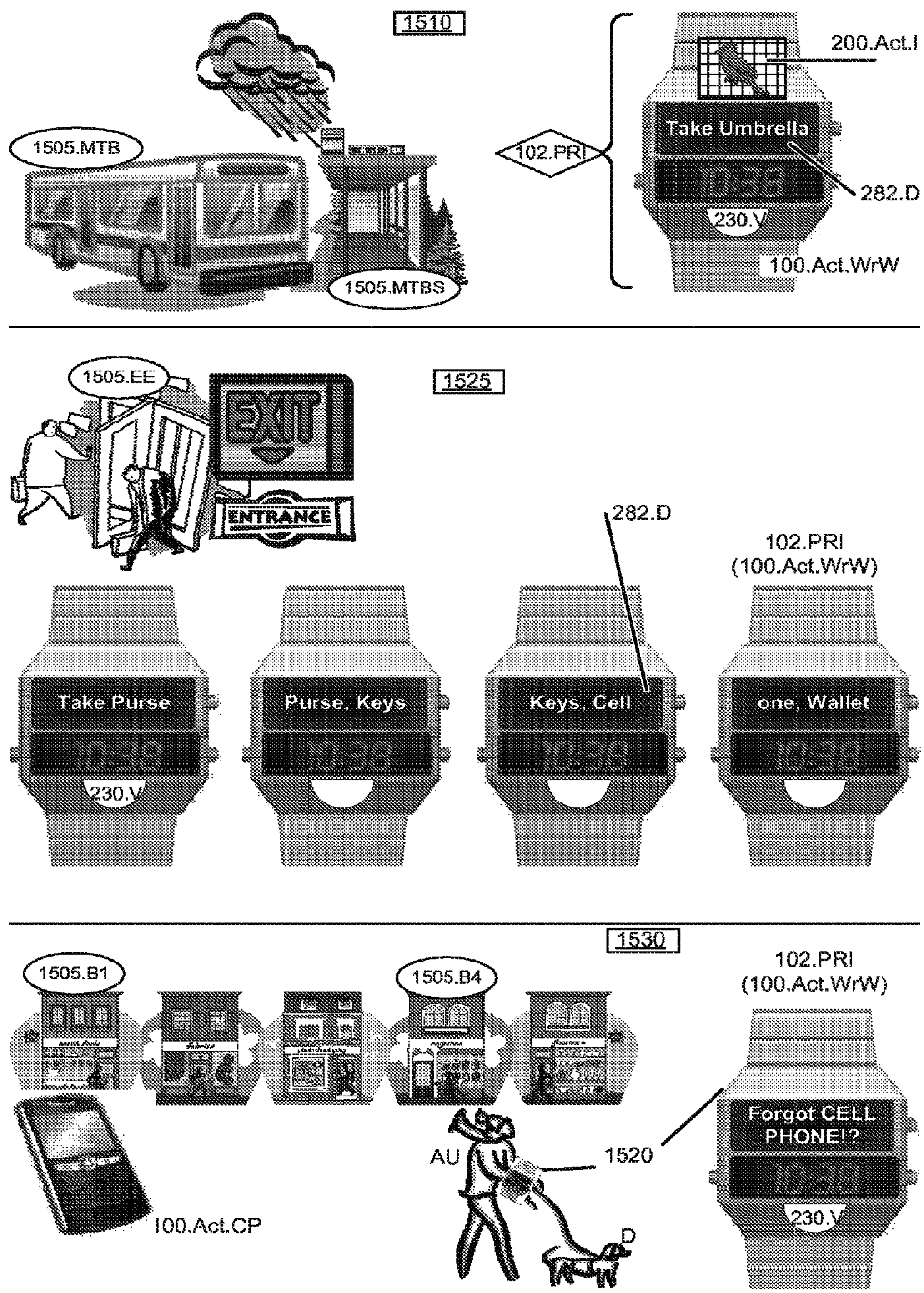

FIG. 15B illustrates exemplary interactions between a principal reporting item and either an environment with a data stream and/or other members of an item team.

Figure 16A:
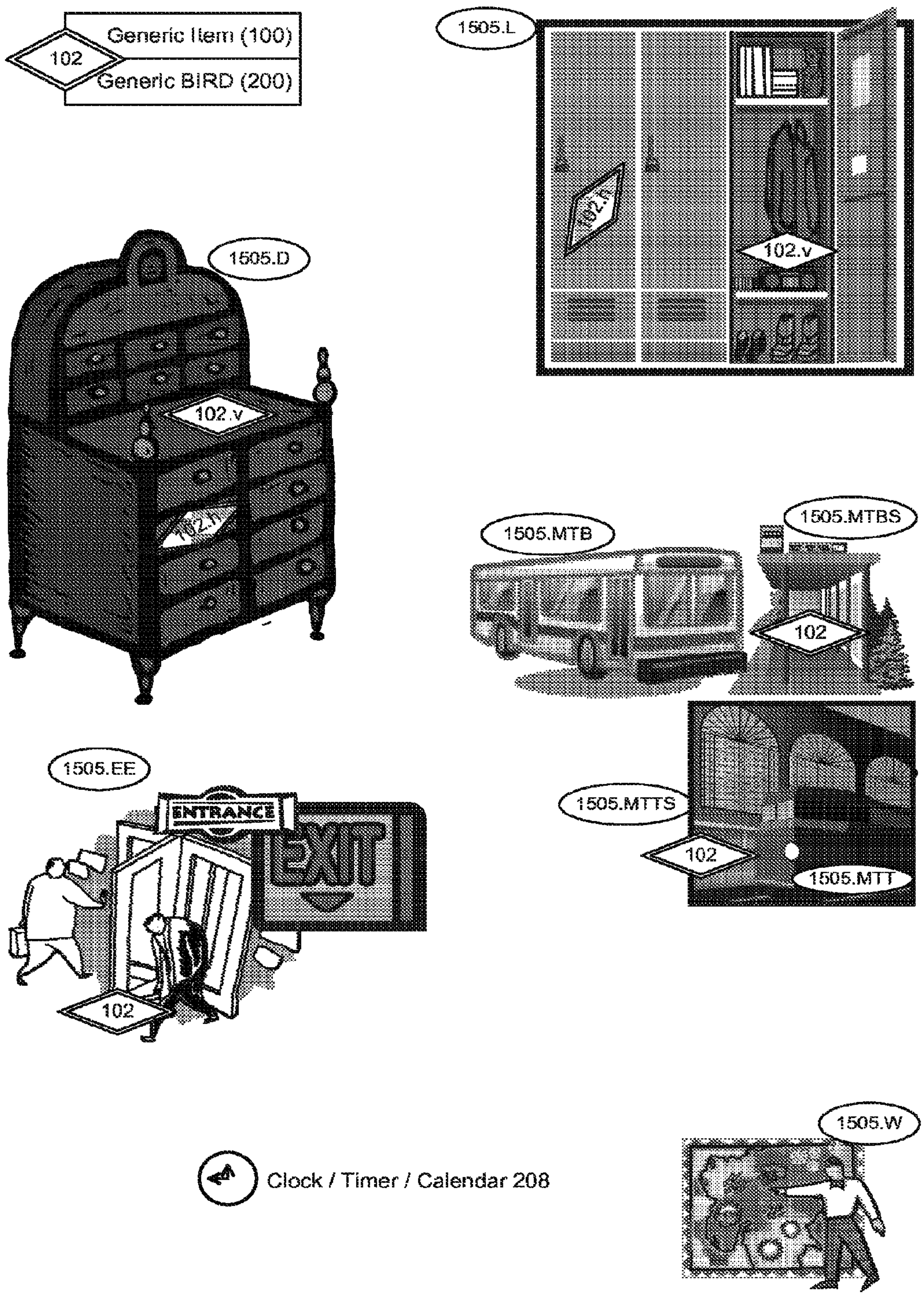

FIG. 16A illustrates exemplary elements associated with the anticipation, prediction, and/or prevention of displaced/anomalous item states or usage.

FIG. 16B is a table of exemplary prediction usage factors which may be an element of usage expectations to predict a possibility of future item displacement/anomalous usage.

Figure 17A:
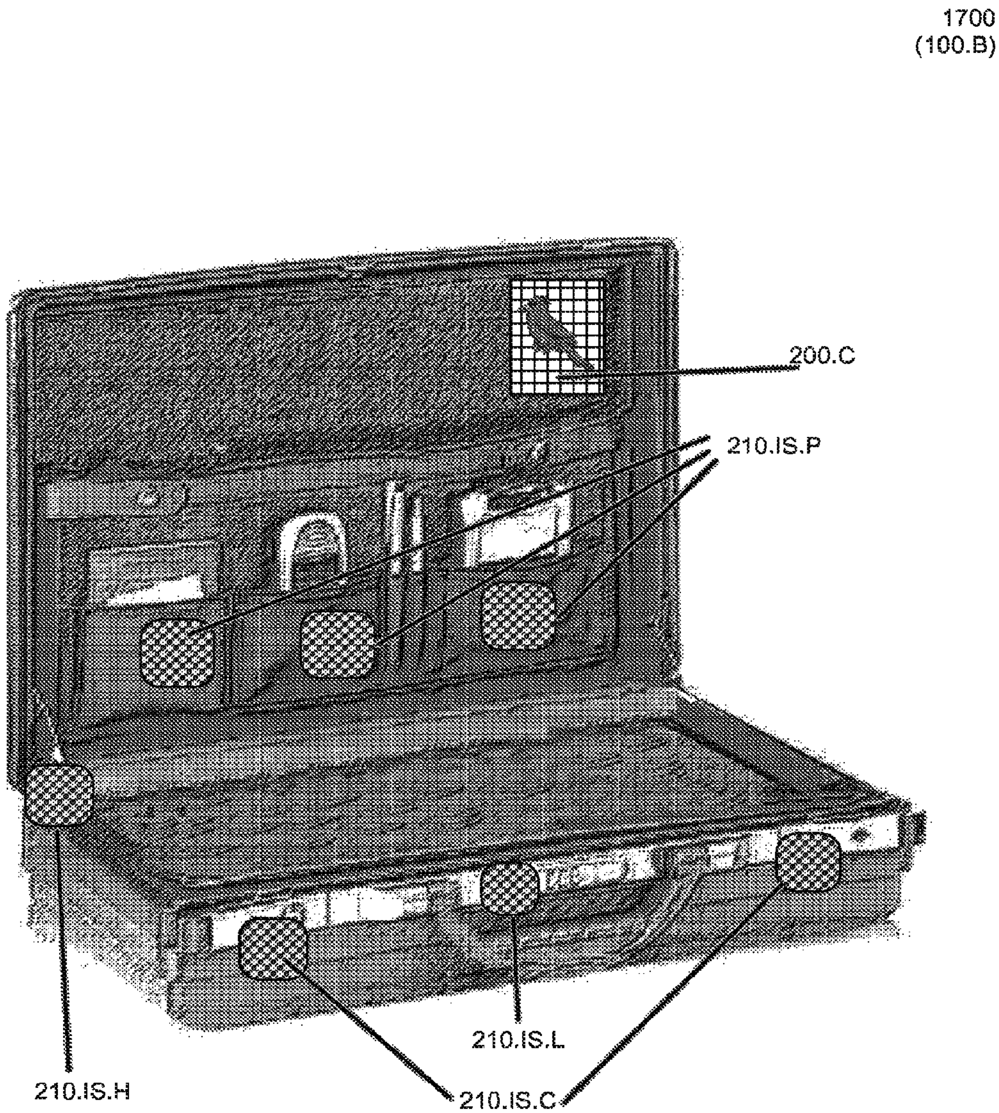

FIG. 17A illustrates an exemplary personal item transport container (a briefcase) with exemplary integrated BIRD elements.

Figure 17B:
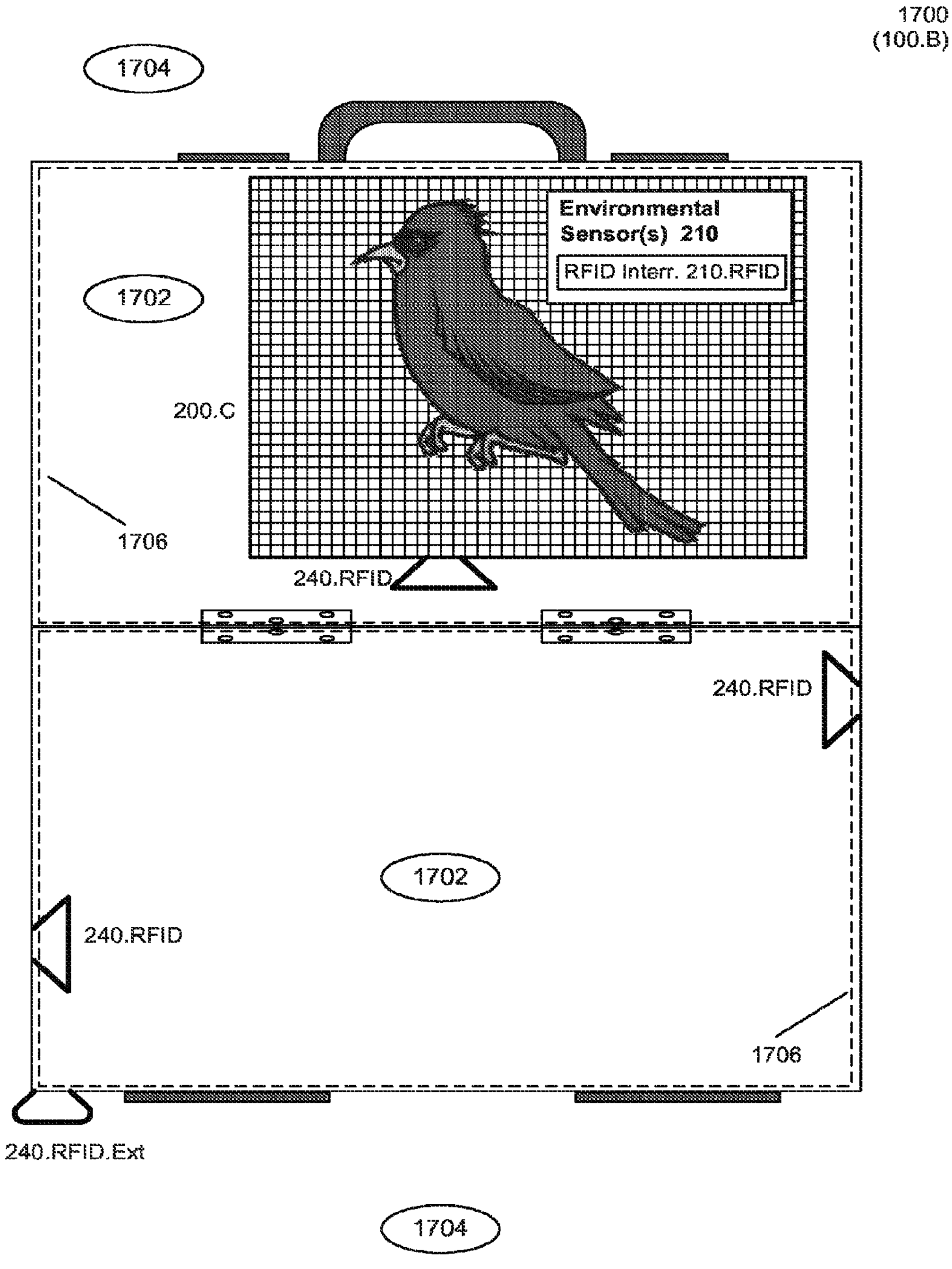

FIG. 17B illustrates an exemplary personal item transport container (a briefcase) with an exemplary integrated BIRD, exemplary integrated RFID interrogator, exemplary RFID antennas, and exemplary radio frequency shielding.

Figure 17C:
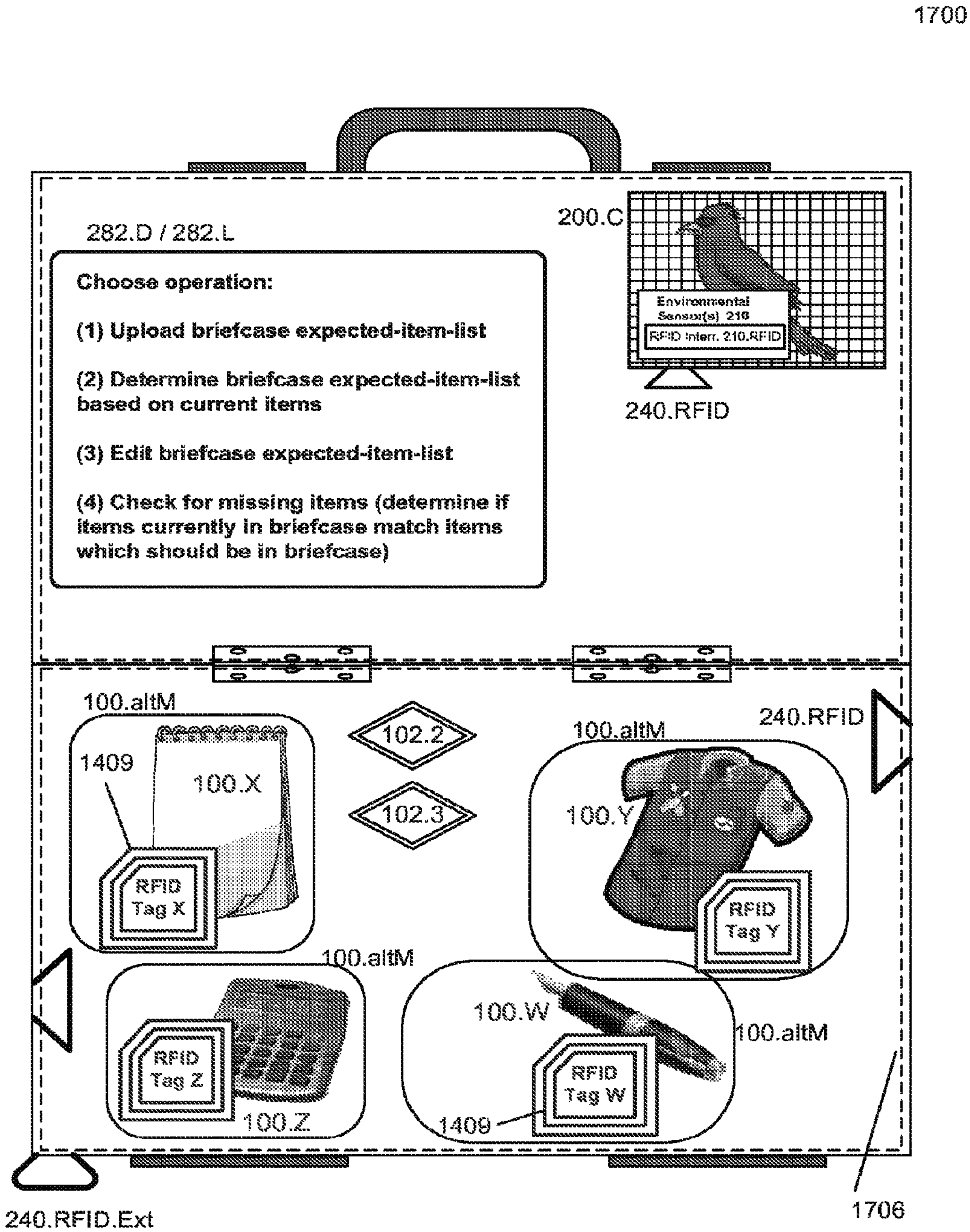

FIG. 17C illustrates the exemplary personal item transport container of FIG. 17B with exemplary items stored within, and with an exemplary user interface.

Figure 17D:
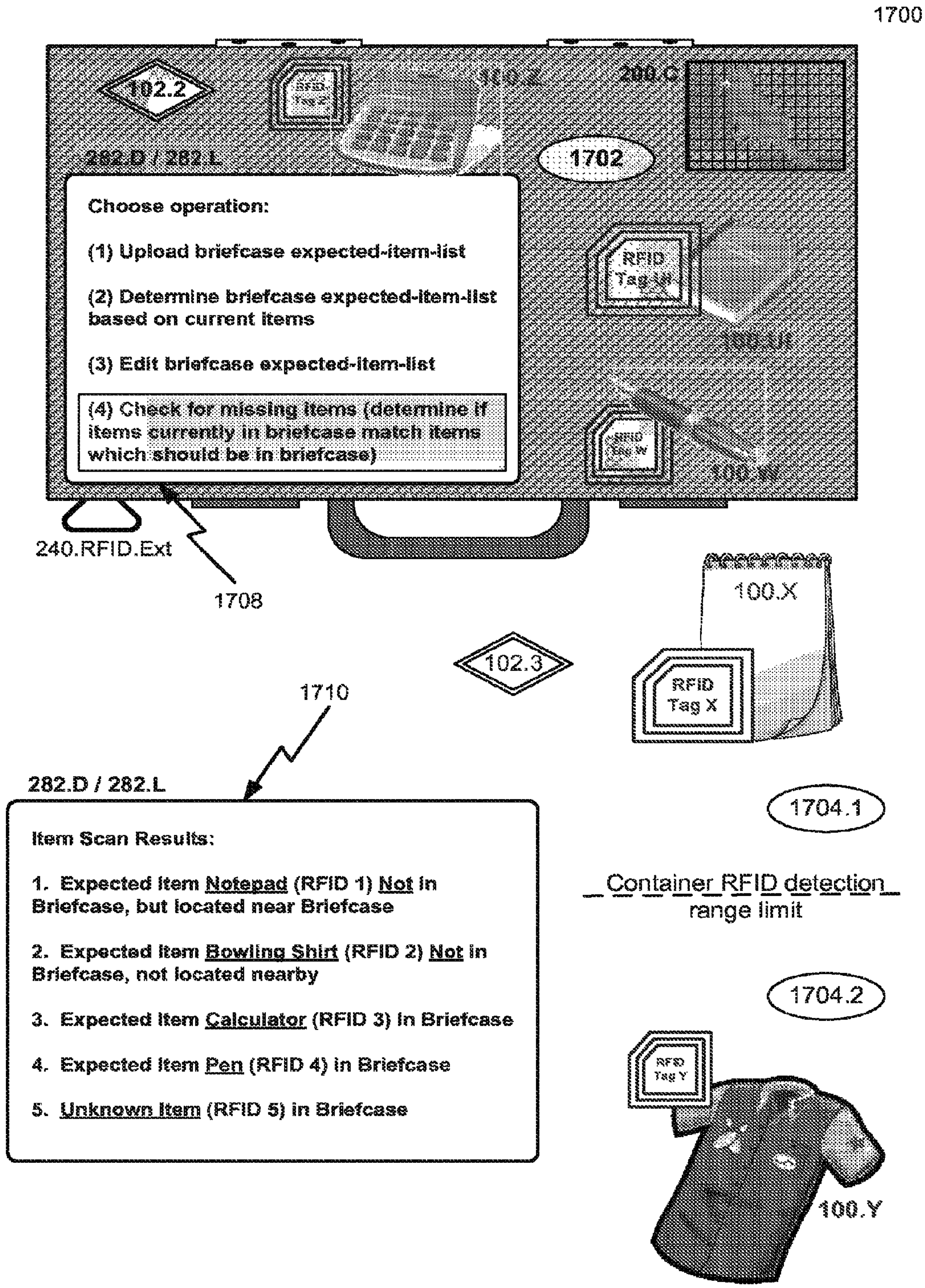

FIG. 17D illustrates the exemplary personal item transport container of FIG. 17B with exemplary items both within and without, and with an exemplary user interface.

Figure 17E:
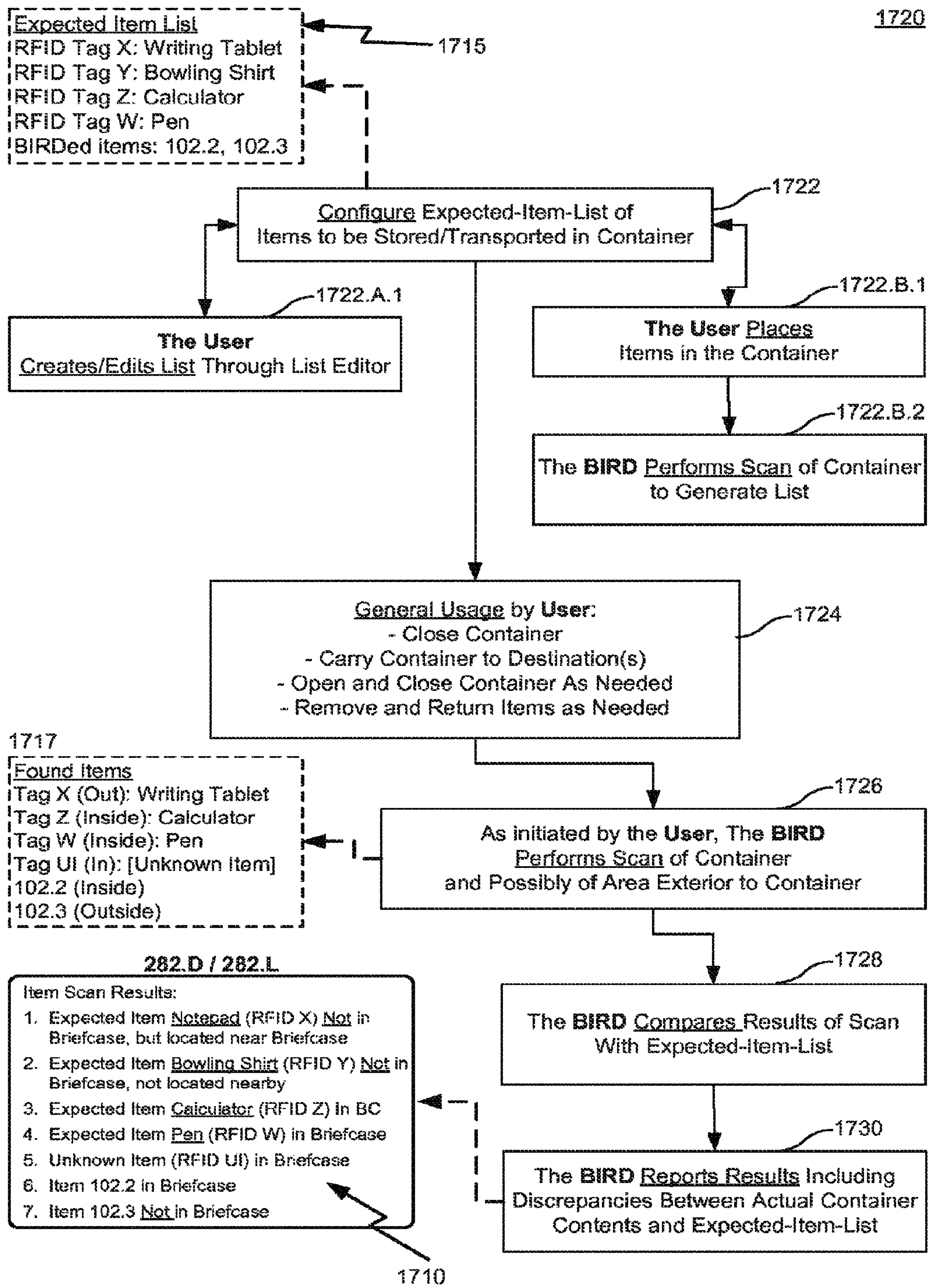

FIG. 17E presents a flowchart of an exemplary method for an exemplary personal item transport container to self-assess if appropriate contents are present, or are not present, in the container.

Figure 17F:
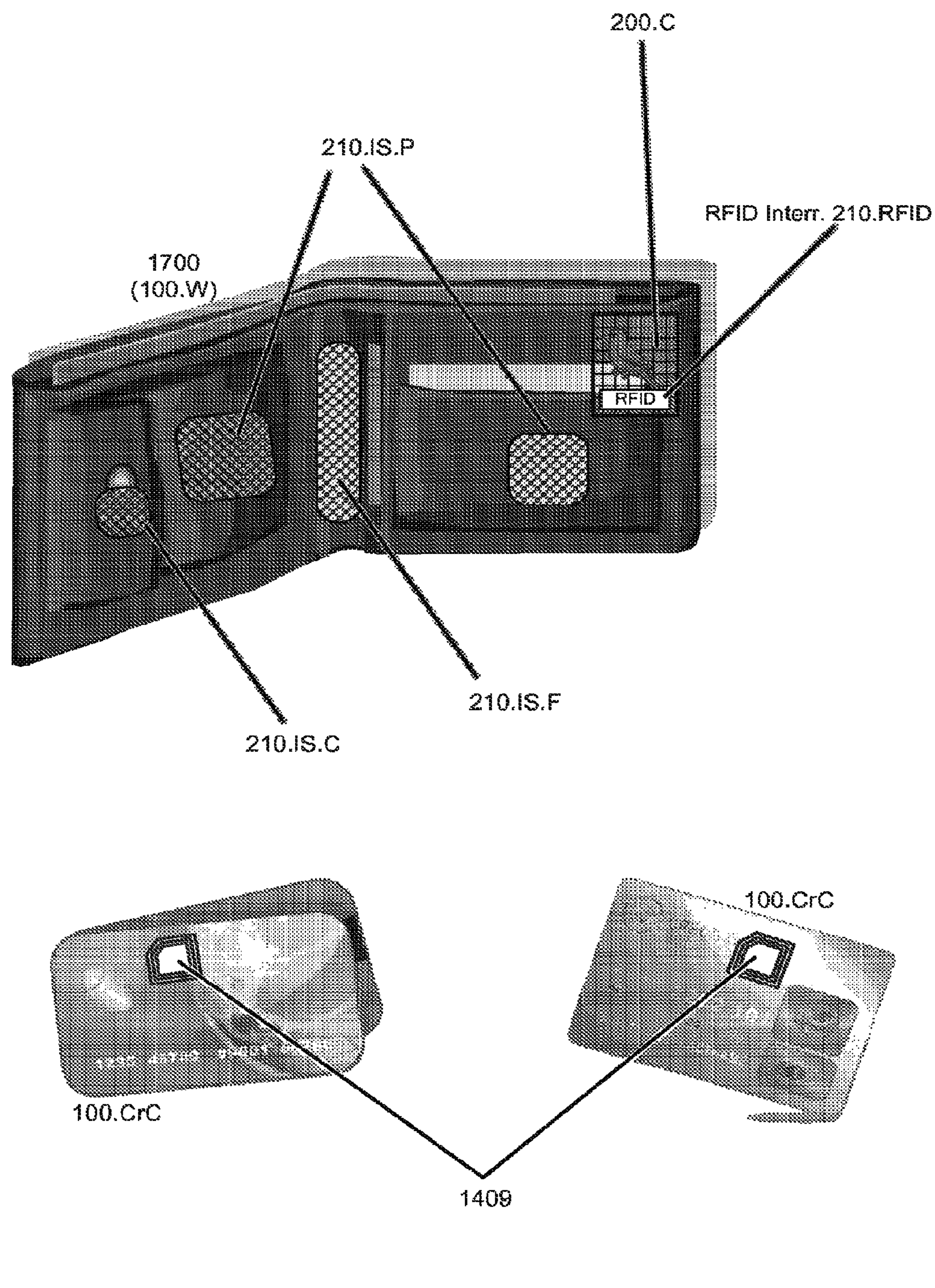

FIG. 17F illustrates another exemplary personal item transport container (a wallet) with exemplary integrated BIRD elements.

Figure 17G:
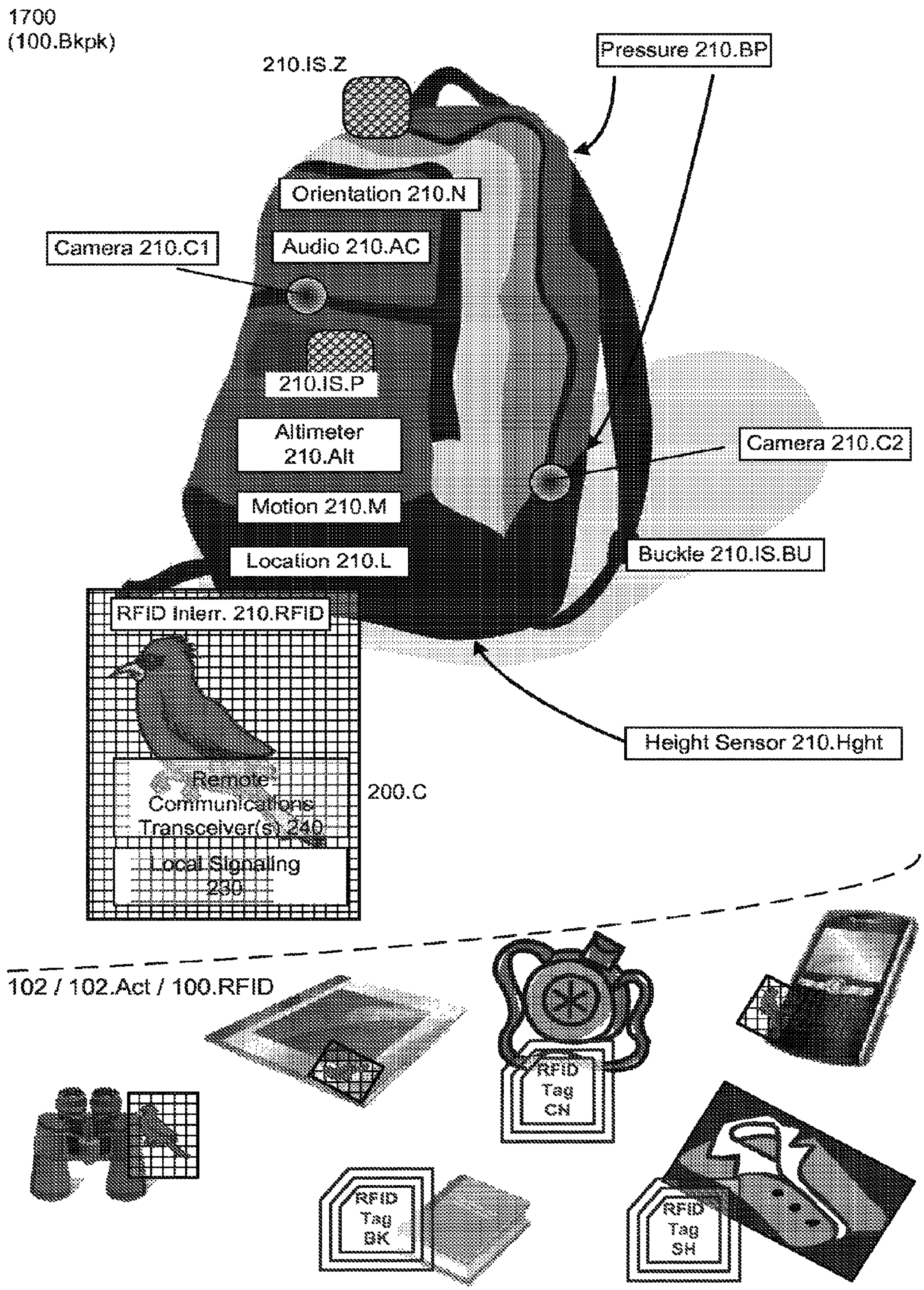

FIG. 17G illustrates another exemplary personal item transport container (a backpack) with exemplary integrated BIRD elements.

Figure 17H:
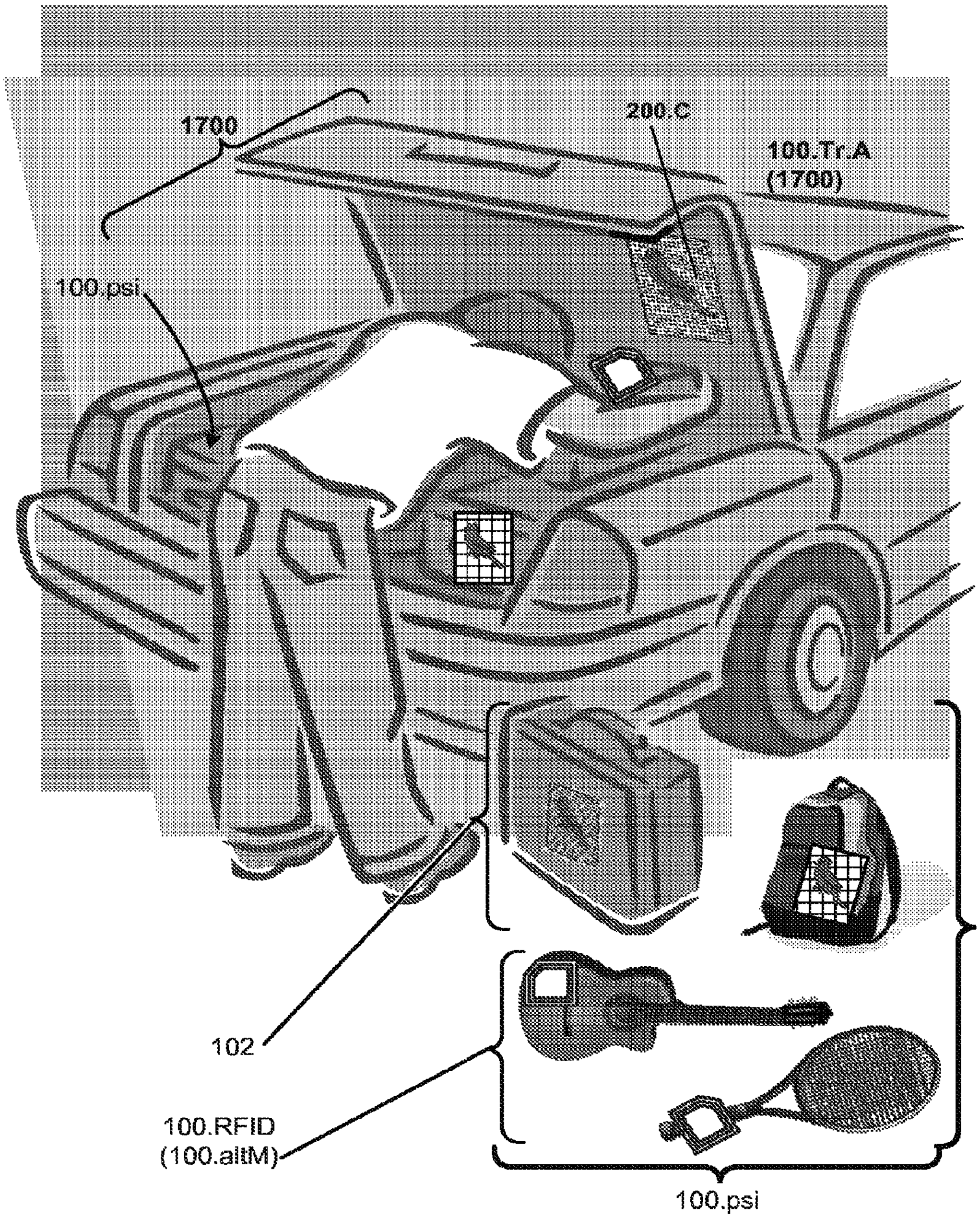

FIG. 17H illustrates another exemplary personal item transport container (a motor vehicle) with exemplary integrated BIRD elements.

Figure 18A:
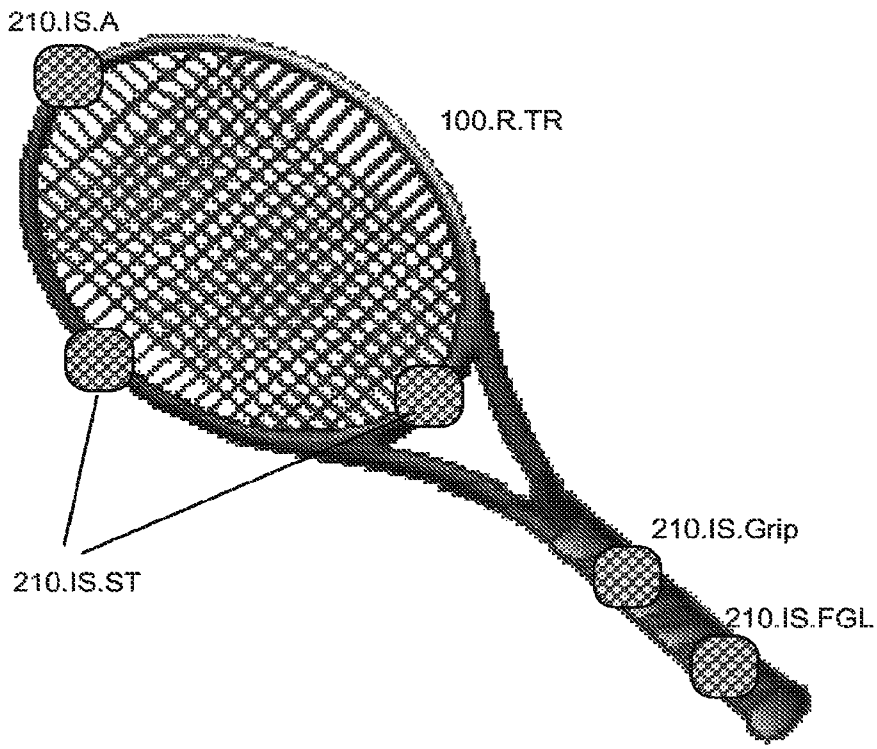

FIG. 18A illustrates an exemplary sporting/recreational item with exemplary integrated BIRD elements.

Figure 18B:
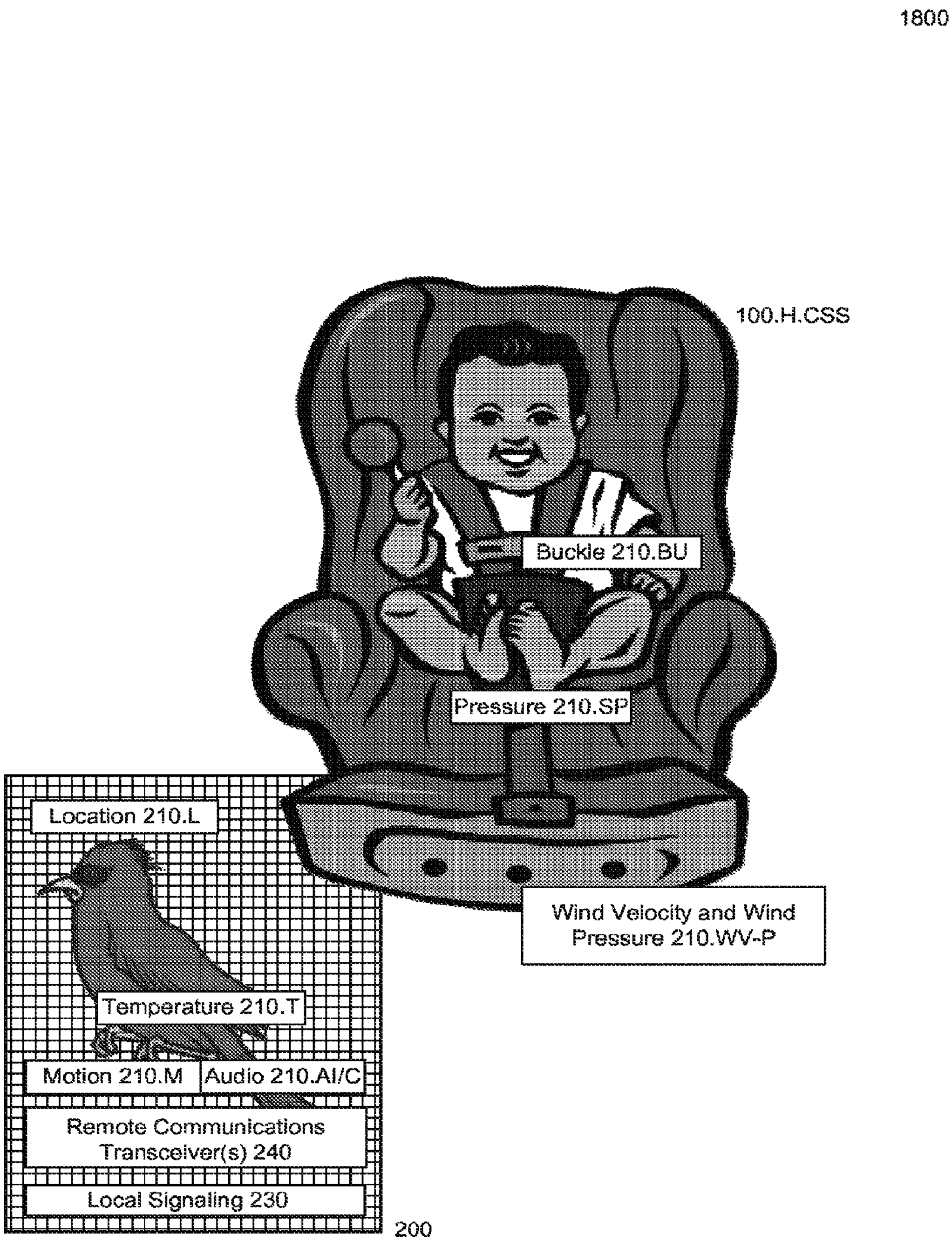

FIG. 18B illustrates an exemplary child safety seat with exemplary integrated BIRD elements.

Figure 18C:
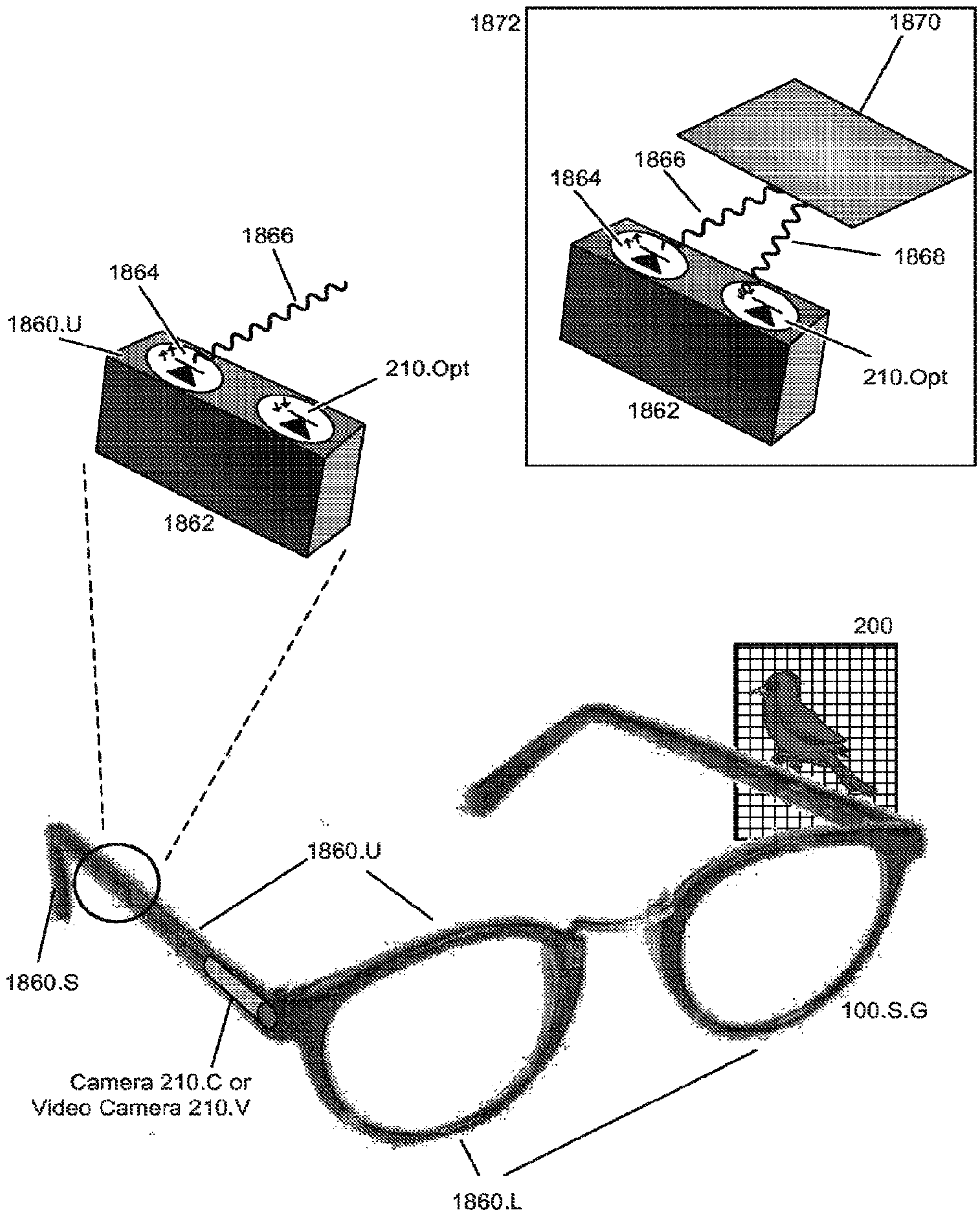

FIG. 18C illustrates exemplary eye glasses with exemplary integrated BIRD elements.

Figure 19:
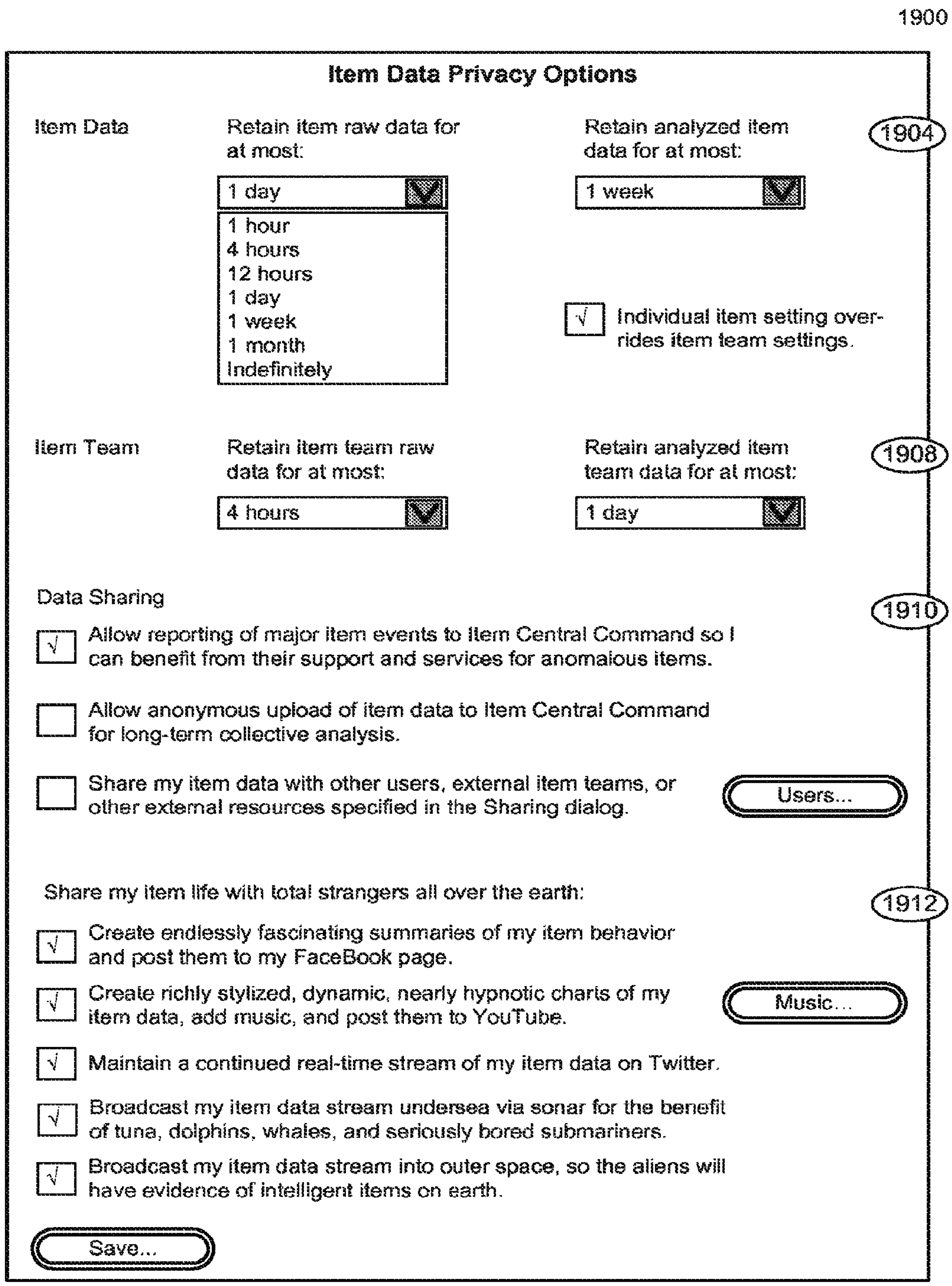

FIG. 19 illustrates an exemplary dialog box pertaining to exemplary data privacy elements for a BIRD.

DETAILED DESCRIPTION OF THE INVENTION

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings.

Similarly, while various terms are characterized throughout this document, including some in the section on Introductory Terminology presented immediately below, it is to be understood that the phraseology and terminology used herein is for the purpose of description and should not be regarded as limiting.

Introductory Terminology

Anomalous (Item State)

An umbrella term to describe an item which is in a condition (an anomalous usage, an anomalous state, or within or subject to an anomalous environment) which is other than normally expected for the item. Conditions associated with the anomaly are generally detected by sensors associated with the item, either via a BIRD associated with the item or by being integrated into the item.

In one usage, an "anomalous item state" may be indicative that the item is displaced (lost, misplaced, misappropriated, wandering, or stolen); however, in this same usage, an "anomalous item state" may also be indicative of other respects in which an item (100) is in an environment, or is being put to use or subjected to conditions, which are other than those normally expected for the item.

In an alternative usage, an "anomalous item state" may refer to an item being in an unexpected state, exclusive of being displaced. For example, anomalous usage may refer to an item which may be extant (present when and where it should be, and with an authorized user); but where the item is being put to an improper or unexpected use (144). In this usage, an item may be both in a "displaced state" and an "anomalous state," but each term is exclusive of the other.

For active items (those which inherently rely on internal data processing, as discussed further above), an anomalous state may also refer to an internal operations state or pattern of internal operations state(s) which is other than that normally expected for the item.

As discussed throughout this document, criteria which define "normal" vs. "anomalous" for a given item may be established by an authorized user of an item, or by recordings of sensor data for the item during a designated training period, or by other means, or by a combination of means.

Authorized Users, Administrators, Borrowers, Owners and Users

Throughout this document, reference is made to the "authorized user" of an item and/or the authorized user of the BIRD associated with an item.

The authorized user of an item may be the actual, legal owner of the item. That is, the authorized user may be the person who purchased the item or received it as a gift, or otherwise came into legally and socially recognized possession of the item. The authorized user may also be referred to herein simply as the owner or the user of the item. Typically the authorized user is also the authorized user and owner of the associated BIRD (200).

In some cases, an authorized user may be a person to whom use of an item has been delegated by the item owner, or delegated by another authorized control person. In a family, for example, a parent may authorize use and possession of an item by a child. In some instances the owner delegates control to another authorized user who may be considered a borrower of the item particularly if the delegation of item control is temporary or limited in some other way.

In an organizational setting, some items may be owned or controlled by the organization or institution. In those cases, possession and control of an item may be delegated, to an authorized user, by an administrator who has formal control or responsibility for the item (100).

Throughout this document, reference is made to an item being owned, and its associated BIRD being configured, by the authorized user. It will be understood, however, that in some cases an item may be owned by someone other than the authorized user. Similarly, it will be understood that configuration, and some degree of command and control of a BIRD may be shared or divided between an authorized user and an owner or administrator. For example, an administrator may have some degree of remote access to BIRD data, and/or remote control of a BIRD even while the BIRD and associated item are in possession of an authorized user.

Compare with person, discussed below.

BIRD (Portable Item Reporting Device)

Various embodiments of a BIRD are discussed throughout this document. In brief, a BIRD is a processing device designed to be substantially collocated with an item and designed to self-assess a possibility that the item is extant, or in the alternative that the item is displaced (lost, misplaced, misappropriated, wandering, or stolen) or otherwise in an anomalous state.

BIRDed-Item

An item and BIRD in substantial and sustained collocation with each other, where the BIRD is functioning or functional and has been configured (or is being configured) for use with the item. See FIGS. 1A and 2F below for more information.

Device

In the appended claims, the term device is synonymous with a portable item reporting device or BIRD discussed in detail throughout this document. Because two or more BIRDs may be part of an item team, in the claims a BIRD may be referred to specifically as a "first device", while a second or additional BIRD in an item team is distinguished by referring to it as a "second device." Device may also, alternatively or additionally, be synonymous with an active-item BIRD (200.Act), or ABIRD (200.Act). The appropriate use of "device" will be apparent from context.

Displaced (Item States)

The present system and method is directed, in part, towards the self-assessment by an item as being in a displaced state, that is, a state where the item is for example lost, misplaced, misappropriated, wandering, or stolen. (The latter terms are defined further below in this document.) Put another way, a displaced item is not appropriately in the hands or under the control of an authorized user, and the item is not otherwise in some appropriate and safe place of storage or dormancy.

Other displaced states may be envisioned as well. The present system method may be applied as well to have a BIRDed-item self-identify or self-assess that it is in some other anomalous environment, condition, state, or usage, in addition to or in alternative to the displaced anomalous state of the item. In an embodiment, the present system and method may enable a BIRDed-item to self-determine with near certainty that it is in a displaced state or otherwise anomalous state. In an alternative embodiment, the present system and method may enable a BIRDed-item to self-determine a degree of probability that it is in a displaced state or otherwise anomalous state.

The use of the paired terms displaced/anomalous is an abbreviated way of indicating the following: In some embodiments, a BIRD is configured principally to determine that its associated item is displaced. In alternative embodiments, the BIRD may be configured to identify other states of anomalous item usage, in addition to or in alternative to the item being displaced. In either set of embodiments, the pertinent discussions in this document may be applicable.

Extant (Item State)

If an item is not lost, misplaced, misappropriated, wandering, or stolen, it is extant. Put another way, an extant item is either appropriately in the hands or under the control of an authorized user, or the item is otherwise in some appropriate and safe place of storage or dormancy. Another way of saying extant might be the word "present" or the phrase "the item is present when and where it is supposed to be, typically with the authorized user or otherwise in an expected storage or non-use location." However, the word "present" is used in other contexts in this document, so the term extant is used to avoid ambiguity.

At points throughout this document, distinctions are made between an item being in an extant/normal state on the one hand, or being in a displaced/anomalous state on the other hand.

The use of the paired terms extant/normal is an abbreviated way of indicating the following: In an embodiment, a BIRD is configured to identify its associated item as being extant. In alternative embodiments, the BIRD may be configured to identify other states of normal item usage, in addition to or in alternative to the item being extant. In either set of embodiments, the pertinent discussions in this document may be applicable.

Identity

The term identity is used in several related ways throughout this document.

(i) Identity generally relates either to the identity of a specific item or the identity of an authorized user or other person. The exact usage will be apparent from context.

(ii) Identity may refer to any of:

(a) the actual entity in question (an item, a person, etc.); or . . .

(b) a set of qualities or behaviors which may be used to characterize the entity (for an item, a distinctive physical property, code, mark, serial number, etc.; for a person, distinctive biometric signatures or usage signatures); or . . .

(c) parameters, data points, data structures, and similar mathematical representations used by the BIRD to represent its own identity, the identity of its associated item the identity of other items or other BIRDs or a person.

Again, the exact usage (entity, identifying qualities or behaviors, or parameters for identity) will be apparent from context. For example (and with reference to FIG. 1J, below), identity may refer to a set of biometric user identification parameters and iteMetric parameters for a BIRD. In an embodiment, a BIRD may be configured with different sets of identification parameters, each set being suitable for a different item and/or a different authorized user.

Item

See FIGS. 1A and 2F below for discussion, as well as other figures throughout this document.

Normal (Item State)

In one usage, and when referring to the state of an item normal is an umbrella term to describe an item which is in a condition (for example, a usage, a location, an internal state, or within or subject to an environment) which is expected for the item at a given point in time. In such a usage, a "normal item state" may be indicative that the item is extant (generally, that the item is where it should be, when it should be, and typically with an expected or authorized user); however, in this usage, a "normal item state" may also be indicative of other respects in which an item is in an environment, or is being put to use or subjected to conditions, which are those typically or conventionally expected for the item and for a given user of the item.

In an alternative usage, "normal" may refer to an item being in an expected state apart from or exclusive of being extant; that is, "normal" may refer to proper or anticipated item usage, apart from the particular location and/or user associated with the item. In this usage, an item may be both in an "extant state" and a "normal state," but each term is exclusive of the other.

For active items (items with inherent internal processing abilities, see FIGS. 13A-13C), a normal state (503.3) may also refer to an internal operations state which is normally expected for the item.

Person

In some cases, reference is made in this document to an item and its associated BIRD being in possession of a person. Person is a broader term than any of owner, authorized user, or borrower. Person is a generic term for any individual who has an item in-hand, or most recently had the item in-hand, whether or not that individual is an authorized user. A person may be, for example and without limitation:

- the item owner, administrator, or another authorized user such as a borrower;
- a thief who has stolen the item;
- an individual, often a family member, friend, or colleague of the owner, who accidentally takes or uses the item (the latter is referred to as misappropriating the item);
- a "good Samaritan," law enforcement officer, facility administrator, or similar person who has found a lost item and taken possession of the item, hopefully with the intent of restoring the item to an authorized user.

Portable Item Reporting Device

See "BIRD," above.

Possibility

Throughout this disclosure and in the appended claims, reference is made to a possibility that an item is lost, a possibility that the item is misplaced, a possibility that the item is stolen, and so on. Similar language is used with reference to possibilities of an item being in a normal or anomalous state. It is always possible that an item is in some particular state (extant, lost, misplaced, stolen, extant, etc.) no matter how small the likelihood. As used herein, however, possibility should be understood as synonymous with any of "notable possibility," "significant possibility," "substantial likelihood," or even "high likelihood."

The term possibility may also be operationally interpreted as meaning: The chance that an item is in a particular displaced state, such as one of being lost, misplaced, misappropriated, wandering, or stolen, is sufficiently high that it is appropriate to alert the authorized user that the item may not be where the user would expect the item to be.

Exact criteria for determining alert or notification thresholds may vary in different embodiments of the present system and method. Different levels of possibility—that is, different probabilities (or ranges of probabilities) that an item may be lost, misplaced, misappropriated, wandering, or stolen, or otherwise anomalous—may be associated with different anomaly alert levels (AALs), discussed further below.

In an embodiment, a BIRD may actually calculate numeric probabilities of an item being lost, misplaced, misappropriated, wandering, or stolen. In an alternative embodiment, the BIRD may not calculate probabilities but may instead rely on various trigger criteria, as designated by BIRD logic and/or usage expectations to determine when it is considered possible that an item is lost, misplaced, misappropriated, wandering, or stolen.

Self-Identification/Self-Assessment/Self-Initiated

Refers to the capability of a BIRD to identify the item it is associated with as being extant, borrowed, lost, misplaced, misappropriated, wandering, or stolen, or otherwise in a normal or anomalous state or environment, without any time-proximate, prior assessment by a human user or by some other third-party technology. For example, in an embodiment a BIRD is designed to determine that the item with which it is associated is lost, before the authorized user of the item may have even noticed the item is missing from his or her possession.

At points in this document it is indicated that it is the "item (100)" or the "BIRDed-item (102)" which self-Identifies or self-assesses as being extant (including borrowed), or displaced (lost, misplaced, misappropriated, wandering, or stolen), or as being otherwise normal/anomalous. Properly speaking, it is the BIRD which is associated with the item which makes the identification or assessment of the item as being extant/normal or displaced/anomalous. However, in expected use, the BIRD is, for a sustained period of time, substantially collocated with the item (for example, by attachment via a short tether, by some other mechanical coupling ensuring close physical proximity between BIRD and item, or by being integrated into the structure of the item). The BIRD and its associated item may be regarded, in operation, as a combined unit, referred to herein as a BIRDed-item. Therefore, it will be understand that when the BIRD identifies a state of its associated item as being extant or displaced, it is the BIRDed-item as a unitary entity which has effectively self-determined, self-identified, or self-assessed as being extant or displaced.

Similarly, this document speaks interchangeably of the BIRD as self-Initiating an alert signal or message, and the associated item as self-initiating the alert signal or message.

In summary: From the perspective of a user, a BIRDed-item may be considered as one unit for purposes of state self-assessment and signaling, even if the BIRD and the item are two physically separate elements which are tethered or otherwise mechanically coupled in substantial and sustained collocation. In some cases, as discussed further throughout this document, the BIRD and item may be physically integrated into one unit (this includes but is not limited to active items (100.Act)); for such integrated items, it is in fact the integrated item/BIRD which self-assesses item state and self-initiates signaling and messaging.

FIG. 1A

Exemplary Items and BIRDs

Item:

An item is generally a portable physical object, device, package, or container, typically though not always meant to be carried on the person of, and/or moved along by, an owner or authorized user. A very wide range of physical objects may be considered to be items, as discussed further below.

Portable:

In an embodiment, the BIRD system discussed herein is used in association with physical items which are generally carried about on or by a person, or are readily transportable by a person, and so are therefore portable. Typical examples, however, might include keys, a wallet, a purse, eye glasses, a backpack, briefcases and luggage, various utility and entertainment items, children's toys, cell phones, notebook computers, and similar. Additional examples are provided below. (See for example FIGS. 1A, 1G, 2F, 13A, 13C, 14A-14I, 15B, 16A, 17A-17D, 17F-17H, and other figures throughout this document.)

Some elements of the present system and method may be applicable as well to larger items, for example, transport vehicles. See FIG. 17H, below, for a discussion of distinctions between transport vehicles (100.Tr) viewed as items (100), versus personally-scaled items (100.psi).

Living Entities:

In an embodiment, an item may also be a living entity which is capable of getting itself lost, or can be stolen or kidnapped, but is not capable of self-identifying itself as being lost, stolen, or wandering. Such living entities may include, for example, children (especially but not exclusively small children), adult persons of diminished mental capacity, and pets. (No disrespect is intended, nor any disregard for the dignity or value of life is implied, by referring to living entities by a term ("item") which normally designates lifeless entities; it is simply for brevity and convenience that the term "item" is employed throughout this document.) A BIRD (200) associated with a living entity may help prevent the wandering or loss of such an entity from a rightful and appropriate guardian.

In general, however, in this document, and unless otherwise noted, it may be assumed that a BIRD (200) is typically designed and configured for use with items which are non-living. In an embodiment, there may be significant design differences between a BIRD (200) intended for reporting on a non-living item as compared with a BIRD (200) intended for reporting on a living entity. For example, a BIRD (200) specifically intended for reporting on a living entity may be specifically designed and configured to be attached or couple to the living entity in ways which are suitable for personal attachment, are physically comfortable, and are unobtrusive. Other design differences between BIRDs (200) for living entities versus BIRDs (200) for non-living items, including types, configuration, and arrangements of sensors (210) and other operational BIRD components, may be desirable as well.

Exemplary Items

Physical things, entities, items, objects, and devices, and also various carrying devices and containers such as purses, briefcases, backpacks, or luggage, are generally referred to in this document as items (100). FIG. 1A illustrates exemplary items and objects (100) which may be associated with exemplary portable item reporting devices (BIRDs) (200).

Figure 1A:
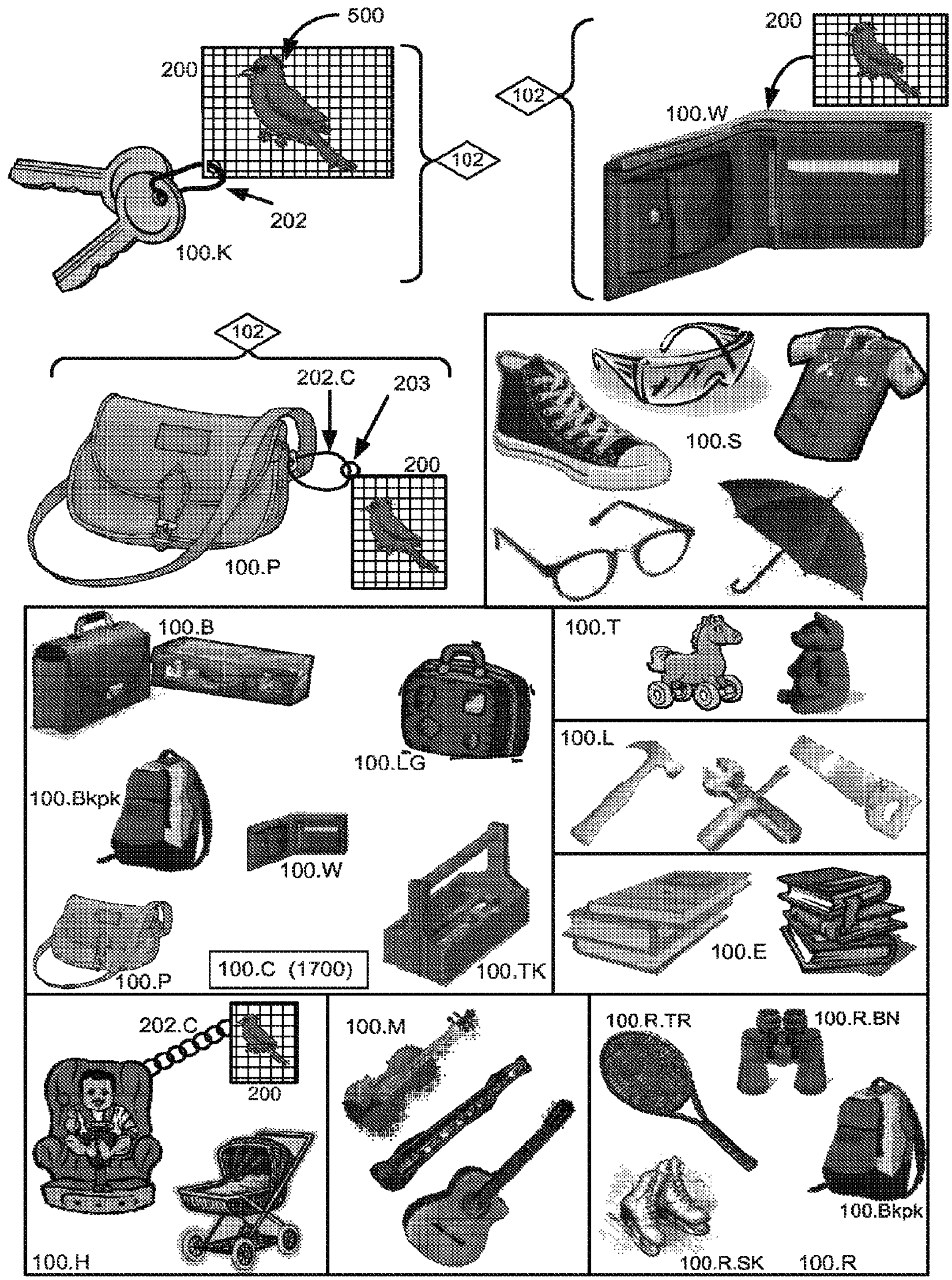
FIG. 1A is an illustration of exemplary items and objects which may be associated with portable item reporting devices (BIRDs).

FIG. 1A illustrates a variety of exemplary items (100), for example and without limitation:

- keys (100.K);
- a wallet (100.W);
- a purse (100.P);
- carrying items (100.C) (also labeled "1700" elsewhere in this document), which may include, for example and without limitation: purses (100.P) and wallets (100.W) (since wallets carry credit cards and other items); and which also includes briefcases (100.B), backpacks (100.Bkpk), valises (100.LG) and luggage (100.LG), and toolkits (100.TK);
- tools (100.L);
- child carriers and carriages (100.H);
- musical instruments (100.M);
- recreational items (100.R) such as backpacks (100.Bkpk), binoculars (100.R.BN), and sporting goods (for example, a tennis racquet (100.R.TR) or skates (100.R.SK));
- personal accessories (100.S) such as glasses, umbrellas, and shoes, even clothing such as shirts, jewelry (not shown), and towels (not shown);
- reading matter (100.E) such as books and reference manuals; and
- children's' toys (100.T).

It will be noted that the classifications of items illustrated in the figure is for convenience only, and other classification schemes may be used. Further, some items may fall under more than one classification; for example, a backpack is both a carrying item (100.C) and a recreational item (100.R).

These items (100), and also many broadly similar items (100) not illustrated, typically share the feature of being portable or readily mobile with a person, that is, readily carried by persons or persons, or moved along by a person (as with a baby carriage (100.H), etc.). The items (100) shown are exemplary only, and the applications of the present system and method are not limited to these items. The present system and method may be used with virtually any items (100) which are portable and potentially lost (503.0.1), misplaced (503.0.2), misappropriated (503.0.3), wandering (503.0.5), or stolen (503.0.4), or otherwise subject to anomalous usage (503.2).

In addition, the present system and method has applications to substantially larger items (100) which, while not typically carried by hand or on-person, are also mobile and may also be lost (503.0.1), misplaced (503.0.2), misappropriated (503.0.3), wandering (503.0.5), or stolen (503.0.4), or otherwise put to anomalous use (503.2). Such applications may include, for example and without limitation, applications with cars, motorcycles, and other forms of transportation.

FIG. 1A also illustrates a tether (202) between items (100) and an exemplary BIRD (200) (representatively illustrated by a rectangle filled with cross-hatching and a bird symbol). (An exemplary internal architecture of a BIRD (200) is discussed in conjunction with FIGS. 2A-2C and FIG. 13B, below, and in other figures and discussions throughout this document.)

BIRD/Item Mechanical Linkage or Tethering

A BIRD (200) may be connected or coupled with an item (100) by a mechanical connection, such as via a BIRD-item link or BIRD-item connector (202), also referred to as a tether (202), formed of metal wire, a cable, a string, a plastic or polymer, or similar connecting material or combinations of the above. The tether (202) may or may not be flexible. The BIRD-item mechanical link (202) may take the form of a chain (202.C). A BIRD (200) may also have a ring (203) or other connecting element, such as a clasp (203) or clamp (203), to which a tether (202) may be attached to facilitate mechanical connection with an item (100). In an embodiment, the tether has two ends and is attached at a first end to the device housing (250) (sec FIG. 2D), and can be attached at a second end to the item (100). In some instances the tether (202) may provide additional functionality as well or item support as well. For example, in FIG. 1A it is seen that the key chain connecting keys (100.K) to each other also serves as the tether (202) with the BIRD (200). In an embodiment (and while not shown in the figure), a ring, clasp, or clamp (203), or similar, may be used to closely and/or rigidly couple the item (100) and the BIRD (200), such that the BIRDed-item (102) is effectively one structural unit.

BIRD/Item Clamp or Clip

In an alternative embodiment, rather than a flexible or extended tether per se, the connecting element may be a clamp, clip, or similar device (not illustrated) which firmly or rigidly attaches the BIRD (200) to the item (100), possibly maintaining the BIRD (200) in direct surface context with the item (100). An advantage of such an arrangement is that any motion of the BIRD (200) may be more precisely indicative of motion of the rigidly connected item (100), as compared with the case for a loose or flexible tether. Similarly, any change of orientation of the BIRD (200) detected by an orientation sensor (210.N) will directly indicate a change of orientation of the rigidly connected item (100). Another advantage is that sensors (210) of the BIRD (200), such as a camera (210.C) or surface pressure sensor (210.SP), or other contact sensors (210), may more readily determine any loss of contact between the BIRD (200) and the rigidly clamped item (100). For some items (100), however, it may still be more practical or convenient to connect the BIRD (200) and item (100) via a flexible tether.

'Tether' Broad Usage Herein

For simplicity of exposition herein, any mechanical connecting element between the BIRD (200) and the item (100), whether a flexible, extended tether, or a rigid clamp or clip or similar, will be referred to herein as the tether (202).

Coupling Element

The ring (203) or other connecting element, possibly but not necessarily along with the BIRD-item connector (202), may also be referred to as a coupling element. While the ring (203) or other connecting element will generally be structurally part of the BIRD (200), a BIRD-item connector (202) may be part of the BIRD (200) or may in some instances be supplied by a user of the BIRD (200).

BIRD Contained Inside of Item

In use, coupling elements (203, 202) of the BIRD (200) are not always required to maintain practical mechanical connection between the BIRD (200) and an item (100). For example, the BIRD (200) may be placed by the user inside the item (100), as for example if the BIRD (200) is placed inside of a purse (100.P) or wallet (100.W) or other container-type of item (100.C). If the BIRD (200) is contained within the item (100), then this containment maintains, in an operational sense, the necessary substantial and sustained collocation between the BIRD (200) and the item (100). However, establishing a mechanical connection may still be advantageous to the user, for example to prevent or discourage a thief from readily removing the BIRD (200) from a purse (100.P), or to prevent the BIRD (200) from accidentally spilling out of the purse (100.P).

Substantial and Sustained Collocation of BIRD and Item

The coupling element(s) (203, 202) are configured to support and maintain a substantial and sustained mechanical linkage between the BIRD (200) and the item (100), such that in use, the BIRD (200) and the item (100) are substantially collocated which is sustained over an extended time.

In practical terms, substantial collocation typically means maintaining close physical proximity or a short distance between the BIRD (200) and the item (100). Substantial collocation may mean the BIRD (200) and the item (100) are in contact with each other or virtually next to each other, as for example a BIRD (200) which is attached to the keychain for a set of keys (100.K). The BIRD (200) may also be inside the item (100), as for example if the BIRD (200) is placed inside of a purse (100.P) or wallet (100.W).

In other instances, substantial collocation may involve distances of up to several centimeters or inches. In some cases, mechanical separations of up to a few feet or yards may even be acceptable. For example, a BIRD (200) may be attached to, or part of, the handgrip on a dog's leash (100). If the dog (presumed to be on the leash (100)) manages to run away from an owner, taking the leash (100) with it, the BIRD (200) is still in sufficient, substantial and sustained collocation with the dog to: (i) self-assess that the dog is not where it should be, or is not "in use" as expected"; (ii) alert the owner that the dog has run away (if the owner has not noticed) and (iii) to identify the location of the errant dog. It will be noted, however, that a BIRD (200) may also be attached to or integrated directly into a pet's collar (100) as well.

(It will be further noted, parenthetically, that usage expectations (600) for a dog leash or dog collar, for a dog which is normally leashed, may be configured to indicate that that if the dog is running faster than the owner would ever run, there is anomalous usage of the collar or leash, though likely a happy dog as well. Usage expectations (600) are discussed further throughout this document.)

BIRD/Item Link Integrity

In an alternative embodiment, the BIRD-item link and link elements (202, 202.C, 203) may itself be electrically or optically active, as for example with an electrically conducting wire or a fiber optic cable actively sourced with LED or laser light. The BIRD (200) may be configured to determine whether the BIRD-item link (202, 202.C, 203) is intact or broken by determining a change in electrical or optical conductivity of the BIRD-item link (202, 203, 202.C). In this way, the BIRD (200) may determine if the mechanical connection between itself and the item (100) has been broken. Other means may be employed as well in terms of the structure or design of the link (202, 203, 202.C), and in terms of the connection to the BIRD (200), to determined if a linkage (202, 203, 202.C) is maintained between the BIRD (200) and the item (100).

The detection of the integrity of the link (202, 203, 202.C) can help prevent both accidental separation of the BIRD (200) from the item (100); and also inhibit or provide an alarm warning in the event of deliberate separation, as might be attempted by a person stealing the item (100). The detection of the integrity of the link (202, 203, 202.C) may be performed in whole or in part by an item link integrity module (224) of the BIRD (200), discussed further below.

In an alternative embodiment, separate means may be used to maintain the physical connection of the BIRD (200) with the item (100), and to determine the proximity of the BIRD (200) to the item (100). For example, a mechanical link (202, 203, 202.C) may be employed to maintain the physical connection, as described above. However, a passive or active RFID tag (not shown in FIG. 1A) may be placed on the item (100) or embedded in the item (100), and the BIRD (200) may periodically "ping" the RFID tag to determine if the item (100) is still in close proximity to the BIRD (200).

In some cases, such as with a wallet (100.W), a BIRD (200) may be suitably sized and shaped to simply slip inside the wallet (100.W), and so remain with the wallet. Other means of mechanically coupling a BIRD (200) with an item (100) may be employed as well, so that the BIRD (200) remains in substantial and sustained collocation with item (100) when the item (100) itself is moved, is in motion, or is otherwise in-use.

Note on BIRD Illustration in This Document

It should be noted that a BIRD (200) is typically expected to be used when mechanically coupled with, linked to, embedded within, or integrated into an item (100), that is, when the BIRD (200) is in substantial and sustained collocation with its associated item (100). However, in this document, for simplicity of illustration, BIRDs (200) are only sometimes illustrated as being coupled with or in proximity to an associated item (100). Even in a figure of a BIRD (200) without an associated item (100), it should still be understood that in operation a BIRD (200) is generally associated with, and usually in substantial and sustained collocation with, an item (100).

BIRD Linkage to Different Items

In an alternative embodiment, a BIRD (200) may be physically coupled, at different times, to different items (100). Since different items (100) may have different expected uses (144) and/or different expected environmental conditions (144) associated with their extant/normal states (503.1, 503.3), the BIRD (200) may be configurable for or programmable with different usage expectations (600) for different items. A user of the BIRD (200) may be able to select which item (100) is attached to the BIRD (200) at a given time, or the BIRD (200) may be programmed to use various of its sensors (discussed further below) to determine which item (100) is attached at a given time.

However, in an alternative embodiment, it may also be the case that, for some applications, a BIRD (200) may be employed without an associated or linked item (100).

BIRDed-Item

At some points in this document, an item (100) and its associated BIRD (200), in combination, are specifically referred to as a BIRDed-item (102), and are represented by a diamond-shaped icon. It will be understood that a BIRDed-item (102) refers to an item (100) for which its associated BIRD (200) is substantially collocated with the item, and the item (100) and BIRD (200) are suitably tethered or otherwise physically configured to maintain their substantial collocation.

The terms or phrases (i) BIRDed-Item (102), a (ii) BIRD (200) and its associated item (100), or an (iii) item (100) and its associated BIRD (200), are generally synonymous throughout this document. The only qualification is that a BIRDed-item (102) always refers to the BIRD (200) and item (100) as being in substantial and sustained collocation. However, at points in this document, there are some discussions of situations where an item (100) and its associated BIRD (200) are in fact separated (as for example by a thief who forcefully separates the two). Usage of these terms and phrases will be apparent from context.

At some points throughout this document, items (100) are simply referred to as items, and association with a BIRD (200) is implied by context.

Passive Items and Active Items

The items (100) shown in FIG. 1 are generally passive items (100.Pass), meaning that in typical or common design they usually do not have sensors, processors, or other electronics. Active items (100.Act), which inherently have processing capabilities, and possibly sensors, are discussed further below in this document (see FIGS. 13A-13C, 15A, and other figures throughout this document). Such active items (100.Act) include cell phones. PDAs, and personal computers.

A BIRDed-item (102) may be a passive item (100.Pass) physically linked to an associated BIRD (200) or with an integrated BIRD (200); or an active item (100.Act) with an associated external-active-item-BIRD (200.Act.E) (discussed further below); or an active item (100.Act) with an integrated, internal-active-item-BIRD (200.Act.I) (discussed further below). When a BIRDed-item (102) is specifically includes an active item (100.Act), the combination will be referred to with the reference numbers "102.Act"; see FIGS. 13A-13C below for further discussion.

See FIGS. 13A, 14F-14H and associated text for some additional exemplary items (100). See also FIG. 15B, and Figs. XYZW for further item examples.

Symbolic Representations in this Document of BIRD Logic, BIRD Navigation, and BIRD Song A bird image (a Robyn) is used at points in this document to symbolize the overall BIRD logic (500), which is the aggregate of general algorithms employed by a BIRD (200) to distinguish an item (100) which is extant/normal (503.1/503.3) from an item which is displaced/anomalous (503.0/503.2).

A sextant (an old-style navigational tool) image is used to symbolize BIRD Navigation (1000), that is, methods and algorithms associated with enabling a BIRD (200) to identify usage expectations (600). Usage expectations (600) represent when and where an item (100) should be found (and/or how the item should be in use) in normal usage.

Musical notes on a staff are used to symbolize BIRD song (900), that is, methods and algorithms associated with enabling a BIRD (200) to signal, message, and otherwise respond to displaced/anomalous item states (503.0/503.2).

The use in the figures of these different symbols—a Robyn, a sextant, or musical notes—should not be construed as suggesting different types of BIRDs, nor necessarily different embodiments of BIRDs. Rather, the symbols are used to suggest that the figure and the associated discussion may be focused on a particular aspect of exemplary BIRD activity (BIRD logic (500), BIRD Navigation (1000), or BIRD song (900)).

Where the discussion has a more generalized focus, or may have focus on more than one of these elements, the Robyn is the default symbol.

See FIGS. 4A-4D for a further overview of BIRD logic (500), BIRD Navigation (1000), and BIRD song (900). Sec FIGS. 5A-5I and other figures throughout this document for further discussion of BIRD logic (500). See FIGS. 1B, 1C, 1P, 6A-6F and other figures throughout this document for a further discussion of the usage expectations (600) associated with BIRD navigation (1000). BIRD song (900) and BIRD navigation (1000) are discussed further in conjunction with figures throughout this document.

Figure 1B:
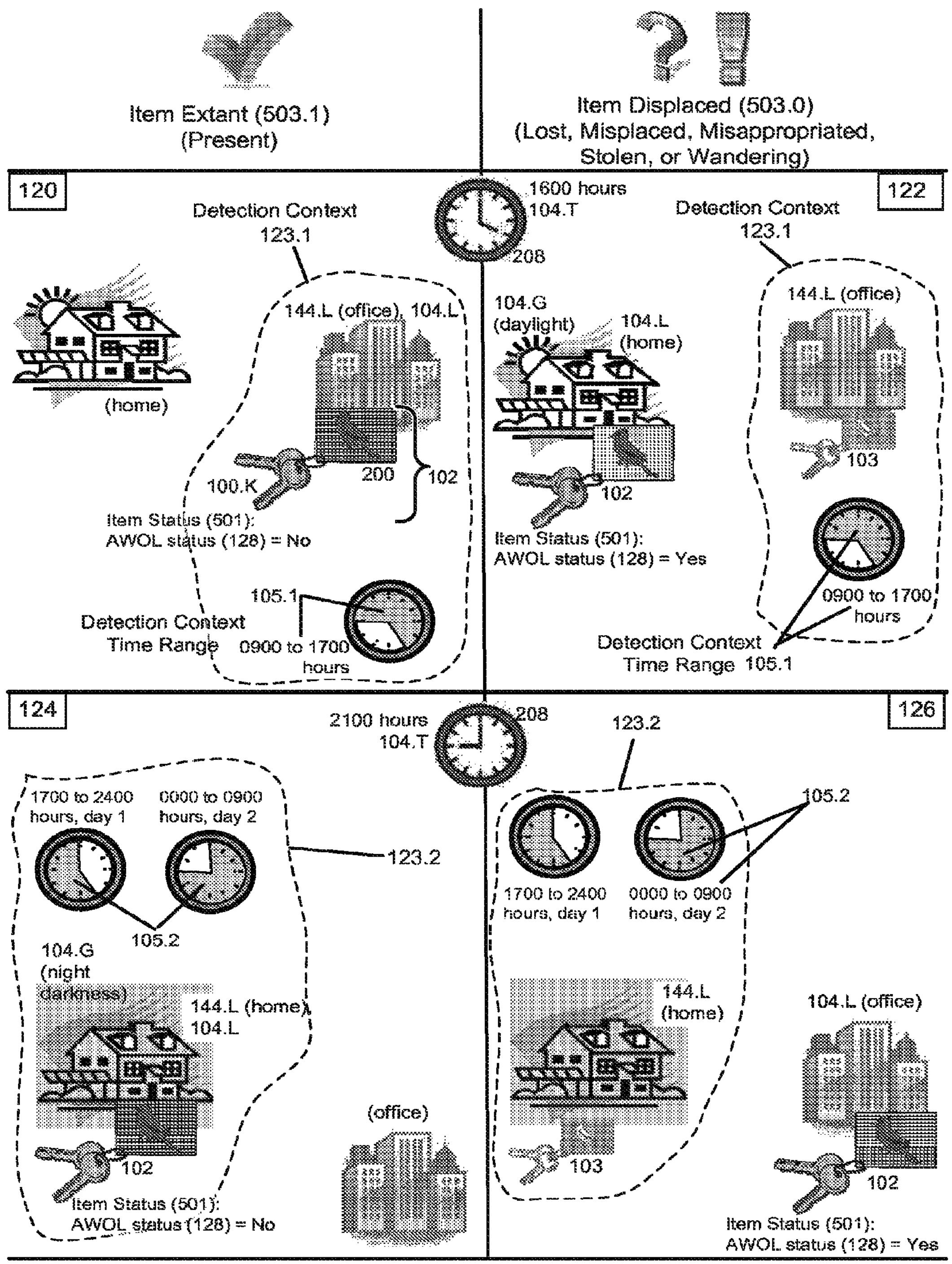
FIG. 1B illustrates an exemplary method by which an item with an associated BIRD may self-assess as possibly being extant or displaced to an embodiment of the present system and method.
Figure 1C:
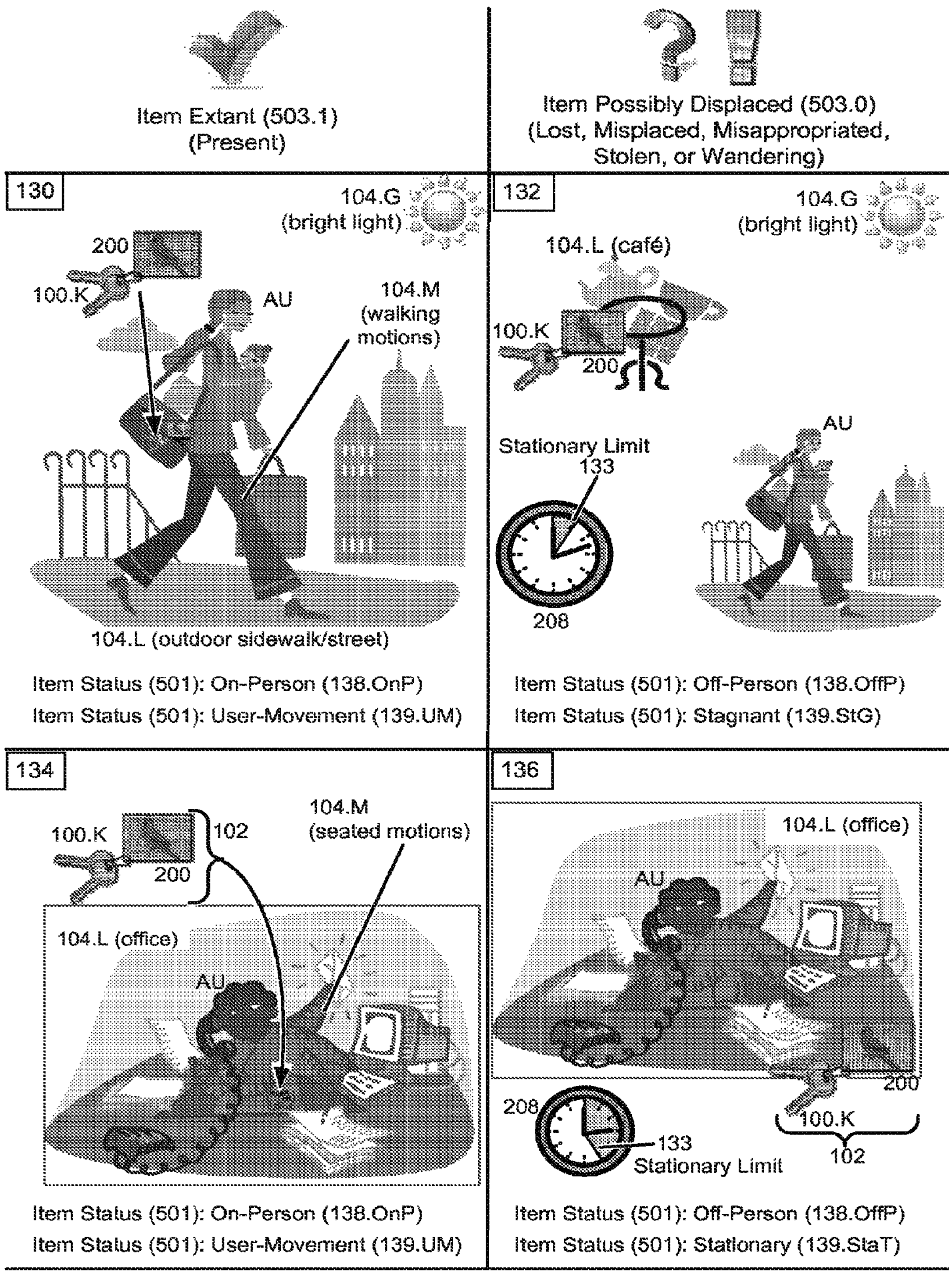
FIG. 1C illustrates exemplary methods by which an item with an associated BIRD may self-assess as possibly being extant or displaced according to an embodiment of the present system and method.

FIGS. 1B and 1C

Exemplary BIRD Field Operations and Environments

FIGS. 1B-1C illustrate several exemplary embodiments of how a BIRDed-item (102) may self-assess that it is either extant (503.1) (in an embodiment, that the item is present when and where it's expected to be; in alternative embodiments, additional or alternative factors may be taken into account, such as the BIRDed-item (102) being with an authorized user (AU)); or on the other hand that the item (100) may be displaced (503.0) (lost (503.0.1), misplaced (503.0.2), misappropriated (503.0.3), wandering (503.0.5), or stolen (503.0.4)).

FIG. 1B

Exemplary Location-Related Assessments

Detection Contexts and Usage Expectations

In an embodiment, and as elements associated with BIRD logic (500), a BIRD (200) may store and employ one or more data structures, data listings, data sets or similar referred to as detection contexts (123) and usage expectations (600). Both detection contexts (123) and usage expectations (600) are discussed extensively throughout this document; a preliminary discussion is presented here.

In an embodiment, a BIRD (200) has an internal clock/timer/calendar (208) as well as a location sensor (210.L) (both discussed further below). In an embodiment, a specified time frame (105) for sensing the environment (104) around an item (100) (and impinging on the item (100)) may be referred to as a detection context (123). The time frame (105) may be a specified range of minutes, hours, days, or even longer or shorter periods of time, and may be repetitive or otherwise repeating. A time frame (105) may be referred to equivalently as a time range (105), or by similar terminology. For example, a first detection context may specify "week days," while a second detection context may specify "weekends." For another example, more fine-grained detection contexts may be employed to specify "week days, daytime," "week day evenings," "weekend days," and "weekend evenings."

In an embodiment, more fine-grained time distinctions—for example, hours within a day, or daytime vs. evening portions of a day—may be a parameter of the usage expectations (600), discussed further below.

In an embodiment, the detection context (123) may also contain an indication of an expected location (144.L) where environmental sensing by the BIRD (200) will take place or is expected to take place. In an alternative embodiment, expected locations (144.L) for the item (100) are instead considered elements of the item's usage expectations (600), discussed further below.

In an alternative embodiment, expected locations (144.L) may be elements of both one or more detection contexts (123) and also of associated usage expectations (600).

The allocation of locations may be based in part on hierarchical considerations. For example, an element or parameter of the detection context (123) may include specifying a relatively larger geographic domain (a country, a state, a metropolitan area)—referred to below as a daily life location (140.DL)—where sensing is expected to take place. Contained within a daily life location (140.DL) may be relatively smaller, more localized areas, regions and zones (140.Z)—and also commuting routes (140.CR), some buildings or other contained home base areas (140.HB), and zones (140.Z) within buildings—which may be elements of the usage expectations (600).

Detection contexts (123) are discussed further below, in conjunction with FIGS. 1P, 6F, 10B and other figures throughout this document.

Expected Environments and Expected Usage:

An expected location (144.L) is one element of an overall expected environment (144) for an item (100). Expectations (144) for an item's environment or usage may be based on, for example and without limitation: an historical recording of past item usage (100), or expectations as specified by an authorized user of the item (100). Expected environments (144) and expected item usage (144) may be part of an authorized user's ExD criteria (170) for an item (100) (discussed further below, see for example FIG. 4A), and are formalized in the usage expectations (600).

Location Usage Expectations

In the exemplary embodiment shown in FIG. 1B, the BIRD (200) is configured with, programmed with, or has learned or been trained with specific location usage expectations (600.Loc) for its associated item, in this case, keys (100.K). Location usage expectations (600.Loc) are one element, among others, of general usage expectations (600), which indicate that during and throughout some specified time frame (105) a BIRDed-item (102) is expected to be subject to some kind of specified environment.

In an embodiment, if the BIRDed-item (102) has an actual location (104.L) which is within some specified, expected location(s) (144.L) during the specified times (105)—and assuming no other competing parameters are programmed into the BIRD—then BIRD logic (500) is configured to determine that the BIRDed-item (102) is extant (503.1). If the BIRDed-item (102) self-assesses as being outside the specified, expected location(s) (144.L) during the specified times (105), the BIRDed-item (102) self-assesses that it may be lost (503.0.1), misplaced (503.0.2), misappropriated (503.0.3), wandering (503.0.5), or stolen (503.0.4)—in other words, that the item (100) is displaced (503.0). The current time (104.T) is identified in the figure via clocks, which may be the BIRD's internal clock/timer/calendar (208).

Exemplary Application

In the present exemplary instance, the BIRDed-item (102) may be configured via detection context(s) (123) and/or its location usage expectations (600.Loc) to expect that during the time range (105.1) of 0900 hours to 1700 hours, the keys (100.K) will be in a designated, expected office location (144.L). This characterizes a first detection context (123.1), as illustrated in panels 120 and 122 of FIG. 1B.

Note that the keys (100.K) and BIRD (200) are not an element of the detection context (123.1) itself. The detection context is rather the expected time range (105), possibly along with the associated, expected location (144.L) for the keys (100.K); or possibly the expected time range (105), along with a broader expected location (144.L) (not illustrated) which includes the specific expected location (144.L) of the office.

During the time ranges (105.2) of 1700 hours to 2400 hours, and again from 0000 to 0900 hours on a next consecutive day ("day 1" and "day 2", respectively), the BIRDed-item (102) may be configured to expect that the keys (100.K) will be at a designated home location (144.L). In an embodiment, this defines a second detection context (123.2) as illustrated in panels 124 and 126. (Note again that the BIRDed-item (102) itself is not an element of the detection context (123.2); only the expected time frame (105) and possibly the expected location (144.L) are elements of the detection context.)

Item Extant:

In panel 120, at the time of 1600 hours the location sensor (210.L) of the BIRD (200) determines that the keys (100.K) are at the expected office location (144.L), which is also its current location environment (104.L). Since this is the expected location (144.L) for this time frame (105), the BIRD (200) determines that the item (100.K) is extant (503.1).

Item Displaced:

In panel 122, at the current time (104.T) of 1600 hours the location sensor (210.L) of the BIRD (200) determines that the item (100.K) is currently at the home location (104.L), which is again its current environment (104) at that time. Since this is not the expected location (144.L) for this time frame—the BIRDed-item (102) should be at the office (144.L), as suggested by the faded, "ghostly" keys/BIRD (103) in the figure—the BIRD (200) determines that the keys (100.K) are displaced (503.0).

The BIRD (200), with additional usage expectations (600), may determine that the item (100.K) is specifically misplaced (503.0.2) (and not, for example, lost (503.0.1) or stolen (503.0.4)), since it has apparently been left at home. If the item's current location (104.L) were elsewhere, then depending on the particular location (104.L) and possibly other factors, the BIRD (200) may make a determination that the keys (100.K) may be lost (503.0.1) or stolen (503.0.4).

Item Extant:

In panel 124, at the current time (104.T) of 2100 hours the location sensor (210.L) of the BIRD (200) determines that the item (100.K) is at the home location (104.L). Since this is also the expected location (144.L) for this time frame, the BIRD (200) determines that the item (100.K) is extant (503.1).

Item Displaced:

In panel 126, at the current time (104.T) of 2100 hours the location sensor (210.L) of the BIRD (200) determines that the item (100.K) is currently at the office location (104.L). Since this is not the expected location (144.L) for this time frame—the BIRDed-item (102) should be at home, as again suggested by the faded keys/BIRD (103) in the figure—the BIRD (200) determines that the item (100.K) is displaced (503.0).

The BIRD (200), with additional usage expectations, may determine that the item (100.K) is most likely misplaced (and not, for example, lost or stolen), since it has apparently been left at the office. If the item's current location (104.L) were elsewhere, then depending on the location and possibly other factors, the BIRD (200) may make a determination that the item (100.K) may be lost (503.0.1) or stolen (503.0.4).

Absent Without Leave (AWOL) Condition

When, as illustrated in panels 122 and 126 of FIG. 1B, an item (100) is:

(i) expected to be at a particular, fairly specific location at a particular time—typically a home base location (140.HB)—and . . .

(ii) the item is not at that location, then . . .

. . . the item (100) is in a condition in which it is considered to be Absent Without Leave (128), or AWOL (128).

This document refers equivalently to: (i) an item (100) being AWOL (128); the item is AWOL (128); or (iii) the item has an AWOL status (128)=Yes.

If an item (100) is not AWOL—meaning the item is within an expected location (144.L) during an expected time frame (105)—this document refers equivalently to the item (100) having an AWOL status (128)=No.

In an embodiment, AWOL status (128) is not applicable to large, generalized geographic areas, such as daily life locations (140.DL). Rather, AWOL status (128) is applicable to more specific, expected locations (144.L)—for example, the authorized user's home, office, or a frequently used recreational facility—which may be referred to as home base locations (140.HB). Both home base locations (140.HB) and the AWOL status (128) are discussed further below, in greater detail, in conjunction with FIG. 1H.

In an alternative embodiment, AWOL status (128) may be applicable to some or all daily life locations (140.DL) as well.

In FIG. 1B, in both of panels 122 and 126, the item's condition as being AWOL (128) is consistent with the item's state (503) as likely being displaced (503.0). It will be noted that, while an item's being AWOL (128) is generally indicative of the item (100) being in some state of being displaced (503.0) (for example, being misplaced or lost), an AWOL status (128) is not the only condition that can trigger a displaced state (503.0). Other conditions which lead the BIRDed-item (102) to self-assess a displaced state (503.0) are discussed throughout this document. Moreover, an item (100) may be not AWOL—that is, the item (100) is at an expected location (144.L), during a time frame (105) it should be at that location—and still, due to other actual environmental or actual usage conditions (700.U), the BIRDed-item (102) may self-assess as displaced (503.0).

Environment and Environmental

The term environment, as used herein, is in some respects generally consistent with conventional usage, but in embodiments usage of the term environment may be broader in some ways.

The environment (104) of a BIRDed-item (102) includes actual environmental phenomena, environmental conditions, or environmental features (104) which are characteristics of, elements-of, energies emanating from, or properties of the physical setting or context surrounding an item or impinging on an item. The label "104," as used in this document, may reference any of an item's general, actual environment taken as a whole (a room, for example, within which the item (100) resides, possibly along with the person in the room who currently has the item (100) on person); and/or the aggregate of environmental forces or energies actually impinging on the item (100) at any given time.

General environmental conditions (104.G) may include, for example and without limitation: the ambient visual elements and the ambient light level surrounding the item (suggested in FIG. 1B by sunlight or the dark of evening, and again in FIG. 1C (below) by the sunlight); ambient sounds and the ambient sound level; the ambient humidity; ambient temperature; measures (intensity, frequency, etc.) of electromagnetic phenomena impinging on the item; chemicals in the environment; surface pressure on the item; ambient radiation; air pressure surrounding the item; and other properties of the physical setting.

Location: Environment (104), as used herein, may be somewhat broadened over conventional usage in that the actual location (104.L) of an item may be considered an aspect of the item's environment. Locations (104.L) shown in FIGS. 1B and 1C include a home, an office building, an outdoor pedestrian walking area, and a cafe (suggested by the cafe table of FIG. 1C, below). As discussed further below, an item's actual location (104.L) at any given time may be, or may not be, the same as the expected item location(s) (140) for that item and at that time.

Time: Environment (104), as used herein, may also include the current time (104.T), which may be ascertained by the BIRD (200) via its internal clock/timer/calendar (208).

Motion: Environment (104), as used herein, also includes aspects of an item's condition which may be relative or relational to the environment. For example, an item's motion (104.M) may not be conventionally considered an element of the item's environment (but rather a property or state of the item (100) itself). However, as used herein, environment (104) would also include the BIRDed-item's state of motion (104.M). This is because (as described further throughout this document), an item's motion (104.M) may sometimes be employed to help determine if the item (100) is displaced (503.0) (lost, misplaced, misappropriated, wandering, or stolen), or otherwise in an anomalous state (503.2). Further, since many items (100) are not self-propelled, an item's motion (104.M) (if any) is typically imposed on it by an external agent, often a person who is carrying, using, or otherwise transporting the item (100). As such, the item's "environment" is broadened to include changes in the state or condition of the item (100) which may result from the motion of a user or other environmental factors (such as vehicular transport).

Motion (104.M) is suggested in FIG. 1C (below) by the walking movements, and likely other body movements, of the user carrying the keys (100.K) in her purse in panel 130; and the user with keys in pocket, and engaged in seated body movements, in panel 134.

Environment (104), as used herein, may also include physiological features or states of persons in proximity to the item (100), particularly if those physiological features or states may be determined by either of: (i) the sensors (210) of the BIRDed item (102); or (ii) a data transmission from a physiological sensor on the person which can detect the person's physiological features or states.

The term environmental, as used for example in the phrase "environmental sensor," refers to measurable aspects or properties of the environment (104) surrounding, impinging upon, or influencing an item (100) or its associated BIRD (200). Environmental may also refer to measures of the environmental condition of the item (100) which result from environmental factors, or to measures of those conditions. For example, a motion sensor (210.M) is an environmental sensor (210) which measures the velocity, acceleration, and/or torque of an item.

FIG. 1C

Exemplary Motion-Related and Light-Related Assessments

In an embodiment, a BIRD (200) is configured or programmed with usage expectations (600) for its associated item (100) which are in alternative to, or in addition to, the usage expectations (600.Loc) based on expected location (144.L). Such usage expectations (600) may include, in exemplary embodiments, expectations for movement (104.M) of the item (100) or an amount of illumination (104.G) impinging on the item (100).

Motion Usage Expectations

In an embodiment, a BIRD (200) has a motion sensor (210.M) (discussed further below in conjunction with FIG. 2A and other figures throughout this document). In an embodiment, the BIRD's motion sensor (210.M) can detect walking or running (104.M) by the user, and is also sufficiently sensitive to detect the smaller body movements (104.M) which people naturally make even when sitting or standing.

In an exemplary application, a set of keys (100.K) may generally be carried by an authorized user (AU) during the user's waking hours or work hours. The user may configure the BIRD (200) with usage expectations (600) indicating that he or she will never set the keys (100.K) down for more than a specified number of minutes during routine waking or work hours. A determination of whether the keys (100.K) are extant (503.1) or displaced (503.0) may depend, in whole or in part, on motion detections by the BIRD (200). For a BIRDed-item (102) to self-assess as either extant (503.1) or displaced (503.0), and possibly in a particular state of being displaced (503.0), may require some distinctions among motion states.

On-Person/Off-Person

The BIRD (200) may use motion data to determine if its associated item (100) is being carried, held, or is otherwise on the person of some individual. This may be referred to as the on-person/off-person status (138) of the item (100). In an embodiment, when a person is in physical possession of an item (100), this may be detected by personal motions (104.M)

that people make, including walking and running motions. Even when a person is standing or sitting, the individual generally does not remain perfectly motionless for any substantial length of time; people shift in place as they sit or stand. In addition, personal motions (104.M) may include movement of the item (100) when the item is in hand (or in some instances, worn or used on the person's head). In an embodiment, a BIRD (200) processes data (700) from the motion sensor (210.M) to identify item motions (104.M) associated with an item (100) being on-person (138.OnP); or to identify a lack of such personal motions (104.M), which may indicate that the item (100) is off-person (138.OffP).

References to an item have a status of on-person (138.OnP) typically mean the item (100) is being carried about by some person (for example, in hand or in pocket, or in a purse, worn on a wrist or around the neck, etc.). Note that "on-person" does not indicate whether the person is an authorized user (AU); it may be unknown, or to-be-determined by the BIRD (200), whether the person possessing the BIRDed-item (102) is an authorized user (AU), or on the other hand the person is a thief or some other unauthorized user (UU) (who may have misappropriated the item (100)).

Alternative On-Person/Off-Person Determinations:

In an alternative embodiment, a BIRD (200) may employ additional sensor data (700), and/or alternative sensor data (700), to determine if an item (100) is on-person (138.OnP) or off-person (138.OffP). For example, a wallet (100.W) may be subject to pressure when carried in a person's pocket, and so a surface pressure sensor (210.5P) may detect such pressure. Any item which is carried close to a person's skin (for example, a wallet in pocket, or jewelry) may be in proximity to body heat; such heat can be detected by a BIRD's temperature sensor (210.T). Some items (100) may normally or conventionally be carried about outside of a pocket or other personal container; if such an item has one or more cameras (210.C), the cameras may be used to search the environment for the face of a user. Other BIRD sensing means may be employed as well to make a determination if the item (100) is on-person (138.OnP) or off-person (138.OffP).

Personal Motion, and Stationary Items vs. Stagnant Items

An item may have a motion status (139). An item (100) which is subject to personal motion (104.M) has a motion status (139) of user-movement (139.UM).

An item (100) is stationary (139.Stat) when it is off-person (138.OffP), and so not engaged in any personal motion (104.M). Often this means this item (100) is, in fact, completely still; that is, the item is without any motion whatsoever. For example, the item may be on a table or in a drawer, where the item is not subject to any motion at all (unless, for example, the table is being moved or the drawer is being opened).

For purpose of this document, however, an item (100) may also be considered stationary (139.Stat) if it is subject to other kinds of motion but the item (100) is not subject to personal motion (104.M). For example, an item (100) which has been left behind (typically by accident) on public transportation (bus, train, car, airline, etc) may be in motion with the public transport, but the item is still classified, for BIRD purposes, as stationary (139.Stat) since it is off-person (138.OffP).

An item (100) is stagnant (139.StG) if it continuously stationary (139.Stat) (off-Person (138.OffP)) for more than some allowed amount of time, referred to as the stationary limit (133). This typically means the item is not subject to personal motions (104.M) for more than the designated, allowed period of time (133).

It is common that, in normal use, an authorized user (AU) may set down an item (100) for a period of time. Keys (100.K), wallets (100.W), purses (100.P), and cell phones (100.Act.CP) are all routinely set down at various times, even when substantially in use. (For example, a user making a purchase at a store may momentarily set their wallet (100.W) down on a counter. A purse (100.P) may be set down on a table for substantially longer periods of time.) As part of the usage expectations (600) for an item, a BIRD (200) may be configured with parameters indicating the stationary limit (133), that is, a maximum amount of time that an item (100) may be set down before being considered stagnant (139.StG).

Stagnancy as Context-Dependent:

In an embodiment, the stationary limit (133), that is, the duration in time which is indicative of an item becoming stagnant (139.StG), may vary depending on detection context (123). For example, a purse (100.P) may normally be set down on a table or similar surface the entire time it is at home. An appropriate stationary limit (133), at home, before the purse (100.P) is considered stagnant (139.StG) may be eight or ten hours, or even longer. At an office or other place of employment, on the other hand, the same purse (100.P) may be assigned, by the authorized user (AU), a stationary limit (133) (time before the item is considered stagnant (139.StG)) of no more than, say, one hour. While shopping or running other errands, the user-configured stationary limit (133) may be, at most, a few minutes.

Stationary vs. Stagnant:

In summary, an item which is not subject to user-imposed movements, but has been still (or only subject to non-personal motions, such as transportation motions) for less than the allowed time interval—that is, less than the stationary limit (133)—is simply stationary (139.StaT). An item which remains stationary (139.Stat), or is only subject to non-personal motions (transportation motions, etc.), for more than the stationary limit (133) is further considered stagnant (139.StG). If an item is stagnant (139.StG), that may be a partial indicator that the item is lost (503.0.1) or misplaced (503.0.2) (as discussed further below).

Combined Personal Motion Status and On-Person/Off-Person Status:

In an embodiment, personal motion status (139) and on-person/off-person status (138) may be combined into a single, integrated personal motion status (139). That is, the on-person/off-person status (138) may be fully subsumed by, or indicated by, the personal motion status (139). In such an embodiment, a personal motion status (139) of user-movement (139.UM) is also indicative of a status of on-person (138.OnP). Similarly, in such an embodiment, a personal motion status of either stationary (139.StaT) or stagnant (139.StG) are both indicative of a status (138) of off-person (138.OffP).

Exemplary Application of Motion Detection

Panel 130:

In panel 130 of FIG. 1C, the authorized user (AU) is in an outdoor, street environment (104.L). Such an environment may be part of a much larger expected location (144.L)—for example a daily life location (140.DL) such as an entire city or larger metropolitan area—where the authorized user (AU) routinely goes about her business. In such wide-ranging daily life locations (140.DL)—unlike more localized home base locations (140.HB)—any definable detection contexts (123) may be very broad in geographic scope, and so they may be less than optimally useful in identifying an item (100) as extant (503.1) or displaced (503.0). In such daily life locations (140.HB), then, motion statuses (139) may be of particular value for a BIRDed-item (102) to self-assess if it is extant (503.1) or displaced (503.0). (See FIG. 1H below regarding daily life (140.DL) vs. home base (140.HB) locations; see FIG. 1B above regarding detection contexts (123).)

In panel 130 (as well as in the associated panel 132 discussed below) the keys (100.K) may be within the appropriate detection context (123) (that is, an overall daily life location (140.DL), such as a city) whether they are with the authorized user (AU) walking on the sidewalk, or are left behind at a nearby café. However, the motion sensor (210.M) of the BIRD (200) may determine that the keys (100.K), which are carried in the authorized user's handbag, are in personal motion (104.M) consistent with being carried on-person (138.OnP) of an authorized user (AU) who is walking through the environment (104); and also consistent with a formal status of user-movement (139.UM). In an embodiment, since this is an expected motion status (139) and on-person status (138) of the item (100.K), the BIRD (200) determines that the item (100.K) is extant (503.1).

Panel 132:

In panel 132 of FIG. 1C, the authorized user (AU) is again walking along the sidewalk, but she has left her keys (100.K) behind on a table at a nearby cafe. (So in panel 132, it is the table and the surrounding cafe which is the BIRDed-item's environment (104), while the space through which the authorized user (AU) is currently walking is not the BIRDed-item's environment (104).) The stationary limit (133) for the keys (100.K) is five minutes, as established in the BIRD's usage expectations (600), and as monitored by the BIRD's clock/timer (208). The motion sensor (210.M) of the BIRD (200) determines that the keys (100.K) are stationary (139.Stat), and have been stationary (139.Stat) for more than five minutes (for about 12 minutes, in the figure). Therefore, the keys (100.K) are not only off-person (138.OffP), but further the keys (100.K) are stagnant (139.StG). Since this is not the expected motion status (139)—in an embodiment, an item (100) should never be stagnant (139.StG)—the BIRD (200) determines that the item (100.K) is displaced (503.0).

Panel 134:

In panel 134 of FIG. 1C, the authorized user (AU) is in an office environment (104.L). Such an environment is typical of a home base location (140.HB), in being: relatively compact geographically; a location that the authorized user (AU) visits on a routine basis (and possibly a well-scheduled basis); and a location where the authorized user (AU) may likely feel it safe to leave and/or store various personal items (100). If an item (100) is left behind in a home base location (140.HB), and so is present in the office location when it should not be, the BIRD (200) may determine that the item is displaced (503.0). This is a scenario already discussed above in conjunction with FIG. 1B.

However, even during times when an item, such as keys (100.K), are supposed to be in the office, the keys (100.K) may still become displaced (503.0)—for example, misplaced (503.0.2), misappropriated (503.0.3), or even stolen (503.0.4). The motion sensor (210.M) of the BIRD (200) may self-assess if the BIRDed-item (102) is in an appropriate on-person/off-person status (138), and/or an appropriate motion status (139). In this way, the BIRDed-item (102) may self-assess as being extant (503.1) or displaced (503.0).

In panel 134, the BIRD (200) determines that the keys (100.K) are in personal motion (104.M) consistent with being in the pocket of a very busy, active user at a desk, and so of course must be on-person (138.OnP), and be assigned a status (139) of having user-movement (139.UM). Since—as specified in usage expectations (600)—this is are expected statuses for the keys (100.K) in the office, the BIRD (200) self-assesses that it and its associated keys (100.K) are extant (503.1).

Panel 136:

In panel 136, the environment (104.L) is again the office. Here, however, the keys (100.K) are no longer in the authorized user's pocket, but rather are lying on edge of the desk. The stationary limit (133) for the keys (100.K) is twenty-five minutes, as established in the BIRD's usage expectations (600), and as monitored by the BIRD's clock/timer (208).

The motion sensor (210.M) of the BIRD (200) determines that the keys (100.K) are stationary (139.StaT). Since the keys (100.K) are therefore off-person (138.OffP)—which is not normally the expected on-person/off-person status (138) for this item (100) in this context—the BIRD's clock/timer (208) initiates a count of the amount of time that the item has been stationary (139.Stat).

The stationary limit (133) may be seen to be about twenty-five minutes, but the amount of time the keys (100.K) have been stationary (139.Stat) may be seen to be about fifteen minutes. Since this is still within the stationary limit (133), the BIRD (200) does not yet self-assess itself and the keys (100.K) as being displaced (503.0); the item is still considered extant (503.1).

However (in a scenario not illustrated), once the timer (208) reaches the stationary limit (133) of twenty-five minutes, the keys (100.K) would be determined to be stagnant (139.StG). In this instance, the BIRDed-item (102) may then emit a local signal indicating its state as displaced (503.0). If the authorized user (AU) meant to place his keys on the desk, and wants them there, he can deactivate the signal on the BIRD (200) and leave the keys (100.K) where they are. On the other hand, if the authorized user (AU) actually meant to put his keys back in his pocket, he is now constructively reminded to do so.

It may be observed that if the keys (100.K) are on the desk, and the authorized user (AU) remains present in the office, the keys (100.K) cannot really be viewed as being lost (503.0.1) or misplaced (503.0.2), or generally as being displaced (503.0). However, it is a practical fact of life that the longer the keys (100.K) or similar items (100) are left lying about (especially when the authorized user (AU) normally keeps the items (100) in pocket), the greater the risk that the items (100) may be forgotten, covered over with papers, etc. In other words, the more time elapses, the great the risk of the keys becoming displaced (503.0).

In an embodiment, the BIRD (200) may self-assess its associated item as being at risk of being displaced (503.0). In that event, the BIRD (200) may present suitable warnings or alerts (372) to the authorized user (AU). In an embodiment, a BIRD (200) may employ multiple stationary limits (133). For example, a first, shorter time limit (133) may trigger a self-assessment that the item (100) is at risk of being displaced (503.0); a second, longer time limit may trigger a self-assessment that the item (100) is now to be considered displaced (503.0).

See FIGS. 16A and 16B for further discussion of item diversion risk assessment and anticipation.

Container Items and Other Items Set Down During Transit

Some items—especially but not exclusively purses (100.P), briefcases (100.B), and more generally container items (100.C)—may be off-Person (138.OffP) but still subject to transportation motions, while still being under the control of the authorized user (AU). For example, purses (100.P) and briefcases (100.B) are typically "set down" on a seat or elsewhere in a car while the authorized user (AU) is driving to various destinations. In an embodiment, BIRD logic (500) (discussed below throughout this document) may employ suitable refinements to adapt for expected transportation motions, and expected durations of such transportations motions, when establishing logic for such containers items (100.C) and other items (100) which may be deliberately set off-Person (138.OffP) by an authorized user (AU) during transit.

Light Exposure Usage Expectations

Again with reference to FIG. 1C, an authorized user (AU) of the keys (100.K) or (other some other item, such as a wallet (100.W)) may know that she will normally keep the item (100) in her pocket or purse, and so shielded from ambient light most of the time. The BIRD's optical sensor (210.Opt) (discussed further below) may be configured to determine if the item (100) is exposed to light for more than some specified, allowed amount of time (a light exposure limit, not labeled in the figure, but again, for example, five minutes).

In FIG. 1C, when the keys (100.K) are taken out of pocket or out of a purse (100.P), the coupled BIRD (200) is out of pocket as well, since the two are tethered. As long as the keys (100.K) remains exposed to little or no light—and assuming no other potentially competing usage expectations (600) indicate otherwise—then the BIRD (200) is configured to determine that the item (100) is extant (503.1) (in pocket or in purse). If the BIRD (200) determines that the item (100) is exposed to light for less than the light exposure limit, no alert condition is triggered. However, if the BIRD (200) makes a determination that the item (100) has been exposed to light for longer than the light exposure limit (for example, longer than five minutes)—an indication, for example, that the item (100) may have been left behind on a table—then the BIRD (200) signals that the item (100) may be displaced (503.0).

In panel 130, the light sensor (210.Opt) of the BIRD (200) determines that the keys (100.K), which are in the purse (100.P) of an authorized user (AU), are exposed to little or no light. Since this is an expected illumination state for the keys (100.K), the BIRD (200) determines that the keys (100.K) are extant (503.1).

In panel 132, the light sensor (210.Opt) of the BIRD (200) determines that the keys (100.K) have been exposed to daylight for at least five continuous minutes—for example, the keys have been left behind on a table at a cafe. Since this is not the expected illumination status, the BIRD (200) determines that the keys (100.K) are displaced (503.0).

In panel 134, the light sensor (210.Opt) of the BIRD (200) determines that the keys (100.K), which are in the authorized user's shirt pocket, are exposed to little or no light. Since this is an expected illumination status of the keys (100.K), the BIRD (200) determines that the keys (100.K) are extant (503.1).

In panel 136, the light sensor (210.Opt) of the BIRD (200) may determine that the keys (100.K) are exposed to room light (from a light source, not illustrated), and have been exposed to illumination for longer than the light exposure limit (for example, twenty five minutes)—for example, the keys (100.K) have been left sitting on the edge of the desk for more than twenty-five minutes. Since this is not the expected state of illumination for the keys (100.K), the BIRD (200) determines that the item (100.K) is displaced (503.0). In this instance, the BIRD (200) may emit a local signal indicating its state as displaced (503.0). If the authorized user (AU) meant to place his keys (100.K) on the desk, and wants them there, he can deactivate the signal on the BIRD (200) and leave the keys (100.K) where they are. On the other hand, if the authorized user (AU) actually meant to put his keys (100.K) back in his pocket, he is now constructively reminded to do so.

Combinations as Status Elements as Determinants of Item State (Extant or Displaced)

In discussions above, in conjunction with FIGS. 1B and 1C, various exemplary item statuses (501)—location status, motion status, or light status—have been employed in exemplary embodiments of methods to determine if an item (100) is extant (503.1) or is displaced (503.0). In practice, a BIRDed-item (102) may be configured to employ multiple aspects of item status (501)—location, motion, light exposure, sound exposure, temperature, and other aspects of the item's assessment of its environment—in order to self-assess its state (503) as extant (503.1) or displaced (503.0).

In practice, employing more than one environmental factor, and so more than one item status (501), may result in assessments of item state (extant (503.1) or displaced) which are both more reliable and more detailed than that obtained through analysis of just one item status (501) alone. The additional detail may come, for example, in the form of determining whether an extant item (100) is with a primary authorized user (AU) or with a borrower; or whether a displaced item (100) is lost (503.0.1), misplaced (503.0.2), stolen (503.0.4), misappropriated (503.0.3), or wandering (503.0.5). Specific method embodiments employing multiple item statuses (501) (location, motion, and other factors) are presented throughout this document. See for example FIGS. 5A through 5H and other figures throughout this document.

FIG. 1D

ExD Criteria, Usage Expectations, and Exemplary BIRD Field Configuration

The exemplary criteria discussed above, and similar criteria for distinguishing an item which is extant (503.1) from an item which may be displaced (503.0) (lost, misplaced, misappropriated, wandering, or stolen), may be referred to as ExD criteria (170). ExD criteria (170) may also include other criteria indicative of other normal states (503.3) or anomalous states (503.2), in addition to or in the alternative to being extant (503.1) or displaced (503.0) (lost, misplaced, misappropriated, wandering, or stolen).

ExD criteria (170) reflect item usage as it might be expressed in plain language by an authorized human owner or user of an item. ExD criteria (170) may also reflect item usage as might be indicated by an authorized user (AU) via selections of choices readily made via a dialog box on a graphical user interface, or similar. So for example, an authorized user (AU) might describe their typical usage of an item (when extant (503.1) and/or in normal use) in terms of locations (144.L) where the item (100) is typically used, how the user moves about with item, expected light exposure, expected sound exposure, and similar criteria.

ExD criteria (170) can also be understood in terms of general characteristics of an authorized user (AU) and a user's environment which can impact or influence BIRD sensors (210). For example, different people walk and move in different ways (different average speeds, different gait, etc.), which can be detected by a BIRD's motions sensor (210.M) and distinguished by a suitably programmed and configured BIRD microprocessor (204) (discussed further below).

Internal to a BIRD (200), ExD criteria (170) must be represented by suitable mathematical or logical representations, referred to as usage expectations (600), which in an embodiment are both item-specific and user-specific. (Usage expectations (600) are discussed in detail in FIGS. 6A-6F and in conjunction with other figures throughout this document). During field operation with an item (100), BIRD logic (500)

may process data received from one or more sensors, such as the location sensor (210.L), the motion sensor (210.M), the optical sensor (210.Opt), and/or other sensors.

The sensor data (700) and processed sensor data (700.P), referred to in aggregation as usage data (700.U) (discussed in detail starting in FIGS. 7A-7B and in conjunction with other figures throughout this document), is processed and interpreted by the BIRD logic (500) in combination with the usage expectations (600).

Figure 1D:
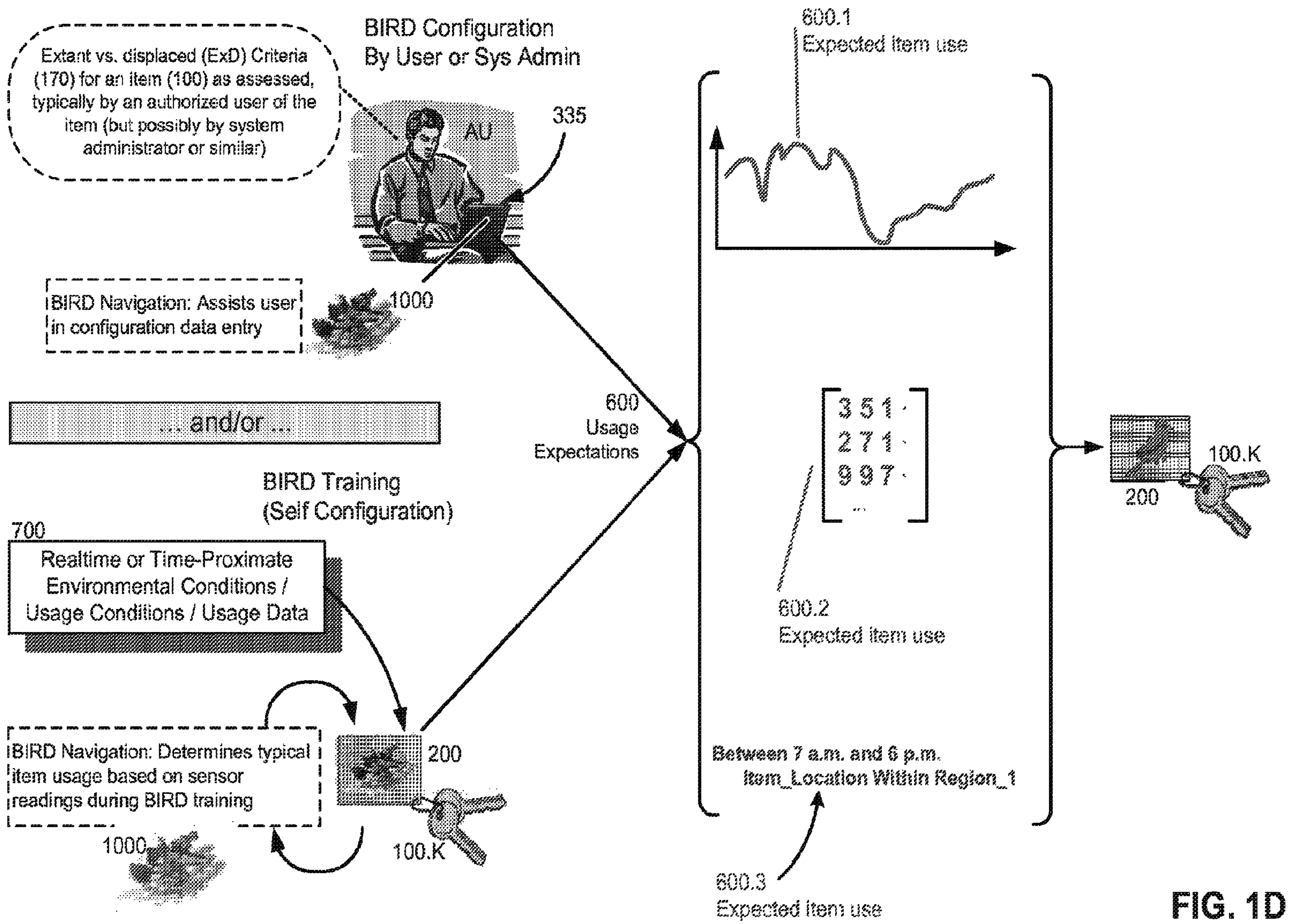
FIG. 1D illustrates exemplary methods by a BIRD may be configured with usage expectations to help assess if the item associated with the BIRD may be possibly extant or displaced according to an embodiment of the present system and method.

In an embodiment, and as illustrated in FIG. 1D, ExD criteria (170) as assessed by the authorized user (AU) may be input by the authorized user (AU). The user (AU) may enter BIRD configuration data into the BIRD (200) via a configuration computer (335) (discussed further below in conjunction with FIG. 3). In an embodiment, the configuration computer (335) or the BIRD (200) itself are configured with suitable interface algorithms or processing (1000), such as dialog boxes, calendars, maps, or data entry wizards, to guide the authorized user's input of ExD criteria (170). Such processing (1000), referred to as BIRD Navigation (1000), and illustrated in the figure as a sextant, may also assist in translating the user's data entry into formal usage expectations (600).

In an alternative embodiment, the ExD criteria (170) may be determined in whole or part by the BIRD (200) itself during one or more training sessions or configuration time periods. During the training periods, an authorized user (AU) (not shown) uses the item (for example, her keys (100.K) in her purse) in ways designed to train the BIRD (200) to distinguish normal item usage from anomalous item usage (503.2). In this case, on-board BIRD Navigation (1000)—possibly augmented at points by BIRD logic (500) on a configuration computer (335)—uses the sensor data (700) collected during the training period to determine normal (503.3) vs. anomalous (503.2) item usage, that is, ExD criteria (170).

Whether a BIRD (200) is configured by direct user configuration, by training, by other means, or by a combination of the above, an output of the configuration process is a mathematical and/or logical representation of the ExD criteria (170) as usage expectations (600). Three exemplary forms of usage expectations (600) are illustrated in FIG. 1D.

- A wave function (600.1) may represent, for example, item movement, item location, item light exposure, item sound exposure, or other data captured by sensors (210) of the BIRD (200). A wave function (600.1) may also represent processed versions (700.P) of one or more other wave functions which are drawn directly from sensor data (700). For example a wave function (600.1) may be a Fourier transform, Laplace transform, wavelet representation, or similar representation of another wave function. A wave function (600.1) may also represent a combination or synthesis of two or more other wave functions, as for example a convolution of two functions.
- Matrix representations (600.2) may similarly be used to capture, integrate, summarize, or otherwise represent many kinds of numerical data.
- A logical relationship (600.3) may also be used to indicate normal or expected usage of the item (100). In the alternative, these and other forms of usage expectations (600) may be used to represent displaced (503.0) or other anomalous (503.2) conditions of the item (100).

These three forms of usage expectations (600)—wave functions (600.1), matrix representations (600.2), and logical relationships (600.3)—are exemplary only. Persons skilled in the relevant arts will recognize that many forms of mathematical, logical, functional, or symbolic representations may be used to represent expected or anticipated behaviors of an item (100), and/or to represent the expected or anticipated sensor data (700) associated with expected/anticipated item behaviors. All such representations fall within the scope and spirit of the present teachings, system, and method.

FIG. 1E

Exemplary BIRD Field Operation for "Extant" State

Figure 1E:
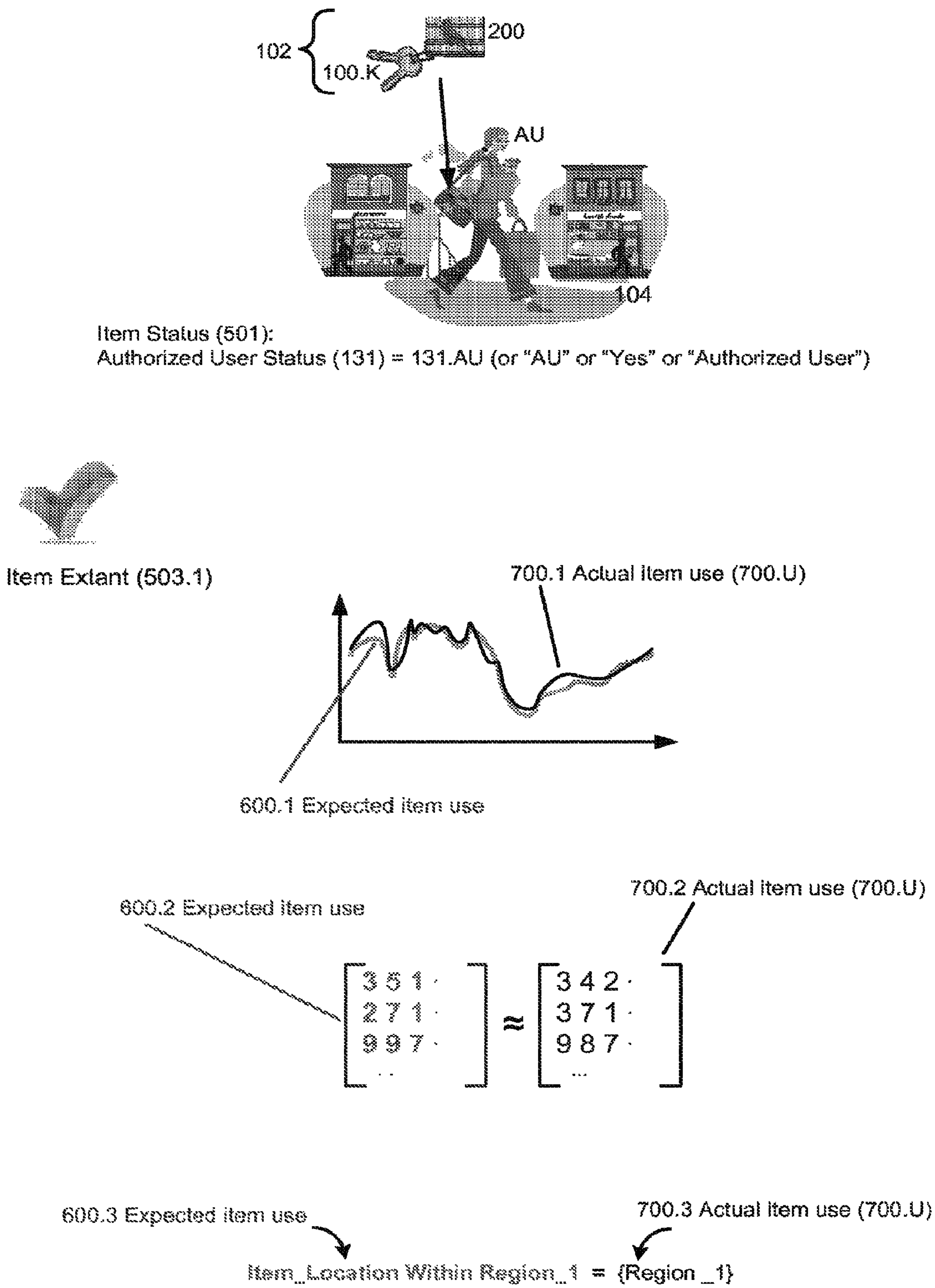
FIG. 1E illustrates exemplary methods by which an item with an associated BIRD may self-assess as possibly being extant according to an embodiment of the present system and method.

FIG. 1E illustrates, according to an embodiment, general operating principles of the present system and method. An authorized user (AU) goes about her normal business with an item, her keys (100.K), in her possession, in appropriate places at appropriate times. The keys (100.K) have an associated BIRD (200) tethered or other connected so as to be in substantial and sustained collocation with the keys (100.K). The BIRD (200) maintains a real-time record of its environment as captured in the form of sensor data (700) using its sensors (210). The BIRD (200) has stored, in its memory (206) (discussed further below in conjunction with FIG. 2A and other figures), both general BIRD logic (500) and the usage expectations (600) appropriate for the authorized user (AU) and the item (100.K) linked to the BIRD (200).

Sensor data (700.R) is recorded in real time, and a suitable history of the sensor data (700.H) is maintained in the memory (206) of the BIRD (200). As appropriate for purposes of processing, the BIRD (200) may represent and/or process the sensor data (700) into a variety of processed representations (700.P), such as a waveform (700.4), a matrix or other data structure (700.5), or summary forms of data (700.6). The real-time sensor data (700.R), the historical sensor data (700.H), and the processed sensor data (700.P) are referred to collectively (that is, as a total, aggregate set of data elements) as usage data (700.U).

In an embodiment, usage data (700.U) is compared against the usage expectations (600). In various embodiments, different elements of usage data (700.U) (that is, different sets or subsets of real-time data (700.R), historical data (700.H), and/or processed data (700.P)) may be employed for comparison at various points in time. In an embodiment, the usage data (700.U) used for comparison purposes is any or all of real-time sensor data (700.R), historical data (700.H), and/or processed data (700.P). If the usage data (700.U) is acceptably close to the usage expectations (600) for the item (100)/authorized user (AU), the BIRD (200) determines that the item (100) is extant (503.1) or otherwise in a non-anomalous state. This is illustrated in FIG. 1E via:

- two plots (600.1, 700.1) which are substantially similar to each other (compare with plots 600.4, 700.4 in FIG. 1F, below);
- two matrices (600.2, 700.2) which have only a few small differences in data values (compare with matrices 600.5, 700.5 in FIG. 1F, below); and
- a summary real-time location value (700.3) which matches the summary location value in a usage expectation (600.3) (compare with 600.6, 700.6 in FIG. 1F, below).

In practical operations, it must be specified just how "acceptably close" the usage data (700.U) must be to the usage expectations (600). This may be specified in whole or in part in the BIRD logic (500), in the usage expectations (600) themselves, in other BIRD (200) configuration parameters, or in a combination of all three. Algorithms in support of these determinations are discussed further below throughout this document.

In an embodiment, an item (100) may be associated with an authorized user (AU). When so associated, the item (100) has an authorized user status (131) which may have exemplary values of "131.AU," "AU," "Yes," or "Authorized user (AU)." In an embodiment, a BIRD (200) may determine whether or not an item (100) is associated with an authorized user (AU) via iteMetrics (154). See FIG. 1J, below, and other figures throughout this document, for further discussion.

FIG. 1F

Exemplary BIRD Field Operation for "Displaced" State

FIG. 1F illustrates, according to an embodiment, general operating principles of the present system and method. At times an item (100) may be lost (503.0.1), misplaced (503.0.2), misappropriated (503.0.3), wandering (503.0.5), or stolen (503.0.4), that is, displaced (503.0). In the figure, an unauthorized user (UU) is in possession of an item, keys (100.K), meaning the keys are either misappropriated (503.0.3) or stolen (503.0.4). Various features of the BIRD (200), discussed further below, are designed to increase the likelihood that the BIRD (200) remains physically tethered to its associated item (100) (and therefore in substantial and sustained collocation with the item (100)), and also that the BIRD (200) remains powered on and operational, even when the item (100) is stolen (503.0.4).

The BIRD (200) maintains a real-time monitor of environmental sensor data (700) using its sensors (210). The BIRD (200) has stored, in its memory (206) (discussed further below in conjunction with FIG. 2 and other figures), both general BIRD logic (500) and the usage expectations (600) appropriate for an authorized user (AU) and the item (100.K) linked to the BIRD (200). (See FIG. 1E, discussed above).

Sensor data (700.R) is recorded in real time, and a suitable history of the sensor data (700.H) is maintained in the memory (206) of the BIRD (200). As appropriate for purposes of processing, the BIRD (200) may represent and or process the sensor data (700) into a variety of representations, such as a waveform (700.4), a matrix or other data structure (700.5), or summary forms of data (700.6).

In an embodiment, usage data (700.U) is compared with the usage expectations (600). In various embodiments, different elements of usage data (700.U) (that is, different sets or subsets of real-time data (700.R), historical data (700.H), and/or processed data (700.P)) may be employed for comparison at various points in time. In an embodiment, the usage data (700.U) used for comparison purposes is any or all of real-time sensor data (700.R), historical data (700.H), and processed data (700.P).

If the sensor data (700) varies from the usage expectations (600) for the item (100)/authorized user (AU) (AU, see FIG. 1E) beyond some specified threshold, the BIRD (200) determines that the item (100) may be displaced (503.0) or otherwise in an anomalous (503.2) state. The variation threshold for determining a displaced state (503.0) or anomalous state (503.2) may be specified in whole or in part in the BIRD logic (500), in the usage expectations (600), or in a combination of both.

That the sensor data (700) varies significantly from the usage expectations (600)—in this case with a relatively dramatic variation—is illustrated in FIG. 1F via two plots (600.4, 700.4) which are visibly very different from each other; two matrices (600.5, 700.5) which have a large differences in data values; and a summary real-time location value (700.6) which does not match the summary location value in a usage expectation (600.6). Algorithms in support of these determinations are discussed further below throughout this document.

In an embodiment, an item (100) may be associated with an unauthorized user (UU). When so associated, the item (100) has an authorized user status (131) which may have exemplary values of "131.UU," "UU," "No," or "Unauthorized user (UU)." In an embodiment, a BIRD (200) may determine whether or not an item (100) is associated with an authorized user (AU) via iteMetrics (154). See FIG. 1J, below, and other figures throughout this document, for further discussion.

FIG. 1G

Shared BIRD Usage Expectations for Different Users and Items

In an embodiment, a BIRD's usage expectations (600) may be shared, in whole or in part, among different authorized users (AU) and/or different items (100).

Single BIRD with Multiple, Separate BIRD Identities for Different Users

Figure 1G:
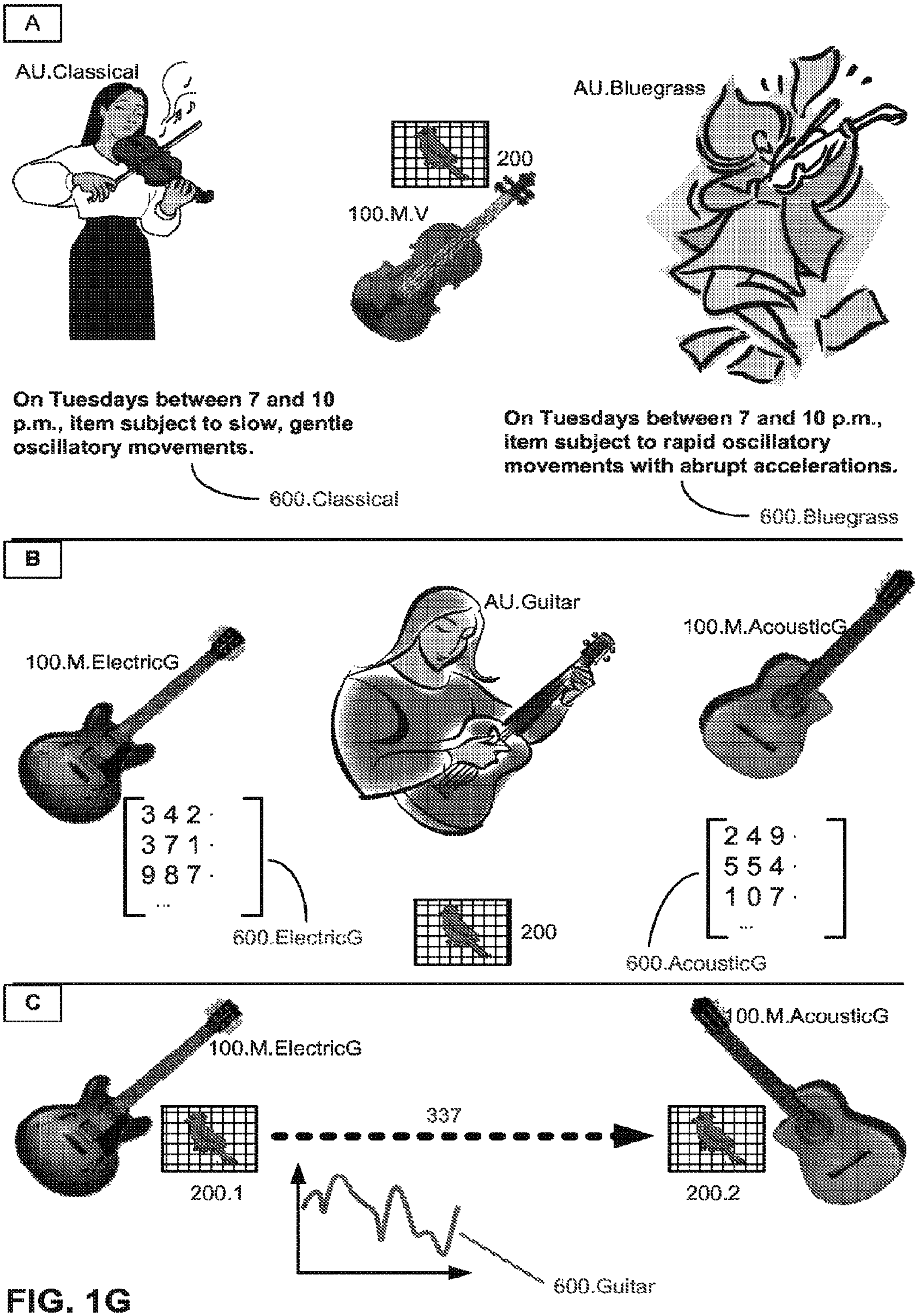
FIG. 1G illustrates how shared usage expectations may apply in whole or in part to different authorized users and/or different items.

In an embodiment, a BIRD (200) which is associated with a single item (100) may be configured with usage expectations (600) suitable for different users of the same item. Panel A of FIG. 1G illustrates an exemplary musical instrument, in this case a violin (100.M.V), which is used by two different exemplary family members, authorized user 1 (AU.Classical) who is an aficionado of classical music and authorized user 2 (AU.Bluegrass) who likes to jam it up bluegrass style. The instrument (100.M.V) has an exemplary associated BIRD (200). In addition to having different musical styles and tastes, the two family members (AU.Classical, AU.Bluegrass) may have distinctly different personal usage habits when carrying about the violin (100.M.V).

For example, each family members (AU.Classical, AU.Bluegrass) may play the violin (100.M.V) in different venues at different locations (144.L). As such, expected location (144.L) is one parameter for the usage expectations (600), among others, that would be different for the two users (though the "home" or storage location may be the same for both users (AU.Classical, AU.Bluegrass)). The BIRD (200) associated with the violin (100.M.V) can be configured with appropriate respective usage expectations (600.Classical, 600.Bluegrass) for each of the two respective family members (AU.Classical, AU.Bluegrass). Other usage expectations (600), such as those reflective of movement of the item, may be very different for each of the two users as well.

Suitable local input elements (282) (discussed below in conjunction with FIG. 2A and other figures) can be used to put the BIRD (200) into an operational mode for each respective user (AU.Classical, AU.Bluegrass). Each user-based operational mode is configured based on the appropriate respective usage parameters (600.Classical, 600.Bluegrass) for the appropriate family member (AU.Classical, AU.Bluegrass) who is using the violin (100.M.V) at a given time.

The usage expectations (600.Classical, 600.Bluegrass) shown are exemplary only, and are expressed in colloquial, informal, and imprecise terms (essentially, as ExD criteria (170)) for convenience of illustration only. In an embodiment, the actual usage expectations (600) employed by the BIRD (200) for internal processing are reflective of the data expected to be sensed by multiple all of the sensors (210) of the BIRD (200) when the violin (100.M.V) is in a non-anomalous or extant (503.1) state. In an embodiment, such usage expectations (600) employed by the BIRD (200) for internal processing are expressed in a variety of mathematical, logical, or symbolic forms, as discussed throughout this document.

However, in an embodiment, an authorized user (AU) of a BIRD (200) may be able to specify some or all usage expectations (600) by employing colloquial, informal, and/or imprecise terms, that is ExD criteria (170); the BIRD (200) or an associated configuration computer (335), discussed below, may employ natural language processing capabilities to transform ExD criteria (170) into the more formal (mathematical/logical/symbolic) usage expectations (600) required for internal processing by the BIRD (200).

In an embodiment, sound qualities of a musical instrument (100.M) or any sound-emitting item (100) could be a factor, either by themselves or in conjunction with other sensor data (700) (indicative of other environmental factors), in determining if the instrument (100.M) or other item (100) is in a normal (503.3) or anomalous (503.2) usage state.

Single BIRD with Multiple, Separate BIRD Identities for Different Items

In an embodiment, a BIRD (200) which is associated with (that is, mechanically tethered to) different items (100) at different times may be configured with usage expectations (600) suitable for each item of the different items. Panel B of FIG. 1G illustrates an exemplary user (AU.Guitar) who plays the guitar and who has two guitars: an electric guitar (100.M.ElectricG) and an acoustic guitar (100.M.AcousticG). Assuming the user (AU.Guitar) elects to take only one of the two guitars (100.M.AcousticG, 100.M.ElectricG) on the road at a time, the user (AU.Guitar) could switch the BIRD (200) from one guitar to the other as needed.

The BIRD (200) can be configured with appropriate respective usage expectations (600.ElectricG, 600.AcousticG) for each of the two guitars (100.M.AcousticG, 100.M.ElectricG), respectively. Suitable local input elements (282) (discussed below in conjunction with FIG. 2A) can be used to put the BIRD (200) into an operational mode for each respective guitar (100.M.AcousticG, 100.M.ElectricG). Each item-based operational mode is configured based on the appropriate respective usage parameters (600.ElectricG, 600.AcousticG) for the appropriate guitar (100.M.AcousticG, 100.M.ElectricG) to which it will be tethered.

The usage expectations (600.ElectricG, 600.AcousticG) shown are exemplary only. In an embodiment, the actual usage expectations (600) are reflective of the data expected to be sensed by multiple or all of the sensors (210) of the BIRD (200) when a guitar (100.M.AcousticG. 100.M.ElectricG) is in a non-anomalous or extant (503.1) state. In an embodiment, sound qualities of the guitar (100.M.AcousticG, 100.M.ElectricG) or other musical instrument (100.M) or any sound-emitting item (100) could be a factor, either by themselves or in conjunction with other sensor data (700) (indicative of other environmental factors), in determining if the guitar (100.M.AcousticG, 100.M.ElectricG) or other item (100) is in a normal (503.3) or anomalous (503.2) usage state.

Identity Transplants Via Copying of Configuration Parameters

Two BIRDS (200.1, 200.2) may both be used by a common owner. If the two BIRDS (200.1, 200.2) will be used with items that have substantially similar usage, one of the two BIRDs may be configured in whole or in part by copying controlling configuration parameters from the other BIRD. The configuration parameters may include part or all of the usage expectations (600). Panel C of FIG. 1G illustrates an exemplary case of copying configuration usage parameters (600.Guitar) from a first BIRD (200.1) associated with an electric guitar (100.M.ElectricG) to a second BIRD (200.2) associated with an acoustic guitar (100.M.AcousticG).

If a user (such as AU.Guitar from panel B) typically carries both guitars about to her gigs, then either the same or substantially similar usages parameters (600.Guitar) are likely to be applicable for both guitars (100.M.ElectricG, 100.M.AcousticG). Copying usage expectations (600) and other configuration parameters from the first BIRD (200.1) to the second BIRD (200.2) may offer some convenience in establishing parameters for the second BIRD (200.2). This is particularly true if, for example, the second guitar (100.M.AcousticG) and associated BIRD (200.2) were acquired after the first guitar (100.M.ElectricG) and associated BIRD (200.1).

In an embodiment, appropriate usage expectations (600) for each of the two guitars (100.M.ElectricG, 100.M.AcousticG) may be substantially similar but not identical. In that event, copying the usage expectations (600.Guitar) from the first BIRD (200.1) to the second BIRD (200.2) may still be an effective way to establish baseline parameters for the second BIRD (200.2). The guitar player may then employ a variety of methods and means, discussed throughout this document, to fine-tune the usage expectations (600) for the second BIRD (200.2).

Actual transfer of the parameters may be accomplished via a BIRD communications link (337) (discussed below in conjunction with FIGS. 3D and 14B), possibly in association with other communications means such as a configuration computer (335) (also discussed below).

FIG. 1H

Location Attributes and Schemas

The present teachings, system, and method are directed, in part, to a technology-based capability to determine if an item (100) is displaced (503.0), which may include the item being lost (503.0.1), misplaced (503.0.2), misappropriated (503.0.3), stolen (503.0.4), or wandering (503.0.5); or determining on the other hand if the item is extant (503.1) (present and/or in-use when and where expected). In an embodiment, these determinations may rely in part on sensor data (700) pertaining to the location of the BIRD (200) and its associated item (100). A BIRD (200) has a location sensor (210.L), discussed further below in conjunction with FIG. 2A and other figures throughout this document.

Location

One dictionary definition of "location" is "a place of settlement, activity, or residence." In common usage, the term location tends to refer to designation of place on a geographic scale, such as a home, office, street, street address, a building, an identifiable outdoor site, or geographic coordinates of any of the above; location may also refer to presence in a mode of transport, such as being located in a car or a train.

For purposes of this document, location (including both actual location (144.L) and expected location (144.L)) includes those meanings, but the term is also broadened to include more localized or fine-grained position/place identifiers. For example, a location of an item (100) may include identification of the item (100) as being positioned in a particular room in a home or office; or even further, identification of the item (100) as being in/on a specific desk, table, cabinet, locker, or drawer within the mom.

Location Schema

In an embodiment, to characterize a BIRDed-item (102) as displaced (503.0) or extant (503.1), and possibly in a particular state of being displaced (503.0), requires some distinctions among locations (both actual locations (104.L) and expected locations (144.L)), so that locations (104.L, 144) are divided into schema categories (140).

Location, Location Schema, Location Status, Expected Location, and Location Usage Expectations Location:

In this document, an item's location (104.L) is considered to be a real-time geographic attribute of an item (100) referring to where the item (100) is to be found at a given time. For convenience of exposition, the location (104.L) is sometimes characterized in terms of a building or room, or other localized place designation, which may also be an elements of an authorized user's ExD criteria (170) for the item (100). The item's location (104.L) is one aspect of the item's environment (104). (See for example FIGS. 1B and 1C, above, and other figures throughout this document.)

Location Schema:

The location schema (140) refers to the categories into which locations may be divided for purposes of BIRD logic (500). In an embodiment, an exemplary location schema may include home base locations (140.HB), daily life locations (140.DL), zones (140.Z), commuting routes (140.CR), and out-of-bounds (140.OoB) locations (140.OoB). This exemplary location schema, as well as other exemplary location schemas, are discussed further below in conjunction with the present FIG. 1H and other figures throughout this document.

In this document, the reference label "140" is used interchangeably to refer to a location schema (140) as a whole, and to the categories (140) which define the schema. However, see also "location status." discussed immediately below.

Location Status:

The location status (141) of an item (100) indicates which particular category from a location schema (140) currently applies to the actual location of the item (100). (Or the location status (141) may indicate which category actually applied to the item (100) at some earlier point in time.) For example, when an item (100) is in a home base location (140.HB), then an exemplary value of the location status (141) may be "HB," "home base," or some other appropriate code for a home base (140.HB). For another example, when an item (100) is in a daily life location (140.DL) (but outside of a home base location (140.HB)), then an exemplary value of the location status (141) may be "DL," "daily life," or similar.

Expected Location:

An expected location (144.L) is any geographic designation of a place where an item (100) may be found, or is expected to be found. Expected locations (144.L) may be associated with specific context times or context time ranges (105) via definitions of detection contexts (123) and/or usage expectations (600). See for example FIG. 1I, and other figures throughout this document.

Location Usage Expectations:

The usage expectations (600) for an item (100) may include location usage expectations (600.L), which may in turn include one or more specific expected locations (144.L). (See for example FIG. 6A, below, and other figures throughout this document.)

Where specific expected locations (144.L) or location designations (144.L) are referenced throughout this document, particularly with reference to usage expectations (600), the associated reference label(s) may still refer to categories in the location schema (140), since such expected locations are often categorized in terms of the location scheme (140). However, in some cases, the reference label "144" may be employed instead, for example:

(i) where a generic but singular indication is intended of a location—that is, a reference to some specific location (144.L), but without necessarily associating the location with a category from the location schema (140); or . . .

(i) where a generic but singular indication is intended of a location—that is, a reference to some specific expected location (144.L), where a possible association of the specific location (104.L) with some schema category (140) is incidental.

Figure 1H:
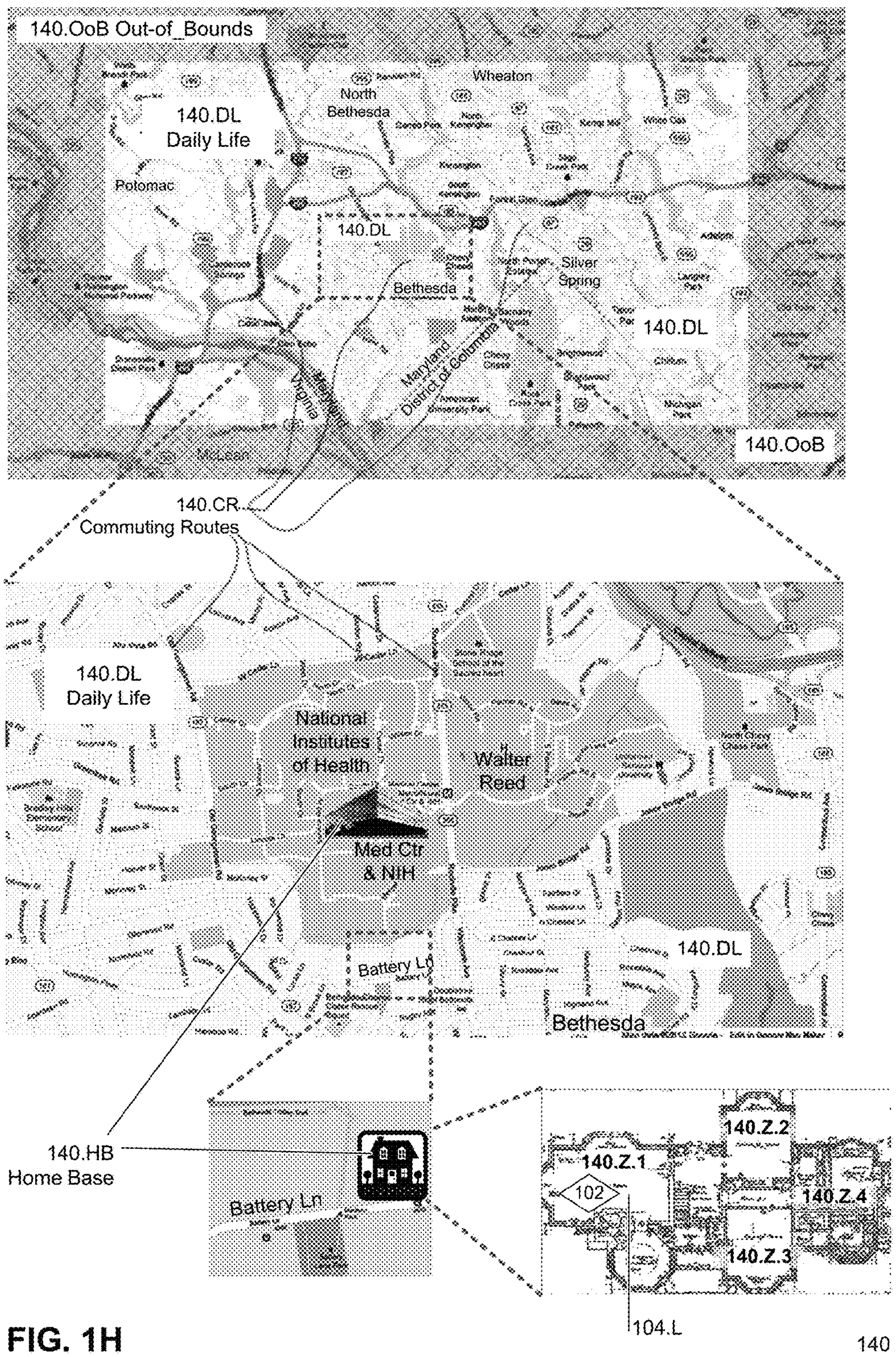
FIG. 1H illustrates an exemplary location schema which may be employed by a BIRD according to an exemplary embodiment of the present system and method.

In FIG. 1H, a BIRDed-item (102) happens to be located in a particular home base location (140.HB), and in a particular zone (140.Z.1) of the home base (140.HB). In a discussion where the association of the BIRDed-item (102) with a home base/zone (140.HB/140.Z) was a significant factor, the location may be referenced for example as "140.Z" or "140.Z.1." In a general reference to the fact that the BIRDed-item (102) is at some specific location, the location may be referenced as "104.L."

Exemplary Location Schema

In an embodiment, a BIRD (200) may employ an exemplary location schema (140) based on designations of:

- one or more home base locations (140.HB);
- one or more daily life locations or regions (140.DL);
- one or more out-of-bounds (140.OoB) regions (140.OoB);
- one or more commuting routes (140.CR);
- one or more localized zones (140.Z) (for example, rooms within a home base, such as rooms within a home or office, or classrooms, etc.); and
- one or more states which may be hybrids of location and time, or location and other factors; one example being a state of absent-without-leave (AWOL) (128).

FIG. 1H presents an exemplary map which illustrates some elements of the exemplary location schema (140) discussed here. Note that icons on the map for a house and for an office building are not illustrated to scale with the rest of the map elements or with each other. Note also that the geographic boundaries shown are exemplary only, and should not be construed as limiting. For example, geographic boundaries defined for location purposes may have many different shapes or configurations, including but not limited to the rectangular boundaries illustrated in FIG. 1H. Also, for example, a location schema (140) is not limited to contiguous or connected geographic areas, but may include multiple, unconnected geographic areas. Or, such disconnected areas may be viewed as being connected via modes of transit such as air travel or boats, or other modes of transport, which may have only loosely defined paths or boundaries, or highly unpredictable paths or boundaries. Such semi-determinate connection paths, which may define a user's transit between more well-defined geographic areas, may or may not be included as part of a specific location scheme (140).

Home-Base Location or Storage Location

A home-base location or storage location (140.HB) is typically a building or another localized area or site which is a permanent or semi-permanent base of living or operations for an authorized user (AU) of the item (100). A home-base (140.HB) may also generally be a place where an authorized user (AU) could store an item (100), or leave the item (100) safely, when the item is not in-use.

For example, a home, an office, or other place of employment would typically be a home-base or storage location (140.HB). By contrast, stores or restaurants that a person visits as a customer, or friend's home (even if visited fairly often) would typically not be a home-base. Some locations (104.L) that an authorized user (AU) might visit on a very routine basis—for example, the gym where the authorized user (AU) works out five days a week, or a relative's home, or the home of a friend where the user sometimes stays overnight—might be considered a home-base (140.HB). In some cases a home-base (140.HB) might be, or might include, a well-defined, relatively localized outdoor location, such as the property surrounding a home or office.

In an embodiment of the present system and method, a BIRD (200) may specifically enable an authorized user (AU) to distinguish home-base locations (140.HB) which are suitable for item storage from home-base locations (140.HB) which are not item storage locations. In an alternative embodiment, such distinctions are not available or not needed, and any home-base location (140.HB) is considered to be a suitable storage location. For simplicity in the discussion below, “home-base” location and “storage location” are assumed to be the same.

Characterized in other terms, a home-base (140.HB) is a place where a user would typically feel it appropriate to leave a personal item (100) either unattended, or in a specific storage bin (such as a locker); and if the authorized user (AU) leaves the item (100) out in the open and unattended, or in the locker, there is little or no likelihood of it being stolen (503.0.4). (Or, at least, a theft the item (100) would require a very deliberate, concerted effort on the part of the thief, for example, a deliberate home break in.) The home and (hopefully) the workplace usually qualify, as may some other locations (104.L) such as a gym or school where the authorized user (AU) has a locker or similar.

Characterized in other terms, a home-base (140.HB) is a localized place—typically on the scale of a building, a part of a building, or a room—in which the authorized user (AU) conducts essential business or personal activities, and/or has a sustained association, and/or has a right or authorization to leave personal items on site even when the authorized user (AU) is not present. In some cases, the scale of a home-base (140.HB) may be as large as an organizational campus (for example, a college campus or corporate campus).

Characterized in yet other terms, a home-base location (140.HB) may be a relatively localized site with relatively predictable and consistent time-usage with respect to an item (100). For example, the times when an item (100) is expected to be present in an authorized user’s home, or the times when an item (100) is expected to be present in an authorized user’s place of work, may both be fairly well-defined and reasonably consistent. Viewed in these time-related terms, a home base location (140.HB) may not necessarily be defined in terms of item storage. For example, a recreational site, store, or other facility which an authorized user (AU) generally visits on a scheduled, consistent basis may be deemed to be a home base (140.HB), even if the authorized user (AU) would not store or leave an item (100) in those sites.

Classes of Home-Base Locations:

In an embodiment, a BIRD (200) may be configured to accept more than one class or category of home base locations (140.HB). Such classes or categories may include, for example and without limitation: Occupational (work) home base locations; residency home base locations; recreational home base locations; regularly-scheduled home base locations (that is, home-base locations visited on a predictable basis); home-base locations distinguished based on scale (for example, campus, building, section of building); shopping home base locations; friend/social home base locations; and others. In an embodiment, different classes of home base locations may be distinguished in terms of frequency of visits, length of visits, regularity of schedule of visits, whether or not items (100) may be stored in a class of home base locations, and other factors.

In an embodiment, one application of home-base locations (140.HB) is to help provide a framework in which BIRD logic (500) can assess if the BIRDed-item (102) is, or is not, in a well-defined, fairly specific location when expected to be. In an embodiment, BIRD logic (500), BIRD song (900), and BIRD navigation (1000), all discussed throughout this document, may all be fine-tuned to reflect distinctions among different classes of home-base locations.

In an alternative embodiment, some or all distinctions among different classes of home-base locations (140.HB) may instead be implemented through zones (140.Z), discussed further below.

Office:

Throughout this document, reference is made at points to an item possibly being in an authorized user’s office. The term office should be taken as a shorthand phrase to refer to any place of employment, including but not limited to actual offices; schools; hospitals; laboratories; other corporate, public or government facilities; factories: and even outdoor environments such as farms or construction sites. For some users, such as police, firemen, paramedics, truck drivers, airline pilots, and others involved in highly mobile occupations, one or more office locations (104.L) may relate to a fixed geographic office site or sites, and also to a transit, patrol or service vehicle. Additional location schemas (140), with appropriate terms, may also be defined for such mobile occupations (for example, one or more “patrol areas,” one or more “vehicles,” etc.). BIRD logic (500) and usage expectations (600) discussed throughout this document may be suitably adapted/extended for such addition or extended location schemas (140).

Daily-Life Locations

A daily-life location (140.DL) is any location which an authorized user (AU) may visit or may transit through with some regularity or frequency, but with which the authorized user (AU) does not maintain a central or permanent association. Typical examples of daily-life locations (140.DL) include stores which a person visits, recreational facilities, doctor’s offices, and other routine-but-intermittent life activity locations (104.L, 144). These are locations (104.L, 144) which an authorized user (AU) may visit more or less frequently, but where the authorized user (AU) typically does not leave personal items behind when the user leaves. (At least, personal items are not left behind intentionally by the user. One use of the present system and method is to enable items (100) to self-identify as having been left behind unintentionally.)

In an embodiment, daily-life locations (140.DL) may be broadly defined. For example, a user of a BIRD (200) may define a broad geographic life-area in which the authorized user (AU) generally lives, works, and otherwise conducts life activities. Example may include one or more cities, one or more counties, one or more areas defined by postal codes, one or more areas within a specified radial distance of a central location, one or more areas within a specified proximity to certain roads, etc. In an embodiment, daily-life locations (140.DL) defined as broad geographic areas usually include or encompass the home-base location(s) (140.HB).

In an alternative embodiment, the authorized user (AU) of a BIRD (200) may define specific sites, such as stores or recreational centers, as daily-life locations (140.DL).

In an alternative embodiment, the authorized user (AU) of a BIRD (200) may define two or more distinct, specific categories of daily-life locations (140.DL). Each category may be assigned different usage expectations (600) pertaining to whether an item (100) is extant (503.1) or displaced (503.0). For example, the general geographic area in which a person lives may be a first category of daily-life locations (140.DL); stores which are frequently visited may be a second category; a school which the user attends may be a third category, etc. For another example, a user may define a first geographic area which is relatively close to home, work, school, etc., as a first daily-life location (140.DL); and then define a somewhat larger, more extended geographic area as a second daily-life location (140.DL).

In an embodiment, a daily-life location (140.DL) may also be understood in terms of physical scale and in terms of time usage. A daily-life location (140.DL) tends to be geographically broad, large enough to encompass many or most of the routine life activities of an authorized user (AU), and large enough to have, within its boundaries, multiple home base locations (140.HB). In addition—and possibly in contrast to a home base location (140.HB)—user and item movement within a daily life location (140.DL) may be less predictable on a time basis. That is:

(i) on the one hand, it is expected that an item (100) will typically remain somewhere within a daily life location in the course of a day (or week, or other extended time period); but on the other hand . . .

(ii) . . . if the item (100) is not in a home base location, then it may be difficult to predict where exactly the item (100) will be, at any given time, within the broad geographic domain of the daily life location(s) (140.DL). This reflects the possibility that authorized user (AU) movement and activities may be relatively variable when the authorized user (AU) is not at home base locations (140.HB).

Commuting Routes

A commuting route (140.CR) is any road or public transit route, or bike path, or even a walking path, flight path, or boat route, that the authorized user (AU) typically employs or may employ to get around within their general geographic life-area (140.DL), or between distinct geographic regions of a general geographic life area (140.DL).

In an embodiment, any road or other travel path within the daily-life locations (140.DL) may be designated as potential commuting routes (140.CR). In an alternative embodiment, an authorized user (AU) may specify that only particular roads or paths with the daily-life locations (140.DL) may qualify as commuting routes (140.CR). In an alternative embodiment, one or more commuting routes (140.CR) may be designated as being apart from the daily-life locations (140.DL), but as connecting one or more geographically distinct daily-life locations (140.DL).

In terms of BIRD logic (500), a commuting route (140.CR) may be construed as being similar to a home-location (140.HB), or to a daily-life location (140.DL); the designation and associated logic may depend in part on how the route is travelled, and how an item (100) is used along the route (140.CR). If an item (100) may travel along a commuting route (140.CR) with the user, but the authorized user (AU) typically does not leave the item unattended along the route, then (for that item and route), the route (140.CR) may be designated as daily-life (140.DL) but not home base (140.HB). For certain items (100) and certain routes (140.CR), an item (100) may be one which can be left unattended (in a car or bicycle, for example). Appropriate BIRD logic (500) for such a commuting route (140.CR) might then be similar to that for a home location (140.HB).

Whether a commuting route (140.CR) is considered similar to a home-base location (140.HB) or to a daily-life location (140.DL) which is not a home base, special considerations may still apply in terms of BIRD logic (500). For example, the movement of a transport device (car, train, bicycle, etc.) adds extra motions to the use of an item (100). This may required filtering or other special processing of data from the motion sensors (210.M) (discussed further below) to distinguish a user's personal motions (104.M) from transport motions. Further, some modes of transport—both cars and bicycles, for example—typically require that a user to keep at least one hand on a wheel or handle bars. This may change how the user would use an item (100), as compared to item usage when not in transit.

For simplicity below, commuting routes (140.CR) are sometimes considered simply as part of and included within daily-life locations (140.DL).

Out-Of-Bounds (140.OoB) Locations

Any location which is completely outside of any expected location for an item (100) is considered to be out-of-bounds (140.OoB). That is, any location which is not a home-base (140.HB), not a daily-life location (140.DL), and not a travel route (140.CR) is considered out-of-bounds (140.OoB).

In an embodiment, if an item (100) is not in a home base location (140.HB) or a daily life location (140.DL), the BIRDed-item (102) is by default in an out-of-bounds location (140.OoB). As such, and in an embodiment, the location usage expectations (600.Loc) need not include any specific definition of the out-of-bounds (140.OoB) locations (140.OoB), which rather are defined implicitly in relation to the home base (140.HB) and daily life (140.DL) locations.

In an alternative embodiment, the location usage expectations (600.Loc) explicitly define some or all regions that are out-of-bounds (140.OoB) locations (140.OoB).

In an alternative embodiment, the location usage expectations (600.Loc) may define two or more different categories of out-of-bounds (140.OoB) locations (140.OoB), which may be used for various item state assessments by BIRD logic (500).

Zones

In an embodiment, a BIRD (200) may be configured to subdivide any of a home location (140.HB), a daily life location (140.DL), an out-of-bounds (140.OoB) region (140.OoB), and/or a commuting route (140.CR) into smaller specific units, or zones (140.Z). For example, and as illustrated in FIG. 1H, a home may be subdivided into zones (140.Z), such as a zone for a living room (140.Z.1), zones for foyers or parlors (140.Z.2, 140.Z.3), and a zone for a kitchen (140.Z.4). In an embodiment, such zones may be incorporated into usage expectations (600) to indicate expected item behavior in different zones.

For example, a usage expectation for keys (100.K) may indicate that, when left at home in the evening (when the authorized user (AU) is home as well), the house keys (100.K) are typically left sitting in a kitchen (140.Z.4). Such usage of the keys (100.K) is expected. If the keys (100.K) are left stationary (139.Stat) in any other zone (140.Z) in the home, then the keys may be misplaced (503.0.2).

Each room in an office building or in a school setting, or similar institutional settings, may also be designated as a zone (140.Z). This may be particularly helpful for persons engaged in a highly structured usage schedule (for example, students going from class-to-class in a school setting). The BIRD (200) may be configured with usage expectations (600) which indicate, with substantial precision and only limited allowance for time-slippage, that the user is expected to be in certain rooms at certain times. If the student leaves an item (100) behind in a class, the BIRDed-item (102) can detect its lost state (503.0.1) in a relatively timely manner.

Zones may be defined at varying levels of granularity, and subsidiary zones may be defined as well. For example, a single room may be partitioned into smaller zones or units.

Zones and Regions:

In an embodiment, different terminology, as well as different BIRD processing and BIRD logic (500), may be applied to zones of different scales. For example, subdivisions of home base locations (140.HB) may be referred to as zones (140.Z); while subdivisions of large geographic areas may be referred to by some other terminology, such as "regions." For example, a daily life location (140.DL) of a county may be subdivided into regions according to cities, zip codes, or other boundaries specified by an authorized user or suggested by the BIRD (200) based on item usage. For simplicity in this document, reference is simply made throughout to "zones (140.Z)."

Absent Without Leave (AWOL)

Absent Without Leave (AWOL) (128) may be considered a hybrid attribute or item status (501). It is illustrated above in conjunction with FIG. 1B.

In an embodiment, a BIRD (200) is configurable with usage expectations (600) which indicate expected usage of an item (100). These usage expectations (600) may indicate that the item (100) is expected to be within certain expected locations (144.L) at specified times of day and/or on specified dates. These expectations typically conform with typical usage by the authorized user (AU).

For example, an item (100) may be expected to be at home during night-time hours, and also be expected to be at the office during working hours. The appropriate usage expectations (600) to reflect this may be established by the user, or the BIRD (200) may determine them during a training period, as discussed further below.

If, at a given point in time (that is, at a particular moment):

(i) an item (100) is within a generally allowed location (a home base (140.HB) or daily life (140.DL) location—that is, the item (100) is within a location where it is allowed to be at some points in time—but . . .

(ii) the item is outside of any location where it is expected to be at the current point in time;

. . . then the item (100) may be determined, by the BIRD (200), to be absent without leave, or AWOL (128).

A determination of AWOL status (128) may contribute to a determination that an item may be lost (503.0.1), misplaced (503.0.2), misappropriated (503.0.3), wandering (503.0.5), or stolen (503.0.4).

In an embodiment, AWOL status (128) may be associated exclusively with an item (100) which is stationary (139.Stat) (not subject to personal movements, and so is off-person (138.OffP)). If the item (100) is in on-person (138.OnP), then it is either with the authorized user (AU), or with someone who has accidentally misappropriated the item, or it is with a thief. In any of these cases, the item (100) is with some person, and so is not wholly absent. In other words, in this embodiment, AWOL status (128) is associated with an item (100) which has been left behind someplace where it should not be, or has been taken to where it should not be and has been left in place there. (This may include an item (100) which is left behind on a bus, train, or other public transportation.)

In an embodiment, a BIRD (200) is configured to determine AWOL status (128) for its associated item (100) on a simple yes/no, true/false basis. In an alternative embodiment, a BIRD (200) may be configured to ascertain multiple different AWOL statuses (128), with variations for whether or not the item (100) is in motion (on public transportation, for example) or stationary (139.Stat); how far the item (100) is from a currently allowed or expected location (144.L); how long the item (100) has been outside the allowed location; and other factors.

In-Bounds but Still AWOL:

It will be noted that an item (100) may be generally within the overall daily life location(s) (140.DL) for the item, and possibly even within a home base location (140.HB), and still be AWOL (128). AWOL status (128) depends not only on location, but also on the time(s) of day the item (100) is expected to be within particular allowed expected locations (144.L). For example, an authorized user (AU) may normally take an item (100) to work; if on some occasion the user accidentally leaves the item at home during the work day, then the item is AWOL (128) from the work location. Similarly, if the item (100) is accidentally left at work when the user returns home for the evening, then during that evening the item is AWOL (128) from home.

Varied Daily Routine Locations/Travel Locations/Alternate Locations

Typically, people's routines tend to be fairly stable in some respects, while varying in others. For example, a user may have a life routine which is somewhat similar from one working-day to the next, but then distinctly different on weekends or other non-work days. Additionally, some users may travel, either occasionally or routinely. A BIRD (200) may be configured with alternate home-base location(s) (140.HB), alternate daily-life location(s) (140.DL), and/or alternate commuting routes (140.CR), to be specifically associated with different types of days (for example, work-days vs. weekends), or with an authorized user's travel.

See the discussion below of usage expectations (600) (FIGS. 6A-6F)—and in particular the discussion of usage expectation groups (652) and context-specific expectation groups (655) (FIG. 6D)—for exemplary associations of different expected locations (144.L) with different times of day, or days of the week, etc.

Alternative Location Schemas

The location schema (140) described above—based on home base locations (140.HB), daily life locations (140.DL), out-of-bounds (140.OoB) regions (140.OoB), commuting routes (140.CR), zones (140.Z), and statuses (501) such as AWOL (128)—is exemplary only, and other location schemas (140) may be envisioned. The location schema (140) described above may be useful for many users with relatively routine or stable life habits—people who, for example, have only one or a handful of well-defined home base locations (140.HB), and who tend to spend a very substantial part of their life in a particular larger geographic location (144.L) (such as the city they live in, and some nearby city where they are employed or go to school). The schema also tends to be appropriate for people with relatively stable or predictable schedules of movement and life activities.

Other, alternative location schemas (140) may be more suitable for other users. For example, for a person who travels extensively, or otherwise has a highly transient lifestyle, alternative location schemas (140) may be better suited for characterizing appropriate and inappropriate expected locations (144.L) for an item. Similarly, for persons with less predictable or unpredictable schedules, an alternative schema—possibly with alternate, or additional, hybrid categories of location and time—may be more suitable for distinguishing appropriate vs. inappropriate expected item locations (144.L), and location vs. time. Such alternate schemas may, for some users, better enable a BIRD (200) and BIRD logic (500) to determine when an associated item (100) is extant (503.1) or displaced (503.0). Such alternate schemas fall within the scope and spirit of the present system and method.

Other elements which may be aspects of alternative location schemas (140) include, for example and without limitation:

- Water-bound location elements, including identifications and regions of rivers, lakes, seas, oceans, etc.;
- Areal location elements, such as airline or helicopter navigation routes;
- Outer-space elements, such as orbital or sub-orbital paths;

- Altitude-related coordinates or parameters, and similarly (for under-water purposes) depth-related coordinates or parameters; and
- Geographically distinct or separate location regions, coordinates, or parameters.

See also the discussion immediately below on a schema based on location probabilities.

Location Fuzziness Parameters

Life doesn't always go exactly according to plans, and so neither does the usage of items (100). In an embodiment, an authorized user (AU) may configure a BIRD (200) with parameters which allow for some imprecision or "fuzziness" in location determinations. This takes into account that a user's actual life schedule or movements may not be perfectly identical from day-to-day. The fuzziness parameters may take various forms including, for example and without limitation:

- spatial tolerance parameters: a user may specify that a BIRD (200) and its associated item (100) may be located up to some distance outside of home-base, daily-life location(s), or travel routes, and still be considered within those boundaries (and so possibly still extant (503.1), for example);
- time tolerance parameters: a user may specify that a BIRD (200) and its associated item (100) may be located outside of home-base, daily-life, or travel routes for specified amount of times, and still be considered within those boundaries (and so possibly still extant (503.1));
- combination spatial and time tolerance parameters: a combination of spatial and time fuzziness may be employed, for example allowing an item to be either a short distance outside of normal bounds for some relatively long, specified period of time; or allowing an item to be a longer distance outside of normal bounds, but for some relatively briefer specified period of time.

In an embodiment, a location schema (140) may be based, in whole or part, on location probabilities. In an exemplary embodiment, a first category of locations (104.L, 144) may be based on a location or locations where, for some part of a day (or week, etc.), the authorized user's location can be anticipated with certainly, very high likelihood, or near certainty; a second category of locations (104.L, 144) may be based on a location or locations where, for some other part of a day, the authorized user's location can be anticipated with a fairly high level of probability, but a level that is lower than for the first category; a third category of locations (104.L, 144) may reflect yet a lower probability of confidence about the user's expected location; and so on, as additional location probabilities may be characterized in this exemplary location schema (140).

For example, a users presence at one or more home base locations (140.HB) (such as at an office or at school, or at home), may be highly likely for certain parts of the day or week; while the user's presence at these same locations (140.HB) may be possible, but less likely or less predictable, during other parts of a day or week. Similar conditions may apply to various other locations (104.L, 144) within a user's daily life locations (140.DL) or travel routes (140.CR), or even to some zones (140.Z).

Designation of Expected Locations

In an embodiment, the designation of an expected place (144.L) or expected location (144.L) as a home-base (140.HB) is at the user's discretion in configuring the BIRD (200). Similarly, the designation of locations as daily-life locations (140.DL), travel routes (140.CR), etc., is ultimately at the user's discretion in configuring the BIRD (200). See for example FIG. 11, below. Similarly, the designation of location fuzziness parameters (if any) is ultimately at the user's discretion in configuring the BIRD (200).

Transportation Motions and In-Transit State

In-Transit:

An BIRDed-item (102) may be subject to transportation motions, including car, motorcycle, bicycle, train, bus, airplane, and boat movements. An item (100) which is on board a transportation device (car, train, airplane, etc.) is said to be In-Transit. While subject to such motions, the BIRD (200) and associated item (100) may also be subject to additional personal motions (104.M), if the item (100) is on-person (138.OnP) (and possibly, in addition, if the item is in-hand (138.OnP)).

If the item (100) is with the authorized user (AU), then the item is generally understood to be extant (503.1) as well. However, an item (100) which is in-transit may also be lost (503.0.1) (if, for example, left behind on a bus, train, taxi, plane, etc.), misappropriated (503.0.3), or stolen (503.0.4). An in-transit item (100) may even be misplaced if, for example, the authorized user (AU) has unintentionally left the item behind in a family or business car, and another family member or business associate drives off with the item (100). Identification of an in-transit item (100) as also being extant (503.1) on the one hand, or as being displaced (503.0) on the other hand, may be accomplished by a BIRD (200).

Transportation motions may include both large scale transport motions, such as accelerations and substantial velocities, but may also include the vibratory motions and occasional "bumps" associated with many forms of transit. (Note that, in an embodiment, and as discussed further below, a BIRD (200) may be configured with a vibration sensor (210.B) separate from the motion sensor (210.M). In an alternative embodiment, a single sensor may be configured to function as both a large scale motion sensor (210.M) and a vibration sensor (210.B)).

Because personal motions (104.M) and transport-associated vibrations are both small-scale motions, there is a possibility that these two forms of motion could tend to mask each other. However, sensors (210) with sufficient sensitivity and precision, if coupled with suitable filtering algorithms, may be configured to extract and distinguish user-personal-motions from transport-vibratory-motions. For example, a BIRD (200) may be configured to distinguish motion frequencies and amplitudes associated with personal motions (104.M) from the frequencies and amplitudes associated with transportation-driven movements.

Other Non-Person-Driven Motions

An item (100) and associated BIRD (200) may be subject to other motions as well. Some of these may be transitory, such as an item (100) in a desk drawer being subject to motion when the drawer is opened or closed. Other motions may be more sustained and be inherent in certain types of environments, for example, vibratory motions associated with construction sites. As with transportation motions, suitable filtering algorithms may enable a BIRD (200) to distinguish personal user motions from other types of motions which are not driven by a person holding or bearing an item (100).

Alternative Motion Schemas

The motion schema described immediately above—with an item subject to personal motion, stationary, stagnant, and/or in-transit—is exemplary only. Other motion schemas may be employed as well by a BIRD (200), in the alternative or additionally, to categorize and identify item motion states which are associated with an item being extant (503.1) or displaced (503.0), or more generally with an item being in a normal state (503.3) of use or in an anomalous state (503.2) of use. Such alternative motion schemes may include, for example and without limitation:

- schemas based on designated ranges of item velocity or acceleration;
- schemas based on frequency or magnitude of item changes in direction;
- schemas defining two or more categories of stagnancy, which may depend on varying time frames or other factors;
- schemas which distinguish an item in motion on a person actively engaged in walking, running, or other location-changing activities, vs. an item subject only to motions associated with sitting or standing.

IteMetric Determinations

Item motion is one item attribute, among others, which may be detected by BIRD sensors (210) and that may be significant in assessing the iteMetrics (154) of an item (100). IteMetrics (154) are discussed immediately below.

FIG. 1I

Expected Locations

FIG. 1I presents a table of exemplary expected locations (144.L) which may be defined by an authorized user (AU). The expected locations (144.L) may, for example, be defined as an aspect of defining one or more detection contexts (123) and/or usage expectations (600).

The table has a first column which names various exemplary locations (144.L) which may be associated with an authorized user's daily life, but which thereby includes not only the larger, formal daily life areas (140.DL) (such as cities, counties, or other large geographic domains); but also more localized home base locations (140.HB) and zones (140.Z).

A second column lists the various respective, exemplary schema categories (140) which are associated with respective, specific expected locations.

A third column lists locator data (145), which would actually define the location by geographic coordinates or other location data usable by a BIRD's location sensor (210.L). Shown in Table 143 are exemplary pointers (*GPS1, *GPS2, *BEACON1, etc.) which would reference data structures in memory that contain the actual, formal geographic location data. For example, "GPS" pointers may obtain data for GPS coordinates, while "BEACON" pointers may reference data structures associated with location broadcast beacons (1507).

In an embodiment, the expected locations (144.L) may be defined by an authorized user (AU), along with a designation of appropriate matching schema categories (140). In an embodiment, the BIRD (200) may determine the location boundaries/beacons by downloading suitable location coordinates and/or location beacon data (1507) from databases which associate the expected location labels (144.L) with the locator data (145). Suitable location databases may include internet-based mapping services, local building/facility location databases maintained by various institutions, and other sources. In an embodiment of the present system and method, it is envisioned that over time it will become increasingly common for many public and private facilities to maintain location databases and/or location beacons (1507) which may be compatible with BIRD technology.

FIG. 1J

Associating an Item and a User: Biometrics and IteMetrics

In an embodiment, a BIRD (200) is configured to use data from its input devices (226, 240, 282) and/or environmental sensors (210) to identify, recognize, or otherwise characterize a person who possesses, or most recently possessed, the item (100) associated with the BIRD (200). In an embodiment, a BIRD (200) is also configured to distinguish between authorized users (AU), who are authorized to be in possession or control of the associated item (100), versus other persons who are not so authorized, and who are therefore unauthorized users (UU).

In an embodiment, the BIRDed-item (102) has an authorized user status (131) which may have exemplary values of:

"131.AU," "AU," "Yes," or "Authorized user (AU)" for an authorized user (AU); and "131.UU," "UU," "No," or "Unauthorized user (UU)" for an unauthorized user (UU).

See for example FIGS. 1E and 1F, above, and other figures throughout this document.

In an embodiment, the BIRD (200) may be configured with additional authorized user (AU) status values (131) to distinguish among different categories of authorized users (AU) (for example, a primary authorized user vs. borrowers) and/or different individual authorized users (AU); and similarly the BIRD (200) may be configured with additional unauthorized user (UU) status values for different categories and/or specific persons of unauthorized users (UU).

In an embodiment, a BIRD (200) may determine whether or not an item (100) is associated with an authorized user (AU) or an unauthorized user (UU) via iteMetrics (154), discussed immediately below.

In an embodiment, the desired personal authentications/characterizations fall into two categories, which are broadly distinct, though possibly with some functional areas of overlap:

- Biometrics and/or Personal ID (152)—Used by a BIRD (200) to identify and validate an authorized user (AU) who is deliberately turning the BIRD (200) on or off, or otherwise deliberately configuring or interacting with the BIRD (200).
- IteMetrics (154)—Data which may be derived by the BIRD (200) from raw sensor data (700), and used by the BIRD (200) to assess whether the usage of the item (100) is consistent with item usage as expected for the current authorized user (AU).

A BIRD (200) logically links the biological identity of an authorized user (AU) with the item-related behavior of an authorized user (AU) by associating a specific user's biometrics (152) (identity) with the specific user's iteMetrics (154) (behavior).

Both biometrics (152) and iteMetrics (154) are discussed further immediately below. Table 150 shown in FIG. 1J presents a side-by-side comparison of biometrics (152) and iteMetrics (154).

(1) Biometrics and/or Personal ID (152)

In the data processing arts, when an authorized user (AU) establishes usage of or control over a data processing device, some form of active, deliberate personal validation is commonly required. Familiar examples are logging into a personal computer or gaining access to financial accounts via a commercial ATM machine. For example, the user may identify himself or herself via a user name or an ATM card, and provide further validation with a secret password.

In an embodiment, a BIRD (200) employs analogous methods of active, deliberate access control for authorized users (AU). Controlled access to the BIRD (200) by the authorized user (AU) is accomplished via active input of user biometrics (152), and may be required at various points or times of active control by an authorized user (AU), including for example and without limitation:

- when the authorized user (AU) first obtains the BIRD (200) (for example, via purchase of the BIRD (200)), and establishes initial ownership and control;
- when an authorized user (AU) starts or powers-up a BIRD (200);
- when the authorized user (AU) powers-down the BIRD (200);
- when the authorized user (AU) establishes or modifies usage expectations (600) or other operational parameters for the BIRD (200); and
- if and when the BIRD (200) signals a possible anomalous (503.2) or displaced (503.0) item state, the BIRD (200) may be configured to only allow an authorized user (AU) to respond; in an alternative embodiment, the BIRD (200) may allow only limited responses by a non-authorized user (UU).

In an embodiment, a BIRD (200) may detect, via iteMetric assessments (discussed below), that it's associated item (100) may be stolen (503.0.4) or misappropriated (503.0.3); the BIRD (200) may then request biometric or personal ID input (152) from the current item user. If the user cannot provide the appropriate biometric/personal authentication (152), this confirms that the BIRDed-item (102) is stolen (503.0.4) or misappropriated (503.0.3).

By means of this controlled access, the BIRD (200) ensures that only the authorized user (AU) can put the BIRD (200) to effective operational use. In addition, a BIRD (200) is configured by the authorized user (AU) to associate or link the user's biometrics (152) with the same user's iteMetrics (154). Once that linkage configuration is accomplished, then each time the authorized user (AU) logs into the BIRD (200) by inputting biometrics or other login signatures (152), the BIRD (200) has suitable operational expectations for the types of iteMetrics (154) it should be sensing in daily field use.

Deliberate, active self-authentication by an authorized user (AU) may be accomplished by a number of biometric means and methods (152), including for example and without limitation: user-name and/or password input to the BIRD (200); handwriting recognition; and/or biometric authentication of the authorized user (AU) via fingerprint, voice print, eye print (iris and/or retina scan), facial recognition, or other user-distinctive biological signatures. Apart from deliberate changes of a user name or password, a general characteristic of biometrics (152) is that they tend to be highly stable over time. Fingerprints do not change, iris characteristics and voice prints tend to be substantially stable over time, facial appearance changes only gradually over time (unless deliberately altered), etc.

(2) IteMetrics (154)

As discussed in detail below, throughout this document, a BIRD (200) is configurable with usage expectations (600) which indicate the expected environment and/or usage (144) of an item (100). In an embodiment, a set of usage expectations (600) are largely unique to both a particular item (100) and to a particular authorized user (AU) of the item (100). Usage expectations (600) may be in-whole or in-part configured/programmed into the BIRD (200) by the authorized user (AU), or may in-whole or in-part be auto-determined by the BIRD (200) during a training or configuration process.

However established (user configuration or auto-determination), the usage expectations (600) are broadly indicative of the usage of an item (100) by a user. IteMetrics (154) are defined as: Those aspects of BIRDed-item (102) usage and/or BIRDed-item environment (104) which can be sensed by BIRD sensors (210) during field use; and are likely to be, or are reasonably capable of being, indicative of the identity of an authorized user (AU).

In an embodiment, an aspect of item usage and/or item environment satisfies this definition even if the aspect by itself is not sufficiently distinctive to indicate the identity of the authorized user (AU), but may be a contributing element with other usage/environmental aspects to indicate the identity of the authorized user (AU). In an embodiment, the identity of the authorized user (AU) need not be confirmed with certainty; a reasonable likelihood of correct user identification is sufficient to satisfy the criteria. In an alternative embodiment, a high likelihood of correct user identification may be required to satisfy the criteria.

Identity-Related Sensed Data (154):

For purposes of the appended claims, the term "iteMetrics (154)" is synonymous with the phrase: "identity-related sensed data (154)," or substantially similar language. In turn, the phrase "sensed data," as used in the preceding sentence, should be understood to mean any of: (i) actual data (700, 700P) obtained/derived from BIRD sensors (210); (ii) data (700, 700P) which may be obtained/derived from BIRD sensors (210); and (iii) a description, in usage expectations (600) or similar, of the data (700, 700P) which may potentially be obtained/derived from sensors (210).

Exemplary IteMetrics

As a first example, one aspect of iteMetrics (154) may be item movement which is reflective of how an item (100) moves as it is carried or held by a person, or is otherwise On-Person (138.OnP). As a second example, another aspect of iteMetric (154) may be the amount or pattern of light exposure for an item as the user takes the item (100) out of pocket and back into pocket during the course of the day.

As a third example, another aspect of iteMetrics (154) may be any biological characteristic of the person who possesses the BIRDed-item (102), especially if the BIRD (200) associated with the item (100) has means to monitor that biological characteristic. So, for example, a person's facial appearance, or any profile of the person's head, may be an iteMetric (154), provided the BIRDed-item (102) in typical use is at least sometimes positioned or oriented so that the BIRD's camera (210.C) can obtain a facial image or head profile.

(By contrast, the purely structural or physical properties of an item (100) are typically NOT an iteMetric (154). For example, an item's physical dimensions (length, height, width) or an item's weight are NOT iteMetrics (154). (An exception may be if the item's physical dimensions can actually be altered through user action on the item, or through user interaction with the item.) Note, however, that iteMetrics (154) are defined as aiding the BIRD (200) in identifying the authorized user (AU) who has, or most recently possessed, the item (100). As a distinct function, a BIRD (200) may also be designed or configured to identify and/or validate that it is tethered-to/coupled-with the correct item (100). For purposes of item identification/validation, structural or physical properties of the BIRD (200) may be relevant. See for example FIG. 2G and associated discussion, and other figures and discussion throughout this document. Note also that internal operations (1350) of the item (200) may be an element of iteMetrics (154), if those internal operations can be modified by the authorized user (AU) during normal field use of the item. See the discussion of active item (100.Act) in FIGS. 13A-13C and elsewhere throughout this document.)

IteMetrics vs. Biometrics

As discussed further below, iteMetrics (154) tend to be separate from biometrics (152). Biometric user authentication (152) elements are typically indicative of biological user qualities which require directed, deliberate input by a user, such as entering a user name and password, pressing a finger against a fingerprint scanner, or orienting an optical scanner towards the user's eyes. In contrast, IteMetrics (154) are typically indicative of user attributes which can be detected passively by a BIRD (200), and when the authorized user (AU) is more or less ignoring the BIRDed-item (102), such as a user's walking gait, or a user's tendency to pick up or put down an item (100).

However, some biometrics (152) and iteMetrics (154) can overlap. For example, a user may deliberately speak into a BIRD (200) to provide a voice print authentication, as part of a user-BIRD login process. However, in routine use a BIRDed-item (102) may also monitor ambient sounds, and in the process may monitor for (among other things) the sound of the authorized user's voice. Similarly, a facial image of the user may be used both for biometric authentication (152) of the authorized user (AU), and for iteMetric determination (154) that the item (100) is still with the authorized user (AU).

In an embodiment, iteMetrics (154) may in turn be divided into two categories, morphIteMetrics and psyIteMetrics.

MorphIteMetrics

MorphIteMetrics (156) are data or indicators which can be extracted from BIRD sensor data (700), and which are processed data indicators (700P) of physical or biological characteristics of an authorized user (AU). (The term "morphIteMetrics" is short for "Morphology Item Metrics," since these iteMetrics are based on user morphology.) Examples of morphIteMetrics (156) may include, for example and without limitation:

- Aspects of a user's walk and/or run, such as stride length, stride timing, the height or "bounce" of a user's walk/run, side-to-side movement measurements, and other dynamic or harmonic properties which may be associated with a user's work or run;
- Various habitual or semi-habitual characteristics of a user's hand-and-arm movements when an item (100) is in hand;
- Habitual or semi-habitual user shifting motions when a user is standing or seated;
- User voice print, since a BIRDed-item (102) in proximity to a user may be able to detect the user's voice at times throughout the day;
- User facial recognition, if the BIRDed-item (102) is used in such a way that the BIRD's camera (210.C) can capture images of the user's face while the item (100) is in use;
- User iris structure or retinal pattern information, if the BIRDed-item (102) is used in such a way that the BIRD's camera (210.C) or other sensors (210) can capture this information (for example, a pair of eyeglasses with a built-in BIRD (200) may be properly situated and designed for this data capture);
- User fingerprints, which may be detected by gloves worn by the user, or by surface elements of other BIRDed-items (102) when these items are held in-hand;
- User pulse, heartbeat, or respiration, if the BIRDed-item (102) is either normally in sustained contact with the user (for example, a wristwatch (100.W)), or if the BIRDed-item (102) is configured to receive pulse, heartbeat, or respiration data from a biological sensor which is in contact with the person.

The subset of morphIteMetrics which are based on user motion (gait, hand or arm movements, etc.) may be referred to as kinIteMetrics (for "kinetic" iteMetrics). The subset of morphIteMetrics which are based on other anatomical or physiological features (facial structure, fingerprints, voice prints, iris structure, pulse, respiration, etc.) may be referred to as anIteMetrics (for "anatomical" iteMetrics) or even more specifically, for some elements, as metIteMetrics (for "metabolic" iteMetrics). This document, however, will generally refer broadly to morphIteMetrics.

For a given user, some measures of iteMetrics may have a substantial range of variation. For example, the pace (frequency) or stride length of a user's gait can vary. However, in an embodiment, a BIRD (200) is configured to identify qualities which may remain substantially the same over time. For example, while stride length or frequency may vary, a user's average stride length or frequency may be substantially predictable over a sufficiently extended period of time. More generally, suitable signal processing protocols and statistical metrics may be devised to extract reasonably reliable signature's of a particular user's morphIteMetrics.

PsyIteMetrics

PsyIteMetrics (158) are data or indicators which can be extracted from BIRD sensor readings, and which are indicators of an authorized user's habitual tendencies with respect to an item (100). (The term "psyIteMetrics" is short for "Psychological Item Metrics.") Examples of psyIteMetrics (158) may include, for example and without limitation:

- User time spent actively moving about, that is, walking or running vs. user time spent standing or seated (in both cases, with item (100) on-person (138.OnP) or in-hand (138.OnP));
- User time spent indoors vs. outdoors (in both cases, with item (100) on-person (138.OnP) or in-hand (138.OnP));
- Amount of time an item (100) is in-hand, that is, actually held by the user; vs. item time in-pocket, purse, backpack, briefcase, etc.; vs. item-time set down (on a desk or table);
- Time spent in transport (car, train, boat, plane, etc.) and means of transport vs. time spent in buildings or outdoors without transport;
- General exposure profile of an item (100) to environmental elements such as light, sounds, temperature variations, etc.; general exposure may include both general characteristics, such as the intensity or spectrum of expected local illumination, or the average expected temperature, and also the amount of time or percentages of time of various environmental exposures:
- For active items (discussed further below) such as cell phones, computers, etc., operations profiles in terms of data access (phone numbers called, files accessed, web sites accessed, e-mail addresses contacted, etc.), item time on or off, etc.

Much of this item sensor data can be characterized through a variety of different statistical profiling measures, all of which may be indicative of a user's tendency to use an item (100) in certain ways. Sensor data (700) used as a basis for determining these derived, psyIteMetrics (158) may include location, motion, light, sound, and temperature sensing, as well as possibly other sensor data (700).

PsyIteMetrics (158) for a BIRDed-item (102) may also vary depending on the usage context. For example, a user may keep an item (100) in pocket most of the time while at home, while the same item (100) may be frequently out-of-pocket and in-hand in the work place. These psyIteMetrics (158) may be identified during a configuration process or training period for an item (100), as discussed further below.

Using Both MorphIteMetrics and PsyIteMetrics

It will be apparent to persons skilled in the relevant arts that, in general, different degrees of precision may be assigned to different types of morphIteMetrics (156) and to different types of psyIteMetrics (158). Data processing by the BIRD (200) which draws on a multiplicity of morphIteMetrics (156) and psyIteMetrics (158) will generally result in more reliable indicators of whether a current item user is—or is not—an authorized user (AU) of an item (100).

It will also be apparent to persons skilled in the relevant arts that, in relative terms, it may take a shorter amount of time for a BIRD (200) to obtain reliable readings for morphIteMetrics (156) (for example, a few seconds to a few minutes for a person's walking characteristics): compared to relatively longer periods of time for a BIRD (200) to obtain reliable readings for many psyIteMetrics (158).

BioMetric and IteMetric Consistency for Authorized User

During configuration, a BIRD (200) is configured with appropriate biometrics (152) or other login signatures associated with the authorized user (AU).

In normal (extant (503.1), non-anomalous) use, a BIRD (200) and its associated item (100) will have an authorized user (AU) who has most recently identified itself to the BIRD (200) via biometrics (152) or via routine login (user name, password, etc.) (152). If the BIRDed-item (102) is On-Person (138.OnP), current iteMetrics (154) will be indicative of a certain usage of the item (100), which will preferably reflect a likelihood that the item (100) is currently on the person of the authorized user (AU). If the BIRDed-item (102) is off-person (138.OffP)—it is resting on a table, or in storage, etc.—the general iteMetric usage (particularly the psyIteMetrics (158)) will preferably be consistent with the usage expected of the item for the authorized user (AU), and the most recent morphIteMetrics (156) will be indicative that the item (100) was in control of the authorized user (AU).

In other words, under normal conditions, the user-authentication established via biometrics (152), and the sensed identify established via iteMetrics (154), should be consistent with the same authorized user (AU). Any disparity suggests a possibility of a displaced (503.0) or anomalous (503.2) state of the item (100), as discussed further throughout this document.

Alternative Authentication/Identification Metric Schemas

The user authentication/identification schemas discussed above, and presented in FIG. 1J, are exemplary only. Additional and alternative user authentication/identification means, methods, and schemas may also be employed, consistent with the present teachings, system, and method. In general, and in an embodiment, a BIRD (200) may employ input means (226, 240, 282), sensors (210), sensors data (700), and processor (204) to:

(i) authenticate an authorized user (AU) through active user input and interaction for authentication purposes;

(ii) to maintain substantially real-time, on-going identification of the authorized user (AU), as long as the BIRDed item is on the person off, or in appropriate proximity to, the user;

(iii) to maintain in memory (206) the most recent authentications and identifications, even if the BIRDcd-item (102) is no longer in proximity to the user; and (iv) to compare the on-going identification of the current user or most recent user, against the identity of the most recently authorized, authenticated user, to determine whether or not the two are the same.

FIG. 1K

Item Statuses, Extant Item States, and Displaced Item States

In an embodiment, a BIRDed-item (102) is configured to self-assess if it is in a state (503) of being extant (503.1) or is instead in an item state (503) of being displaced (503.0). As discussed above, and discussed in greater detail in conjunction with figures throughout this document, in an embodiment such self-assessment is based on a comparison, by the BIRD (200), between usage data (700.U) and usage expectations (600).

Item Statuses

In an embodiment, in comparing usage data (700.U) with usage expectations (600), BIRD logic (500) may rely in whole or in part on a determination of Item statuses (501). An item status (501) is a determination of some particular condition of the BIRDed-item (102) in relation to its environment (104). For example, an item's condition of being on-person (138.OnP) or off-person (138.OffP) may be one status (501) of the item. Similarly, the item (100) being in one condition of motion from among user-movement (139.UM), stationary (139.StaT), or stagnant (139.StG) may be an item status (501). AWOL status (128) ("yes" or "no") is yet another status (501). An item's location as being at a home base (140.HB), in a particular zone (140.Z), being in a daily life location (140.DL), or out-of-bounds (140.OoB) may be yet another applicable status determination (501). An item's association (131) with an authorized user (AU) or unauthorized user (UU) is another status determination (501).

Other statuses (501) may be envisioned as well, including for example and without limitation: whether an item (100) is or is not subject to an expected temperature range; whether the item (100) is or is not subject to an expected level or pattern of light exposure; whether the item (100) is or is not subject to an expected level or pattern of sound exposure; and so on.

Item statuses (501) may also be indicative of internal item operating conditions, especially for active items (100.Act) (typically processor-based items) discussed further below in this document. For example, an active item (100.Act) may have an on/off status, a status of being logged into a network or not logged into a network, a status associated with linking to expected network IP addresses or not, and so forth.

Informally, an item status (501) may be thought of as some kind of fairly particular, well-defined condition in which the item (100) is, or has been for some time, such as carried on-person or not, in personal motion (104.M) or not, with a particular person or not. The term "status" is used in this document for such determinations, to distinguish from "conditions" as a term that is generally applied to the environment. (So this document refers to "environmental conditions," meaning the environment surrounding or impacting upon the item (100); and to "item statuses" as indicative of a relationship between the item (100) and its environment (104).

It will be noted that, in some instances, more than one item status (501) may apply, and/or one item status (501) may encompass another. For example, an item (100) may be in a daily life location (140.DL), and also be within a home base location (140.HB) within the daily life location (140.DL). Similarly, an item which is stagnant (139.StG) is also stationary (139.Stat). In an embodiment, it may be the more limited or localized status (501) which is indicative, reflective, or determinative of an item's condition as extant (503.1) or displaced (503.0). For example, a BIRDed-item (102) which is stagnant (139.StG) is more likely to self-assess as displaced (503.0) than if the same BIRDed-item (102) is merely stationary (139.StaT) but not stagnant (139.StG).

Combined Personal Motion and On-Person/Off-Person Statuses:

In an embodiment, personal motion status (139) and on-person/off-person status (138) may be combined into a single, integrated personal motion status (139). In such an embodiment, a personal motion status value of "user movement"

(139.UM) is also indicative of a status of on-person (138.OnP). Similarly, in such an embodiment, a personal motion status of either stationary (139.StaT) or stagnant (139.StG) are both indicative of a status of off-person (138.OffP).

Data Flow

Figure 1K:
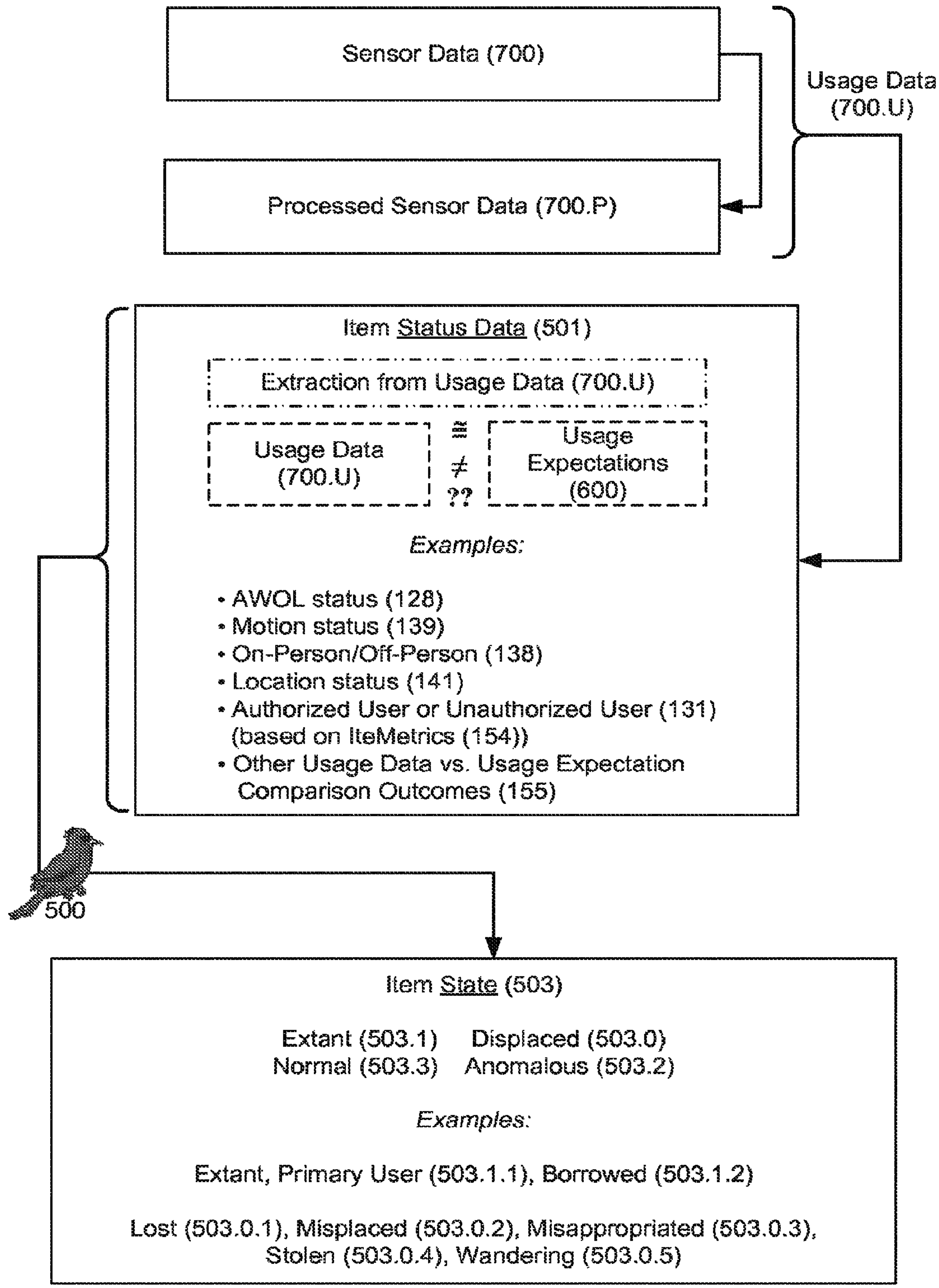
FIG. 1K is a data flow diagram illustrating the self-assessment of BIRDed-item state data based on raw sensor data, according to an exemplary embodiment of the present system and method.

In an embodiment, a BIRD (200) may rely on several general statuses (501) of an item (100) to determine item states (503), such as if the item (100) is extant (503.1) on the one hand, or lost (503.0.1), misplaced (503.0.2), misappropriated (503.0.3), wandering (503.0.5), or stolen on the other hand. FIG. 1K is a data flow diagram illustrating the evolution from raw sensor data (700) to item status data (501) to item states (503), as the BIRD (200) of a BIRDed-item (102) self-assesses the item state.

Sensor Data Collection:

State self-assessment begins with on-going, real-time collection of raw sensor data (700), which may include, for example and without limitation: location data, motion data, light data, image data, sound intensity data, sound quality data, temperature data, environmental chemical data, moisture and humidity data, pressure data, and other forms of data as well. Collection of sensor data (700) by BIRD sensors (210) is discussed in association with figures throughout this document.

Processed Sensor Data:

Raw sensor data (700) is analyzed by the BIRD's processor (204) to generate processed sensor data (700.P). Processed sensor data (700.P) may include various forms of derived data, which may include for example and without limitation: statistical values, maximum and minimum values, trend detections, pattern analysis, correlations, threshold crossings, identifications of environmental entities, waveform construction and analysis, and various determinations of iteMetrics (154). For further discussion see for example FIGS. 1J, 7A, 7B, 8A, 12A, and other figures throughout this document.

Usage Data:

Raw sensor data (700) and processed sensor data (700.P) are referred to, in aggregate, as usage data (700. U).

Status Data:

In an embodiment, specific item statuses (501) may be arrived at by comparing specific elements of usage data (700.U) against corresponding specific elements of usage expectations (600). In an alternative embodiment, specific item statuses (501) may be arrived at by comparing specific elements of usage data (700.U) against general item usage parameters which may be elements of, or partial elements of, usage expectations (600). In an alternative embodiment, specific item statuses (501) may be arrived at by direct extraction of specific values or ranges of values from usage data (700.U).

Several exemplary item statuses have already been discussed above, (see FIGS. 1B and 1C), and are discussed further below as well (see for example FIGS. 1K, 1L, 5A-5G, 12A, 13C, 14D, 14G, 16B, and other figures throughout this document). Item statuses (501) may include, for example and without limitation: AWOL status (128); on-person/off-person status (138); motion statuses (139); location status (141) (which may entail characterization of the location as home-based (140.HB), daily life (140.DL), out-of-bounds (140.OoB), travel routes (140.CR), and/or zones (140.Z), or similar characterizations); and item association (131) with an authorized user (AU) or unauthorized user (UU) (based on iteMetrics (154)).

Other statuses (155) may be envisioned as well, for example based on comparisons between, for example and without limitation: actual light conditions and expected light conditions; actual ambient sound conditions and expected ambient sound conditions; actual ambient temperatures and expected ambient temperatures; actual atmospheric conditions and expected atmospheric conditions; actual item use and expected item use; actual item internal operations states and expected item internal operations states.

Status Data Outcomes:

In an embodiment, some or all item status determinations (501) are expressed in terms of a single outcome from among several possible discrete outcomes (AWOL (128) or not AWOL (128); on-person/off-person (138); personal motion/stationary/stagnant (139); authorized user (AU) or unauthorized user (UU) (131); and so on). In an alternative embodiment, multiple outcomes may be applicable, but the outcomes may be prioritized in terms of significance; for example, an item (100) which is stagnant (139.StG) is also stationary (139.StaT), but the stagnant status (139.StG) will generally be prioritized.

In an alternative embodiment, some or all item status determinations may be expressed in terms of weighted likelihoods or probabilities of several possible discrete outcomes from among a set of possible discrete outcomes. In an alternative embodiment, some or all item status determinations may be expressed in terms of a specific numeric value or ranges of values indicative of probabilities, likelihoods, correlations, degrees of pattern matching, or other factors with continuous ranges or valuations.

Item States:

In an embodiment, BIRD logic (500) may rely upon the outcome of a single category of item status assessment (501) in order to assess the current item state (503). In an alternative embodiment, BIRD logic (500) may rely upon the outcome of multiple different categories of item statuses (501) in order to assess the current item state (503). Flow charts of exemplary methods of BIRD logic (500), as well as exemplary tables of BIRD logic (500.T), are presented in conjunction with FIGS. 5A-5D, 5E(1)-5E(3), 5F-5H, below. BIRD logic (500) is discussed in conjunction with other figures throughout this document as well.

Exemplary resulting item states (503) are discussed immediately below, as well as in conjunction with other figures throughout this document.

Extant and Displaced States

If a BIRDed-item (102) is able to make the self-assessment of being extant (503.1) or, especially, displaced (503.0), before the authorized user (AU) notices a possible problem, then the BIRD (200) can signal or notify the authorized user (AU) that the item is displaced (503.0). (In an embodiment, a confirmation that an item (100) is extant (503.1) is typically not required.)

In the discussion immediately below, item states (503), both extant (503.1) and displaced (503.0), are characterized both in terms of:

(i) objective environmental conditions which are indicative of the item states (503); and (ii) a likely or typical mental state of the authorized user (AU) in relation to the item (for example, "an item is lost or misplaced if the user does not know where the item is located").

Note that objective environmental conditions associated with extant (503.1) and displaced (503.0) states are discussed further below in this document, in conjunction with FIG. 1L, FIGS. 5A-5H, and other figures throughout this document.

Of course, A BIRD (200) cannot detect and identify the purely mental states of an authorized user (AU). However, a BIRD (200) associated with an item (100) is configured to identify objective item statuses (501) (including possibly internal item statuses (501), for active items (100.Act)), which likely indicate that the item (100) as a whole is in some extant state (503.1) or displaced state (503.0) (lost, misplaced, stolen, misappropriated, wandering). In turn, the displaced states (503.0) are likely to be associated with, and very likely induce, certain distinctive and typically negative mental states in the authorized user (AU). The sooner an item (100) is restored to an extant (503.1) state, the more likely that the authorized user (AU) is restored to a more positive state of mind.

The systems and methods taught in this document pertain, in part, to the identification of the external and internal environmental item conditions which enable a BIRD (200) to self-assess, based on those conditions, certain associated item states (503). However, as an aid to understanding, the likely, colloquial statements of associated human mental states, reflective of or responsive to human knowledge of various item states (503), are included below as well.

Extant (503.1) refers to an item (100) which is where it (the item) should be at a given time, whether on the authorized user's person ("Got it!"), in appropriate proximity to the authorized user (AU) and/or under the authorized user's control, or in appropriate and known storage.

Put another way: if an item is extant (503.1), the item is present, or in place, or located, or in-use where it would be expected to be present, placed, or located, or in-use, at a given time.

Put another way: an extant item (100) is in an environment or subject to an environment (104) consistent with the environment it is expected to be in, or expected to be subject to, at a given time. In field use, this typically means the item (100) is with the authorized user (AU) when the authorized user (AU) expects to have the item in hand, on-person (138.OnP), or in close proximity.

An item's possible state of being extant (503.1) on the one hand, and the possible displaced states (503.0) of being lost (503.0.1), misplaced (503.0.2), misappropriated (503.0.3), stolen (503.0.4), or wandering (503.0.5), are mutually exclusive states. It is a purpose of a BIRD (200) to determine, with a useful degree of reliability, the probability that an item (100) is extant (503.1) on the one hand; or displaced (503.0) or otherwise in an anomalous (503.2) state on the other hand.

The term "extant" may refer both to an item being with a primary authorized user (AU), and also to the item being with an authorized secondary user or borrower (discussed immediately below). Where a specific distinction of the primary authorized user (AU) is intended, the state may be referred to as "extant, primary user (503.1.1)."

(Another possible English term for "extant" might be "present." That is, an extant item (100) is present when and where it's expected to be, and/or present with an appropriate user. Because the term "present" is used in other ways and in other contexts throughout this document, the term "extant" was chosen to avoid ambiguities.)

Borrowed (503.1.2) refers to an item (100) in a specialized borrowed state (503.1.2) of being extant (503.1). Specifically, a borrowed item (100) is not with a primary or main authorized user (AU) (such as the item's owner), but the item is with another, secondary authorized user (AU) who has some kind of limited authorization to possess or control the item (100). Typically, the borrower's authorization to possess the item (100) has been delegated to the borrower by a primary or main authorized user (AU). Also, the borrower's authorization to possess the item (100) may be constrained by one or more of time limits, location limits, and/or usage limits on the borrowed item.

Displaced (503.0) means the BIRD (200) and its associated item (100) are possibly in a state of being lost (503.0.1), misplaced (503.0.2), misappropriated (503.0.3), wandering (503.0.4), or stolen (503.0.5). More generally, displaced (503.0) is an umbrella term to describe any item (100) which is not where it's expected to be or should be, and/or is not with the authorized user (AU) it should be with, at a given time.

Displaced item states may include, for example and without limitation:

Lost (503.0.1): An item whose whereabouts are unknown, which is not in possession of an authorized user (AU), and is generally not anywhere within any of its expected, localized usage or storage locations (144.L) (also referred to as home base locations (140.HB), see FIG. 1H below). The user may have left or dropped the item (100) just about anywhere, and in fact the item is sitting someplace which is nowhere near where it's supposed to be. ("I don't know where it is, and I sure hope I didn't leave it at the restaurant . . . or the bowling alley . . . or on the bus . . . ")

Misplaced (503.0.2): An item (100) whose whereabouts are unknown, and which is not in possession of an authorized user (AU), but which is somewhere within any of its standard, localized usage or storage locations (a home base location (140.HB)). For example, the item (100) is around the home or office, or other expected place, but the user has forgotten where. ("I don't know where it is, but I'm sure I left it around the house someplace.")

Misappropriated (503.0.3): An item (100) in possession of an unauthorized users (UU), but typically a user who is known to the authorized user (AU), and who has obtained the item without ill intent. For example, someone else, perhaps family, friend, or a co-worker, picked up the item, likely by accident. ("Did my husband take my keys again?!")

Stolen (503.0.4): An item (100) in possession of an unauthorized person, typically (though not always) a person who is unknown to the authorized user (AU), and who has obtained the item (100) with deliberate illicit intent. Stolen generally means the same thing as criminal theft of the item. An example is an item taken by a total stranger for purposes of unauthorized use, sale of the item, etc. ("Hey, where is my wallet—oh, no, that guy who bumped into me on the elevator . . . ")

Wandering (503.0.5): An item (100) in possession of an authorized user (AU), but being carried about at a time or at a place where the authorized user (AU) should not have it. An example is an item normally meant to be used and stored in some institutional setting (a work location, for example), which the user has accidentally carried outside the setting (for example, the user has taken the item home). ("Daddy, were you supposed to bring this thing home? . . . . This thing, the one with the funny picture and the letters that say R-A-D-I-O-A-C-T-I-V-E . . . ")

Overlapping Item States

Generally, and in an embodiment, the displaced item states (503.0) characterized above are mutually exclusive. However, in an alternative embodiment, some displaced item states (503.0) may be mutually coexistent. For example, for an item (100) which may be subject to shared use by two or more co-workers, the same item (100), at one and the same time, may be identified as being misplaced (503.0.2) with respect to a first authorized user (AU) (who wants to use the item "now", on the job); while being identified as being wandering (503.0.5) with respect to a second authorized user (AU) who has taken the item home by accident. The BIRD (200) associated with the item (100) may be configured to detect both states, and to alert both authorized users (AU) appropriately.

Other Item States

The item states (503) listed above-extant (503.1), borrowed (503.1.2), lost (503.0.1), misplaced (503.0.2), misappropriated (503.0.3), wandering (503.0.5), or stolen-cover some exemplary, possible usage states (503) for an item, but the list is not exhaustive. Another state (503) is discussed below as well: In-Transit. Other item states (503) may be characterized as well, and such other states may be identified by systems and methods within the scope of the present teachings.

In an embodiment, a BIRD (200) is specifically configured to discriminate among different states of item displacement (503.0), that is, to distinguish between an item (100) being lost (503.0.1), being misplaced (503.0.2), being stolen (503.0.4), being misappropriated (503.0.3), wandering (503.0.5), etc. In an embodiment, BIRD song (900) is configured to provide different types and levels of messages (374) and local signals (372), as well as other possible responses, depending on the type of item displacement (503.0) which it identifies.

Further Note on Lost Items

An authorized owner or user of an item (100) may himself/herself become lost, as in traveling into an unknown location or taking a mistaken route while on a trip. However, this is typically not the intended meaning of "lost" as used in this document. "Lost," as used in this document, typically refer to the state or condition of an item in relation to an authorized owner or user. So if an authorized user (AU) take a wrong turn on a road trip, but still has their keys (100.K) and wallet (100.W) with them, then the owner may be lost but the keys and wallet, per se, are not lost.

Qualification:

In an embodiment, an authorized owner may configure a BIRD (200) to expect an item (100) to travel a certain route at a certain time. There are at least two possible signaling scenarios which may ensue:

(i) If the authorized user (AU) loses the item (100), the BIRD (200) may determine that the item (100) is not along the expected route (and is not traveling with the user) at the expected time; the BIRD (200) may then initiate a signal that the item (100) is lost (503.0.1).

(ii) The user may retain possession of the item (100), but the user himself/herself becomes lost (for example, taking a mistaken route while in the car). The item (100) per se is not actually lost, since the authorized user (AU) has it in hand. However, since the authorized user (AU) is driving on the wrong road, the item (100) itself is not on the expected route at the expected time. As a result, the BIRD (200) may still identify the item (100) as being lost (503.0.1). The resulting signal from the BIRD (200) to the authorized user (AU) may still be helpful to the user by alerting him/her of being personally lost, assuming the user hasn't noticed that already.

FIG. 1L

ExD Criteria: Distinguishing Extant vs. Displaced Item States

As noted above, ExD criteria (170) reflect item usage as it might be expressed in plain language by an authorized human owner or user of an item. ExD criteria (170) may also reflect item usage as might be indicated by an authorized user (AU) via selections of choices readily made via a dialog box on a graphical user interface, or similar.

The particular ExD criteria (170) for an item (100) being extant (503.1), or in the alternative for being displaced (503.0) (lost, misplaced, misappropriated, stolen, or wandering), will vary from one item (100) to another and also from one authorized user (AU) to another. However, some broad ExD criteria are likely to be widely applicable to many items (100) and many authorized users (AU), providing a general framework for a BIRD's extant/displaced analysis. These general criteria may be a partial basis for exemplary designs/algorithms for BIRD logic (500). They can also be helpful both in preconfiguring a BIRD (200) at the factory with default values for usage expectations (600), and in guiding an authorized user (AU) in configuring a BIRD (200) or fine-tuning BIRD configuration with usage expectations (600).

It will be understood that the exemplary, general ExD criteria (170) presented immediately below are by no means exhaustive, nor are they definitive. Alternative, different, or additional criteria (170) may be applicable depending on the particular item (100), particular usage, particular authorized user (AU) or users, and particular environmental contexts. FIG. 1L presents Table 172 with a partial and abbreviated summary of the generalized ExD criteria discussed here. In conjunction with the ExD criteria (170), exemplary elements of possible associated BIRD logic (500) are presented below as well.

Extant

Extant (503.1) is a state where the item (100) is where it's supposed to be, and/or in-use by an authorized user (AU), when expected. If the BIRD (200) does not identify the item (100) as possibly being in a state of being displaced—that is, the item (100) is not lost (503.0.1), not misplaced (503.0.2), not stolen (503.0.4), not misappropriated (503.0.3), and not wandering (503.0.5)—then the BIRD (200) generally identifies the item (100) as being extant (503.1).

An item (100) may be identified by its associated BIRD (200) as being extant (503.1) if it is within a daily life location (140.DL) (including a home base location (140.HB), or along an allowed commuting route (140.CR)); the item is in user-movement (139.UM) or stationary (139.StaT), but is not stagnant (139.StaT); the item is not AWOL (128); and the item is currently with, or most recently with, an authorized user (AU) (possibly including a borrower).

ExD criteria (170) which may be defined by an authorized user (AU) may include, for example and without limitation: the home base locations (140.HB) and daily life locations (140.DL); the allowed time (stationary limit (133)) before an item (100) is considered stagnant (139.StaT) in a given detection context (123); and the detection context time ranges (105), which in turn affect BIRD AWOL determinations (128).

Lost

A BIRDed-item (102) may self-assess as possibly being lost (503.0.1) if:

(i) the item (100) is in a daily life location (140.DL) but it is not located within a known, established home-base/storage location (140.HB) for the item (or possibly not located within an established zone (140.Z) for the item), or the item (100) is in an out-of-bounds location (140.OoB);

(ii) the item (100) shows indications of not being in possession of any person when it should be in possession of some person (preferably an authorized user (AU))—typically, the item (100) is stagnant (139.StG); and (iii) the most recent user of the item (100) was the authorized user (AU). (If this last condition is not met, the item is more likely misappropriated (503.0.3) or stolen (503.0.4), see below.)

More concisely, an item (100) may be lost (503.0.1) if it is stagnant (139.StG) while away from any home-base/storage location (140.HB).

For example, if the authorized user (AU) leaves an item (100) behind in a store or restaurant, the item is likely to remain in-place, stationary, in a location which may be within the daily life domain (140.DL), but is not a home-base/storage location (140.HB). The item is now effectively lost (503.0.1).

Overall personal motion (104.M), or lack of personal motion, is not the only possible "signature" or indicator of an item (100) being lost (503.0.1). Inappropriate exposure to light and/or sound, may also be indicators that the item is not in possession of a person when it should be in possession of a person. For example, an item which is exposed to light, when it should generally be in the user's pocket (and so shielded from light), may very well be lost (503.0.1). Other iteMetrics (154) may be indicators as well. The authorized user (AU) may characterize ExD criteria (170) which are the basis for iteMetrics (154), and in particular may be the basis for psyIteMetrics (158), which in an embodiment generally reflect the authorized user's habitual or typical usage of an item (100). The ExD criteria (170), once formalized, may be in whole or in part a basis for usage expectations (600).

Misplaced

Misplaced (503.0.2) is a state where the item (100) is around the home or office or other expected home base/storage location (140.HB), but the user has left the item lying around for longer than the stationary limit (133) (that is, the item is stagnant (139.StG)), or the item (100) is someplace in the wrong zone (140.Z) within the home base (140.HB). Either condition suggests the user has forgotten where the item (100) is.

Appropriate ExD criteria (170) may include characterizations, by the authorized user (AU), of zones (140.Z) as detection contexts (123) within the home base locations (140.HB); stationary limits (133) for an item (100) within the home base zones (140.Z); and other aspects of expected item usage within the zone-bounded detection contexts (123).

In an embodiment, a BIRDed-item (102) may self-assess as possibly being misplaced if:

(i) it is located within a known, established home-base location (140.HB) and/or storage location (140.HB) for the item, but (ii) the item shows indications of not being in possession of any person—that is, the item is not being carried on-person (138.OnP)—when it should be in possession of some person (preferably an authorized user (AU)), and the off-person status (138.OffP) exceeds an allowed time (the stationary limit (133)).

In an alternative embodiment, a BIRDed-item (102) may self-assess as possibly being misplaced if:

(i) it is located within a known, established home-base location (140.HB) and/or storage location (140.HB) for the item, (ii) the item (100) is not being carried On-Person (138.OnP), at a time when that is considered normal for the item (for example, in the evening or at night, when the authorized user (AU) and the item are both at home, and the item is expected to be off-person (138.OffP) for an extended time), but . . .

(iii) the item (100) is located in an inappropriate zone (140.Z) within the home base (140.HB) (for example, the item should be stored in the kitchen, but the item is instead in the living room, or the garage, etc.); that is, the item (100) is AWOL (128) with respect to the zone (140.Z) it should be in.

Another exemplary indicator that an item (100) is misplaced is that the item (100) is present in the home when it should be in the office (and so the item is AWOL (128) from the office); the item (100) is also most likely stationary (139.Stat), as the authorized user (AU) is at work and so not carrying or using the item (100). (Possibly, the authorized user (AU) forgot to bring the item (100) to work.)

Motion can also be characterized in terms of personal motion (104.M) probabilities, which may be an aspect of psyIteMetrics (158). In an embodiment, an authorized user's ExD criteria (170) may include estimates of the percentage of time he or she is likely to keep an item (100) on-person (138.OnP) versus the percentage of time the item (100) is likely to be kept off-person (138.OffP).

Motion, or lack of motion, is not the only possible "signature" or indicator of an item (100) being misplaced (503.0.2). In an embodiment, inappropriate exposure to light and/or sound, may also be indicators that the item (100) is misplaced (503.0.2). Sec for example the discussion of light sensing, and possible "hiding" or coverage by a newspaper or magazine, associated with eye glasses (100.S.G) set down on a table or desk, in FIG. 18C below. By way of ExD criteria (170), an authorized user (AU) can estimate how likely he or she is to keep an item (100) in pocket (or in a purse), as opposed to keeping the item (100) out where it is exposed to light.

Misappropriated/Stolen

An item (100) may be misappropriated (503.0.3) (that is, "inadvertently borrowed" by a friend, family member, or colleague), or an item may be stolen (503.0.4) (taken by an unauthorized person with intent to steal).

In many settings, such as work or home, similar items (100) may be left lying about, such as keys (100.K) or cell phones (100.Act.CP). In a work setting, essentially identical items (100) (that is, items identical in appearance), such as certain tools or devices, may be left lying about. It is possible for a family member or coworker to inadvertently pick up an item (100), intending to pick up a first item which should be under their control, and instead picking up a second, different (but similar looking) item instead. The item (100) which is actually picked up—the wrong item for that person—has not really been stolen, but it has been misappropriated or inadvertently borrowed.

A stolen item (100), of course, is one which has been outright, deliberately taken by someone who has no business removing the item. A BIRDed-item (102) may self-identify as possibly being either stolen (503.0.4) or misappropriated (503.0.3) if:

(i) the item (100) shows indications of being in possession of some person, as may be indicated, for example, by movement of the item (detected by BIRD motion sensor (210.M), discussed further below); but (ii) the BIRD (200) detects iteMetrics (154) which are not consistent with those normally associated with the use of the item (100) by the authorized user (AU).

The BIRD (200) may also self-identify the item (100) as possibly being stolen (503.0.4) or misappropriated (503.0.3) if the item (100) is stationary (139.Stat), but the iteMetrics (154) associated with the most recent holder or user of the item are not consistent with those associated with the authorized user (AU).

In an embodiment, a BIRD (200) associated with a single, particular item (100) may be configured for different, respective iteMetrics (154) associated with different respective users. It may further be expected that a particular user should be using the item (100) at certain times or dates. If the BIRD (200) detects that an authorized user (AU) is making use of the item (100), but at a time or date when the particular user should not be using the item (100), the BIRD may be configured to still report the item as misappropriated (503.0.3).

In additional to user-identity criteria, other criteria may be employed as well as a basis for a stolen (503.0.4) or misappropriated (503.0.3) state. These include location criteria, and various item usage criteria. Such criteria, as defined by an authorized user (AU), may be an aspect of the ExD criteria (170), which may be translated by various means (discussed further below) into usage expectations (600).

Wandering (Restricted Items)

Some items (100) may, by user designation, be subject to relatively strict expectations that the item remains exclusively within a designated home-base or storage location (140.HB) (either all the time, or at least during certain specific dates or hours). For example, some items (100) associated with a workplace are often expected to remain within the workplace, and not go home with the employees. (An example might be a laptop computer or other PDA (personal digital assistant) which is carried around in an office or other work setting, but is meant only for that setting and nowhere else.) Some items (100) are even more restricted, and meant to be used only within a designated building or setting, or designated rooms, within a larger facility. (Such specific location boundaries may be established through zones (140.Z).) For such restricted items, which are not meant to "wander" outside of the designated facility or setting, there is no daily life location (140.DL) beyond the designated home base(s) (140.HB) and/or designated zone(s) (140.Z).

Wandering (503.0.5): With a restricted item (100), it can happen that an authorized user (AU) of the restricted item may still, inadvertently, take the item (100) outside of its allowed location(s). Particularly if the restricted item (100) is small enough to carry inside a pocket, or even inside a briefcase or purse, an authorized user (AU) of such an item may slip the item (100) into a pocket and wind up carrying it home without even realizing it. Such an item may be said to be improperly removed or wandering (503.0.5). Other terms may be employed as well. The authorized user (AU) is inadvertently carrying the restricted item (100) from the limited home base location(s) (140.HB) and/or zone(s) (140.Z) where the restricted item (100) is supposed to be.

In an embodiment, a BIRD (200) may be configured, through the use of suitable algorithms and usage expectations (600) to identify a restricted item (100) which is wandering (503.0.5). A restricted BIRDed-item (102) may self-assess as possibly being wandering (503.0.5) if:

(i) the item is in motion; and (ii) iteMetrics (154) indicate the item is in possession of the authorized user (AU); but (iii) the item is outside of its home base location(s) (140.HB), or even outside of a specific zone(s) (140.Z) within the home base location(s) (140.HB).

Typically, an authorized user (AU) or an authorized system administrator will determine if an item (100) should be designated as one which may be wandering (503.0.5). Such a determination may be an aspect of the overall ExD criteria (170) for the item (100).

Borrowers and Borrowed Items

Borrowers are authorized users (AU) with limited or restricted control rights for an item (100), such as time and/or location limits on usage. A primary authorized user (AU) may determine which persons, if any, are authorized to be borrowers of an item (100). Such determinations are part of the authorized user's ExD criteria (170). An item which is with a borrower but is otherwise extant is considered to be borrowed (503.1.2).

FIG. 1M

Heuristics for Distinguishing Stolen Items from Misappropriated Items

From the standpoint of BIRD sensor determinations, both item theft and item misappropriation share significant common characteristics. In both cases, the iteMetrics (154) detected by the BIRD (200) are not consistent with those of the authorized user (AU). As such, it may not always be possible to immediately distinguish the two states with as high a probability level as may be possible with other item state discriminations. In such circumstances, a BIRD (200) may be configured to present signals and/or messages (372, 374) consistent with a partly ambiguous notification of the item (100) as being either misappropriated (503.0.3) or stolen (503.0.4).

However, various contextual analysis and misappropriated vs. stolen (MvS) heuristics (180) may enable a BIRD (200) to distinguish, with varying confidence levels, a stolen item from a misappropriated item. Several exemplary MvS heuristics (180) and/or contextual analysis tools are described here and are summarized in Table 182 of FIG. 1M. It will be appreciated by persons skilled in the art that these MvS heuristics (180) are exemplary only, and other such heuristic or contextual analysis tools may be envisioned within the scope of the present teachings, system, and method.

Purse Snatching Heuristics (180.1):

A "purse snatching," or similar snatch-and-run theft of a BIRDed-item (100) directly from an authorized user (AU), may be distinguished by one or more characteristics, including for example and without limitation: (i) an abrupt acceleration of the stolen item, as the item is being grabbed; (ii) an abrupt and distinctive change of iteMetrics (154) from those characteristic of the authorized user (AU); and/or (iii) defined panic movements by the snatching individual, such as a fast run, rapid changes in direction, rapid arm movements including rapid and repeated thrusting of arms, or raising and lower of arms, characteristic of a run. If a BIRD (200) detects, based on these and similar heuristics, that it (and its associated item (100)) may have been snatched, the BIRD (200) may be configured to emit loud and distinctive alerts (372) of its stolen state (503.0.4). This may enable others in the vicinity of the BIRDed-item (102)—both law enforcement, and good Samaritan bystanders—to intercept and thwart the purse snatcher.

It should be noted that if a BIRDed-item (102) is a member of an item team (1400) (discussed further below, see FIGS. 14A-141), then purse snatching may also be detected, in whole or in part, by abrupt removal of the item (100) from the vicinity of the item team (1400).

Pick-Pocket Heuristics (180.2):

A pick-pocket episode—the removal of an item (100), by a thief, from the pocket or purse of an authorized user (AU)—may be distinguished by one or more characteristics, including for example and without limitation: (i) prior identification of the item as being in-pocket, as indicated by a combination of motion sensing and possibly other sensing (for example, surface pressure sensing on the item, substantially zero illumination on the item, muffled sound detection, etc), followed by; (ii) detection of removal of the item from the pocket; (iii) immediately following, a sudden change in iteMetrics (154), such as the user's gait characteristics; (iv) near immediate placement of the item back in a pocket or other enclosure, but possibly with different pocket characteristics (for example, a different amount of surface pressure or different level of reduced illumination).

Other, possibly more subtle heuristics may be employed as well. For example, if an authorized user (AU) removes an item (100) from a pocket, he or she may well elevate the item (100) close to chest or face level for usage; a thief, however, may immediately slip the item back into a waist level pocket. More generally, the BIRD (200) may be programmed with characteristic movements associated with pick-pocket activity, based on motion studies conducted with the assistance of experienced pick-pockets, in order to identify those motions associated with pick-pocketing.

Here again, if a BIRD (200) detects that it (and its associated item (100)) may have been pick-pocketed, the BIRDed-item (102) may be configured to emit loud and distinctive alerts (372) of its stolen state (503.0.4). If an item (100) is a member of an item team (1400) (discussed further below, see FIGS. 14A-14I), then pick-pocketing may also be detected, in whole or in part, by a removal of the item (100) from the vicinity of the item team (1400) at a pace which is slower than that for a purse-snatching.

Known-Associates Heuristics (180.3):

In an embodiment, a BIRD (200) is configured with iteMetrics (154) for an authorized user (AU). In an embodiment, a BIRD (200) may also be configured with data indicative of some iteMetrics (154) for some known associates of the authorized user (AU).

For example, consider an item (100) which is commonly taken home and stored at home. A BIRD (200) associated with the item (100) may be configured to store data for iteMetrics (154) of other family members who live at the same home. Or, consider an item (100) which is commonly used at the workplace and stored at the workplace. A BIRD (200) associated with the latter item (100) may be configured to store data for iteMetrics (154) of colleagues in the same workplace. The selected, stored iteMetrics (154) may be those which pertain to the walking gait and typical arm movements of the various users, that is, morphIteMetrics (156). Other user iteMetrics (154) may be employed as well.

In operation, if the BIRD (200) detects iteMetrics (154) which are (i) other than those of the authorized user (AU), but (ii) are associated with a known-associate, the BIRD (200) may be configured to flag the item (100) as being misappropriated (503.0.3).

If the BIRD (200) detects iteMetrics (154) which are (i) other than those of the authorized user (AU), and further (ii) are not associated with a known-associate, the BIRD (200) may be configured to flag the item (100) as being stolen (503.0.4).

Extended-Time and/or Extended-Distance Heuristics (180.4):

If an item (100) is inadvertently taken by an associate (colleague, family member, friend) of an authorized user (AU), it is likely the unauthorized possessor will eventually notice they have an item they should not have. A thief, on the other hand, has deliberately taken an item (100) that does not belong to the thief. Therefore, the longer an item (100) is with an unauthorized users (UU), the more likely it is that the item was stolen rather than misappropriated. A BIRD (200) may be configured so that, upon initial determination that an item (100) may be misappropriated (503.0.3) or stolen (503.0.4), the BIRD (200) will assign a higher probability or weighting to the item being misappropriated (503.0.3). After a longer time, the BIRD (200) may be configured to assign a higher probability or weighting to the item (100) being stolen (503.0.4).

Similarly, there is at least some general probability that a known associate of an authorized user (AU) will tend to share roughly the same geographic daily life space (140.DL) as the authorized user (AU). On the other hand, a thief may tend to inhabit any geographic area, which may or may not be generally the same as that of the authorized user (AU). Therefore, the further an item (100) is displaced (503.0) from the daily life areas (140.DL) of the authorized user (AU), the greater the likelihood that the item is stolen (503.0.4). If an item (100) is at (or in transit within) a location that the item (100) is never found at, this indicates a higher likelihood that the item has been stolen (503.0.4). Implementing this embodiment may entail configuring the BIRD (200) to maintain an internal database of actual locations (104.L) where the item (100) has been used occasionally in the past, even in the out-of-bounds (140.OoB) locations (140.OoB).

It will be apparent to persons skilled in the relevant arts that a variety of heuristics and "rules of thumb" may be employed, and combined in various logical and probabilistic ways, to arrive at some general determination as to whether an item (100) is misappropriated (503.0.3) on the one hand, or on the other hand has been stolen (503.0.4).

If an item (100) is outside of any preferred storage location, usage location, or transit/shopping/recreational location—that is, the item is out-of-bounds (140.OoB)—this may also be indicative of the item (100) being stolen as well. However, since users will sometimes travel outside of preferred storage/usage/transit locations (144.L), travel outside of such locations (144.L) should not necessarily trigger a "stolen" state. BIRD configuration options enable users to determine such factors as how long an item (100) must be out-of-bounds (140.OoB) before a stolen state (503.0.4) is determined, and also to what extent other usage factors (in addition to location) determine that the item may be stolen (503.0.4) or is still considered extant (503.0.5).

Age-Related Heuristics (180.5):

Certain iteMetrics (154), for example those pertaining to user gait and other movements, may tend to be indicative of the age of a person, for example either that the person is a child or is elderly. Consider an item (100) which is normally in possession of a teenager or adult of middle years. If iteMetrics (154) indicate that an item (100) is in possession of either a child or elderly person, this may be more likely to be consistent with misappropriation than with deliberate theft (503.0.4).

Active Item Usage Heuristics (180.6):

Active items (100.Act) inherently have processing capabilities, and possibly sensors. (Active items (100.Act) may include cell phones, PDAs, and personal computers; see FIGS. 13A-13C and other figures throughout this document.) Active items (100.Act) may have particularly distinctive signatures of use, such as the call phone numbers called, the locations of cell phone numbers called, types of web sites visited, or even types of games played on a device, and so on. IteMetrics (154) may be devised which analyze the usage of an active item (100.Act) to determine general usage characteristics by the authorized user (AU). Once the active item (100.Act) has been misappropriated (503.0.3) or stolen (503.0.4), if the subsequent iteMetrics (154) are even partially consistent with that of an authorized user (AU), this increases a possibility that the item has been misappropriated (503.0.3); while iteMetrics (154) that are wholly inconsistent with an authorized user (AU) indicates an increased possibility of theft (503.0.4).

Geographic or Situational Heuristics (180.7):

Certain geographic areas may be associated with higher crime rates; if an item was transferred from an authorized user (AU) to an unauthorized users (UU) in such a high-crime area, this may contribute to an assessment that the item (100) may have been stolen (503.0.4). If the item transfer (from authorized user (AU) to unauthorized users (UU)) occurred in a social context with a very high density of persons (as may be determined for example by BIRD visual or sound analysis), this may suggest an environment conducive to activity by a pick-pocket. Alternatively, if the item transfer occurred in an environment of very low people density and also darkness (for example, an isolated street at night), this may also suggest a possibility of a mugging or theft. (In the latter case, a mugging victim who is left unconscious may benefit from an automated alert, by the BIRD (200), to police of the possibility of a personal attack.)

Heuristics Combinations:

In an embodiment, a combination of the item (100) not being in-use as expected, and also the item (100) not being subject to expected environmental conditions (144), may be a stronger indicator of the item (100) being stolen than either unexpected usage or unexpected environment alone. More generally, a combination of heuristics (180), possibly weighted as to importance, may be a more reliable indicator of stealing vs. misappropriation than any one heuristic (180) by itself.

These MvS heuristics (180) and similar ones may be integrated into either or both of general BIRD logic (500) or item/user-specific usage expectations (600), both discussed further below.

FIG. 1N

Borrowed Items and Borrowers

In an embodiment, a BIRDed-item (102) may have multiple authorized users (AU).

In an embodiment, a BIRDed-item (102) may have multiple authorized users (AU) who all have equal levels of authorization for control and use of the item (100). In an alternative embodiment, a BIRDed-item (102) may have one or more authorized users (AU) who have primary and/or maximum authorization for control or use of the item (100), and the BIRDed-item (102) may also have one or more classes of authorized users (AU) with lesser or reduced authorizations for use or control of the item (100). In an embodiment, a BIRD (200) may be configured to recognize multiple different users. The BIRD (200) may also be configured to store multiple different user-specific usage expectations (600) reflective of both different usage patterns and/or different control levels for various users.

In an embodiment, a BIRD (200) may be configured with two or more classes or categories of usage expectations (600), with the classes being applicable to different users. For example, different categories of usage expectations (600) may define different geographic areas (104.L) (home base locations (140.HB), daily life locations (140.DL), out-of-bounds (140.OoB), and zones (140.Z)) of varying scopes; these usage expectations may be assigned as appropriate to different authorized users (AU).

In an embodiment, a BIRD (200) may have at least two categories of authorized users (AU), among them being: (i) owners/lenders/primary authorized users (AU) and (ii) borrowers.

An owner may understood in the conventional sense as a person or persons who purchased the item (100) associated with the BIRD (200), or a person who received substantially enduring, lawfully recognized possession and control of the item (100) through some transaction other than a purchase (for example, receiving the item as a gift). In a corporate or organizational context an item (100) and associated BIRD (200) may have an authorized administrator who functions in proxy for the corporate owners. In the present context, an owner may also be considered to be a lender who may lend the item (100) to a borrower. The owner of an item (100), or any person who can authorize the lending of the item (100), may also be referred to as a primary authorized user (AU).

A borrower may also be understood in the conventional sense, as a person or persons who have received—from a primary authorized user (AU), lender, or owner—a limited right to possess and control an item (100). The possession and control of the item (100) is typically limited by agreement or conventional understandings, which may be reinforced via the associated BIRD (200). For example, the limited right(s) of a borrower may extend for a limited period of time, and/or may entail other limits such as on the types of uses to which the item (100) may be put, the locations (144.L) to which the item is allowed or authorized to be taken, etc. In organizational or business contexts, a borrower may be an employee, a lessee, an item renter, and so on. Borrowers of an item may also be considered to be secondary authorized users (AU) or temporary authorized users (AU).

In an embodiment, an owner/lender/primary authorized user (AU) of an item may have access to BIRD operations which enable or authorize the lending of the associated item (100). These operations may include authorizing configuration of the BIRD (200) for use by the borrower (using for example the exemplary configuration methods listed below), and setting limits on the use of the borrowed item (100) by setting custom, borrower-associated usage expectations (600) for the BIRD (200). For example, the lender may be able to limit the time period during which the BIRD (200) will consider the borrower to be a valid user, or the lender may limit the geographic areas into which the borrower may take the item (100). Other limitations may be envisioned as well.

Lent items: A lender's item (100) which is being configured in preparation for lending, or which is currently in use by a borrower, may be referred to equivalently as the lent item or as the borrowed item. Such an item still remains, at all times, the lender's item (100.Lender's), meaning it ultimately is owned by or belongs to the lender.

Items belonging to borrower: The borrower may possess items (100) of his own or her own, from which some or all usage expectations (600) may be transferred or copied to other items. Such an item is referred to as a borrower's item (100.Borrower's) (which is not to be interpreted as, or confused with, a borrowed item: a borrower's item (100.Borrower's) is one that actually belongs to the borrower, while a borrowed item (100.Lender's) belongs to the lender.

A BIRD (200) may be configured to permit use and control of its associated item (100) by a borrower. FIG. 1N presents Table 192 which summarizes several exemplary methods (190) of BIRD configuration for use by a borrower, which are also discussed immediately below.

(190.1) Transfer of Usage expectations from a Borrower's Item/BIRD to a Lent Item/BIRD In an embodiment, an authorized user (AU)/lender of the BIRDed-item (102) specifically configures the BIRD (200) with suitable usage expectations (600) for the borrower. This may be accomplished in any of several ways. Usage expectations (600) for a borrower may be transferred from a first BIRD (200.Borrower's) principally associated with an item (100.Borrower's) belonging to the borrower, to a second BIRD (200.Lender's) associated with a second item (100.Lender's) belonging to the lender.

Data transfer of usage expectations (600) may be accomplished via various means and methods discussed further throughout this document. One method, for example, would be to upload the usage expectations (600) from one BIRD to another via a configuration computer (335). In an embodiment, direct data transfer between two BIRDS (200) may also be accomplished via wired or wireless means. (See for example FIG. 1G (panel C) above, and FIGS. 3D and 3E below.)

(190.1.S) Transfer of Usage expectations from Similar-Item to Borrowed Item

In an embodiment, the first item, belonging to the borrower, may be of a very similar type to the second item, belonging to the lender. For example, the lender may be lending a tennis racket (100.R) to the borrower. The borrower may already have a tennis racquet of her own. In this case, usage expectations (600) associated with the borrower's tennis racquet may be programmed into a BIRD (200) associated with the lender's tennis racquet. These same-item or similar-item usage expectations (600) may therefore provide a substantially complete and accurate picture of how the borrowed item (100) will be used by the borrower. In particular, both morphIteMetrics (156) and psyIteMetrics (158) copied from the borrower's own tennis racquet may be suitable for a different, borrowed tennis racquet.

(190.1.D) Transfer of Usage Expectations from Dissimilar-Item to Borrowed Item

In an alternative embodiment, the first item, belonging to the borrower, may be of a substantially different type than the second item, belonging to the lender. For example, the lender may again be lending a tennis racket (100.R) to the borrower. However, the borrower's usage expectations (600), which will be copied to a BIRD (200) associated with the borrowed tennis racquet (100.R), may be taken from a BIRD associated with the borrower's wallet (100.W). These different-item usage expectations (600) may provide only a partial picture of how the borrowed item (100.R) will be used by the borrower. For example: Elements of the borrower's morphIteMetrics (156) which pertain to how the borrower generally walks may be applicable to both a wallet (100.W) and a tennis racquet (100.R). However, elements of the morphIteMetrics (156) which pertain to how the borrower would move on a tennis court may not be applicable; either the borrower may never carry her wallet (100.W) On-Person (138.OnP) on the tennis court, or the borrower would keep her wallet (100.W) in a pocket while on the tennis court but not keep her wallet in hand. Similarly, some elements of psyIteMetrics (158) may be applicable in transfer from a wallet to a tennis racquet, while others may not.

In an embodiment, when a lender configures a BIRD (200.Lender's) with transferred usage expectations (600), which are taken from a BIRD (200.Borrower's) owned by the borrower, the lender indicates which elements of the borrower's usage expectations (600) are applicable.

(190.2) Configuration of Borrowed Item Via Borrower-Driven Configuration or Training In an embodiment, a borrowed item (100) may be configured by the borrower to recognize the borrower's iteMetrics (600). The configuration by the borrower is done via a training session, using methods substantially the same or similar as those employed to train the BIRD (200) for normal use by a primary authorized user (AU). In an embodiment, the BIRD (200.Lender's) must first receive authorization from an authorized primary user before permitting a borrower to train the BIRD (200.Lender's) for the borrower's iteMetrics. See FIGS. 1D, 3A, 3B, 10D-10I, and other figures throughout this document for a discussion of BIRD training sessions.

(190.3) Generic Usage Expectations for Generic Borrower

In an embodiment, a lender may elect to authorize an item (100.Lender's) for generic borrowing. This may occur, for example, in a home base context, such as a person's home or a place of employment or similar. When an item (100.Lender's) is to be available for generic borrowing, the associated BIRD (200.Lender's) is configured so that any person may use the item (100.Lender's), but most likely with various limitations on the usage. For example, a BIRD (200.Lender's) may be configured so that any person may use its associated item (100.Lender's), but only within a limited geographic range of a central location. Or, for another example, the BIRD (200.Lender's) may be configured so that any person may use its associated item (100.Lender's), but only for a limited period of time; in an embodiment, the time clock or "count down" on the limited usage would commence when the BIRD (100.Lender's) detects, via iteMetrics (154), that a user other than the primary authorized user (AU) has put the item (100.Lender's) into use.

(190.4) Generic Usage Expectations for Generic Class of Borrowers

In an embodiment, a lender may elect to authorize an item (100.Lender's) for generic borrowing, similar to that discussed above, but only for a limited class of users. In this application, the BIRD (200.Lender's) associated with the item may be configured similarly to the configuration described immediately above, but with additional limitations based on iteMetrics (154). For example, in home use, a BIRD (200.Lender's) may be configured so that an item (100.Lender's) may be borrowed by adults or teens, but not children; if the BIRD (200.Lender's) detects iteMetrics (154), such as motion signatures, indicative of the item (100.Lender's) being in possession of a child, the BIRD (200.Lender's) may signal that the item is misappropriated (503.0.3) (rather than borrowed (503.1.2)).

In embodiment, the class of allowed borrowers configured into the BIRD (200.Lender's) may be identified based on the iteMetrics (154) of the associated item (100). In an alternative embodiment, the class of allowed borrowers may be identified based on supplemental signatures, such as active (electronic, magnetic, etc.) organizational identification (ID) cards, or other ID technologies which may be possessed by authorized borrowers. In an embodiment, a BIRD (200.Lender's) may be suitably designed and configured to receive and recognize signals from such identification technologies.

FIG. 1O

Summary Listing of Some Embodiments

FIG. 1O presents Table 194 which summarizes some embodiments of items (100), BIRDs (200), BIRDed items (102), and some related elements discussed throughout this document. (The table is labeled as "1[O]" in the figure, to avoid possible confusion as "FIG. 10.") The table is presented for reference and convenience only, and should in no way be construed as limiting. Extensive discussions of the elements listed in the table are presented throughout this document.

It should also be noted that not all embodiments are listed in the table. For example, lender's items (100.Lender's), a lender's BIRD (200.Lender's), a borrower's item (100.Borrower's), and a borrower's BIRD (200.Borrower's)—all discussed above in conjunction with FIG. 1N—are not listed in the table for FIG. 1[O].

It should also be noted that an element of the present system and method may often be understood in terms of more than one embodiment. For example, a particular item, such as a briefcase (100. B), may be understood as one or more of:

- a passive item (100.Pass), since most briefcases (100.B) do not normally utilize a processor in their conventional operations as briefcases;
- a member (100.IT) of an item team (1400), provided the briefcase (100.B) is either a BIRDed-item (102) or an alternatively-monitored item (100.altM), such as an RFID-tagged item (100.RFID);
- a member (100.EIT) of an extended item team (1400.EIT), again provided that the briefcase (100.B) is either a BIRDed-item (102) or an alternatively-monitored item (100.altM); and/or
- as a container item (1700) in its capacity as an item which contains other items (100).

The labeling applied to the briefcase (100.B) in any given context, within this document, will depend on the primary role or function in which the briefcase is being described in that context. Similar considerations apply to other elements discussed throughout this document. For example, a cell phone may be labeled as: "340" when being described in its use and capacity as a phone to receive voice messages, text messages, or similar data, or as a phone used to control or configure other BIRDed-items (102); "100.Act.CP" when being described in terms of its structure or function as an active item (100.Act); "102.FFP" in its capacity as a BIRDed-item (102) which is free from a person; "102.IT" in its capacity as an item team member; and so forth.

FIG. 1P

Exemplary Detection Context and Usage Specification Implementations

Introduced above, in conjunction with FIGS. 1B and 1C, were detection contexts (123). See also FIGS. 10A-10D, 11B, 12B, 12C, and other figures below for additional discussion of detection contexts (123). Generally, and for many common items (100) in common use, it may be expected that item usage by an authorized user will vary significantly at different times of day, or different days of the week, or based on different locations, or based on other contextual factors. For example, an item (100) which is in use during the day but in storage at night is obviously subject to completely different uses during those two different time frames.

Expected item usage is reflected in usage expectations (600), discussed throughout this document. The purpose of a detection context (123) is to characterize a time frame, milieu, setting, circumstance, or surrounding in which item usage is likely to be broadly consistent, or to have broadly consistent patterns.

The broadly consistent item usage, or similarly, broadly consistent patterns of item environment, are captured by one or more sets of usage expectations (600). In an embodiment, and within a given detection context (123), a BIRD (200) will generally have one or more associated sets of usage expectations (600). The usage expectations (600) contain parameters indicative of various specific aspects of expected usage of an item (100), or expected item environment. The combination of a detection context (123) and the associated usage expectations (600) provide the BIRD (200) with a basis to compare actual usage data (700.U) against how an item (100) is anticipated to be used. The details of defining detection contexts (123) and usage expectations (600), and methods for real-time comparison of usage data (700.U) against usage expectations (600), are discussed throughout this document.

Operational Application of Detection Contexts and Usage Expectations

Figure 1P:
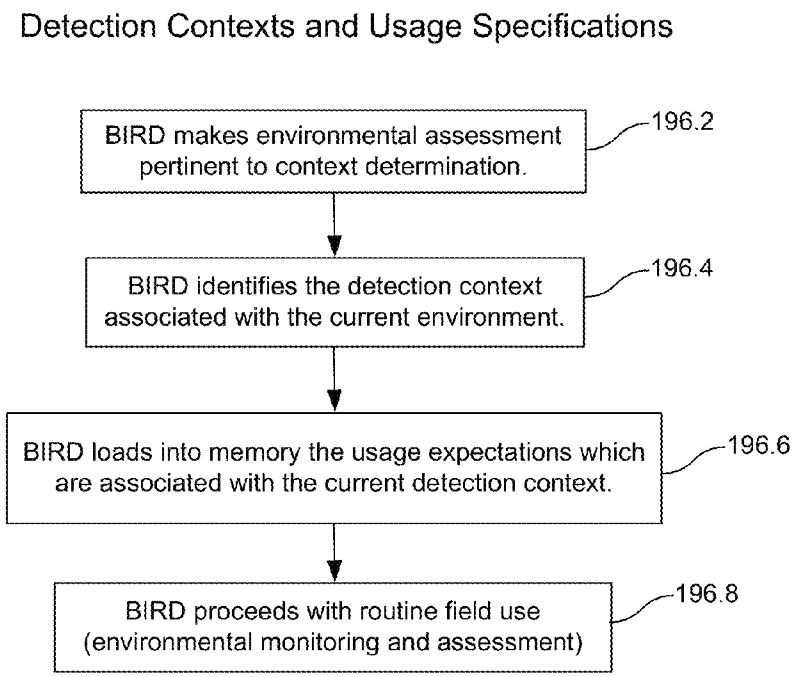
FIG. 1P is a flow chart of an exemplary method for determining an appropriate detection context and usage specification for an item.

FIG. 1P illustrates an exemplary method by which a BIRD (200) selects, in real-time, during field use, an appropriate detection context (123) and associated usage expectations (600). The method assumes that detection contexts (123) and usage expectations (600) have been previously defined.

In step 196.2 of the method, the BIRD (200) makes an environmental assessment, identifying the environmental values necessary to select the appropriate detection context (123) among several already-defined detection contexts (123). For example, if the detection contexts (123) are defined strictly in terms of detection context time ranges (105), the BIRD (200) will assess the current time (104.T).

In step 196.4, and based on for example the current time (104.T), the BIRD (200) will ascertain the appropriate detection context (123). Suppose for example one detection context (123) has been assigned for daytime hours, and another detection context (123) for night hours. If the current time (104.T) is during the day (for example, 0900 hours), the BIRD (200) identifies and loads the daytime detection context (123).

In an embodiment, the detection context (123) has been configured to contain a listing of associated usage expectations (600), or sets of usage expectations (600). In step 196.6, the BIRD (200) loads into working memory (206.M.D) the appropriate usage expectations (600) or sets of usage expectations (600).

In step 196.8, the BIRD proceeds with routine field use, that is, monitoring and assessment of the environment as per exemplary methods discussed in association with FIGS. 1B-1F, 4A-4D, 5A-5H, 14E, 16B, 17E, and numerous other figures throughout this document.

Exemplary Detection Context Embodiments

Broadly stated, a detection context (123) identifies or characterizes a setting or domain within which a BIRD (200) will engage in detection of the environment (104) which impinges on the BIRDed-item (102). In many instances, it may be natural and practical to parameterize one or more detection contexts (123) as initially done above, primarily in terms of a time range (105), with several different detection contexts (123) spanning the full time when the item (100) might be in use or in storage. In such embodiments, expected locations (144.L) may be specified exclusively in the associated usage expectations (600).

For example, it may be the case that item usage will vary significantly at night (when the authorized user may be at home and sleeping) as compared to daytime usage. In such cases, at least two detection contexts (123) may be defined, one for daytime hours and one for nighttime hours. Suitable, separate sets of usage expectations (600) may then be defined and associated respectively with the daytime detection context (123) and the nighttime detection context (123).

In an alternative embodiment, a detection context (123) may specify a combination of: (i) an expected time range (105) when a BIRDed-item (102) will be in some kind of use or storage, and (ii) one or more associated, expected location(s) (144.L) for the use or storage. (The expected location(s) (144.L) may be fairly localized, for example, a home base location (140.HB), or a zone (140.Z) within a home base; or it may be a broader, geographically larger daily life area (140.DL)).

In an alternative embodiment, a detection context (123) may be specified strictly in terms of expected locations (144.L), with associated time frames (105) (if any) be an element of the usage expectations (600) to be associated with the detection context (123).

However, in alternative embodiments, a BIRD (200) may use more, fewer, or different parameters to characterize the overall context in which environmental detection takes place.

In an embodiment, a BIRD (200) may be configured with two or more detection contexts (123), some of which are subsets of others. For example, the authorized user (AU) may specify default detection contexts (123) which refer only to time (for example, specific daytime hours or nighttime hours). However, the authorized user (AU) may also specify additional subcontexts (123) which include locations (144.L). The applicable BIRD logic (500) may then indicate (in pseudocode form):

```
if the item (100) is within the default context (123)
(indicated by time range (105));
    then apply a first set of usage expectations (600);
if the item is also within the subcontext (123)
pertaining to location (144.L);
    then also apply a second set of usage expectations (600).
```

Universal Detection Context

Generally, and for many common items (100) in common use, it may be expected that item usage by an authorized user will vary significantly at different times of day, or different days of the work, or based on different locations, or based on other contextual factors. However, for items (100) and/or for some authorized users (AU), it may be determined that one set of usage expectations (600) is broadly applicable across all time frames and across all locations. In such cases, the applicable detection context (123) may essentially be "all times, all places." An "all place, all time, all contexts" detection context may be referred to, for convenience, as the universal detection context.

Detection Contexts and Usage Expectations Combinations and Integration

As noted above, a detection context (123) broadly establishes a domain where item usage is expected to be consistent, while usage expectations (600) characterizes expected item usage or expected environment (144) within the domain. In some embodiments of the present system and method, there is a possible advantage of segregating detection contexts (123) from usage expectations (600) as logical entities, and as software (or firmware, etc.) based data structures:

By defining the usage specification(s) (600) separately from the detection context(s) (123), it is possible to mix-and-match usage expectations (600) with detection contexts (123) as appropriate. For example, various different sets of location usage expectations (600) may prove to be applicable, in various combinations, to different time-based detection contexts (123). For another example, different sets of iteMetrics (154) (reflecting physiological and/or habitual aspects of item usage by an authorized user (AU)) may be applicable in various combinations to different detection contexts (123). For a particular example of the latter, if an item (100) may be used by more than one authorized user (AU), the BIRD (200) may first determine the detection context (123), and then load particular usage expectations (600) for those user(s) (AU) who are authorized for the current detection context (123). For still another example, there may be established separate sets of usage expectations (600) for home environments versus work environments. An authorized user (AU) may have multiple homes and/or multiple work environments. The BIRD (200) may first determine, based on detection context determinations, if the item (100) is in any of the home environments or any of the office environments; the BIRD (200) may then load appropriate usage expectations (100).

However, the distinction between detection contexts (123) and usage expectations (600) is made, in part, for convenience of exposition and explanation in this document. In various embodiments, such distinctions may or may not be reflected in BIRD logic (500) (actual algorithms, program logic, data structures, or computer code) used to implement the present system and method.

In embodiments, it may be the combination of data elements of detection contexts (123) and data elements of usage expectations (600) that provide BIRD logic (500) with the data or parameters against which to compare actual item usage (as indicated in field use by usage data (700.U)). In various embodiments of the present system and method, elements which may sometimes be an aspect of detection contexts (123) may in other embodiments be aspects of usage expectations (600). For example, in various embodiments of the present system and method, expected locations (144.L) may be an element of either detection contexts (123) or usage expectations (600), or both.

More generally, in some embodiments of the present system and method, elements of what are identified herein as detection contexts (123) and usage expectations (600) may be merged into unitary data structures, logic, or similar; or may instead be spread or divided over more than two data structures or elements. Thus, the use of two data structures (detection contexts (123) and usage expectations (600)) to ascertain or define an expected environment (144) for a BIRDed item (123) is exemplary only, and should not be construed as limiting; in various embodiments, more or fewer data structures may be employed.

Moreover, any characterizations in this document of certain data elements or parameters as being part of detection contexts (123) or usage expectations (600) should be construed as exemplary only, and should not be construed in any way as limiting.

FIGS. 2A-2H, 13B

Exemplary BIRD Architectures

In FIGS. 2A-2H and 13B, discussed below, as well as in other figures through this document, several exemplary BIRD (200) hardware embodiments are presented. The embodiments shown are exemplary only, and other hardware embodiments may be envisioned within the scope and spirit of the present teachings, systems, and method. Throughout this document, various method and software embodiments are described in terms of these exemplary BIRD (200) hardware embodiments. After reading the descriptions of these exemplary BIRD hardware embodiments, it will become apparent to a person skilled in the relevant art(s) how to implement the invention using other BIRD systems and/or architectures.

Figure 2A:
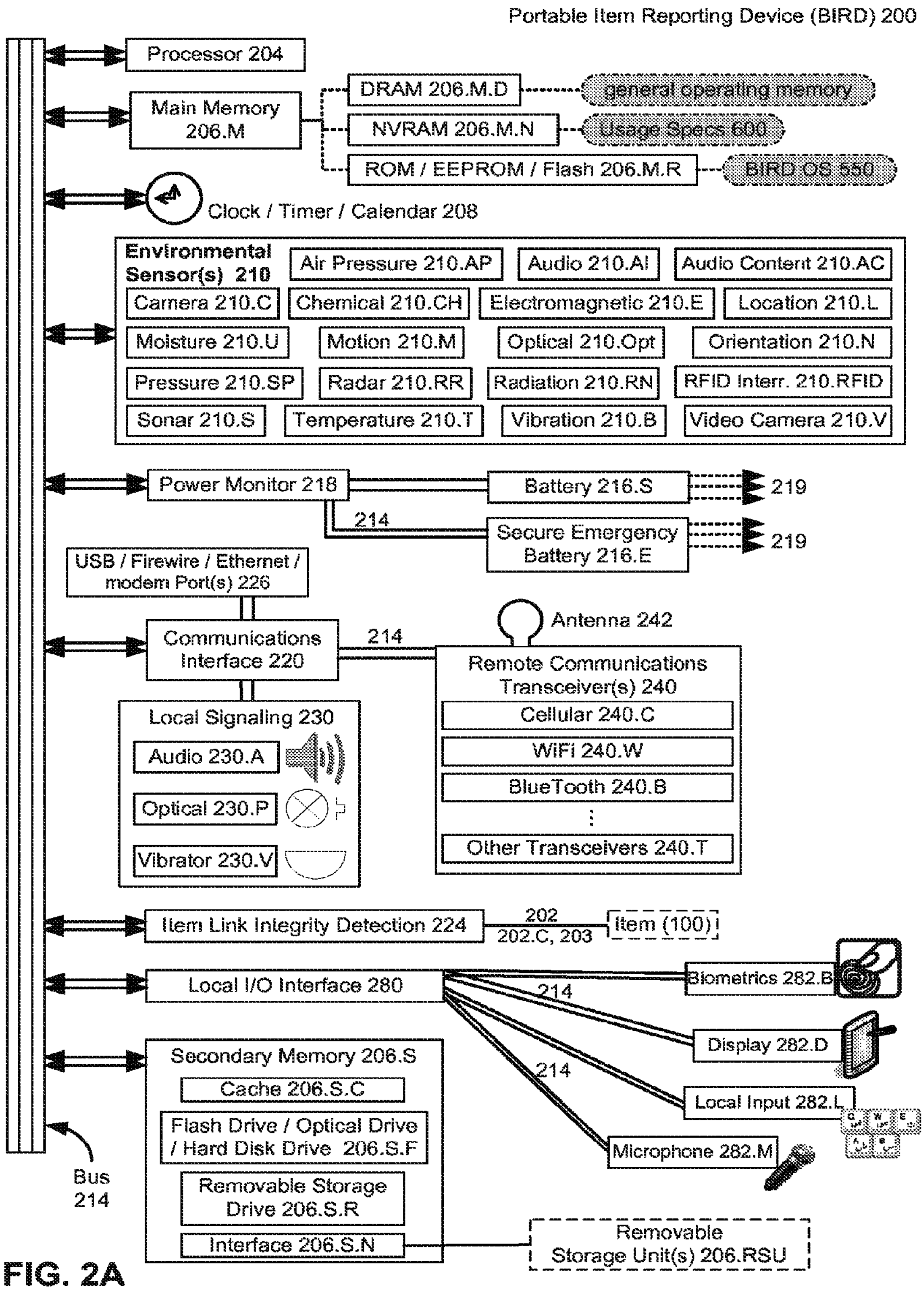
FIG. 2A is a schematic, system level illustration of an exemplary internal architecture of an exemplary BIRD according to an embodiment of the present system and method.

In discussion and figures throughout this document, a BIRD (200) is generally referred to by the label number "200", employed for example in FIG. 2A. It will be understood that most such references may refer to the exemplary BIRD (200) hardware illustrated in FIG. 2A, but may also refer to other BIRD hardware configurations, such as those illustrated in FIGS. 2B-2H, 13B, and other figures throughout this document.

FIG. 2A

Exemplary BIRD Architecture

An exemplary internal schematic architecture for a portable item reporting device (BIRD) (200) is illustrated in FIG. 2A.

(a) BIRD Processor, Memory, and Timer/Clock

The BIRD (200) includes one or more processors, such as processor (204). The processor is configured for processing instructions retrieved from memory (206); retrieving data from and storing data to memory (206); retrieving data from other elements (208, 210, 218, 220, 224, 280, and possibly other elements) of the BIRD (200); processing the retrieved data based on the instructions; performing arithmetic and logical operations on the retrieved data; making decisions based on the results of arithmetic and logical operations; transmitting control instructions to other elements (208, 210, 218, 220, 224, 280, and possibly other elements) of the BIRD (200); and such other processing and operations as may be necessary or useful to coordinate and control the BIRD (200) and to generally implement the teachings, system and method described herein. The processor (210) may include specialized modules, including for example and without limitation modules for: signal processing, image processing, natural language processing, sensor control, sensor data correlation, parallel data processing, neural network processing, and other specialized data processing.

The processor (204) is connected to a communication infrastructure (214) (e.g., a communications bus, cross over bar, or internal network), referred to for convenience as the bus (214). The bus (214) enables coordinated activity and data communications by the other internal elements of the BIRD (200) with the processor (204), and possibly directly with each other as may be necessary or useful to implement the teachings, system and method described herein.

The BIRD (200) also includes a main memory (206.M) for storing operating instructions, operating parameters, real-time dynamic sensor data (700R), historical data (700H), and processed data (700P) which is generated by applying suitable algorithms to the real-time and historical data. The real-time and historical data (700), discussed throughout this document, is generated in whole or in part by the environmental sensors (210) discussed further below. In an embodiment, the main memory (206.M) may be implemented with two or more different types of memory, including for example and without limitation:

- Dynamic random access memory (DRAM) (206.M.D), which may be used for general operations purposes, such as dynamic data storage, recent historical data storage, and storage of some or all BIRD software during real-time operations;
- Non-volatile random access memory (NVRAM) (206.M.N), which may be used for a variety of purposes, including storage of usage expectations (600), discussed further below; storage in NVRAM means the usage expectations (600) remain in storage even when the BIRD (200) is powered down, or otherwise loses power,
- Read-only memory (ROM), or updateable read-only memory (EEPROM, Flash memory, and so on) (206.M.R), which may be used to store a BIRD operating system (OS) (550); a BIRD OS (550) may in turn may include elements of general BIRD logic (500), as well as firmware code associated with supporting interrupts, internal configurations, communications, and mutual interaction among other BIRD components (broadly analogous to the BIOS code associated with desktop and laptop computers).

Persons skilled in the relevant arts will recognize that the types of main memory (206.M) described above, and their uses, are exemplary only. Alternative or additional types of main memory (206.M) may be employed as well to implement the teachings, systems, and methods described herein.

In an embodiment, time and date data, used for various analysis and monitoring purposes, is generated by an internal clock/timer/calendar element (208). In an alternative embodiment, clock/timer/calendar data may be obtain from other sources, such as external time and date feeds received through radio frequency links (240). For purposes of simplicity, any time/date/calendar data generated by the BIRD (200), or received by the BIRD (200) from such external data sources, will also be referred to as the clock/timer/calendar element (208).

(b) BIRD Sensors

The environmental sensors (210) are used to gather data about the environment surrounding and/or containing the BIRD (200), about the interaction of the BIRD (200) with that environment, and about the influence of the surrounding environment on the BIRD (200). The "environment," as understood here, includes any persons in proximity to the BIRD (200), including but not limited to any person (authorized user (AU) or otherwise) who may be in possession of the BIRDed-item (102).

Sensor Types

Shown in FIG. 2A are a variety of environment sensors (210) which may be employed with the BIRD (200). It should be understood that not all BIRDs (200) will necessarily employ or embody all sensors (210). In different embodiments, various subsets of the sensors (210) shown may be sufficient to implement the methods described in this document, and additional sensors (210) not shown may be employed as well.

While the list below identifies sensors (210) in terms of the environmental data they are configured to detect, some sensed environmental phenomena may be determined, by the BIRD (200), via the applicable sensor(s) (210) working in conjunction with the processor (204). For example, voice identification, language identification, and/or speech-to-text, may be accomplished by an audio sensing element (such as a microphone (282.M)) in conjunctions with the processor (204). The microphone (282.M) and processor (204) then effectively function in combination as the audio content sensor (2109AC). Similar considerations may apply to sensing and identification of other environmental phenomena, such as identification of objects or persons via image analysis (camera (210.C) or video camera (210.V) plus processor (204)), and so on. In an embodiment, however, some or all sensing elements (210) may have their own, dedicated and integrated microprocessors (not shown), rendering such sensing elements capable of partial or complete sensor or data analysis independent of the main BIRD processor (204).

In the discussion below, the sensors (210) are listed in the singular. However, a BIRD (210) may have more than one sensor (210) of the same type which may, for example, be positioned in multiple locations on an exterior body (250) of the BIRD (200) for enhanced environmental monitoring.

Sensors (210) may include, for example and without limitation:

- Air pressure sensor (210.AP): Detects the pressure of the surrounding air.
- Altimeter (not shown): Detects the altitude at which the BIRD (200) is located.

Audio intensity sensor (210.AI): Determines the intensity, loudness, or volume of ambient sound around the BIRD (200).

Audio content sensor (210.AC): Determine qualities of sounds, including pitch or frequency, voice identification and/or language identification and/or speech-to-text. The audio content sensor (210.AC) may determine loudness as well.

For convenience in this document, an audio intensity sensor (210.AI) and/or an audio content sensor (210.AC) may be referred to generically as an audio sensor (210A). In an embodiment, the BIRD's microphone (282.M) may serve as the audio sensor (210A).

Camera (210.C): Used for capture of still images. May also perform activities otherwise associated with an optical sensor (210.Opt) discussed further below. May also be an element of the video camera (210.V) discussed further below. In an embodiment, the camera (210.C) may be configured with logic for changing from a wide-angle view to a narrow-angle, close-up view, depending on current sensing needs.

Chemical sensor (210.CH): Detects and identifies molecules and/or atoms present in the ambient environment (typically the atmosphere, but possibly water or another environment) surrounding the BIRD (200).

Electromagnetic sensor (210.E): Configured to detect frequencies of electromagnetic radiation. An electromagnetic sensor (210.E), or a combination of several such sensors, may sense one or more types of electromagnetic phenomena, including but not limited to radio frequency (RF) waves, microwaves, ultraviolet waves, infrared waves, and X-rays. (Light frequencies, for purposes of illustration, are associated with the optical sensor (210.Opt), camera (210.C), and video camera (210.V) also discussed above and below. In practice, the electromagnetic sensor (210.E) may also detect light frequencies, and so may partially overlap in function or capabilities with the light-related sensors.) The electromagnetic sensor (210.E) may in the alternative, or additionally, detect the presence of magnets or magnetic fields.

As with the optical sensor (210.Opt) described below, an electromagnetic sensor (210.E) may be configured primarily for detection of electromagnetic wave intensity. In an alternative embodiment, the electromagnetic sensor (210.E) may be configured for additional electromagnetic wave analysis, such as spectrum analysis or polarization analysis. The electromagnetic wave sensor (210.E) may also be configured or configurable for selective sensing at specific frequencies or frequency bands within its overall bandwidth.

Item-specific sensors (not illustrated): As discussed further below in this document, a BIRD (200) may be integrated into an item (100). If the item (100) already has integrated processing and memory (for example, a cell phone or laptop computer), the item is referred to as an active item (100.Act); a combined active item BIRD (ABIRD) (200.Act) and active item (100.Act) are referred to as an ABIRDed-active Item (102.Act). The active item (100.Act) may already have inherent internal sensing capabilities, which can be employed by the active item BIRD (200.Act) as a further means of distinguishing extant/normal item usage (503.1/503.3) from displaced/anomalous usage (503.0/503.2).

In addition, even items (100) which are typically not electrical in nature may have sensing elements integrated into them, which can provide additional data to the BIRD (200). For example, a hardcopy book (100.E) with an integrated BIRD (200) may have a sensing element (210) designed to determine when the book's cover is opened or closed, or even to identify the page to which the book was last opened.

Location sensor (210.L): In an embodiment, a BIRD (200) contains a location sensor (210.L) which is capable of generalized location determinations. By "generalized" is meant a geographic location sensing system which is not bound to a localized geographic area (a particular campus, building, or facility), nor to a particular, nearby, companion hardware system. However, in an embodiment, a generalized location sensor may be supplemented by a more localized location sensor (210.L), for example, a location sensor system keyed to a particular campus, building, or facility.

In an alternative embodiment, a BIRD (200) may be designed or configured with only local location sensors (210.L), for use with items (100) which are expected to remain within a specific campus or building. For example, a BIRD (200) may contain a comprehensive image database for a given building or region. The BIRD (200) may also employ an image sensor (210.C, 210.V, both discussed further above and below), and then use the BIRD's processor (204) to compare (i) real-time images of the environment around an item (100) with (ii) images in the image database. Based on the comparison, the processor may make location determinations.

A generalized or geographic location sensor (210.L) may include, for example and without limitation: sensors integrated into or interacting with the Global Positioning System (GPS) or similar satellite systems; sensors which determine location based on triangulation with cell phone towers; sensors which determine location based on dedicated local, wireless data streams (1507) from buildings or wireless computer networks (1505); and sensors which determine location based on interpretation of image data from the surrounding environment (104).

In an embodiment, a BIRD (200) may employ a first, separate sensor for determining geographic locations (104.L), such as street locations or building locations; and a separate, second sensor for more fine-grained location determinations, such as a particular room (104.L), or even a particular place (104.L) (desk, table, floor location, etc.) within a particular room. The exact degree of granularity in location determination between the geographic sensor versus the fine-grained sensor may vary in different embodiments. In an alternative embodiment, a single location sensor (210.L) may be employed to make location determinations at all geographic scales, down-to-and-including location measurements specified to within inches or centimeters.

Redundant or Backup Location Sensing:

In an embodiment, a BIRD (200) may employ only a single form of RF-based location sensing, such as GPS or cell-phone signal (cell phone tower) based sensing. In an alternative embodiment, a BIRD (200) may be capable of more than one more of form of RF-based location sensing, with a second or third form providing either redundancy or backup. For example, if a BIRD (200) is primarily configured for GPS-based location determination (with a suitable GPS sensor (210.L)), the BIRD (200) may employ location sensing based on cell-phone tower triangulation as an additional or backup form of location sensing (again, with a suitable cell-phone based sensor (210.L)).

Alternate Location Determination:

A BIRD (200) will normally obtain location data in conjunction with various RF sources, such as GPS systems, triangulation with cell phone towers, or other RF broadcast sources of location information. A BIRD (200) and its associated item (100) may, however, be in an environment where such RF sources are blocked (for example, in a parking garage or inside a building which blocks such RF signals). In an embodiment, the BIRD (200) may employ alternative means for making at least approximate location determinations. For example, the BIRD (200) may combine (i) a last known location (as determined, for example, via GPS) with (ii) recent motion data (velocity and acceleration) from the motion sensor (210.M), in order to calculate a current location.

In an embodiment, the BIRD (200) may also have an image database and/or sound database stored in memory (206), the images being recorded during a training period, or being pre-configured at a factory or from some other suitable location-image database. The images and sounds may be of locations (104.L) where the BIRD (200) is typically used, and may also be images and sounds associated with common environments. For example, the BIRD (200) may store images and sounds associated with parking garages, restaurants, and other well-known public environments.

If conventional (RF-based) location information is not available, the BIRD (200) may compare currently obtained images and sounds with the stored images and sounds. By making a match between current and stored images/sounds, the BIRD (200) may be able to identify at least a type of environment to which it is exposed (for example, a parking garage, a restaurant, etc.). If the BIRDed-item (102) is lost (503.0.1), misplaced (503.0.2), misappropriated (503.0.3), or stolen (503.0.4), then by transmitting such an identification to an authorized user (AU), the BIRDcd-item (102) may assist the user in identifying the item's current location. (For example, the authorized user (AU) may know of a restaurant or parking garage that he or she recently visited, and can investigate if the lost/misplaced item is in that location.)

In an embodiment, the BIRD (200) may be configured to identify well-known, public corporate icons indicative of certain commercial establishments, brands on nearby cars, etc. Such identifications may further contribute to assisting an authorized user (AU) in determining the location of an item (100) which is lost (503.0.1), misplaced (503.0.2), misappropriated (503.0.3), or stolen (503.0.4).

- Moisture/humidity sensor (210.U): In an embodiment, this sensor is configured to detect atmospheric moisture (humidity levels, rain, snow). In an alternative embodiment, the sensor may be configured to detect a surrounding environment of water, for example, if the BIRD (200) is expected to be used under water or if there is a potential of the BIRD (200) being immersed in water. In an alternative embodiment, a BIRD (200) embedded into an item (100) which is worn on a person may be configured to detect perspiration.
- Motion sensor (210.M): Configured to detect the speed, the velocity, the acceleration, the rotation, and/or the torque of the BIRD (200). A single motion sensor (210.M) may be able to detect movement over a wide range of velocities or accelerations, or two or more motion sensors may be employed as applicable for different scales or ranges of motion. For example, a first, large-scale motion sensor (210.M) may be employed to detect movements and acceleration in a range associated with walking up to ranges associated with automobile traffic or even airplane travel. For these purposes, a location sensor (210.L) (discussed further below) in conjunction with a timing element (208) may be able to provide double duty for gross or approximate determinations of velocity and acceleration. An additional, small-scale or fine-grained motion sensor (210.M) may be employed to determine smaller scale motions or accelerations, such as those associated with a person's body movements or position shifts while seated, or while moving or shifting about slightly but remaining in a localized area within an office.

"Motion": For purposes of this document—and unless context clearly indicates an actual time change of position—the phrases "motion of an item" or "state of item motion", or similar terms and phrases, refer not only to actual movement (time changes in position); but also to states where the item may not be subject to any movement at all (either with respect to the general environment [the room, a building, the earth], with respect to a person who possesses the item or is in proximity to the item, or both). Similarly, for purposes of this document—and unless context clearly indicates a preferred meaning—the "motion of a person" or a "person's movement" refers to any of when the person is engaged in motion (time changes in position), when a person is engaged in movements in place (while standing, seated, or lying down), and to when a person may be completely without motion.

"Stationary items" vs. "Motionless items": An item (100) is considered stationary (139.Stat) when it is not subject to personal motions (104.M), and so is presumed to be off-person (138.OffP). The item is considered stationary (139.Stat) even if, while off-person (138.OffP), it is subject to other motions, such as transportation motions. An item (100) is considered motionless only if its velocity relative to the earth is zero; or in plain language, if the item is completely still.

- Optical sensor (210.Opt): A sensor configured to detect properties of light impinging on the sensor. The properties of light to be sensed may include, for example and without limitation, the intensity of the light impinging on the sensor (210.Opt), the spectrum of the light, or the polarization of the light. In an embodiment, the optical sensor (210.Opt) may be integrated into, or may be an element of, any of the camera (210.C), the electromagnetic sensor (210.E), or the video camera (210.V).
- Orientation sensor (210.N): Configured to determine the orientation of the BIRD (200) along at least one axis (for example, up or down), or two axes (for example, north/south and east/west), and possibly along up to three orthogonal axes.
- (Surface) Pressure sensor (210.SP): Detects pressure directly against the surface of the BIRD's outer body, housing, or case (250) (see FIG. 2D, below). For example, if a BIRD (200) is associated with an item (100) which is carried in a user's pocket, purse, backpack, or similar, it may be expected that some surface pressure will be exerted against the BIRD (200) (by the person's body, or by other items in the purse or backpack). The pressure sensor (210.SP) detects whether this pressure is present, and if so, how much pressure is present. If will be noted that if the BIRD (200) is actually carried within the item (100)—for example, as a flat BIRD (200) which slips within a wallet (100.W)—then the pressure detected by the BIRD (200) may substantially reflect or correlate with the surface pressure on the item (100).
- Radar sensor (210.RR): In an embodiment, and possibly but not exclusively for BIRD's (200) intended for specialized uses or industrial applications, a BIRD (200) may employ radar to detect elements of its surrounding environment. In an alternative embodiment, a BIRD (200) may employ a passive radar sensor to detect any other nearby radar systems.

- Radiation sensor (210.RN): In an embodiment, and possibly but not exclusively for BIRD's (200) intended for specialized uses or industrial applications, a BIRD (200) may have a sensor configured to detect alpha particles, beta particles, and gamma rays. In an embodiment, a BIRD's electromagnetic sensor (210.E) may function in whole or in part as a radiation sensor, for example by being capable of detecting X-rays.
- RFID sensor (RFID interrogator) (210.RFID): Radio-frequency identification (RFID) is the use of a wireless non-contact system that employs radio-frequency (RF) electromagnetic fields to transfer data from an RFID tag attached to an object. (See for example FIGS. 14I, 17C, and 17D.) The data in the RFID tag may be only a unique tag serial number, stored in a non-volatile memory, which thereby identifies the object to which it is attached. The RFID tag includes a small RF transmitter and receiver. The transmitter can transmit the tag's serial number in an RF signal. Some tags require no battery and are powered by the electromagnetic fields used to read them. Others use a local power source and emit radio waves (electromagnetic radiation at radio frequencies). The RFID tag's digitally stored serial number can be read from up to several meters (yards) away.

In an embodiment, a BIRD (200) may have an RFID interrogator (210.RFID) configured to transmit an encoded radio signal to interrogate an RFID tag on a nearby object. The tag receives the message and responds with its identification information. Applications of a BIRD's RFID technology are discussed further below. (See for example FIGS. 14I, 17A-17G, and other figures throughout this document.)

In an embodiment, the BIRD (200) may have an RFID sensor (210.RFID) implemented as a distinct hardware module, for example, with a microchip(s) which implements the RFID interrogator capabilities. In an alternative embodiment, RFID sensing/interrogation may be accomplished by suitable configuration of the BIRD's other components, such as using the processor (204) to transmit/receive RFID signals via the communications interface (220) and remote transceivers (240).

- Sonar (210.S): In an embodiment, and possibly but not exclusively for BIRD's intended for specialized uses or industrial applications, a BIRD (200) may employ sonar to detect elements of its surrounding environment. In an alternative embodiment, a BIRD (200) may employ a passive sonar sensor to detect any other nearby sonar systems.
- Temperature sensor (210.T): In an embodiment, a BIRD (200) may have a sensor configured to determine the temperature of the environment surrounding the BIRD (200). In an alternative embodiment, and particularly in conjunction with active items (100.Act) (discussed further below in conjunction with FIGS. 13A-13C), an active item BIRD (200.Act) may have a sensor configured to detect the internal operating temperature of the active item (100.Act). In an alternative embodiment, a BIRD (200) may have sensors (210.T) for detection of both external and internal temperatures.
- Vibration sensor (210.B): A vibration sensor is designed to detect relatively small scale motions and/or relatively high frequency motions of the BIRD (200) and its associated item (100).

There is potentially some overlap between a "motion of an item" and a "vibration of an item." However, in this document the "motion of an item" is generally understood as reflecting either a change in location resulting from the transport of the item from a first location to a second location; or at least a more localized change in item position on the order of a few centimeters or inches which is indicative of bodily movement by the person holding or carrying the item. This may include either or both of the person moving from one location to another, or a result of the person staying in one place, but shifting position (as for example, movement while seated). As noted above, "motion" may also broadly refer to lack of motion, that is, an item's state of rest.

Vibration is generally understood as reflecting the influence of a nearby source of oscillatory mechanical vibration, which may be transmitted to the BIRDed-item (102) through an intermediate carrier of mechanical energy (such as a table on which the item is resting).

In practice, a BIRD (200) may employ a single sensor (210) which can operation as both a motion sensor (210.M) and vibration sensor (210.B), or the BIRD (200) may employ two separate sensors for each respective type of sensing. For purposes of this document, however, a distinction is made between sensing of item motion; and the sensing of item and/or BIRD vibration(s).

- Video camera (210.V): Configured to detect sequential images of movement in the environment, typically at frame rates associated with smooth visualization of motion, for example, fifteen frames per second or greater. However, in some embodiments lesser frame rates may be acceptable. In an embodiment, a single image sensor may function in two or more roles of a video camera (210.V), a still image camera (210.C), and/or an optical sensor (210.Opt). In an alternative embodiment, separate sensors (210) may be employed for these different functions.
- Wind velocity sensor (not shown): A BIRD (200) may include a sensor configured to detected the velocity of air relative to the BIRD and its associated item (100). The sensor may detect wind speed, wind direction, wind vorticity, or some combination of the above.

Sensor Data Delivery Timing

Data may be delivered from the sensors (210) to the processor (204), to memory (206), or to other BIRD elements on any of several timing basis, including for example and without limitation:

- substantially continuous: raw data is generated and delivered by the sensors in an ongoing and substantially continuous data stream, which may entail multiple specific data points per second;
- periodic: raw data is raw data is generated and delivered by the sensors at periodic time intervals, which may be configurable;
- event responsive: data is delivered by a sensor only when an event occurs, where in event is typically a change in sensor data (for example, a motion sensor (210.M) may be configured to generate new data only when it detects motion, while a location sensor (210.L) may be configured to generate data only when it detects a change in location);
- as needed: the BIRD's processor may be configured according to various criteria to determine when it requires additional data, and from which sensors, and to trigger sensor data generation at those points in time.

Other sensor data generation timing criteria may be envisioned as well within the scope and spirit of the present system and method.

Sensor Data, Raw Sensor Data, and Processed Sensor Data

In an embodiment, it is desirable to obtain data from the sensors (210) in some standard units (also known as scientific units) which, typically, are readily understood by humans skilled in the relevant arts and/or are parseable by computer code written by humans skilled in the relevant arts. For example, a motion sensor (210.M) should deliver data normalized to such units as meters/second or meters/second^2, or their English unit equivalents. A location sensor (210.L) should provide spatial coordinates normalized to standard metrics of latitude and longitude (typically degrees, minutes, and seconds). A sound sensor (210.AI) should provide sound intensities in units such as sones, phons, or dBs, etc. Similar considerations of standard or established units apply to measures of intensity of other environmental phenomena, including for example and without limitation: torques and other angular measures, frequencies, wavelengths, light intensities, temperatures, radiation levels, and other environmental qualities and magnitudes.

Sensors (210), as electronic or optical devices, typically deliver initial data as low-level signals (electrical or optical), which then requires some kind of additional processing to render the data in standardized or scientific units. In general, such low-level processing of sensor signals is not a concern of this document, and is not addressed in this document. It is presumed that in the BIRD (200), sensor signals will be translated as necessary into values associated with appropriate scientific units, either by a dedicated processor or other electronics associated directly with each sensor and/or by the BIRD's processor (204).

Therefore, any references in this document to unprocessed sensor data, raw sensor data, or simply sensor data (700) (without further qualification) generally refers to sensor data which is directly indicative of specific environmental phenomena data (item location, velocity, acceleration, torque, ambient sound intensity, ambient light intensity, ambient temperature, etc.), but where such data has in fact been translated from low-level signals into appropriate scientific units (or suitable data structures which inherit such units) to represent the sensor data for further processing.

For purposes of this document, a still image from a camera (210.C), a video recording from a video camera (210.V), or a recording of sounds by an audio content sensor (210.AC) would also be considered to be unprocessed sensor data or raw sensor data, or simply sensor data (700). This is true even if some degree of processing has been applied, following the actual data acquisition, for purposes of data compression, noise reduction, or similar "clean up" of the image/audio signal.

By contrast, processed sensor data (700P) is sensor data which has been subject to further analysis, refinement, and/or distillation. Processed sensor data (700P) may include, for example and without limitation: maximum value determinations, minimum value determinations, and threshold crossings; statistical analyses of sensor data; trend detection within the data; pattern detection within the data; data correlation analysis; data waveform construction and waveform decompositions (Fourier, wavelet) (unless these are provided directly by the sensor or its associated, dedicated processing elements); spectral analysis; facial recognition or other structure/object recognition regarding image data; voice recognition, language recognition, and other environmental recognition based on sound data; and in general, any level of mathematical or symbolic processing of sensor data, and/or synthesis of data from two or more sensors, designed to extract some kind of integrated interpretation or understanding of the environment impacting an item (100).

Sensor Data and Usage Data

The raw environmental data collected by the sensors may be referred to generally and interchangeably as sensor data (700), sensor readings (700), or environmental readings (700). The term sensor data (700) is generally understood to mean either or both of current (real-time) data (700R) as identified by the BIRD's sensors (210), or real-time data plus stored, historical data (700H). The intended meaning is generally clear from context.

Where real-time sensor data only is specifically intended, it is referred to as such ("real-time sensor data (700.R)").

Where historical sensor data only is specifically intended, it is referred to as such ("real-time sensor data (700.H)"). Historical sensor data (700.H) may be may be stored on the BIRD (200), for example in an environmental data log (488) in BIRD memory (206).

Various values may be derived from the baseline sensor data (both real-time and/or historical). Such values are referred to a processed sensor data (700.P), processed sensor values (700.P), or simply processed values (700.P). As already noted above, processed values (700.P) include for example and without limitation: max values, min values, and threshold crossings; averages and other statistical analyses of sensor data; trend detection within the data; pattern detection within the data: data correlations; waveforms and waveform decompositions; facial recognition or other structure/object recognition of image data; voice recognition, language recognition, and other environmental recognition based on sound data.

Usage data (700.U): Usage data (700.U) is any data which is indicative of a person's use of the BIRDed-item (102), or indicative of the environment around the BIRDed-item (102) during item storage. Usage data (700.U) may be sensor data (700) (historical and/or real-time) only; processed sensor values (700.H) only; or an aggregation all or some of (that is, subsets of) of sensor data (700) and processed sensor values (700.P).

See Table 700.T of FIG. 7A, below, for a summary of the different types of sensor data (700.R, 700.H, 700.P) and usage data (700.U).

(c) BIRD Power

The BIRD (200) is generally intended for use as a portable item, and so requires a portable source of power. In an embodiment, the BIRD (200) has two sources of power, a battery (216.S), which may for convenience be viewed as the BIRD's standard battery (216.S), and a secure emergency battery (216.E).

The battery (216.S) may be any one of numerous well known battery types, such as a lithium ion cell or similar. It is generally intended to be lightweight and relatively-long lasting. In an embodiment, the battery (216.S) is contained within or on the BIRD (200) through any kind of conventional battery bay, such that the battery (216.S) is readily accessibly and readily replaced by a user of the BIRD (200).

The emergency battery (216.E) may also be any type of well known battery source, with again a typical design goal of lightness and being a long-lasting power source. However, in an embodiment, the emergency battery (216.E) is distinguished in that it is placed within the BIRD (200) so that it cannot be readily accessed or removed by the user. For example, emergency battery (216.E) may be scaled within the BIRD (200) so that the emergency battery (216.E) can only be removed by effectively destroying the physical structure of the BIRD (200). Alternatively, the emergency battery (216.E) may be contained within the BIRD (200) in such a way that the emergency battery (216.E) can be accessed and removed, but only with substantial and time-consuming mechanical effort by a user. In an embodiment, the removal of multiple screws, or the application of a specially designed tool, may be required to remove the emergency battery (216.E). In an alternative embodiment, the emergency battery (216.E) can only be removed by actions which essentially result in the total destruction of the BIRD (200) or its crucial operating components. (For example, the emergency battery (216.E) may be so attached to a main BIRD motherboard or primary circuit board (not shown in the figures), which houses the BIRD processor (204) and memory (206), so that removal of the emergency battery (216.E) entails removal and/or destruction of the motherboard itself.)

Configured in this way, for difficult removal by a user, the emergency battery (216.E) serves several purposes. First, it is a backup battery which is always in place if the standard battery (216.S) should lose power or otherwise fail. Second, in the event that the BIRD (200) is stolen (typically along with the item (100) attached the BIRD (200)), a thief cannot readily or quickly disable the power within the BIRD (200), because the emergency battery (216.E) is difficult to access and remove. As a result, when an item (100) is stolen, the attached BIRD (200) will remain powered and therefore will remain able to determine its state as stolen (503.0.4), and will further remain able to appropriately signal its state as stolen (503.0.4).

More generally, in an embodiment, the secure emergency battery (216.E) is a secondary power source which is substantially hardened against removal, tampering, disabling, or destruction by any action short of substantial damage to, or destruction of, the BIRD (200) as a whole. This ensures that while the primary battery (216.S) is available for ready removal or replacement by a user, the secondary power source cannot be readily disabled in the event the BIRD (200) and its associated item (100) are in the possession or control of an unauthorized users (UU).

A power monitor and charging element (218) is coupled to the battery (216.S) and to the emergency battery (216.E). The power monitor (218) monitors the status of both batteries, and automatically switches from the standard battery (216.S) to the emergency battery (216.E) if the power fails for any reason from standard battery (216.S). The emergency battery (216.E), even when not in use, may still slowly discharge over time. Therefore the power monitor (218) also maintains a low rate charging process, charging the emergency battery (216.E) from the standard battery (216.S) (or from an external power source, not shown) as necessary. The power monitor and charging element (218) is also configured to charge the standard battery (216.S) from an external power source (not shown) such as wall current, via a power port, magnetic power coupling, or other electricity transfer device (not shown).

Secure BIRD Power-Down:

In an embodiment, the power monitor (218) may also be used to create a secure power-down feature for the BIRD (200). In the event that the BIRDed-item (102) is stolen (503.0.4), it is desirable that the BIRD (200) remain powered on in order to make a determination of the item's state as possibly being stolen (503.0.4). This, in turn, requires that the BIRD (200) cannot be readily powered-down or deactivated by a thief. To ensure this, the BIRD (200) may require a special user input to turn power off. The power monitor (218) may for example be configured to require, to power down the system, a special input from local I/O interface 280 (discussed further below) via the bus 214. The special input may take many forms including, for example and without limitation: a special key sequence entered via local input (282.L); a code entered via a touch-sensitive display (282.D); a fingerprint or retinal scan entered via biometrics (282.B); or a voice print identification entered via a microphone (282.M). In an embodiment, a BIRD's audio sensor (210A), may double as a microphone. In an alternative embodiment, the audio signaling element (230.A) may also serve as either of the audio sensor (210A) or microphone (282.M), or both.

Internal power lines (219) are used to transfer electricity from the batteries (216.S, 216.E) to other elements throughout the BIRD (200).

Other sources of power may be used in place of, or to supplement, the batteries (216.S, 216.E). Such sources may include, for example and without limitation: solar power provided by solar power converters on the outside of the BIRD (200), or power received via radio frequency communications (for example, in an RFID system).

(d) BIRD Link Integrity

An item link integrity detection module (224) may be employed to determine the structural integrity of the mechanical tether/coupling (202, 203, 202.C) between the BIRD (200) and the item (100). The detection module (224) reports if the mechanical tether (202, 203, 202.C) is damaged or broken. This determination may be made based on, for example, the response of an electronic path or circuit which is threaded through or embedded within the mechanical link (202, 203, 202.C).

If the item (100) itself contains electronics (for example, an active item (100.Act) such as a personal computer, a cell phone, or similar), the determination may also be made in whole or part based on a signal directly from the item (100.Act), via a tether (202.Act) with suitable signal transmission elements within.

In an embodiment, the item link integrity detection module (224), or in the alternative an additional item identity module (not shown in the figure), may have a capability to validate or partly validate that a particular intended item (100) is connected to the BIRD (200). If the item (100) is itself processor-based, or otherwise configured to provide data, then the tether (202) between the item (100) and the BIRD (200) may be configured to support data transfers between the item (100) and the BIRD (200).

However, even for items (100) which are not processor based, and which may have no electrical or data processing components of any kind, a number of methods may still be employed by the BIRD (200) to at least partly validate if a correct item (100) is attached. These methods may include, for example and without limitation:

Alternative electrical link recognition: Even if the item (100) is not inherently electrical in nature—that is, it does not possess internal electronics, processing means, or similar—it may have an outer surface or casing with some degree of electrical conductivity or resistance.

In an embodiment, a low voltage or low current may be sent through the tether (202), with suitable contacts on the item (100) to determine an electrical resistance or electrical impedance of the item. Other electrical properties of the item (100) may similarly be determined as well. It may be determined in this way whether the item (100) has an expected resistance or impedance. If not, an incorrect item (100) may be attached to the BIRD (200).

In an alternative embodiment, an electrically conductive tag or strip, for example, an adhesive strip with a metallic coating on one side, may be attached to an item (100). The BIRD's tether (202) may be configured with suitable contacts or other electrical sensors to determine if the BIRD (200) is attached to the item (100). A more detailed discussion of exemplary such embodiments is presented below in conjunction with FIG. 2G.

Visual recognition: A camera (210.C) of the BIRD (200), with suitable associated processing, may be configured to recognize the desired item (100) from a variety of angles and profiles, and in a variety of different levels of light exposure.

Optical properties recognition: An optical sensor (210COpt) of the BIRD (200), with suitable associated processing, may be configured to detect optical surface properties of the desired item (100), such as color, more detailed spectral properties, or reflective qualities. In an embodiment, a BIRD (200) may be configured with a light-emitting element, either in the optical range, infra-red range, or some other spectral range, which illuminates items (100) in the vicinity of the BIRD (200). The emissions reflected from the items (100) may then be detected and characterized by the BIRD (200).

Audio recognition: An audio sensor (210.AI) associated with the BIRD (200) may be configured to recognize sounds associated with the item, such as for example the "jangling" sounds made by multiple keys (100L) on a keychain when a user moves the keys, or even when the keys shift relative position in a user's pocket.

Weight or pressure link recognition: The tether (202) between the BIRD (200) and the item (100) may be configured with a weight or pressure sensor (not shown in the figures). When the user holds the BIRD (200) so that the weight of the item (100) is suspended from the BIRD (200), the BIRD may detect the weight of the item (100).

RFID sensing for link determination: The item (100) may have an associated RFID tag. The BIRD (200) may be configured with RFID interrogator technology (210.RFID) to query the item (100). A successful query does not establish that the item (100) is physically linked or tethered to the BIRD (200), but it does at least establish that the item is in close physical proximity to the BIRD. Through sustained RFID interrogations, the BIRD (200) can determine if the item (100) maintains close physical proximity, or if the item falls out of range of the BIRD. If the BIRD (200) is in motion, repeated successful RFID queries of the item (100) are an indicator that the item (100) is likely still physically coupled with the BIRD (200).

Other item-link validation methods may be envisioned as well.

(e) BIRD Signaling, Communications and Local I/O

When the BIRD (200) signals a displaced/anomalous item state (503.0/503.2), or needs to otherwise signal or alert an authorized user (AU), a variety of signaling elements may be employed. These may include, for example and without limitation, local signaling elements (230) such as an audio signaling element (230.A), for example a speaker; an optical signaling element (230.P), such as an LED; and a vibrator (230.V). More detailed signaling may also be done via a display (282.D).

In some embodiments, local signaling may be accomplished in whole or in part via a connection with some other local device, such as a cell phone or PDA, via a wired communications port (226) or a wireless connection mediated via transceivers (240)). Communications port (226) may be, for example and without limitation, a USB or Firewire port, or an Ethernet port, or other modem or high speed communications port. The communications port (226) may also be used to upload program updates and/or data into the BIRD (200), and may also be used to transmit stored data to an external data processing system (such as a configuration computer (335)).

Remote signaling, as well as other data communications, may also be accomplished via one or more remote communications transceivers (240) which may include, for example and without limitation, a cellular transceiver (240.C) (3G, 4G (WiMax or LTE)), a WiFi (IEEE 802.11) transceiver (240.W), a Bluetooth transceiver (240.B), and other transceivers (240.T). The BIRD (200) is provisioned with any necessary antenna(s) (242) to enable wireless communications.

Internal control of the local signaling (230), the remote communications transceivers (240), and the ports (226) is managed and maintained by a communications interface module (220). The communications interface module (220) allows software and data to be transferred between the BIRD (200) and external devices, such as a configuration computer (335).

Local user input/output with the BIRD (200) may be accomplished via several elements, including for example and without limitation:

the display (282.D), which may be display-only, or may be a touch-screen or similar display for accepting user input;

a local input device (282.L) which may include a keypad, mouse pad, or similar;

a microphone (282.M), and . . .

a biometrics sensor (282.B).

Several other input features discussed further below (see FIG. 2D), such as the [[Power]] button (225), the [[Temporary Deactivate/False Alarm]] button (221), the [[Good Samaritan]] button (222), and the [[Panic]] button (223) may be implemented via any of the local input device (282.L) (for example, as mechanical buttons); virtual buttons or other input elements of the display (282.D); or speech recognition elements of the microphone (282).

The biometrics sensor (282.B) may be, for example, a fingerprint scanner or a retinal scanner. The biometrics sensor (282.B) may be used to validate that an authorized user (AU) is in possession of the BIRD (200), both when data or commands are being input into the BIRD (200), and when the BIRD (200) has made a provisional determination that the BIRDed-item (102) may have been lost (503.0.1) or stolen (503.0.4).

Local inputs such as the biometrics sensor (282.B), the display (282.D), and the local input (282.L) may be controlled via a local input/output interface module (280). The local input/output interface (280) forwards graphics, text, and other data from the internal bus (214) (or from a frame buffer not shown) for display on the display (282.D).

Multifunction Elements

Certain hardware components of the BIRD (200) may function in multiple capacities. For example, a touchscreen display may function in the role of the display (282.D), the local input (282.L), and the fingerprint scanner (282.B). Similarly, a camera (210.C), in addition to having various environmental sensing applications, may also function as a biometrics scanner (282.B) by providing retinal imaging or even fingerprint imaging. In an embodiment, personal identification data collected via the biometrics sensor (282.B) may be used as an element of algorithms to determine anomalous (503.2) or non-anomalous device usage. In that sense, the biometrics sensor (282.B) may be considered to be a part of the environmental sensors (210) as well.

Size and Weight Considerations for Local I/O

In an embodiment, it is desirable to make the BIRD (200) as physically small and lightweight as possible, with the additional goal of reducing power consumption. Therefore, in an embodiment, a display (282.D) may be omitted altogether, and a local input (282.L) may comprise a very minimal set of buttons or other BIRD surface elements sufficient for minimal control, such as turning the BIRD (200) on and off. In such embodiments, field control or modification of BIRD configuration or functionality, by the authorized user (AU), may be minimal.

Figure 3A:
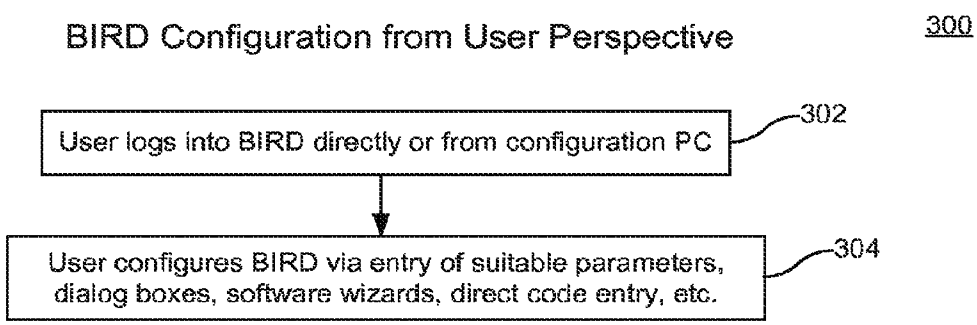
FIG. 3A is a flow chart of an exemplary method for configuring a BIRD, according to an embodiment of the present system and method.
Figure 3B:
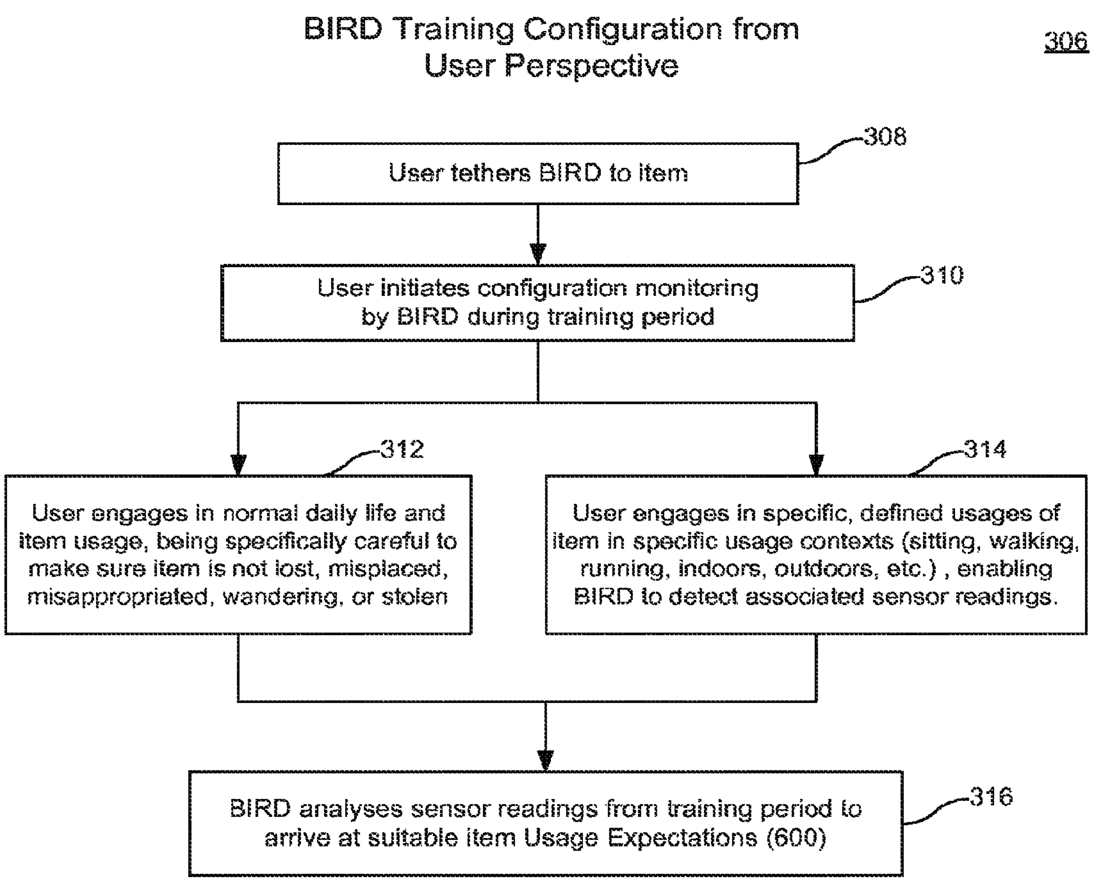
FIG. 3B is a flow chart of an exemplary method for configuring a BIRD, according to an embodiment of the present system and method.
Figure 3C:
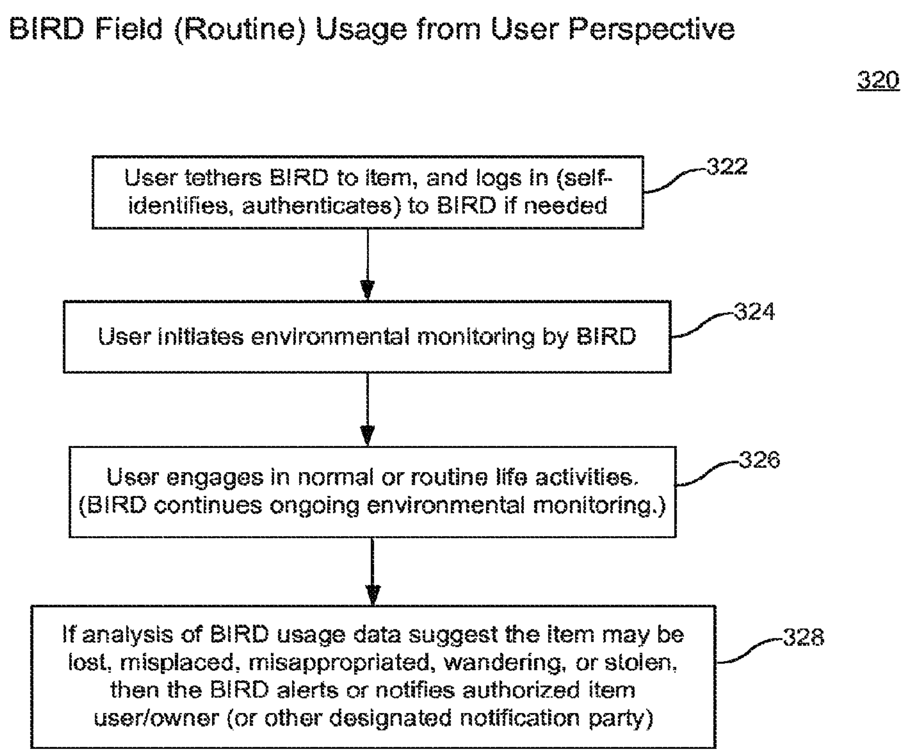
FIG. 3C is a flow chart of an exemplary method of using a BIRD to monitor an item, according to an embodiment of the present system and method.
Figure 3D:
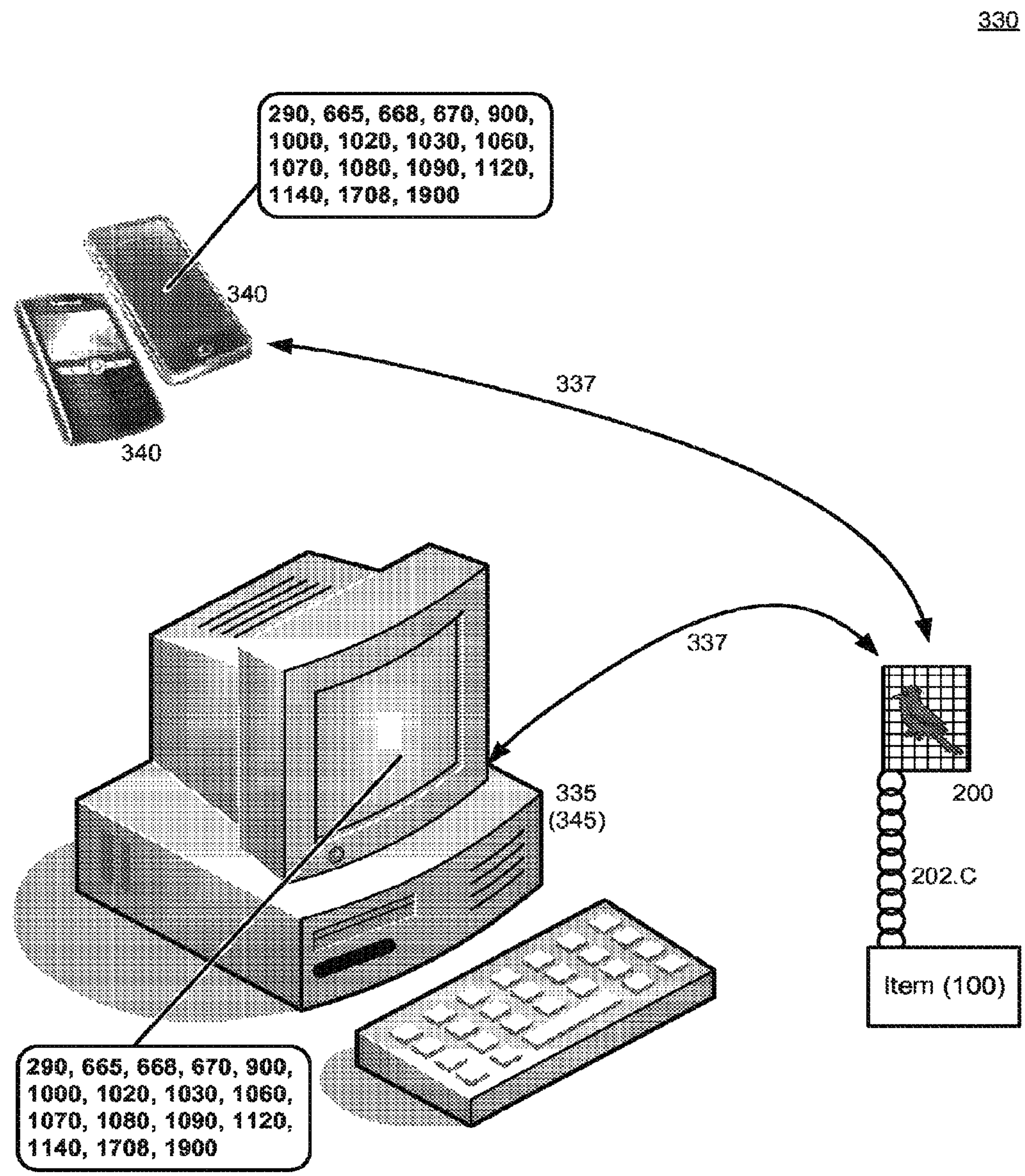
FIG. 3D illustrates an exemplary connection between a BIRD and a computer or other processing device which may used to configure the BIRD.

In an alternative embodiment, field control/configuration of the BIRD (200) may be accomplished by a wired or wireless interface between the BIRD (200) and a device used as a portable configuration computer (335) (see FIG. 3D). For example, a cell phone (340, see FIG. 3D) or tablet computer may function in the field as a configuration computer (335) which may interface with the BIRD (200) via the ports (226) or the communications transceivers (240). In an embodiment, this may minimize or eliminate altogether the need for the local I/O interface (280), and/or for the biometrics (282.B), display (282.D), microphone (282.M) and/or local input (282.L).

In an embodiment, the BIRD (200) may communicate with the portable configuration computer (335), such as the cell phone (340), via the standard cellular network or other established network system. In an alternative embodiment, a cell phone (340) or other portable configuration computer is configured with a dedicated transceiver element for local communications with the BIRD (200). For example, a WiFi or Bluetooth transceiver in the cell phone (340) may be configured to communicate with the BIRD's WiFi (240.W) or Bluetooth (240.B) transceivers. A single cell phone (340) may be configured to communicate with multiple BIRDs (200) associated with items (100) belonging to the authorized user (AU).

In the event the authorized user (AU) loses or misplaces their cell phone (340) (or the cell phone is stolen), provision made be made for the BIRD (200) to communicate with other communications devices, such as a borrowed cell phone or tablet computer. Suitable security protections (for example, password protections) would be put in place to ensure the security of the BIRD (200). (As discussed further below in conjunction with "active devices," a cell phone (340) may itself be configured with BIRD elements and functionality in anticipation of possible cell phone loss, misplacement, or theft.)

(f) BIRD Additional Memory or Storage

In addition to the main memory (206.M) already discussed above, in an embodiment the BIRD (200) may have additional forms of memory, or secondary memory (206.S). However, due to considerations of minimizing the BIRD's size, weight, and/or power consumption, in an embodiment the secondary memory (206.S) may be omitted.

In embodiments where secondary memory (206.S) is employed, the secondary memory (206.S) may be used to store transitory programs, to store data for removal to other processing systems, and for similar purposes. The secondary memory (206.S) may include, for example and without limitation, cache memory (206.S.C); a flash drive, optical drive, or hard disk drive (206.S.F); another removable storage element or drive (206.S.R); or an interface (206.S.N) such as a slot or port for a removable storage unit (206.RSU).

As will be appreciated, the removable storage unit (206.RSU) includes a computer usable storage medium having stored therein computer software and/or data. Examples of such may include a program cartridge and cartridge interface (such as that found in video game devices), a removable memory chip (such as an erasable programmable read only memory (EPROM), or programmable read only memory (PROM)) and associated socket, and other removable storage units (206.RSU) and interfaces (206.S.N), which allow software and data to be transferred from the removable storage unit (206.RSU) to the BIRD (200).

(g) BIRD Software and Program Control

In this document, the terms "non-transitory, physical storage medium," "tangible computer program medium", "tangible computer usable medium" and similar terms are used to generally refer to media such as the removable storage drive (206.S.R); or to flash memory, an optical disk, or a magnetic disk installed in the flash/optical/hard disk drive (206.S.F); or to removable storage units (206.RSU). The terms the terms "non-transitory, physical storage medium," "tangible computer program medium", "tangible computer usable medium" and similar terms may also refer to hard drives, optical disks, flash memory, and similar tangible data storage media which may be connected to or inserted into a configuration computer (335). Since the configuration computer (335) can, in turn, be coupled to the BIRD (200) (as discussed further below, see FIG. 3D), the "non-transitory, physical storage medium," "tangible computer program medium", "tangible computer usable medium" and similar terms can be directly or indirectly coupled to the BIRD (200) via the configuration computer (335). These tangible computer program products provide software to BIRD (200). The current system and method is directed in part to such computer program products.

Computer programs (also referred to as computer control logic) are stored in the BIRD's main memory (206.M) and/or secondary memory (206.S) and/or in the removable storage units (206.RSU). Computer programs may also be received via the communications interface (220). Such computer programs, when executed, enable the BIRD (200) to perform the features of the present system and method, as discussed herein. In particular, the computer programs, when executed, enable the processor (204) to perform the features of the present system and method. Accordingly, such computer programs represent controllers of the BIRD (200).

In an embodiment where the invention is implemented using software, the software may be stored in a computer program product and loaded into the BIRD (200) using the removable storage unit(s) (206.RSU), or via the flash/optical/hard drive (206.S.F), or via removable storage drive (206.S.R), or via the communications interface (220). The software may also be loaded into the BIRD (200) via a configuration computer (335), as discussed further below in conjunctions with FIG. 3D. The control logic (software), when executed by the processor 204, causes the processor 204 to perform the functions of the present system and method as described herein.

In another embodiment, the present system and method is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

The elements of a BIRD (200) described above are exemplary only. Other BIRDs (200) may be envisioned which employ less hardware, more hardware, or alternative hardware elements, as necessary or helpful to implement the methods and algorithms described throughout this document.

Further Sensor Considerations

Sensor Operations Overview

A BIRD (200) is configured to store data values, data ranges, data variations and data patterns—generally in the form of usage expectations (600)—which are emblematic of the BIRDed-item (102) as the BIRDed-item (102) is put to normal or typical usage by a particular authorized user (AU). The usage expectations (600) embody environmental data reflective of typical item usage and/or storage by the authorized user (AU), and are stored in the BIRD (200) itself.

In operation, the BIRD (200) compares usage data (700.U), reflective of the BIRDed-item's (102) environment, against the expected environment (144) as captured in the usage expectations (600). In general, the sensors (210) are employed to collect the real-time environmental data (700.R) over extended time intervals, ranging from minutes to hours, days, or even weeks or longer. The environmental data (700) is further analyzed to determine real-time ranges, variations, and patterns in the data, yielding processed data (700.P). The environmental data reflective of typical usage, by the authorized user (AU), is stored in the BIRD (200) itself as historical sensor data (700.H).

The BIRD (200) is configured so that it can maintain a real-time monitor of the environmental data. In use, the BIRD (200) maintains a substantially continuous or periodic monitor of the environment, and assesses the state of its associated item (100) in relation to the environment. If the usage data (700.U) varies significantly from the conditions embodied in the usage expectations (600), then the BIRD (200) determines that displaced/anomalous usage (503.0/503.2) of the item (100) may be in progress. The BIRD (200) then initiates a signal to an appropriate party, typically an owner or other authorized user (AU) of the item (100), that displaced/anomalous usage (503.0/503.2) may be in progress.

The details of this process, and particular applications, are discussed further below. Particular applications including determining when anomalous usage (503.2) indicates that an item (100) linked to BIRD (200) may be lost (503.0.1), misplaced (503.0.2), misappropriated (503.0.3), wandering (503.0.5), or stolen (503.0.4).

Observer Sensors vs. Interrogation Sensors

In an embodiment, many or all of the sensors employed by a BIRD (200) can operate in a pure observer mode, meaning they are configured simply to passively receive appropriate types of energy from the environment and transduce that energy into meaningful electrical signals for further processing. Examples of such sensors include, for example and without limitation, location sensors (210.L), motions sensors (210.M), various optical sensors (210.C, 210.V, 210.Opt), audio sensors (210.AI, 210.AC), temperature sensors (210.T), and others.

In some embodiments, a BIRD (200) may include sensors which actively interrogate the environment, transmitting energy and/or signals into the environment and then analyzing energy which is reflected back to the BIRD (200) by the ambient environment. Such sensors may include, for example and without limitation, sonar (210.S) and radar (210.RR).

In some cases observer sensors may, at least at times, be augmented with energy emitting elements. For example, optical sensors (210.C, 210.V, 210.Opt) or general electromagnetic sensors (210.E) (such as infrared sensors) may determine that the environment around the BIRD (200) is dark (meaning the environment has insufficient RF energy for clear detection by the sensors). In an embodiment, the BIRD (200) may be configured to emit appropriate energy to illuminate the environment for the benefit of the sensors (210). For example, a BIRD may use an integrated light source (not shown) or integrated infrared source (not shown) to provide any needed illumination for optical sensors (210.C, 210.V, 210.Opt) or general electromagnetic sensors (210.E). In combination with the energy emitting elements (for example, light sources), sensors (210) which are otherwise strictly observer sensors become interrogator sensors.

Since interrogator sensors emit energy as part of their operations, they can be a drain on BIRD power. In an embodiment—and for various reasons, including limiting power consumption—a BIRD (200) may be configured to only activate or use interrogator sensors under specified conditions. For example, BIRD logic (500) and/or usage expectations (600) (discussed in detail further below) may specify that interrogation sensors are only to be activated if other sensors—observer sensors—first provide some indication that the BIRD (200) and its associated item (100) may be in a displaced/anomalous state (503.0/503.2).

Resolution and Sensitivity

The sensors (210) integrated into the BIRD (200) need to have sufficient resolution and sensitivity to implement the methods described herein. At the same time, since the BIRD (200) is generally intended for field use with small, portable items, other goals in selection or design of the sensor technologies employed include small size, light weight, and low power consumption. For a BIRD (200) configured for typical consumer use, it will also generally be desirable to maintain relatively low cost to the consumer, which in turn requires low costs for parts. The resolution and sensitivity and the sensors (210) incorporated into a BIRD's design will reflect appropriate trade-offs between sufficient resolution and sensitivity needed for the methods described herein, along with the goals of light weight, small size, and manageable costs.

Applications of the RFID Sensor

A BIRD's RFID sensor (210.RFID) sensor may have multiple applications, some of which are discussed here. Additional applications, or elaborations of these applications, are discussed elsewhere throughout this document:

- Item proximity: In operation, a BIRD (200) is intended to be in substantial and sustained proximity to its associated item (100). In an embodiment, this proximity is established and maintained via a tether (202). In an embodiment, the tether (202) contains active electronics to sense and determine the integrity of the connection between the BIRD (200) and the item (100) (see FIG. 2G, below, and other figures throughout this document). In an alternative embodiment, the tether lacks such active electronics. In such embodiments, an authorized user (AU) may attach to the item (100) an RFID tag. The BIRD's RFID interrogator (210.RFID), possibly in conjunction with the item link integrity detection module (224), can then query the item's tag to determine if the item (100) remains in close proximity to the BIRD (200).

In addition, even if the tether (202) does contain active link-integrity electronics, the electronics may determine that the integrity of the connection is broken. (That is, the tether (202) and the item link integrity detection module (224) may determine that the item (100) is no longer mechanically coupled to the BIRD (200).) In that event, the BIRD (200) may still determine, via the RFID interrogator (210.RFID), possibly in conjunction with the item link integrity detection module (224), whether the item (100) is still in substantial spatial proximity to the BIRD (200).

- Alternate location determination: A BIRD (200) may be in operation in a location, such as an indoor facility, where some conventional location sensors and/or methods of location determination do not work. For example, GPS determinations are not always available in some indoor facilities (or even sometimes outdoors, in a heavily sheltered structure such as an open parking garage). Some buildings and facilities, including some secure facilities, have RFID tags strategically distributed through the building. In such facilities, the BIRD's RFID interrogator (210.RFID) may interrogate the local RFID tags to obtain location data for the BIRD (200) and its associated item (100). An authorized user (AU) or administrator may elect to place RFID tags at various zones (140.Z) within their home or office as an alternate or additional means of helping a BIRD (200) identify the location of a misplaced item (100).

Sensing other nearby objects: A BIRD (200) is typically associated with an item (100). In some instances or contexts, at certain times, or for certain uses of an item (100), it may be expected or desired that other items (referred to here, for convenience, as "other objects" or simply "objects") should also be in proximity to the item (100) and the BIRD (200). A user may tag these other objects with unique RFID tags for identification purposes. The BIRD (200) may then be configured or trained to search, via its RFID interrogator (210.RFID), for the nearby presence of these specified RFID-tagged other objects.

Applications for sensing other nearby objects including item teams (1400), discussed further below (see for examples FIGS. 14A-14I); and containers (1700) which are configured to sense for expected contents, also discussed further below (see for example FIGS. 17B-17G).

Power Savings and Power Control

Because a BIRD (200) may be in field use for an extended period of time, it is preferable to configure the BIRD (200) to minimize power consumption. Several methods may be employed to limit power consumption by the BIRD (200).

Certain categories of environmental monitoring may be turned off, or reduced in frequency, based on data regarding other types of environmental sensing. For example, it may be that image capture is only required when an item (100) is in motion and/or changing location. A BIRD's motion sensor (210.M) may report that the item (100) is not in motion (or only in limited motion), or the location sensor (210.L) may report that the item (100) is in substantially the same place for a period of time. In response to such data from the motion sensor (210.M) or location sensor (210.L), the BIRD (200) may be configured to reduce a frequency of image capture by a camera (210.C) or video camera (210.V), or even to power down the camera(s) (210.C, 210.V) altogether. Similarly, if the motion sensor (210.M) determines that no motion or minimal motion is taking place, such that the item's location cannot substantially change, the location sensor (210.L) may be shut down or put in reduced-power mode until substantial motion is again detected.

Other such power-saving optimizations may be envisioned as well, linking an activity level of a first sensor to values of environmental data reported by a second sensor.

Another power saving option is controlled frequency of sensor monitoring. The BIRD (200) may be configured so that certain, selected sensors (210) may be powered down for a period of time—effectively reducing the frequency of usage, but also reducing power consumption—when the BIRD (200) is in locations (104.L) where those sensors and their data are not applicable. Some sensors (210) may not be employed altogether in certain locations (104.L). Similarly, if battery power is low, priority may be allocated to those sensors (210) deemed most likely to produce a determination of extant/normal item state (503.1/503.3) vs. displaced/anomalous item state (503.0/503.2), while other sensors are shut down.

Dormant or Very Reduced Power Mode:

In an embodiment, a BIRD (200) may be configured to be coupled with, or integrated into, items which are typically expected to remain in one place, and not be in-use by a person, for extended periods of time. For example, a BIRD (200) may be integrated into a book (100.E) which is expected to remain on the book shelf most of the time. In a very reduced power mode, the BIRD (200) may monitor only for item motion. If-and-when motion is detected, the BIRD (200) may fully power up, and monitor the book's environment to determine if the book's usage (for example, the location) is consistent with the book's expected usage. Because the BIRD (200) is normally in a very lower power, dormant mode when the book is on the shelf, the BIRD (200) may be able to monitor the book (100.E) for an extended period of time. This can help ensure that the book does not "wander away" in the hands of an unauthorized reader.

Additional Hardware Implementations, Configurations, and Optimizations

Persons skilled in the relevant arts will recognize that some existing technologies embody various combinations of some of the elements described above for a BIRD (200). For example, most or all of the processing-related elements (processor (204), memory (206), clock/calendar/timer (208), and possibly others) are found in contemporary personal computers, laptop computers, tablet computers, and cell phones. Buses (214), some types of sensors (210), and communications elements (240) are also found in contemporary personal computers, cell phones (340), and similar devices.

However, various design considerations and resulting hardware implementation details, which are not specifically illustrated in FIG. 2A, may serve to distinguish a BIRD (200) from other processor-based technologies.

Size and Weight Considerations

In an embodiment, a BIRD (200) is intended to be attached to or embedded within items (100) which are physically small, such as keys (100.K), wallets (100.W), various personal accessories (100.S), and similar.

In order to maintain convenience for users, it is therefore desirable that a BIRD (200) typically be scaled in both size and weight to these small, personal, portable items. While this does not impose any specific size constraints, persons skilled in the relevant arts will recognize that it is often desirable to make a BIRD (200) at least as small as, if not smaller, than a typical cell phone. It is similarly desirable to make a BIRD (200) lighter, in some case drastically lighter, than a cell phone (340), and to have less power consumption than a cell phone as well.

Manual Handling Design Considerations

The expected manual manipulation, by human hands, of different technologies imposes, or at least encourages, certain design considerations as well. For example, cell phone users frequently employ their phones for texting or messaging, as well as for the use of various cell phone applications. The extensive manipulation of the cell phone's user interface for these purposes tends to impose a minimum size requirement, such that a cell phone (340) is at least large enough for convenient keying-in of text. By contrast, and in an embodiment, the user of a BIRD (200) may be expected to make less frequent use of the user interface features, which in turn lends itself to BIRD designs which may be substantially smaller than a cell phone (340). In an embodiment, it is desirable to make a BIRD (200) substantially smaller than a cell phone (340).

Battery Life and Reduced Power Consumption

Longevity of battery life is an additional design goal. Depending on anticipated usage, it may be desirable for the BIRD power source (216.S, 216.E) to last for a full day, several days, or even several weeks. Low heat output is another desirable goal for a BIRD (200).

Possible Omitted Elements

The goals of small size and small weight, as well as the goal of preserving battery life, may yield specific hardware embodiments of a BIRD (200) which omit one or more elements discussed above in conjunction with FIG. 2A. Elements which may be omitted in some embodiments may include:

- some (but not all) of the sensors (210);
- some or all of the communications ports (226), where data transfers may be accomplished instead by wireless means (240) or infrared means (not illustrated in FIG. 2A);
- some or all elements of the local I/O elements (282.B. 282.D, 282.L, 282.M), possibly along with local I/O interface (280); and
- some or all elements of secondary memory (206.S) and removable storage units (206.RSU).

In an embodiment, the secure emergency battery (216.E) and/or the power monitor (218) may be omitted as well, although this entails some tradeoffs in BIRD security and reliability. Similarly, the item link integrity detection module (224) may be omitted, again with some trade-offs in device functionality.

Further Structural Design Considerations

These broad, high level design goals (for example, small size, light weight, low heat generation, extended battery life) impose further specific design constraints on a BIRD (200). In an embodiment, each specific element of the BIRD (200) must be designed with a view towards small size and low power. This means that, in an embodiment, a BIRD (200) may actually employ a processor (204) and memory (206) which run at slower speeds, and have reduced processing capabilities, as compared with the processor/memory of contemporary laptop computers, tablet computers, PDAs, or cell phones. Reduced speed and reduced processing capabilities are associated with small size, light weight, reduced power consumption, and low heat generation.

Similarly, the sensors (210) employed on a BIRD (200) may generally require significantly lower resolution and/or lower sensitivity than those employed on most contemporary personal computers, cell phones, and similar devices. For example, a BIRD (200) may include an optical sensor (210.Opt) or camera (210.C). The optical sensor (210.Opt) or camera (210.C) is used to determine light levels and/or surrounding physical environments (as recorded visually) for an item (100) associated with the BIRD (200). In an embodiment, it is advantageous for the optical sensor (210.Opt) employed to be a camera (210.C), so that the BIRD can record specific images of the environment surrounding an item (100). However, for purposes of the BIRD (200), even relatively low resolution images may be sufficient to compare a presently imaged environment with a previously captured image environment (representing an expected environment (144) for the item). Therefore a low resolution camera (210.C) may be employed, saving on size, weight, and power consumption. In an alternative embodiment, a camera is not employed at all. Rather, the optical sensor (210.Opt) is a much simpler photosensitive element configured primarily to determine ambient light levels surrounding an item (100).

In another example, a BIRD (200) may employ a motion sensor (210.M), which may for example be an accelerometer, to determine the speed and acceleration of an item (100) physically tethered to the BIRD (200). The purpose of the motion sensor (210.M) is to compare a present (that is, current) speed or acceleration of the item (100) with an expected speed or acceleration. The determinations necessary for such comparisons may often be approximate or within general ranges. For example, it may be desirable to determine if an item is approximately stationary; or being used at approximately a typical human walking speed; or being used at a typical human running speed; or being transported in an automobile. For such comparisons, and such general ranges of speeds or accelerations, measurements of speed or acceleration may have a substantial degree of error, and still be useful. As such, a relatively compact, low cost, low resolution motion sensor (210.M) may be sufficient for some embodiments of a BIRD (200).

Similar considerations may apply to measurements of other environmental factors, such as ambient moisture (via moisture sensor (210.U)); ambient temperature and/or device temperature for active items (discussed further below) (determined via temperature sensor 210.T); and even for the location sensor (210.L); and other sensors as well. As such, in various embodiments, the sensors (210) of a BIRD (200) may be smaller, lighter, less expensive, less heat-generating, and of lower power consumption than the sensors which may be employed for other contemporary processor-based devices such as computers and cell phones.

In an embodiment, then, a BIRD (200) is a specialized processing device designated principally for the identification of environmental data, and for the determination of an extant/normal (503.1/503.3) or displaced/anomalous (503.0/503.2) environment of an item (100) associated with the BIRD (200). In an embodiment, the environmental data sensed and recorded by the BIRD (200) need only be of such accuracy or precision as to enable a meaningful comparison between a present environment of an item (100) and the expected environment (144) of the item (100). Such comparisons may be approximate or fuzzy in nature, and still be useful to determine if an item's usage/environment is normal or anomalous (503.2).

In such embodiments, a BIRD (200) only has a processor (204), memory (206), sensors (210), and other elements which are sufficient—in processing abilities, speed, resolution, data storage and program code storage, and similar design parameters—to implement the normal/anomalous-item detection algorithms and methods described throughout this document.

As such, in various embodiments, the specific architectural design of a BIRD (200) may employ components which are reduced in functionality and power compared with generally analogous components employed in general-purpose personal computers, cell phones, personal digital assistants, and similar technologies. In such embodiments, a BIRD (200) differs significantly from the typically higher-powered, faster, heavier, and more voluminous requirements associated with general-purpose personal computers, cell phones, personal digital assistants, and similar technologies.

However, the precise component and functionality/power requirements of BIRD technology may vary in different embodiments.

In an exemplary embodiment—referred to for convenience as a "first minimal signal processing configuration"—a BIRD (200) may employ only a location sensor (210.L). In such embodiments, normal (503.3) vs. anomalous (503.2) item usage may be distinguished, in whole or in part, based on a comparison between the present item location and the expected item location. In such embodiments, the demands on the processor (204) and memory (206) may be minimal compared with the requirements of a BIRD (200) with additional sensing capabilities. As such, the size, power, capabilities, speed and weight of the processor (204) and/or memory (206) may be minimized.

In an alternative exemplary embodiment—referred to for convenience as a "second minimal signal processing configuration"—a BIRD (200) may employ only an optical sensor (210.Opt) and/or a sound sensor (210A) sufficient for basic discrimination of light intensities or sound intensities. In such embodiments, normal (503.3) vs. anomalous (503.2) item usage may be distinguished, in whole or in part, based on a comparison between ambient light intensities or sound intensities, and expected light or sound intensities. In such embodiments, not only can the optical sensor (210.Opt) or the audio sensor (210A) be functionally minimal, but the demands on the processor (204) and memory (206) are minimal compared with the requirements of more advanced signal processing. As such, the size, power, capabilities, speed and weight of the processor (204) and/or memory (206) may be minimized.

In an alternative exemplary embodiment—referred to for convenience as an "advanced signal processing configuration"—a BIRD (200) may employ a camera (210.C) or video camera (210.V), and/or a sound sensor (210A) configured for voice and/or language recognition. (Such sensors (210) may also accomplish basic discrimination of light intensities or sound intensities as well.) In such advanced signal processing configurations, normal (503.3) vs. anomalous (503.2) item usage may be distinguished, in whole or in part, based on a comparison between ambient visual features (faces, buildings, other items in the environment) or ambient sound qualities (language, particular voices, or even music or other sound identification), versus the expected visual or sound qualities. Such advanced signal processing embodiments require more advanced technologies than a simple optical sensor (210.Opt) or minimal audio sensor (210A) limited to sound intensity detection. The demands on the processor (204) and memory (206) increase as well, due to the requirements of more advanced signal processing.

In an alternative embodiment, a BIRD (200) may employ elements not found in contemporary personal computers, tablet computers, cell phones, PDAs, etc. For example, some sensors (210) which may be employed on some BIRDs (200), such as an air pressure sensor (210.AP), surface pressure sensor (210.SP), temperature sensor (210.T), moisture/humidity sensor (210.U), sonar (210.S), radiation sensor (210.RN), chemical sensor (210.CH), and other sensor are not typically found on cell phones, personal computers, PDAs, or similar. These sensors and others, and the environmental data they collect, may be gainfully employed to determine extant/normal (503.1/503.3) or displaced/anomalous (503.0/503.2) device usage and/or normal/anomalous device contexts.

In an alternative embodiment, some of the extant/normal (503.1/503.3) vs. displaced/anomalous (503.0/503.2) item environment detection algorithms and methods described herein may be implemented using processing systems and sensors associated with active items (100.Act) such as personal computers, laptop computers, tablet computers, cell phones, PDAs, and similar devices. The implementation of these BIRD algorithms in these devices may enable these devices to function as a BIRD for purposes of self-determining if the item (computer, cell phone, etc.) is in an extant/normal state (503.1/503.3) of usage or is in an displaced/anomalous state (503.0/503.2) of usage. This is discussed further below in conjunctions with FIGS. 13A-C, and in conjunction with other discussion throughout this document of active items (100.Act).

However, even these existing processing systems (personal computers, laptop and tablet computers, cell phones, etc.) may benefit, for usage as active items, from additional hardware elements distinctive to a BIRD (200). For example, the redundant and security-oriented power features described herein are just one BIRD element, among others, that may be integrated into these other processing devices.

Additionally, while BIRD algorithms may be implemented in whole or in part on laptop and tablet computers, cell phones, PDAs, and similar devices, these devices are generally not suitable for use as BIRDs (200) to be associated or coupled with other items. This is at least because personal, laptop, and tablet computers, as well as cell phones and other PDAs, have their own independent uses; in view of at least this, they are not suitable for being physically coupled with, and substantially collocated with, other items (100) for extended periods of time. In addition, personal, laptop, and tablet computers, and also cell phones and PDAs, typically have a size, weight, power consumption requirements, and other hardware configuration aspects, which make them substantially less than optimum for use as BIRDs (200). Similar considerations may apply to other hardware elements of the BIRD (200).

Summary of Specialized BIRD Hardware Configuration Considerations

In general, a processing system is characterized not just by a list of generic hardware components, but rather in terms of a constellation of specific components with carefully selected hardware design parameters suitable for both the external usage of the system and for the internal processing requirements of the system.

In some embodiments for typical personal consumer usage, the BIRD (200) is itself meant to be an inexpensive, small, light-weight, low-power consumption device comprised of its hardware components in conjunction with suitable algorithms to determine whether an associated item is in extant/normal (503.1/503.3) or displaced/anomalous (503.0/503.2) usage. The BIRD (200) is constructed using a particular choice of components among multiple similar components or similar types of components which may be available (for example, a variety of processors (204) are available on the market, as are a variety of memory types (206)). The BIRD (200) is designed so that the particular choices of components provide an optimum balance between:

(i) the structural goals (light weight, lower power consumption, small size, long battery life), and . . .

(ii) the processing requirements and supporting element requirements for determining and signaling extant/normal (503.1/503.3) vs. displaced/anomalous item usage (503.0/503.2) or contexts.

The processing system is further determined by a particular configuration, arrangement, and connection of the components which is substantially optimized to achieve the specified set of operational behaviors and usage features.

For the BIRD (200), the choice, configuration, and arrangement of components—including but not limited to those components which may be similar to, though not necessarily the same, as those employed in other processing systems—is tailored to provide for the substantial optimization of the BIRD (200) for the purposes and uses described herein. Thus, even if a generic list of BIRD components appears to be substantially the same or similar between the BIRD (200) and some other processing technologies, it is the particular hardware configuration, and its substantial optimization for use as a BIRD (200), which contributes at least in part to distinguishing the BIRD (200) from the other processing technologies.

Further Alternative Hardware and Design Considerations and Distinctions

In alternative embodiments, a BIRD (200) may benefit from a processor (204), memory (206), or sensors (210) which have greater capabilities or requirements than the analogous components typically employed for laptop computers or cell phones. This may be particularly true for BIRDS which are configured for specialized items (100) used in industrial contexts, or BIRDs configured for use with large or heavy portable items (100).

Further distinctions between the BIRD (200) and the other processing technologies are apparent based on other BIRD optimizations, including but not limited to:

- one or more specific hardware components used in the BIRD (200) which may not be employed at all in the other processing technologies;
- the unique combination of elements employed by the BIRD (200) which may not be exactly duplicated in other processing technologies;
- the internal electronics (such as bus (214)) employed internally by the BIRD (200) to integrate operations of all components; and
- the employment by the BIRD (200) of algorithms and methods not employed in the other processing technologies.

BIRD algorithms and methods are described throughout this document and are by themselves distinctive and distinguishing features of the present system and method, even when employed with or integrated into existing processing technologies (computers, cell phones, PDAs, etc.), as may the case with active items (100.Act) discussed further below. (See FIGS. 13A-13C and other discussion of active items throughout this document.)

FIG. 2B

First Reduced BIRD Configuration

Figure 2B:
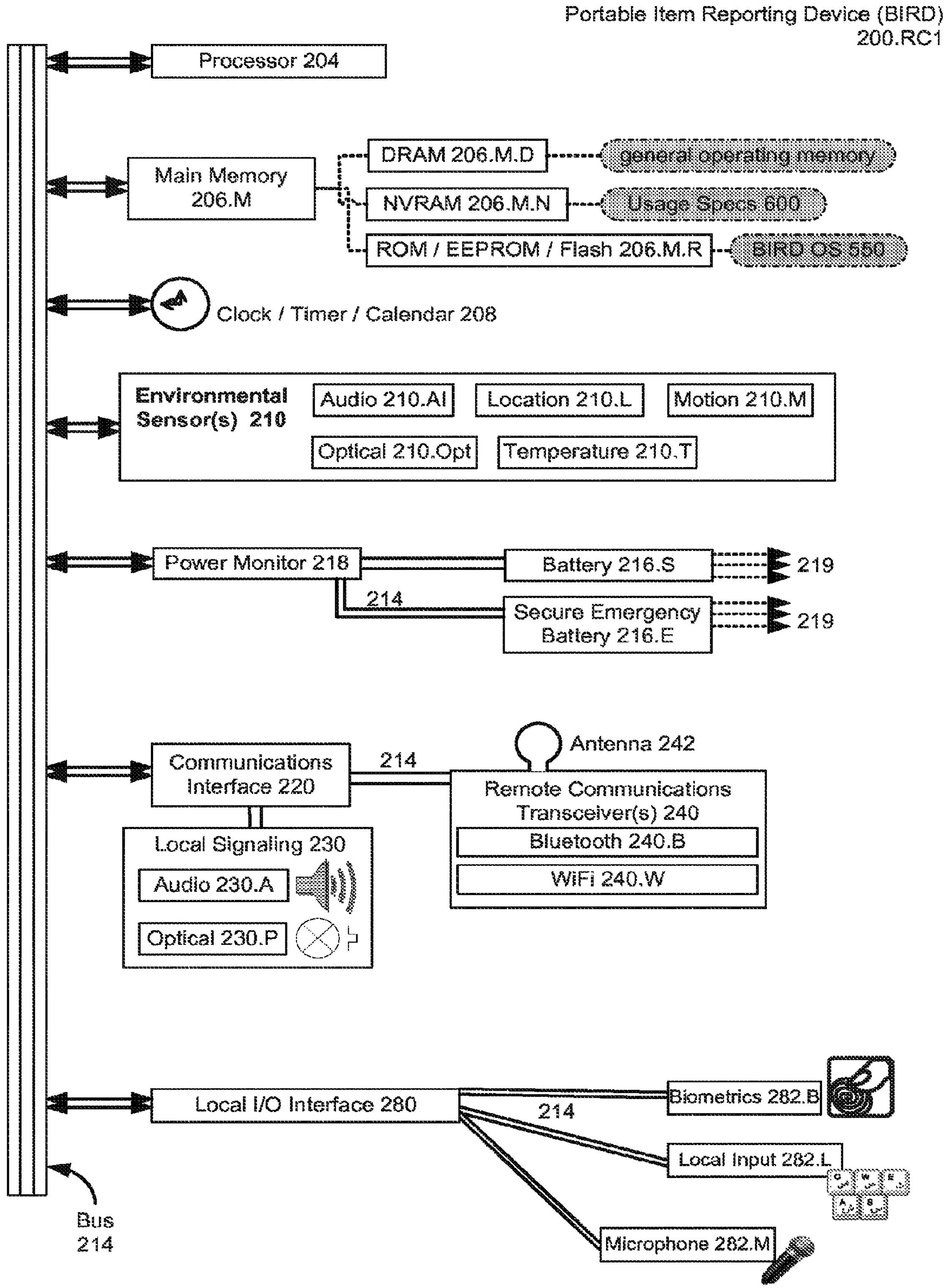
FIG. 2B is a schematic, system level illustration of an exemplary internal architecture of an exemplary BIRD according to an embodiment of the present system and method.

FIG. 2B illustrates another exemplary internal schematic architecture for a portable item reporting device (BIRD) (200.RC1) with a first reduced configuration (as compared with the BIRD (200) illustrated in FIG. 2A), according to an embodiment of the present system and method.

The BIRD (200.RC1) shares many elements in common with the BIRD (200) illustrated in FIG. 2A, and a detailed discussion of these elements will not be repeated here. However, certain differences between the embodiment shown in FIG. 2A and the embodiment 200.RC1 of the present figure are discussed immediately below.

A BIRD (200.RC1) may have a reduced configuration for any number of reasons, including reduction in cost, reduction in size, reduction in weight, and reduction in power consumption. Depending on the specific intended applications of a BIRD (200), a BIRD (200.RC1) may have all the hardware components needed to enable the BIRD (200.RC1) to effectively distinguish when an item is extant (503.1) versus when an item is displaced (503.0) (lost, misplaced, stolen, misappropriated, or wandering), or otherwise in an anomalous state (503.2). In an embodiment, such a reduced configuration BIRD (200.RC1) may be suitable to self-determine extant/normal item states (503.1/503.3) from displaced/anomalous item states (503.0/503.2) within limited or designated environmental contexts.

A BIRD (200.RC1) may have a relatively limited set of sensors (210). In FIG. 2B, the BIRD (200.RC1) has an audio intensity sensor (210.AI), a location sensor (210.L), a motion sensor (210.M), an optical sensor (210.Opt) (configured to detect light intensity, but not to capture pictures or motion images), and a temperature sensor (210.T). In alternative embodiments, other combinations of sensors may be employed. The BIRD (200.RC1) has fewer sensors than the exemplary BIRD (200) illustrated in FIG. 2A. (For example, the BIRD (200.RC1) does not have an audio content identification sensor (210.AC), and does not have a camera (210.C) or video camera (210.V).) In such a hardware embodiment, the BIRD logic (500) and usage expectations (600) will be configured to make determinations of extant/normal item states (503.1/503.3) or displaced/anomalous item states (503.0/503.2) using the available sensor data (700).

The BIRD (200.RC1) still has a secure emergency battery (216.E), and a power monitor module (218) configured for various power management and control operations. In an embodiment, and with certain inherent trade-offs in BIRD reliability under some circumstances, either or both of the secure emergency battery (216.E) or power monitor (218) may be omitted.

The BIRD (200.RC1) omits ports (226) (such as a USB or Firewire port), and instead relies entirely on a remote communications transceiver (240) (such as for example a WiFi connection (240.W) or a Bluetooth connection (210.B)) to link to external digital devices. In an alternative embodiment, one or more ports (226) may be part of the BIRD (200.RC1), but wireless linkages (WiFi (240.W), Bluetooth (210.B), and so on) may be omitted entirely.

In the embodiment shown in FIG. 2B, the BIRD (200.RC1) retains capability for local signaling (230) and remote reporting (via remote the communications transceivers (240)). In an alternative embodiment, a BIRD (200.RC1) may be configured with only one of either the local signaling elements (230) or the remote communications transceivers (240), but not both. In such embodiments the BIRD (200.RC1) will be capable of one of local signaling or remote reporting, but not both.

In an embodiment, the BIRD (200.RC1) may have a reduced set of local interfaces (282) as compared with the interfaces (282) illustrated in FIG. 2A. For example, the BIRD (200.RC1) illustrated in FIG. 2B omits a display 282.D. In an embodiment, most or all of the elements of local interfacing (280, 282) may be omitted; in such an embodiment, control of the BIRD (200.RC1) may be achieved by interfacing with the BIRD (200.RC1) from a configuration computer (335), cell phone (340), or similar, via remote communications transceivers (240).

In an embodiment, the BIRD (200.RC1) with a reduced configuration may enable the use of a processor (204) and/or memory (206) with less power (as measured by appropriate metrics), as compared with the processor (204) and/or memory (206) of the BIRD embodiment (200) illustrated in FIG. 2A.

FIG. 2C

Second Reduced BIRD Configuration

Figure 2C:
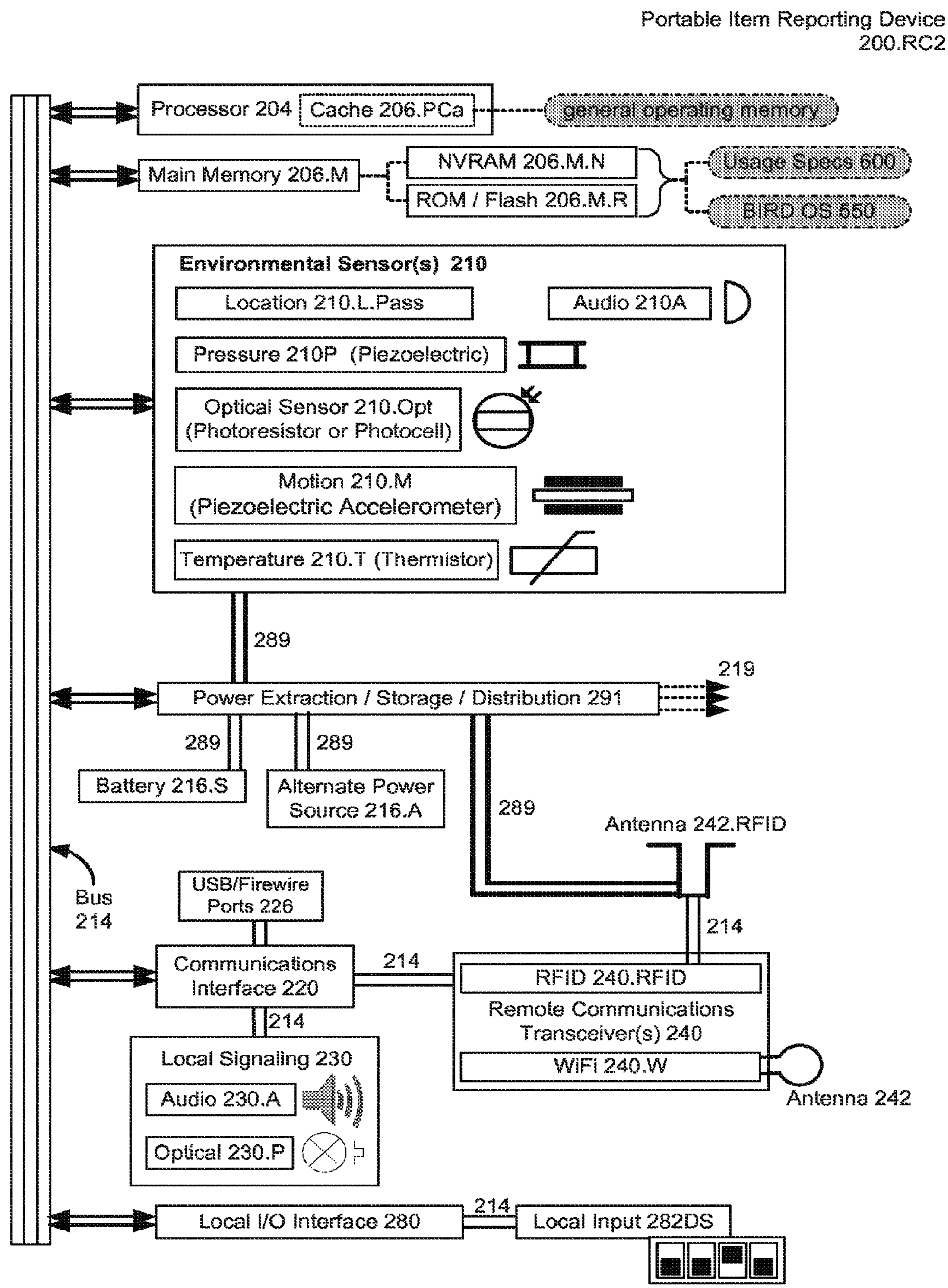
FIG. 2C is a schematic, system level illustration of an exemplary internal architecture of an exemplary BIRD according to an embodiment of the present system and method.

FIG. 2C illustrates another exemplary internal schematic architecture for a portable item reporting device (BIRD) (200.RC2) with a second reduced configuration (as compared with the BIRD (200) illustrated in FIG. 2A).

The BIRD (200.RC2) shares many elements in common with the BIRD (200) illustrated in FIG. 2A, and a detailed discussion of these elements will not be repeated here. However, certain differences between the embodiment shown in FIG. 2A and the present figure are discussed immediately below.

The BIRD (200.RC2) may be configured with a reduced set of BIRD software (a stripped down BIRD logic (500) and/or a minimal operating system (550), both discussed further below), so that the BIRD (200.RC2) does not require DRAM memory (206.M.D). Rather, the BIRD (200.RC2) may be designed to support all processing within an on-board processor cache memory (206.PCa) which is structurally part of the processor (204). Lacking conventional DRAM, main memory (206.M) may consist of just one or both of NVRAM (206.M.N) or ROM/EEPROM/Flash memory (206.M.R), or some other form of non-volatile memory for sustained storage of the BIRD operating system (550) including BIRD logic (500), and usage expectations (600).

Environmental sensors (210) may be confined exclusively to sensors which require no input power or external power for operation, such as piezoelectric sensors or a microphone, or a purely passive locationing system (210.L.Pass) (which may, for example, rely on position data received from local environment position beacons (1507)). Such sensors (210) may have reduced resolution or other lesser capabilities compared with actively powered sensors. In such a hardware embodiment, the BIRD logic (500) and usage expectations (600) will be configured to make determinations of extant/normal item states (503.1/503.3) or displaced/anomalous item states (503.0/503.2) using the available sensor data.

Such sensors (210), which require no external power, may have the additional advantage that part of the signal power they generate may be siphoned off to provide power for other elements, via power-extraction lines (289) and a power-extraction/storage/distribution unit (291). Power may also be extracted from the antenna (242), and possibly from a secondary antenna (242.RFID) used for received RFID communications. Additional power may be extracted from one or more alternate power sources (216.A), including for example and without limitation: a photovoltaic material (not shown) covering a substantial portion of the BIRD's outer casing (250) (see FIG. 2D); a motion-based power source (not shown) in addition to motion sensor (210.M); or a source (not shown) which generates power based on a heat differential, such as a differential between room temperature air and body heat. The BIRD (200.RC2) may also have a battery (216.S) (not shown); however, the use of various supplemental power sources (210, 216.A, 242.RFID, 242) may enable the use of a smaller, lighter battery than that employed by the exemplary BIRD (200) of FIG. 2A.

Similarly, a deliberate choice of a lightweight, low-power-consumption communications interface for the BIRD (200.RC2) may entail eliminating USB/Firewire ports (226); and/or some or all modes of local signaling (230); and/or some or all modes of remote communications transceivers (240). For example, in an embodiment, the BIRD (200.RC2) employs only RFID communications via an RFID communications transceiver (240.RFID). In an alternative embodiment, a BIRD (200) may have no remote communications transceivers (240), which may limit the BIRD (200) to local signaling (230) only, but which also reduces the BIRD's cost, weight, and power consumption.

In an embodiment, the BIRD (200.RC2) may have no local interfaces or controls (280, 282), relying entirely on communications (220, 226, 240) for the authorized user (AU) to control or configure the BIRD (200.RC2). In an alternative embodiment, a very small or limited set of controls, such as for example dip-switches (282.DS) may be provided.

FIG. 2D

Exemplary BIRD Exterior

Figure 2D:
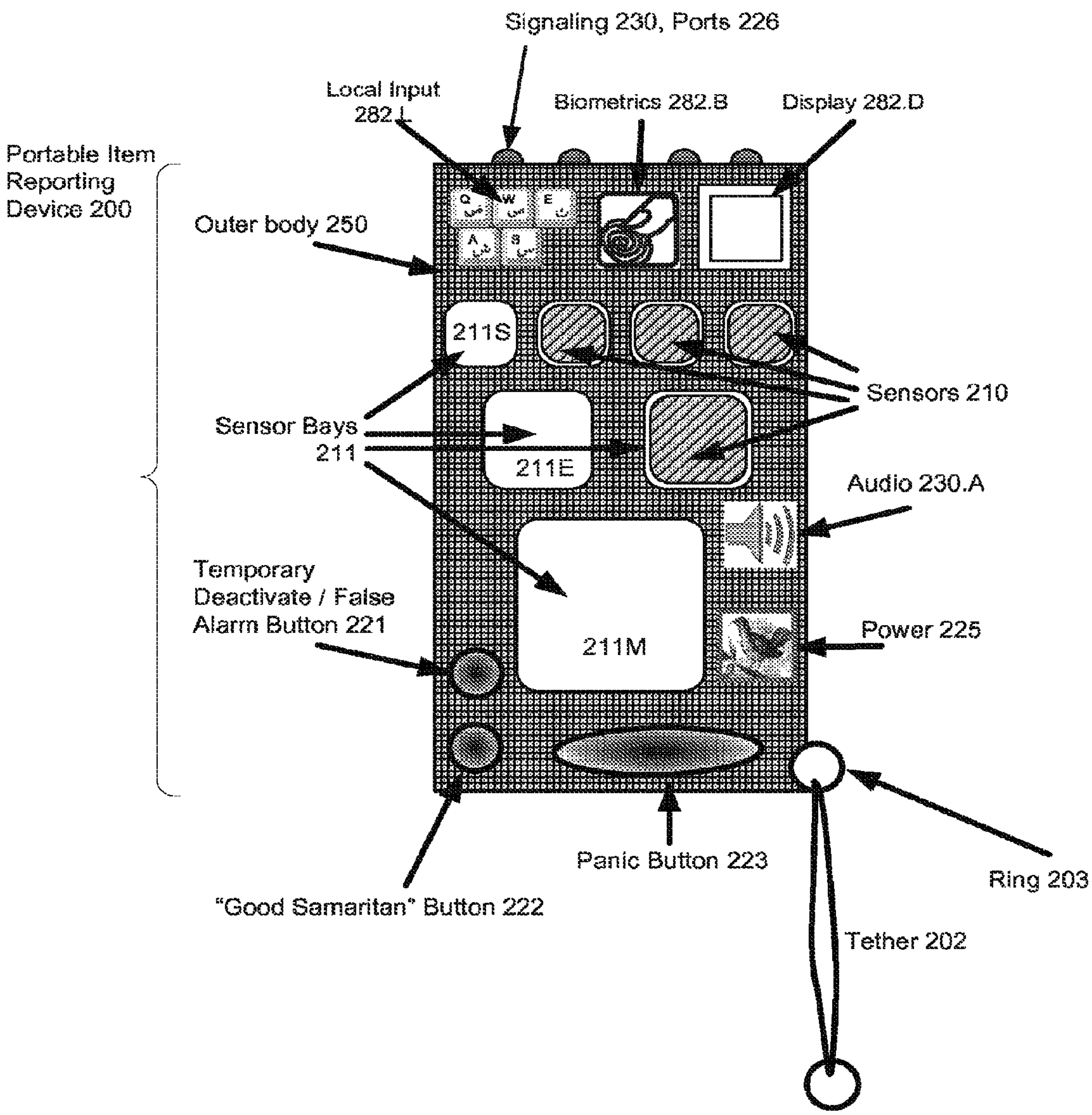
FIG. 2D is a schematic illustration of the exterior of an exemplary BIRD according to an embodiment of the present system and method.

FIG. 2D is a schematic illustration of an exemplary exterior of an exemplary BIRD (200). Note that elements of the BIRD exterior are not drawn to scale.

Casing, Sensors, and Sensor Bays

In an embodiment, the BIRD (200) has an exterior outer body, housing, or casing (250). The casing (250) may be composed of a variety of materials well known in the art, including various metals, metallic alloys, plastics, ceramics, polymers, or other materials or combinations of materials. In an alternative embodiment, the BIRD (200) may be substantially implemented using a thin, flat card, similar to a credit card; in such embodiments, the surface of the card may be considered to be the casing (250). Sensors (210) may be either internal to or external to (that is, surface mounted on) the BIRD's casing (250). Some sensors, such as for example an optical sensor (210.Opt), camera (210.C), or a chemical sensor (210.CH) will necessarily have at least some component which is either at or in substantial proximity to, or otherwise coupled with, an exterior surface (250) of the BIRD (200). For example, an optical sensor (210.Opt) or camera (210.C) requires a means for exterior light to reach the active sensing (photosensitive) element(s), and similarly a chemical sensor (210.CH) requires a means for environmental chemicals to reach the active sensing (chemically responsive) elements. Other types of sensors, such as some types of location sensors (210.L) or a motion sensor (210.M), may be interior to BIRD (200) or may be substantially coplanar with or mounted on an exterior surface of the BIRD (210) or casing (250). Four such exterior sensors (210) are illustrated in FIG. 2D.

In an embodiment, the BIRD (200) may also have sensor bays (211) for holding and retaining various sensors (210). The sensors bays (211) may be either surface mounted or interior to the BIRD (200). The sensor bays (211) permit the BIRD (200) to be configurable with different sensors, which may be attached or removed by a user. The exemplary BIRD (200) illustrated in FIG. 2D has seven sensor bays (211) on the side illustrated. The sensor bays (211) may be of various sizes and shapes, and use varying types of mechanical and/or electrical connectors, to accommodate sensors (210) of varying sizes and or sensing power or resolution. Shown in FIG. 2D are three different exemplary sizes of sensor bays: standard sensor bays (211S), enhanced sensor bays (211E), and a major or multipurpose sensor bay (211M).

Tether

The BIRD (200) also has a BIRD-item tether or BIRD-item connector (202), already discussed above, and used to link or help link the BIRD (200) with an item (100). See also FIG. 2G, below, for further discussion of an exemplary tether (202).

Input/Output and Control Elements

Shown in FIG. 2D are exemplary input/output and control elements for the BIRD (200). The elements shown are exemplary only, and should in no way be construed as limiting.

Local I/O: Shown in the figure are the local input (282.L), which may for example be a keyboard or button-type input: the display (282.D); and biometrics (282.B) for reading fingerprints, retinal or iris scans, or similar. In an embodiment, the local input (282.L) and display (282.D) may be a combined element, as for example a touch-screen display. A BIRD (200) may also have a microphone (282.M), not shown in the figure, though in an embodiment an audio output element (230.A) may serve dual function as a microphone.

Power On/Off: Also shown is a power on/off switch (225), complete with an exemplary, stylish bird logo. As discussed above, powering down the BIRD (200) may require, in addition to use of the power switch (225), entry of a confirmation code or other user authentication, for example in the form of a password (entered via the local input (282.L)); in the form of a voice confirmation entered via a microphone (not shown) or an audio sensor (210A) doubling as a microphone, and which may be confirmed by voice recognition technology and/or audio password recognition; or in the form of biometric confirmation, such as a fingerprint, iris scan, or retinal scan, entered via the biometric sensor (282.B). In an embodiment, powering on the BIRD (200), or utilizing some of its features, may require user confirmation/authentication as well.

Temporary Deactivate/False Alarm:

In an embodiment, the BIRD (200) has a [[Temporary Deactivate/False Alarm]] button (221). In an embodiment, this one button may instead be partitioned into two separate buttons. The user may employ the [[Temporary Deactivate]] button (221) when the user knows that the BIRDed-item (102) will be deliberately and temporarily used in an anomalous manner. The use of the [[Temporary Deactivate]] button (221) prevents the BIRD (200) from signaling a false alarm. In an embodiment, upon pressing the [[Temporary Deactivate]] button (221), the BIRD (200) may again require the user to provide confirmation or authentication, for example in the form of a password (entered via the local input (282.L)); in the form of a voice confirmation entered via a microphone or the audio sensor (210A), and which may be confirmed by voice recognition technology and/or audio password recognition; or in the form of biometric confirmation, such as a fingerprint entered via the biometric sensor (282.B).

The [[False Alarm]] button (221) may be employed by the user to silence the BIRD (200) in the event that the BIRD (200) mistakenly diagnoses or signals an anomalous state (503.2). Here again, in an embodiment, upon pressing the [[False Alarm]] button (221), the BIRD (200) may require the user to provide confirmation or authentication in the form of a password, a voice confirmation, or in the form of biometric confirmation such as a fingerprint.

Good Samaritan Button:

In an embodiment, the BIRD (200) has a [[Good Samaritan]] button (222), or [[GSB]] (222). The BIRD (200) has internal methods (discussed briefly above, and in further detail below) to determine and to signal when the item associated with the BIRD (200) is likely in a state or condition of being displaced (503.0). However, these methods, no matter how reliable, cannot be guaranteed to work with 100% reliability in all circumstances and at all times, and so may sometimes fail to detect a displaced/anomalous state (503.0/503.2). Further, in some embodiments, the displaced item determination method(s) may require some time interval to determine that the item (100) is displaced (503.0).

If the displaced-item-determination methods do not work in a particular case, or if the methods are delayed in determining that the item (100) is displaced (503.0), a nearby person—a "good Samaritan"—may still intervene and help. Suppose that the BIRD (200) is connected with an item (100) which has been lost in a public place. If the good Samaritan (typically a total stranger to the authorized item owner) finds the item (100)—for example, keys (100.K) or a wallet (100.W)—lying around unattended and out of place, the good Samaritan will likely assume that the item (100) is lost. The good Samaritan, if familiar with BIRDs (200), will also recognize the attached BIRD (200) with its [[Good Samaritan]] button (222). In addition, suitable labeling may be provided on the BIRD (200) to guide the uninitiated good Samaritan.

The good Samaritan can simply press the GSB (222). The GSB (222) is preprogrammed so that, when pressed, it triggers appropriate signaling activity by the BIRD (200). Appropriate signaling activities are discussed further below, but may include sending a lost-item message to the appropriate item owner's cell phone (340), e-mail, or similar; or signaling a Lost/Anomalous Reporting Center (355) (see FIG. 3E, below). The lost-item message may include location information, if available to the BIRD (200), so that the item owner can find the lost item (100).

Panic Button:

In an embodiment, a [[Panic]] button (223) is intended for use in the event that the authorized user (AU) of an item (100) has an encounter with a person who is not a good Samaritan. For example, if the owner of a purse (100.P), wallet (100.W), or keys (100.K) encounters a purse snatcher or other thief, the owner may have the time to press the [[Panic]] button (223) on the item being pulled away. (Alternatively, the owner of the stolen item (100) may simply press the [[Panic]] button (223) on another BIRD (200) which remains in their possession after a first item (100) is stolen or snatched.) The [[Panic]] button (223) may be programmed with a variety of responses, including automated signals or messages (374) to local police, emission of loud warning alarms or messages (372) to draw the attention of sympathetic and brave bystanders, etc. Alarms and other audio messages (372) may be emitted by local signaling (230), such as a speaker (230.A).

If the user's BIRDs (200) have been configured to be members of an item team (1400) then, in an embodiment, activating the [[Panic]] Button (223) on one item may trigger alarms and other suitable responses from all members of the item team (1400). In this event, a thief attempting to escape will a stolen item (100) will quickly find himself/herself carrying a stolen item which draws a great deal of attention, as well as carrying an item (100) which may continuously report it's location to suitable authorities. Items teams and item team members are discussed further below in this document in conjunction with FIGS. 14A-14I, 15A, 15B, and other figures as well.

The [[Panic]] button (223) may also be programmed for use in medical emergencies, such as a heart attack, and is useful as long as the user has sufficient awareness of an onset of illness or injury to actually press the button.

Embodiments of Control Elements

Persons skilled in the art will appreciate that the exemplary input/output and control elements shown in FIG. 2D may be implemented in a variety of ways. In an embodiment, for example, some or all of such elements as the on/off switch (225), the [[Temporary Deactivate/False Alarm]] button (221), the [[GSB]](222), and the [[Panic]] button (223) may be implemented as mechanical buttons or switches, or similar. In an alternative embodiment, some or all of the same buttons, or the functionality associated with such buttons, may be implemented as virtual buttons or similar virtual control widgets on a touch-screen display. In an alternative embodiment, some or all of the same functionality associated with such buttons may be implemented through voice command of the BIRD (200). Other methods and means of mediating user control of, and interaction with, the BIRD (200) may be envisioned as well via other user-interface schemas, within the scope of the present teachings, system, and method.

FIG. 2E

Exemplary BIRD Exterior

Figure 2E:
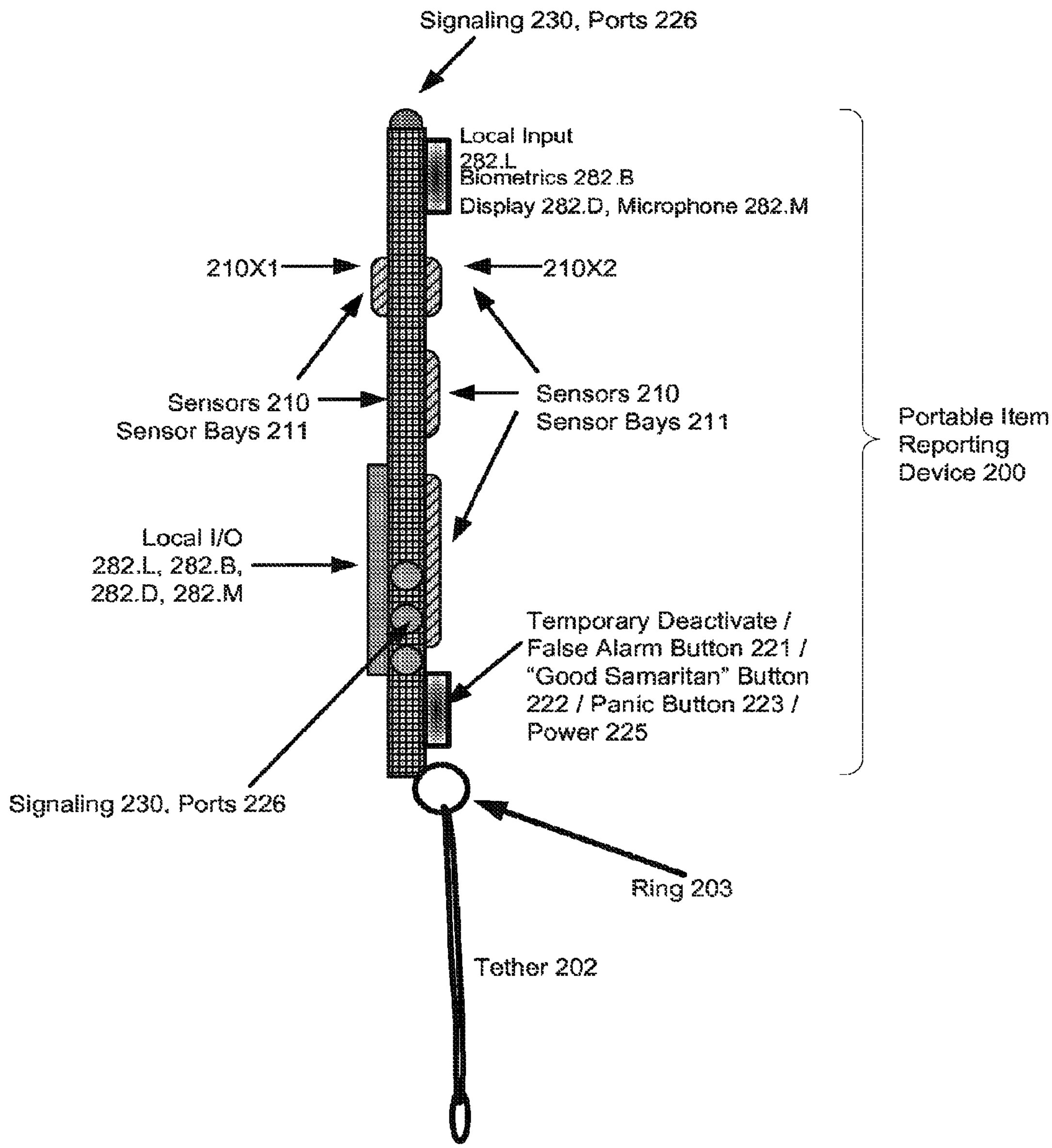
FIG. 2E is a schematic illustration of the exterior of an exemplary BIRD according to an embodiment of the present system and method.

FIG. 2E is a schematic illustration of an exemplary exterior of an exemplary BIRD (200) shown in profile. FIG. 2E shows a number of elements already discussed above, and a detailed discussion of these elements will not be repeated here.

FIG. 2E also illustrates exemplary exterior placements of signaling elements (230) and ports (226) of the BIRD (200), which may be positioned for example on the side edge or top edge, or both, of the BIRD (200). The positions shown are exemplary only, and other positions for these elements may be employed as well.

FIG. 2E also illustrates two possible exemplary placements for the local input/output (input (282.L), biometrics (282.B), display (282.D), microphone (282.M)) of the BIRD (200).

Sensor Positions Optimized for Environmental Awareness

FIG. 2E illustrates how, in an embodiment, sensor bays (211) and sensors (210) may be on more than one side or more than one surface of the BIRD (200). In some instances, a same type of sensor (210X) may be positioned on more than one surface of the BIRD (200), as for example same sensor types (210X1, 210X2), which are illustrated as being on opposing sides of the BIRD (200). For example, the BIRD (200) may have optical sensors (210.Opt) or cameras (210.C) positioned on more than one side or one edge, for gathering optical data from different directions. For another example, the BIRD (200) may have surface pressure sensors (210.SP) on two or more surfaces or edges, configured to detect if the BIRD (200) is pressed against a single surface (for example, a table top) or is being held or squeezed between two surfaces (for example, in a pocket, in a pouch, or in a person's hand).

More generally, a BIRD (200) or an active item (100.Act) (see FIGS. 13A-13C) may have sensors (210) which are structurally placed or positioned, in relation to the main body of the BIRD (200) or active item (100.Act), in such a way as to optimize acquisition of environmental data suitable for determination of extant (503.1) or displaced (503.0) states. In addition, a BIRD (200) may have an casing (250) which is shaped in such a way that, no matter how the BIRD (200) is oriented, sensing elements (210) are optimally positioned for data acquisition.

In an exemplary embodiment (not illustrated), a BIRD (200) may have a shape of the outer body (250) such as a sphere or cube. In an embodiment, and depending on the cost of optical sensors (210.Opt) or cameras (210.C), numerous optical sensors or cameras (210.C) may be directly situated on the outer body (250) of the BIRD (200) with a substantially uniform and/or broadly dispersed distribution. In an alternative embodiment, numerous optical receptors, such as fiber-optic strands with lenses at their first ends, may be embedded in the sphere or cube with a substantially uniform and/or broadly dispersed lens distribution along the surface of the outer body (250) of the BIRD (200). The second ends of the fiber optic strands may connect to an optical receptor or camera (210.Opt, 210.C) within the BIRD (200).

In field use, the BIRD (200) may be placed in a container item (100)—for example a purse (100.P) or toolkit (100.TK)—which may be left partially open by the authorized user (AU). Assume that the BIRD (200) is positioned within the container (100) in such a way that some area of its surface (250) is exposed to the exterior environment. Then no matter how the BIRD (200) is oriented within the container (100), and because of the substantially uniform or broadly dispersed distribution of optical receptors along the outer surface (250), the BIRD (200) is likely to have available to it optical sensor data of the environment beyond the purse. Similar considerations may apply to other kinds of sensors (210), such as an audio sensor (210.AI, 210.AC), a temperature sensor (210.T), and other sensors (210).

Additional Elements

A BIRD (200) may also employ additional elements (not illustrated) to optimize sensor exposure, especially in closed or semi-closed containers or environments. Such additional elements may include, for example and without limitation:

Sensor stalks: Sensor elements (image lenses, microphones, and so on) may be mounted on the distal ends of extendible and or flexible stalks, extending from the main body (250) of the BIRD (200), so that the sensing elements can extend to within range of the outer bounds of the enclosure, or beyond the enclose) through any available openings;

Multiple antennas: Multiple antennas (242) (which may be interior or exterior) and MIMO technologies may be employed to maximize RF reception and transmissions capabilities in RF-limited environments;

Mechanical clips: Clips or clasps, or similar elements, attached to or integrated into the outer body (250) of a BIRD (200) may be used to attached the BIRD (200) to any kind of outer lip or sleeve of an enclosure.

FIG. 2F

Stand-Alone and Embedded BIRDs, and Other BIRD Embodiments

Figure 2F:
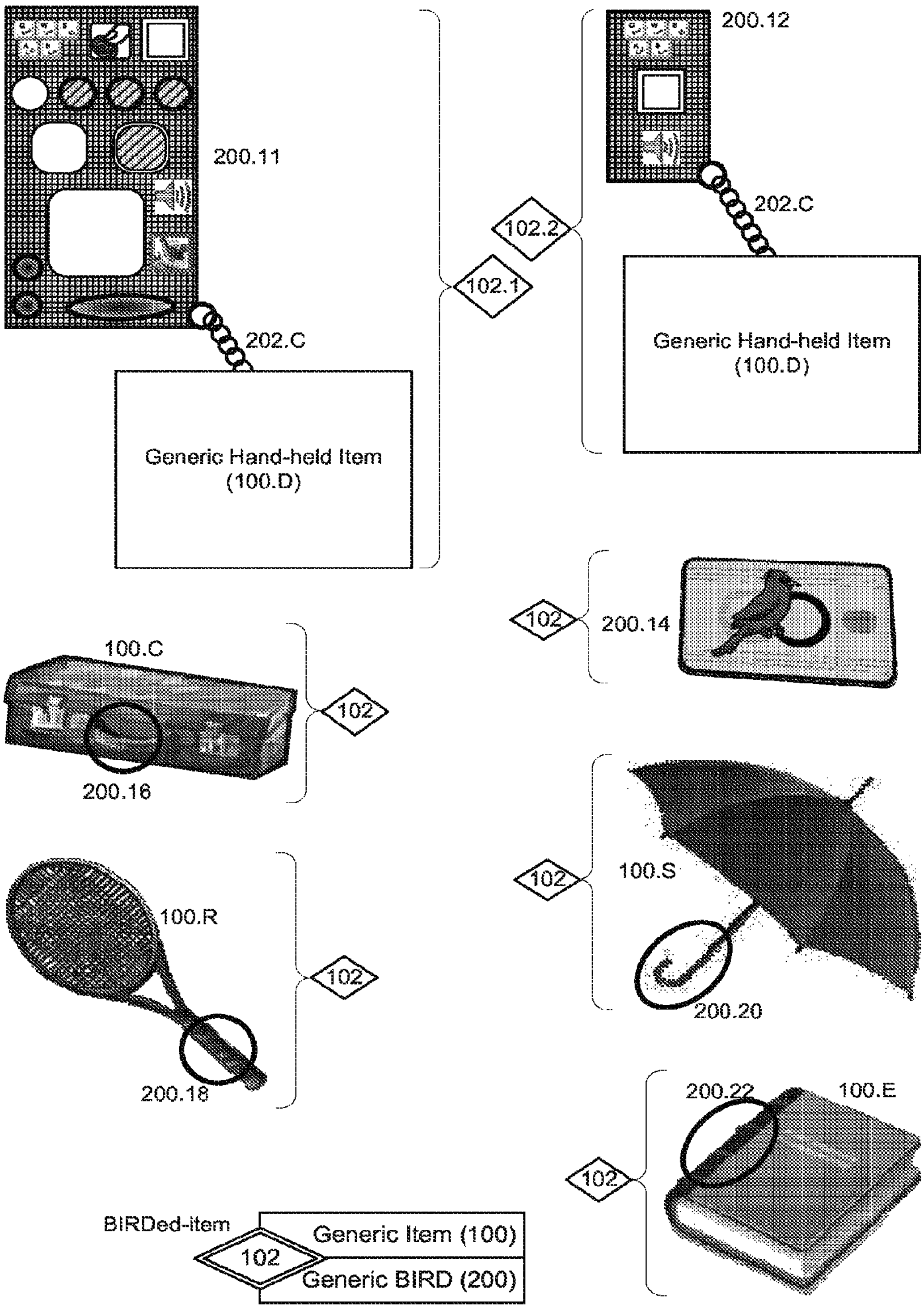
FIG. 2F is an illustration of exemplary placements of BIRDs in various items, or usage of a BIRD as a stand-alone device.

FIG. 2F illustrates several different exemplary embodiments of BIRDs (200). In some embodiments a BIRD (200) is a standalone device (conventionally, such physically discrete, electronic attachments to other items or devices are sometimes referred to generically, in the art, as a "dongle"). In other embodiments, a BIRD (200) may be incorporated into the physical structure of an item.

BIRD (200.11) illustrates an exemplary stand-alone BIRD which may be the same or similar in design and configuration to the BIRDs (200) illustrated in FIGS. 2D and 2E, already discussed above. The BIRD is shown tethered to a generic hand-held item (100.D) via a chain (202.C). The combination of a BIRD (200) and an item (100), tethered together or integrated into a unit, is referred to as a BIRDed-item (102).

In this particular figure, the first BIRDed-item (102.1)—that is, the generic hand-held item (100.D) and the BIRD (200.11)—are shown as being approximately to scale, with the BIRD (200.11) being roughly the same size as the hand-held item (100.D), which may for example be a typical hand-held item.

In an alternative embodiment, a standalone BIRD (200.12) may be substantially smaller than many hand-held items, as suggested by the smaller BIRD (200.12), again drawn approximately to scale with the generic hand-held item (100.D). Such a BIRD (200.12) may have less available surface space, and so fewer available surface interface controls than a larger BIRD (200.11). (Such a BIRD (200.12) may still have available extensive control features, but some of these may be accessed via a configuration computer (335) or cell phone (340), as discussed further below (see for example FIG. 3D).)

For some authorized users (AU) and some items (100), a smaller BIRD (200.12) may be desirable for a number of reasons, including considerations of being lighter, less expensive, less obtrusive, taking up less space in the authorized user's pocket, and other reasons as well.

BIRD (200.14) is an exemplary small or narrow design, which may also be referred to as a slimline, credit-card style, or compact BIRD (200.14). Such a design may be distinguished by being thinner or lighter than other BIRDs (200.11). Such a design may have a somewhat reduced feature set as compared with some other BIRDs (200.11), for example, by having fewer sensors (210) or lower resolutions sensors (210), fewer communications ports (226), less memory (206), a smaller or more compact display or local input (282.L), and so on. Such a slimline BIRD (200.14) may be especially suited for use in relatively tight confines, such as within a wallet (100.W).

It should be noted however, that with continued advances in technology and miniaturization, the designs, functionality, and features of a larger BIRD (200.11) and smaller and/or slimmer BIRDs (200.12, 200.14) may converge with time, at least to some extent.

In an alternative embodiment, a BIRD (200) may be incorporated into the physical structure of an item (100) to be monitored or reported on by the BIRD (200), for example a BIRD (200.16) incorporated into a briefcase handle or elsewhere in briefcase (100.C); or a BIRD (200.18) incorporated into the structure of a tennis racket (100.R); or a BIRD (200.20) may be incorporated into the structure of an umbrella (100.S); or a BIRD (200.22) may be incorporated into the cover or spine of a book or other printed reading matter.

BIRD technology may also be incorporated into items (100) which are already processor-based, such as computers, cell phones, and other personal digital assistants (PDAs). This is discussed further below, in conjunction with FIGS. 13A-13C pertaining to active items (100.Act), and in conjunction with other figures throughout this document.

FIG. 2G

BIRD-Item Link Integrity Assessment

Figure 2G:
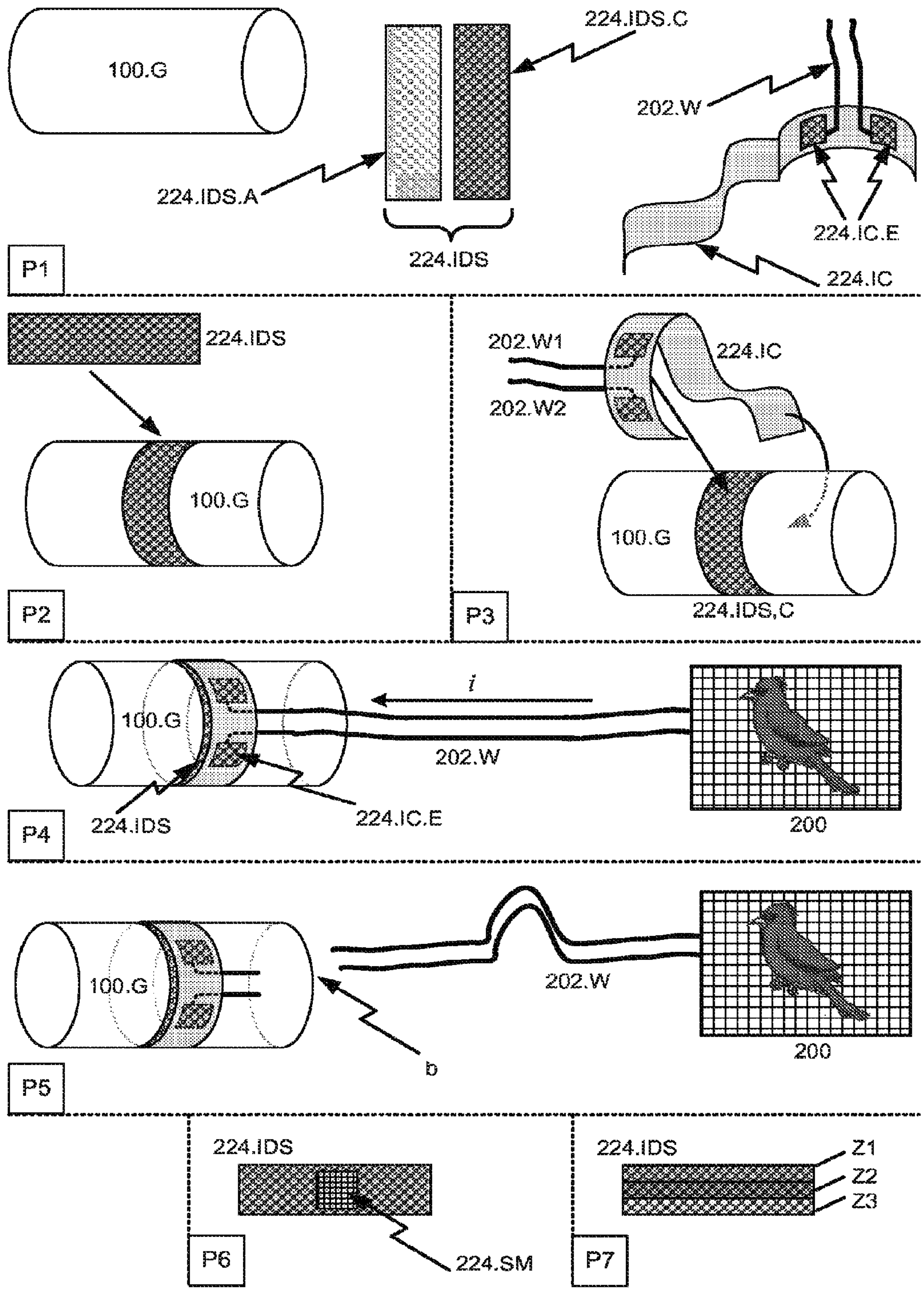
FIG. 2G illustrates exemplary means and methods for determining whether or not a BIRD is physically tethered to its associated item.

FIG. 2G illustrates exemplary elements and method for a BIRD (200) to assess the integrity of its physical link (202) with an item (100). In an embodiment, the link integrity detection may also be configured to confirm the specific identity of the item (100).

Exemplary Elements

Panel 1 (P1) of FIG. 2G illustrates elements associated with the method. The item (100) is assumed to have a projection, component, surface or contact area (100.G) to which an electrically conducting element may be attached. For example, the item may have a handle or grip (100.G). A segment of such a grip (100.G) is shown in Panel 1.

An exemplary electrical conducting element is an item validation marker (224.IVM), which may be distributed to a user of a BIRD (200) (for example, as part of the overall package of items when a BIRD (200) is sold to a consumer). In an embodiment, the item validation marker (224.IVM) may be a thin rectangular strip of material which has two sides: (i) a first side with an attachment means (224.IVM.A), which in an embodiment may be an adhesive material, and (ii) a second side with an electrically conductive coating (224.IVM.C), which may be composed of known electrically conducting materials such as copper, iron, aluminum, silver, or alloys of these and other metals, or other conducting materials. In an embodiment, sandwiched between the first and second sides (224.IVM.A, 224.IVM.C) of the strip (224.IVM) may be a non-conducting base or substrate, such as a flexible polymer or similar material, not shown. In alternative embodiment the substrate is not present, and the adhesive material (224.IVM.A) is applied directly to a conducting material (224.IVM.C).

The BIRD (200) may also be configured with an element for attachment to the item, for example an item collar (224.IC). In an embodiment the item collar (224.IC) is itself electrically non-conducting, but has two electrically conducting pads (224.ID.E), each of which is physically separate from the other. Each of the two conducting pads (224.IC.E) is connected to a separate conducting wire (202.W) which is part of and runs along the length of the BIRD's tether (202). In the figure only the electrically conducting wires (202.W1, 202.W2) are shown (see also panel 3); any associated non-conducting insulator or sleeve of the tether (202) is not illustrated. At the far end of the tether (also not shown in the figure), the two wires (202.W) are connected to the BIRD's item link integrity detection module (224), discussed above in conjunction with FIG. 2A.

Exemplary Method

Panels 2 through 5 (P2-P5) of FIG. 2G illustrate an exemplary use of these elements.

In panel 2 (P2), the item validation marker (224.IVM) is attached to the item (100). For example, the marker (224.IVM) may be wrapped around the grip (100.G) of the item (100), with the adhesive side (224.IVM.A) attached to the item and the conducting side (224.IVM.C) externally exposed.

In panel 3 (P3), the item collar (224.IC) is attached to the item validation marker (224.IVM) in such a way that the conducting pads (224.IC.E) face interior to the grip (100.G). Consequently, the conducting pads (224.IC.E) are in contact with the conducting side (224.IVM.C) of the item validation marker (224.IVM). A closure or attachment means (not shown) ensures that the item collar (224.IC) is securely attached to the grip (100.G), and will not readily or casually slip off the item validation marker (224.IVM).

Panel 4 (P4) illustrates an exemplary configuration of the BIRDed-item (102) when the item collar (224.IC) is attached to the item (100) in normal use. The two conducting wires of the tether (202) extend from the BIRD (200) to the item grip (100.G). An electrical current (i) generated by the BIRD (200) can make a round trip through the tether (202) in one direction, into one conducting pad (224.IC.E), through the item validation marker (224.IVM), into the other conducting pad (224.IC.E), back down the tether (202) and back to the BIRD (200). The BIRD's item link integrity detection module (224) (not shown in the figure, see FIG. 2A) can detect the integrity of the current flow, and so detect that the item (100) remains tethered to the BIRD (200).

Panel 5 (P5) illustrates an exemplary configuration of the BIRD (200) and item (100) when the system has experienced a rupture in the integrity of link between the BIRD (200) and item (100). For example, if a thief steals the item (100), the thief may attempt to prevent the BIRD (200) from assessing the change in item state (503) by physically separating the BIRD (200) and item (100). This may involve tearing the tether (202) between BIRD and item. The rupture in link integrity is represented by the break (b) in the tether (202). The break (b) interrupts the flow of current (i). The interruption of current flow may be detected by the BIRD's item link integrity detection module (224). The module (224) can then trigger the BIRD (200) to generate an alarm or signal.

Additional Embodiments

Panel 6 (P6) shows another view of an exemplary item validation marker (224.IVM). In this view, the marker (224.IVM) has an attached smart chip (224.SM). The smart chip (224.SM) may include non-volatile RAM (NVRAM) or other storage means, which can be configured to include specific data about the item (100). With the smart chip (224.SM) attached to the item (100), a tethered BIRD (200) may be able to read specific data about the item (100), and verify that the correct item (100) is associated with the BIRD (200).

Panel 7 (P7) shows another view of an exemplary item validation marker (224.IVM). In this view, the marker (224.IVM) is composed of multiple elements (Z1 . . . Zn), each with a different impedance. In the illustration, there are three elements (Z1, Z2, Z3) in parallel, with three different impedances. Each parallel element (Z1, Z2, Z3) is separated by an insulating element (not illustrated). In an embodiment, the item collar (224.IC) (not illustrated in panel 7) has multiple electrodes which are configured and arranged so as to read the impedances of the separate elements of the strip. By employing, for different items (100), different item validation markers (224.IVM) with different impedance elements, it is possible to "impedance code" an item to give each item a substantially unique, identifying encoding.

The elements and methods described immediately above, in conjunction with FIG. 2G, for enabling a BIRD (200) to determine the integrity of its link with an item (100), and possibly to further identify the item or aspects of the item based on an identity encoding attached to the item, are exemplary only, and should in no way be construed as limiting. Variations may be envisioned on both the item validation marker (224.IVM) and the item collar (224.IC), such variations falling within the teachings and scope of the present system and method. Other methods and technologies, such as radio frequency tagging of the item (100) and radio frequency monitoring by the BIRD (200) may be employed. Other methods may be envisioned as well within the teachings and scope of the present system and method.

FIG. 2H

BIRD Operational Configuration ("Sensor Configuration" Dialog Box)

In an embodiment, a BIRD (200) requires at least two broad kinds of configuration:

(i) Establishing usage expectations (600) for an item (100) which will be associated with the BIRD (200); and (ii) establishing numerous other operational parameters which may control aspects of BIRD usage in daily life.

Systems and methods for establishing usage expectations (600), as per item (i) are discussed throughout this document; see for example FIGS. 1P, 6A-6F, 9A, 9B, 10A-10I, 11A-11C, 12A, 12B, 14D, 14G, and other figures throughout this document.

In an embodiment, various hardware elements and software parameters of the BIRD (200) (in addition to usage expectations (600)) are configurable to fine-tune BIRD operations, as per item (ii) immediately above. Configuration may be accomplished through any number of user-interface means, including for example and without limitation: uploading configuration parameters into the BIRD (200) via a configuration computer (335), or configuring the BIRD through configuration dialog boxes displayed on the BIRD's display (282.D).

Figure 2H:
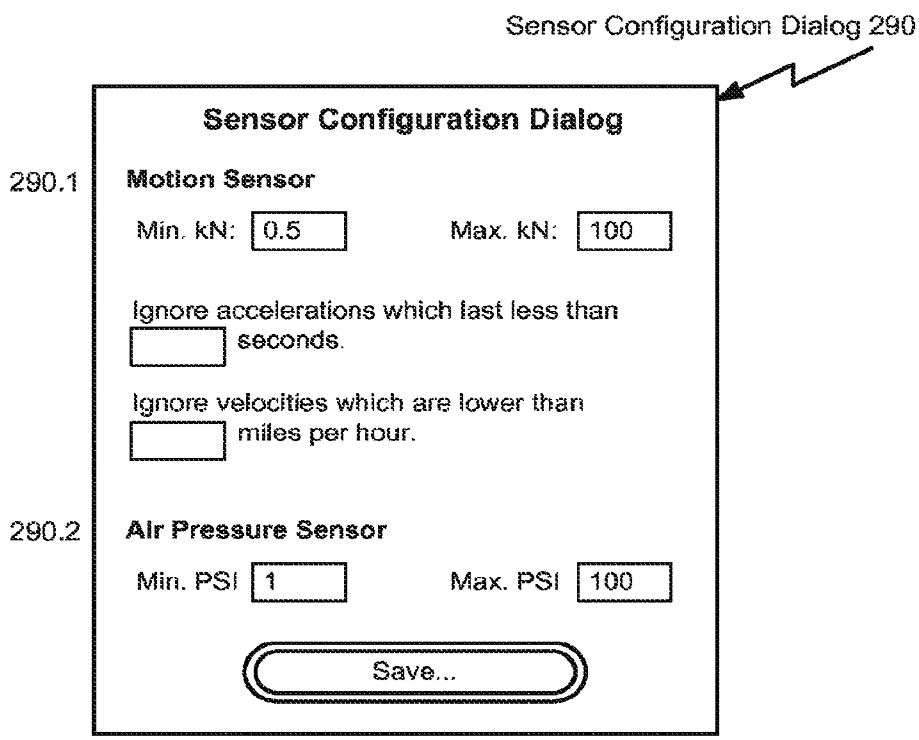
FIG. 2H is an illustration of an exemplary dialog box for configuration of a BIRD's sensors.

One set of elements which may be configured are the BIRD's sensors (210). FIG. 2H illustrates an exemplary Sensor Configuration Dialog 290.

The Sensor Configuration Dialog (290) includes, for example, a first set of data entry fields (290.1) used to configure the motion sensor (210.M). The Sensor Configuration Dialog (290) also includes a second set of data entry fields (290.2) used to configure the air pressure sensor (210.AP).

The illustration in FIG. 2H of only a single configuration dialog box (290) pertaining to a single set of BIRD hardware features (the sensors (210)) is exemplary only, and should not be construed as limiting. Numerous other aspects of the BIRD's hardware and operations may be configurable as well, including, for example without limitation:

- biometrics (152) and biometric-related parameters associated with authorized user authentication;
- iteMetric (154) related parameters and controls;
- power management features;
- BIRD security;
- BIRD display properties;
- fine-tuning of operations of BIRD buttons and controls;
- BIRD responses to displaced/anomalous item states (503.0/503.2), including both reporting and local signaling options;
- operations of BIRD ports;
- the channels/frequencies associated with BIRD wireless communications; and
- other BIRD (200) features as well.

Persons skilled in the relevant will appreciate that, in some embodiments of the present system and method, there may be some overlap or interaction between establishing usage expectations (600), and establishing other aspects or parameters involved in configuring BIRD operations.

BIRD Configuration vs. BIRD Field Use

The present system and method associates an item (100), which is typically a conventional portable object of some kind, with a BIRD (200). To put the present system and method into use, it may be necessary to first configure the BIRD (200) with various control and reporting parameters. During a configuration phase of the present system and method, an authorized user (AU) (or other person authorized to control an item (100), such as an administrator) establishes the necessary BIRD operating parameters. Once the configuration is complete, the item (100) and associated BIRD (200) may be put to use in the field for general use by the user or authorized owner.

In an embodiment, the distinction between configuration and field use is really more a distinction of time rather than location. The BIRD (200) must first be configured, a process which may include taken the BIRD (200) and associated item (100) out to wherever the item (100) is normally used or stored. Following the training period, any usage of the BIRD (200)—whether in a home base (140.HB) storage location, or in a daily life location (140.DL), or even in an out-of-bounds location (140.OoB), constitutes field use.

Configuration entails preparing the BIRD (200) to effectively monitor the item (100) for an item state of extant/normal (503.1/503.3) or displaced/anomalous (503.0/503.2). Field use entails putting the BIRD (200) to work as an active portable item reporting device.

In an embodiment, a BIRD (200), once configured, can modify and update its configuration during field use. In such an embodiment, BIRD configuration may be an ongoing process, either continuous or intermittent, which is coincident in time with BIRD field use.

FIG. 3A

Flowchart of BIRD Configuration (First Exemplary Method)

Configuring a BIRD (200) may entail setting a variety of parameters which control or influence BIRD operations. Included in BIRD configuration is the establishment of usage expectations (600), discussed in conjunction with FIGS. 6A-6F, which distinguish between extant/normal item behavior (503.1/503.3) versus displaced/anomalous item behavior (503.0/503.2).

In an embodiment, the BIRD (200) is configured with parameters which define expected sensor readings, and/or expected ranges of sensor readings, and/or expected data values that will be yielded in the field by sensor readings (700) and processed sensor values (700.P). The expected sensor readings, which are embedded in the usage expectations (600), reflect the expected behavior(s), use(s), and/or environment(s) of an item (100).

Expected behaviors/uses/environments include, for example and without limitation, those associated with the item (100) when the item is extant (503.1), that is, when the item is present or located when and where it's expected to be.

In an alternative embodiment of the usage expectations (600), the BIRD (200) is configured with parameters which define expected sensor readings, and/or expected ranges of sensor readings, and/or expected data values for one or more displaced/anomalous (503.0/503.2) behaviors of an item (100). Displaced/anomalous (503.0/503.2) behaviors/users/environments include, for example and without limitation, the behavior/environments of the item (100) when the item is lost (503.0.1), misplaced (503.0.2), misappropriated (503.0.3), wandering (503.0.5), or stolen (503.0.4). In an alternative embodiment, configuration of the BIRD (200) via usage expectations (600) is based on both extant/normal item environments (503.1/503.3) and on displaced/anomalous item environments (503.0/503.2).

FIG. 3A is a flowchart (300) of a first exemplary method for an owner or other authorized user (AU) to configure a BIRD (200).

In step 302, the authorized user (AU) either logs directly into the BIRD (200) via a BIRD user interface element (282); or the user may connect to the BIRD (200) via an external configuration device (335, 340) (see FIG. 3D, below), and then log in to the BIRD (200). Logging in entails the authorized user (AU) validating his or her identity to the BIRD (200) via such means as a user name and password, or via a biometric signature (152).

In step 304, the user configures the BIRD (200) via entry of suitable parameters such as usage expectations (600) and other parameters. The user may enter such data via dialog boxes and software wizards (290, 665, 668, 670, 900, 1020, 1030, 1060, 1070, 1080, 1090, 1120, 1140, 1708, 1900, and others which may be implemented by BIRD Navigation (1000)), voice interface, direct code entry, upload of configuration files, and similar means. Exemplary means and methods of entry of configuration data by a user are discussed further below in conjunctions with FIGS. 2H, 6D-6F, 9A, 9B, 10A-10I, 11A-11C and elsewhere through this document.

In an embodiment, however, step 304 entails establishing future expected values for usage data (700.U)—in total referred to as usage expectations (600)—based at least in part on the authorized user's anticipated or planned use of the item (100). For example, if the authorized user (AU), as part of his or her ExD criteria (170), anticipates carrying the item (100) about to certain expected locations (144.L), or within particular geographic boundaries (144.L), the expected sensor readings for location (600.Loc) will be based on those ExD locations or boundaries.

In an embodiment, a BIRD (200) may be configured to determine anomalous usage (503.2) based on readings from a single sensor (210), such as a location sensor (210.L) or a motion sensor (210.M). However, data from a single sensor may be ambiguous, in the sense that single-sensor data may not always be a reliable indicator of an extant/normal item state (503.1/503.3) or a displaced/anomalous item state (503.0/503.2). To gain a more reliable determination of whether an item is extant (503.1) or is displaced (503.0) (lost, misappropriated, misplaced, wandering, stolen) or otherwise in an anomalous state (503.2), it is desirable to make extant/normal state (503.1/503.3) versus displaced/anomalous state (503.0/503.2) determinations based on interpretations of data (700) from multiple sensors (210), as discussed further below.

FIG. 3B

Flowchart of BIRD Configuration (Second Exemplary Method)

In an embodiment, future expected sensor readings, ranges, and/or processed values (that is, usage expectations (600)) are based at least in part on an historical record of past usage of the item (100) by the authorized user (AU). FIG. 3B is a flowchart (306) of a second exemplary method for an owner or other authorized user (AU) to configure a BIRD (200) based on deliberate, scheduled historical recording of item usage. Such a period of deliberate, scheduled training of the BIRD (200) is referred to as a training session or a training session.

In step 308, the user tethers (physically connects or links) the BIRD (200) to its associated item (310). If the BIRD (200) is structurally integrated into an associated item (100), then this step is not necessary.

In step 310, the user initiates configuration monitoring by the BIRD (200). Configuration monitoring entails monitoring of the environment by the BIRD's sensors (210), as would also be done in routine daily field use of the BIRD (200) and associated item (100). However, in a configuration monitoring mode, the BIRD (200) is primed to use the sensor data (700) so obtained in order to identify, or help identify, appropriate usage expectations (600). As part of setting the BIRD (200) in configuration monitoring mode, the user may indicate whether the identification will proceed according to either of steps 312 or 314. In an embodiment, steps 312 and 314 represent alternate configuration modes which cannot be done at the same time. However, analysis results from both modes may contribute to the definition of usage expectations (600). In an alternative embodiment, both steps 312 and 314 may be performed concurrently.

Location (600.Loc):

In step 312, the user engages in normal or routine daily life activities, with normal or routine usage of the item (100). The user specifically makes sure that the item (100) is NOT lost, misplaced, misappropriated, stolen, or wandering during the period of time required for configuration. The period of time may vary, being as little as a few hours, or even less time in some cases, up to several days or weeks. Generally, a longer period of time allows the BIRD (200) to obtain more extensive data for analysis. This step may substantially contribute to the identification of usage expectations for item location (600.Loc), as well as helping define other appropriate usage expectations (600).

IteMetrics (154): In step 314, the user engages in use of the item (100) in defined, specific usage contexts. For example, the user may indicate to the BIRD (200) that the item will be used while the user is walking indoors; or that the item will be used while the user is seated indoors; etc. The user then proceeds to use the item in the manner or context indicated. The BIRD (200) then collects sensor data pertaining to the indicated item usage. This step may substantially contribute to the identification of iteMetrics (154), as well as helping define other appropriate usage expectations (600).

In step 316 the BIRD analyzes sensor readings from the training period (also known as a training period) to arrive at suitable item usage expectations (600). Regarding methods steps 312, 314, and 316, exemplary embodiments of the associated BIRD analysis are discussed in conjunction with FIGS. 10D-10I, 11A-11C and 12A below, as well as in conjunction with other figures throughout this document.

BIRD Configuration Updates and Modifications

A BIRD (200) will typically need initial configuration by its authorized user (AU) or other authorized party, such as a system administrator. In some cases, a BIRD (200) may effectively monitor the state of its associated item (100) for an indefinite period of time, based on the initial configuration. In an alternative embodiment, however, a BIRD (200) may be configured to continually refined and update usage expectations (600), either automatically or with intermittent user input and BIRD-user interaction. The updates may be based on additional data acquired from routine, extant/non-anomalous use of the item by the user, but may also be based on data acquired during displaced/anomalous item use (503.0/503.2). More generally, there may be occasions when the BIRD (200) provides alerts (372) or messages (374) the user of possible anomalous use (503.2). The user may then confirm anomalous use (503.2) or signal the BIRD that the anomaly report was itself erroneous. In an embodiment, such user feedback to the BIRD (200) enables the BIRD to further refine or fine-tune usage expectations (600).

FIG. 3C

Flowchart of BIRD Routine Usage

FIG. 3C is a flowchart of an exemplary method (320) of field usage of the BIRD (200) by an owner or other authorized user (AU). In the flow chart, it is assumed that configuration of the BIRD (200) has already occurred, such as via exemplary methods 300 and/or 306, already discussed above.

Method 320 begins with step 322. In step 322, the BIRD (200) is physically coupled to the item (100). If necessary, the user also logs in (self-identifies) to the BIRD (200) via a user-name/password or biometric identification (152), or similar.

In step 324, the owner or authorized user (AU) initiates environmental monitoring by the BIRD (200). In an embodiment, this may be accomplished automatically when the BIRD (200) is powered on. In an alternative embodiment, environmental monitoring commences upon a specific, designated user input action via an interface element (282) or a remote command via communications interface (220). In an alternative embodiment, environmental monitoring commences automatically upon login (step 322).

In step 326, the BIRD (200), employing sensors (210) and other internal data processing elements (204, 206, 208, 224, and possibly other elements) maintains ongoing environmental monitoring as the user goes about his or her general life activities. The activities may entail movement to various locations (104.L), and movement within various locations (104.L). The BIRDed-item (102) may at times be on the person of, or in close proximity to, the authorized user (AU) during parts of this time, and at other points in time, such as when the BIRDed-item (102) is in storage, the BIRDed-item (102) may not be on the person of, or in proximity to, the authorized user (AU).

In step 328, the BIRD (200) emits a local alert and/or transmits suitable notification if sensed environmental conditions (that is, usage data (700.P)) suggest a likelihood that the attached item (100) may be lost (503.0.1), misplaced (503.0.2), misappropriated (503.0.3), stolen (503.0.4), wandering (503.0.5), or otherwise in some anomalous usage (503.2). The notification is received by an owner of the item, or by another authorized party, through any number of means and methods discussed further below.

BIRD Log-In

In step 322, discussed immediately above, the user may log-in to the BIRD (200), that is, self-identify and authenticate via a user-name/password or biometric identification (152). In an embodiment, certain login requirements are hard-coded into the BIRD (200), and cannot be changed by the authorized user (AU). In an alternative embodiment, the requirements for login in may be determined by the user via configuration settings. Possible login options include, for example and without limitation:

- Requiring the authorized user (AU) to login at time intervals with a certain maximum length. For example, the user may be required to login once every week, once every day, several times a day (for example, for items (100) used in a secure setting, etc.).
- Requiring the user to login in every time the BIRD (200) and associated item (100) have been off-Person (138.OffP) (set down on a table or similar) for longer than an allowed period of time, the stationary limit (133).
- In an embodiment, when the BIRDed-item (102) detects a displaced (503.0) or otherwise anomalous state (503.2), the BIRD (200) may request that the user login, in order to re-establish proper possession of the item by the authorized user (AU).

A user may have multiple different items (100), each with an associated BIRD (200). Logging into each BIRD (200) on a frequent basis may prove to be an inconvenience for the user. In an embodiment, items (100) may be part of item teams (1400), discussed further below in conjunction with FIGS. 14A-14I and other figures throughout this document. One or more BIRDs (200) may function as a principal reporting item (102.PRI) of the item team (1400) (see FIG. 15B for more on principal reporting items (102.PRI). In an embodiment, a user may login to all BIRDs (200) of the item team (1400) by logging in through the principal reporting item (102.PRI). The principal reporting item (102.PRI) may be configured to notify all other BIRDs (200) of the team (1400) that the identify of the authorized user (AU) has been properly validated.

FIG. 3D

BIRD Configuration System

As per step 304 of method 300 discussed above, a BIRD (200) may be directly configured by the user with parameters which define expected usage data (700.P) based on data from the sensors (210), for expected behaviors or expected uses (144) of an associated item (100).

Configuration may be accomplished in whole or in part directly via the local I/O (282) of the BIRD (200). However, configuration of the BIRD (200) may also be accomplished in whole or in part via a remote programming device (335, 340) which is coupled with the BIRD (200).

FIG. 3D illustrates an exemplary system (330) for configuring a BIRD (200). In an embodiment, the system (330) includes:

- a computer (PC) 335, which may be a personal computer, laptop computer, tablet computer, or possibly a cell phone (335) (labeled elsewhere in this document as 100.Act.CP, when the cell phone itself has BIRD functionality) or similar;
- the BIRD (200); and
- a BIRD communications link (337). The BIRD communications link may be, for example and without limitation, a wired connection such as a USB connection or Ethernet connection, or it may be a wireless connection. A wired connection may connect to the BIRD (200) via ports 226, while a wireless connection may be established via the BIRD's transceivers (240).

Appropriate configuration parameters, some of which are discussed further below, may be uploaded into the BIRD (200) from the configuration device (335, 340) via the BIRD communications link (337). The same upload process and path may also be used to upload required software upgrades into the BIRD (200). The same BIRD communications link (337) may also be used to download stored data from the BIRD (200) to the configuration device (335, 340). Note that while the BIRD (200) is shown in the figure with an item (100) attached, in an embodiment an item (100) need not be attached to the BIRD (200) during the processes of data upload or data download.

Appropriate parameters may be entered into the PC (335) through a variety of means, including but not limited to configuration dialog boxes (for example, elements 290, 665, 668, 670, and others) discussed in part above and further below.

As discussed above in conjunction with FIG. 2A, the use of a configuration computer (335, 340) for BIRD configuration may support or enable BIRD embodiments with reduced size, weight, and power consumption due to reduced user-interface hardware/functionality on the BIRD (200) itself.

In an embodiment, initial BIRD configuration, which may entail substantial setup and a relatively elaborate user interface, may be done via a larger configuration computer (335) (with a larger display, keyboard, etc.); while relatively minor fine-tuning and field adjustment of the BIRD (200) may readily be done via a cell phone (340) or similar. In an alternative embodiment, all configuration of the BIRD (200) may be done via a cell phone (340) or similar small, readily-portable, processor-based device.

FIG. 3E

BIRD Reporting System

As per step 328 of method 320, the BIRD (200) presents and/or transmits notification (372, 374) if environmental conditions, as reported by the sensors (210), suggest a likelihood that the attached item (100) may be displaced (503.0) (lost, misplaced, misappropriated, stolen, wandering) or otherwise in some anomalous usage (503.2) or anomalous context. The notification is targeted towards an authorized owner or authorized user (AU) of the item (100), or to another authorized party.

Figure 3E:
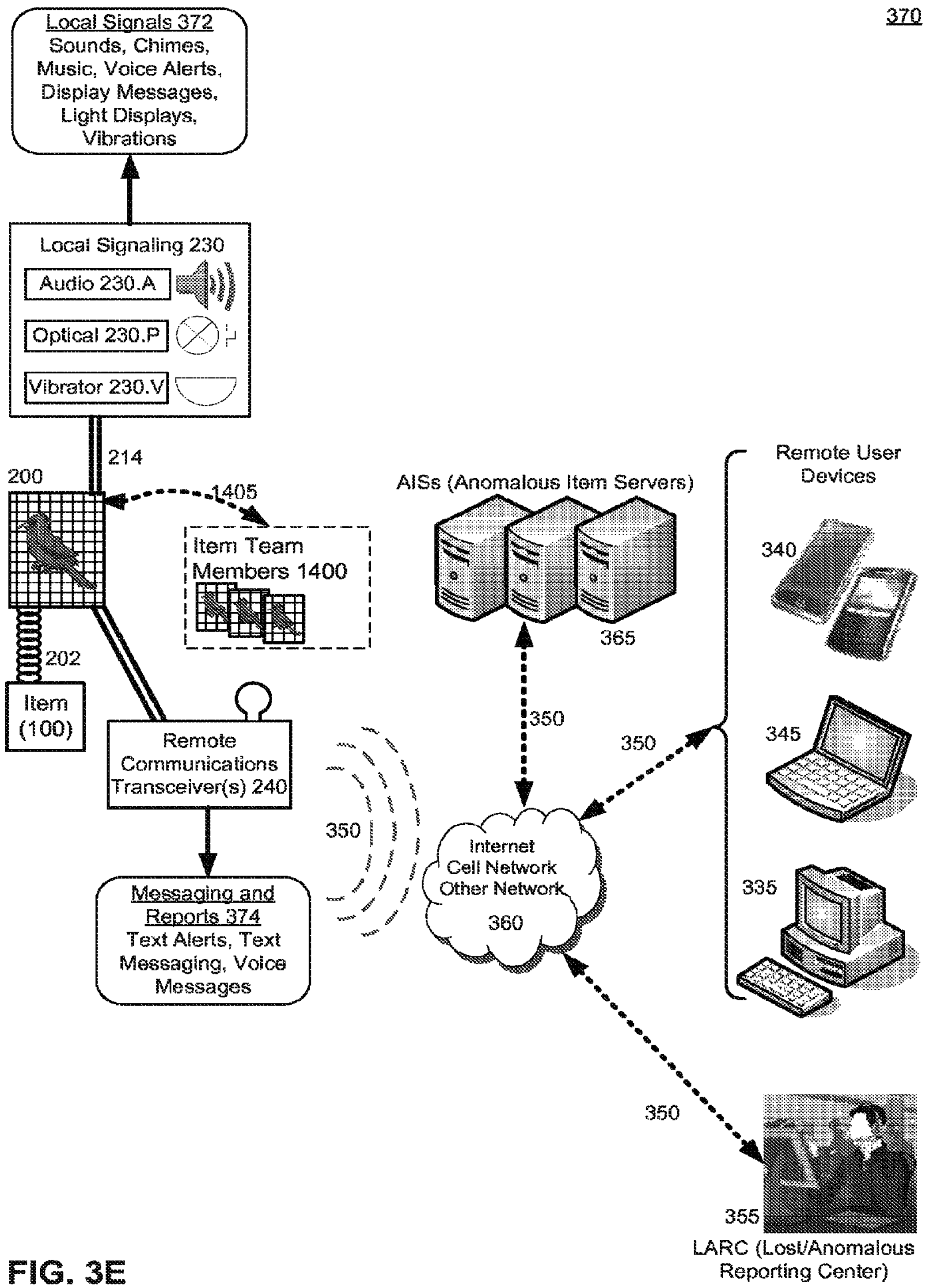
FIG. 3E is an illustration of exemplary means and communications paths used by a BIRD for reporting and for other communications with external processing devices.

FIG. 3E is an illustration of an exemplary BIRD reporting system (370). The system includes a BIRD (200) which is typically tethered to (mechanically coupled with), embedded within, or integrated with an item (100).

The BIRD (200) includes local signaling elements (230) already discussed above, which are used by the BIRD (200) to provide local indications and warnings (372) to persons in immediate proximity to the BIRD (200), of possible displaced/anomalous item usage (503.0/503.2) or condition. In FIG. 3E the local signaling elements (230) are illustrated as being external to the BIRD (200), but this is primarily for purposes of illustration; in an embodiment, the local signaling elements (230) are an integrated element of the BIRD structure, though in an alternative embodiment some or all local signaling elements (230) may be part of an auxiliary or secondary structure or device (not shown).

The BIRD (200) includes remote communication transceivers (240) already discussed above, which are used by the BIRD (200) to provide remote messaging and reports (374), for example to an authorized user (AU) of the item (100) or to other appropriate authorities, of possible displaced/anomalous item usage (503.0/503.2) or condition. In FIG. 3E the remote transceivers (240) are illustrated as being external to the BIRD (200), but this is primarily for purposes of illustration; in an embodiment, the remote transceivers (240) are an integrated element of the BIRD structure, though in an alternative embodiment some or all local signaling elements (230) may be part of an auxiliary or secondary structure or device (not shown).

In an embodiment, the reporting system (320) relies upon one or more dispersed wide area network (WAN) systems (360), such as, for example and without limitation: the internet, a cell phone network, the plain old telephone system (POTS), cable network systems, or possibly a dedicated corporate, government, or other institutional intranet. The WAN (360) enables communication between the BIRD (200) and remote reporting facilities and elements via communications links (350), which may include either wired or wireless elements, or both.

The reporting system (370) may include communications devices or data processing devices which belong to the authorized owner or other authorized user (AU) of the BIRD (200) and its associated item (100). Such communications devices or data processing devices receive notification of anomalous item behavior, and may include for example and without limitation a cell phone (340), a personal computer (335), and a notebook computer, tablet computer, or other PDA (345).

The reporting system (370) may also include a Lost/Anomalous Reporting Center (LARC) (355). A LARC (355) may be for example a conventional lost-and-found at a public facility; a police station; a private security facility; a fire station; or similar institutional or organizational reporting center which is equipped to address and resolve issues of lost, misplaced, misappropriated, wandering, stolen and/or otherwise anomalous items.

The reporting system (320) may also include anomalous item servers (AISs) (365) which are configured to receive and process data pertaining to lost, misplaced, misappropriated, stolen, wandering, or otherwise anomalous items.

The reporting system (320) may also include a link or links (1405) to members (102.IT) of item teams (1400). Items teams (1400), item team members (102.IT), and item links are discussed further below in this document in conjunction with FIGS. 14A-14I, 15A, 15B, and other figures as well.

Anomaly Alert Level (AAL):

Anomaly signals (372) or reports (374) may have an associated anomaly alert level (AAL), which indicates a probability that the alert is valid. For example, anomalies may be rated on a color-coded scale (red, yellow, orange, blue, or similar), or on a numeric scale (for example, 5 for certainly or near certainty of anomaly; 4, 3, and 2 for progressively less probable; and 1 for some risk of anomaly). The intensity, type, and duration of signaling of reporting may be determined in part based on the AAL. The selection of target for an alert or report (for example, whether or not to notify a LARC (355)) may be based in part on the AAL. This reduces a risk of hammering the authorities with erroneous alerts of lost items. Alternatively, all alerts may be reported to a LARC (355), but with the associated AAL as well. (Suitable filtering of alerts, by AALs, may be done at the LARC (355).)

FIG. 4A

Overview of BIRD Logic, BIRD Navigation, and Usage Expectations

Usage Condition (Environmental Condition)

In this document, the terms usage condition and environmental condition are used interchangeably.

Both terms may refer to a relatively specific description of how an item (100) is actually being used by a person (whether an authorized user (AU) or otherwise), or has been used in its substantially immediate, short-term history (for example, the past minute, the past ten minutes, the past hour, etc.); or the state of the environment (104) in which the item is found, or the environment (104) to which the item is subject, either at the current moment or in its substantially immediate, short-term history.

Alternatively, both terms may refer to a relatively specific description of how an item (100) may be used or is expected to be used in the future; or to a relatively specific state of the environment (104) in which the item is expected to be found, or the environment (104) to which the item may be subject, in the future.

An item's usage data (700.U) is based on sensor data (700) and/or processed sensor data (700.P), and is based on an item's actual item usage conditions (which typically vary over time, and which may or may not reflect usage by an authorized user (AU)).

An item's usage expectations (600) embody a collection of expected item usage conditions for different times, dates, and expected locations (144.L), assuming item usage by an authorized user (AU). (That is, usage expectations (600) are based on the item's expected usage, assuming the item remains substantially under the control of an authorized user (AU).)

BIRD Logic and Usage Expectations

Figure 4A:
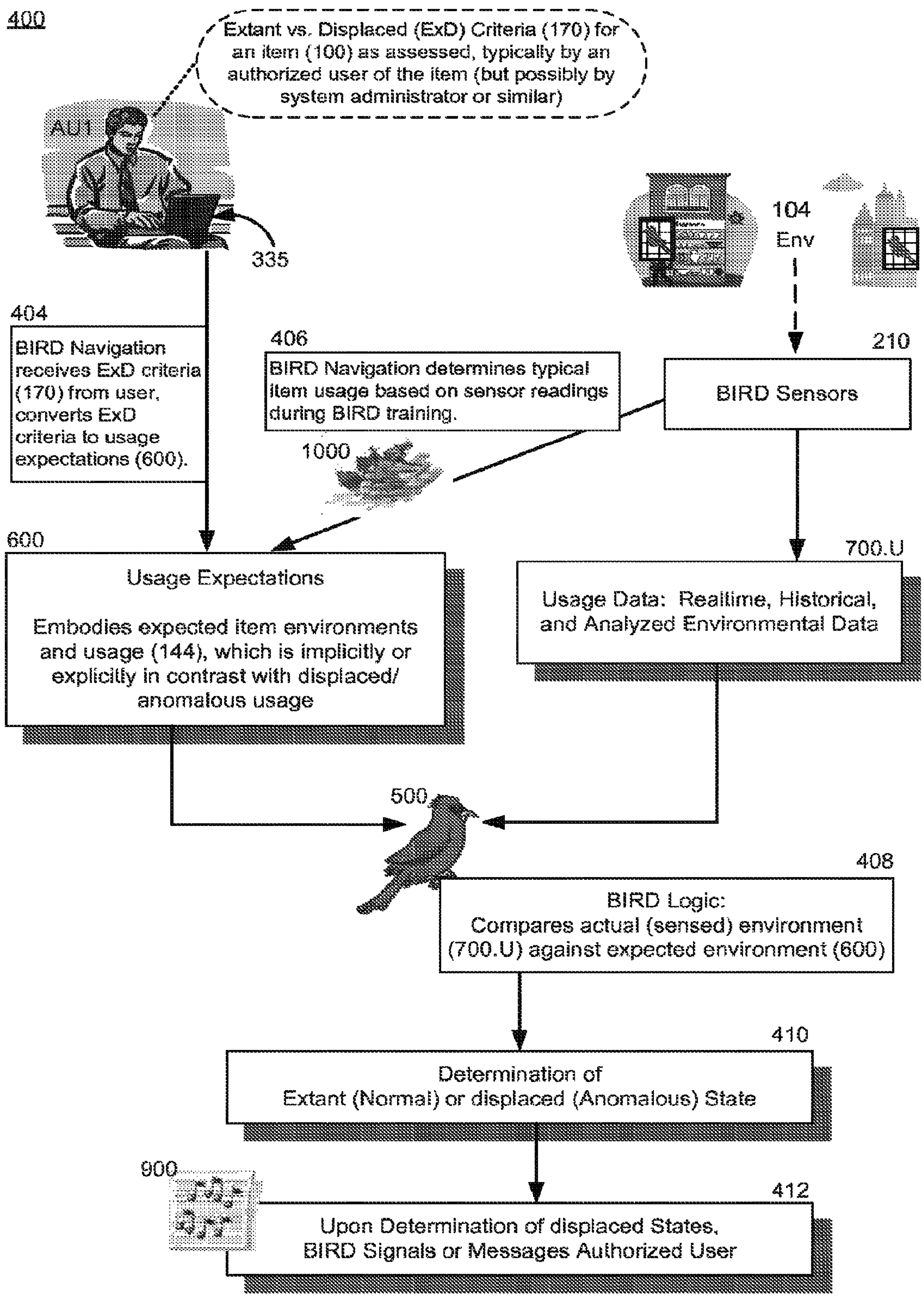
FIG. 4A is a hybrid diagram illustrating both process aspects and system aspects of overall, exemplary BIRD operations.

FIG. 4A is a hybrid process diagram (400) illustrating both method aspects and system aspects of overall, exemplary BIRD operations. The process diagram (400) shows exemplary interactions between an authorized user (AU1), ExD criteria (170) framed by the user, BIRD navigation (1000), usage expectations (600), the environment (104) in which an item (100) is used, BIRD sensors (210), usage data (700.U) from the environment, and BIRD logic (500). The process (400), as illustrated, encompasses both the configuration or training phase (300, 306) of BIRD usage, and also daily field usage (320) where the BIRD (200) is employed to monitor for potential displaced/anomalous usage (503.0/503.2) of an item (100). The hybrid process diagram (400) integrates various elements already discussed above.

Usage expectations (600) typically refer to environmental conditions (104) which are expected to surround an item (100), and/or to environmental forces or phenomena to which an item (100) may be subject, when the item remains substantially under the control of the authorized user (AU1), or remains in appropriate storage as would be expected by the authorized user (AU1). Environmental conditions (104) may include, for example and without limitation: the locations(s) (104.L) in which an item (100) is found or used; the temperature ranges (104.G) to which the item (100) is subject; the ambient light and/or sound levels (104.G) to which the item (100) is subject; velocities (104.M) which the item (100) may experience; accelerations (104.M) to which the item (100) may be subject, and other environmental factors (104.G)—chemical, radiological, and similar—to which the item (100) may be subject. Multiple examples of usage expectations (600) are provided in conjunction with FIGS. 6A-6F, below, as well as with other figures throughout this document.

BIRD Navigation, Usage Conditions, BIRD Configuration, and BIRD Training

As already discussed above (FIG. 1D), an owner or other authorized user (AU1) of a BIRD (200) may establish usage expectations (600) for the BIRD (200). In an embodiment, the usage expectations (600) are determined by the user based on the user's specific ExD criteria (170). The ExD criteria (170) are general criteria for when the item is to be considered extant (503.1) or otherwise in normal use; versus when the item is to be considered displaced (503.0) (that is, lost, misplaced, misappropriated, wandering, or stolen), or otherwise anomalous (503.2). In an embodiment, BIRD navigation (1000), discussed further below, assists in the translation of the user's ExD criteria (170) into formal usage expectations (600).

In an alternative embodiment, the BIRD's usage expectations (600) are identified in whole or in part by the BIRD (200) itself, via algorithms or processing provided by BIRD Navigation (1000), based on sensor data (700) identified during periods of BIRD training.

In the figure, the ExD criteria (170) are illustrated in a box with a dotted line, indicating that these are informal or "plain language" identifications of how an item (100) is expected to be used and/or how the item may be displaced (503.0). The formal criteria employed by the BIRD (200)—the mathematical, logical, or other symbolic representations employed by the BIRD to distinguish extant/normal states (503.1/503.3) versus displaced/anomalous item states (503.0/503.2)—are the usage expectations (600). In an embodiment, the ExD criteria (170) form a basis for defining usage expectations (600). The authorized user (AU1) may enter ExD criteria (170) which are translated (in step 4040) via BIRD algorithms (BIRD Navigation (1000)) into usage expectations (600), or the authorized user (AU1) may directly enter usage expectations (600), via the configuration computer (335). In an embodiment, a BIRD (200) is configured with BIRD Navigation (1000) suitable for identifying usage expectations (600) based on the authorized user's ExD criteria (170).

During a training period, the BIRD (200) and its associated item (100) are always in some environment (104), with the user (AU1) being careful to engage in normal item usage and/or normal item storage. (In FIG. 4A, for simplicity only, the environment (104) is illustrated without the presence of the user (AU1) or item (100).) BIRD sensors (210) captures date regarding environmental phenomena which impinges on the BIRD (200) from the environment (104). In step 406, during a training period, and based on the data from BIRD's sensors (210), the BIRD Navigation (1000) identifies substantially real-time, or time-proximate, environmental conditions and usage conditions (600) for the item (100).

In an embodiment, step 404 of process 400 corresponds to step 304 of method 300*m* discussed above in conjunction with FIG. 3A. In an embodiment, step 406 corresponds to steps 310 through 316 of method 306, discussed above in conjunction with FIG. 3B.

BIRD Field Use

After the BIRD (200) is configured, the user (AU1) keeps the BIRD (200) tethered to the appropriate item (100). The user (AU1) then goes about life activities as normal. While the user (AU1) no doubt intends not to lose the item, misplace the item, have the item stolen, etc., such events may occur. In step 408, throughout the day (and night), BIRD logic (500)—methods and algorithms discussed in detail throughout this document—compares the real time usage conditions (700.U) against expected usage or environmental conditions, as embodied in usage expectations (600). In step 410, and based on the comparison, the BIRD logic (500) makes a determination (410) of whether its associated item (100) is extant (503.1) or displaced (503.0); or more generally, whether the item (100) is in a normal state (503.3) or anomalous state (503.2).

If the determination (410) is that the item (100) is in a displaced state (503.0) or anomalous state (503.2), then in step 412 the BIRD (200) issues signal (372) or reports (374) of the displaced/anomalous state (503.0/503.2), and may take other response actions as well. The algorithms and methods associated with these responses are associated with BIRD song (900), discussed further below.

Steps 408 through 412 broadly correspond with steps 324 through 328 of method 320, discussed above in conjunction with FIG. 3C.

FIG. 4B

Summary of Some Exemplary BIRD Algorithms

In an embodiment, a BIRD (200) may employ numerous methods, algorithms, system services, software modules, hardware modules, API's, user interfaces, internal system interfaces, multi-component system layers, and/or other service resources to implement the teachings, systems and methods described herein. Exemplary methods, algorithms, services, modules, etc., are described throughout this document. In an embodiment, and for purposes of system description, these method, algorithms, services, modules, and similar internal BIRD resources, may be grouped or categorized in a variety of ways.

An exemplary summary description (420) of some BIRD methods, algorithms, services, and modules is presented in FIG. 4B. The summary (420) is for purposes of teaching and clarity of exposition only, and should in no way be construed as limiting.

BIRD Navigation (1000) and Usage Expectations (600): BIRD Navigation (1000) includes algorithms, services, modules, and other resources configured to enable a BIRD (200) to ascertain and to store, in memory (206), usage expectations (600), which are discussed in more detail elsewhere throughout this document.

In an embodiment, the storage of usage expectations (600) takes the form of either:

(i) indications or parameters for expected raw sensor data (700) from BIRD sensors (210), or (ii) expectations of values for derived or integrated data products, that is, processed data (700P) which can be distilled, extracted, or otherwise synthesized from raw sensor data (700).

In aggregate, and in an embodiment, the stored data or parameters, which are representative of expected item usage, are referred to as usage expectations (600). In an alternative embodiment, usage expectations (600) may take the alternative or additional form of representations of sensor data indicative of expected sensor data when the associated item is not subject to normal or conventional use/storage.

BIRD Navigation (1000) may include, for example and without limitation:

- algorithms and methods, including dialog boxes, wizards, and other user-interface means, to assist a user in defining or entering the user's own expectations (ExD criteria (170)) for item usage;
- algorithms and methods to translate, or assist in translating, the user's ExD data entry into formal usage expectations (600);
- algorithms and methods for the BIRD (200) to determine iteMetrics (154) during training or training sessions;
- algorithms and methods for the BIRD (200) to directly identify or characterize non-iteMetrics aspects of usage expectations (600), such as location usage expectations (600.Loc), during training or training sessions;
- algorithms and methods for the user to dynamically modify usage expectations (600) during field use of the BIRDed-item (102); and
- algorithms and methods for the BIRD (200) to dynamically re-assess and modify usage expectations (600) during field use of the BIRDed-item (102).

The term "navigation," in conventional use, is typically associated with location and motion only; that is, navigation conventionally refers to where something (or someone) is located or how something (or someone) is moving at a particular time. As understood and defined in this document, however, the term navigation is broader, and may refer to, for example and without limitation, elements of:

- item (100) location;
- item movement associated with transitions from one geographic location to another;
- item movement associated with, or characteristic of, user movement on a personal scale (walking or running, shifting motions while standing, shifting motions while seated, movement of an item in the user's hands, movement of an item in the user's pockets or on the head, etc.);
- non-movement, including identification of how long an item (100) is either or both of stationary or motionless and where the item is stationary and/or motionless;
- impact of environmental phenomena on an item (100), such as the impact or influence of, and/or changes in, ambient light, sound, temperature, and other environmental influences;
- for items with internal mechanical or electric operations, or other variable internal states or properties, transitions in states and conditions which are associated with internal item operations; and generally . . .
- any item-associated data, detectable via BIRD sensors (210), which may be used to assess transitions in item status (501) or usage; and in particular to assess whether an item is in a conventional state of usage or storage, or on the other hand is in a non-conventional state of usage or storage.

In the figures BIRD Navigation (1000) is illustrated symbolically by a sextant.

BIRD Logic (500): The term BIRD logic (500), as employed in this document, may describe any of the BIRD methods, algorithms, services, APIs, logic or analysis modules, and other processing resources or system logic employed by a BIRD to distinguish an item which is extant/normal (503.1/503.3) (present when and where expected, and/or in use when, where, and how expected to be, and typically associated with an authorized user (AU)) from an item which is displaced (503.0) (lost, misplaced, misappropriated, wandering, or stolen) or otherwise in an anomalous state (503.2).

BIRD logic (500) is broadly synonymous with the computational intelligence of a BIRD (200), and is implemented through instructions stored in memory (206) running on the BIRD's processor (204) in conjunction with other BIRD hardware, all of which are discussed throughout this document.

In an embodiment, BIRD logic typically entails comparing:

usage data (700.U) for an item, collected and processed during field-use of the item (100), against . . .

item-and-user-specific usage expectations (600) . . .

. . . to identify whether the current state of the item (100) is extant/normal (503.1/503.3) or is displaced/anomalous (503.0/503.2).

At points throughout the figures, BIRD logic (500) is illustrated symbolically by the image of a bird (a Robyn).

BIRD song (900): Methods, algorithms, services, analysis modules and other processing resources employed by a BIRD (200) to signal, message, and otherwise respond to displaced/anomalous item states (503.0/503.2).

As discussed above, a BIRD (200) may alert a user to potentially displaced states (503.0) or anomalous states (503.2) through local signal (372) emitted via the BIRD's local signaling (230), or through messages (374) transmitted via communications transceivers (240) to another local device (such as a cell phone (340) or an item-attached-to-person (102.ATP) (see FIG. 14F)). Control of such local signaling is implemented, in part or in whole, via local BIRD song (900) which is discussed, inter alia, in association with FIG. 9B and other figures throughout this document.

As also discussed above, including in conjunction with FIG. 3E above, a BIRD (200) may alert an authorized user (AU) or other appropriate authorities to potentially displaced states (503.0) and/or anomalous states (503.2) through remote reporting, which entails messages (374) transmitted via communications transceivers (240) to remote devices (335, 340, 345, 355, 365). Control of such remote reporting is implemented, in part or in whole, via remote BIRD song (900) which is discussed, inter alia, in association with FIG. 9B and other figures throughout this document.

At points throughout the figures, BIRD song (900) is illustrated symbolically by musical notes on a staff.

FIG. 4C

Flowchart of Exemplary BIRD Process for Daily Item Field Usage and Storage

Figure 4C:
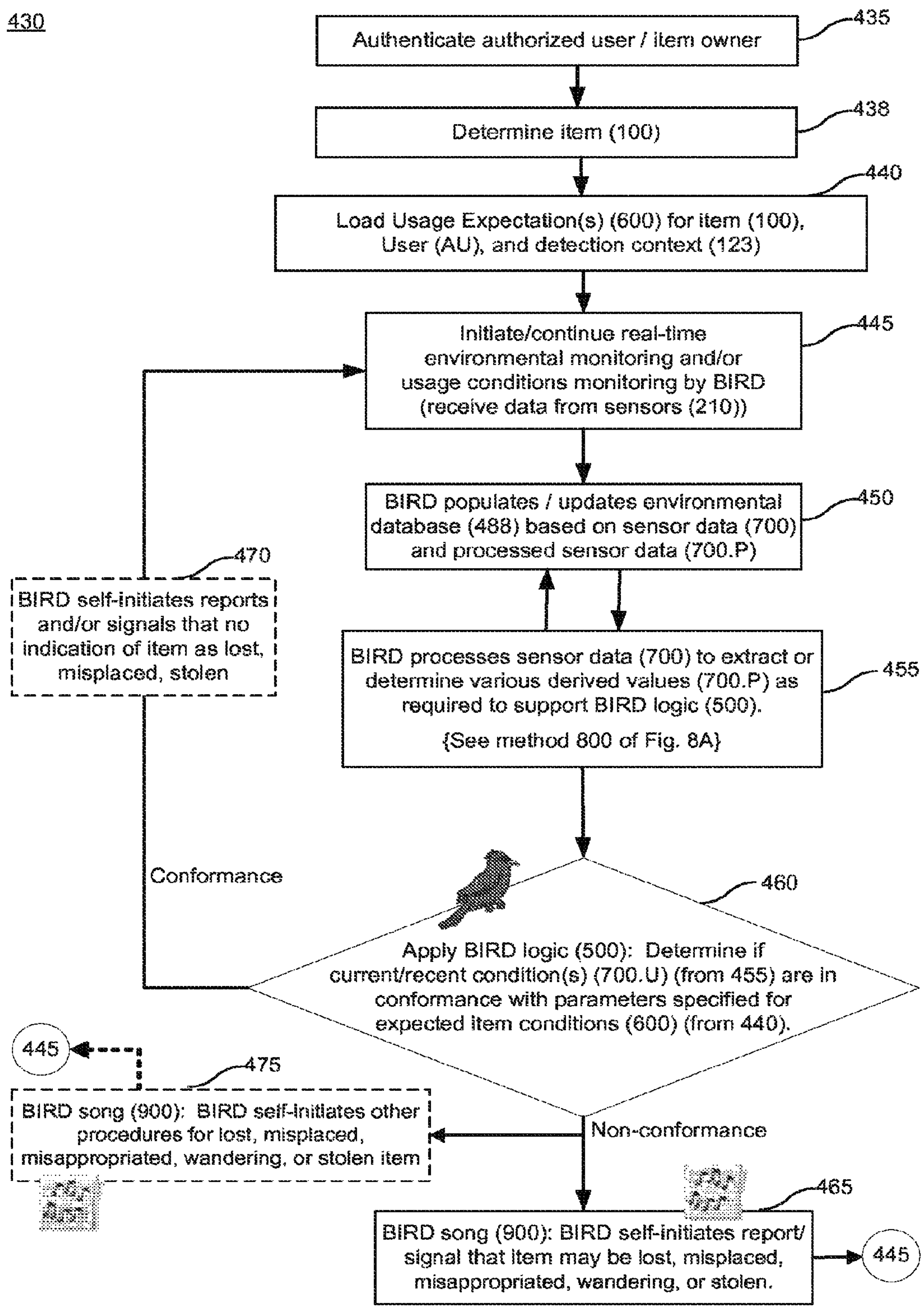
FIG. 4C is a flowchart of an exemplary method employed by an exemplary BIRD to identify extant item usage or displaced item usage, which may include identifying items which are potentially lost, misplaced, misappropriated, wandering, or stolen.

FIG. 4C is a flowchart of an exemplary method (430) which may be employed by an exemplary BIRD (200) to identify extant/normal item usage (503.1/503.3) or displaced/anomalous item usage (503.0/503.2), which may include identifying items (100) which are potentially lost (503.0.1), misplaced (503.0.2), misappropriated (503.0.3), wandering (503.0.5), or stolen (503.0.4).

In an embodiment, exemplary method 430 may require that suitable usage expectations (600) have previously been defined and stored in the BIRD (200), as discussed in association with various figures throughout this document.

In an embodiment, exemplary method 430 may require that when the BIRD (200) is first obtained by a user (for example, upon or shortly after purchase), the user configures or programs the BIRD (200) with a suitable personal identification signature (152) (see FIG. 1J, above). For example, the user may provide a keyed-in or spoken password, or a biometric signature such as a thumbprint, facial image, or retinal scan (152). The BIRD (200) retains the signature (152) in memory (206). Thereafter, the BIRD (200) may request or require user identification, either upon activation or at some regular interval to be programmed (for example, once per day or once per week). In this way, the BIRDed-item (102) may authenticate an authorized user (AU). More than one authorized user (AU) may be programmed into the BIRD (200), and the identification step (435, discussed below) may be optional.

Method 430 begins with step 435, which in an embodiment may be performed substantially simultaneously with step 438. Steps 435 and 438 are associated with step 322 of method 320, already discussed above in conjunction with FIG. 3C. Steps 435 and 438 entail identifying, for the BIRD (200), both the authorized user (AU) and also the item (100) associated with the BIRD (200). In an embodiment, a user may identify himself or herself to the BIRD (200) via a variety of authentication mechanisms or biometric determinations, as discussed elsewhere in this document. The user may also identify the item (100) to which the BIRD (200) is attached.

In alternative embodiments, either or both of steps 435 and/or 438 may be optional, or may need to be performed only infrequently. For example, a user may log in to a BIRD (200) upon initial use, and also identify the item (100) with which the BIRD (200) is associated. Following the initial login/user-authentication, the BIRD (200) may be configured to not require further user authentication or item identification for prolonged or indefinite periods of time, provided only that the BIRD (200) does not assess any kind of displaced/anomalous item states (503.0/503.2). In an alternative embodiment, the BIRD (200) may be configured so as to require the authorized user (AU) to refresh his or her authentication, and item identification, at periodic intervals.

In an alternative embodiment, the step of item identification (step 438) is either not needed at all or is an entirely automated process:

the BIRD (200) may be integrated with the item (100);

the BIRD (200) may be electrically coupled with an electrically active item (100.Act) (see the discussion of active items associated with FIGS. 13A-13C and other figures throughout this document); or . . .

the BIRD (200) may be tethered to an item which has affixed to it an item validation marker (224.IVM) which enables the BIRD (200) to identify and validate the item (100) (see for example FIG. 2G, above).

In an embodiment, in step 440, the BIRD (200) identifies the expected environmental condition(s)/usage(s) (144) and/or usage expectations (600) for an associated item (100). This step is applicable if more than one detection context (123) has been defined for the item (100). For example, in an embodiment, multiple usage contexts (123) may be defined based on time range (105) and expected location (144.L). The BIRD (200) may then identify the current time (104.T) and current location (104.L) to determine the appropriate detection context (123), and then load the appropriate matching usage expectations (600), for example from long-term storage in NVRAM (206.M.N) in general operating memory (206.M.D).

In an alternative embodiment, multiple usage contexts may be defined based on time range (105) only, with expected locations (144.L) (if any) instead being an element of the usage expectations (600). In such an embodiment, the BIRD (200) may identify the current time (104.T) to determine the appropriate detection context (123), and again load the appropriate matching usage expectations (600).

This step is also applicable if the BIRD (200) has been configured for use with more than one item (100), and/or more than one authorized user (AU). In this case, the BIRD (200) may store different sets of usage expectations (600) associated with the different users and/or items (100). Identifying the appropriate usage expectations (600) entails identifying the usage expectations suitable for the current authorized user (AU) and item (100) (as determined in steps 435 and 438, above). If the BIRD (200) is configured with usage expectations (600) for only a single item (100) and a single authorized user (AU), step 440 may still entail loading the usage expectations (600) from a long-term storage (for example, NVRAM (206.M.N) or secondary memory (206.S)) into higher speed volatile memory (such as DRAM (206.M.D)).

In step 445, the BIRD (200) initiates or continues real-time environmental monitoring and/or usage monitoring for its associated item (100), receiving real-time sensor data (700.R) (see FIGS. 7A-7B, below) from sensors (210). Step 445 is associated with step 324 (user initiates monitoring by BIRD) and step 326 (routine item use/storage) of method 320, discussed above in conjunction with FIG. 3C.

Steps 450, 455, 465, and 470—all discussed immediately below—are associated with step 326 of method 320 (discussed above in conjunction with FIG. 3C). Step 326 of method 320 broadly entails normal use of the item (100) by the authorized user (AU), and/or normal storage of the item (100), but in either case with the possibility of the item becoming displaced (503.0) or otherwise changing to an anomalous item state (503.2).

Steps 450 and 455, described immediately below, entail storage and processing of sensor data (700). In an embodiment, these two steps (450, 455) may be mutually interdependent, and may occur substantially in parallel or in rapid alternation. This is indicated in the flowchart (430) by the dual direction arrows between the two steps (450, 455).

In step 450 the BIRD (200) populates and/or updates an internal environmental data log and/or usage pattern database (488) (see FIG. 4D, below), based on the sensor data (700.R) received in step 445. The database (488) is maintained in the BIRD's memory (206) (see for example FIG. 4D, FIG. 7B, and other figures throughout this document) and stores historical sensor data (700.H) and processed sensor data (700.P); in aggregate the stored data constitutes usage data (700.U).

In step 455, the BIRD (200) analyzes current and/or recent historical environmental sensor data (700) to generated processed data (700.P). Analysis may take a variety of forms including, for example and without limitation:

- A simple retrieval of, or determination of, an immediate, current sensor data value (700.R), such as current item location, current item movement, current item light exposure, etc.
- Arithmetic calculations based on multiple data values, such as minimum or maximum values over a recent period of time, average values over a recent period of time, etc. For example, the BIRD (200) may calculate an average item velocity over a recent period of time.
- More elaborate mathematical calculations or pattern recognition operations.

The mathematical calculations of step 455, based on the raw environmental sensor data (700), yield processed environmental data values (700.P). See FIGS. 7A-7B, FIG. 8A (and in particular method 455[Meth]), and other figures throughout this document, for further discussion.

In step 460, the BIRD (200) compares:

- usage data (700.U) (which includes the measured, current sensor data (700.R), and/or recent sensor data (700.H), and the processed values (700.P)) against . . .
- the usage expectations (600) for the item.

Based on the comparison, the BIRD (200) determines if the usage data (700.H) for the item (100) are in conformance with, or fall within boundaries or parameters specified for, expected item conditions/usage (600). Analysis and comparison are done by the BIRD's processor (204). In an embodiment step 460 applies and encompasses the BIRD logic (500). See FIGS. 5A-5D, 5E(1)-5E(3), 5F-5G and other figures throughout this document for exemplary BIRD logic (500) associated with step 460. See also figures throughout this document for discussions of sensor data analysis.

The application of BIRD logic (500) may determine the that current usage data (700.H) for the item (100) is in conformance with, or fall within boundaries or parameters specified by, the usage expectations (600), resulting in the BIRDed-item (102) self-assessing a state of being extant/normal (503.1/503.3). In this event, method 430 may continue with a return to step 445, further environmental monitoring. Optionally, for example at timed intervals, the method may first proceed to step 470, where a message, signal, or report is sent indicating that there are no signs of item displacement/anomaly (503.0/503.2). The method then proceeds from step 470 to step 445, further environmental monitoring.

The application of BIRD logic (500) may determine the that current usage data (700.U) for the item (100) is not in conformance with, or does not fall within boundaries or parameters specified by the usage expectations (600). This results in a self-assessment by the BIRDed-item (102) of being in a state which is displaced (503.0) or otherwise anomalous (503.2). In this event the method proceeds to step 465, where self-initiated reporting by the BIRD (200) occurs.

By self-initiated reporting is meant a report or signal, transmitted from or produced by the BIRD (200) only in response to its own self-assessment in step 460, without any preceding, time-proximate prompt by the authorized user (AU)/owner or other third party device. Persons skilled in the art will appreciate that the BIRD (200) may receive time-proximate data from third-party devices, for example, location data from GPS systems or other sources. However, in an embodiment, no third-party device is required for data analysis or assessment that the item (100) is displaced/anomalous (503.0/503.2). The displacement/anomaly (503.0/503.2) assessment is made solely by the BIRDed-item (102), and in that sense the subsequent reporting or signaling by the BIRDed-item (102) is self-initiated.

In step 465, a report or message is sent by the BIRD (200), and/or a local and/or remote signal is issued by the BIRD (200), indicating that its associated item (100) may be displaced (503.0), or otherwise in an anomalous context or usage (503.2). See for example discussion associated with FIGS. 3E, 9B, 9C, 15B, and other figures throughout this document.

If in step 460 a determination is made that the environment of the item (100) or the usage of the item (100) is potentially displaced/anomalous (503.0/503.2), then the method may also proceed to step 475 in addition to, or possibly in place of, step 465. In step 475, the BIRD (200) initiates other procedures for displaced states (503.0) (lost, misplaced, misappropriated, stolen, wandering) or other anomalous item states (503.2). Some of these procedures may be internal, such as for example and without limitation:

- adjustments in internal power usage by the BIRD (200);
- changes in internal monitoring methods by the BIRD (200);
- limitations on control or access to BIRD resources via user-interface elements (282);
- changes or limitations in operations of an active item (100.Act) associated with or having integrated within themselves an active item BIRD (200.Act).

Such procedural or operational responses may also be considered to an element of BIRD song (900).

From steps 465 and/or 475, the method typically proceeds back to step 445, continued environmental monitoring. In an embodiment, this continued environmental monitoring may include monitoring for a renewed authorized user (AU) login/authentication, indicating that the authorized user (AU) has regained possession of, and control over, the BIRDed-item (102).

In an alternative embodiment, steps 460 and 465 may include discrimination of the anomaly alert level (AAL), already discussed above, which indicates the estimated probability by the BIRD (200) that the alert—that is, the determination of anomalous item behavior (503.2)—is valid.

Steps 455, 460, 465, 470, and 475 implement elements of BIRD logic (500) and BIRD song (900), performing the necessary computational methods and algorithms on the BIRD's processor (204) based on data from the sensors (210), data stored in memory (206), instructions stored in memory (206), and possibly data from other BIRD elements such as the item link integrity detector (224), the clock/calendar time (208), and possibly other elements as well.

Displacement Determination and Time Frames for Sensor Data Analysis

In an embodiment, determinations of a displaced/anomalous item state (503.0/503.2), as per step 460 of method 430, above, may fall into one of two categories:

(1) Determinations based on a substantially instantaneous or short-term event or state change. Such a determination by BIRD logic (500) might entail, for example, receiving data from the BIRD's location sensor (210.L) indicating that the associated item (100) is outside of a specified region or boundary, even briefly; or receiving data from the BIRD's motion sensor (210.M) indicating that the associated item (100) is in motion at a time or place when/where the item (100) should not be in motion.

(2) Determinations based on a pattern of environmental conditions which occur over a period of time or a duration of time, typically a recent period/duration of time. Such events may be related to location or movement, for example, the item (100) being outside a specified geographic region (home base (140.HB) or daily life (140.DL) regions) for more than a designated period of time. However, such longer-term determinations of displacement or anomaly (503.0/503.2) may also be based on iteMetric (154) events or changes, including for example and without limitation:

- determinations related to psyIteMetrics (158), for example that the item (100) is exposed to light or shielded from light for more than a designated period of time, or that the item (100) is in motion for more than a designated period of time, or is in motion on more than a specified number of occasions within the designated time frame, etc.;
- morphIteMetric (156) determinations based on a user's pattern of locomotion (for example, walking rhythm, gait, etc.) over a period of time, this may require an analysis of sensor data (700) extending over several minutes.

In some cases, a non-transitory, sustained variations or changes in sensor data (700) from a baseline, normal condition to some other condition may be required to be indicative of displaced/anomalous item state (503.0/503.2).

By a recent period of time is meant a time frame reflective of an item's usage or environment dating from the current moment, or the substantially current time (104.T), into the substantially immediate past. For example, a BIRD (200) may analyze historical sensor data (700.H) for the immediate past minute, the immediate past five or ten minutes, or the immediate past hour. Determinations of whether an item (100) is in the correct location, or is subject to expected user movements (144.M), or whether the item is subject to expected intensities of light or sound (144.G), may typically be made based on analysis of sensor data (700) from within relatively short time frames; these time frames may range from a few seconds into the past up to an several hours into the past. Analysis of BIRD sensor data (700) based on such time frames permits a relatively timely identification of whether an item (100) may be lost (503.0.1), misplaced (503.0.2), misappropriated (503.0.3), wandering (503.0.5), or stolen (503.0.4).

For certain other types of analyses, a self-assessment of whether an overall, daily pattern of item usage is consistent with established, daily item usage pattern (144.P, 144.AU) of an authorized user (AU), may require somewhat longer times frames, such as eight hours, a day, or even several days prior. Analysis by BIRD logic (500) of BIRD sensor data (700) for such longer time frames (hours to days) may identify an item (100) as possibly lost (503.0.1), misplaced (503.0.2), misappropriated (503.0.3), wandering (503.0.5), or stolen (503.0.4), even when short-term (few minutes to an hour) analysis failed to make such a determination.

FIG. 4D

Exemplary BIRD Processing Modules

Figure 4D:
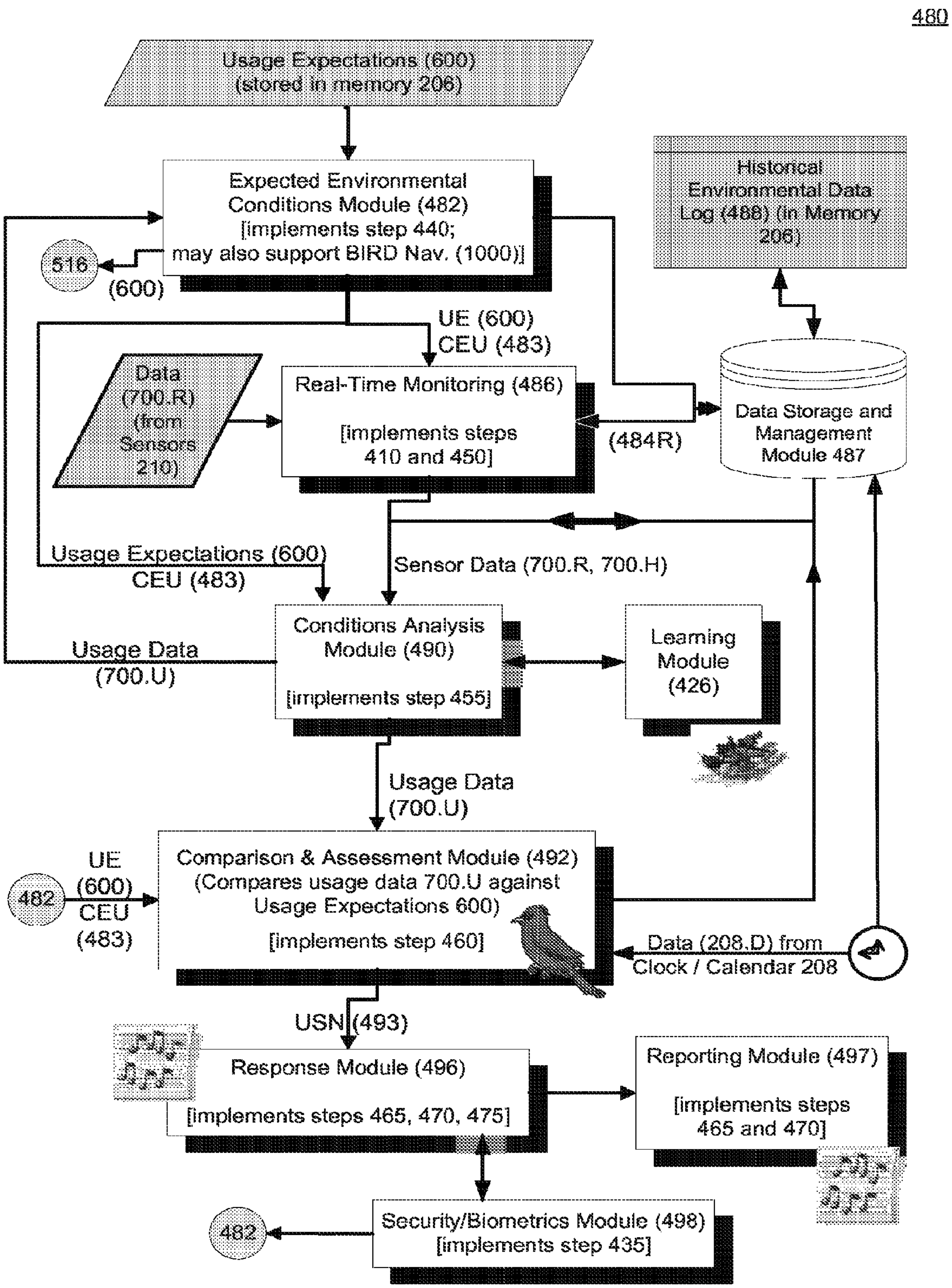
FIG. 4D is a system diagram of an exemplary group of BIRD processing modules.

FIG. 4D is a diagram of an exemplary system of BIRD processing modules (480) for real-time data processing by a BIRD (200) to identify extant/normal item usage (503.1/503.3) or displaced/anomalous item usage (503.0/503.2), which may include identifying items (100) which are potentially lost (503.0.1), misplaced (503.0.2), misappropriated (503.0.3), wandering (503.0.5), or stolen (503.0.4), according to an embodiment of the present system and method. The figure also illustrates some associated data elements such as sensor data inputs (700.R), historical sensor data (700.H), and clock/calendar/time data (208.D).

The exemplary modules shown may be implemented through software stored in the BIRD's memory (206) and running on the BIRD's processor (204); or through a variety of dedicated BIRD processors (204); or though one or more specialized subprocessors of a single processor (204); or through a combination of the processor (204) and firmware; or through a combination of the above, or through any other suitable processing means. The processing modules serve to implement the steps of exemplary method 430 (discussed above in conjunctions with FIG. 4C), the steps of other methods of BIRD Navigation (1000). BIRD logic (500), and BIRD song (900) disclosed throughout this document, and to implement other methods which may be appropriate or suitable for the BIRD (200).

Expected Environmental Conditions Module

The expected environmental conditions module (482) implements step 440 of method 430, receiving and/or determining:

(i) environmental conditions which are expected or typical of an attached item (100) which is in an extant/normal state (503.1/503.3); and/or . . .

(ii) environmental conditions which are expected or typical of an attached item (100) which is in a displaced/anomalous state (503.0/503.2).

In an embodiment, the expected environmental conditions module (482) receives usage expectations (600) for expected environmental conditions for an item (100). In an alternative embodiment, the expected environmental conditions module (482) may also implement some elements of BIRD navigation (1000). For example, during a training or training session, the expected environmental conditions module (482) may use reporting from the real time monitoring module (486) and conditions analysis modules (490) (both discussed below) to establish appropriate usage expectations (600) for an item (100), or to modify usage expectation (600) previously provided by an authorized user (AU).

Usage Expectation Parsing, Filtering, Prioritization and Adaptation:

In addition to receiving and/or establishing the usage expectations (600), the expected environmental conditions module (482) may perform additional data processing as well. Such processing may include, for example and without limitation:

- parsing the usage expectations (600) to translate the usage expectations form as data, logical expressions, or other mathematical forms into additional or alternative data forms/structures suitable for further processing by other modules described herein;
- parsing the usage expectations (600) to extract specific data values, ranges, limits, or other usage parameters;
- identification or prioritization of particular data elements within the usage expectations (600);
- filtering of the usage expectations (600), resulting in only prioritized or otherwise selected usage parameters being forward to other modules.

The details of such processing/parsing, if any, by the expected environmental conditions module (482) may vary in different embodiments of the present system and method, and may depend in particular on highly specific coding implementations.

Current Expected Usage (CEU) (483): In particular, and in an embodiment, the expected environmental conditions module (482) may extract, from the usage expectations (600), a subset of data or data structures referred to as current expected usage (CEU) (483). While usage expectations (600) may provide extensive data pertaining to expected sensor data at various times and/or in various places, current expected usage (483) may include only data pertaining to expected sensor readings for the current time (104.T) and/or the current location (104.L). To extract the current expected usage (483) may also rely on time/date data (208.D) from the clock calendar (208), as well as data from various sensors (210) such as the location sensor (201L).

In an alternative embodiment, any determination of the current expected usage (483) may be performed by the conditions analysis module (490) or by the comparison and assessment module (492), both discussed immediately below. In an alternative embodiment, any determination of current expected usage (483) may be distributed over several modules.

Real-Time Monitoring Module

The real time monitoring module (486) receives real-time sensor data (700.R) from the sensors (210), and also current expected usage (483) from the expected environmental conditions module (482). Current expected usage (483) may be employed by the real time monitoring module (486) for purposes of filtering and consolidating sensor data (700). The real time monitoring module (486) also passes current sensor data (700.R) to a data storage and management module (487), which stores the data in an historical and environmental data log (488). An exemplary historical and environmental data log (488) is discussed further below in conjunction with FIG. 7B. As can be seen, the real time monitoring module (486) implements steps 445 and 450 of method 430.

Conditions Analysis Module

A conditions analysis module (490) implements step 455 of method 430. The conditions analysis module (490) receives current sensor data (700.R) and historical sensor data (700.H), and also the current expected usage (483). The conditions analysis module (490) analyzes the received data (700.R, 700.H) in view of the data requirements for the usage expectations (600) and the current expected conditions (483), and processes the received data (700) to generate processed sensor data (700.P). Sec method 455[Meth] of FIG. 8A for further discussion of such sensor data processing.

The conditions analysis module (490) passes usage data (700.U)—which includes the current and historical sensor data (700) and also analyzed sensor data (700.P)—back to the expected environmental conditions module (482), which may use the data to update or validate usage expectations (600). The conditions analysis module (490) also the usage data (700.U) to a comparison and assessment module (492).

Comparison and Assessment Module

The comparison and assessment module (492), in addition to receiving the usage data (700.U), also receives the usage expectations (600) from the expected environmental conditions module (482). The comparison and assessment module also receives clock/calendar/time data (208.D). Using its combined inputs, the comparison and assessment module (492) applies BIRD logic (500) to compare the usage data (700.U) against the usage expectations (600) for the item (100), thereby implementing step 460 of method 430. The comparison and assessment module (492) thereby determines if the BIRD (200) and its associated item (100) are most likely in an extant/normal state (503.1/503.3) of usage, or instead most likely in a displaced/anomalous state (503.0/503.2) of usage. In response to these determinations, the comparison and assessment module (492) generates usage state notifications (USN) (493) indicating an extant/normal state (503.1/503.3) or a displaced/anomalous state (503.0/503.2) of usage, and any details (for example, the type of displacement (503.0)) which are determined by BIRD logic (500) based on the sensor readings.

Response Module

A response module (496) receives the usage state notifications (493) from the comparison and assessment module (492). Based on the notifications, the response module (496) generates appropriate signals, alerts or messages (372, 374) which can alert an item owner or other authorized party or system of the state (503) of the BIRDed item (102). As can be seen, the response module (496) implements steps 465, 470, and 475 of method 430.

Reporting Module

The response module (496) may be linked with or include a reporting module (497) which can generate more detailed reports (374) and/or historical reports (374) on the usage of an item (100). The reporting module may also draw upon data from data storage and management module (487). The reporting module may incorporate or support elements of BIRD song (900).

Learning Module

In an embodiment, a BIRD (200) has BIRD Navigation (1000) which implements various algorithms designed to determine, or to assist an authorized user (AU) in determining, appropriate usage expectations (600) for the BIRD (200) and an associated item (100). Several exemplary embodiments of such algorithms are discussed elsewhere in this document; see for example FIGS. 10A-10I, FIGS. 11A-11C, and FIG. 12A and associated discussion, below, as well as other figures throughout this document. A learning module (426) may be coupled with the conditions analysis module (490). The learning module may employ the exemplary algorithms discussed herein, as well as other algorithms, adaptive heuristics, neural network technologies, and/or pattern discernment technologies, to identify trends or usage expectations (600) of the BIRDed-item (102). These recognized trends or usage expectations (600) may then be employed by the conditions analysis module (490) and the comparison & assessment module (492) in order to further refine the recognition of extant/normal (503.1/503.3) and displaced/anomalous (503.0/503.2) usage of an item (100).

Security/Biometrics Module

A security/biometrics module (498) may be employed to implement elements of step 435 of method 430, including identification or recognition of an owner or other authorized user (AU) of the BIRD (200) and its associated item (100). The security/biometrics module (498) may also work in conjunction with the response module (496) to implement appropriate security procedures in the event that the BIRD (200) determines the item (100) may be in a displaced state (503.0) or other anomalous state (503.2).

Additional Processing Modules and BIRD Logic/Algorithms

The above indicated modules are exemplary only. Additional modules or alternative modules, with additional or alternative configurations, additional or alternative modes of data exchange, and with additional or alternative modes of operation, may be employed consistent with the present teachings, system and method as disclosed throughout this document. The overall scope of the processing performed by the BIRD logic modules may be different than, more limited than, and/or broader than the scope described in the exemplary embodiment above.

In particular, the BIRD processing modules (480) may also include additional processing modules, or submodules of the modules illustrated in FIG. 4D, and associated with:

- Displacement predictive logic/algorithms for alerting an item owner or authorized user (AU) that an item (100) which is currently extant/normal (503.1/503.3) is at risk of becoming displaced (503.0) or anomalous (503.2) in the proximate future (see FIGS. 16A-16B and associated discussion, and other discussion throughout this document);
- Container logic/algorithms: For briefcases (100.B), valises (100.LG), carrying bags, backpacks (100.Bkpk), and similar items (100.C), which may also be considered to be container items (1700), storage logic/algorithms for identifying other items (100) stored in the container (1700), and/or if expected stored items (100) for the container (1700) are in fact not stored (see FIGS. 17A-17G and associated discussion, and other discussion throughout this document);
- User risk logic/algorithms for determining that an anomalous state (503.2) of an item (100) may also indicate a state of possible risk, injury, danger, or harm for a person associated with the item (see FIGS. 14G, 14H, XYZW, and associated discussion, and other discussion throughout this document);
- Alternative anomalous states logic/algorithms for determining miscellaneous other anomalous states (503.2) of an item (100) (see FIGS. 18A and 18C and associated discussion, and other discussion throughout this document);
- Displacement probability logic/algorithms for determining a degree or level of possibility, or a probability, that an item is displaced (503.0) (see discussion throughout this document).

It will be understood that the processing modules (480) may include, among other elements, one or more logic modules, one or more memory access modules, one or more arithmetic modules, and one or more advanced mathematical operations modules, not illustrated in FIG. 4D. These logic, memory access, arithmetic, and advanced mathematical operations module(s) may be apart from but in communication with one or more of the modules illustrated in FIG. 4D, or embedded within or included as part of one or more of the modules illustrated in FIG. 4D.

BIRD Logic and Expected Authorized User(s)

In conjunction with discussions of BIRD logic (500) and other teachings, systems, and methods throughout this document, reference is made herein to an expected authorized user (AU) of an item (100). In many cases, an item (100) has a single possible authorized user (AU)—typically the owner of the item or a person granted some kind of institutional authority to use the item for some extended period of time. In such cases, the "expected authorized user" is the same as the sole authorized user (AU).

In other instances, however, an item may have more than one authorized user (AU). For example, there may be shared ownership of the item (100). For some particular item (100), the appropriate usage expectations (600) may indicate that any authorized user (AU) may be allowed to use the item (100) at any time. In this case, the expected authorized user (AU) may be any of several users.

For some other item (100), the appropriate usage expectations (600) may indicate that a first authorized user (AU) should be using the item (100) at certain times, while a second authorized user (AU) is allowed to use the item (100) at other times. In this latter case, the "expected authorized user" is time-dependent (and so typically detection context (123) dependent), and may be the particular authorized user (AU) who is allowed to use the item at a given time (or in a particular detection context (123)).

In an embodiment, a BIRD (200) may be configured to allow for usage of the item by users with limited control rights over the item, or users who are allowed to use the item only for limited periods of time. As discussed above in conjunction with FIG. 1N, such users may be referred to as "borrowers." At certain times and/or in certain contexts, as indicated by the usage expectations (600), the "expected authorized user" may be a borrower of the item (100).

BIRD Logic and Ambiguous Item States

In conjunction with discussions of BIRD logic (500) and other teachings, systems, and methods throughout this document, reference is made herein to an ambiguous item state (503.9). In an embodiment, an ambiguous item state (503.9) is to be understood in terms of a design choice in the programming of BIRD logic (500).

In an embodiment, BIRD logic (500) may be configured so that, for any and all possible sets of available usage data (700.U), the BIRD (200) will arrive at either:

(i) some specific determination of a single item state (503) (for example, extant (503.1), borrowed (503.1.2), misplaced (503.0.2), misappropriated (503.0.3), lost (503.0.1), stolen (503.0.4), wandering (503.0.5), or some other specific, defined state (503)); or (ii) determinations of two or more possible, well-defined states, with a calculated probability for each state, where the total probabilities may add up to one (1). In this latter case, in an embodiment, the BIRD (200) may base a choice of response action (BIRD song (900)), if any, on the item state (503) assigned the highest probability.

However, in an alternative embodiment, BIRD logic (500) may be configured so that, for some possible sets of available usage data (700.U), the BIRD (200) does not arrive at any definitive or highest probability item state (503). For purposes of the present system and method, an ambiguous item state (503.9) is defined as an item state (503) for which the BIRD (200) does not arrive at any definitive or highest probability item state (503).

For a number of possible item contexts, it may be desirable to configure the BIRD (200) to possibly arrive at an ambiguous item state (503.9) within those contexts.

One likely context for an ambiguous item state (503.9) is when usage data (700.U) indicates that the item (100) is On-Person (138.OnP), and further is on the person of the authorized user (AU); but the item (100), along with the authorized user (AU), is in an out-of-bounds location (140.OoB). For such a context, the designer or programmer of BIRD logic (500) faces a possible puzzle:

- On the one hand, since the item (100) is on the person of the authorized user (AU), the item (100) may simply be viewed as being extant (503.1), even though the item (and user) is out-of-bounds (140.OoB).
- If the item (100) is not only out-of-bounds (140.OoB), but is also AWOL (128) (away from a home base location (140.HB) when the item should be at the home base), BIRD logic (500) may be designed to assess the item as wandering (503.0.5).
- However, since the item (100) and authorized user (AU) are both out-of-bounds (140.OoB)—that is, outside of any expected usage location for the item—the out-of-bounds status (140.OoB) could be inherently construed as wandering (503.0.5).

In summary, while the designer/programmer of the BIRD (200) has any of several options for programming the BIRD logic (500), there is an inherent puzzle in the case where the item (100), along with authorized user (AU), is out-of-bounds (140.OoB). The out-of-bounds locations (140.OoB) are defined or indicated (by the authorized user (AU), via usage expectations (600)) as places where the item (100) and user normally will not be. Intuitively, then, if the item (100) and authorized user (AU) together are out-of-bounds (140.OoB), this is an unexpected usage of the item (100). At the same time, in real life usage, the authorized user (AU) may, or may not, have deliberately chosen to take the BIRDed-item (102) out-of-bounds (140.OoB).

In view of these considerations, the programmer/designer of a specific embodiment of BIRD logic (500) may elect to have such a state (On-Person (138.OnP) of authorized user (AU), but out-of-bounds (140.OoB)) be assessed as ambiguous (503.9). Responsive to such an assessment, the BIRD (200) may be further configured with a variety of responses. In an embodiment, a response is to have the BIRD (200) actively query the user. The query, or queries, may attempt to assess, for example and without limitation:

(i) Whether or not the authorized user (AU) has deliberately taken the BIRD (200) with associated item (100) to a location which is out-of-bounds (140.OoB); and . . .

(ii) whether or not this is an exceptional state of affairs, or whether the usage expectations (600) should be modified to reflect a changed definition of daily life (140.DL) vs. out-of-bounds (140.OoB) locations.

In an embodiment, a possible response to an ambiguous item state (503.9) is to have the BIRD (200) send an appropriate signal or message to a Lost/Anomalous Reporting Center (355). Other responses may be envisioned as well.

The above-provided example of an ambiguous item state (503.9) is exemplary only. In various embodiments, other item states (503) may be construed by BIRD logic (500) as being ambiguous (503.9). In an embodiment, user-configuration options for the BIRD (200) may enable an authorized user (AU) to configure the BIRD (200) regarding which types of item usages or contexts may be regarded as ambiguous states (503.9). In an embodiment, various probabilities may be assigned both to specific item states (503), and to a further possibility that the item state is ambiguous (503.9). If the probability of an ambiguous state (503.9) crosses a designated threshold, or if the probability of the ambiguous state (503.9) is higher than the probability of any other specific item state (503), then the item state is construed as ambiguous (503.9).

FIG. 5A

First Exemplary BIRD Logic Method

As already discussed above (see for example FIGS. 4A-4D), BIRD logic (500) includes methods and algorithms for comparing item usage data (700.U) against usage expectations (600) in order to self-assess if the BIRDed-item (102) is in a state of being extant (503.1) (or normal (503.3)) versus being a state of being displaced (503.0) (lost, misplaced, misappropriated, stolen, or wandering) or some other anomalous state (503.2).

Item Statuses

In an embodiment, implementations of BIRD logic (500) may entail comparing specific elements or subsets of item usage data (700.U) against corresponding elements or subsets of the usage expectations (600). The outcome of such comparisons yields one or more item statuses (501). An item status (501) may be in any of several forms, including for example and without limitation:

- a "yes" or "no" outcome;
- a choice among two other status outcomes (for example, AWOL (128) or not AWOL (128), or on-person (138.OnP) or off-person (138.OffP));
- weighted probabilities of two or more status outcomes;
- a choice among multiple status outcomes (for example, home-base (140.HB), daily-life (140.DL) excluding home base, or out-of-bounds (140.OoB); or "sound intensity in expected range," "sound intensity above expected range," or "sound intensity below expected range"); or
- specific numeric value or ranges of values indicative of probabilities, likelihoods, correlations, degrees of pattern matching, or other factors with continuous ranges or valuations.

Other outcomes or values for an item status (501) may be envisioned as well.

Based on results of a single item status (501), or based on multiple item statuses (501), BIRD logic (500) may then self-assess an overall state (503) of the BIRDed-item (102).

An item (100) can have multiple item statuses (501). Each status (501) is associated with either some particular kind of data (700) which may be sensed by an environmental sensor (210), or by a relation among several kinds of data (700) which can be sensed by one or more environmental sensors (210).

More generally an item status (501) indicates some aspect of the relationship between the item (100) and its environment (104). In an embodiment, the particular value (501.V) of an item status (501) at any given moment in time (104.T) may be determined by a comparison between appropriate usage data (700.U) and the corresponding elements of usage expectations (600). In an embodiment, the determination of item statuses (501) is an element of step 460 of exemplary method 430 (sec FIG. 4C, above).

Exemplary Item Statuses

As elements of method 500.1[Meth], FIG. 5A illustrates several exemplary types (501.T) of item statuses (501). Each exemplary item status type (501.T) is illustrated with a specific, exemplary set of possible item status values (501.V). In FIG. 5A, a particular value, the outcome of a comparison (as discussed below), is underlined.

Location:

(See FIG. 1H, above, for a discussion of location schemas (140).) A first exemplary type of item status (501.T) is location status (141), which is based on actual item location (104.L) compared against item expected location(s) (144.L). For example, the current location (104.L) may be compared against the item's allowed home-base locations (140.HB), daily life locations (140.DL), and zones (140.Z) which are defined in the usage expectations (600.Loc) (see FIG. 11, above, and FIG. 6A, below).

The result of the comparison is a specific value (501.V) for the location-related item status (141), indicating if the BIRDed-item (101) is in a home base location (140.HB), a daily life location (140.DL), a zone (140.Z) within a home base (140.HB) or daily life (140.DL) location, or in an out-of-bounds location (140.OoB). (It will be understood that, in an embodiment, out-of-bounds locations (140.OoB) are determined as any locations that are not home-base or daily-life locations (140.HB/140.DL).)

Authorized User or Unauthorized Users:

A second exemplary item status type (501.T) is a determination (131) as to whether the current user of the item (100), or the most recent user of the item, is an authorized user (AU). Such an authorized user status determination (131) may typically require employing multiple aspects of usage data (700.U) to arrive at iteMetrics (154) which are part of the overall usage data (700.U). (See FIG. 1J, above, for a discussion of iteMetrics (154).) The current or most recent iteMetrics (154) are then compared against the iteMetrics (154) stored in the usage expectations (600). (See FIG. 6B, below.) The result of the comparison is a specific value (501.V) for the authorized-user item status (131), indicating if the current user of the BIRDed-item (102) (or the most recent user) is an authorized user (AU).

AWOL Status:

A third exemplary item status type (501.T) is a determination (128) of whether or not the BIRDed-item (102) is absent without leave (AWOL (128)). This again entails obtaining the current location information (104.L), as well as the current time (104.T), and comparing the data against the AWOL criteria (128) in the usage expectations (600). (See again FIG. 6A; note that AWOL criteria (128) may be defined explicitly or implicitly in the usage expectations (600).) Based on the comparison, a value (501.V) is obtained for the AWOL status (128) as either "Yes" (the item is AWOL (128)) or "No" (the item is not AWOL (128)).

On-Person/Off-Person Status:

A fourth exemplary item status type (501.T) is a determination (501.OP) of whether the BIRDed-item (102) is on-person (138.OnP) or off-person (138.OffP). This determination entails comparing various usage data (700.U), which in an embodiment may be motion data, against the BIRD's criteria for whether an item (100) is on-person (138.OnP) or off-person (138.OffP). Based on the comparison, a value (501.V) is arrived at for the on-person/off-person status (138). (Note that, in an embodiment, appropriate on-person/off-person criteria (138) may be an element of BIRD logic (500), rather than an element of usage expectations (600). In an alternative embodiment, such on-person/off-person criteria (138) may be an element of usage expectations (600). In an alternative embodiment, aspects of on-person/off-person criteria (138) may be distributed between BIRD logic (500) and usage expectations (600).)

Combined Personal Motion Status and On-Person/Off-Person Status:

In an embodiment, and as noted above, personal motion status (139) and on-person/off-person status (138) may be combined into a single, integrated personal motion status (139). In such an embodiment, a personal motion status (139) of user-movement (139.UM) is also indicative of a status of on-person (138.OnP). Similarly, in such an embodiment, a personal motion status of either stationary (139.StaT) or stagnant (139.StG) are both indicative of a status of off-person (138.OffP).

Other Item Statuses:

Similar considerations apply to determining values (501.V) for other types (501.T) of item statuses (501), such as determining whether or not an item is in transit or not in transit (In-Transit status (511)); or whether an item's temperature is in bounds of a specified range, or too high, or too low (Temperature status (515)).

The item statuses (501) shown in FIG. 5A are exemplary only, and should in no way be construed as limiting. Numerous other item statuses (501) may be envisioned, including for example and without limitation those related to: velocity values and ranges; acceleration values and ranges; torque values and ranges; light intensity values and ranges; sound intensity values and ranges; humidity or moisture values and ranges; indoors versus outdoors; in-hand or not-in-hand; in vehicle or not in vehicle; in a container item or not in a container item; in-storage vs. in-use; on vs. off (for electrical items); values or ranges of values for various internal processing statuses (for active items (100.Act)); values or ranges of values for biometric determinations; results of item usage pattern comparisons; results of item usage correlation comparisons; and results of other comparisons as well.

It will be noted that a single type of sensor data (700) may be employed in the determination of multiple types (501.T) of item statuses (501). For example, an item's location (104.L) may be employed both in the determination of its location status (141) (as currently being in a home base (140.HB), daily life (140.DL), or out-of-bounds (140.OoB) location (140.HB/140.DL/140.OoB): and also in whether or not the item (100) is AWOL (128) (though the latter determination also requires comparison of time elements as well). Similarly, motion measurements may be employed in determination of whether or not the item (100) is on-person/off-person (138), and whether or not the item (100) is in transit (511) or not.

Further, a single form of sensor data (700), such as light intensity data, temperature, or sound intensity data, may be employed in multiple ways—for example in the form of single value comparisons to determine if the value is in a specified range, or in the form of waveform data to determine if a pattern of values over time has been consistent with previously established patterns contained in the usage expectations (600).

FIG. 5A also lists exemplary item states (503) (such as extant (503.1), normal (503.3), displaced (503.0) or anomalous (503.2)) and specific types of extant states (503.1) and displaced states (503.0). Detailed descriptions of these states (503) are discussed at length above in this document and their definitions will not be repeated here.

Exemplary Method Steps

FIG. 5A presents a flow chart of a first exemplary method (500.1[Meth]) of BIRD logic (500).

The method 500.1[Meth] begins with step 506. In step 506 the method identifies the applicable types (501.T) of item statuses (501). These may be determined for example, based on the item statuses (501) employed in a table (500.T) of BIRD logic. Exemplary BIRD logic tables (500.T) are presented in FIGS. 5B, 5C, 5F and 5H. Applicable types (501.T) of item statuses (501) may also be determined in other ways, for example from the usage expectations (600) or via a listing of status types (501.T) associated in memory with computer code for BIRD logic algorithms.

From step 506 the method 500.1[Meth] proceeds to step 508. In step 508 a first item status type (501.T) is selected for evaluation.

In step 510 appropriate usage data (700.U) for the current item status type (501.T) is obtained. The data (700.U) may be obtained, for example, from the Historical Environmental Data Log (488) (see FIG. 4D, above).

In step 512, the usage data (700.U) obtained in step 510 is compared against the matching usage expectations (600) or other appropriate comparison criteria for the current item status type (501.T). For example, for location status (141), the BIRDed-item's current location (104.L) is compared against definitions of daily life, home base, and zone locations (140.HB, 140.DL, 140.Z) (indicated either in the usage expectations (600) and/or the detection context (123) data).

For another example, for authorized user status determination (131), the iteMetrics (154) obtained from the usage data (700.U) are compared against the iteMetrics (154) for the authorized user (AU) stored in the usage expectations (600). Similar comparisons may apply to determining AWOL status (128), on-person/off-person status (138), and other statuses (501) which may be applicable.

Based on the comparison of step 512, a status value (501.V) is determined for the current type (501.T) of item status. For example—and as indicated by underlined values (501.V) in FIG. 5A—the current location (104.L) for the BIRDed-item (102) may be a home base location (140.HB), and/or the current user may not be an authorized user (AU), or the item (100) may be AWOL (128), and so forth.

In step 516 it is determined whether all item status types (501.T) which are currently applicable have been processed. If all types (501.T) have not yet been processed the method returns to step 508 for the selection of another type (501.T) of item status for analysis. If all types (501.T) have been processed the method continues to step 518.

In step 518, the previously identified values (501.V) for the item statuses (501) are applied in order to assess the current item state (503). The assessment may be accomplished, for example, by comparing the determined values (501.V) for the item statuses (501) against a BIRD logic table (500.T). Exemplary BIRD logic tables (500.T) are presented in FIGS. 5B, 5C, 5F, and 5H below. Other means and methods may be employed as well.

The method 500.1[Meth] may repeat on a substantially continuous basis, or at defined time intervals, to continually update both the item statuses (501) and the resulting, self-assessed item states (503).

FIGS. 5B and 5C

Exemplary BIRD Logic Table

BIRD logic (500) provides criteria and/or methods to execute steps 455 and 460 of exemplary method 430 (FIG. 4C, above). Specifically, BIRD logic (500) provides criteria and/or methods to compare usage data (700.U) against usage expectations (600) to determine if an item (100) is on the one hand extant (503.1) or borrowed (503.1.2), or otherwise in a normal state (503.3); or is on the other hand displaced (503.0) (lost, misplaced, stolen, misappropriated, wandering) or otherwise in an anomalous state (503.2).

FIGS. 5B and 5C presents a table (500.T) of exemplary BIRD logic (500). Each version of the exemplary BIRD logic table (500.T) has thirty-six clusters (505) of item status/state data. Each status/state cluster (505) in the tables lists:

- a set of sensed or derived item environmental statuses (501) (location category (140); combined on-person/off-person status (138) and personal motion status (139); AWOL status (128); and combined iteMetrics (154) and authorized user status (131)), which all may be potentially obtained from readings from BIRD sensors (210), along with . . .
- an associated, self-assessed item state (503) (extant (503.1), misplaced (503.0.2), lost (503.0.1), wandering (503.0.5), misappropriated (503.0.3), or stolen (503.0.4), or possibly ambiguous (503.9)).

In an embodiment, the association between a set of sensed environmental statuses (501) and a consequent, resulting self-assessment of item state (503) constitutes an aspect of BIRD logic (500).

Table 500.T

Both FIG. 5B and FIG. 5C present the same thirty-six status/state clusters (505)—in other words, the same exemplary, substantive embodiment of BIRD logic (500) but with the clusters ordered differently for purposes of reader comprehension:

- FIG. 5B presents version 1 (v1) of the table (500.T), with different clusters (505) grouped according to item statuses (501): first according to common location categories (140) (home base, daily life, out-of-bounds), and then progressively grouped according to common motion states (138, 139), AWOL status (128), and iteMetrics (154) and authorized user status (131).
- FIG. 5C presents version 2 (v2) of the table (500.T), with different clusters being grouped according to assessed item state (503) (extant (503.1), misplaced (503.0.2), lost (503.0.1), etc.).

The exemplary BIRD logic table (500.T) is presented in these two different forms (v1 and v2) as an aid to understanding only; the exemplary BIRD logic (500) is identical in both versions of the table. Both versions of the table (v1 and v2) are referred to below simply as "the table (500.T)." Corresponding status/state clusters (505) are labeled with the same cluster number (1, 2, 3 . . . 36) in each table (v1 and v2).

The table (500.T) lists exemplary possible item states (503) (extant (503.1), lost (503.0.1), misplaced (503.0.2), wandering (503.0.5), stolen (503.0.4), etc.) which may be self-assessed by an exemplary BIRDed-item (102). At any given time, the BIRDed-item (102) may self-assess a variety of environmental statuses (501) or attributes associated with the item (100), as either sensor data (700) detected directly by the BIRD's sensors (210) or as determined by processing sensor data (700) to obtain processed data (700.P). The final determination of an extant/normal (503.1/503.3) or displaced/anomalous item state (503.0/503.2) will typically entail comparing the usage data (700.U), which includes the status determinations (501), against the usage expectations (600).

For example, the BIRD (200) determines not only the item's current location (which can typically be determined from sensor data (700)); but also assesses whether the item is in a home base location (140.HB), a daily life location (140.DL), or is out-of-bounds (140.OoB). The latter determination requires parameters established via the usage expectations (600) which define the home base (140.HB), daily life (140.DL), and out-of-bounds (140.OoB) locations. Similar considerations apply to assessing whether an item is merely stationary (139.Stat) or is stagnant (139.StG), and to assessing iteMetrics (154); these determinations require comparing the item's usage data (700.U) against parameters found with the usage expectations (600).

The item statuses (501) listed in the table (500.T) are exemplary only, and should not be construed as limiting in any way. For a given item (100), at a given time, the associated BIRD (200) may determine:

Location status: Whether the item is in a home base (HB) location (140.HB), a daily life (DL) location (140.DL), or whether the item is out-of-bounds (140.OoB) (OOB) (140.OoB). See FIG. 1H and associated discussion, above, for more information on these location terms. Note that zones (140.Z), also discussed with FIG. 1H, are omitted from the table. In some exemplary embodiments, zones (140.Z) may not be a factor in BIRD logic (500). However, the choice to omit zones (140.Z) from the table (500.T) was principally for brevity in discussing an exemplary embodiment. In alternative embodiments, zones (140.Z) may be a factor as well in BIRD logic (500); that is, a determination of which zone (140.Z) an item (100) is in, or a determination of which of several categories of zones an item is in, may be used by BIRD logic (500) as one element to distinguish different item states (503) (lost (503.0.1), misplaced (503.0.2), stolen (503.0.4), etc.).

Combined Personal Motion and On-Person/Off-Person Status: In an embodiment, and as noted above, personal motion status (139) and on-person/off-person status (138) may be combined into a single, integrated personal motion status (139). In such an embodiment, a personal motion status (139) of user-movement (139.UM) is also indicative of a status of OnPerson (138.OnP). Similarly, in such an embodiment, a personal motion status (139) of either stationary (139.StaT) or stagnant (139.StG) are both indicative of a status of off-person (138.OffP). These statuses are discussed in detail above in conjunction with FIG. 1C and other figures throughout this document.

AWOL: Absent-Without-Leave (AWOL) condition (128) for an item is discussed in detail above in conjunction with FIGS. 1B, 1H, 5A, and other figures throughout this document. As a brief reminder, an item (100) may be considered AWOL (128) even if it is within a generally allowed location (in an embodiment, a home base location (140.HB)), but the item (100) is not within a particular expected location (144.L) during a time interval (105) when it is expected to be within the particular location.

For example, for an authorized user (AU) working a conventional 9-to-5 work day, an item (100) may be AWOL (128) if it is at the user's home between the hours of 0900 and 1700, when it should be with the user at work. Similarly, the item (100) may be AWOL (128) if it is at the user's office when it should be home, with the user, in the evening.

IteMetrics: As discussed above in conjunction with FIG. 1J, iteMetrics (154) are data derived by the BIRD (200) from raw sensor data (700), and used by the BIRD (200) to assess whether the usage of the item (100) is consistent with item usage as expected for the current authorized user (AU). In brief, iteMetrics (154) determine whether the person who is using an item (100) is an authorized user (AU), or is an unauthorized user (UU).

In an embodiment, IteMetrics (154) may in turn be divided into morphIteMetrics (156) which may be determined on a relatively short-term basis (for example, seconds, a minute, or a few minutes); and psyIteMetrics (158) which may require longer-term analysis (a few minutes to a few hours). Thus, determinations based only on morphIteMetrics (156) may be quicker but less reliable, while determinations based on both morphIteMetrics (156) and psyIteMetrics (158) may take longer but be more reliable.

For simplicity and brevity of exposition, the exemplary BIRD logic (500) shown in FIGS. 5B-5C does not distinguish between general iteMetrics (154) vs. morphIteMetrics (156) and/or psyIteMetrics (158). However, persons skilled in the relevant arts will appreciate that, in an alternative embodiment, the logic in the Table 500.T may be refined based on such distinctions.

Identifying the Most Recent User when the Item is Off-Person:

If an item (100) is on-person (138.OnP), the BIRD (200) may attempt to assess the item as being carried by an authorized user (AU), or not being carried by an authorized user (AU), based at least on the item's morphIteMetrics (156); psyIteMetrics (158) may be taken into account at well. If the item (100) is off-person (138.OffP) then present morphIteMetrics (156) (which, in an embodiment, depend on-personal movement) may not be available.

However, in an embodiment, the BIRD (200) may identify, through iteMetrics (154), that an item (100) is or is not associated with an authorized user (AU), even when the item is off-person (138.OffP). In an embodiment, the BIRD (200) makes this determination by associating the item with the most recent iteMetrics (154) when the item was on-person (138.OnP).

In an alternative embodiment, the BIRD may make this determination based on a combination of: (i) the most recent morphIteMetrics (154) when the item was on-person (138.OnP), and (ii) the relatively recent psyIteMetrics (156), which may span both the current off-person time period and a preceding on-person time period.

Assessed Item State as a Consequence of Combinations of Item Status Elements

In an embodiment, a BIRDed-item (102) may use BIRD logic (500) to self-assess its state (503) as being extant (503.1) (including borrowed (503.1.2)), lost (503.0.1), misplaced (503.0.2), misappropriated (503.0.3), stolen (503.0.4), or wandering (503.0.5) based on a combination of item statuses (501).

The logic table (500.T) lists thirty-six possible combinations of assessed item states (503) with respect to the exemplary item statuses (501) listed above. These thirty-six combinations are a consequence of possible combinations of:

three item location statuses, home base (HB) (140.HB), daily life (DL) (140.DL), or out-of-bounds (140.OoB) (OOB) (140.OoB) (where in this context, "daily life" (140.DL) means the item is not within any home base (140.HB) location that is geographically contained within the daily life locations (140.DL));

three combined on-person/off-person statuses (138) and personal motion statuses (139) (in user movement, on a person (139.UM, 138.OnP); stationary, off-person (139.StaT, 138.OffP); or stagnant, off-person for longer than allowed) (139.StG, 138.OffP));

two AWOL statuses (128) (AWOL (yes) or not AWOL (no)); and two iteMetric-based statuses (154) indicative of authorized user status (131) ((the item is with an authorized user (AU), or the item is with an unauthorized user (UU)).

In an embodiment, each of the thirty-six distinct combinations results in BIRD logic (500) providing one of:

a specific assessed item state (503), such as extant (503.1) (which may include borrowed (503.1.2)), wandering (503.0.5), misplaced (503.0.2), misappropriated (503.0.3), stolen (503.0.4) or lost (503.0.1):

an assessment of more than one possible item state (503), such as misappropriated (503.0.3) or stolen (503.0.4); or an assessment of a state (503) which the BIRD (200) may not be able to fully resolve, and which may prompt the BIRD (200) to alert the user to an ambiguous state (503.9), and/or to query the user for more information (designated in table 500.T as Query User).

Flagging an Item:

When the BIRD (200) assesses an extant/displaced item state (503), this document refers to flagging the item as extant (503.1), lost (503.0.1), misplaced (503.0.2), stolen (503.0.4), etc. These possible assessments by BIRD logic (500) are discussed in further detail immediately below.

Cluster ID numbers (1, 2, 3, . . . 35, 36):

It will be noted that in the table (500.T) of exemplary BIRD logic (500), the thirty-six distinct clusters of logic combinations are identified or labeled by a number. These cluster numbers are placed adjacent to the location field for convenience only, and do not refer to thirty-six different locations; rather, each bracketed number refers to the cluster (505) as a whole, that is, to the combination of four item statuses (501) along with the self-assessed item state (503) associated with the cluster.

Extant States

Four of the thirty-six states result in an assessment that the item (100) is extant (503.1), meaning generally that the item is located where it is expected to be (either with the authorized user (AU) or in storage), and/or is in use as expected to be, when it is expected to be in such location and/or use, and also that the item (100) is associated with an authorized user (AU).

In an embodiment, the determination by BIRD logic (500) of an extant item state (503.1) may be understood as a comparison between the item's usage expectations (600) and the item's usage data (700.U). The usage expectations (600) define the expected locations (144.L) associated with the item (100), the expected iteMetrics (154) associated with the item, and the parameters for AWOL status (128) and for stagnancy (139.StG) for the item. The usage data (700.U) provides both the raw and processed environmental data which are compared against the usage expectations (600). The four extant states (503.1) in the table (500.T) of exemplary BIRD logic (500) are 1, 5, 13, and 17. In these states, the BIRDed item (102) self-assesses:

appropriate location: the item (100) is within a location it is generally expected to be in, which in an embodiment may be either a home base (140.HB) or daily life (140.DL) location;

on-person or off-person, but not stagnant: the item (100) is either on-person (138.OnP) or off-person (138.OffP), but the item is not stagnant (139.StG);

not AWOL: the item (100) is not AWOL (128); and item associated with an authorized user: iteMetrics (154) indicate that the item (100) either is On-Person (138.OnP) of an authorized user (AU); or if the item is stationary (139.StaT), that prior to being stationary (139.Stat) the item was most recently On-Person (138.OnP) of an authorized user (AU). (In some instances, if the BIRD (200) has recently been initialized but left lying in place (on a table, for example), the appropriate "iteMetric readings" may actually be biometric readings or login data for the user who initialized or powered-on the BIRD (200)).

In an alternative embodiment, a self-assessment by the BIRDed-item (102) that the item is extant (503.1) may also entail determining that the BIRDed-item (102) is in an appropriate zone (140.Z) at an appropriate time.

In an alternative embodiment, a self-assessment by the BIRDed-item (102) that the item is extant (503.1) may also entail determining, based on appropriate data from sensors (210), that the item (100) is being used in an appropriate way or manner.

Borrowed Item:

In an embodiment, the self-assessment that the item (100) is extant (503.1) may include a determination that the current authorized user (AU) is a borrower of the item, so that the item is borrowed (503.1.2).

Misplaced States

Three of the thirty-six states result in an assessment that the item (100) is misplaced (503.0.2), meaning generally that the item is located in a home base location (140.HB), but that possibly the item has been left lying around where it should not be, or when it should not be, within the home base (140.HB). (In this event, possibly the authorized user (AU) has either forgotten the item (100), or cannot recall where he or she last left the item (100).)

In an embodiment, the determination by BIRD logic (500) of a misplaced item state (503.0.2) may be understood as a comparison between the usage expectations (600) and the current usage data (700.U). The three misplaced states (503.0.2) in the table (500.T) are 7, 9, and 11. In these states, the BIRDed-item (102) self-assesses that all of the following statuses (501) apply:

home base location: the item (100) is within a home base location (140.HB), that is, someplace like the home or office, or other location where the item might be routinely used and/or stored.

off-person: the item (100) is off-person (138.OffP) of any individual, which in an embodiment is determined by the BIRD (200) by the fact that the item is either stationary (139.Stat) or stagnant (139.StG).

AWOL and/or stagnant: the item (100), if simply stationary (139.Stat), is AWOL (128), meaning it is at the wrong home base (140.HB) location for the given time/date. For example, the item may be lying about at home when it should be at the office, or the item may be lying in the work place when it should be at home. Alternatively or additionally, the item (100) may not simply be stationary (139.Stat) but rather is stagnant (139.StG) (meaning that even if the item is in the correct home base location (140.HB) for the time/date, the item (100) has been lying in one place, stationary (139.Stat), for longer than the stationary limit time (133)).

item associated with an authorized user: iteMetrics (154) indicate that, prior to being stationary (139.Stat), the item was most recently on-person (138.OnP) of an authorized user (AU). (Or, if the BIRD (200) has recently been initialized but left lying in place (on a table, for example), the functional equivalent of "iteMetric readings" may actually be biometric readings (152) or login data (152) for an authorized user (AU) who initialized or powered-on the BIRD (200)).

In brief, the BIRDed-item (102) self-assesses as being misplaced because it is at a home base location (140.HB) and is associated with an authorized user (AU), but the item is either at the home base (and so is AWOL (128)) at the wrong time and/or is lying about longer than it should be.

In an alternative embodiment, the BIRDed-item (102), in self-assessing its misplaced state (503.0.2), may either ignore or place a lower weighting on the iteMetrics (154) and/or the identity of the most recent user. For example, it is possible that an item (100) becomes misplaced in a home or office because someone other than the authorized user (AU) has picked up the item (100) and moved it to (and left the item in) a zone (140.Z) other than the zone expected by the authorized user (AU).

Lost States

Four of the thirty-six states result in a self-assessment by the BIRDed-item (102) that it is lost (503.0.1), meaning generally that the item is located outside of a home base location (140.HB), and that the item is off-person (138.OffP) of—and is not under the control of—an authorized user (AU); and further, that the item is likely not in the deliberate possession of, or under the knowing control of, any person.

In an embodiment, the determination by BIRD logic (500) of a lost item state (503.0.1) may be understood as a comparison between the usage expectations (600) and the current usage data (700.U). The four lost states (503.0.1) in the table (500.T) are 21, 23, 33 and 35. In these states, the BIRDed-item (102) self-assesses that all of the following item statuses (501) apply:

- not in a home base location: The item (100) is either in a daily life location (140.DL) which is not a home base location (140.HB) (so the item is typically outside of the home, workplace, or other place of frequent item use and storage), or the item is in an out-of-bounds location (140.OoB);
- not on person: the item (100) is off-person (138.OffP);
- stagnant: the item is stagnant (139.StG) (continuously off-person (138.OffP) for longer than the stationary limit (133)); and
- item associated with an authorized user (AU): iteMetrics (154) indicate that, prior to being stagnant (139.StG), the item was most recently on-person (138.OnP) of an authorized user (AU). (Or, if the BIRD (200) has recently been initialized but left lying in place (on a table, for example), the appropriate "iteMetric readings" may actually be biometric readings (152) or login data (152) for an authorized user (AU) who initialized or powered-on the BIRD (200)).

In brief, the BIRDed-item (102) self-assesses that it is lost (103.0.1) if the item (100) is outside of a home base location (140.HB), was last associated with an authorized user (AU), but is stagnant (139.StG).

It will be noted that in two of these item state cases (numbers 23 and 35), the item (100) is AWOL (128) as well. In an embodiment, these cases may never actually be flagged or identified by the BIRD (200), because prior to such identification the BIRD (200) will flag the item (100) as either wandering (503.0.5) or wandering/lost (503.0.5/503.0.1), in accordance with state cases 19 and 31. In an alternative embodiment, either the BIRD (200) does not signal the user in state cases 19 or 31; or the BIRD (200) does signal the user, but the user overrides the alert or warning, and the BIRD (200) again signals the user for state cases 23 or 35, as applicable.

Wandering States

In general terms, an item (100) is wandering (503.0.5) if that the item is on the person of, or under the control of, an authorized user (AU); but the authorized user (AU) has inadvertently carried the item to a location where he or she does not actually intend to take it. Or, at the very least, for a wandering item, the authorized user (AU) has carried the item (100) to a location where the user normally does not intend to take it. In an embodiment, upon being alerted by the BIRD (200) of the item's wandering state (503.0.5), the authorized user (AU) may have the option of cancelling the alert, effectively telling the BIRD (200) that a change of plans is in effect. In an embodiment, the cancellation response by the authorized user (AU) may only be effective for a limited period of time or on a single occasion. In an alternative embodiment, the BIRD (200) may employ the cancellation as part of a learning process to redefine the item's usage expectations (600).

In table 500.T, four of the thirty-six states (503) result in an assessment that the item (100) is wandering (503.0.5). In an embodiment, the assessment by BIRD logic (500) of a wandering item state (503.0.5) may be understood as a comparison between the usage expectations (600) and the current usage data (700.U). The four wandering states (503.0.5) in the table (500.T) are 3, 15, 27 and 31. In three of these states—3, 15, and 27—the BIRDed-item (102) self-assesses that all of the following statuses (501) apply:

- any location: the item (100) may be in any of a home base location (140.HB), a daily life location (140.DL) other than a home base location (140.HB), or the item is in an out-of-bounds location (140.OoB);
- on-person: the item (100) is on-person (138.OnP), which in an embodiment may be indicated by motions indicative of user-movement (139.UM);
- authorized user: the user is an authorized user (AU), as for example determined by iteMetrics (154); and
- AWOL: the item (100) is AWOL (128), meaning the item is not where it is expected to be at the given time/date.

In brief, the item (100) is being carried about by an authorized user (AU), but the item (100) is being carried in a place where the item (100) should not be at that time.

In the fourth wandering state (503.0.5), state 31, the item (100) is out-of-bounds (140.OoB) and AWOL (128), and the item is also off-Person (138.OffP) (and so stationary (139.StaT)), but not yet stagnant (139.StG); further, the item (100) was most recently carried about by the authorized user (AU).

In the exemplary BIRD logic (500) of the table (500.T), it is assumed that these item statuses (501) of cluster 31 indicate the user has recently carried the item to the out-of-bounds location (140.OoB), and so the item is wandering (503.0.5). It will be noted, however, that state 31 may never actually be flagged by the BIRD (200), since normally state 27 is likely to be flagged first. That is, in an embodiment, any time the authorized user (AU) carries the item (100) to an out-of-bounds location (140.OoB), the BIRD (200) may alert the user that the item is wandering (503.0.5).

Misappropriated States

Six of the thirty-six states result in an assessment that the item (100) is misappropriated (503.0.3), meaning generally that the item (100) is in possession or under control of an unauthorized user (UU), but the unauthorized user (UU) is not a thief; for example, the user may be a family member or colleague who picked up the item (100) (and has retained it for some time) by accident (perhaps mistaking it for a similar item which does belong to them).

In an embodiment, the determination by BIRD logic (500) of a misappropriated item state (503.0.3) may be understood as a comparison between the usage expectations (600) and the current usage data (700.U). The six misappropriated states (503.0.3) in the table (500.T) are 6, 8, 10, 12, 22 and 24. In these states, the BIRDed item (102) self-assesses that all of the following statuses (501) apply:

- home-base/off-person or daily-life/stagnant: The item (100) is either in a home base location (140.HB), and is stationary (139.Stat) or stagnant (139.StG) in that location; or the item is in a daily life location (140.DL) and is stagnant (139.StG);

unauthorized users: IteMetrics (154) indicate that, prior to being stationary (139.Stat) or stagnant (139.StG), the item was most recently on-person (138.OnP) of an unauthorized user (UU).

In brief, the item (100) is at a home base (140.HB) or daily life (140.DL) location, was recently with an unauthorized user (UU), and is not moving. Under these circumstances, the exemplary BIRD logic (500) of the table (500.T) assumes that the item is presumed not stolen (503.0.4), because it seems unlikely that a thief would leave the item lying around in a home base location (140.HB). (Rather, a thief would keep moving, with the item (100), until the thief was well clear of the home base location (140.HB)). Similarly, the exemplary BIRD logic (500) assumes that the thief would not leaving the item (100) lying around for an extended time (stagnant (139.StG)) in a location which may be close to the home base, that is, a daily life location (140.DL).

In an alternative embodiment, the statuses (501) of clusters 22 and 24—the item (100) is stagnant (139.StG) in a daily life location (140.DL) (other than a home base location (140.HB))—may be construed, at least initially, as ambiguous (503.9) with respect to whether the item is misappropriated (503.0.3) or stolen (503.0.4).

In an embodiment, these misappropriated clusters (6, 8, 10, 12, 22, and 24) may never actually be flagged or identified by the BIRD (200), because prior to such identification the BIRD (200) will first flag the item (100) as either misappropriated (503.0.3) or stolen (503.0.4) as soon as iteMetrics suggest the item (100) is with an unauthorized user (UU).

In an alternative embodiment, the BIRD (200) may first flag the item (100) as possibly misappropriated (503.0.3) or stolen (503.0.4) as soon as an unauthorized user (UU) is detected; however, once the item becomes stationary (139.Stat) or stagnant (139.StG), and depending possibly also on item location (104.L), the BIRD (200) may refine its assessment from misappropriated/stolen (503.0.3/503.0.4) to simply misappropriated (503.0.3).

Misappropriated/Stolen Assessments

In an embodiment, twelve of the thirty-six item status combinations (501) result in an item state assessment (503) that the item (100) is either misappropriated (503.0.3) or stolen (503.0.4); this means, in general terms, that the item (100) is in possession or under control of an unauthorized user (UU), who may either be a thief, or may on the other hand be a person who is not a thief but who picked up the item and retained it by accident.

In an embodiment, the determination by BIRD logic (500) of a misappropriated/stolen item state (503.0.3/503.0.4) may be understood as a comparison between the usage expectations (600) and the current usage data (700.U). The twelve misappropriated/stolen states (503.0.3/503.0.4) in the table (500.T) are 2, 4, 14, 16, 18, 20, 26, 28, 30, 32, 35 and 36. They fall into three categories or sets.

First Set of Misappropriated/Stolen States:

States 2, 4, 14, and 16 constitute a first set of possible misappropriated/stolen states (503.0.3/503.0.4). In this first set of states, the BIRDed-item (102) self-assesses that all of the following statuses (501) apply:

- home base or daily life: the BIRDed-item (102) is in either a home base (140.HB) or daily life (140.DL) location;
- on-person: the item (100) is on-person (138.OnP), which in an embodiment is indicated by the item being subject to personal motion (104.M), and results in a personal motion status (139) of user-movement (139.UM);
- unauthorized user: iteMetrics (154) indicate the item is currently on-person (138.OnP) of an unauthorized user (UU).

In sum, the item is on-person (138.OnP) of an unauthorized user (UU). The AWOL status (128) is not relevant to this determination.

Second Set of Misappropriated/Stolen States:

States 18 and 20 constitute a second set of possible misappropriated/stolen states (503.0.3/503.0.4). In this second set of states, the BIRDed-item (102) self-assesses that all of the following statuses (501) apply:

- daily life: the BIRDed-item (102) is in a daily life (140.DL) location which is not a home base location (140.HB);
- off-person: the item (100) is off-Person (138.OffP), which in an embodiment is indicated by the item being stationary (139.Stat), but not yet stagnant (139.StG);
- unauthorized user: iteMetrics (154) indicate that, prior to being stationary (139.Stat), the item was last on the person of an unauthorized user (UU).

In sum, the item (100) is in a daily-life location, but association with an unauthorized user (UU).

Third Set of Misappropriated/Stolen States:

States 26, 28, 30, 32, 34 and 36 constitute a third set of possible misappropriated/stolen states (503.0.3/503.0.4). In this third set of states, the BIRDed-item (102) self-assesses that all of the following statuses (501) apply:

- out-of-bounds (140.OoB): the item (100) is out-of-bounds (140.OoB);
- unauthorized user (UU): the item may be on-person (138.OnP, 139.UM), off person stationary (138.OffP, 139.StaT)), or off-person stagnant (138.OffP, 139.StG); whichever the case, iteMetrics (154) indicate that the item is in possession of an unauthorized user (UU) or, if the item is stationary/stagnant (139.Stat, 139.StG), that prior to being stationary/stagnant (139.Stat, 139.StG) the item was most recently on-person (138.OnP) of an unauthorized user (UU).

In brief, the item (100) is outside of any home base (140.HB) or daily life (140.DL) location, and is with an unauthorized user (UU). Under these circumstances, the exemplary BIRD logic (500) of the table (500.T) self-assess the BIRDed-item (102) as either being misappropriated (503.0.3) or stolen (503.0.4).

Applying MvS Heuristics to Distinguish Misappropriated from Stolen:

A further assessment of whether the item (100) is most likely misappropriated (503.0.3) or stolen (503.0.4) may be made by the BIRD (200) based on additional logic which—while part of BIRD logic (500)—is not illustrated in the tables (500.T) of FIGS. 5B and 5C. Once an item (100) as been flagged as misappropriated/stolen (503.0.3/503.0.4), MvS Heuristics (180) (discussed above in conjunction with FIG. 1M) may be applied to determine a likelihood that the BIRDed-item (102) is either misappropriated (503.0.3) or stolen (503.0.4).

Wandering/Lost

One of the thirty-six states result in an assessment that the item (100) is either wandering (503.0.5) or lost (503.0.1), meaning generally that if the item (100) is in possession or under control of any person, then that person is an authorized user (AU); but the item (100) is definitely not where it's supposed to be.

In an embodiment, the self-assessment by BIRD logic (500) of a wandering/lost item state (503.0.5/503.0.1) may be understood as a comparison between the usage expectations (600) and the current usage data (700.U). The wandering/lost state (503.0.5/503.0.1) in the table (500.T) is 19. In this state, the BIRDed item (102) self-assesses that all of the following statuses (501) apply:

daily life location: the item (100) is in a daily-life location (140.DL) other than a home base location (140.HB);

authorized user: iteMetrics (154) indicate that the item was most recently on-person (138.OnP) of an authorized user (AU);

stationary but not stagnant: the item (100) is stationary (139.Stat) but not yet stagnant (139.StG); and AWOL: the item is AWOL (128).

In brief, the BIRDed-item (102) is outside of any home base location (140.HB), was last with an authorized user (AU), is AWOL (128) (not where it's supposed to be at the current time (104.T)), and is stationary (139.Stat). This could indicate the item (100) is simply wandering (503.0.5), meaning that it's with the authorized user (AU), who has temporarily set the item down but still has the item under control; or it could indicate that the item (100) is lost (503.0.1), if the user has set it down and moved on without it.

If the item (100) remains stationary (139.Stat) long enough to become stagnant (139.StG), then the state (503) of the item (100) switches to case 23 and the BIRDed-item (102) self-assesses as being lost (503.0.1).

Ambiguous Cases (Query User)

In an embodiment, some combinations of item statuses (501) may be construed by BIRD logic (500) as being ambiguous states (503.9). The ambiguous clusters in the table (500.T) are 25 and 29. In these clusters, the BIRDed-item (102) self-assesses that all of the following statuses (501) apply:

OOB: the item (100) is in an out-of-bounds (OOB) location (140.OoB);

authorized user: the item (100) is with an authorized user (AU);

not stagnant: the item (100) may either be in user-movement (139.UM) or stationary (139.Stat) status, but is not yet stagnant (139.StG); and not AWOL: the item (100) is not AWOL (128).

In brief, the item (100) appears to be with an authorized user (AU) (since it's either on-person (138.OnP), or it's off-Person (138.OffP) for an amount of time within an allowed stationary limit (133) and was last with the authorized user (AU)); and the time is such that the BIRDed-item (102) is not expected to be in a home base location (140.HB) (so the item (100) is not AWOL (128)); but the item is outside of any place where it's expected to be at all (because it's out-of-bounds (140.OoB)).

A plausible interpretation of this state of affairs is that the authorized user (AU) has decided to venture outside of his or her normal hunting grounds. However, in an embodiment, under these circumstances the BIRD (200) is configured to determine that the current state of the item is an ambiguous state (503.9).

User Query:

In an embodiment, the BIRD (200) is configured to immediately alert the user as to the ambiguous state (503.9), and to query the authorized user (AU) as to whether the item state (503) is acceptable or not. If the user signals that the item state (503) is acceptable, the BIRD (200) may be configured to not issue further alerts or notifications (372, 374). In an embodiment, the BIRD (200) may offer one or more prompts or other user-interface interactions, to determine if the BIRD (200) should modify the usage expectations (600) on either a temporary or permanent basis. In this case, the BIRD (200) may engage in active learning in the field about changes in item usage and/or user behavior.

In an alternative embodiment, the BIRDed-item (102) may be configured to delay for some period of time before alerting the user to the ambiguous state (503.9). Other responses by the BIRD (200) may be envisioned as well.

Summary

Table 500.T is a listing of exemplary status/state data clusters (505), where each cluster (1, 2, 3 . . . 36) pairs a unique constellation of item statuses (501) with a resulting, self-assessed item state (503) (extant (503.1), or any of multiple possible states of displacement (503.0)). In an embodiment BIRD logic (500) employs such item-status/item-state clusters (505) to self-assess a state (503) of an item (100). In turn, the item statuses (501) are arrived at by comparing BIRD usage data (700.U) against usage expectations (600) for the BIRDed-item (100).

For example, an item's current location (from sensor data (700)) may be compared against defined home base (140.HB), daily life (140.DL), and out-of-bounds (140.OoB) locations—which in an embodiment are defined in usage expectations (600)—to determine if an item is currently in a home base location (140.HB), a daily life location (140.DL), or is out-of-bounds (140.OoB).

Similarly, whether an item (100) is or is not AWOL (128) is determined by comparing sensor location data (700.Loc) (one element of usage data (700.U)) against expected item location data which, in an embodiment, is contained in usage expectations (600).

Similarly, whether iteMetrics indicate an item is currently with an authorized user (AU) or not is determined by comparing usage data (700.U) against iteMetrics (154) which would be expected for the user, as defined in usage expectations (600).

Similarly, whether or not an item is currently On-Person (138.OnP) is determined by comparing usage data (700.U) against current usage data (700.U) which be expected when the item (100) is on-person (138.OnP), as defined in usage expectations (600). In an embodiment, the appropriate usage data (700.U) may be data related to personal (user) motion (104.M). In an alternative embodiment, other forms of usage data (700.U) may be employed to determine if the item (100) is, or is not, currently on-person (138.OnP).

Table 500.T is exemplary only. The usage data (700.U), which includes sensor data (700) and processed sensor data (700.P), required for the data analysis inherent in table 500.T are exemplary only. Similarly, the elements of usage expectations (600) which may be required by a BIRD (200) to implement the data assessments and analysis inherent in table 500.T is exemplary only. Similarly, the choices of item statuses (501) (location category (140), on-person/off-person (138), personal motion (139), AWOL status (128), and iteMetrics (154)) employed in table 500.T are exemplary only.

In alternative embodiments, other item statuses (501), other types of usage data (700.U), and other usage expectations (600) may be employed in addition or in the alternative. Similarly, the pairings between item statuses (501) and the assessed item states (503) shown in table 500.T are exemplary only, and reflect an exemplary set of criteria for BIRD logic (500). In alternative embodiments other pairings may be employed, and other item states (503) and/or additional item statuses (501) may be envisioned as well.

In alternative embodiments, BIRD logic (500) may take into account various factors or conditions not addressed in exemplary table 500.T, such as item motions (accelerations, vibrations, etc.) associated with personal transportation or public transportation. In an embodiment, such motions may be addressed through filtering of sensor data (700) to distinguish personal motions (104.M) from transportation motions. In an alternative embodiment, additional logic may be employed to address potential ambiguities in distinguishing personal motion (104.M) from transportation motions.

FIG. 5D

Second Exemplary BIRD Logic Method

FIG. 5D presents a flow chart of a second exemplary method (500.2[Meth]) of BIRD logic (500).

Method 500.2[Meth] begins with step 37. In step 37, the BIRD (200) identifies the current time and date (104.T), and also the current expected, authorized user (AU) (based, for example, on the most recent biometric login).

In step 38, the BIRD (200) extracts from the usage expectations (600) the current expected usage (CUE) parameters (483) which are required to determine if the BIRDed-item (102) is extant (503.1) or displaced (503.0). The current expected usage (CUE) parameters (483) extracted from the usage expectations (600) may include, for example and without limitation: the current expected home base (140.HB) or daily life location (140.DL) and out-of-bounds (140.OoB) locations (140.OoB) for the BIRDed-item (102); AWOL (128) criteria; and iteMetrics (154) for the current authorized/expected user. In turn, the iteMetrics (154) may include parameters pertaining to expected item movement, expected item light exposure, expected item sound exposure, expected item temperature, and any other environmental factors which can be detected by BIRD (200) sensors 210, and which are indicative of normal or expected usage of the item (100) by the user. In an embodiment, the out-of-bounds (140.OoB) locations (140.OoB) may be defined implicitly with reference to the home base (140.HB) and daily life (140.DL) locations.

The next four steps, 39 through 42, are data assessment steps. They all entail comparing data collected from the sensors (210), and collected into usage data (700.U), against the usage expectations (600). The result of each assessment is some specific determination, as discussed immediately below, of an item status (501).

In step 39, the BIRD (200) compares its current location data (700.Loc) against the expected location data (for location categories (140) (home base, daily life, and possibly zones)), and determines if the item (100) is in an expected home base (140.HB) or daily life (140.DL) location, or if the item is out-of-bounds (140.OoB).

In step 40, the BIRDed-item (102) determines if it is On-Person (138.OnP) (in-hand, in pocket, in a purse or backpack which is itself being carried on-person, etc.) or not. In an embodiment, this determination is made by detecting whether or not the item (100) is subject to motions associated with being on a person. In an alternative embodiment, the determination of whether or not the item is On-Person (138.OnP) may be made based on other sensor readings.

In step 41, the BIRD (200) determines if the item (100) is absent without leave (AWOL) (128). An AWOL (128) determination is specific both to a particular expected location (144.L), and a particular time frame when the item should be within that particular location (that is, a detection context (123). The item (100) is AWOL (128) if:

(i) even though the item may be within the bounds of the daily life locations (140.DL), and so is within some generally allowed locations, and . . .

(ii) the item (100) is not within the particular, expected location (144.L) in which it should be located at the current time (104.T).

In an embodiment, expected locations (144.L) with which reference is made for purposes of being AWOL (128) may be home base locations (140.HB). In an alternative embodiment, various specific expected locations (144.L) within the daily life locations (140.DL), which are other than or in addition to home base locations (140.HB), may be suitable as a basis for AWOL (128) assessments.

In step 42, the BIRD (200) employs iteMetric determinations (154). If the item (100) is currently on person, the BIRD (200) determines if the current user is an authorized user (AU). If the item (100) is currently off person, the BIRD (200) determines if the most recent user is an authorized user (AU).

In step 43, the BIRD (200) utilizes the determinations resulting from steps 39 to 42. Specifically, the BIRD (200) uses the following four determinations of item statuses (501):

- item location (home base (140.HB), daily life (140.DL), or out-of-bounds (140.OoB), and possibly a zone determination, if applicable);
- on-person or off-person condition (138) of the item (100); if off-person (138.OffP), stationary (139.Stat) or stagnant (139.StG);
- the AWOL status (128) of the item (yes or no);
- whether the current user, or most recent user, is the expected authorized user (AU) or not (131).

Based on these determinations of specific item statuses (501), the BIRD (200) identifies a corresponding item state/status cluster (505) in a stored table of BIRD logic (500). For example, the BIRD (200) may identify a corresponding item cluster—that is, one cluster (505) from among clusters numbered 1-36—in the table 500.T, discussed above in conjunction with FIGS. 5B and 5C. The BIRD (200) identifies a single item state/status cluster (505) which corresponds to the four currently identified statuses (501) of the BIRDed-item (102), as obtained in steps 39 to 42.

In step 44 the BIRD (200) obtains, from the item state/status cluster (505) determined in step 43, a specific assessed item state (503). This assessed item state (503) can then serve as a basis to determine responses by BIRD song (900).

In an embodiment, the method then repeats throughout field use, returning to step at least one of steps 37, 38, or 39, at functionally useful intervals (which may be multiple times per second, at least once every few seconds, or once per minute, or at other designated time intervals). It will also be understood that while various item status determinations (501)—location category (140), on-person/off-person (138), personal motion (139), AWOL status (128), authorized user (AU) or unauthorized user (UU) (131)—are shown in particular sequences, these determinations (501) may in different embodiments be made in different orders, or may be made in whole or in part in parallel with each other.

FIGS. 5E(1), 5E(2) and 5E(3)

Third Exemplary BIRD Logic Method

FIGS. 5E(1), 5E(2) and 5E(3) present a flow chart (500.3[Meth]) of a third exemplary method of BIRD logic (500). Due to the size of the flow chart (500.3[Meth]), and for clarity of illustration only, the chart has been divided into three sections, 500.3(1), 500.3(2), and 500.3(3) on FIGS. 5E(1), 5E(2) and 5E(3), respectively. All three sections (500.3(1, 2, 3)) have in common the root flow chart steps (46, 47, and 48).

AWOL Criteria Omitted

For simplicity, the influence of AWOL criteria (absent without leave criteria) (128) has not been included in exemplary method 500.3[Meth]. It will be understood that, in an embodiment, the influence of including AWOL criteria (128) in item state assessments is the following: items (100) which might otherwise be extant (503.1) may, if AWOL (128), be assessed by the BIRD (200) as misplaced (503.0.2) or wandering (503.0.5); this is generally reflected in the item status/state clusters (505) in Table 500.T (FIGS. 5B and 5C, discussed above), which does take into account AWOL assessments. Also, in some embodiments—and depending on other factors as well—items (100) which might otherwise be construed as misappropriated (503.0.3) may instead, if AWOL (128), be more likely to be assessed as stolen (503.0.4).

Because AWOL criteria (128) have been omitted from FIGS. 5E(1), 5E(2) and 5E(3), no wandering states (503.0.5) are identified in the flowchart (500.2). However, some potential wandering states (503.0.5) are identified further in the discussion below.

Method Steps: 5E(1)

With reference to FIG. 5E(1), method 500.3[Meth] begins with step 46. In step 46, the BIRD (200) identifies the current time and date (104.T), and also the current expected, authorized user (AU) (based, for example, on the most recent biometric login).

In step 47, the BIRD (200) extracts from the usage expectations (600) the current expected usage (CUE) (483) which are required to determine if the BIRDed-item (102) is extant (503.1) or displaced (503.0). The CUE parameters (483) extracted from the usage expectations (600) may include, for example and without limitation: the current expected home base (HB) (140.HB) and daily life (DL) (140.DL) locations for the item; and item metrics (154) for the current authorized/expected user. In turn, the iteMetrics (154) may include parameters pertaining to expected item movement, expected item light exposure, expected item sound exposure, expected item temperature, and any other environmental factors which can be detected by BIRD sensors (210), and which are indicative of normal or expected usage of the BIRDed-item (102) by the user.

In an embodiment, extraction of appropriate CUE parameters (483) from the usage expectations (600) will also include the extraction of AWOL criteria (128). However, as noted above, AWOL criteria (128) are omitted from exemplary flow chart (500.3[Meth]) for purposes of conciseness.

The method proceeds to step 48. In step 48, the BIRDed-item (102) determines whether the item (100) is with an allowed location such as a home base location (140.HB) or a daily life location (140.DL). In an embodiment, not illustrated in the figure, the determination of the allowed location may include a determination of whether the item (100) is in and allowed zone or within some other defined, allowed area.

Item in Home Base Location (5E(1) (continued)

If in step 48 is determined that the item (100) is within an expected home base location (140.HB), then the method proceeds to step 49. At this point, since the item (100) is within a home base location (140.HB), the item cannot be lost (503.0.1) and cannot be wandering (503.0.5). However, the item (100) may still be any of extant (503.1), misplaced (503.0.2), misappropriated (503.0.3), or stolen (503.0.4).

In step 49, the BIRD (200) determines if the item (100) is on-person (138.OnP) (any of in-hand, in pocket, in a purse or briefcase or backpack which is itself being carried on-person, being worn on-person, etc.) or not. In an embodiment, this determination is made by detecting whether or not the item (100) is subject to motions associated with being on a person. In an alternative embodiment, the determination of whether or not the item is on-person (138.OnP) may be made based on other usage data (700.U).

If in step 49 it is determined that the item is on-person (138.OnP), then the method (500.3) proceeds to step 50. At this point, since the item is on-person (138.OnP), it cannot be that the item is misplaced (503.0.2). However the item may still be any of extant (503.1), misappropriated (503.0.3), or stolen (503.0.4). In step 50 the BIRD (200) analyzes current and recent iteMetrics (154). The method then proceeds to step 51.

In step 51 the BIRD (200) determines if the iteMetrics (154) are consistent with the expected authorized user (AU). If the answer is yes, then the BIRD (200) proceeds to step 52, where the BIRDed-item (102) self-assesses itself as being extant (503.1). The item (100) is extant (503.1) since the item (100) is in a home base location (140.HB), is on-person (138.OnP), and is on the person of an authorized user (AU).

If in step 51 the BIRD (200) determines that the iteMetrics (154) are not consistent with the authorized user (AU), then the method proceeds to step 53. In step 53 the BIRD (200) assesses that the item (100) is either misappropriated (503.0.3) or stolen (503.0.4). The method then proceeds to step 54. In step 54, the BIRD (200) applies appropriate MvS heuristics (180) to determine the relative likelihood that the item is misappropriated (503.0.3) versus the item being stolen (503.0.4). Exemplary MvS heuristics (180) for such a determination are discussed above in conjunction with FIG. 1L.

Returning to consideration of step 49: In step 49, it may be determined that the item (100) is off-person (138.OffP). For example, motion detection may determine that the item (100) is stationary (139.Stat) and therefore off-person (139.OffP). At this juncture, it may be that the item (100) is extant (503.1), misplaced (503.0.2), or misappropriated (503.0.3).

If in step 49 it is determined that the item (100) is off-person (138.OffP), the method proceeds to step 55. In step 55, a determination is made as to whether or not the item (100) is stagnant (139.StG).

An item (100) is stagnant (139.StG) if it is off-person (138.OffP) for longer than an allowed period of time, the station limit (133). The stationary limit (133) is specified in the usage expectations (600), and may vary widely depending on the item (100) itself, the usage to which the item is put by an authorized user (AU), and the time of day and setting. For example, a set of keys (100.K) or a wallet (100.W) may be expected to be stationary for many hours at a time when these items are at home in the evening. On the other hand, the same items (that is the keys (100.K) or the wallet (100.W)) maybe expected to be on-person (138.OnP) all the time or substantially all the time when in use during the day by the authorized user (AU).

During the day then, the stationary limit (133) for the item (100) may be zero minutes, or perhaps just a few minutes. For example, the usage expectations (600) may indicate that the keys or the wallet may be set down for just a few minutes at a time during the day, for example for up to three minutes. If the keys (100.K) or the wallet (100.W) are set down and are stationary (139.Stat) for any longer than three minutes, then a determination is made by the BIRD (200) that the item (100) is stagnant (139.StG).

If in step 55 a determination is made that the item is stagnant (139.StG), then the in the item is assumed to no longer be extant (503.1) but may be misplaced (503.0.2) or misappropriated (503.0.3). The method proceeds to step 56, which entails an analysis of iteMetrics (154) for the item. It will be noted that current morphIteMetrics (156) cannot be analyzed since the item (100) is off-person (138.OffP). But recent morphIteMetrics (156) can be analyzed, along with recent and current psyIteMetrics (158).

From step 56 the method proceeds to step 57. In step 57 a determination is made as to whether the iteMetrics are consistent with those expected for the authorized user (AU).

If in step 57 a determination is made that the iteMetrics (154) are consistent with the authorized user (AU), then in step 58 the BIRDed-item (102) self-assesses itself as having been misplaced (503.0.2). In other words, the item (100) is in a home base location (140.HB), and is with or associated with an authorized user (AU), but the item (100) has been left lying about for longer than expected. On this basis, the BIRD (200) assesses that its associated item (100) is misplaced (503.0.2).

If instead in step 57 the iteMetrics (154) are not consistent with the authorized user (AU), the method moves to step 59 were the BIRD (200) assesses that its associated item (100) has been misappropriated (503.0.3); that is, the item is with an un-authorized user (AU) who is not likely to be a thief (since the item is still in a home base location (140.HB)).

Returning to step 55, if a determination is made in that the item (100) is not stagnant (139.StG), the item (100) may be extant (503.1) or may be misappropriated (503.0.3). The method proceeds to step 60, which entails an analysis of iteMetrics (154) for the item. It will be noted that current morphIteMetrics (156) cannot be analyzed since the item (100) is off-person (138.OffP). But recent morphIteMetrics (156) can be analyzed, along with recent and current psyIteMetrics (158).

From step 60 the method proceeds to step 61. In step 61 a determination is made as to whether the iteMetrics (154) are consistent with those expected for the authorized user (AU). In the iteMetrics (154) are consistent with those expected for the authorized user (AU), the method proceeds to step 62 where the BIRDed-item (102) assesses itself as being extant (503.1). If instead in step 61 a determination is made that iteMetrics (154) are not consistent with the authorized user (AU), then in step 59 the BIRDed-item (102) self-assesses as being misappropriated (503.0.3).

As noted above, the illustrated steps of method 500.3 omit consideration of an item's possible AWOL status (128). An item is AWOL (128) if it is in a home base location (140.HB), but at a time when the item should not be in that location. In that event, and in an alternative embodiment, additional method steps (not illustrated) may assess the item (100) as being either misplaced (503.0.2) (generally if off-person (138.OffP)) or wandering (503.0.5) (typically, if on-person (138.OnP) of the authorized user (AU)).

Dally Life Location which is not a Home-Base Location (FIG. 5E(2))

With reference now to FIG. 5E(2), and so with reference to part 2 of method 500.3[Meth], consideration again returns to step 48 of the method. In step 48, a determination may be made that the item (100) is in a daily life location (140.DL) which is, however, not a home base location (140.HB). In that event the item (100) may be extant (503.1), lost (503.0.1), misappropriated (503.0.3), or stolen (503.0.4). The item (100) is not misplaced (503.0.2), since an item can only be considered misplaced if it is in a home base location (140.HB). It is also possible the item (100) may be wandering (503.0.5), meaning that the item (100) is with an authorized user (AU) but has inadvertently been removed from a designated home base location (140.HB) at a time when the item (100) should still be at the designated home base location (140.HB). (In other words, the item (100) may be AWOL (128).) However, as noted above, for purposes of brevity and simplicity, the wandering state (503.0.5) has been deliberately omitted from the flowchart (500.3[Meth]).

If in step 48 the BIRDed-item (102) determines that it is in a daily life location (140.DL) which is not a home base location (140.HB), then the method continues with step 64. In step 64, a determination is made as to whether or not the item (100) is on-person (138.OnP) (for example, any of being in hand, in pocket, worn on the person's body, in a purse or briefcase which is being carried by the person, in a backpack which is being carried by the person, etc.). In an embodiment, this determination may be made by evaluating whether or not the item (100) is subject to personal motions (104.M). In an alternative embodiment, other usage data (700.U) in addition to or in alternative to motion data may be used to make the determination of whether or not the item (100) is on-person (138.OnP).

If in step 64 the BIRD (200) determines that the item (100) is on-person (138.OnP), then the item may be extant (503.1), or maybe misappropriated (503.0.3) or stolen (503.0.4). The method proceeds to step 65, which entails an analysis of current and recent iteMetrics (154). The method then proceeds to step 66, where the BIRD (200) determines whether or not the iteMetrics (154) are consistent with the expected authorized user (AU).

If in step 66 the iteMetrics (154) are consistent with the expected authorized user (AU), then the method proceeds to step 67, where the BIRD (200) assesses that its associated item (100) is extant (503.1).

If in step 66 a determination is made that the iteMetrics (154) are not consistent with the authorized user (AU), than the method proceeds to step 68 where the BIRDed-item (102) self-assesses as possibly being misappropriated (503.0.3) or stolen (503.0.4). From step 68 the method proceeds to step 69, where the BIRD (200) employs MvS heuristics (180) to assess the relative likelihood that the item (100) is misappropriated (503.0.3) versus the likelihood that the item (100) is stolen (503.0.4). Various exemplary MvS heuristics (180) for making such a determination are presented above in conjunction with FIG. 1M.

Returning to step 64, a determination may be made that the item (100) is off-person (138.OffP). In this event, the item may still be extant (503.1), or it may be lost (503.0.1), misappropriated (503.0.3), or stolen (503.0.3). The method proceeds to step 70, were the BIRD (200) determines whether or not the item (100) is stagnant (139.StG).

If in step 70 the item (100) is stagnant (139.StG), then since it has been stationary (139.Stat) for longer than the stationary limit (133), it is no longer considered possibly extant (503.1). Since the item (100) is not in a home base location (140.HB), it cannot be misplaced (503.0.3) either. The item (100) may be lost (503.0.1), misappropriated (503.0.3), or stolen (503.0.4).

The method proceeds to step 71, which entails an analysis of recent iteMetrics (154). It will be noted that current morphIteMetrics (156) typically cannot be analyzed since the item (100) is off-person (138.OffP). But recent morphIteMetrics (156) can be analyzed, along with recent and current psyIteMetrics (158).

The method proceeds to step 72, where the BIRD (200) determines whether the iteMetrics (154) are consistent with the authorized user (AU). If in step 72 a determination is made that the iteMetrics (154) are consistent with the authorized user (AU), the method proceeds to step 73 where the BIRD (200) assesses that the item (100) is lost (503.0.1). In other words, because the item is stagnant (139.StG) and is not in a home base location (140.HB), but was last associated with the authorized user (AU), the BIRDcd-item (102) self-assesses as being lost (503.0.1).

If in step 72 the iteMetrics (154) are not consistent with the authorized user (AU), the method continues with step 77. In step 77, the BIRD (200) makes an assessment that its associated item (100) is misappropriated (503.0.3) or stolen (503.0.4). The method then proceeds to step 78. In step 78, the BIRD (200) applies MvS heuristics (180) to determine the relative likelihood of the item (100) being misappropriated (503.0.3) or stolen (503.0.4).

Returning to step 70, if it the BIRD (200) determines that the item (100) is not stagnant (139.StG), then the item may be extant (503.1), misappropriated (503.0.3), or stolen (503.0.4). The method proceeds to step 74 with an analysis of iteMetrics (154). It will be noted that current morphIteMetrics (156) usually cannot be analyzed since the item (100) is off-person (138.OffP). But recent morphIteMetrics (156) can be analyzed, along with recent and current psyIteMetrics (158).

The method then proceeds to step 75, which entails a determination of whether the iteMetrics (154) are consistent with the authorized user (AU).

If the BIRDed-item (102) determines that iteMetrics (154) are consistent with the authorized user (AU), the method proceeds to step 76 where the BIRDed-item (102) self-assesses as being extant (503.1).

If in step 75 the iteMetrics (154) are not consistent with the authorized user (AU), the method continues with step 77. In step 77, the BIRD (200) makes an assessment that its associated item is misappropriated (503.0.3) or stolen (503.0.4). The method proceeds to step 78. In step 78, the BIRDed-item (102) applies MvS heuristics (180) to determine the relative likelihood of the item (100) being misappropriated (503.0.3) or the likelihood of the item (100) being stolen (503.0.4).

Out-Of-Bounds (140.OoB) (FIG. 5E(3))

With reference now to FIG. 5E(3), and so with reference to part 3 of method 500.3[Meth], consideration again returns to step 48 of the method. In step 48, the BIRD (200) may determine that the item (100) is not in a home base (140.HB) or daily life (140.DL) location, so that the item (100) is out-of-bounds (140.OoB). In that event the item (100) may be lost (503.0.1), misappropriated (503.0.3), or stolen (503.0.4), or the state (503) of the item (100) may be an ambiguous state (503.9).

It is noted that the item (100) is not misplaced (503.0.2), since an item (100) may only considered misplaced if it is in a home base location (140.HB). It is also noted the item may be wandering (503.0.5)—meaning that the item is with an authorized user (AU) but has inadvertently been removed from a particular home base location (140.HB) at a time when the item (100) should still be at that particular home base location (140.HB). However, as stated above, for purposes of brevity and simplicity, the wandering state (503.0.5) has been deliberately omitted from illustration of the method (500.3 [Meth]).

Upon the determination in step 48 that the item (100) is out-of-bounds (140.OoB), the method proceeds to step 80. In step 80, the BIRD (200) determines whether its associated item (100) is on-person (138.OnP) or not. In an embodiment, this determination may be made via the motion sensors (210.M) and a determination of whether the item (100) is subject to personal motion (104.M). In an alternative embodiment, motion sensing may be augmented and/or replaced by other forms of sensing and other means of determination as to whether or not the item is on-person (138.OnP).

In step 80, the BIRD (200) may determine that the item (100) is on-person (138.OnP). In this case the item may be misappropriated (503.0.3), stolen (503.0.4), or the state of the item may be ambiguous (503.9). The method proceeds to step 81 which entails an analysis of current and recent iteMetrics (154), and from there to step 82. In step 82 a determination is made as to whether or not the iteMetrics (154) are consistent with the authorized user (AU).

If in step 82 the BIRD (200) determines that the item (100) is with the expected authorized user (AU), the method proceeds to step 83 where a determination is made that the item state (503) is ambiguous (503.9). Step 83 is followed by a step 84.

Formally, step 84 is not part of BIRD logic (500). Rather, step 84 is an element of BIRD song (associated with either of step 465 or step 475 of method 430) discussed above in conjunction with FIG. 4C. Step 84 it is discussed here for convenience of exposition. In step 84 the user is queried by the BIRD (200). Because the item (100) is out-of-bounds (140.OoB), the BIRD (200) may query as to whether the user has inadvertently gone out-of-bounds (140.OoB) with the item; or whether there has been a temporary change of plans; or whether the daily life area (140.DL) should be modified (for example, expanded). In other words, the BIRD (200) queries the authorized user (AU) to determine what the state is of both the item (100) and the user. The BIRD (200) may employ such a query process as a basis to modify usage expectations (600).

If in step 82 the BIRD (200) determines that the iteMetrics are not consistent with the authorized user (AU), the method proceeds to step 86 were determination is made that the item (100) is either misappropriated (503.0.3) or stolen (503.0.4). The method then proceeds to step 87 where the BIRD (200) applies MvS heuristics (180) to determine a relative likelihood of the item (100) being misappropriated (503.0.3) versus the item being stolen (503.0.4).

Returning to step 80, a determination may be made that the item (100) is off-person (138.OffP), meaning the item is stationary (139.Stat). In this event, the item (100) state may be lost (503.0.1), misappropriated (503.0.3), stolen (503.0.4) or an ambiguous state (503.9). From step 80 the method proceeds to step 90, where the BIRD (200) determines whether or not the item (100) is stagnant (139.StG).

If the item (100) is stagnant (139.StG), the item may be lost (503.0.1), misappropriated (503.0.3), or stolen (503.0.4). The method proceeds to steps 91 and 92, where iteMetrics (154) are analyzed and a determination is made as to whether the iteMetrics are consistent with the authorized user (AU). It will be noted that current morphIteMetrics (156) typically cannot be analyzed since the item (100) is off-person (138.OffP). But recent morphIteMetrics (156) can be analyzed, along with recent and current psyIteMetrics (158).

If in step 92 the iteMetrics (154) are consistent with the authorized user (AU), the method proceeds to step 93 were the BIRDed-item (102) self-assesses as being lost (503.0.1). This assessment is made because the last person in possession of the item (100) was the authorized user (AU), but the item is stagnant (139.StG) as well as out-of-bounds (140.OoB); this indicates that the item (100) has been left out-of-bounds (140.OoB), by the authorized user (AU), for longer than an allowed period of time.

If in step 92 the BIRD (200) determines that the iteMetrics (154) are not consistent with the authorized user (AU), the method proceeds to step 97 were determination is made that the item (100) is misappropriated (503.0.3) or stolen (503.0.4). The method then proceeds to step 98 where the BIRD (200) applies MvS heuristics (180) to determine a relative likelihood of the item (100) being misappropriated (503.0.3) versus the item (100) being stolen (503.0.4).

Returning to step 90, the BIRD (200) may determine that the item (100) is not stagnant (139.StG), meaning that while the item (100) is off-person (138.OffP), it has been stationary (139.Stat) for no more than some allowed period of time. The item (100) may be misappropriated (503.0.3), stolen (503.0.4), or in an ambiguous state (503.9).

The method proceeds to steps 94 and 95, where recent iteMetrics (154) are analyzed, and the BIRD (200) determines whether the iteMetrics (154) are consistent with the authorized user (AU). It will be noted that current morphIteMetrics (156) typically cannot be analyzed since the item (100) is off-person (138.OffP). But recent morphIteMetrics (156) can be analyzed, along with recent and current psyIteMetrics (158).

If in step 95 a determination is made that the iteMetrics are not consistent with the authorized user (AU), then the BIRD (200) determines in step 97 that the item (100) is misappropriated (503.0.3) or stolen (503.0.4). The method again proceeds to step 98 were determination is made of the relative likelihood of the item (100) being misappropriated (503.0.3) versus the item (100) being stolen (503.0.4).

If in step 95 the BIRD (200) determines that the iteMetrics (154) are consistent with the authorized user (AU), the method proceeds to step 96 where a determination is made that the item state (503) is ambiguous (503.9). Step 96 is followed by a step 99.

Formally, step 99 is not part of BIRD logic (500). Rather, step 99 is an element of BIRD song (associated with either of step 465 or step 475 of method 430) discussed above in conjunction with FIG. 4C. Step 99 it is discussed here for convenience of exposition.

In step 99, the BIRD (200) implements an off-person ambiguity response. In an embodiment, and because the item (100) is in fact-off person, the BIRD (200) may be designed with a number of user-configurable options for the off-person ambiguity response. For example, the user (in advance of this event) may be able to configure the BIRD (200) from among the following options:

(i) do nothing for some period of time, on the possibility that the authorized user (AU) will again pick up the item (100), at which point the BIRD (200) can query the user (as per step 84, discussed above);

(ii) emit a local signal to alert any nearby person (authorized user (AU) or otherwise) that the BIRDed-item (102) requires attention;

(iii) send a report to a lost/anomalous reporting center (355); or (iv) some combination of options (i) through (iii) and possibly other response options as well.

Method Repetition and Alternative Embodiments

While not shown in FIGS. 5E(1)-5E(3), it will be understood by persons skilled in the art that, in an embodiment, upon self-assessing a current state (503) (as per steps 52, 53, 54, 58, 59, 62, 63, 67, 68, 69, 73, 77, 78, 76, 83, 86, 87, 93, 97, 98, 96), the method then repeats throughout field use, returning to at least one of steps 46, 47, or 48, at functionally useful intervals (which may be multiple times per second, at least once every few seconds, or once per minute, or at other designated time intervals). It will also be understood that while various determinations are shown in particular sequences, these determinations (on-person/off-person (138), personal motion (139) (such as stagnancy (139.StG)), location category (140), iteMetrics (154), and others) may in different embodiments be made in different orders, with suitable rearrangements of branching and decision making, or may be made in whole or in part in parallel.

Identification of User Identity Based on Recent IteMetrics

In method 500.3[Meth] (FIGS. 5E(1-3)), each of steps 50, 56, 60, 66, 71, 74, 82, 91, and 94 entails an analysis of current and/or recent iteMetrics (154). Each of these steps is immediately followed by a step which determines whether or not the iteMetrics (154) are consistent with the expected authorized user (AU).

Similarly, step 40 of method 500.2[Meth] (FIG. 5D) may also entail analyzing recent iteMetrics (154) to determine if the analyzed iteMetric data is, or is not, consistent with the authorized user (AU).

The analysis of recent iteMetrics (154), in turn, entails a retrieval by the BIRD (200) of usage data (700.U) (current and recent real time sensor data (700) and processed data (700.P)), which may be pertinent to identifying or helping to identify either of:

(i) the person currently holding/carrying the item (100), or (ii) the person who most recently held the item (100).

Such iteMetric data may include, for example and without limitation: motion data which may be indicative of a user's walk, stride, or body motions while seated or standing; motion data which may be indicative of hand or arm motions, or even head motions; voiceprint data; facial recognition data; and other biometric data which may be available to the BIRD (200).

Such iteMetric data is continually collected and stored by the BIRD (200) in step 445 of exemplary method 430 (discussed above in conjunction with FIG. 4C). The iteMetric determination by the BIRD (200) then entails comparing:

(i) usage data (700.U) (the collected real-time and recent data (700) and also the processed data (700.P)) against . . .

(ii) the expected iteMetric values for the authorized user (AU), as defined in usage expectations (600).

IteMetric Match Tolerance Parameters:

In an embodiment, user stride parameters—such as stride length or stride frequency—may be compared against expected stride length and stride frequency for the authorized user (AU). In an alternative embodiment, recently recorded, real-time voice prints may be compared against stored voice prints for the authorized user (AU). In an alternative embodiment, stored facial patterns for the authorized user (AU) may be compared against recently recorded, real-time facial patterns. Based on how close the match is in each case, the BIRD (200) can make an estimate as to whether or not the item (100) is currently with, or was recently associated with, the authorized user (AU). In an embodiment, various BIRD parameters, perhaps referred to as iteMetric match tolerance parameters, may be adjusted to establish how closely the real-time readings must match with the stored iteMetrics, in order for an identity match to be assessed by the BIRD (200).

Off-Person MorphIteMetrics and PsyIteMetrics

It is noted above, in conjunction with exemplary method 500.2, that typically it is not possible for the BIRD (200) to assess current morphIteMetrics (156) while the BIRDed-item (102) is off-person (138.OffP). This is because, being off-person (138.OffP), the BIRDed-item (102) cannot detect personal user motions associated with morphIteMetrics (156).

In some embodiments, however, there may be exceptions to this. The BIRDed-item (102) may be off-person (138.OffP), but still in sufficient, substantial physical proximity to a person (whether an authorized user (AU) or otherwise) associated with the item (100). In this case, a BIRD's camera (210.C) may be able to identify a person based on facial imaging, or the BIRD's video camera (210.V) may be able to identify personal motions (104.M) through motion analysis. Similarly, the BIRD's audio content sensor (210.AC) may be able to perform voice identification. Other BIRD sensors (210) may also be employed to assess morphIteMetrics (156) even when the BIRDed-item (100) is off person.

By contrast, psyIteMetrics (158) typically can be analyzed by the BIRD (200) in real-time, even when the BIRDed-item (102) is off-person (138.OffP). This is because, in an embodiment, the amount of time an item (100) remains off-person (138.OffP) is itself an element of, or a parameter of, psyIte-Metrics (158).

BIRD Logic: Additional Considerations

Probabilistic Determinations

In an embodiment, self-assessment by the BIRD (200) of its associated item (100) as being lost (503.0.1), misplaced (503.0.2), misappropriated (503.0.3), wandering (503.0.5), or stolen (503.0.4), or on the other hand extant (503.1), are probabilistic. Because of that, determinations by the BIRD (200) of the item (100) as being lost (503.0.1), misplaced (503.0.2), misappropriated (503.0.3), wandering (503.0.5), or stolen (503.0.4) may overlap. That is, the BIRD (200) may determine that its associated item (100) is, in some significant probability, likely in a state of being at least one of lost (503.0.1), misplaced (503.0.2), misappropriated (503.0.3), wandering (503.0.5), or stolen (503.0.4). The BIRD (200) may be further configured to determine more specific probabilities associated with each state (for example, High probability of the item (100) being "misplaced," Intermediate probability of being "lost"). As a result, in some embodiments, the sum of such numeric probability calculations for lost (503.0.1), misplaced (503.0.2), stolen (503.0.4), misappropriated (503.0.3), wandering (503.0.5) or extant (503.1) states may add up to more or less than 100%.

In an embodiment, numerically precise probability calculations may not always be feasible or realistic, so probabilities may be determined and presented by the BIRD (200) in general or range-oriented terms, possibly with associated general terminology (for example, "Very High." "High". "Intermediate," "Possibly Lost." "Possibly Misplaced," etc.).

In an alternative embodiment, the BIRD (200) may not calculate numeric probabilities at all, but may instead rely on various trigger criteria, as designated by usage expectations (600), to determine when it is considered possible that its associated item (100) is lost (503.0.1), misplaced (503.0.2), misappropriated (503.0.3), wandering (503.0.5), or stolen (503.0.4). Generally, once the BIRD (200) determines that it is possible that its associated item (100) is lost (503.0.1), misplaced (503.0.2), misappropriated (503.0.3), wandering (503.0.5), or stolen (503.0.4), the BIRD (200) will initiate alert and/or reporting measures (465, 475) to notify the user or other person's of the item's anomalous state (503.2).

Determinations in the Absence of Some Desired Forms of Sensor Data

In various embodiments, various forms of sensor data (700) may be desirable for BIRD operations. These include, for example and without limitation: time data, item location data, item motion data, and data pertaining to a variety of other forms of environmental influences, such as light, sound, temperature, and others.

In some instances, desired forms of environmental data may be unavailable for any number of reasons: for reasons of cost, weight, or reduced power usage, a BIRD (200) may be configured with fewer sensors (210) than might ideally be employed; or sensor data (700) may become unavailable, for example because a BIRD sensor's (210) are unable to obtain a desired form of data. (For example, a BIRD (200) may be in a location where it is shielded from GPS and other forms of location data, or an external source of location data may suffer a breakdown of some kind.)

In an embodiment, a BIRD (200) may be configured with alternate or fallback means of determining whether its associated item is extant (503.1) or displaced (503.0).

For example, in an embodiment a BIRD (200) is configured to determine if an item (100) is extant (503.1) or displaced (503.0) based in whole or in part on location data (700.Loc). Conventional external sources of location data, as already noted, may for some reason be unavailable. In this case, a BIRD (200) may employ alternate means to determine if there is a significant likelihood that the item (100) is within or is outside of desired boundaries. In an embodiment, the BIRD (200) may rely on velocity data (a combination of speed and directional information) to determine a total distance the BIRDed-item (102) has travelled since the last time a location could be identified based on external data. There may be a maximum distance that the item (100) is allowed to travel in any direction. For example, an item (100) may have a specified allowed radius of travel. Any travel beyond that specified distance is identified, by the BIRD (200) as meaning that it and its associated item (100) are out-of-bounds (140.OoB).

Similarly, some items (100) may have usage expectations (600) which indicate the item (100) is always kept within some specific facility or building, or on the grounds of the facility or building. Such an item (100) may never, in proper usage, be transported by car or other rapid transit. If the BIRD (200) detects accelerations above a designated acceleration (that is, at motor transport levels rather than human transport levels), this may also trigger a determination that the item is out-of-bounds (140.OoB).

Other Extant States, Displaced States, Usage Habits, and Usage Contexts

Above are presented general criteria for distinguishing a number of displaced item states (503)—lost (503.0.1), misplaced (503.0.2), misappropriated (503.0.3), stolen (503.0.4), and wandering (503.0.5)—both from each other, and from the extant item state (503.1). Persons skilled in the relevant arts will appreciate that these states are sufficient to characterize the possible conditions or usage states (503) of many items (100) commonly used by people, in many of the contexts in which items are normally employed in daily life. As such, these items states (503), and the systems and methods disclosed herein for self-assessment of such states by a BIRDed-item (102), are sufficient to significantly assist an authorized user (AU) in rapidly identifying, and possibly ameliorating, a possible displaced state (503.0) of an item.

At the same time, both the extant (503.1) and displaced (503.0) states defined above, and the criteria for distinguishing such states, are exemplary only and are by no means exhaustive. Persons skilled in the relevant arts will appreciate that for some items (100) with special uses, for some users with special or unusual usage habits, and for some possible usage contexts, it may be necessary to define additional or alternative displacement states (503).

It may also be beneficial to subdivide the state of being extant (503.1) into two or more distinct categories of extant states (503.1). That is, for a single item and a single user, it may be beneficial to define two or more distinct states (503) of normal usage, or two or more distinct conditions of an item being present when and where it should be. For example, an item (100) may be extant-and-in-use, extant-but-dormant, or extant-and-in-storage. In turn, it may be possible to distinguish and identify two or more distinct sub-states of extant-and-in-use.

It may also be necessary to characterize alternative or additional item statuses (501), which can be detected by BIRD sensors (210) or derived from BIRD sensor data (700), in order for a BIRDed-item (102) to self-assess such alternative states of displacement (503.0), or to self-assess additional states (503) of being extant (503.1), or to make self-assessments in certain locations (104.L) or detection contexts (123). Such additional or alternative states (503) of being extant (503.1) or displaced (503.0) fall with the scope and spirit of the present system and method. Equally, alternative or additional statuses (501) for distinguishing extant (503.1) and displaced (503.0) states also fall within the scope and spirit of the present system and method.

Even certain conventional detection contexts (123) and usages may not be fully addressed in all respects by the exemplary methods presented in this document. For example, ascertaining an item's state (503) (as extant (503.1) or displaced (503.0), and which state of displacement (503.0)) with a high confidence level, while the item is in transit with a person as the person is driving or on public transit, may present additional requirements with respect to creating processed data (700.P) from raw sensor data (700). In an embodiment, a BIRD (200) may be assisted in such determinations by automotive data and other travel data which may be provided, via RF signals or other means, from a car or other transit suitably equipped with an internal data distribution node. Person's skilled in the relevant arts will recognize that such additional BIRD data derivations, and concomitant state self-assessments, represent appropriate extensions of the methods described herein, and fall within the scope and spirit of the present teachings, system, and method.

FIG. 5F

First Exemplary Small BIRD Logic Table

FIG. 5F presents a Table 500.S1 of exemplary small BIRD logic (500). The BIRD logic (500) of Table 500.S1 is "small" in the sense that:

- it relies on fewer item statuses (501) than the comparable Table 500.T of FIGS. 5B and 5C;
- it provides fewer item state/state clusters (505) than the comparable Table 500.T of FIGS. 5B and 5C; and finally . . .
- it omits any assessment of the item states (503) of misappropriated (503.0.3) or stolen (503.0.4).

The exemplary BIRD Logic (500) of Table 500.S1 may be desirable in some embodiments and/or uses of a BIRD (200), for example, where one or more of the following factors apply:

- limited sensor capabilities: the BIRD (200) has relatively limited sensor capabilities, such that iteMetric assessments (154) are either not available or would be of limited reliability;
- theft and/or misappropriation unlikely: it is known or anticipated with some confidence that the BIRDed-item (102) which will employ the BIRD logic of Table 500.S1 is unlikely to be stolen (503.0.4) or misappropriated (503.0.3); and/or . . .
- structured item use in time and space: the authorized user (AU) of the BIRDed-item (102) has typical days which are relatively structured in terms of both time and space; meaning that it is anticipated, with substantial reliability, that the BIRDed-item (102) should be in designated expected locations (144.L), during designated time intervals, for significant portions of the day.

Put another, the item (100) and its usage are amenable to detection contexts (123) defined in terms of stable time ranges (105) and expected locations (144.L). Consequently, there are significant parts of the day, relative to the total duration of day, when the BIRDed-item (102) can readily self-assess whether or not it is AWOL (128).

It should also be noted that the "limited sensor capabilities" alluded to above need not be a permanent state of affairs. In an embodiment, a BIRD (200) may have sufficient sensor capabilities to engage in the more extended self-assessments of BIRD logic table (500.T) of FIGS. 5B and 5C, above. However, if some sensor capabilities are temporarily unavailable, or deliberately reduced (for example, for reasons of power conservation), the BIRD (200) may be able to switch to the small BIRD logic (500) of Table 500.S1.

BIRD logic Table 500.S1 has six clusters (505) of item status/state data. Each status/state cluster (505) in the table lists:

- a set of sensed or derived item environmental statuses (501) (AWOL status (128); and combined on-person/off-person status (138) and personal motion status (139)), which all may be potentially obtained from data (700) from BIRD sensors (210), along with . . .
- an associated, self-assessed item state (503) (extant (503.1), misplaced (503.0.2), wandering (503.0.5), or lost (503.0.1)).

In an embodiment, the association between a set of sensed environmental statuses (501) and a consequent, resulting self-assessment of item state (503) constitutes an aspect of BIRD logic (500). The item statuses (501) listed in Table 500.S1 are exemplary only, and should not be construed as limiting in any way.

BIRD Logic

Logic Table 500.S1 lists six possible combinations of item states (503) with respect to the exemplary item statuses (501) listed above. These six combinations are a consequence of possible combinations of:

- two AWOL statuses (128) (AWOL (yes) or not AWOL (no)); and
- three combined on-person or off-person statuses (138) and personal motion statuses (139): on-person, user-movement (138.OnP, 139.UM); off-person, stationary (138.OffP, 139.StaT); or off-person, stagnant (138.OffP, 139.StG) (off-person for longer than that stationary limit (133)).

The detection contexts (123) and/or the usage expectations (600) for the item (100) define the allowed location categories (140) associated with the item (100); and also the parameters for AWOL status (128); and also identify the stationary limit (133).

The BIRD's usage data (700.U) for the item provides both the raw and processed environmental data which are compared against the detection contexts (123) and/or associated usage expectations (600) to make item status assessments (501).

Cluster ID numbers (S1.1, S1.2, S1.3, S1.4, S1.5, S1.6): It will be noted that in the table (500.T) of exemplary BIRD logic (500), the six distinct clusters of logic combinations are identified or labeled by a letter-number combination.

Extant States

Two of the six clusters (505) result in an assessment that the item (100) is extant (503.1), meaning generally that the item is located where it is expected to be (either with the authorized user (AU) or in storage), or is in use as expected to be, when it is expected to be in such location and/or use.

The two extant clusters in Table 500.S1 of exemplary BIRD logic (500) are S1.1 and S1.2. In these clusters, the BIRDed-item (102) self-assesses that:

- not AWOL: the item (100) is not AWOL (128), meaning it is where it is supposed to be at the current time (104.T); and
- on-person or off-person, but not stagnant: the item (100) is either on-person (138.OnP) or off-person (138.OffP), but the item is not stagnant (139.StG);

Misplaced State

One of the six clusters, cluster S1.3, results in a self-assessment that the BIRDed-item (102) is misplaced (503.0.3). In cluster S1.3, the BIRDed-item (102) is not AWOL (128)—so the item (100) is where it should be, when it should be—but it has been off-person (138.OffP) for longer than the stationary limit (133), and so is stagnant (139.StG). This suggests the user has put the item down, and possibly forgotten about the item (100).

Extant/Wandering State

One of the six clusters, cluster S1.4, results in a self-assessment that the BIRDed-item (102) is either extant (503.1) or wandering (503.0.5). The item (100) is AWOL (128)—meaning the item is not where it is supposed to be at the current time (104.T)—but the item is on-person (138.OnP). For purposes of this small BIRD logic (500), when the item is on-person (138.OnP), it is presumed that the person is an authorized user (AU).

Since the item (100) is on-person (138.OnP), it may be extant (503.1). However, since the item (100) is not where it's supposed to be, the person may have taken the item (100) where it should not be, meaning the item is wandering (503.0.5).

Suitable BIRD song (900) may be devised to alert the user to the extant/wandering state (503.1/503.0.5) of the item (100), and to seek appropriate responses from the user.

Wandering/Lost State

One of the six clusters, S1.5, results in a self-assessment that the BIRDed-item (102) is either wandering or lost (503.0.1). The item is AWOL (128)—meaning the item is not where it is supposed to be at the current time (104.T)—and the item is off-person (138.OffP) but not yet stagnant (139.StG).

Since the item is not where it's supposed to be, the person may have taken the item (100) where it should not be, meaning the item (100) is at least wandering (503.0.5). Since the item is off-person (138.OffP), it may be lost as well, but since the stationary time limit (133) has not expired (the item is not yet stagnant (139.StG)), the user may simply have set the item down briefly.

Suitable BIRD song (900) may be devised to alert the user to the wandering/lost state (503.0.5/503.0.1) of the item (100), and to seek appropriate responses from the user or other persons near the possibly lost item.

Lost State

One of the six clusters, S1.6, results in a self-assessment that the BIRDed-item (102) is lost (503.0.1). The item is AWOL (128)—meaning the item is not where it is supposed to be at the current time (104.T)—and further the item is off-person (138.OffP) and stagnant (139.StG).

Since the item (100) is not where it's supposed to be, and has been left lying about longer than expected (the item is stagnant (139.StG), the BIRD logic Table 500.S1 self-assesses the item (100) as being lost (503.0.1). Suitable BIRD song (900) may be devised to alert the user to the lost state (503.0.1) of the item (100) (via remote reporting), and possibly to seek appropriate responses from other persons near the lost item.

Simple Application

While not illustrated in FIG. 5F, a simple application of the small BIRD logic in Table 500.S1 can readily be envisioned. A user—say, a student—has a cell phone (100.Act.CP) with integrated BIRD technology (200.Act). The cell phone (100.Act.CP) is configured with the student's class schedule, and also with the location of the classrooms.

Suppose the student leaves the cell phone (100.Act.CP) behind while leaving the class. The integrated BIRD technology (200.Act) will shortly recognize that: (i) the cell phone (100.Act.CP) should no longer be in the classroom, and (ii) the cell phone is lying around (stationary (139.Stat) and/or stagnant (139.StG)). These conditions correspond to clusters S1.5 and S1.6 of Table 500.S1. The cell phone (100.Act.CP) with its integrated BIRD technology (200.Act) may have BIRD song (900) responses which may include, for example and without limitation: (i) Sending an e-mail or text message to the student's computer; (ii) Sending an e-mail or text message to a LARC (355); and/or (iii) emitting a local signal to alert other students to the lost phone. Since, according the Platonic theory, education leads to morals, the nearby students may be relied upon to return the cell phone (100.Act.CP) either to the appropriate owner, or at least to the school's lost and found.

FIG. 5G

Exemplary Method for First Exemplary Small Bird Logic

FIG. 5G presents a flowchart of a fourth exemplary method 500.4[Meth] of BIRD logic, used for applying the exemplary BIRD logic (500) as embodied in the Table 500.S1 of small BIRD logic of FIG. 5F.

Method 500.4[Meth] begins with step 500.4.1. In step 500.4.1, the BIRD (200) identifies the current time and date (104.T), and also the current expected, authorized user (AU) (based, for example, on the most recent biometric login).

In step 500.4.3, the BIRD (200) extracts from the usage expectations (600) the current expected usage (CUE) parameters (483) which are required to determine if the BIRDed-item (102) is extant (503.1) or displaced (503.0). The current expected usage (CUE) parameters (483) extracted from the usage expectations (600) include principally the current expected location; and suitable AWOL (128) criteria (the time or time range (105) when the item (100) should be in the current expected location), if any.

In step 500.4.5, the BIRDed-item (102) compares its current location data (700.Loc) against the expected location data (600.Loc), and determines if the item (100) is outside of the expected location (600.Loc) (AWOL status (128)="Yes"); or if the item is within the expected location (600.Loc) (AWOL status (128)="No").

In step 500.4.7, the BIRDed-item (102) determines if it is on-person (138.OnP) (which may be any of in-hand, in pocket, worn on-person, in a purse or backpack which is itself being carried on-person, etc.) or not. In an embodiment, this determination is made by detecting whether or not the BIRDed-item (102) is subject to motions associated with being on a person. In an alternative embodiment, the determination of whether or not the item is on-person (138.OnP) may be made based on other sensor readings.

If in step 500.4.7 a determination is made that the item (100) is on-person (138.OnP), the method proceeds directly to step 500.4.11. If in step 500.4.7 a determination is made that the item (100) is off-person (138.OffP), the method proceeds first to step 500.4.9.

Step 500.4.9 applies to an off-person (138.OffP) item (100). In this step, the BIRDed-item (102) determines if it has been stationary (139.Stat) for more or less than stationary limit (133). (The stationary limit (133) is specified in usage expectations (600).) If the item (100) has been stationary (139.Stat) for no more than the stationary limit (133), the item (100) is simply stationary (139.Stat). If the item (100) has been stationary (139.Stat) for more than the stationary limit (133), the item is not only stationary (139.Stat), it is also stagnant (139.StG).

In step 500.4.11, the BIRD (200) utilizes the condition determinations (501) resulting from steps 500.4.5, 500.4.7, and 500.4.9, regarding AWOL status (128), on-person/off-person status (138), and (if applicable) stationary or stagnant status (139). Based on these determinations of specific item statuses (501), the BIRD (200) identifies a corresponding item status/state cluster (505) in a stored table of BIRD logic (500). For example, the BIRD (200) may identify a corresponding item status/state cluster—that is, one cluster (505) from among clusters labeled S1.1, S1.2, S1.3, S1.4, S1.5, S1.6—in a table such as Table 500.S1, discussed above in conjunction with FIG. 5F. The BIRD (200) identifies a single item status/state cluster (505) which corresponds to the currently identified statuses (501) of the BIRDed-item (102), as obtained in steps 500.4.5, 500.4.7, and 500.4.9.

In step 500.4.14 the BIRD (200) obtains, from the item status/state cluster (505) determined in step 500.4.11, a specific assessed item state (503). This assessed item state (503) can then serve as a basis to determine responses by BIRD song (900).

In an embodiment, the method then repeats throughout field use, returning to step at least one of steps 500.4.1, 500.4.3, or 500.4.5, at functionally useful intervals (which may be multiple times per second, at least once every few seconds, or once per minute, or at other designated time intervals). It will also be understood that while various item status determinations (501)—on-person/off-person (138), AWOL status (128), stationary or stagnant (139)—are shown in particular sequences, these determinations (501) may in different embodiments be made in different orders, or may be made in whole or in part in parallel with each other.

FIG. 5H

Second Exemplary Small BIRD Logic Table

FIG. 5H presents another Table 500.S2 of exemplary small BIRD logic (500). The BIRD logic (500) of Table 500.S2 is "small" in the sense that:

- it relics on fewer item statuses (501) than the comparable table 500.T of FIGS. 5B and 5C;
- it provides fewer item state/state clusters (505) than the comparable table 500.T of FIGS. 5B and 5C; and finally . . .
- it completely omits any assessment of the item state of wandering (503.0.5).

The exemplary BIRD Logic (500) of Table 500.S2 may be desirable in some embodiments and/or uses of a BIRD (200), for example, where one or more of the following factors apply:

- limited location sensor capabilities: the BIRD (200) has relatively limited location sensor capabilities (or no such capabilities), such that location statuses (140) and/or AWOL statuses (128) are either not available or would be of limited reliability;
- limited ability to anticipate location: it is known or anticipated, by the authorized user (AU), that meaningful location usage expectations (600.Loc) cannot be provided with any degree of useful specificity; or in the alternative, that detection contexts (123) may be defined based on time and possibly other factors, but cannot be reliably defined based on useful (sufficiently specific) location boundaries.

The latter situation may occur if the authorized user (AU) anticipates using the BIRDed-item (102) over a wide geographic area, possibly with limited ability to specify expected geographic boundaries (144.L). For example, if the authorized user (AU) is either on vacation or business travel, possibly with a very loose or flexible schedule, the authorized user (AU) may be able to specify by way of ExD criteria (160): "I, and my BIRDed-items (102), will be someplace in Brazil, but other than that, location cannot be anticipated." In turn, "Brazil," is such a large area that location-related assessments of item state (503) may be of limited practical value.

(Possibly, the authorized user (AU) may be able to specify some detection contexts (123) with expected location information (144.L), for example evening/nighttime hotel locations (and associated detection contexts (123)): but daytime plans may be so fluid that separate detection contexts (123) for the days, and associated usage expectations (600), may not include expected location information (144.L).)

Under such circumstances, however, the authorized user (AU) may still be able to specify various aspects of usage expectations (600). For example, the authorized user (AU) may be able to specify (or has previously established) his or her personal iteMetrics (154), and may also be able to specify the stationary limits (133) for various items (100). The exemplary BIRD logic (500) of Table 500.S2 of FIG. 5H may be applicable in such circumstances.

It should also be noted that the "limited sensor capabilities" alluded to above need not be a permanent state of affairs. In an embodiment, a BIRD (200) may have sufficient sensor capabilities to engage in the more extended self-assessments of BIRD logic table (500.T) of FIGS. 5B and 5C, above. However, if some sensor capabilities are temporarily unavailable, or deliberately reduced (for example, for reasons of power conservation), the BIRD (200) may be able to switch to the small BIRD logic (500) of Table 500.S2.

BIRD logic Table 500.S2 has six clusters (505) of item status/state data. Each status/state cluster (505) in the table lists:

- a set of sensed or derived item environmental statuses (501) (combined iteMetrics (154) and associated authorized user status (131); and combined on-person/off-person status (138) and personal motion status (139)), which all may be potentially obtained from readings from BIRD sensors (210), along with . . .
- an associated, self-assessed item state (503) (extant (503.1), misplaced (503.0.2), wandering (503.0.5), or lost (503.0.1)).

In an embodiment, the association between a set of sensed environmental statuses (501) and a consequent, resulting self-assessment of item state (503) constitutes an aspect of BIRD logic (500).

The item statuses (501) listed in Table 500.S2 are exemplary only, and should not be construed as limiting in any way.

BIRD Logic

Logic Table 500.S2 lists six possible item states (503) outcomes with respect to the exemplary item statuses (501) listed in the table. These six combinations are a consequence of possible combinations of:

- two authorized user statuses (131) (authorized user (AU) or unauthorized user (UU)), which in an embodiment are determined based on iteMetrics (154); and
- three combined personal motion (139) and on-person or off-person (138) statuses: on a person, user-movement (138.OnP, 139.UM); off-person, stationary (138.OffP, 139.StaT); or off-person, stagnant (138.OffP, 139.StG) (off-person for longer than the stationary limit (133)).

The usage expectations (600) for the item (100) define the iteMetrics (154), as well as the stationary limit (133) which distinguishes between stationary (139.StaT) and stagnant (139.StG).

The BIRD's usage data (700.U) for the item provides both the raw and processed environmental data which are compared against the usage expectations (600) to make item status assessments (501).

Cluster ID numbers (S2.1, S2.2, S2.3, S2.4, S2.5, S2.6): It will be noted that in the table (500.S2) of exemplary BIRD logic (500), the six distinct clusters of logic combinations are identified or labeled by a letter-number combination.

Extant States

Two of the six clusters (505) result in an assessment that the item (100) is extant (503.1), meaning here that the item (100) is associated with authorized user (AU), or is in use as expected to be, when it is expected to be.

The two extant clusters in Table 500.S2 are S2.1 and S2.2. In these clusters, the BIRDed-item (102) self-assesses that:

- authorized user: the item (100) is with the authorized user (AU); and
- on-person or off-person, but not stagnant: the item (100) is either on-person (138.OnP) (determined, in an embodiment, by personal (user) motion impinging on the item) or off-person (138.OffP) (determined, in an embodiment, by the item being stationary (139.StaT)), but the item (100) is not stagnant (139.StG).

In principal, the item (100) could be with the authorized user (AU) but still be wandering (503.0.5). However, since location determination is excluded from this embodiment of BIRD logic (500), no attempt is made to indicate a wandering state (503.0.5).

Misplaced/Lost State

One of the six clusters, cluster S2.3, results in a self-assessment that the BIRDed-item (102) is either misplaced (503.0.3) or lost (503.0.1). In cluster S2.3, the BIRDed-item (102) was last associated with the authorized user (AU), but has been lying still for longer than the station limit (133), and so is stagnant (139.StG). This suggests the user has put the item down, and possibly forgotten about the item (100) or left it behind someplace.

Stolen/Misappropriated

Three of the six clusters, clusters S2.4, S2.5, and S2.6, result in a self-assessment that the BIRDed-item (102) is either stolen (503.0.4) or misappropriated (503.0.3).

The item (100) is either associated with an unauthorized user (UU); or was last associated with an unauthorized user (UU) and is now either stationary (139.StaT) or stagnant (139.StG). Whether on-person (138.OnP) or off-person (139.OffP), the association with an unauthorized user (UU) is taken to indicate theft or misappropriation.

Associated Methods

While not illustrated in the figure, methods the same or substantially similar to those discussed above (500.1[Meth], 500.2[Meth], 500.3[Meth], 500.4[Meth]) may be used by the BIRD (200) to apply the BIRD logic (500) of Table 500.S2 to the process of BIRDed-item state self-assessment. Suitable adaptations to the methods above will of course be made in view of the specific item statuses (501) which are employed or omitted by Table 500.S2, relative to the statuses employed by the related methods above.

Method 500.1[Meth], discussed above in conjunction with FIG. 5A, is generally applicable. The item statuses (501) to be identified in step 506 will be the authorized user status (131) and the combined on-person/off-person (138) and personal motion (139) statuses. The actual, current statuses will be determined, as per steps 508, 510, 512, and 514, by comparing the current usage data (700.U) against expected data values indicated by usage expectations (600). Once all status types (501) are processed, with resulting, specific status values, step 518 assesses the current item state (503) by looking up the values in BIRD logic Table 500.S2.

FIG. 5I

Exemplary BIRD Operating System

FIG. 5I presents a block diagram of an exemplary operating system (OS), the BIRD OS (550), for a BIRD (200). The diagram presents features of the operating system in a conventional layered structure, with low-level, hardware-oriented operating system components towards the bottom of the figure and higher level, program-oriented services and user-oriented services progressively closer to the top of the figure. It will be understood by persons skilled in the relevant arts that actual operating system architectures may vary substantially, and the suggested relation of software modules within the BIRD operating system (550), as well as the choice of modules, is exemplary only.

BIRD Hardware and Resource Management

A Hardware Drivers layer (552) contains software necessary to support the initialization, operations, and interaction of the BIRD's hardware, including the processor (204), main memory (206.M), the clock/calendar/timer (208), the various environmental sensors (210), the power monitor (218), the communications interface (220), the item link integrity detection hardware (224), the local I/O interface (280), and secondary memory (206.S). In an embodiment, sensors (210) may be added to and removed from the BIRD (200) in real time; for at least this reason, the BIRD OS (550) may be capable of loading and unloading appropriate hardware driver software, in real time, into the hardware driver layer (552). The Hardware Driver layer (552) may also establish or maintain memory addresses, interrupts, and/or other means or data structures required for accessing and controlling the BIRD's hardware.

A Hardware Resource Management layer (554) may provide a variety of general BIRD system services, including for example and without limitation: management of storage media (290, 294); management of the display (282.D) and/or other local inputs (282.B, 282.L, 282.M); allocation, management, control and protection of memory (206); file management; process management and multitasking support for having more than one process run in parallel; interprocess communications; virtual machine implementations; exception handling; and interpretation of user inputs via local inputs (282). The Hardware Resource Management layer (554) may establish memory addresses, interrupts, or other means or data structures required for accessing its own low-level services, for mediated access to hardware and the hardware drivers (552), and also for accessing modules and services provided by other operating system elements, as described immediately below.

Together, the Hardware Drivers layer (552) and the Hardware Resource Management layer (554) provide services which are generally analogous to those provided by device drivers and BIOS services associated with contemporary computers. These hardware-oriented functions support the services and artificial intelligence features which may be provided elsewhere in the BIRD operating system (550), as described immediately below and throughout this document.

BIRD System Services

In an embodiment, the BIRD OS (550) includes a variety of system services (556) which may be loaded or run from the main memory (206.M) or the secondary memory (206.S). The system services may run on the processor (204). One or more of the system services (556) may also be implemented via dedicated processors or specialized modules within the processor (204). The system services (556) may in turn utilize services provided the BIRD Resources Management layer (554) or directly from the hardware drivers (552).

In an embodiment, system services operations may be accessed through application programming interfaces (APIs). Some exemplary APIs are discussed below in this document (see for examples FIGS. 8C and 9C). In an embodiment, some or all system services (556) may only be private, and so only available internally within the BIRD (200), that is, the services may only be utilized by other software integral to the BIRD (200) itself. In an alternative embodiment, some or all system services (556) may be accessible, in whole or in part, to third party software and/or to external processors accessing the BIRD (200) via external ports, transceivers, or other interfaces (226, 240).

Exemplary system services (556) may include, for example and without limitation:

Sensor Data Relay and Control (558)—Relays sensor data (700) from the environmental sensors (210). Other BIRD software and system services may obtain, via this service, such data as BIRD location, BIRD motion, BIRD exposure levels to light or sound, etc. This service may also provide control of the sensors (210), such as powering a sensor on or off, calibrating or fine-tuning sensor operations, or activating specific sensor operations (for example, initiating the taking of a picture by the camera (210.C), interrogating RFID tags via the RFID Interrogator (210.RFID), etc.). In particular, the Real-Time Monitoring module (486) of BIRD logic (500) (see FIG. 4D) may obtain sensor data (700) via this service. Some or all of the exemplary BIRD sensing API (870), discussed further below in conjunction with FIG. 8C, may be an element of the Sensor Data Relay and Control services (558).

Digital Signal Processing (DSP)/Neural Network/Advanced Math (560)—In an embodiment, BIRD capabilities for digital signal processing (DSP), neural network modeling, and other advanced mathematical operations (such as Fourier transforms, Wavelet analysis, and other tools) are implemented in whole or in part in software, and are available as operating system services. In an alternative embodiment, any or all of DSP operations, neural network processing, or other advanced math are implemented via dedicated hardware, access to which may be mediated via a DSP/Neural Network/Advanced math module (560) of the BIRD OS (550). Some of the operations associated with method 455[Meth], such as correlation calculations (812.9) or trend calculations (812.T), discussed further below in conjunction with FIG. 8A, may be an element of the Digital Signal Processing (DSP)/Neural Network/Advanced Math services (560). Some or all of the exemplary BIRD sensing API (870), discussed further below in conjunction with FIG. 8C, may also be elements of Digital Signal Processing (DSP)/Neural Network/Advanced Math services (560). For example, pattern matching services and functions such as imageMatch (892) or compareSounds (894) may be implemented through these services. Other data pattern detection may be implemented through these services as well.

Usage Expectation Access/Interpreter (562)—Usage expectations (600), discussed extensively throughout this document, provide item-specific and user-specific representations of expected environments (144) and/or expected usages (144) for an item (100). (In some alternative embodiments, the usage expectations (600) may be expressed in terms of anomalous environments or anomalous usages for an item (100).) In operation, a BIRD (200) needs to retrieve from memory appropriate usage expectations (600), which may vary depending on item context (for example, time, date and/or location). The Usage Expectation Access/Interpreter (562) may provide services dedicated to the retrieval of appropriate usage expectations (600).

In addition, the Usage expectation Access/Interpreter (562) may provide other services related to usage expectations (600), including for example and without limitation:

Modifying previously established usage expectations "on the fly"—that is, as needed—in response to user input that daily plans or daily activities will change from past or customary plans/activities;

Accepting usage expectations (600) which are coded in a natural language or semi-natural language format (a usage expectation "source code"), and translating the usage expectation source code into lower-level computer code or machine language;

Determining, during a training or training session, normal and/or anomalous sensor readings for an item (100); and translating these determined sensor readings into appropriate usage expectations (600) for the item (100).

In an embodiment, some algorithms or elements of the latter services (identifying appropriate usage expectations (600) based on sensor readings) may instead be apportioned, in part or in whole, to the BIRD logic (500) layer of the OS (550).

The Usage Expectation Access/Interpreter (562) may provide other services as well.

Item Control and Security (564)—In an embodiment, an active item BIRD (200.Act) may be integrated into an active item (100.Act), broadly understood as an item (100) which inherently incorporates a processor, memory, and other data-management/data-communications electronics as part of its standard operations. Active items (100.Act) are discussed further below in conjunction with FIGS. 13A-13C, and other figures throughout this document. In an alternative embodiment, a BIRD (200) may be integrated into passive items (100) which, conventionally, do not incorporate data processing capabilities, but which may be enhanced through the addition of such capabilities. See for example FIGS. 17A-17G, and 18A-18C and associated discussion, below, as well as other figures throughout this document.

In either case—active items (100.Act) or processor-enhanced passive items (100)—an active item BIRD (200.Act) may be configured to modify item capabilities or access upon a determination that the item (100) is in some kind of displaced state (503.0) or anomalous state (503.2). For example, upon a determination that a cell phone (100.Act.CP) may be stolen (503.0.4), the active item BIRD (200.Act) may shut down calling capabilities until the current user can verify access rights (for example, via biometric identification or a password). Upon a determination that a briefcase (100.C) may be stolen (503.0.4), the active item BIRD (200.Act) may activate a feature to automatically lock the briefcase (if unlocked to begin with), requiring the user to enter a correct lock combination or use a key to open the briefcase.

The processing required for such control features may be provided through the operating system's Item Control and Security services (564).

Communications (566)—A BIRD (200) may have one or more hardware means for digital communications and local signaling, such as ports (226), local signaling (230), and remote communications transceivers (240). Communications services (566) may provide an API for controlling these resources, and for sending and receiving signals and messages (374).

BIRD Security (568)—In an embodiment, a BIRD (200) is configured with a variety of features to ensure that only an authorized user (AU) can control critical BIRD operations. For example, the BIRD (200) may be configured so that only an authorized user (AU) can change various configuration options, set or modify usage expectations (600), power-on the BIRD or power-down the BIRD, etc. BIRD Security services (568) may provide API function calls for implementing these security features.

In an embodiment, a BIRD (200) may be configured to interface with various network services (see for examples FIGS. 3D and 3E), as well as with other BIRD (200) in an item team (1400). As such, the BIRD (200) faces risks of exposure to computer viruses and also exposure to various hacking attacks. BIRD Security (568) may provide firewall and anti-virus services to limit such system vulnerabilities. BIRD Security services (568) may provide API function calls for implementing these security features, or for regulation of the firewall/anti-virus features by an authorized user (AU).

In an embodiment, the BIRD Security services (568) may utilize and/or be utilized by other BIRD services (556), such as Third Party Control (574), User Identity Management (578), and other services.

Local Signal/Alert System (570)—In an embodiment, and upon a determination that its associated item (100) may be in a displaced/anomalous state (503.0/503.2), the BIRD (200) may issue a local signal or alert. These local signals/alerts (372) may be issued via local signaling (230) and/or display (282.D). The Local Signal/Alert System (570) provides services and a service API for triggering and configuring such signals/alerts (372). A function (974) which may be part of an exemplary messaging and signaling API (970) is presented in FIG. 9C, below.

Remote Messaging System (572)—In an embodiment, and upon a determination that its associated item (100) may be in a displaced/anomalous state (503.0/503.2), the BIRD (200) may transmit a message or report to one or more different remote reporting centers or other remote elements (335, 340, 345, 355, 365, 1400). The remote messages or reports (374) may be transmitted via remote communications transceivers (240). The Remote Messaging System (572) provides services and a messaging API for triggering and controlling such messages/reports (374), including message/report recipients and message/report contents. A function (974) which may be part of an exemplary messaging and signaling API (970) is presented in FIG. 9C, below.

Third Party Control (574)—In an embodiment, if a BIRDed-item (102) self-determines that it is in some displaced state (503.0)—for example, lost or stolen—the BIRD may be configured to transfer some or all control of itself to a remote third party (for example, a Lost/Anomalous Reporting Center (355), or to an authorize user's cell phone (340), computer (335, 345), etc.). Third Party Control services (574) may determine or help determine when control is transferred to a remote third party, and what kinds of access and control the remote third party has over the BIRD (200).

Item Identity Management (576)—In an embodiment, a single BIRD (200) may be associated with different items (100) at different times. Item Identify Management services (576) are associated with establishing the identity of the item (100) with which the BIRD (200) is currently associated. In an embodiment, Item Identity Management services (576) must be substantially managed by an authorized user (AU), who employs various user interface means to identify, to the BIRD (200), the item (100) to which it is attached. In an alternative embodiment, a BIRD (200) may have means for identifying the item (100) to which it is currently connected. The Item Identity Management services (576) manage these identification means, and determine the item (100) to which the BIRD (200) is tethered.

User Identity Management (578)—In an embodiment, a BIRD (200) is configured not only to be associated with a particular item (100), but with the use of that item (100) by a particular authorized user (AU) or a limited group of authorized users (AU).

The BIRD (200) may be configured to authenticate the identity of an authorized user (AU) at predetermined intervals or points in time (for example, such as the beginning of each day, before an item (100) is removed from the home). During the course of a day or other time interval, the BIRD (200) may also be configured to re-authenticate that the BIRD (200) and associated item (100) are still with the authorized user (AU). User authentication is discussed in conjunction with FIG. 1J and other figures throughout this document.

User authentication may occur through device interface biometrics (DIB) such as password validation (via typing or speech), fingerprint or eye-scan biometrics (282.B), facial recognition via the camera (210.C), and voiceprint identification via the microphone (282.M). User Identity Management services (578) may provide services, algorithms, and APIs in support of user authentication and the associated hardware (biometrics (282.B), the camera (210.C), the microphone (282.M), etc.

In an embodiment, ongoing, real-time user validation may also be accomplished via iteMetrics (154), as discussed in conjunction with FIG. 1J and other figures throughout this document. User Identity Management services (578) may provide software support, in the form of pattern recognition algorithms, motion analysis algorithms, facial recognition algorithms, and other algorithms and APIs for both morphIteMetrics (156) and psyIteMetrics (158). User Identity Management services (578) may also provide interfaces to any specialized hardware processing elements (in processor (204), or other dedicated BIRD processors) which support iteMetrics.

In support of its services, User Identity Management services (578) may in turn draw upon resources from other system services (556), such as the Usage Expectation Access/Interpreter module (562), Sensor Data Relay and Control (558), DSP/Neural Network/Advanced Math (560), and other services (556) as well.

User Interface Control (580)—In an embodiment, a BIRD (200) has a variety of user interface features for local control of the BIRD (200). These local control features may include elements of local I/O (282), and various external buttons and controls (221, 222, 223, 225). User Interface Control services (580) may provide interrupts and/or an API for detecting user interactions with local I/O (282), and with the external buttons and controls (221, 222, 223, 225), and for triggering appropriate system responses by the BIRD (200). The User Interface Control services (580) may also have services and APIs used to regulate output qualities of the BIRD (200), such as intensity or brightness of the display (282.D), the volume of audio output from the audio signaling (230.A), the output qualities of optical signaling (230.P), and so on.

- Item Team Interface and Management (582)—In an embodiment, a BIRD (200) may be a member of a team of BIRDs, referred to as an item team (1400). Item teams (1400) are discussed further below in conjunction with FIGS. 14A-14I and other figures throughout this document. In an embodiment, the Item Team Interface and Management services (582) support a BIRD's interactions with, monitoring of, and possible alerting/reporting in relation to other members of an item team (1400).
- Active Item Interface and Management (584)—In an embodiment, an active item BIRD (200.Act) may be integrated into an active item (100.Act), broadly understood as an item (100) which inherently incorporate a processor, memory, and other data-management/data-communications electronics as part of its standard operations. Active items (100.Act) are discussed further below in conjunction with FIGS. 13A-13C, and other figures throughout this document. In an embodiment an active item BIRD (200.Act) which is either coupled to, or integrated into, an active item (100.Act) employs internal operations data from the item, as one aspect (among others) of determining if the item is in an extant/normal state (503.1/503.3) or a displaced/anomalous state (503.0/503.2). The coupled or integrated active item BIRD (200.Act) may also modify activities of the active item (100.Act) in response to various determinations (possibly in conjunction with Item Control and Security services (564), discussed above). The Active Item Interface and Management services (584) support these aspects and others of the BIRD/active item integration.
- Natural Language Processing (586)—In an embodiment, a BIRD (200) may be configured to process local user input via natural language processing of voice commands. In an embodiment, such natural language processing may be in addition to input via other means, such as a display (282.D), keyboard (282.L), and various other buttons and controls (221, 222, 223, 225). In an alternative embodiment, natural language processing may be used as the sole or primary means of local user control, eliminating or reducing the need for other input elements (display (282.D), keyboard (282.L), and various other buttons and controls (221, 222, 223, 225)). Microphone 282.M may be used for voice input. In an embodiment, and in part to reduce both memory requirements and processing power, natural language processing may have limited capabilities, such as recognizing only a limited vocabulary of control words or phrases. Natural language processing may be managed through an appropriate API and functions of a Natural Language Processing service (586).

Other System Services:

Other system services, not illustrated, may be envisioned as well. For example, in an embodiment, a dedicated module may be dedicated to management of BIRD user interface biometrics (282.B), thereby supporting the recognition of authorized users (AU) via fingerprints, voiceprints, image recognition, or iris scans, etc. In an alternative embodiment, biometrics management may be an element of one or more other modules, such as Sensor Data Relay and Control (558), Item Control and Security (564), User Interface Control (580), or User Identity Management (578).

BIRD Logic

BIRD Logic (500), discussed throughout this document, may include a variety of processing modules, algorithms and methods employed by the BIRD (200) to self-determine when an associated item (100) is extant (503.1) (present when and where expected) or is displaced (503.0) (lost, misplaced, misappropriated, wandering, or stolen); or more generally, BIRD logic (500) includes the algorithms and methods employed by the BIRD (200) to distinguish an item (100) which is in a normal environment or normal state (503.3) of use from when the same item which is an anomalous environment or anomalous state (503.2) of use.

BIRD logic (500) may also include algorithms and methods to determine—or to assist an authorized user (AU) or a configuration computer (335) in determining—which kinds of sensor readings, and what values of sensor readings, are indicative of extant/normal states (503.1/503.3) vs. displaced/anomalous states (503.0/503.2). In an embodiment, BIRD logic (500) is an integrated element of the BIRD OS (550). In an alternative embodiment, BIRD logic (500) may be an application program running on top of the BIRD OS (550). The BIRD logic application program (500) may be loaded via an executable loader (not illustrated) of the operating system. In performing its functions, the BIRD logic (500) may draw upon elements provided by other system services (556), such as the exemplary system services described above.

BIRD Navigation

BIRD Navigation (1000) is discussed throughout this document (see for example FIGS. 4A-4B, 6A-6F, 10A-10I, 11A-11C, and other figures throughout this document). BIRD Navigation (1000) provides system services and APIs for identifying usage expectations (600). BIRD Navigation (1000) may be supported by various system services (556), including Sensor Data Relay and Control (568), DSP/Neural Network/Advanced Math (560), Usage Expectation Access/Interpreter (562), and others.

BIRD Song

BIRD song (900) is discussed throughout this document (see for example FIGS. 4A-4D and FIG. 9B-9C). BIRD song (900) provides system services and routines for signaling or reporting that the BIRDed-item (102) may be displaced/anomalous (503.0/503.2), as well as other procedures responsive to a displaced/anomalous state (503.0/503.2). In an alternative embodiment, BIRD song (900) may also provide for signaling, reporting, and/or other response to an extant/normal state (503.1/503.3). BIRD song (900) may be supported by various system services (556), including BIRD Security (568), Item Control and Security (564), Remote Message System (572), Third Party Control (574), Item Team Interface and Management (582), Active Item Interface and Management (584), and others.

Public Application Programming Interface (API)

A BIRD (200) may contain numerous system services, software routines, hardware functions, and hardware and software operations, as discussed here in conjunction with FIG. 5I and elsewhere throughout this document. In an embodiment, either all of these services, routines, functions, and operations, or a subset of these services, routines, functions, and operations, may be made accessible to third-party computer programmers (and their computer programs). Such access to BIRD services, routines, functions, and operations may enable third-party programmers to provide additional, alternative, or enhanced software for the BIRD (200).

As is well known in the art, access to the services, routines, functions, and operations of a computational system is generally provided through a public application programming interface (API). Such a public API may come in the form of documented function calls which may be employed in third-party programs written in such languages as C++, Java, and other languages well-known in the art. Such programs, once loaded into BIRD memory (206), or linked to the BIRD via, for example, a configuration computer (335), may control some BIRD operations via the API function calls.

The BIRD's Public API (590) is the collection of internal system services, software routines, hardware functions, and hardware and software operations which are made available for use by third-party computer programmers and their computer programs. For example, some or all of the exemplary function calls 870, 970, shown in FIGS. 8C and 9C respectively, as well as other functions, algorithms, methods and routines taught throughout this document, may be part of a BIRD's public API (590).

In an embodiment, other elements of BIRD operations made be made available via the public API as well. For example, a table of BIRD logic (500), such as the exemplary Table 500.T of FIGS. 5B and 5C—or BIRD data structures or BIRD internal code for implementing such a logic table—made also be made available for modification or enlargement/enhancement via the public API (590), either via direct memory access or via suitable BIRD API function calls.

BIRD User Interface

A BIRD (200) may have a user interface, which may include, for example and without limitation:

- general parameters to control responses to user input via interface elements (282);
- in particular, display elements for presentation on the BIRD's display (282.D);
- in particular, responses to user inputs via biometrics (282.B), the display (282.D) (which may for example be a touch-screen display), local input (282.L), and the microphone (282.M);
- graphical user display elements and other user-interface elements for presentation via a configuration computer (335) which may be linked to the BIRD (200).

A BIRD user interface module may contain the necessary code, routines, and functions to support these user-interface operations and requirements.

Other BIRD Operating System Considerations

In an embodiment, a BIRD (200) is a substantially dedicated device, meaning it functions principally or exclusively for the self-determination of an associated item (100) as extant/normal (503.1/503.3) or displaced/anomalous (503.0/503.2). In such an embodiment, most or all of the necessary BIRD software components may be fully integrated into the BIRD operating system (550). Part or all of the operating system software (550) may be stored in and/or loaded from NVRAM (206.M.N) or ROM/EEPROM/Flash memory (206.M.R). In an alternative embodiment, some or all of the BIRD OS (550) may be stored on and/or loaded from the BIRD's secondary memory (206.S) or a removable storage unit (206.RSU).

The BIRD (200) operating system (550) may have a program loader, code loader, program or code translator or interpreter, intermediate code translator or interpretation, and/or memory management modules, all associated with the loading and management of system software which can be run by the BIRD (200). In an embodiment, the program-loading/program-management elements may enable the BIRD (200) to load third-party programs as well.

In an alternative embodiment, a BIRD (200) may have other significant functions as well. Or, as discussed in detail below in this document, an active item BIRD (200.Act) may be coupled with, or be an integrated element of, an active item (100.Act). In such embodiments, some or all elements of the BIRD OS (550) may be integrated into an operating system otherwise associated with the active item (100.Act). In an alternative embodiment of an active item (100.Act), some or all elements of the BIRD OS (550) may be implemented as application software running on top of the native active item operating system. In particular, in an embodiment, some or all elements of BIRD logic (500) may be implemented as an application program running on top of the general, native active item (100.Act) operating system.

FIG. 6A

Exemplary Usage Expectations

Usage expectations (600) were introduced above (see for example FIGS. 1B, 1C, and 1P), and are discussed further here and below in conjunction with FIGS. 6A-6F, and other figures throughout this document. In an embodiment, it is a combination of BIRD logic (500) and the BIRD's usage expectations (600)—which are typically specific both to a particular authorized user (AU) and a particular item (100)—which determine in part the analyses and comparisons made by the BIRD in steps 455 and 460 of the exemplary method 430 (see FIG. 4C, above).

Usage Expectations

In an embodiment, the usage expectation (600) for an item (100) define one or more of:

(i) how an item is expected to be used;

(ii) an environment in which an item is expected to be found; or . . .

(iii) an environment to which the item is expected to be exposed or to be subject . . .

. . . during normal or anticipated usage by an authorized user (AU).

In an alternative embodiment, the usage expectations (600) may define item use, item environment, or environmental influences when the item is subject to anomalous or unexpected usage.

Usage Expectation Representations

Usage expectations (600) for an item (100) may be expressed in the form of numeric data or parameters, a data structure, symbolic parameters/values, logical expressions (algebraic and/or Boolean representations), waveforms or matrix representations, distributed data systems (holographic, neural network, etc.) or any other symbolic formalism which may be used to represent any of:

(i) a typical or likely external environment for an item, which may include, among other elements, both the location or boundaries of the environment and the time when the item (100) may be expected to be in the environment;

(ii) typical or likely environmental forces or phenomena which may impinge on the item (100) (again, possibly with time-frame boundaries or other associated time parameters);

(ii) a typical or likely manner of usage of the item (100) (again, possibly with time-frame boundaries or other associated time parameters); or . . .

(iii) a typical or likely internal condition or state of operations of the item (100) (again, possibly with time-frame boundaries or other associated time parameters).

In the alternative, or as an adjunct, usage expectations may also be designated as representing a possible anomalous environment, anomalous usage, or anomalous internal state/condition (503.2) for an item.

Usage Expectations and Item Field Use

In embodiments where usage expectation (600) represents a typical or likely item environment, usage, condition, or state, then the following may apply during field use of the BIRDed-item (102):

- Any actual external environment, item usage, internal item state, and/or other item status (501) which (i) is detected by the BIRD (200); and (ii) which falls within the scope specified by the usage expectations (600) is generally presumed to reflect a normal or extant state (503.3/503.1) of the item (100);

Any actual external environment, item usage, internal item state, and/or other item status (501) which (i) is detected by the BIRD (200); and (ii) which falls outside the usage expectations (600) generally indicates some possibility of an anomalous state (503.2) or displaced state (503.0) of the item (100).

Actual, detected environment/usage/conditions are generally reflected in usage data (700.U), discussed throughout this document. Any usage data (700.U) which falls outside the scope indicated by the usage expectations (600) may indicate the item (100) is lost (503.0.1), misplaced (503.0.2), misappropriated (503.0.3), wandering (503.0.5), or stolen (503.0.4), or possibly that the item is being used in some inappropriate manner or is otherwise anomalous (503.2).

In an embodiment, usage expectations (600) may be based on either or both of:

(i) user expectations for how they will use an item; or (ii) a record-of/analysis-of historical usage of an item (100).

Usage expectations (600) are typically programmed into a BIRD (200) during a training period, also referred to as a training period, but may also be modified during item usage and monitoring.

Exemplary Set of Usage Expectations Pertaining to Location

FIG. 6A illustrates an exemplary set of usage expectations (600) pertaining to an authorized user's location expectations (600.Loc). Though no specific item is identified in the figure, typically usage expectations (600) are specific not only to a particular authorized user (AU) but also to a particular item (100). However, in an embodiment, applicable usage expectations (600), and especially location expectations (600.Loc), may be copied or transferred from a first item (100.1) (or a BIRD (200) used with one item) to another item (100.2).

In an embodiment, the location usage expectations (600.Loc) may include listings of one or more specific expected locations (144.L) or expected regions (144.L) which the authorized user (AU) routinely visits, or expects to routinely visit, with the item (100); and/or locations (144.L) where the item (100) may be routinely stored. These locations (144.L) typically include both home base locations (140.HB) and daily life locations (140.DL), as well as possibly zones (140.Z).

In an embodiment, location usage expectations (600.Loc) for each location (144.L) may include various types of location and sensor data pertinent to the authorized user (AU) and the item (100), including for example and without limitation:

Name—Descriptive location name, for the benefit of the authorized user, system administrator, and similar parties.

Type—Home base location (140.HB), daily life location (140.DL), zone (140.Z), (see FIG. 1H above for further discussion), and in alternative embodiments possibly other, additional or alternative location types.

Definition Type—How the location is defined. Various types of data and data structures may be employed to define a location, including for example and without limitation: perimeter definitions based on geographic coordinates of border vertices, perimeter definitions based on radial distances from a central coordinate, references to various maps, place names, building names, and other location definition means as well.

In an embodiment, a location may be defined with reference to a distinctive location identification signal or beacon (1507) which may be emitted by RF devices at certain locations. See FIG. 15A, integration with data streams, below, for further related discussion.

Coordinates—The coordinates or other data which actually define the location. Shown in FIG. 6A are data pointers (*JHC1, *JHC2, *JDL) to suitable data structures (not shown, but stored in BIRD memory (206)) which actually contain the location coordinates.

Zones—Whether or not the location is subdivided into zones (140.Z) ('yes' or 'no').

Number of Zones—If the location is divided into zones, the number of zones (140.Z).

Zone Definition—If the location is divided into zones (140.Z), a data pointer to a data structure (again not shown, but stored in BIRD memory (206)) which defines the boundaries of the zones.

Days—The day(s) of the week when the item (100), and/or the authorized user (AU) with the item, may be found within the location (144.L). In an embodiment not illustrated, additional parameters may be used to indicate additional factors, such as days when the item (100) may only be in storage in the location (144.L), or days when the item (100) may only be in use within the location (144.L) (and not in storage), etc. Shown in FIG. 6A is an exemplary day format where the days Sunday through Monday are numbered from 1 to 7. The format is exemplary only, and other formats may be employed as well.

Times—The time(s) of the day when the item, and/or the authorized user (AU) with the item, may be found within the location (144.L). In an embodiment not illustrated, additional parameters may be used to indicate additional factors, such as times when the item (100) may only be in storage in the location (144.L), or times when the item (100) may only be in use within the location (and not in storage), etc. Show in FIG. 6A is a time format where the days Sunday through Monday are numbered from 1 to 7, and the corresponding times on those days are expressed in 2400 hour format. The format is exemplary only, and other formats may be employed as well.

Expected usage parameters (144.P, 144.G) pertain to expected general item usage (144.P) or expected patterns (144.G) of item usage, which in an embodiment may be viewed also as an element of psyIteMetrics (158) (also discussed further below). In an embodiment these usage parameters (144.P, 144.G) may include, for example and without limitation:

% Time Flex—The Times field (discussed above) specifies the hours or time range (105) when the item (100) is expected to be within a given location. The % Time Flex may be used to indicate a fudge factor, or some flexibility in the time range (105), particularly at the ends of the indicated time range (105). For example, if the item (100) should be within a given location for one hour—say, from 1200 to 1300 hours—then a 10% time flex would indicate a possible variability of six (6) minutes at either end of that time range (105). That is, the item might arrive within the location up to six minutes early or six minutes late, and might leave that location up to six minutes early or six minutes late.

Flex Min—An alternative way of specifying the flexibility at either end of the time range (105), only specified in specific number of minutes rather than a percentage.

Max Step Out Time—The Times field (discussed above) specifies the hours when the item (100) is expected to be within a given location (144.L). In real-life usage, an authorized user (AU) may take an item (100) outside of a given, specified usage location for some periods of time. The Max Step Out Time indicates the maximum time, in minutes or some other specified time units, that the item (100) may be outside the expected location (144.L). In an embodiment, the Max Step Out Time may indicate a total number of minutes during a time frame. In an alternative embodiment, the Max Step Out Time may indicate a maximum contiguous period of minutes.

Stagnancy—Indicates how long the item may be off-person (typically meaning stationary (139.Stat), or not subject to personal user motions) before the item is identified as being stationary (139.Stat) for "too long" a time. This provides the value for the stationary limit (133) discussed above in conjunction with FIG. 1C and other figures. In FIG. 6A, the value of "9999" is used as an exemplary code value to indicate that stagnancy may not apply in some contexts. For example, an authorized user (AU) may consider it to be acceptable if the item (100) is left lying about (off-person (138.OffP)) for an indefinite amount of time while the item is at home.

The above identified data elements of location usage expectations (600.Loc) are exemplary only. Additional or alternative data elements may be employed as well.

AWOL-Related Data Fields

In an embodiment, certain usage expectation data fields are inherently related to whether or not an item (100) is considered absent without leave (AWOL) (128). If an expected location (144.L) is defined as a home base location (140.HB) (under Type), then the days and times when that item (100) should be in that location provide the basis for AWOL (128) determinations: if the item (100) is not actually present in that location when it should be, the item is AWOL (128). Alternatively, or additionally, if the is in a home base location (140.HB) when it should not be, the item (100) may also be considered AWOL (128).

One or more additional AWOL-related data fields may be employed as well. For example, a user may indicate that some expected locations (144.L) are not home base locations (140.HB) (for example, they are not typically used for item storage); but may still be subject to AWOL (128) evaluations. This may apply, for example, to recreational locations or other expected locations (144.L) that the user routinely visits at specifics times and dates. Similarly, data fields may be provided to indicate whether an item (100) is required to be within a specified location during the specified time; or on the other hand only that the item (100) may be (that is, is allowed to be, but is not required to be) within the specified location during the specified time.

Travel Routes

In an embodiment, the location usage expectations (600.Loc) may include listings of one or more specific expected commuting routes (144.CR) which the authorized user (AU) routinely transits, or expects to transit, with the item (100). Route information may be used by the BIRD (200) for several forms of processing within the scope of BIRD Logic (500), including for example and without limitation:

- additional determinations of where the item (100) should be, or is expected to be, at given times;
- expectations of times/places where the item (100) may be expected to be subject to transportation-related movements and accelerations;
- support in distinguishing or filtering transportation-related movements from personal (user) movements to which the item (100) may be subject.

In an embodiment, the location usage expectations (600.Loc) for each travel route (144.CR) may include various types of routing pertinent to the authorized user (AU) and the item (100), including for example and without limitation:

Name—This may either be a descriptive name of a specific route (a street, a bus or train transit line, or similar); or may be a name which is descriptive of a class or group of travel routes, or descriptive of a mode or purpose of transit (work, recreation, etc).

Type—The type of transport medium, for example, highway, local roads, mass transit, etc.

Mode—A type or category of the transportation mode, for example, car, bus, train, bicycle, walking, running, etc.

Coordinates—The coordinates or other data which actually define the transport path or paths. In an embodiment, more than one path—for example, multiple roads—may be included in a coordinate definition. Shown in FIG. 6A are data pointers (*TR1 . . . TR5) to suitable data structures (not shown, but stored in BIRD memory (206)) which actually contain the travel route coordinates.

The above identified data elements of location usage expectations (600.Loc) for travel routes (144.CR) are designed to identify the routes in categories or groups associated with travel types (highway, local, mass transit, etc.). In an alternative embodiment, travel routes may instead be clustered accorded to a combined route travelled by the authorized user (AU) of the item (100). For example, a travel route may be defined or identified as a cluster of travel types and modes related to getting to or from work each day; such a route may include modes of walking, automobile, public transport, and even biking, all under one travel route definition.

The above identified data elements of location usage expectations (600.Loc) for travel routes (144.CR) are exemplary only. Additional or alternative data elements may be employed as well, including, for example and without limitation:

Time/Date Information—Data elements pertaining to the dates or times when an item (100) may be or should be found on a travel route;

Route Imagery Data—For a BIRD (200) which may be expected to obtain, or possibly obtain, a view of a route which can be detected by the BIRD's cameras (210.C, 210.V), images associated with a travel route may also be provided as a means for the BIRD (200) to determine when it is traveling along the route. Such imaging means may be in addition to, or in the alternative to, location determinations via GPS and similar systems.

Vehicle or Transport Path Beacon Information—Identification of specific vehicles or carriers the item (100) is expected to encounter; for example, an automobile, train, or bus may transmit an electronic self-identification signal or beacon (1507), and so enable a BIRD (200) to determine whether or not the item (100) is onboard the correct vehicle (see FIG. 15A, below, for a discussion of BIRD integration with ambient data streams (1507)).

FIG. 6B

Exemplary Usage Expectations: IteMetrics

FIG. 6B illustrates an exemplary set of usage expectations (600) pertaining to an authorized user's iteMetrics (154). Though no specific authorized user (AU) or item (100) is identified in the figure, typically usage expectations (600) are specific both to a particular authorized user (AU) and also to a particular item (100). As discussed above in conjunction with FIG. 1J and other figures, iteMetrics (154) are defined as those sensed aspects of item usage which are likely to be indicative of the identity of an authorized user (AU). As a reminder:

MorphIteMetrics (156) are data or indicators which can be extracted from BIRD sensor readings (700), and which may be derived indicators (700.P) of distinctive physical or biological characteristics of an authorized user (AU). The values stored here generally pertain to expected motions (144.M) (typically, motions distinctive of user movement, which may be distinguished from other expected item motions), and expected patterns (144.P) of movement, and of course more generally to expected authorized users (144.AU). The values stored here may also pertain to authorized user (AU) identity (144.AU) in the form of expected biometrics (144.B) for a person using or in proximity to the BIRDed-item (102).

PsyIteMetrics (158) are data or indicators which can be extracted from BIRD sensor readings (700), and which may be derived indicators (700.P) of an authorized user's habitual usage tendencies with respect to an item (100). The values stored here are likely to be derived from a wide variety of environmental factors, which in specific terms may or may not have well-defined, expected values or ranges, but which may (when analyzed) display user-distinctive patterns (144.G) of expected behavior.

However, in an embodiment, applicable usage expectations (600), and especially morphIteMetrics (156), may be copied or transferred from a BIRD (200.1) associated with a first item (100.1) to a second BIRD (200.2) associated with another item (100.2).

MorphIteMetrics

In an embodiment, the usage expectations (600) associated with morphIteMetrics (156) may include listings of one or more parameters, waveforms, or other data representations associated with various user activities and/or physiological features:

Walking (156.1): The BIRD's motion sensor (210.M) may detect user motions which can be analyzed by the BIRD's processor (204), yielding processed sensor data (700.P) which can identify motions associated with user walking, running, and even motions associated with standing and sitting. In turn, the usage expectations (600) for morphIteMetrics (156) represent expected values for these user motions, for a given authorized user (AU) and a given item (100). Exemplary parameters used to represent expected user walking (156.1), with exemplary data values, are illustrated in FIG. 6B.

In an embodiment, motions associated with walking may be represented by specific parameters such as average walking speed, maximum walking speed, average user stride length, average user bounce height (the up and down movement associated with walking), average user sway (side-to-side motion), and other parameters. In an alternative embodiment, user walking motion may be represented by waveforms or waveform representations (Fourier decompositions, wavelet representations, etc.) or other data structures (not shown in the figure).

In an embodiment, aspects of walking and related activities may also be expressed in terms of percentages of time that the user engages in such activities. For example, walking morphIteMetrics (156.1) may indicate the percentages of time the authorized user (AU) is expected to stand or sit, and the associated magnitudes of user body motions while standing or seated. (These motion magnitudes (Mot. Mag., in the figure), are illustrated with arbitrary values and units in the figure, and should not be construed as limiting in any way.)

Arm and Hand Motions (156.2): When an item (100) is held in hand by an authorized user (AU) or other person, the BIRD's motion sensor (210.M) may also detect user motions which can be analyzed by the BIRD's processor (204), yielding processed sensor data (700.P) which can identify motions associated with hand and arm movements. In turn, the usage expectations (600) for morphIteMetrics (156) represent expected values for these user hand and arm motions, for a given authorized user (AU) and a given item (100).

Exemplary parameters used to represent expected user arm and hand movements, with exemplary data values, are illustrated in FIG. 6B. (Data values shown are exemplary and arbitrary, and should not be construed as limiting in any way.)

In an alternative embodiment, arm and hand motion morphIteMetrics (156.2) may be represented by waveforms or waveform representations (Fourier decompositions, wavelet representations, etc.) or other data structures (not shown in the figure).

In an embodiment, aspects of arm and hand motion morphIteMetrics (156.2) may also be expressed in terms of percentages of time, or average number of minutes of time, that the item is in hand, or similar time-related metrics. Such arm and hand motion morphIteMetrics (156.2) may also be considered an element of psyIteMetrics (158) for the item (100), discussed further immediately below.

Physiological Features (156.3): Usage expectations (600) may include physiological morphIteMetrics (156.3). These may be useful in the field if the BIRD (200) is even sometimes positioned or used so that its sensors (210) are able to obtain data (700) with appropriate physiological information. For example, a BIRDed-item (102) which is held in hand may use its camera (210.C) to obtain a facial image of the person holding the item (100); may use its audio content sensor (210.AC) for voice print analysis; and may use biometrics (282.B) to detect fingerprints and/or other physiological signatures, such as pulse. Certain BIRDed-items (102), in certain uses, may even lend themselves to detection of an iris scan or retinal scan. Similarly, a BIRDed-item (102) which is normally worn on or against a body may lend itself to capture of voice prints and other physiological signatures.

The usage expectations (600) for physiological iteMetrics (156.3) may be stored in the BIRD (200) in a variety of data forms, including various parameterized forms, waveforms, and other data structures. Shown in FIG. 6B are data pointers (*FP, *VP, *NP, *IS, *PS) to suitable data structures which may be stored in BIRD memory (206).

In general, the morphIteMetric parameters shown in the figure, as well as the particular data values, are exemplary only, and should not be construed as limiting. Many other psyIteMetrics parameters may be envisioned within the teachings, scope, and spirit of the present system and method.

MorphIteMetrics and PsyIteMetrics:

In an embodiment, the morphIteMetrics (156) stored as part of usage expectations (600) may also serve as a foundation for some psyIteMetrics (158). For example: For a particular authorized user (AU) and a particular item (100), the BIRD (200) may store any correlations which are identified (during a training session) between any of walking morphIteMetrics (156.1), arm/hand motion iteMetrics (156.2), physiological iteMetrics (156.3), and/or possibly other sensed environmental data (700) (light exposure, sound exposure, temperature, etc.).

PsyIteMetrics

PsyIteMetrics (158), which are typically determined and identified during a training or training session, to identify behavioral aspects of item usage by an authorized user (AU). PsyIteMetrics (158) for an item (100) and user may vary depending on context, for example, depending on location. FIG. 6B illustrates exemplary psyIteMetrics which vary depending on an authorized user's location, in this case, the home, the workplace, and other daily life locations (140.DL).

Exemplary psyIteMetrics illustrated include:

- the average percentage of the time the item (100) is on person;
- the average percentage of the time the item (100) is exposed to light (meaning, typically, the item (100) is not in a pocket, not in a purse, not in a briefcase, not in a drawer, and in general not shielded from light);
- the average percentage of time the item (100) is exposed to sounds above some threshold sound level (where the threshold sound level is specified elsewhere, not illustrated);
- the average level of sound exposure to which the item (100) is subject; and
- the average temperature to which the item (100) is subject.

The psyIteMetric parameters shown in the figure, as well as the particular data values, are exemplary only, and should not be construed as limiting. Many other psyIteMetrics parameters may be envisioned within the teachings, scope, and spirit of the present system and method.

FIG. 6C

Exemplary Supplemental Usage Expectations and BIRD Logic

In an embodiment, it is the BIRD's usage expectations (600) which determine, along with BIRD logic (500) and usage data (700.U), the analyses and comparisons made by the BIRD in steps 455 and 460 of the exemplary method 430. The usage expectations (600) express in formal terms the ExD criteria (170) for an item (100).

Default BIRD Usage Expectations and BIRD Logic

In an embodiment, BIRD logic (500) consists of algorithms and methods which may be substantially pre-programmed into a BIRD (200), possibly with various operational and logical parameters which may be accessible by an authorized user (AU) for "tweaking," or fine-tuning, the BIRD logic (500). The pre-defined algorithms and methods constitute the default BIRD logic (500).

Similarly, in an embodiment, the BIRD's usage expectations (600) may be determined or defined according to a number of processes or methods, including for example and without limitation:

(i) direct configuration by an authorized user (AU) employing a pre-established user interface which is an element of BIRD navigation (1000);

(ii) determination by the BIRD (200) based on item usage by the authorized user (AU) during a training or training session;

(iii) modification by the BIRD (200) based on authorized user (AU) feedback and other events during a training session and/or during field use of the item (100).

The usage expectations (600) may also be defined via a combination of the preceding three methods. As discussed above in conjunction with FIGS. 6A and 6B, the usage expectations (600) may take the form of various values, parameters, and data structures which characterize expected use (144) of an item (100) by an authorized user (AU).

In an embodiment, when BIRD navigation (1000) presents a pre-defined user interface, or automatically defines expected item usage during a training session, BIRD navigation (1000) has several features which are salient here:

(a) BIRD navigation (1000) will collect environmental data which is congruent with the structure of the default BIRD logic (500), meaning BIRD navigation (1000) will collect such data as is necessary for the default BIRD logic (500) to determine the extant/normal (503.1/503.3) vs. displaced/anomalous state (503.0/503.2) of the BIRDed-item (102); and (b) BIRD navigation (1000) stores the data in data structures, and generates processed data, which is again congruent with the default BIRD logic (500), (c) Any user interface presented by BIRD navigation (1000) will constrain user data entry to conform to the requirements of the default BIRD logic (500).

In an embodiment, and in the sense characterized by features (a), (b), and (c) immediately above, the BIRD (200) may have a data framework in place which constitutes a default structure for BIRD navigation (1000).

Supplemental Usage Expectations and BIRD Logic

In an embodiment, a BIRD (200) may be configured to accept and apply supplemental usage expectations (600.S), which may incorporate as well elements of supplemental BIRD logic (500). For brevity, such supplemental usage-expectations/BIRD-logic will simply be referred to as supplemental usage expectations (600.S).

In an embodiment, supplemental usage expectations (600.S) may at times augment or extend existing, the default BIRD logic (500) and the default BIRD navigation (1000). In an alternative embodiment, supplemental usage expectations (600.S) may override some elements of existing, system-default BIRD logic (500).

Supplemental usage expectations (600.S) may be entered into a BIRD (200) and BIRD memory (206) through a variety of means, including for example from a configuration computer (355).

In an embodiment, supplemental usage expectations (600.S) may be used to define new or novel anomalous item states (503.2) (that is, states apart from the displaced states (503.0) of lost, misplaced, misappropriated, wandering, or stolen). In an embodiment, supplemental usage expectations (600.S) may be used to define new or novel normal states (503.3) of usage (that is, states apart from extant (503.1), or possibly sub-states of being extant (503.1).) In an embodiment, supplement usage expectations (1000) may enable third-party vendors to provide extensions to BIRD logic (500) and BIRD navigation (1000).

Forms of Supplemental Usage Expectations

The supplemental usage expectations (600.S) may be expressed in a variety of forms. The supplemental usage expectations (600.S) shown in FIG. 6A are presented in a kind of pseudocode, representative of the generic computer code often employed in the art of computer software. Other forms of mathematical, logical, and/or symbolic representation may be employed as well, including for example and without limitation:

- representations in specific computer languages (C, C++, C#, Java, Perl, machine language or assembly language);
- custom mathematical languages employed by mathematical software (for example, Mathematica, Matlab, Mathead, Maple, and other such software);
- new or novel programming languages specifically tailored to express or capture possible values/ranges of environmental sensor data (700) in view of possible usages of items (100) which are monitored by a BIRD (200);
- various mathematical functions;
- waveforms, neural network representations, and other data structures as well.

The pseudocode shown in FIG. 6C and used elsewhere in this document is exemplary only, and many other examples of suitable code may be envisioned. The pseudocode may in practice be implemented via any number of known programming languages. The code, once translated into executable form, would be run on the processor (204) of the BIRD (200).

Exemplary Supplemental Usage Expectations

FIG. 6C presents a list of exemplary supplemental usage expectations (600.S) which may be appropriate for various items (100). Some of the exemplary supplemental usage expectations (600.S) shown in FIG. 6A may duplicate or overlap the functionality of the default BIRD logic (500) and default framework for usage expectations (1000). Some of the exemplary supplemental usage expectations (600.S) may extend or override the default BIRD logic (500) and default framework for usage expectations (1000).

In an embodiment, supplemental usage expectations (600.S) may be expressed or symbolized, and analyzed in operation, via clearly defined combinations of:

(i) logical statements, (ii) data values and relational operators, and (iii) conditional statements.

Not shown in FIG. 6C are conditional elements, which may be considered as implicit. Thus, the supplemental usage expectations (600.S) may be understood as expressing:

```
if [the condition indicated in the usage expectation] = true
    then item__state is extant/normal;
else
    item__state is anomalous.
```

Supplemental usage expectation 600.S.10 indicates whether or not an item (100) is typically stationary (139.Stat), and for how long, in normal usage. It will be understood that exactly how still an item is when stationary (139.Stat) may be defined by other parameters, not shown.

Supplemental usage expectation 600.S.12 indicates whether or not an item (100) is typically within a certain temperature range during normal usage. It will be understood that temperature range may refer to the environment to which an item (100) is typically exposed (such as the temperature of an indoor environment or outdoor environment within which the item (100) is used, or the temperature of an aqueous environment such as a swimming pool or other body of water in which the item (100) is used); or the temperature may refer to a temperature caused by an activity of the item (100) itself, if for example the item is an electrically active item.

Supplemental usage expectation 600.S.14 indicates whether or not an item (100), in normal usage, typically does not go outside a certain environmental temperature range for more than an indicated amount of time.

Supplemental usage expectation 600.S.16 indicates whether or not an item (100) is typically within certain defined locations or regions (104.L), or along certain travel routes, or within certain buildings, if the item (100) is in normal usage. It will be understood that the defined locations or regions (104.L), or the defined travel routes, or the location and/or spatial extent or scope of the buildings, will be characterized using separate parameters.

Supplemental usage expectation 600.S.18 indicates whether or not an item (100) is typically within certain defined locations or regions (104.L), or along certain travel routes, for a certain percentage of time of a defined time period, if the item (100) is in normal usage.

Supplemental usage expectation 600.S.20 indicates a maximum time duration for which an item (100) may be stationary (139.Stat) during a defined time period, if the item (100) is in normal usage. It will again be understood that exactly how still an item (100) is when stationary (139.Stat) may be defined by other parameters.

Supplemental usage expectation 600.S.22 indicates whether or not an item (100) is typically experiencing or exposed to a defined temperature range for a defined percentage of the time if the item (100) is in normal usage.

Supplemental usage expectations 600.S.24 indicates whether or not an item is typically within a defined region for a certain percentage of the time, during a defined time period.

Supplemental usage expectation 600.S.26 pertains to usage locations, routes, buildings, times, days of the week, indicating that an item (100) is normally used according to the indicated criteria.

Supplemental usage expectations 600.S.28 are several versions of usages elements which indicate whether or not an item is typically within certain defined expected locations (144.L) and in motion within defined acceleration levels, during specified times of day.

Supplemental usage expectations (600.S) may be defined in various ways, and also grouped into sets of related expectations, in various ways. FIG. 6D, discussed below, addresses exemplary sets (652, 655) of supplemental usage expectations (600.S). FIG. 6E, discussed below, illustrates an exemplary dialog box for defining sets (652, 655) of supplemental usage expectations (600.S).

For purposes of discussion throughout this document, it will be understood that the term/reference number "usage expectations (600)" may typically refer to either or both of the default usage expectation framework, generally built into the BIRD operating system (550), and user-defined supplemental usage expectations (600.S). Context may in some cases indicate that the system default usage expectation framework is under consideration (as for example with respect to FIGS. 6A and 6B above). Where supplemental usage expectations (600.S) are specifically intended (as immediately above, in the discussion of FIG. 6C), the appropriate terminology and label "supplemental usage expectations (600.S)" will be employed.

FIG. 6D

Exemplary Usage Expectation Groups

In an embodiment, a BIRD (200) may have, for a single item (100) and a single authorized user (AU), multiple different sets of usage expectations (600) (either default expectations and/or supplemental usage expectations (600.S)). For example, in an embodiment, each of the different location usage expectations (602) (Location 1, Location 2, and Location 3) of FIG. 6A, above, may be considered a distinct set of usage expectations, for a total of three sets. For another example, each of the different psyIteMetrics (158) (Jane's Home, Jane's Office, Jane's Daily Life) of FIG. 6B may be considered a distinct set of usage expectations.

Definitions for multiple sets of usage expectations (600) can be used to define the overall expected environment (144) for an item (100) when the item is in an extant/normal state (503.1/503.3) in specific expected locations (144.L). Similarly, definitions for multiple sets of usage expectations (600) can be used to define the overall expected environment (144) for an item (100) when the item is in extant/normal usage (503.1/503.3) at various times of day or days of the week, that is, in different time frames (105), or more generally in different detection contexts (123). (Throughout, it will be understood that in alternative embodiments, usage expectations (600) may be employed which are indicative of displaced/anomalous item usage (503.0/503.2) instead.)

FIG. 6D is an illustration of exemplary combinations of usage expectations (600) into (i) usage expectation groups (652) and (ii) context-specific expectation groups (655), and some exemplary applications of the combinations.

Usage expectation groups (652) may be defined by authorized users (AU) or by the computational intelligence of the BIRD (200) itself (for example, by BIRD Navigation (1000)), and include combinations of sets of usage expectations (600). The combined usage expectations will indicate two or more item statuses in which a particular item (100) is expected to be found in normal usage (or, in an alternative embodiments, in anomalous usage (503.2)).

For example, a first exemplary group (652) of motion expectations (MS1) may include:

(1) an expectation than an item (100) in extant/normal usage (503.1/503.3) should be found moving at or below a first specific velocity; and (2) a further expectation than the same item (100) in extant/normal usage (503.1/503.3) should never be found to be accelerated at greater than a first specific acceleration.

A second exemplary group (652) of motion expectations (MS2) may include:

(1) an expectation than the same item (100) in extant/normal usage (503.1/503.3) should be found moving between a second specific velocity and a third specific velocity; and (2) a further expectation than the same item (100) in extant/normal usage (503.1/503.3) should never be found to be accelerated at greater than a second specific acceleration.

A third, fourth, and additional groups (652) of motion expectations MS3, MS4, etc., may be defined as well for the item (100).

Similarly, a first exemplary group (652) of location expectations (LoS1) may include:

(1) an expectation than the item (100) in extant/normal usage (503.1/503.3) should be found within a first specific geographic region; and/or (2) a further expectation than the same item (100) in extant/normal usage (503.1/503.3) should be found in a first specific building (which may or may not be within the first specific geographic region).

A second exemplary group (652) of location expectations (LoS2) may include:

(1) an expectation than the same item (100) in extant/normal usage (503.1/503.3) should be found in a second specific building; and/or (2) a further expectation than the same item (100) in extant/normal usage (503.1/503.3) should be found in a third specific building.

A third, fourth, and additional groups of location expectations LoS3, LoS4, etc., may be defined as well for the item (100).

Similar groups (652) of usage expectations (TS1, TS2, TS3, etc.) may be defined for expected temperatures surrounding the item (100) during normal usage. Similar groups (652) of expectations (SS1, SS2, etc.) may be defined for an ambient sound level and/or ambient sound qualities surrounding the item (100) during extant/normal usage (503.1/503.3). Similar groups (652) of expectations (LiS1, LiS2, etc.) may be defined for an ambient light level, ambient color, and/or other optically related qualities surrounding the item (100) during extant/normal usage (503.1/503.3).

Similar groups (652) of usage expectations (600) may be defined for other types of sensed environmental data (700), such as air pressure, humidity, surface pressure, ambient RF qualities, and or other sensed environmental qualities surrounding the item (100) during extant/normal usage (503.1/503.3).

Context-Specific Expectation Groups

Usage expectation groups (652) may be further combined into context-specific expectation groups (655). Several exemplary context-specific expectation groups (655) are shown in FIG. 6D. A Home Expectations group (655.H) may contain usage expectations (600) for items (100) which are kept in the home, or for items which may leave the home but are sometimes at home. An Office Expectations group (655.O) may contain usage expectations (600) for items (100) which are kept in the office, or for items which may leave the office but are sometimes in the office. Similarly, context-specific expectation groups (655) may be defined for local travel (655.LT), the golf course (655.GL), the gym (655.GM), or for times of day such as the evening (655.E).

Such context-specific expectation groups (655) may be shared, via file transfers or data transfers, among multiple BIRDs (200), which in turn may each be used with various respective items (100) which share a common usage (such as home, office, gym, golf club, etc.). Once shared or transferred from one BIRD (200) to another, a context-specific expectation group (655), such as the Home Expectation set (655H), may be further fine-tuned or modified for each specific item (100) in the home or other context.

A BIRD (200) may be configured to apply different context-specific expectation groups (655) at different times of day and/or on different days of the week. An exemplary first application (660.A) of context-specific expectation groups (655) is shown for weekdays. The BIRD (200) may be configured so that Home Expectations group (655.H) is in effect from approximately the hours of midnight to 0715, and again from approximately the hours of 2130 to 2400. The Office Expectations set (655.0) may be in effect from approximately the hours of 0800 to 1830. Similarly, the Travel Expectations set (655.LT) and the Evening Expectations set (655.E) may be in effect for the hours illustrated.

It will be seen that the BIRD (200) may be configured so that more than one context-specific expectation group (655) is in effect at the same time. This may reflect that an authorized user (AU) of the BIRD (200) has determined that alternative uses of a BIRDed-item (102) may be possible during a given time frame. For example, in the first application (660.A), the user expects that during the hours of approximately 2030 to 2400, the BIRDed-item (102) may either be at home, otherwise be in general evening use. As such, the expected environmental conditions (144) for the item (100) may be either those for the Home Expectation set (655.H) or the Evening Expectation set (655.E).

An exemplary second application (660.B) of context-specific expectation groups (655) is also shown, here applying to the use of the BIRDed-item (102) on the weekends and holidays.

FIG. 6E

Exemplary Dialog Boxes

FIG. 6D is an illustration of two exemplary dialog boxes (665, 668) which may be associated with defining usage expectations (600). These exemplary dialog boxes (665, 668) and others presented below in conjunction with other figures, may be presented to an owner or authorized user (AU) of a BIRD (200) via the BIRD's display (282.D). These dialog boxes, or others which provide substantially analogous functionality, may also be presented via a configuration computer (335) or portable configuration computer, such as a cell phone (340), which are coupled to the BIRD (200) via a communications link (337).

An exemplary Set Activity Velocity Ranges dialog box (665) is used to define, contribute to defining, or editing user-specific iteMetrics (154) for item motion, which in turn may become an element of the usage expectations (600). The dialog box (665) enables a user to define one or more typical acceleration range (667) associated with the authorized user (AU) of an item (100). For various types of activities or activity contexts (666) a user may engage in, a velocity or acceleration range (667) is associated with the activity context. (The velocity ranges shown are in arbitrary units, and are for purposes of illustration only.) Since different authorized users (AU) may move differently (for example, walk at different speeds or run at different speeds), the velocity ranges may be adjusted accordingly.

An exemplary Set Criteria Precision Requirements dialog box (668) may be used to define, contribute to defining, or editing a set of usage expectations (600) which may have multiple classes of parameters, such as location, velocity, and acceleration. The dialog box (668) enables a user to define, for the usage expectations (600), an degree of precision required of various types of sensor data (700), such as location, velocity, and acceleration. Such precision criteria may, for example, define tolerance levels for different types of sensed environmental data.

For example, a top priority parameter (1) may be expected to fall exactly within specific ranges, a medium priority parameter (2) may be expected to fall closely within specific ranges, while a low priority parameter (3) may be expected to fall only approximately within specific ranges. Degrees of exactness or variability may be set via other dialog boxes (not shown).

The same item (100), when in the possession of different owners or authorized users (AU), may also be assigned different precision requirements for different users.

FIG. 6F

Exemplary "Define Extant/Normal Usage Expectation Group" Dialog Box

FIG. 6F is an illustration of an exemplary dialog box (670) which may be used to define, supporting defining, or editing of an exemplary usage expectation group (652) or context-specific usage expectation group (655), according to an embodiment of the present system and method. The dialog box (670) may be displayed, and configuration data input accepted, via a configuration computer (335, 340) used to configure a BIRD (200) associated with an item (100).

Detection Contexts:

The dialog box (670) includes a detection context name field (672) used to pick or set a name for the usage expectation group (652, 655). The name may pertain, for example, to a specific detection context (123) in which an item (100) may be used, such as a home base location (140.HB) (such as the home or office): or a daily life location (140.DL); or an activity type (such as shopping); or time a time of day (such as the evening). Another dialog box or a [[New]] button (not illustrated in the figure) may be used to define additional detection contexts (123) (see FIG. 10B, below), or usage expectation group names. ((Preferred Criteria)) radio buttons (674) may be used to help define various logical options for a usage expectation group (652, 655).

IteMetric Entries

In an embodiment, various predefined fields may be employed to define different criteria for extant/normal usage (503.1/503.3) of an item (100) when the item is in use by an authorized person or user. For example, check boxes, menus, data entry fields, and radio buttons (676) may be used to define expected item behavior pertaining to item velocity in different activity contexts.

Similar dialog box data entry elements may be used to define percentages of time the item (100) will be carried on a person in extant/normal usage (677) and the amount of time an item may be stationary (678).

It will be seen that the data entry elements (676, 677, 678) generally pertain to iteMetrics (154).

General Environmental Conditions

The dialog box (670) may also enable the authorized user (AU) or system administrator to set parameters pertaining to general, expected environmental conditions (144) for the item (100). For example, the authorized user (AU) or administrator may set the expected item temperature environment(s) (680) for extant/normal item usage (503.1/503.3).

Location IteMetrics

The dialog box (670) may also enable the authorized user (AU) or system administrator to set parameters pertaining to location usage expectations (600.Loc) for the item (100). For example, the authorized user (AU) or administrator may employ GUI elements (682) to set an expected location based on zip code, a pre-defined map, a named area, or possible other location defining parameters such as geographic coordinates (not illustrated).

A [[Save]] button (684) saves the group (652, 655) of usage expectations (600).

General Usage Expectation Dialog Box Considerations

It will be understood that the dialog box (670) is exemplary only, and other or additional dialog boxes, or components of dialog boxes, may be used to define usage expectations (600) and groups of usage expectations (652, 655). In particular, it will be understood that BIRDs (200) employing other or additional types of environmental sensors (210) may require dialog box elements pertaining to those sensors, and the types of environmental phenomena sensed by them (for example, orientation parameters, optical parameters, audio parameters, pressure parameters, and so on).

It will also be understood that usage expectations (600) for an item (100) and its associated BIRD (200), indicating expected/extant/normal item usage (503.1/503.3) may be defined additionally or in the alternative via software code, uploaded parameters and conditions, data files containing parameters and conditions, and via other means and processes. Some of these alternative or additional means or processes are discussed further throughout this document.

It will also be understood that usage expectations (600) for an item (100) and its associated BIRD (200) may be defined in terms of parameters expected for displaced/anomalous environments or usage (503.0/503.2), rather than or in addition to parameters expected for extant/normal environments or usage (503.1/503.3).

Parts of the discussion as presented above pertains to a two-state definition of item behavior, extant/normal (503.1/503.3) vs. displaced/anomalous (503.0/503.2). In an alternative embodiment, additional states of an item (100) may be characterized, including a variety of displaced/anomalous state (503.0/503.2)s, such as lost (503.0.1), misplaced (503.0.2), misappropriated (503.0.3), stolen (503.0.4), or wandering (503.0.5); and also various species of extant/normal states (503.1/503.3), such as a borrowed state (503.1.2). Additional states may also be pertinent to discrimination of the anomaly alert level (AAL), already discussed above, which indicates the estimated probability by the BIRD (200) that the alert—that is, the determination of displaced/anomalous item behavior—is valid. For example, AAL states may be defined which include: extant/normal usage (503.1/503.3);

low indication of displaced/anomalous usage (503.0/503.2); medium indication of displaced/anomalous usage (503.0/503.2); high indication of displaced/anomalous usage (503.0/503.2); certainty or near certainly of displaced/anomalous usage (503.0/503.2).

The Define Extant/Normal Usage Expectation Group dialog box (670), as well as other related dialog boxes used to configure the BIRD (200), may be suitably modified with additional fields and options to characterize ranges of sensor readings associated with different categories of extant/normal usage (503.1/503.3), different categories of displaced/anomalous usage (503.0/503.2), different AALs, and other item usage distinctions as well.

Usage Expectations and BIRD Logic

Additional Embodiments (Usage Patterns)

In an embodiment, usage expectations (600) may take the form of usage patterns, which can include elements which are probabilistic, have self-similarity at different scales (fractals), have repetitive or semi-repetitive underlying data structures, are time generators of new elements (cellular automata), and have other elements which benefit from characterizations alternative to, or in addition to, concise algebraic or limited-parameter definitions. Such usage patterns may be analyzed by BIRD navigation (1000) during training or training sessions, and possibly refined during extant/normal (503.1/503.3) field use of an item (100). At the same time, during field use, BIRD logic (500) may then be configured to compare real-time usage pattern assessments with the stored usage patterns.

Waveform Representations

For example, for a BIRDed-item (102), a pattern of usage over time may be expressed through waveforms representative of the item's location, motion, light exposure, sound exposure, or similar environmental data. The waveform(s) may be deconstructed via various mathematical analyses, such as Fourier analysis or wavelet analysis. Future determinations of extant/normal (503.1/503.3) or displaced/anomalous (503.0/503.2) item usage by the BIRD (200) may be made by comparing current waveform decomposition data (for example, Fourier or wavelet coefficients) with historical waveform data, with suitable parameters to allow for some inevitable statistical variation. In some cases, waveforms representations of data from different types of sensors (210) may be combined by the BIRD (200) to form composite waveforms suitable for such analysis.

Neural Network Representations

For another example, a pattern of item (100) usage over time-based on data from a single type of BIRD sensor (210), or from multiple types of sensor data (700) may be integrated into an artificial neural network representation stored in the BIRD (200). The neural network representation is first trained to recognize extant/normal (503.1/503.3) patterns of environmental context and/or item behavior, and then is later used to monitor the environment and item (100), and identify significant variations from the extant/normal (503.1/503.3) patterns. Various algorithms for pattern recognition training and reinforced learning may be employed to train a neural network to recognize extant/normal (503.1/503.3) and/or displaced/anomalous (503.0/503.2) item usage/environment.

Stochastic Factors

Usage expectations (600) may have distinctive probabilistic/stochastic elements, for example in terms of distributions of events. Consider for example, the usage of ordinary keys (100.K), such as house, car, and office keys (all together on one key chain), by a typical user.

The keys (100.K) may sometimes be in motion (subject to acceleration) or taken out of the user's pocket (and so exposed to ambient light) at predictable times of day (such as when leaving the house, driving to work, leaving the office, etc.). To that extent, motion of the keys (100.K) or exposure of the keys (100.K) to light may be predicted in relatively reliable or deterministic ways, during specific time frames of the day. (For example, the user may consistently leave the house at about 0830 hours, arriving at work at 0900 hours, with appropriate implications for usage expectations (600) for the keys (100.K).)

In between these predictable time periods, however, it may be difficult to say exactly at what times of day the keys (100.K) might be in motion, or might be taken out of pocket. However, on account of human nature and the relative consistency of personal habits, it may be possible to determine that the authorized user (AU) is likely to move about, or remove his or her keys (100.K) from a pocket, for a fairly predictable number of times during the day. Similarly, for a given user, the distribution of time intervals between removals of the keys (100.K) from a pocket (or purse), and the length of time of removal from the pocket or purse, may follow a reliable statistical distribution. Such distributions may be determined through measurement of extant/normal usage (503.1/503.3) by the user (during a training period), and then used as a basis to determine displaced/anomalous usage (503.0/503.2) of the keys (100.K). Thus, if the keys are stolen (503.0.4), the thief's statistical distribution of key usage is unlikely to conform to that of the authorized user (AU). As a result, displaced/anomalous usage (503.0/503.2) may be identified.

More generally, either or both of BIRD logic (500) or usage expectations (600) may constructed with various elements, parameters, or mathematical terms which are approximate, probabilistic, or otherwise logically fuzzy. Such fuzzy logic and parameters may be more consistent with real-world environments and sensor readings for items. These elements may include, for example and without limitation:

- Various "fuzzy logic" forms of expression which state, for example, that at least one environmental condition or set of sensor readings, of a plurality of possible conditions or sensor readings, is expected to be true;
- Multiple environmental conditions with weighting factors, indicating the relative importance of the environmental conditions in determining an extant/normal item state (503.1/503.3) or displaced/anomalous state (503.0/503.2).

Usage Expectations Defined by Expected Displaced/Anomalous State

It will be recognized that defining item behavior by usage expectations (600) which are based on extant/normal item usage (503.1/503.3), is only one way to define item behavior. In an alternative embodiment, item usage may be defined by usage expectations (600) indicating a state or environment in which an item may be found when the usage of the item (100) is displaced/anomalous (503.0/503.2). In an alternative embodiment, combinations of normal and anomalous usage expectations (600) may be employed. These considerations apply to complex embodiments of usage expectations (600) as usage patterns (waveforms, fractals, neural network representations, cellular automata, probabilistic/stochastic represcntations, etc.), as well as to usage expectations (600) in relatively less complex structures or representations.

Usage Expectations and BIRD Song (AALs)

In an embodiment, analogous usage expectations (600) with variations in specific parameters may be associated with different forms of BIRD alerts and notifications (372, 374) associated with BIRD song (900). For example, in an embodiment, anomaly alert levels (AALs) may be pre-coded or predefined by the BIRD (200) via built-in BIRD logic (500) and/or BIRD song (900), and then suitably fine-tuned for individual items in conjunction with usage expectations (600). Suitable user interface means (dialog boxes, wizards, etc.) may be provided to the authorized user (AU), to adjust both the usage expectations (600) and the associated AAL settings.

In an alternative embodiment, some or all BIRD alerts or notifications (372, 374), such as for example, anomaly alert levels, may be associated with various item events via supplemental usage expectations (600.S).

For example, as expressed in pseudocode:

```
between 7 a.m. and 6 p.m., item_location is inside Montgomery County,
    MD is associated with 100% anomaly certainty if the condition
    fails;
between 7 a.m. and 6 p.m., item_location is inside Bethesda, MD
    is associated with 90% anomaly likelihood if the condition fails;
between 9 a.m. and 5 p.m., item_location is inside National Institutes
    of Health, Bethesda, MD
    is associated with 80% anomaly likelihood if the condition fails;
between 9 a.m. and noon, and again between 1 p.m.
    and 5 p.m., item_location is inside National Institute of
        Biomedical Imaging and Bioengineering (NIBIB), Bethesda,
    MD is associated with 60% anomaly likelihood if the condition
    fails.
```

For another example, and for example for a wallet (100.W) or keys (100.K) which are usually kept in a pocket or closed purse:

```
during daylight, item_exposed_to_light for at most 15 continuous
    minutes is associated with 100% anomaly certainty if the condition
    fails;
during daylight, item_exposed_to_light for at most 10 continuous
    minutes is associated with 90% anomaly likelihood if the condition
    fails;
during daylight, item_exposed_to_light for at most 5 continuous minutes
    is associated with 60% anomaly likelihood if the condition fails.
```

In other words, the longer the wallet (100.W) or keys (100.K) are exposed to light, the higher the likelihood that the usage is anomalous (503.2). Similarly, suppose the authorized user (AU) has ExD criteria (170) such that he expects to carry the wallet (100.W) or keys (100.K) about all day, and assume the user engages in some motion most of the day. Then the AALs may be set so that the longer the wallet (100.W) or keys (100.K) are stationary (139.Stat), the higher the likelihood of displaced usage (503.0) (for example, that the user left the keys or wallet lying about somewhere, and so has lost or misplaced them). Beyond a certain amount of time with no motion, the AAL settings would indicate a 100% probability of a displaced state (503.0).

FIGS. 7A and 7B

Types of Sensor Data and Exemplary Historical Environmental Data Log

Discussed above are the different categories of sensor data (700) associated with a BIRD (200) (see for example discussion associated with FIG. 2). Table 700.T of FIG. 7A summarizes the distinctions in this document among sensor data (700).

FIG. 7B is an illustration of an exemplary historical environmental data log (488) for an item (100), with exemplary usage data (700.U) filled in, according to an embodiment of the present system and method. It may be supposed that the item (100) is a typical small item carried by a user, such as, for example, house keys (100.K) on a key chain. The log (488) contains time/date data (702), real-time sensor data (700.R), historical sensor data (700.H), and processed sensor data (700.P), all of which may is stored by a BIRD (200) which, in field use, is intended to be physically tethered to the house keys (100.K).

In an embodiment, the descriptive labels at the far right of FIG. 7B (for example. "Key chain at home, out on table . . . ", etc.) are not part of historical environmental data log (488), and are shown only as exemplary suggestions of when, where, and how an item (100) might be in-use when sensor data (700) is detected by sensors (210). In an alternative embodiment, such descriptive labels might be stored in the data log (488), for example, by being added as annotation by an authorized user (AU). In an alternative embodiment, the descriptive labels might be stored in the data log (488), for example, by being added as annotation by a natural language module of the BIRD (200) which is configured to recognize and define the "when, where, and how" of item use in natural language.

A first portion, or first set of records, of the exemplary historical environmental data log (488) may be data recorded by the BIRD (200) when, for example, the keys are at home, out on a table, not only stationary (139.Stat) but also motionless, at night. Each data record is marked with a date/time stamp (702) indicating when the data was recorded. The data (700) includes the location of the keys (indicated here symbolically as GPS 1.0); the acceleration and velocity (both 0, for keys lying motionless); and the ambient light level (shown as 0, though in practice a low ambient light level may be recorded even at night). Also shown is a single data field, "PSD1" with processed sensor data (700.P), though in fact the BIRD (200) may calculate, and the environmental data log (488) may store, numerous types of processed or derived data. (See for example the discussion associated with FIG. 8A, below, of method 455[Meth] and the resulting, associated processed data types.) For more complex forms of derived data, such as waveforms or other functions, a data field for the processed data (700.P) may include a data pointer or other reference to a suitable data structure.

The time/date data (702) is obtained from the BIRD's clock/timer/calendar (208). The remaining real-time and historical sensor data (700) is obtained from various BIRD sensors (210): The data for location is obtained from location sensor (210.L). The data for acceleration and velocity is obtained from motion sensor (210.M). The data for light intensity is obtained from one or more of the camera (210.C), the electromagnetic sensor (210.E), the optical sensor (210.Opt), or the video camera (210.V). Other categories or types of environmental data (not shown) may be collected and recorded from other sensors (210) as well. The processed data (700.P) is calculated by the BIRD's processor (204) according to the requirements of BIRD logic (500). Sec step 455 of exemplary method 430 (FIG. 4C), and also discussion associated with FIGS. 8A, 11A, 12A, and other figures throughout this document for further discussion of derived data (700.P).

A next successive portion, or successive set of exemplary records (710) of the exemplary historical environmental data log (488) may be data (700, 702, 700.P) recorded and/or derived by the BIRD (200) when the keys (100.K) are at home, out on a table, motionless, at dawn. The recorded data will be similar to that recorded for the keys at night, but the ambient light level (shown in arbitrary, representative units) will start to increase as daylight enters the home. Other sensor readings may change as well. For example, if people are waking in the home, a recorded sound level may increase. The ambient recorded light level may also increase significantly and abruptly, if someone wakes up and turns on the inside lights.

Successive portions of exemplary records (715-740) are shown for times throughout the day, for example, environmental data for when the keys (100.K) are at home, moving about the home in an owner's pocket (715); environmental data for when the key chain (100.K) is out of the owner's pocket as the owner locks the house door, then opens and starts car (720); environmental data for when the owner is on the road, driving (for example, to a job) (725); environmental data when the keys or key chain (100.K) is still out of pocket as the owner locks the car, and has the keys out for entry to an office while walking to the office (730); environmental data for the keys (100.K) while the keys are in the owners pocket, with minimal body movement while the owner is at his or her desk; and environmental data for when the owner is walking about the office, with the keys (100.K) still in pocket.

Except for time and date data (702), all exemplary data (700.H, 700.R, 700.P) shown uses arbitrary, representative units, intended mainly to show relative changes in intensity (for example, more light or less light, high speed or lower speed, etc.). In real application, appropriate units and associated, appropriately-scaled data values would be used for light intensity, velocity, acceleration, and other sensor measurements.

It will be noted that the illustrated exemplary historical environmental data log (488) shows historical environmental data (700.H) as being recorded at one minute intervals. This time interval is exemplary only. In an embodiment, environmental data (700) may be recorded and/or stored at more frequent intervals (for example, once every ten seconds or once every second, or even multiple times per second); or environmental data (700) may be recorded and/or stored at less frequent intervals (for example, once every two minutes or once every five minutes, or even longer intervals). An advantage of storing less data (700) is a reduced requirement for memory (206) by the BIRD (200). An advantage of storing more data (700) is a more fine-grained analysis of environmental conditions.

In an embodiment, the BIRD (200) may store different types of environmental data (700), from different sensors (210), at different time intervals. For example, location or motion data may be stored in time intervals on the order of seconds, while humidity or moisture data may be stored in time intervals on the order of minutes.

In an alternative or complementary embodiment, the BIRD (200) may store more recent data (700.R) at more frequent intervals, supporting fine-grained environmental analysis of current and recent conditions, while selectively deleting older data (700.H) so that it is stored at less frequent time intervals. Such embodiments balance requirements for fine-grained analysis with requirements for reduced data storage requirements.

In an alternative or complementary embodiment, the BIRD (200) may selectively stop recording certain kinds of data altogether, depending on environmental conditions. For example, if the BIRD (200) determines that the BIRD (200) and its associated item (100) are indoors, then humidity data may not be recorded or stored at all. Similarly, if the BIRD (200) determines that the BIRD's location has remained unchanged for a pre-determined period of time, then recording of acceleration or velocity data may cease. Recording of motion or velocity data may resume when an acceleration is detected by the motion sensor (210.M), or when a change in position is detected by the location sensor (210.L).

The BIRD (200) may employ similar, environmentally-contingent decision making to actually shut down some sensors (210) and/or associated circuitry when not required, thereby saving power. Examples again include shutting down moisture detection when indoors, or shutting down location detection when the BIRD (200) is stationary (139.Stat) (or, in the alternative, shutting down motion detection when the BIRD's location remains unchanged). Choices of which sensors (210) to shut down, and/or which sensor data (700) to record or not record, and/or frequency of recorded data (700), may be programmable, may vary from one sensor (210) to another, and may be changed dynamically depending on time of day, user selection(s), general location, and other factors.

FIG. 8A

Exemplary Analysis of Environmental Conditions

Step 455 of exemplary method 430 (see FIG. 4C, above) entails analyzing current/and or historical environmental conditions and/or item usage expectations. Step 460 of exemplary method 430 entails determining if the resulting usage data (700.U) from step 455 are in conformance with, and/or fall within parameters specified for, expected item conditions (600) (from step 440 of method 430).

FIG. 8A is a hybrid flow-chart/data-source-diagram for an exemplary method 800 for implementing step 455 of method 430. That is, exemplary method 800 processes sensor data (700) to derived processed sensor data values (700.P), according to an embodiment of the present system and method.

(For context and for convenience of reference, FIG. 8A also reproduces steps 460, 465, and 470 of method 430. These steps were already discussed above, and the discussion will not be repeated here. Exemplary method 800—that is, the method steps specific to step 455 of method 430—is shown in the shaded area of FIG. 8A. Inputs to the method 800 are shown in the unshaded areas at the top and top-left of FIG. 8A.)

Inputs to the Method

Various steps of exemplary method 800 accept time/date input from the BIRD's clock/calendar/timer (208); and sensor data (700) from sensors (210) and from the BIRD's historical and environmental data log (488) stored in the BIRD's memory (206). The clock, calendar and time data may contribute to triggering specific types of calculations or analyses in time-appropriate ways, as well as contributing time and duration data for the calculations.

Various steps of method 800 may also receive usage expectations (600) with parameters and/or logic for expected environmental conditions (144); and/or learned or adaptive item condition parameters, algorithms, data structures and similar (such as neural network constructs) (802) received from the BIRD's learning module (426). At times, exemplary method 800 may also receive direct user input (455) as well, for example through a graphical user interface. The direct user input (455) may for example modify the parameters of the monitoring process in real-time. For example, if the authorized user (AU) ordinarily spends the hours of 9 a.m. to 5 p.m. in an office, but will instead spend all or part of the day outside the office, the authorized user (AU) may enter parameters to indicate to the BIRDed-item (102) that it will be legitimately used outside their usual context.

Method Steps

For convenience of exposition, the steps of exemplary method 800 will be discussed immediately below with reference to an exemplary usage expectation (600.8) (see FIG. 8B, below, but also repeated here for convenience):

Between 7 a.m. and 6 p.m., and for the most recent hour, the Item Temperature is greater than 60° F. and the Item Temperature is less than 85° F. for at least 90% of the hour.

In step 804 of method 800, the BIRD (200) determines the appropriate data type requirements for data retrieval and evaluations. With reference to the exemplary usage expectation (600.8), the appropriate type of data which will be retrieved and evaluated is ambient temperature data recorded by the BIRD (200).

In step 806, the BIRD (200) determines the appropriate data scope requirements, that is, which data is to be retrieved. In an embodiment, the data scope refers to a time frame for the data. In an alternative embodiment, the scope of the data to be retrieved is defined by other considerations including for example and without limitation: the magnitude of the data, an estimated accuracy of the data, or other factors pertaining to the data. With reference to the exemplary usage expectation (600.8), the appropriate scope of the data which will be retrieved and evaluated is ambient temperature data recorded for the immediately preceding hour, as long as the current time (104.T) is any time between 7 a.m. and 6 p.m.

In step 808, the appropriate data determined in steps 804 and 806 is retrieved. With reference to the exemplary usage expectation (600.8), temperature data for the past hour is retrieved. The data may be retrieved both from current readings and from the environmental data log (488).

In step 810, a calculation type is determined. Calculation types may vary widely in complexity and type. With reference to the exemplary usage expectation (600.8), the calculation type is a determination of the percentage of the past hour during which the retrieved temperature data was between the lower and upper limits of 60° and 85° F.

In step 812, the appropriate calculations are performed on the retrieved sensor data (700). Results of the calculations may be a new number or value (such as an average value, a maximum or minimum value, a percentage value, or similar value); a logical outcome (such as a true or false result, or yes or no result); a trend calculation (such as increasing or decreasing values, or a correlation factors among the data); a mathematical function or value(s) indicative of or associated with a mathematical function (such as parameters defining a statistical distribution, or Fourier coefficients or wavelet coefficients of a curve representative of the data); or a complex data structure, such as that associated with defining a neural network.

Some possible exemplary calculations (812) include, for example and without limitation:

(812.0) data validation: at times, the BIRD (200) may validate data to confirm it falls within an expected range or meets other criteria; while such validation does not, strictly speaking, yield processed data (that is, it does not yield a new data point or set of data points), it is included here for completeness and economy of exposition;

(812.1) extracting a minimum or maximum value from a set of data points (such extraction may be configured to either include or exclude outlier data (extreme values));

(812.2) average value calculations, including mean, median, and mode;

(812.3) determining a trend, such as whether data points are strictly increasing or generally increasing over a time period, or are strictly decreasing or generally decreasing over a time period;

(812.4) clock/time determinations, such as determining a duration of time or a percentage of time for which data points are within a specified range;

(812.5) boundary crossing detection/count, which determines the number of time sensor data (700) crosses a specified boundary value;

(812.6) pattern recognition, such as determining statistical regularities among sensor value data points (700); determining self-similarities (fractal patterns) for sensor data (700); extrapolating or predicting future item behavior data based on past sensor data (700) for the item (100); constructing a neural network structure or similar pattern-based data structure based on past data (700), and designed to filter for future data which matches past data or does not match past data; and identifying which of various human-usage rules for items may be applicable to a set of data;

(812.7) human user biometrics calculations, such as recognizing characteristics of a walking style or pattern associated with a user (average length of gate, average timing of gate, average ratio of up/down to sideways motion to gate length, average velocity of walk, etc; average pressure exerted by user's frame on items carried in pockets; etc.).

(812.8) waveform calculations, including deriving wave patterns from raw sensor data (700), and establishing compact waveform representations such as Fourier and wavelet coefficients for functions constructed from sensor data (700);

(812.9) correlation calculations, such as recognizing a degree of correlation or non-correlation among sensor value data points; cross-correlation of two functional representations of sensor data (700); product of two functional representations of sensor data (700); a convolution of two functional representations of data (700); and a modulation of two functional representations of data (700);

Regarding again steps 812.6 and 812.9, a combination of correlation and pattern recognition calculations may be used to determine a correlation between internal location in a facility and movement or usage of the item (100). The pattern correlation may detect that a BIRDed-item (102) is frequently in-use within certain zones (140.Z) within a facility (or, perhaps, is typically not in-use in certain locations). If at a later time the observed real-time behavior of the item (100) is opposite to the previously calculated correlation, a displaced state (503.0) or an anomalous state (503.2) of the item (100) may be occurring.

Another pattern recognition calculation (812.6) may comprise recognizing a probabilistic or deterministic regularity in location within a home base (140.HB) or zone (140.Z), or local movement of the item (100) with respect to time. Again, if at a later time the observed real-time behavior is different from the previously calculated regularity, an anomalous item usage may be in progress.

For some items (100) which are in regular and consistent usage, a broad selection of normal behavior parameters, associated with processed sensor data values (700.P) may be determined to be associated with particular days of the week. For examples, items like keys (100.K), a wallet (100.W), or a purse (100.P), may have one typical set of usage behaviors on working days (typically Monday through Friday), and a different set of parameters for weekends and holidays. Other items (100) have usage parameters which may be determined less by particular days of the week, and more by other factors, such as location. For example, musical instruments (100.M) and sporting goods items (100.R) may have one set parameters (associated with processed sensor data (700.P)) when located (and used or in storage) at a home location, and a different set of parameters (associated with processed sensor data (700.P)) when taken outside the home, which may be at irregular dates or times.

Analysis Time Frames and/or Time Slices

In figures throughout this document, various exemplary plots are shown of exemplary BIRD sensor data (700), for purposes of illustrating BIRD sensor data analysis. In many of the figures, the time segments/slices illustrated are on the order of one day, with exemplary data subdivided or analyzed in hour units. The choice of time slices of a day and/or an hour is exemplary only. The BIRD (200) is designed to receive and interpret data on time scales which are appropriate to analyze and identify human usage of an item (100) and environmental variations that affect or impinge upon an item (100). Appropriate time scales for data collection and analysis may typically range from fractions of a second, to intervals of one second or several seconds, up to time scales of multiple days or even weeks.

For example, one means of identifying behavior or environmental factors indicative of a particular human user (iteMetrics (154)) associated with an item (100) may be to identify motion patterns (velocity and acceleration) reflective of a user's walking patterns or running patterns, or even smaller scale motion patterns associated with movement while being seated. For such analysis, data collection and analysis on the order of one second, or even fractions of a second, may be appropriate.

FIG. 8B

Exemplary Usage Expectations and Associated Calculation Steps

FIG. 8B shows three exemplary usage expectations (600.7, 600.8, 600.9). It will be recalled that usage expectations are applied in steps 455 and 460 of exemplary method 430. In an embodiment, step 455 may be implemented via exemplary method 800 discussed above in conjunction with FIG. 8A.

For each exemplary usage expectation (600.7, 600.8, and 600.9, respectively) the figure shows:

- the associated data types to be retrieved in step 804 of method 800;
- the scope of the data to be retrieved in step 455.10 of method 800;
- the data to be retrieved in step 808 of method 800;
- the calculation type to be determined in step 810 of method 800;
- the calculations performed in step 812 of method 800; and the comparison to be performed in step 460 of method 430.

Exemplary usage expectation 600.7 for the item (100) is:

Between 7 a.m. and 6 p.m., the Item Temperature is greater than 60° F. and the Item Temperature is less than 85° F.

Under usage expectation 600.7, steps 455 and 460 of method 430 together determine if the environment surrounding the BIRDed-item (102) has remained strictly between 60° F. and 85° F. during the hours of 7 a.m. and 6 p.m. If "yes," the item usage is determined to be normal (503.3), and otherwise the item usage is determined to be anomalous (503.2). Usage expectation 600.7 may, for example, be indicative of an (144) for a BIRDed-item (102) which is expected to be wholly used in a typical, room-temperature controlled environment between 7 a.m. and 6 p.m.

Exemplary usage expectation 600.8 for the item (100) is:

Between 7 a.m. and 6 p.m., and for the most recent hour, the Item Temperature is greater than 60° F. and the Item Temperature is less than 85° F. for at least 90% of the hour.

Usage expectation (600.8) has already been discussed in part above. Usage expectation 600.8 may, for example, be indicative of an expected environment for an item (100) which will be used in a typical, room-temperature controlled environment between 7 a.m. and 6 p.m., but where the user may occasionally step into a warmer or colder environment. For example, the usage expectation (600.8) may be applicable to an item (100) carried by a person working in a supermarket, who will occasionally step into a refrigerated room during the day, or perhaps be near an oven, where the item (100) will be exposed for brief periods to temperatures below 60° F. or above 85° F.

Exemplary usage expectation 600.9 for the item (100) indicates that:

Between 7 a.m. and 6 p.m., there is a 98% (or greater) correlation between a low light level for the item (indicated in arbitrary units as 0.1) and a low acceleration for the item (indicated in arbitrary units as 0.01).

In informal language, the usage expectation 600.9 indicates that, in normal (503.3) or extant (503.1) usage, there is a very high correlation between low light exposure and low acceleration for the item. This may indicate, for example, an item (100) for which: (i) when the user is not using the item, the item (100) is typically kept in pocket (limiting light exposure) and the user is typically in a state of limited motion (seated, for example), whereas (ii) when the user is using the item (100), the item is out of pocket (and so exposed to light) and the user is likely active (walking or running, etc.). A hypothetical item (100) and authorized user (AU) fitting this scenario might be keys (100.K) belonging to a guard or other security personnel, who keeps the keys in pocket when seated at a monitoring desk or station, but typically has the keys in hand when making rounds.

FIG. 8C

Exemplary Sensing and Environmental API

FIG. 8C is a list of some function calls which may be used in an exemplary application programming interface (API) (870) for sensing and environmental determinations by BIRD (200). The exemplary function calls shown are only a small subset of those likely to be used in a full API sensing and environmental API (870) for BIRD (200). The functions shown, and others like them, are used to obtain data from the sensors (210) and to make calculations based on sensor data (700) as per step 812, of method 800.

In an embodiment, the API function calls (870) may be available only for use internally by the BIRD (200). In an alternative embodiment, some or all of the API function calls (870) may be made so-called public interfaces, which are available to third-party programmers seeking to create enhancements to or supplements to the programs and applications provided with the BIRD (200). In an embodiment, some or all of the API function calls (870) may be part of an operating system program for the BIRD (200).

In an embodiment, the functions in the API (870) are elements of, and/or implemented within, one or more of the BIRD real-time monitoring module (486), the BIRD conditions analysis module (490), the BIRD comparison and assessment module (492), the BIRD learning module (426), or other modules of the BIRD (200) discussed above in conjunction with FIG. 4D. In an embodiment, the functions shown, and others like them, are elements of, and/or implemented within, one or more of the BIRD Sensor Data and Relay Control module (558), the BIRD DSP/Neural Network/Advanced Math module (560), and/or the BIRD's Public API (590), all discussed above in conjunction with FIG. 5I.

The functions shown, and others like them, may be employed by BIRD programmers as part of implementing the code for usage expectations (600). In an embodiment, the API (870) runs on the processor (204) of the BIRD (200), using the logical and mathematical function hardware of the processor (204) to make necessary environmental calculations and determinations. In an embodiment, the API (870) has the necessary internal computer code to obtain data from memory (206) of the BIRD (200), including data from the historical and environmental data log (488). In an embodiment, the API (870) has the necessary computer code to obtain data from the sensors (210) of the BIRD (200), possibly via the Sensor Data Relay and Control module (558) discussed above in conjunction with FIG. 5I.

The elements of the exemplary API include:

- BIRD motion function calls (872, 874-878), which identifies values and performs calculations pertaining to the motion of the BIRD (200) and its associated item (100);
- boundary function calls (880, 882-884) for determining where the BIRD (200) is in relation to a specified geographic boundary; in performing associated calculations and returning results, the boundary function calls (880) may in turn rely on calls to functions in a location API (not shown);
- visual function calls (886, 888-892) for determining ambient light levels and/or other visual data impinging on the BIRDed-item (102); and
- sound functions (894) for determining ambient sound levels and/or other sound quality data in the environment around the BIRD (200).

Other APIs (870) may be envisioned as well pertaining to other kinds of sensor data (700), including for example and without limitation, API functions pertaining to location, moisture or humidity, BIRD orientation in space, air pressure surrounding the BIRD (200), water pressure surrounding the BIRD (200), surface pressure on a surface of the BIRD (200), the ambient temperature surrounding the BIRD (200), the electromagnetic environment surrounding the BIRD (200), vibrations experienced by the BIRD (200), sensed radiation data, radar data, sonar data, and chemicals detected in the environment around the BIRD (200).

FIG. 9A

Exemplary BIRD Song Decision Table

Comparison of a BIRDed-item's usage expectations (600) or supplemental usage expectations (600.S) with the item's usage expectations (600.U) may occur through the steps of exemplary method 430, as discussed above. In steps 465 and 475 of method 430, the BIRD (200) determines appropriate responses—reports or signal (372), as well as other appropriate measures, in response to determining that an item (100) is displaced/anomalous (503.0/503.2). (In step 470 of method 430, the BIRD (200) may also initiate responses to its associated item being extant/normal (503.1/503.3).) The logic, algorithms, and/or other processing which a BIRD (200) applies to the determination of appropriate responses is referred to as BIRD song (900).

FIG. 9A illustrates an exemplary decision table (900.1) which, in an embodiment, may be employed as an element of implementing BIRD song (900). The exemplary decision table (900.1) shows various possible environmental conditions (905), which may be defined via (or extracted from or derived from) usage expectation (600), supplemental usage expectations (600.S), usage expectation groups (652), context-specific expectation groups (655), or other usage-related logical relations or data structures. The table (900.1) also shows various contexts (910) in which the environmental conditions may be evaluated, for example in a Time Frame 1 or a Time Frame 2, or a Location 1 or a Location 2.

Combination selections (915) indicate various ways that the different conditions (905) may be combined, that is, be simultaneously present, in different contexts (910). The response options (920) indicate different options for the BIRD (200) to signal a user that the BIRD (200) and its associated item (100) are experiencing anomalous conditions. The selection response options (925) indicate which specific responses may be implemented.

For example:

During Time Frame 1, context C1 indicates that if the item (100) is not in motion for more than a specified threshold number of minutes, or if the item is outside an allowed area for more than a specified threshold number of minutes, then the BIRD (200) should sound a local alarm.

During Time Frame 1, context C2 indicates that if the item (100) is not in motion for more than a specified threshold number of minutes, or if the environmental sound level is greater than a specified threshold level, then the BIRD (200) should sound a local item alarm and the BIRD (200) should also send an alert message to a user alert center (a cell phone (340), a home PC (335), a laptop or tablet computer (345), a LARC (355), etc.).

Similar considerations apply to interpreting contexts C3 through C12.

It will be understood that the decision table (900.1) is exemplary only. Many more or different conditions (905) may be employed, and the conditions (905) may be combined or interpreted through a plurality of logical relations such as AND, OR, XOR, NOT, and others. The decision table (900.1) may employ probabilistic elements as well or employ various kinds of fuzzy logic. The decision table (900.1) may be used along with, or as an adjunct to, other types of data structures, analytical mechanisms, pattern recognition and resolution systems, and other general methods and systems for determining the response of the BIRD (200) to displaced/anomalous states (503.0/503.2) for the item (100).

In an embodiment, the BIRD song decision table (900.1) may be implemented in whole or in part as part of the response module (496) and/or the reporting module (497) of the BIRD software. In an embodiment, the BIRD song decision table (900.1) may be implemented in whole or in part as part of BIRD operating system services including local signal/alert system (570), remote messaging system (572), third party control (574), item control and security (564), communications (566), and BIRD security (568); or the BIRD song decision table (900.1) may call upon various functions and features implemented within the same or similar operating system services.

FIG. 9B

Exemplary Reporting, Signaling, and Response Methods

FIG. 9B presents two flowcharts (900.2, 900.3) of exemplary methods which, in an embodiment, may be employed in whole or in part for implementing BIRD song (900), that is, for implementing: (i) BIRD self-initiated reporting that an item (100) may be lost (503.0.1), stolen (503.0.4), misplaced (503.0.2), misappropriated (503.0.3), or wandering (503.0.5); and (ii) other BIRD-initiated procedures responsive to a lost, misplaced, misappropriated, wandering, or stolen item (100). The flowcharts 900.2 and 900.3 provide exemplary, detailed implementations for steps 465 and 475, respectively, of method 430, already discussed above. (Other steps from method 430 are shown as well to provide context, but these steps are not discussed again here.)

In an embodiment, the exemplary BIRD song methods (900.2, 900.3) may be implemented in whole or in part as part of the response module (496) and/or the reporting module (497) of the BIRD software. In an embodiment, the exemplary BIRD song methods (900.2, 900.3) may be implemented in whole or in part as part of BIRD operating system services including local signal/alert system (570), remote messaging system (572), third party control (574), item control and security (564), communications (566), and BIRD security (568); or the exemplary BIRD song methods (900.2, 900.3) may call upon various functions and features implemented within the same or similar operating system services.

Signals and Reports

Signals:

A signal (372), as understood here, is a local sensory-based prompt or emission by the BIRD (200), which is: (i) generally sufficient in intensity to obtain the attention of an authorized user (AU) or other person nearby to the BIRD (200), and (ii) indicating that the BIRDed-item (102) is in some possibly displaced/anomalous state (503.0/503.2). Signals (372) may include, for example and without limitation: an alarm sound or other distinctive or vivid auditory sound emitted by the BIRD (200); a flashing light or other distinctive or vivid visual display presented by the BIRD (200); or a vibration or other distinctive or vivid tactile presentation by the BIRD (200). In an embodiment, and particularly for emergency uses, the signal (372) may even be a small electric shock to be administered by a BIRD (200) worn against the authorized user's body. The signal (372) is generated via the BIRD's local signaling (230).

Report:

A report, as understood here, is a content-oriented message which may either be presented locally on the BIRD (200) itself, or may be transmitted by the BIRD (200) to another device or recipient, such as a cell phone (340), a user's computer (335, 345), a LARC (355), AISs (365), or item team members (1400). A report may also be stored on the BIRD (200) for future reference. The content may be in the form of text, graphics, animation, a pre-recorded or artificially generated vocal message, alarm sounds, other tones, music, or a combination of the above. The content may pertain to various aspects of the BIRDed-item's displaced/anomalous state (503.0/503.2). To the extent that a report may be presented locally on the BIRD (200), a report may be viewed as a signal as well, so the two presentation modes—signal and report—may have some overlap.

BIRD Song Self-Initiated Reporting and/or Signaling

Parsing State Data:

Exemplary BIRD signaling and reporting method (900.2) begins with step 900.2.5. In an embodiment, in step 900.2.5, the BIRD (200) responds to a self-assessment by BIRD logic (500) that the BIRDed-item (102) may be in a displaced/anomalous state (503.0/503.2). In an embodiment, BIRD logic (500) not only assesses the displaced/anomalous state (503.0/503.2), but also generates other pertinent data as well including, for example and without limitation: an anomaly alert level (AAL); the time of detection; specific associated sensor data; and the usage expectation(s) (600) or other criteria which triggered the signal (for example, a determination by a neural network system of the BIRD (200)). Various elements of this displaced/anomalous state (503.0/503.2) data may be included in reports (374) generated by BIRD song (900). In step 900.2.5, the BIRD (200) parses the displaced/anomalous state (503.0/503.2) data (503), identifying those elements which may be pertinent for response/reporting purposes. The BIRD (200) may determine, among other elements, the type of displacement/anomaly state (503.0/503.2) and possibly an associated AAL, generally indicative of the severity of the displaced state/anomaly or the probability of the displaced state/anomaly.

Reporting and Signaling Rules:

In step 900.2.10, the BIRD (200) obtains reporting and/or signaling rules. These rules are typically retrieved from the BIRD's memory (206). In an embodiment, these rules are provided by an authorized user (AU) during BIRD configuration. In an alternative embodiment, the reporting/signaling rules may be provided as default rules for the BIRD (200), that is, provided by the designer or manufacturer of the BIRD (200). In an alternative embodiment, the rules may be a combination of default rules and user-provided rules.

The reporting/signaling rules may define, for example and without limitation:

- what types of displaced/anomalous states (503.0/503.2) will trigger signaling or reporting;
- whether a particular displaced/anomalous state (503.0/503.2) will trigger a signal, a report, or both;
- the type of signal generated in response to a particular displaced/anomalous state (503.0/503.2);
- the type of report and content of the report generated in response to a particular displaced/anomalous state (503.0/503.2);
- the target of the report (that is, the message recipient) in response to a particular displaced/anomalous state (503.0/503.2);
- whether the type of signal, type of report, content of a report, and target of a report will vary depending on the anomaly alert level (AAL), if any;
- whether the type of signal, type of report, content of a report, and/or target of a report will vary depending on the environmental context (for example, depending on whether the BIRD (200) and associated item (100) are in their home/storage location, or are in the field (office, travel, etc.)); and
- alternative signaling or reporting modes in the event that priority modes (that is, preferred or first choice modes) are not available.

In an embodiment, the reporting/signaling rules may be established in whole or in part via a BIRD song decision table (900.1). In an alternative embodiment, other logical rules or other forms of tables may be employed to establish the reporting/signaling rules.

Environmental Context:

In step 900.2.15, the BIRD (200) determines the environmental context. The determination may be based on sensor data pertaining to location, the optically sensed environment, BIRD motion, and other data as well. Based on available data, the BIRD (200) determines or attempts to determine the current environment of the BIRDed-item (102), such as a home base or other storage location (140.HB), or whether the BIRD (200) is in an office, a public space, indoors or outdoors, in travel, etc.

Available Reporting/Signaling Modes:

In step 900.2.20, the BIRD (200) assesses available signaling and/or reporting modes. This may include establishing whether the BIRD's local signaling elements (230) are operational. It may also entail establishing whether a communication link can be successfully established with one or more of a target cell phone (340), a target user computer (335, 345), a LARC (355), AISs (365), or item team members (1400)

Mode Selection:

In step 900.2.25, the BIRD (200) chooses suitable signaling and/or reporting modes, as well as report content. The determination(s) are made by applying the reporting/signaling rules (from step 900.2.5) to the current displaced/anomaly state (503), environmental context, and available reporting/signaling modes (from steps 900.2.10/15/20, respectively).

Generate Signal/Report:

In step 900.2.30, the BIRD (200) generates the appropriate local signals(s) (372) and/or the appropriate reports (374), based on the determinations made in step 900.2.25. The signals (372) are generated via local signaling elements (230), while the report(s) are transmitted via the transceivers (240) and antenna (242). Reports (374) may also be presented locally via the BIRD display (282.D) and audio output (230.A).

Remote Connection Validation and Options

In an embodiment, when a BIRD (200) transmits a report to a remote device (340, 340, 345, 365) or LARC (355), the BIRD is configured to expect a confirmation signal from the remote device or LARC. In the event the BIRD (200) does not receive the confirmation signal, the BIRD (200) may be configured to transmit to an alternate remote device (340, 340, 345, 365) or LARC (355). In the event the BIRD (200) does not receive the confirmation signal, the BIRD (200) may also be configured to generate a local signal (even if a local signal is not normally generated for the given displaced/anomalous state (503.0/503.2)).

In an embodiment, in the event the BIRD (200) does not receive the confirmation signal, the BIRD (200) may be configured to run a general check of the communications media and protocols normally available to it (such as cellular links, WiFi, Bluetooth, general internet access, etc.). In the event one media and/or protocol proves to be non-operative, the BIRD (200) may be configured to attempt communications via alternate media and/or protocols.

Other BIRD Self-Initiated Procedures for a Displaced/Anomalous Item

In method 900.3, the BIRD (200) may self-initiate other procedures in response to a displaced/anomalous item, in addition to signaling and reporting. In an embodiment, and while not shown in FIG. 9B, method 900.3 may entail steps similar or analogous to steps 900.2.5, 900.2.10, 900.2.15, and 900.2.25 of method 900.2:

Upon a determination by BIRD logic (500) of a displaced/anomalous item state (503.0/503.2), the BIRD (200) retrieves rules for responding to a displaced/anomalous state (503.0/503.2). (For example, the rules may be retrieved by the BIRD's response module (496).) In analogy with the signaling and reporting rules, the response rules determine appropriate responses based on the type of displaced state (503.0) or anomalous state (503.2), the AAL, the environmental context, and other factors.

The response module (496) parses displaced/anomalous state data to obtain relevant information about the displaced/anomalous state (503.0/503.2).

The response module (496) chooses suitable responses based on the response rules, the parsed displaced/anomaly state data (503), and the environmental context.

In an embodiment, and in response to the item being lost (503.0.1), misplaced (503.0.2), misappropriated (503.0.3), wandering (503.0.5), or stolen (503.0.4), the BIRD (200) may initiate one or more possible responses which may include, for example and without limitation:

Power conservation measures (900.3.5)—These measures may be useful if the BIRDed-item (102) determines that it may be lost (503.0.1) or misplaced (503.0.2), meaning the item (100) may be at risk of lying in place until retrieved by an authorized user (AU) or other party. Power conservation measures may include, for example and without limitation: determining which sensors are essential, and reducing power usage for other sensors; reduce power for reporting or signaling, or adjusting the frequency of repeating reports or signaling; reduced processor speed.

Alternate or additional location determination measures (900.3.10). For power conservation or other reasons, a BIRD (200) may normally update location data at relatively long intervals (for example, once per minute). If the BIRD (200) determines that it (along with its associated item (100)) are stolen (503.0.4), it may be useful to obtain rapid updates in item location determination. These more frequent updates enable tracking the motions of a thief, and provide accurate location information via wireless reports to authorities.

Current possessor determination measures (900.3.15). Measures which attempt to identify a current possessor (if any) of the BIRDed-item (102). These measures may include, for example and without limitation:

Using the camera (210.C) to obtain a picture of any persons near the BIRDed-item (102);

Using the camera (210.C) to obtain a picture of other possible identity-associated elements in the environment, such as license plate numbers of any cars identified by the BIRD (200);

Sound capture of ambient sounds via the BIRD's sound sensor (210.AC), with particular attention on capturing voice prints;

Capture of any fingerprint signatures in the event that a human digit comes in contact with the BIRD's biometric sensor (282.B);

Searching for RFID signatures of any RFID-tagged items which may be in possession of the current possessor; and Transmission of any captured identify data to a LARC (355).

BIRD security measures (900.3.20). In an embodiment, a BIRD (200) may normally have certain routine security measures in place. In an embodiment, when a BIRD (200) determines that it may be lost (503.0.1), misplaced (503.0.2), misappropriated (503.0.3), wandering (503.0.5), or stolen (503.0.4), the BIRD (200) may implement an elevated level of security measures. In an embodiment, the level of elevated security measures may depend on the type of displaced state (503.0), that is, on whether the BIRD (200) determines itself and its associated item (100) to be lost (503.0.1), misplaced (503.0.2), misappropriated (503.0.3), wandering (503.0.5), or stolen (503.0.4).

For example, a routine level of security may either require a use to enter a password in order to shut down power for the BIRD (200), or to use a biometric signature (such as a thumbprint) to shut down power. At an elevated level of security, the BIRD may require both the password and the biometric signature in order to shut down power. At a routine level of security, the BIRD (200) may enable a user to readily enter "in the field" or "on the fly" changes to the BIRD's expected environment (144) for a given day or a given period of time (that is, to make changes to the usage expectations (600)). At an elevated level of security, password access and/or biometric signature confirmation may be required in order to change the BIRD's expected environment (144) (usage expectations (600)). Other changes in security features may be envisioned as well in response to a determination that the BIRDed-item (102) is lost (503.0.1), misplaced (503.0.2), misappropriated (503.0.3), wandering (503.0.5), or stolen (503.0.4).

FIG. 9C

Exemplary Reporting, Signaling, and Response API

FIG. 9C lists some exemplary programming function calls which may be used in an exemplary application programming interface (API) (970) for BIRD song (900), that is, for reporting and/or signaling determinations by the BIRD (200) of an anomalous environment, context, or usage (503.2) for an item (100) associated with the BIRD (200). The exemplary function calls shown are only a small subset of those likely to be used in a full reporting and signaling API (970) for the BIRD (200).

The functions shown, and others like them, are used to report determinations of anomalous contexts or environments, and or/anomalous usage (503.2), and to report or signal the determinations as per step 465 method 430 (see FIG. 4C) and as per method (900.2) (see FIG. 9B). The functions shown, and others like them, may be employed by BIRD programmers as part of implementing the code for the BIRD's reporting to users. In an embodiment, the functions shown, and others like them, may be part of BIRD response module (496) and or BIRD reporting module (497). In an embodiment, the functions shown, and others like them, may be elements of the BIRD operating system (550), for example, being implemented within local signal/alert system (570) or remote messaging system (572). In an embodiment, the functions shown, and others like them, may be accessible by third-party programmers via the BIRD OS's public API (590).

In an embodiment, the API (970) would run on the processor (204) of the BIRD (200). In an embodiment, the API (970) would have the necessary internal computer code to obtain data from memory (206) of the BIRD (200), including data from the historical and environmental data log (532). In an embodiment, the API (970) would have the necessary computer code to obtain data from the sensors (210) of the BIRD (200). In an embodiment, the API (970) would have the necessary computer code to activate and make use of the BIRD's communications interface (220), ports (226), communications transceivers (240), and/or local I/O interface (280).

The elements of the exemplary API (970) include a messaging function call (972) and a signaling function call (974).

The APIs calls (972, 974) may include a variety of parameters, including for example and without limitation:

- anomaly: Indicates the type of anomaly, such as an item (100) possibly lost (503.0.1), item possibly misplaced (503.0.2), item possibly stolen (503.0.4), item possibly wandering (503.0.5), item possibly misappropriated (503.0.3), item in possibly unexpected type of use, item in possibly dangerous type of use. Text or codes may be used to indicate the type of anomaly, and additional information may be indicated by the codes. In an embodiment, the "anomaly" parameter may also be used to signal a normal/extant state (503.3/503.1) for the item (100).
- signaling method: Indicates how a message should be sent (for example, phone call, internet message, text message, etc.), or how a signal should be emitted by the BIRD (200) (for example, sound, visual signal, vibration, etc.).
- target: A target for a transmitted message, such as a phone number, e-mail address, URL, IP address, etc.
- additional signaling parameters: Message content and/or qualities of an alert signal emitted locally by the BIRD (200).
- alert level: signals the anomaly alert level (AAL) already discussed above, indicating the probability or likelihood of an actual anomaly.

Other alert and signaling functions and APIs (970) may be envisioned as well.

In an embodiment, the API function calls (970) may be available only for use internally by the BIRD (200). In an alternative embodiment, some or all of the API function calls (970) may be made available to third-party programmers seeking to create enhancements to or supplements to the programs and applications provided with the BIRD (200).

BIRD Navigation: Defining Usage Expectation

Discussed above and throughout this document are ExD criteria (170), which express in common or conventional language, or via user-friendly user interface elements, the ways in which an item (100) will be used or stored; and/or the environments to which the item (100) will be exposed, in the course of expected or ordinary use by an authorized user (AU).

For a BIRD (200) to determine if its associated item (100) is in an extant/normal state (503.1/503.3) or a displaced/anomalous state (503.0/503.2), the BIRD (200) must compare actual item usage (as indicated by usage data (700.U) with the ExD criteria (170). To make this comparison, the ExD criteria (170) must ultimately be expressed and stored within the BIRD (200) as formal parameters which can be compared, via the processor (204), to usage data (700) obtained directly or indirectly from sensors (210). The formal parameters for expected item usage are referred to as usage expectations (600).

Usage expectations (600) may include parameters which pertain to, for example and without limitation:

- expected item locations (144.L) such as daily life locations (140.DL), home base locations (140.HB), and zones (140.Z);
- expected times (144.T) when the item (100) should be at the expected locations (144.L);
- whether the item (100) is anticipated as being on-person (138.OnP) or off-person (138.OffP) in various contexts (expected locations (144.L), times, etc.) (144.P, 144.G);
- in particular, when and where an item (100) is expected to be in-use or in the field with an authorized user (AU) (whether on-person (138.OnP) or off-person (138.OffP)), or whether the item (100) is expected to be in storage;
- iteMetrics (154), including both morphIteMetrics (156) and/or psyIteMetrics (158) (144.AU);
- expected environmental conditions such as temperature, light exposure, sound exposure, and other environmental elements as well (144.G, 144.P).

BIRD Navigation

The methods and algorithms employed by a BIRD (200) to determine the usage expectations (600) are referred to as BIRD navigation (1000). In an embodiment, BIRD navigation (1000) may determine the usage expectations (600) based primarily on data and parameters input by an authorized user (AU). In an alternative embodiment, BIRD navigation (1000) may determine the usage expectations (600) through various automated or semi-automated methods. In an alternative embodiment, BIRD navigation (1000) may determine the usage expectations (600) through a combination of authorized user (AU) input and automated or semi-automated methods.

Several exemplary methods (1000.A, 1000.B, 1000.C, 1000.D) of BIRD navigation (1000) are discussed below in conjunction with FIGS. 10A-10K. Other methods and/or algorithms associated with BIRD navigation (1000) are discussed in conjunction with other figures throughout this document.

Linking User Schedule with Location and Other Elements of Item Usage

In an embodiment, a user's established or planned personal schedule (daily, weekly, or monthly) may provide a simple means to establish significant elements of the usage expectations (600). This is particularly true if the user has a fairly consistent and well-defined schedule, and if scheduled user activities can be reliably associated with specific expected locations (144.L).

For example, a user with a substantially fixed set of work hours may import, into a BIRD (200), the schedule of hours for which the user is at work. The workplace may then be associated with a specific location, so that the BIRD (200) now has at least a preliminary set of location usage expectations (600.Loc). Similarly, a teacher or student with a fixed class schedule may import, into a BIRD (200), the schedule of classes, and then establish expected classroom locations (144.L), again establishing a set of preliminary location usage expectations (600.Loc).

Such usage expectations may be "preliminary" in the sense that the user may still elect to fine-tune the usage expectations (600), for example by indicating allowed ranges of time that actual presence in a location may vary from the formal schedule.

In an embodiment, the association between certain scheduled times and certain specific expected locations (144.L) may be established via the BIRD user interface itself. In an alternative embodiment, an association between certain scheduled times with specific expected locations (144.L) (with suitable, specific geographic coordinates) may be established via a configuration computer (355). For example, scheduling or calendar software (for example, Microsoft Outlook and similar programs) may be provided with modular software extensions which enable the user to define expected locations (144.L), and to associate the expected locations (144.L) with specific appointment times. Such data can then be imported into a BIRD (200) to provide partial, preliminary usage expectations (600).

In addition to location, other elements of expected item usage (600) may be entered via a calendar as well. For further discussion of associating an authorized user's schedule with usage expectations (600), see the exemplary BIRD navigation method 1000.D discussed below in conjunction with FIG. 10J, and the associated exemplary calendar (1090) discussed below in conjunction with FIG. 10K.

Third Party Location Data

It will be noted that location data is taking on increasing importance in many areas of society. As such, location data (in the form of GPS data, geographic coordinates, or dedicated, location-specific signals from location beacons (1507)) for buildings and other significant locations (104.L) (parks, shopping malls, roads, etc.) may become routinely available via online services provided by information vendors (for example, Google, Yahoo, Microsoft, Apple, online news vendors, and other information vendors present in the information market either at the time of filing of this document or in the future). Similarly, schools and business may make available, to employees, faculty, and students, suitable location data for offices and classrooms. Such third-party location data may be employed by the BIRD (200) in conjunction with the various BIRD navigation methods discussed below.

FIG. 10A

1st Exemplary Method for Defining Usage Expectations: User-Defined

Expected environmental condition(s) (144) are the environmental conditions to which an item (100) is expected to be subject or likely to be subject during extant/normal usage (503.1/503.3) by an authorized user (AU). In an embodiment, in steps 404 and/or 406 of the exemplary method 400 discussed above (see FIG. 4A), the BIRD (200) receives or determines usage expectations (600) which reflect the expected environmental condition(s) (144) for an associated item (100) when the item is in extant/normal use (503.1/503.3). In an alternative embodiment, in steps 404 and/or 406 of the exemplary method 400 discussed above, the BIRD (200) receives or determines usage expectations (600) which reflect environmental condition(s) for an associated item (100) when the item is in displaced/anomalous use.

FIG. 10A is a flowchart of a first exemplary method 1000.A of BIRD navigation (1000), which may be used for implementing step 404 of the exemplary method 400. The method 1000.A typically results in the generation of one or more usage expectations (600) based on the authorized user's ExD criteria (170).

Exemplary method 1000.A is typically applicable when an authorized user (AU) can define in relatively precise, specific terms the expected environments (144) and/or behaviors for an item (100) in a given context. For example, the item (100) may be a set of car keys (100.K) to be used during the day to leave and enter the home, and to drive the car to and from work. For the keys (100.K), a user may be able to specify in significant or complete detail the key's usage environment(s) (104), for example, the expected locations (144.L) for the keys, the times when the keys are likely to be in motion, the temperatures, sound levels, or light levels to which the keys will be exposed, and similar environmental factors.

In an embodiment, exemplary method 1000.A is typically user-driven. That is, most or all of the parameters are entered by a user of the BIRD (200), for example via a user-interface of a configuration computer (335) used to configure the BIRD (200). Appropriate parameters may be entered into the configuration computer (335) through a variety of means, including but not limited to configuration dialog boxes (for example, elements 665, 668, 670, 1020, 1030) discussed in part above and further below, and similar dialog boxes.

In an alternative embodiment, exemplary method 1000.A may be partly or wholly automated, for example, by importing configuration data from a first BIRD (200.1) to a second BIRD (200.1). The imported data may serve as a baseline, against which the user can made suitable modifications.

Exemplary method 1000.A may also be used in conjunction with exemplary methods 1000.D, 1000.C and/or 1000.D, discussed below.

Method Steps

In step 1000.A.1 a context definition is received by the BIRD (200), from the authorized user (AU), for the expected environmental condition(s) (144). In an embodiment, a context definition establishes expected environmental conditions for a normal (503.3) or extant (503.1) item state, as well as the "when" and "where" for the item (100) and associated BIRD (200), during which certain conditions are expected to prevail.

In an alternative embodiment, a context definition establishes an anomaly type, such as "lost," "misplaced," or "stolen", as well as the "when" and "where" for the item (100) and associated BIRD (200), during which certain conditions are expected to prevail.

For example, the context definition may indicate:

context Date: Weekdays

Context Time: Between 09:00 and 17:00 hours

Context Anomaly Type: Lost/Misplaced Item

This indicates that the usage pattern or environmental conditions to be specified are applicable on weekdays between 9 a.m. and 5 p.m., and that the specified information will be indicative of anomalous item behavior or environment pertaining to a lost or misplaced item. The parameters to be specified may indicate either how it is known that the item (100) is lost (503.0.1) or misplaced (503.0.2); or how it is known when the item is where it is expected to be, that is, that the item (100) is not lost (503.0.1) or misplaced (503.0.2).

In step 1000.A.3, the BIRD (200) receives, from the authorize user, a sensor (210) type. The sensor type is indicative of a type of environmental condition which reflects whether the item (100) is in an extant/normal state (503.1/503.3), or a displaced/anomalous state (503.0/503.2). Examples of sensor types may include any of the sensors (210) already discuss above.

In step 1000.A.5, the BIRD (200) receives, from the authorized user (AU), a definition for either an extant/normal (503.1/503.3) or displaced/anomalous (503.0/503.2) item environment/behavior, as may be detected by the type of sensor selected in step 1000.A.3. For example, if the selected sensor type was a temperature sensor (210.T), the usage condition with the item behavior definition may now be:

Context Date: Weekdays;

Context Time: Between 09:00 and 17:00 hours

Context Anomaly Type: Lost/Misplaced Item

Sensor: Temperature

Anomalous Behavior: Temp<60° C.

In step 1000.A.7, the BIRD (200) receives from the authorized user (AU) an indication if the item behavior definition is complete for the current sensor type. Some sensors may sometimes require only a single definition (for example, a single temperature range), while other sensors may sometimes require multiple definitions (for example, multiple temperature ranges, multiple locations or multiple levels of velocities, etc.). It should also be noted that an extant/normal (503.1/503.3) or displaced/anomalous (503.0/503.2) behavior definition may include probability elements, such as indicating that a condition is expected to be true for a certain percentage of the time.

If in step 1000.A.7 the BIRD (200) receives from the authorized user (AU) an indication that the item behavior definition is not complete for the current sensor type, the method continues by returning to step 440.1E, where an additional expected and/or anomalous item behavior may be defined for the sensor currently under consideration.

If in step 1000.A.7, the BIRD (200) receives an indication that the item behavior definition is complete for the current sensor type, the method continues with step 1000.A.9. In step 1000.A.9, the BIRD (200) receives from the authorized user (AU) an indication of whether the item behavior definition is complete for all sensor types.

If the item behavior definition is not complete for all sensor types, the method continues back at step 1000.A.3, where the BIRD (200) receives from the authorized user (AU) an indication of a new sensor type for the item behavior definition. The method then continues as before to step 1000.A.5, where one or more extant/normal (503.1/503.3) and/or displaced/anomalous (503.0/503.2) item behaviors/environments are defined for the selected sensor (210).

If in step 1000.A.9, it is determined that the item behavior definitions are complete for all sensor types, the method continues with step 1000.A.11. In step 1000.A.11, the BIRD (200) receives from the authorized user (AU) logical combination criteria (AND/OR criteria, ELSE/IF criteria, and similar) among the previously established item behavior definitions.

Steps 1000.A.1 through 1000.A.11 are exemplary only, and do not necessarily need to be completed in the order shown. In an embodiment, for example, these steps may be integrated into the usage of a single dialog box, such as the exemplary Define Extant/Normal Usage Expectation Group dialog box (670) discussed above. The dialog box (670) enabled the definition of context-specific expectation groups (655).

In an alternative embodiment, multiple dialog boxes may be employed by the user to provide, to the BIRD (200), the appropriate context-specific expectation groups (655) and usage expectations (600). For example, a wizard-style system, provided by BIRD navigation (1000), may be employed, prompting a user for appropriate entries, and tuning the selections in successive dialog boxes based on user entries in earlier dialog boxes. In addition, the wizard may provide suggested data values or boundaries based on previously recorded data for the item (100), or for other items (100) used by the authorized user (AU).

At the conclusion of step 1000.A.11, an exemplary, complete usage pattern, reflective of the authorized user's ExD criteria (170), might now be:

Context Date: Weekdays

Context Time: Between 09:00 and 17:00 hours

Context Anomaly Type: Lost/Misplaced Item

Sensor: Temperature

Anomalous Behavior: Temp<60° F. OR Temp>80° F.

Sensor: Location

Anomalous Behavior: Location!=Building1 OR Location!=Building2 OR Location!=ConnectingCorridor1 or Location!=ConnectingCorridor2

Sensor: Accelerometer

Anomalous Behavior: PercentageOfTime_ItemInMotion<=25%

Sensor Combinations: Anomaly may be triggered by any one anomalous sensor

In step 1000.A.13, BIRD navigation (1000) converts the authorized user's usage ExD criteria (170), received in the previous steps, into an internal representation as usage expectations (600).

Step 1000.A.15 is formally an element of BIRD song (900) rather than BIRD navigation (1000), but is included here for completeness and clarity. In step 1000.A.15, the BIRD (200) receives from the authorized user (AU) reporting and signaling for the context. That is, if anomalous behavior is detected for the item (100) during field use, the type(s) of remote reporting and local signaling to be used are defined—for example, send an e-mail message to a cell phone, and sound a local alarm buzzer at a certain volume level. In an embodiment, step 1000.A.15 may include defining appropriate AALs for different values or ranges of anomalous parameters.

In step 1000.A.17, a determination is made if all contexts have been defined. If in step 1000.A.17 all contexts have been defined, the method stops (1000.A.19), and the BIRDed-item (102) is now ready for field use.

If in step 1000.A.17 it is determined that more contexts need to be defined, the method continues with step 1000.A.1, as per above. In the above example, at least one and possibly more contexts may need to be defined, for example:

Date: Weekdays

Time: Between 17:00 and 09:00 hours and

Date: Weekend days

Time: All hours

It will be noted that certain types of sensor data (700) may be integrated into expected environmental condition(s) (144) and/or usage expectations (600) both as part of the context and as part of the normal or anomalous behavior criteria. For example, part of the context could be a larger geographic area or location, while the anomalous behavior criteria could include more specific location determinations. For example:

Context Date: Weekdays

Context Time: Between 09:00 and 17:00 hours

Context Location: National Institutes of Health, Bethesda, Md.

context Anomaly Type: Lost/Misplaced Item

Sensor: Location

Normal Behavior:

Percent_Of_Time_Item_Is_Inside_Of_Building(ClinicalCenter)>=90%

OR

Percent_Of_Time_Item_Is_Inside_Of_Building(BioInformaticsCenter)>=80%.

This means that the above criteria are only in use when the item (100) and its associated BIRD (200) are on the grounds of the National Institutes of Health in Bethesda, Md. When on those grounds, the BIRD (200) will signal a displaced item state (503.0) or an anomalous item state (503.2) if the specific location criteria for normal behavior fail to be met.

FIG. 10B

Exemplary “Define Detection Context” Dialog Box

FIG. 10B illustrates an exemplary Define Detection Context dialog box (1020) which may be used, for example, in conjunction with exemplary method 1000.A discussed immediately above. The dialog box (1020) may be an element of BIRD navigation (1000) and may used to define for a BIRD (200), or to help define, a detection context (123) for usage expectations (600) for an associated item (100). The dialog box (1020) may assist an authorized user (AU) in formalizing their ExD criteria (170) for item usage.

Detection contexts have already been discussed above in conjunction with FIGS. 1B, 1C, 1P, and other figures. A detection context (123) is a set of context parameters that determine when and/or where some usage expectations (600) (that is, expected environmental conditions (144)) should be associated with the item (100). In an embodiment, the context parameters pertain to time and/or date ranges (105) of item usage, and/or to where the item is in-use. In an alternative embodiment, alternative or additional parameters may be employed as well. For example, a first detection context (123) for an item (100) may apply when the item is in-use on land, while a second detection context (123) for the item (100) may apply when the item is in-use in the water. In such a case, detection context (123) definitions may include the ambient surrounding medium for the item (100) (for example, air or water). For specialized applications, other detection context (123) parameters may apply as well.

A detection context (123) may also be understand as an environmental context where an item may be put to use by a person, and where the item's usage is expected to be generally consistent, or to display a consistent usage pattern, possibly over fairly well-defined duration in time. A detection context (123) is typically defined in terms of a general usage location and/or a general usage time frame or time range (105). For example, a detection context (123) might be a home base location (140.HB) such as the authorized user's “home” or “office”, or a time frame (105) such as “weekdays during working hours” or “weekdays at nights.” (For operational purposes, specific data parameters are provided to indicate the location and/or time for “home.” “office”, “working hours,” etc.)

A detection context (123) may also be defined, in the alternative or additionally, by a type of user activity, such as “shopping”, “dancing,” etc. A detection context (123) may also be defined, in the alternative or additionally, by a storage of an item (100) or mode of carrying an item, such as “in pocket” (for a wallet or keys), “on wrist” (for a watch), “in purse” or “in backpack” (for various items), etc.

If a BIRDed-item (102) is typically expected to by used by more than one user (that is, the item (100) and BIRD (200) are typically shared by the different users), then applicable detection context (123) definitions may also include a particular authorized user (AU). (In field user, when the BIRDed-item (102) switches hands from one user to another, the current user may input their identify via password, biometric identification, or similar, to help establish the appropriate detection context.)

Viewed broadly, detection contexts (123) are part of the usage expectations (600). A detection context (123) helps specify the expected usage of an item (100) in terms of where and/or when an item (100) is expected to be used in certain ways. A typical item may, for example, have three primary usage contexts: two home base locations (140.HB) (such as a home and place of work), and a broader, encompassing daily life domain (140.DL). Specific usage expectations can then be define which are appropriate to each of these three contexts.

The exemplary Define Detection Context dialog box (1020) includes:

Name fields for defining one or more detection context names (123).

((Anomaly Type)) radio buttons (1024), as well as possibly subordinate dialog boxes, for selecting or defining anomaly types, such as lost (503.0.1), misplaced (503.0.2), misappropriated (503.0.3), wandering (503.0.5), or stolen (503.0.4). A checkbox (1024.*cb*) enables the user to indicate whether or not anomaly type is used at all to define the detection context.

Location data fields and related data entry elements (1026) for selecting or defining one or more expected locations (144.L) where the context may apply. A checkbox (1026.*cb*) enables the user to indicate whether or not location is used at all to define the detection context.

Suitable time data fields (1027) and suitable date data entry means (1028) for specifying the time(s) and date(s) when the context applies. A checkbox (1027.*cb*) enables the user to indicate whether or not time and date are used at all to define the detection context.

The data fields shown are exemplary only, and alternative or additional fields and data entry elements may be employed for defining the context elements shown (location, dates, times) and for defining other contextual elements as well (for example, altitude, accelerations (for a car, airplane, etc.).

FIG. 10C

Exemplary "Define Normal/Anomalous Environment or Usage Dialog" Box

FIG. 10C is a drawing of an exemplary Define Normal/Anomalous Environment Or Usage dialog box (1030) which may be used, for example, in conjunction with the exemplary method 1000.A discussed above (see FIG. 10A). The dialog box (1030) may be used to define, or help define, usage expectations (600) which characterize extant/normal (503.1/503.3) or displaced/anomalous (503.0/503.2) environmental condition(s) for an associated item (100). In an embodiment, the extant/normal (503.1/503.3) and/or displaced/anomalous (503.0/503.2) environment (or usage) is defined with respect to a particular detection context. In an alternative embodiment, definitions may be created which are not context-specific.

The exemplary Define Normal/Anomalous Environment Or Usage context dialog box (1030) includes:

- Detection context fields, drop down menus, list boxes, or similar GUI elements (1032) for selecting an applicable detection context. In an alternative embodiment, the selection of a detection context (1032) may be optional or not available, and the dialog box (1030) may be used instead to create universal definitions (that is, universal classes) of normal or anomalous environments/uses; such classes of normal/anomalous environments may then be applies to specific item contexts using other dialog boxes (not shown).
- Sensor fields, drop down menus, list boxes, or similar GUI elements (1034) for selecting an applicable BIRD sensor (210)
- Sensor specific data fields, check boxes, radio buttons, data entry fields, list boxes, and other GUI elements (1036) for defining the sensor-specific requirements for the current detection context. In the figure, a temperature-related set of configuration elements are shown, corresponding to the selection of "Temperature" in the Sensor list box (1034). Had another sensor (210) been selected by the authorized user (AU), then alternative, appropriate, sensor-related data fields (check boxes, radio buttons, etc.) would be shown under Sensor Specific Requirements (1036). For example, if a location sensor (210.L) were selected, data fields related to defining location would be displaced (503.0). If the motion sensor (210.M) were selected, data fields related to define motion and motion limits would be displayed.

Radio buttons (1038) allow the user to determine if the data entered will indicate extant/normal (503.1/503.3) or displaced/anomalous (503.0/503.2) environmental temperatures for the item (100); and if anomalous (503.2), the AAL level (general likelihood that the readings do indicate displaced/anomalous states (503.0/503.2)). Other data entry fields, as shown, may be used to define the specific expected temperature ranges the item (100) should experience in extant/normal usage (503.1/503.3), or displaced/anomalous usage (503.0/503.2), as appropriate.

The Define Normal/Anomalous Environment Or Usage dialog box (1030) may also include addition GUI elements, not shown, for associating different ranges of AALs with different sensor readings or ranges of sensor readings.

FIG. 10D

2nd Exemplary Method for Defining Usage Expectations: Auto-Defined

FIG. 10D is a flowchart of a second exemplary method 1000.B of BIRD navigation (1000), which may be used for implementing step 406 of exemplary method 400 (see FIG. 4A).

Exemplary method 1000.B may be used in conjunction with exemplary method 1000.A already discussed above, to confirm or augment user-delineated expectations for environmental conditions and/or usage expectations (600). Method 1000.B may also be employed when an authorized user (AU) is unable to determine, or is uncertain of, the precise parameters for expected item environmental conditions or usage. Method 1000.B enables the BIRD (200) to automatically define suitable usage expectations (600) for expected item environmental conditions based on actual item usage. Method 1000.B may also be used in conjunction with exemplary methods 1000.C and/or 1000.D, discussed below.

BIRD Training Period

Method 1000.B depends on the authorized user (AU) making use of an item (100) in typical usage over some extended period of time. This period of time may be referred to as a BIRD training period. (Other equivalent terms may be employed as well, such as "BIRD-item tracking period," "BIRD configuration period," or "BIRD observation period.") The exact configuration or training period of time must be chosen by the authorized user (AU), based on general BIRD usage guidelines provided to the user, and based on the user's own general knowledge of typical usage for a particular item (100).

For example, if an item (100) will typically be used in varying ways over the course of a typical work week and weekend off, then typical usage expectations may be determined by keeping the item (100) in-use, tethered to the BIRD (200), and under BIRD observation, for a period of several weeks. In general, two or more cycles of a single full usage period would be the preferred choice to determine normal item usage.

During this extended (multiple cycle) normal usage period, it would be important for the user to take extra precautions, or simply be extra aware, to make sure the item (100) remains in extant/normal (503.1/503.3) or typical usage. For example, for an item (100) that would typically be carried about by the user at various times of day on certain days, the user will want to pay added attention to ensure that the item is not lost or misplaced, and certainly not stolen, during the BIRD observation period or tracking period.

Method Steps

In step 1000.B.1, a context definition is established for the expected environmental condition(s) (144). A context definition establishes a "when" and/or a "where" for the item (100) and associated BIRD (200), during which certain environmental conditions are expected to prevail. The context definition may also establish an anomaly type.

For example, the context definition may indicate:

Context Date: Full Week

Context Time: 24 Hours Per Day

Context Type: Extant/Normal Usage (Not Displace/Anomalous)

This indicates that the usage pattern or environmental conditions to be identified are applicable on over the course of a single week (for example, Sunday through Saturday), and that the specified information will be indicative of extant usage (503.1) (the item (100) is not a lost, misplaced, stolen, misappropriated, or wandering). The parameters to be identified by the BIRD (200) will be indicative of extant/normal usage (503.1/503.3) of the item (100). The context definition may be established, for example, through the exemplary Define Detection Context dialog box (1020) already discussed above in conjunction with FIG. 10B.

In step 1000.B.3, the BIRD (200) is:

(i) attached to the appropriate item (100);

(ii) set into a configuration mode or monitoring mode; and (iii) allowed to continuously monitor and record the environmental conditions and usage to which the item (100) is subject.

Substantively, the BIRD's configuration or monitoring mode may differ little from routine item monitoring for field use of the item (100), in that appropriate environmental sensors (210) are active either way. In an embodiment, however, the BIRD (200) is configured to continuously monitoring throughout the training period, even if in normal usage the authorized user (AU) might at times shut down the BIRD (200) (to conserve battery power, for example). In such an embodiment, during the training period, it is therefore also important that the BIRD (200) be kept continuously charged, or if in continual on-the-go usage, that the battery be swapped if and when needed to maintain continual or nearly continual power. In an alternative embodiment, the BIRD (200) may be shut down at points even during the training period; the BIRD (200) may include the "shut down" times and locations (104.L) as part of its determination of extant/normal (503.1/503.3) environment or usage.

Step 1000.B.5 occurs at the conclusion of the training period or training period. In step 1000.B.5, the BIRD (200) or an associated configuration computer (335) automatically defines extant/normal sensor responses for extant/normal item usage expectations (600), and also either implicitly or explicitly thereby defines displaced/anomalous sensor responses for displaced/anomalous states (503.0/503.2). In step 1000.B.5, the BIRD (200) or configuration computer (335) analyzes the data collected during the preceding training period. In an embodiment, determinations made by the BIRD (200) or configuration computer (335) may include, for example and without limitation:

- Days of the week when the item (100) is being carried about or not being carried about by the authorized user (AU).
- Hours of the day when the item (100) is being carried about or not being carried about by the authorized user (AU).
- Other characterizations of on-person/off-person (138) usage of the item (100).
- Consistent locations (104.L) or location boundaries during certain days of the week or certain times of day for the item (100). In particular, the BIRD (200) or configuration computer (335) may identify home base locations (140.HB) and daily life locations (140.DL). Associated with such identifications may be suitable AWOL criteria (128) for the item (100).
- Consistent velocity patterns or ranges during certain days of the week or certain times of day for the item (100).
- Consistent acceleration patterns or ranges during certain days of the week or certain times of day for the item (100).
- Consistent patterns pertaining to levels, ranges, or qualities of sound exposure during certain days of the week or certain times of day for the item (100).
- Consistent patterns pertaining to levels, ranges, or qualities of light exposure during certain days of the week or certain times of day for the item (100).
- Consistent patterns pertaining to levels, ranges, or qualities of temperature exposure during certain days of the week or certain times of day for the item (100).
- Determinations of iteMetrics (154).

The patterns of levels and ranges so determined may also be expressed or determined in terms of probabilities or percentages. For example, the BIRD (200) or configuration computer (335) may determine that there is a 90% likelihood the item (100) will be found within a certain building or traveling along a certain road within a certain time frame, on certain days.

The output or result of step 1000.B.5 are one or more usage expectations (600) which have been determined to be indicative of extant/normal usage (503.1/503.3) of the item (100). See FIG. 10E, discussed further below, for addition information on step 1000.B.5.

In step 1000.B.7, the normal sensor responses for extant/normal item usage (503.1/503.3) determined in step (1000.B.5) are presented to the user for review and editing. This may take any of several forms, including presenting real-time and historical sensor data (700); presenting processed sensor data (700.U), including various summaries of item usage; presenting sensor data (700) in various graphical forms; presenting summaries of sensor data as encapsulated into usage expectations (600) in algebraic and logical formats; and/or presentations of the usage expectations (600) in natural language formats for user editing.

In step 1000.B.9, the BIRD (200) or configuration computer (335) receives user edits of the sensor data (700) to eliminate outlier values (values the user would expect to rarely see, which only showed up by accident or unlikely circumstance during monitoring), or the user may edit conditional statements for usage expectations (600). Other forms of user editing of the usage expectations (600) may be employed as well.

Steps 1000.B.5 through 1000.B.9 may be iterative (1000.B.10), with analysis by the BIRD (200) or configuration computer (335) being repeated in light of user edits.

In steps 1000.B.11 and 1000.B.13, reporting and signaling are respectively defined for the usage context(s). That is, if displaced/anomalous (503.0/503.2) behavior is detected for the item (100), the type(s) of remote reporting and local reporting to be used are defined—for example, send an e-mail message to a cell phone, and sound a local alarm buzzer at a certain volume level. (These steps may be formally part of BIRD song (900), but are included here for completeness and clarity.)

In an embodiment, steps 1000.B.9, 1000.B.11, and 1000.B.13 may be combined in whole or in part so as to include defining appropriate AALs for different values or ranges of displaced/anomalous states (503.0/503.2).

In step 1000.B.15, the authorized user (AU) makes a determination whether or not all contexts have been defined. If in step 1000.B.15 all contexts have been defined, the method concludes at step 1000.B.17.

If in step 1000.B.15 it is determined that more contexts need to be defined, the method continues with step 1000.B.1, as per above.

Alternative Forms of Usage Expectations

In an alternative embodiment, and referring back to step 1000.B.5, usage expectations (600) may, additionally or in the alternative, be automatically defined in terms of more abstract mathematical representations or patterns. For example, item velocity and acceleration, light exposure, sound exposure, pressure patterns, or even location data may be represented as waveforms. The waves may be further deconstructed via such pattern analysis tools as Fourier analysis (or fast Fourier analysis), or wavelet analysis, to determine typical or baseline expected wave coefficients.

Once these baseline coefficients are determined and stored as usage expectations (600), future data collected by the BIRD (200) during field use may be gathered (in step 445 of method 430, see FIG. 4C), subject to similar analysis (that is, Fourier analysis, wavelet analysis, or similar). The analyzed data in field use may then be compared to the baseline data (in step 455 of method 430), to make a determination of normal or anomalous behavior (step 460 of method 430).

Other data analysis modes may be employed as well. For example, during the training period, the recorded sensor data (700) may be used to program a neural network model or other stochastic modeling system. The BIRD (200) may then employ the neural network model or other stochastic modeling system to predict future expected behavior of the item (100) associated with the BIRD (200). If future behavior of the item (100) does not match the predicted behavior, the BIRD (200) may signal the possibility of anomalous behavior (steps 455, 460, and 465 of method 430).

In an alternative embodiment, and referring back to steps 1000.B.7 and 1000.B.9, presentation of extant/normal item sensor data (700) to a user, and editing by the user, may entail direct presentation of sensor-derived waveforms or waveform coefficients. In the alternative, and possibly in a more "user friendly" mode, presentation and editing may entail appraising a user of possible outlier data values and allowing the user the option of suppressing such values. Presentation and editing (1000.B.7, 1000.B.9) may also entail enabling a user to edit parameters associated with the use or interpretation of wave data or similar data. For example, the authorized user (AU) may be able to edit parameters pertaining to how closely or loosely future sensor measurements should be expected to be similar to the configuration-period measurements. Other forms of sensor data review and editing may be envisioned as well.

In an embodiment, steps 1000.B.9, 1000.B.11, and 1000.B.13 may be combined in whole or in part so as to include defining appropriate AALs in terms of different amounts or degrees of variation from expected sensor waveforms. For example, future waveform measures which are (by some suitable waveform-variation metric) within 10% of previously measured waveforms may be considered non-anomalous; waveforms showing between 10% and 20% variation from previously measured waveforms may be considered to have a low probability of anomaly indication; waveforms showing between 20% and 40% variation from previously measured waveforms may be considered to have a medium probability of anomaly indication, etc.

As noted above, analysis (1000.B.5) of sensor data (700) acquired by the BIRD (200) during the training period, and used to arrive at usage expectations (600), may occur on either the BIRD (200) or a configuration computer (335). If the analysis is done on the configuration computer (335), it will be understood that sensor data (700) acquired by the BIRD (200) is first downloaded to the configuration computer (335); the computer (335) performs the analysis and data presentation steps (1000.B.5, 1000.B.7, and 1000.B.9); and the finalized usage expectations (600) are then uploaded from the configuration computer (335) back to the BIRD (200).

FIG. 10E

Exemplary Method for BIRD Autodetermination of Normal Sensor Responses

In step 1000.B.5 of exemplary method 1000.B discussed above, the BIRD (200) or an associated configuration computer (335) automatically determines expected environmental condition(s) (144) and/or usage expectations (600) for an associated item (100) based on BIRD sensor data (700) obtained during a BIRD training period.

FIG. 10E is a flowchart of an exemplary method 1000.B.5[Meth] for implementing step 1000.B.5. In an embodiment, the method 1000.B.5[Meth] is completely automated. In an alternative embodiment, method 1000.B.5[Meth] may employ some authorized user (AU) input at certain points.

Configuration Process Time Frame, Primary Time Cycle, and Time Subunits

The method begins with step 1000.B.5-1. In step 1000.B.5-1, a determination is made as to the total time frame or time period of the BIRD configuration process. This time frame should be at least the duration of a primary time cycle unit for usage of the BIRD (200) and its associated item (100), but may be two or three such cycles, or longer.

In step 1000.B.5-4, a determination is made as to the primary time cycle unit within the overall configuration process time frame. In an embodiment, a primary time cycle is a time frame in which the authorized user's overall pattern of usage repeats itself. In an embodiment, a primary time cycle is the most extended or longest time frame, within the overall training period, in which the authorized user's overall pattern of usage repeats itself.

For example, for many items in typical usage, a typical primary time cycle for usage might be one week. A person's keys (100.K), purse (100.P), or wallet (100.W) are carried about and used during the course of a typical work week, with certain expected usage on workdays (such as Monday through Friday), and different expected usage on days off (such as Saturdays and Sundays). Assuming the authorized user (AU) maintains fairly steady work and life habits, usage expectations for items (100) can be expected to be more or less similar from one week to the next.

Of course for different items (100) used in other contexts, or for persons with less conventional work/time-off/life cycles, other time patterns might apply. For example, for some item (100) used exclusively in a work setting (as opposed to work and home), a typical primary time cycle might be a single day, or some period of several days (other than Sunday through Saturday), or even a period of several hours, depending on the specific work context.

If the appropriate primary time cycle for an item is one week (for example, Sunday through Saturday), then a desirable total time frame for BIRD configuration might be two weeks, or possibly three or four weeks.

Summary examples:

(a) Total time frame for BIRD configuration: 4 weeks. Primary time cycle: one week.

(b) Total time frame for BIRD configuration: 1 week. Primary time cycle: one day.

(c) Total time frame for BIRD configuration: 1 day. Primary time cycle: four hours.

In an embodiment, the determination of the total configuration time frame and the primary time cycle may be made, at least in part, by the user, with one or the other (or both) being provided to the BIRD (200) or to the configuration computer (335).

For example, in step 1000.B.5-1 the BIRD (200) or configuration computer (335) may receive from the authorized user (AU) that the total time period to be devoted to BIRD configuration is one month. After the data has been gathered for a month (by using the BIRD (200) and associated item (100) in the field), the BIRD (200) may analyze the sensor data (700), and determine that usage of the item typically repeats from week to week. In this case, the BIRD (200) has determined in step 1000.B.5-4 that the primary cycle time for the BIRD (200) is one week.

In an alternative embodiment, step 1000.B.5-4 may precede step 1000.B.5-1. (In this event, step 1000.B.5-4 may actually come at the beginning of the entire BIRD configuration process, 1000.B.5[Meth].) The user specifies in advance that the primary cycle time is (for example) one week. The BIRD (200) or configuration computer (335) then recommends a total configuration time frame which is a multiple of one week (for example, two, three, or four weeks). The user then selects the actual configuration time, and data collection proceeds.

(Note that while steps 1000.B.5-1 and 1000.B.5-4 are considered part of step 1000.B.5, in practice they may proceed or overlap with steps 1000.B. 1 and/or 1000.B.3.)

Following data collection, and following steps 1000.B.5-1 and 1000.B.5-4, the method proceeds with step 1000.B.5-8. In step 1000.B.5-8, the method determines appropriate time subunits for further data analysis. Multiple time sub-units may be determined. For example, if the total time frame for BIRD configuration data collection is several weeks, and the primary time cycle for the BIRD (200) and associated item (100) is one week, then a primary time subunit may be determined to be one day in length, a secondary time subunit may be determined to be one hour in length, a tertiary time subunit may be determined to be some fraction of an hour (such as a quarter hour, or five minute intervals, etc.).

Appropriate but different time subunit intervals may be determined based on different considerations and algorithms. In general, however, a time subunit interval is:

(i) an interval which is long enough to reflect some sustained usage of an item (100) by a authorized user (AU) and/or sustained impact of an environment on the BIRDed-item (102), or (ii) an interval which is long enough to reflect some sustained pattern(s) of usage of the item (100) by the authorized user (AU) and/or a sustained pattern of environmental impact, and therefore is (iii) long enough that failure to reflect those pattern(s) may indicate displaced/anomalous usage (503.0/503.2).

For many common items (100) a time period of, for example, a few seconds would likely be too short for a time subunit, though there may be some exceptions for some items (100) and some types of usage which is highly time specific. For example, in some corporate, industrial, government, or military application, where it is expected that a particular key must be inserted in some lock at precisely a specific time every day, a time subunit on the order of seconds may be appropriate. Most people, however, in common usage, do not start their car in the morning at exactly, precisely 06:00:00 hours. So, for example, a time interval indicative of when a car should normally be started (and so when the keys should be out, and be in motion to start the car) might specify a time range on the order of ten minutes, or multiples of ten minutes (indicating the car should be started somewhere within that time interval).

Upper limits to time usage subunits may be established as well. Time usage subunits may also be established based on known conventions for human behavior, and may therefore have specific time boundaries. For example, usage subunits may be established for morning (for example, 06:00:00 hours to 12:00:00 hours), for afternoon, for breakfast time, for lunchtime, for dinner time, etc. In some cases, time usage subunits may partly overlap as well.

In an embodiment, time subunits are predefined. In an alternative embodiment, time subunits are defined by BIRD navigation (1000) based on an analysis of the sensor data (700). For example, an automated analysis of the sensor data (700) may determine an average length of time in which certain sensor data is sustained. For a particular example, an automated analysis of the sensor data may determine that, on average usage, motion of an item (100) is sustained for (typically) five minutes when the item (100) is in motion at all, with a typical variation of two minutes either way. Based on such data, a time subunit may be established of, for example, three minutes, five minutes, seven minutes, and/or ten minutes. Fractions of average usage time may also be employed; in the above example, if an average the motion of an item (100) is sustained for five minutes at a time, a time subunit of one minute may be established as a basis for further analysis and processing.

Other criteria may be employed as well to determine time subunits, for example based on variations from baseline sensor data. Such variations may be referred to as periods of active sensor readings. For example, for motion or acceleration sensor readings, baseline data may be considered to be zero values, during periods when an item (100) is not in motion and/or not accelerated, and non-zero values may be considered active sensor readings. For light readings, baseline values may be darkness. Other appropriate baseline criteria may be developed for other types of sensor readings.

Criteria for delimiting or identifying time subunits may include, for example and without limitation: average time intervals for active and/or baseline sensor readings (as per above); time intervals between active and/or baseline sensor readings; minimum length of active and/or baseline sensor readings; and maximum length of active and/or baseline sensor readings. Outlier values may or may not be dismissed, according to optional filter criteria.

Specialized time intervals may also be defined around cultural and social calendars, such as holidays, vacation periods, seasons of the year, and so on.

Identifications of Location Units and Subunits

In step 1000.B.5-12, the BIRD (200) or configuration computer (355) may determine location units and/or subunits (primary, secondary, tertiary, etc.). Location units and subunits identify definable areas or regions where the BIRD (200) and its associated item (100) are used for significant or substantial lengths of time. Location units and subunits may be defined in terms of geographic coordinates (such as GPS coordinates and boundaries; or a central geographic point and radial distance from that point), building identifiers, room names within buildings, road and street names, and similar.

In an embodiment, step 1000.B.5-12 may identify one or more appropriate boundaries for daily life locations (140.DL), home base locations (140.HB), and zones (140.Z). In an embodiment, daily life locations (140.DL) may be identified by determining the outer perimeter for all item usage during the training period. In an alternative embodiment, daily life locations (140.DL) may be identified by first determining an outer perimeter for all item usage, and then extending the perimeter according to conventional public location boundaries (such as cities boundaries or county boundaries). Similarly, in an embodiment, daily life locations (140.HB) may be identified by the boundaries of actual locations (104.L) where the item (100) is regularly used or stored; or, in alternative embodiment, by identifying the location boundaries of regular item use/storage, and then extending such boundaries to conventional public location boundaries (such as home or office property lines). Similarly considerations may apply to identifying zones (140.Z).

As with time cycle units and subunits, location units and subunits may be identified in whole or in part by data provided by a user of the BIRD (200); in whole or in part by an analysis of the sensor data (700) recorded during the BIRD training period; or by a combination of user-provided data and analysis by the BIRD (200) or configuration computer (335). Outlier values (such as a location visited only once during the BIRD training period) may or may not be dismissed, according to optional filter criteria or user editing.

Other Environmental Contexts

In step 1000.B.5-16, the BIRD (200) or configuration computer (355) may determine units and/or subunits (primary, secondary, tertiary, etc.) for other types of environmental contexts in addition to time and space. Time and space (that is, location) are the two most common environmental contexts in which human behavior—and therefore, item usage—may be examined for patterns. Put another way: An item (100) is used or not used by a person, an item (100) is put into motion or not put into motion, an item (100) is exposed to light/sound or not exposed to light/sound, etc., either at certain times or in certain locations (104.L). It is therefore in the context of time and/or location that a BIRD (200) would typically seek out recognizable usage expectations. However, for specialized applications and items (100), other domains or contexts may apply as well.

For example, consider an item (100) specifically meant to be used, and mainly intended for use, on board an airplane. Such an item may have one broad set of behavior patterns (and associated sensor readings), or typically show usage at all, while at high altitudes associated with flight; the same item may have a different broad set of behavior patterns, and perhaps show little or no usage, while at low altitudes. For such an item, time and/or location may be a less relevant context for distinguishing usage expectations (based on sensor readings), while altitude may be a more appropriate context.

Therefore, in step 1000.B.5-16, the BIRD (200) or configuration computer (335) may use the sensor data (700) recorded during the BIRD training period to determine if additional contexts (other than time or location) should be defined for the BIRD (200) and the associated item (100). Other imaginable contexts may include altitude, temperature, light or darkness, radiation levels, and others. If so, appropriate boundaries (for example, low altitude vs. high altitude, as determined by GPS readings, air pressure sensor readings, or acceleration or velocity sensor readings) may be determined as well.

For the remainder of the discussion of this method, 1000.B.5[Meth], it will be assumed that the broad environmental contexts for data analysis are time and/or space (that is, location category (140)). However, it will be understood that similar analysis may be conducted against other environmental contexts as well.

Analysis of Sensor Data

Analysis of item behavior as displaced/anomalous (503.0/503.2) or extant/normal (503.1/503.3) may be based on readings from more than one sensor. In an embodiment, however, and for purposes of defining extant/normal (503.1/503.3) behavior, analysis may initially proceed based on data from one sensor at a time. In step 1000.B.5-20, a sensor is selected (for example, one of the motion sensor (210.M), location sensor (210.L), light sensor (210.C), audio sensor (210A), etc.). Data values (700) previously recorded for the selected sensor (210), spanning the BIRD training period, are retrieved from the historical environmental data log (488) via the data storage and management module (487).

Outlier Values:

In step 1000.B.5-24, possible outlier data values are identified. Outlier values may be determined based on a number of criteria including, for example and without limitation: the frequency or rarity of similar values, and the number of standard deviations of variance from a mean or normal value for the data. A determination as to whether to keep or ignore outlier values (in relation to further data processing, below) may be made based on a number of parameters and criteria.

The remaining data processing/analysis discussion below pertains to sensor data values (700) which have been retained for analysis, after step 1000.B.5-24 (outlier evaluation).

Data Randomness:

In step 1000.B.5-28, the BIRD (200) and/or the configuration computer (335) identifies the degree of randomness of the sensor data (700). Randomness, or non-randomness, can itself be used as a criteria to distinguish displaced/anomalous (503.0/503.2) from extant/normal (503.1/503.3) item behavior.

Identification of Data Consistencies:

In step 1000.B.5-32, the BIRD (200) and/or the configuration computer (335) identifies data sensor consistencies across time units and subunits, and/or across location units and subunits. The identification process may include comparing sensor data (700) across comparable context units or context subunits to identify consistent sensor readings.

For example, comparable hours of each day may be analyzed to identify consistent sensor readings for a given hour. As a specific example, it may be determined (based on analysis of motion data) that a user's keys (100.K) or purse (100.P) are generally in motion between 08:00 hours and 09:00 hours. More fine-grained analysis may reveal further details, for example, that the keys (100.K) are usually in motion (for example, during at least 90% of the time slices analyzed) between 08:45 hours and 09:00 hours; the amount of motion (a range of velocities and/or accelerations) may be determined as well.

Data consistencies which span subunits may be identified as well. For example, if the smallest subunits (as established in steps 1000.B.5-8, 1000.B.5-12, and 1000.B.5-16) are five minute intervals, it may be determined that the keys (100.K) are in motion, on at least 90% of the days, from 08:40 hours to 08:45 hours. Data consistencies may be determined across locations (104.L) as well, for example, that on all days the keys (100.K) are in motion at least 30% of the time when the keys (100.K) are located in Office Building 1.

Identification of Data Limits and Boundaries:

In step 1000.B.5-36, the BIRD (200) or configuration computer (335) analyzes the sensor data (700) to determine data limits and boundaries, within either or both of time units and subunits and/or location units and subunits. For example, it may be determined that the item (100) associated with the BIRD (200) is normally only exposed to temperatures between a specific lower temperature limit and specific upper temperature limit.

Identification of Statistical Patterns:

In step 1000.B.5-40, the BIRD (200) or configuration computer (335) analyzes the sensor data (700) to determine statistical patterns within time units and subunits, and/or within location units and subunits. For example, it may be determined that during certain time slices (for example, during certain hours of the day), the keys (100.K) are in motion at least 20% of the hour, but never more than 40% of the hour.

Other values and patterns may be detected as well, during any of steps 1000.B.5-32, 1000.B.5-36, and/or 1000.B.5-40. For example, determinations may be made as to sensor data (700) trends (sensor data values substantially increasing or substantially decreasing during a time period, or going from one location to another); average value calculations for sensor data (700); determinations of suitable boundary values for boundary crossing detections or counts; and other pattern calculations for sensor data (700). In general, the values and patterns identified may correspond to any of those identified in method 800 of FIG. 8A (which is associated with field use of the BIRD (200), and in particular with values and patterns (812.0, 812.1, 812.2, 812.3, 812.4, 812.5, 812.6, 812.7, 812.8, 812.9) associated with step 812 of method 800.

Translation into Usage Expectations

In step 1000.B.5-44, the BIRD (200) or configuration computer (355) translates the data randomness, data consistencies, data limits and boundaries, and data patterns detected in steps 1000.B.5-24/32/36/40 into usage expectations (600). In an embodiment, the translation process may entail adding specified degrees or percentages of "fuzziness"—that is, allowance for error in the measurements made during the BIRD training period—into the definitions of the usage expectations (600). Once defined and stored, the usage expectations (600) may be used by the BIRD (200) to distinguish extant/normal (503.1/503.3) from displaced/anomalous (503.0/503.2) item behavior during steps 455 and 460 of method 430.

In step 1000.B.5-48, item (100) velocity, acceleration, light exposure, sound exposure, pressure patterns, location data, and other sensor data may be represented as waveforms. The waves may be further deconstructed via such pattern analysis tools as Fourier analysis (or fast Fourier analysis), or wavelet analysis, to determine typical or baseline expected wave coefficients. The coefficients may be further analyzed to detect various patterns and consistencies not previously identified.

In step 1000.B.5-52, the sensor data (700) may be analyzed with a view towards predictive analysis. For example, a neural network model of the data may be created or updated to predict future item sensor readings (700) based on past sensor readings.

In step 1000.B.5-56, a determination if made as to whether data has been analyzed for all sensors (210) employed by the BIRD (200) during the BIRD training period. If not, the method proceeds back to step 1000.B.5-20, where a different, previously unanalyzed sensor is selected. For the newly selected sensor (210), the method again proceeds through steps 1000.B.5-24 through 1000.B.5-52.

If in step 1000.B.5-56 it is determined that data from all sensors (210) has been analyzed, the method proceeds to step 1000.B.5-60. In step 1000.B.5-60, the BIRD (200) or configuration computer (335) analyzes and compares data from multiple sensors to determine additional usage expectations (600). The analysis may yield indications of pattern correlations or anticorrelations between sensors. (See for example discussion associated with FIG. 12, below.) Additional usage expectations (600) may be generated based on this analysis.

In step 1000.B.5-64, the BIRD (200) or configuration computer (335) may prioritize data from different sensors to determine which sensor or sensors (210) are most likely to yield sensor data (700) which is indicative of displaced/anomalous (503.0/503.2) or extant/normal (503.1/503.3) item behavior.

FIG. 10F

Exemplary "Autodetermination of Normal Sensor Readings Dialog" Box

FIG. 10F is a drawing of an exemplary Auto-Determine Normal Sensor Readings Based On Usage In A Training Period dialog box (1060) which may be used, for example, in conjunction with exemplary method 1000.B discussed immediately above. The dialog box (1060) may be used to set parameters for autodetermination of extant/normal (503.1/503.3) or displaced/anomalous (503.0/503.2) environmental condition(s) for an associated item (100). In an embodiment, the parameters are defined with respect to a particular detection context. In an alternative embodiment, extant/normal sensor readings are identified throughout the duration of a BIRD training period, without limitation to a particular detection context.

The dialog box (1060) includes:

- Context fields, drop down menus, list boxes, or similar GUI elements (1062) for selecting the applicable detection context (123); available options may include "All Contexts," or equivalently, "No Context Limitation";
- Sensor fields, drop down menus, list boxes, or similar GUI elements (1064) for selecting the BIRD sensors (210) for which autodetermination will apply;
- Behavior criteria check boxes, radio buttons, fields, drop down menus, list boxes, or similar GUI elements (1066, 1068) for determining the types of behavior criteria to be autogenerated;
- Training interval GUI elements (1069) and possibly subordinate dialog boxes (not shown) for setting parameters related to the recording time interval for the BIRD training period.

FIG. 10G

3rd Exemplary Method for Defining Usage Expectations: User Activity Modes

FIG. 10G is a flowchart of a third exemplary method 1000.C of BIRD navigation (1000), which may be used for implementing step 406 of exemplary method 400 (see FIG. 4A), possibly in conjunction with step 404 of exemplary method 400. The method 1000.C may result in the generation of one or more usage expectations (600) based on the authorized user's ExD criteria (170). Further, method 1000.C may result in the generation of, or support the generation of, iteMetric criteria (154) for a particular authorized user (AU) and item (100).

In an embodiment, exemplary method 1000.C may be used by itself. In an alternative embodiment, exemplary method 1000.C may also be used in conjunction with methods 1000.A and 1000.B (already discussed above, see FIGS. 10A-10F) as well as method 1000.D (discussed below, see FIGS. 10J and 10K) to confirm or augment user-delineated usage expectations (600) or automatically generated usage expectations (600).

In an embodiment, method 1000.C may be employed when an authorized user (AU) is able to characterize in general terms how an item (100) might be used, but has difficulty determining specific numeric boundaries for such parameters as geographic locations (104.L, 144), accelerations, velocities, light exposure levels, sound exposure levels, etc. Method 1000.C enables the BIRD (200) to work with the user to determine appropriate boundary parameter values for data obtained from various sensors (210).

User Activity Modes

Method 1000.C depends on the authorized user (AU) making use of the BIRD (200) and an associated item (100), during a training period, in specific user activity modes. A user activity mode is any kind of specific user activity that is fairly consistent in terms of motion and possibly other environmental factors, such as sound levels, light levels, etc. Exemplary user activity modes may include, for example and without limitation: standing still; walking; running; driving (general); driving on local roads; driving on the highway;

walking indoors; walking outdoors; walking in a specific work environment; running indoors; running outdoors; various athletic activities (skiing, tennis, horseback riding, miscellaneous team sports, etc.).

In an embodiment, the steps of the method (1000.C) assume that a number of user activity modes have already been defined (that is, such modes have been named, but are void of sensor data (700))—either predefined by a product manufacturer and/or defined by the authorized user (AU). In an alternative embodiment, a pre-defined user activity mode may include default sensor data values (700)—for example, typical upper and lower bounds for human walking speeds—which may be modified by the authorized user (AU) through testing in the field with the BIRD (200).

Method Steps

Selection of User Activity Mode: The method beings with step 1000.C.1. In step 1000.C.1, the BIRD (200) receives from the authorized user (AU) a selection of a named-but-undefined user activity mode to be populated with appropriated sensor data (700, 700.P); or the BIRD (200) receives from the authorized user (AU) a selection of a previously defined user activity mode which is to be modified. For example, the user may select "walking while carrying the item," or select "running while carrying the item," or other such modes. (See element 1072 of dialog box 1070 in FIG. 10H, below.)

In step 1000.C.3, the authorized user (AU) initiates a user activity mode training session. This session is a period of time when the user will carry the item (100) about with them, along with its associated BIRD (200). The BIRD (200) is set to make sensor readings during this training session, and to associate the sensor data (700) so obtained with the user activity mode selected in step 1000.C. I. The period of time may vary as appropriate, and may be as little as a few minutes or as long as several hours.

Data Analysis:

In step 1000.C.4, the BIRD (200) analyzes the sensor data (700) obtained during the training session, and determines appropriate parameters reflective of the user activity. The BIRD (200) may determine, for example and without limitation:

- Lower and upper bounds on item velocity during the user activity mode
- Lower and upper bounds on item acceleration during the user activity mode
- Percentage of time the item is exposed to light, and average light exposure
- Minimum, maximum, and average light exposure
- Minimum, maximum, and average sound level exposure
- Surface pressure ranges and average surface pressure experienced
- Temperature parameters ranges and average values.

IteMetric Determinations:

More generally, during such a user activity mode training session the BIRD (200) may obtain the sensor data (700) necessary to identify various iteMetrics (154). In particular, the BIRD (200) may obtain the sensor data (700) necessary to characterize morphIteMetrics (156), such as user gain characteristics, user arm and hand movement characteristics, user head movement characteristics, user voice print, and even physiological signatures such as pulse and respiration parameters.

Additional Analysis and Storage:

The analyzed parameters are stored and associated with the user activity mode. A determination may also be made as to associated sensor wave patterns for the item in the user activity mode. Such wave patterns may later be used as a basis to distinguish extant/normal (503.1/503.3) vs. displaced/anomalous (503.0/503.2) item activity, as already discussed above.

In step 1000.C.5, the BIRD (200) enables the user to determine whether or not all user activity modes have been defined. If not, the method returns to step 1000.C.1 to select another user activity mode (for example, a running activity, if all walking activities have been defined), and continues with data collection in step 1000.C.3. If in step 1000.C.5 it is determined by the user that all user activity modes have been defined, the method continues with step 1000.C.7.

Establish Context Definition:

In step 1000.C.7, the BIRD (200) receives from the user a context definition. As previously discussed, a context definition establishes a "when" and/or "where" for the item (100) and associated BIRD (200), during which certain conditions are expected to prevail. The context definition may also establish an anomaly type.

For example, the context definition may indicate:

context Date: Weekdays

Context Time: Between 09:00 and 17:00 hours

Associated Context Definition with User Activity Modes:

In an embodiment, in step 1000.C.9, the BIRD (200) receives from the authorized user (AU) an expected item usage for the context. In this embodiment, a expected item usage is an indication of how the user thinks the item (100) is expected to be used in the given context, and is defined here in terms of one or more user activity modes. For example, for a typical item used in an office setting between 09:00 and 17:00 hours on weekdays, the applicable expected item usage might be:

- User and item substantially stationary between 20% and 40% of time.
- User and item walking about between 70% and 90% of the time
- Item exposed to light between 10% and 30% of the time
- Item in pocket or in-purse between 80% and 95% of the time.

In each of the four examples immediately above, the elements which are underlined and in bold-face correspond to a user activity mode for which sensor data (700) has been recorded, and analyzed, during a user activity mode training session.

In an alternative embodiment, in step 1000.C.9, the BIRD (200) determines the expected item usage for the context, and associates various user activity modes with the context, using methods the same or similar to exemplary method 1000.B already discussed above (see FIGS. 10D-10F).

Define Usage Expectation:

In step 1000.C.11, the BIRD (200) combines the context definition(s) from step 1000.C.7, the user item usage from step 1000.C.9, and sensor data (700, 700.P) for the various user activity modes from step 1000.C.4 to determine expected extant/normal (503.1/503.3) and/or displaced/anomalous (503.0/503.2) item sensor results for the context. These are integrated into usage expectations (600).

Define Reporting/Signaling:

In step 1000.C.13, the user defines reporting and/or signaling for the BIRD (200) for displaced/anomalous and/or extant/normal sensor responses for each item context.

In step 1000.C.15, a determination is made if all item contexts have been defined. If yes, the method concludes at step 1000.C.17. If in step 1000.C.15, a determination is made that not all contexts have been defined, the method returns to step 1000.C.7 and the selection of another item context.

FIG. 10H

Exemplary "User/Item Activity Mode Sensor Recording Dialog" Box

FIG. 10H is a drawing of an exemplary User/Item Activity Mode Sensor Recording dialog box (1070) which may be used, for example, in conjunction with exemplary method 1000.C discussed immediately above. The dialog box (1070) may be used to initiate a user activity mode training session.

A drop down Activity list box (1072) enables the user to select an activity mode to be defined, for example, "Item On User, Indoors, In Pocket/Purse, User At Rest."

Sensor check boxes (1074) enable the user to select which BIRD sensors (210) will record data that the user believes to be applicable for characterizing the user activity mode.

Training session control buttons (1076) enable the user to start recording sensor data, pause the sensor data recording, resume sensor data recording, and stop sensor data recording.

A [[Define New . . . ]] control button (1078) leads the user to a new dialog box (not shown) which enables the user to define a new Activity mode not currently available in the Activity list box (1072).

FIG. 10I

Exemplary "Define Context by Activity" Dialog Box

FIG. 10I is a drawing of an exemplary Define Context By Activity dialog box (1080) which may be used, for example, in conjunction with exemplary method 1000.C discussed immediately above. The dialog box (1080) may be used to associate one or more user activity modes with a detection context (123) definition.

A Context drop-down list box (1082) enables the user to select a detection context (123) to be defined or modified, for example, "Home," "Office," etc.

A Normal Activities list box (1084) is used to list all the user activity modes which the user believes are likely to be associated with the detection context. For example, in an office setting, the user may elect to associate such user activity modes as "Item At Rest Indoors, Out In Open," "Item On User, Indoors, In Pocket/Purse, User At Rest," etc.

An Add User Activity selection area (1086) enables a user to associate activity modes with the detection context, thereby adding those activity modes to the Normal Activities list box (1084).

FIG. 10J

4th Exemplary Method for Defining Usage Expectations: User-Defined (Calendar-Based)

FIG. 10J is a flowchart of a fourth exemplary method (1000.D) of BIRD Navigation (1000), enabling the BIRD (200) to receive and/or determine usage expectations (600) which reflect the expected environmental condition(s) (144) for an associated item (100) when the item is in extant/normal use (503.1/503.3). In an alternative embodiment, the received and/or determined usage expectations (600) may pertain to displaced/anomalous item use (503.0/503.2).

Exemplary method 1000.D may be used for implementing step 404 of exemplary method 400 (see FIG. 4A), possibly in conjunction with step 406 of exemplary method 400. The method 1000.D may result in the generation of one or more usage expectations (600) based on the authorized user's ExD criteria (170). Further, method 1000.D may result in the generation of, or support the generation of, iteMetric criteria (154), and in particular psyIteMetrics (158) for a particular authorized user (AU) and item (100).

In an embodiment, exemplary method 1000.D may be used by itself. In an alternative embodiment, exemplary method 1000.D may also be used in conjunction with methods 1000.A, 1000.B, and 1000.C (already discussed above, see FIGS. 10A-10I) to confirm or augment automatically generated usage expectations (600) and/or user-delineated usage expectations (600) generated by methods other than the calendar-based method discussed here.

Exemplary method 1000.D is typically applicable when an authorized user (AU) can define his or her daily schedule (or expected schedule for some other definite time frame), and associated item location and use, in relatively precise terms, and also in relatively consistent, reliable and/or repetitive terms. Particularly if the usage of an item (100) or multiple items (100) tends to be confined to localized, well-defined areas for significant parts of the day, exemplary method (1000.D) lends itself to easily definition of location usage expectations (600.Loc) and AWOL (128) criteria for the item (100).

Calendar-Based Data Entry

In an embodiment, the method 1000.D enables an authorized user (AU) to define his or her item usage with simple extensions of already-familiar, computer-based calendar tools (for example, the calendars provided by Microsoft Outlook, Google Calendar, and other calendar tools and applications available for desktop computers, web browsers, cell phones, tablet computers, and related PDAs).

Therefore, in an embodiment, the method 1000.D entails, among other elements, downloading or transferring (see FIG. 3D, above), from a configuration computer (335, 340) to the BIRD (200), suitable calendar data. The method 1000.D assumes that the authorized user (AU) has already entered the appropriate calendar data on the configuration computer (335, 340). An exemplary authorized user (AU) calendar (1090), with suitable data entries, is discussed in conjunction with FIG. 10K, below.

The calendar data (or similar user-defined scheduling and location data) effectively formalizes the user's ExD criteria (170) for item usage, but in a user-friendly process (filling in a digital calendar) which is familiar and readily accomplished by most contemporary computer/PDA users. It will be noted, however, that for purposes of establishing usage expectations (600) for a BIRD (200), the calendar data entered by the authorized user (AU) may include additional data, beyond that conventionally entered purely for personal scheduling purposes. BIRD navigation (1000) transforms this calendar-based ExD criteria (170) into BIRD-friendly usage expectations (600) via the steps of method 1000.D.

The ExD criteria (170) which may be captured by the BIRD (200) or configuration computer (335, 340) via method 1000.D, and converted into usage expectations (600), includes for example with without limitation:

- the item's detection contexts (123) and detection subcontexts (1092), which in turn may include location labels (1094);
- AWOL relaxation criteria (1096); and
- other item usage parameters (1098).

These elements are all discussed further below.

In the embodiment presented in FIG. 10J, it is assumed the calendar data—which may include both personal schedule data, and also additional item usage data—is prepared by the authorized user (AU) on a configuration computer (335, 340). The calendar data is then downloaded to the BIRD (200) (see FIG. 3D, above). The BIRD (200) then converts the calendar data to suitable usage expectations (600). In an alternative embodiment, the calendar data may be entered directly into the BIRD (200) via BIRD user interface elements (282). In an alternative embodiment, the calendar data may be entered into the configuration computer (355, 340), and BIRD navigation (1000) on the configuration computer may then convert the calendar data to usage expectations (600). The usage expectations (600) may then be downloaded from the configuration computer (355) to the BIRD (200).

Method Steps

Detection Contexts and AWOL Criteria: The method 1000.D begins with step 1000.D.1. In step 1000.D.1, the BIRD (200) receives an item's detection contexts (123), and possibly sub-contexts (1092). A sub-context (1092), illustrated below in conjunction with FIG. 10K, is a more fine-grained division of a detection context (123).

For example, a detection context (123) for a particular user may be a home base location (140.HB), such as a college or university setting, for a certain period of time during a day. The time at the college may be further divided into smaller units of time, and into particular zones (140.Z) within the school, such as classrooms; these smaller units of place/time are the detection subcontexts (1092). (See again FIG. 10K.) Thus, the calendar (1090) has places (140.HB, 140.DL, 140.Z), defined via place labels (1094), already associated with specific time slots (1091.2). By downloading such a calendar (1090), BIRD navigation (1000) can identify when and where the BIRDed-item (102) is expected to be.

In step 1000.D.3 the BIRD (200) converts the received detection contexts (123) and subcontexts (1092) into AWOL (128) criteria. In an embodiment, the default AWOL criteria (128) are that if an item (100) is not within a context (123) and/or subcontext (123.5B) during a time when it should be with the context/subcontext, then the item (100) is AWOL (128).

For example, suppose the calendar (1090) indicates that the item (100) should be in room 101 between 0900 hours and 1050 hours. The BIRD (200) converts this into a data representation for usage expectations (600), shown here in pseudocode form:

```
If [(0900 <= time <= 1050) and (item__location ≠ room__101)]
    then item__condition.AWOL = true
```

The data representation for usage expectations (600) is exemplary only, and other representations may be employed as well within the scope and spirit of the present system and method.

Location Usage Expectations:

In an embodiment, the calendar (1090) contains location labels (1094) for expected locations (144.L) at which the user expects to bring the BIRDed-item (102). The location labels (1094) may include labels for building addresses, room number or room names, and similar location appellations. In an embodiment, the location labels take a form which is readily familiar to non-technical users of a BIRD (200). In step 1000.D.5, the BIRD (200) maps the location labels (1094) to more formal location usage expectations (600.Loc). In an embodiment, this entails the BIRD (200) determining location boundaries and/or location beacons (1507) in a form consistent with location data (700) which may be obtained via the BIRD's location sensor (210.L) during BIRDed-item (102) field use.

Location usage expectations (600.Loc) may include GPS coordinates for the expected locations (144.L) and/or location perimeters, or similar data. Data associated with location beacons (1507) may take the form of suitable radio signal data and/or location data packet signatures for location data which may be broadcast at the location(s) in question (for example, as radio frequency waves, infrared signals, etc). (See FIG. 15A, below.)

In an embodiment, the BIRD (200) may determine the location boundaries and/or beacon data (1507) by downloading suitable location coordinates and/or location beacon data from databases which associate the location labels with the location data. Suitable location databases may include internet-based mapping services, local building/facility location databases maintained by various institutions, and other sources. In an embodiment of the present system and method, it is envisioned that over time it will become increasingly common for many public and private facilities to maintain location databases and/or location beacons (1507) which may be compatible with BIRD technology. In an embodiment, a BIRD (200) or configuration computer (335) may come pre-configured with some internal location databases; or the BIRD (200) or configuration computer (335) may be configured to download location databases for extended areas or for facilities which the user expects to visit on a regular basis, such that updates by the user to is or her ExD criteria (170) can be accommodated via previously downloaded location information.

AWOL Relaxation Criteria:

In an embodiment, the authorized user (AU) may specify an amount of time, or a percentage of time, that the BIRDed-item (102) may be outside of a detection context (123) (that is, outside of a location it is generally required to be in at a given time). Such a parameter may be referred to as AWOL relaxation criteria (1096). For example, while the authorized user (AU) may expect to be in a classroom (with the BIRDed-item (102)) during certain hours, the user may also expect to step out for one or more breaks. The AWOL relaxation criteria may indicate, for example and without limitation: a number of times the BIRDed-item (102) might be outside the normally expected location, an amount of time the BIRDed-item (102) might be outside the expected location, and a percentage of the time the BIRDed-item (102) might be outside the expected location.

In step 1000.D.7, the BIRD (200) receives any AWOL relaxation criteria which may be associated, on the calendar (1090), with an item's detection contexts (123) and/or sub-contexts (123.5B).

Other Item Usage Parameters:

In an embodiment, the authorized user (AU) may be able to enter, via the calendar (1090) and associated data entry tools (for example, dialog boxes), other item usage parameters (1098). For example, the authorized user (AU) may be able to indicate, via the calendar (1090), whether they expect the item (100) will typically be on-person (138.OnP) or off-person (138.OffP) when the item is within a given detection context (123) and/or sub-context (123.5B). Similarly, the authorized user (AU) may be able to indicate via the calendar (1090) whether it is expected that the item (100) will be out-of-pocket or in-pocket (or in other enclosed spaces, such as a carrier item (100.C), for example, a purse, briefcase, or backpack). Other parameters related to item usage may be reflected as well via the authorized user's calendar entries.

In step 1000.D.9, the BIRD (200) receives these additional item usage criteria (1098) which may be associated on the calendar (1090) with an item's detection contexts (123) and/or sub-contexts (123.5B).

Data Conversion:

Data for AWOL relaxation criteria (1098) and other item usage parameters, as stored by the calendar-associated software, may not be in a form which is directly consistent with representations used internally by the BIRD (200) for usage expectations (600). In step 1000.D.11, the BIRD (200) performs any necessary data format conversions or data structure conversions which are required to adapt calendar-based item usage parameters (that is ExD criteria (170)) into a format/structure suitable for internal BIRD storage as usage expectations (600).

Reporting and Signaling:

In steps 1000.D.13 and 1000.D.15, reporting and signaling are respectively defined for any displaced/anomalous item states (503.0/503.2) which may be detected in an item context (123) and/or sub-context (123.5B). In an embodiment, these steps may formally be considered elements of BIRD song (900) rather than BIRD navigation (1000). They are discussed here for convenience.

In an embodiment, such reporting and signaling may already have been defined by the user via the calendar (1090) and its associated software and user interface elements. In this case, steps 1000.D.13 and 1000.D.15 may entail downloading the user-defined reporting from the calendar (1090), and making suitable data format/structure adaptations to store the reporting and signaling requirements in the BIRD (200).

In an alternative embodiment, reporting and signaling may instead by defined via the BIRD (200), or via BIRD song software residing on a configuration computer (335, 340), but separate from the calendar-related software. In these embodiments, steps 1000.D.13 and 1000.D.15 may entail the BIRD (200) and/or BIRD song software prompting the user to provide appropriate reporting and signaling requirements.

Additional Considerations

The use of a calendar interface (1090) in conjunction with method 1000.D, as discussed above, is exemplary only, and should not be construed as limiting. In alternative embodiments, other user interfaces may be employed by the BIRD (200) and/or a configuration computer (335, 340) to collect the user-defined ExD criteria (170) employed by the method 1000.D. In an alternative embodiment, a user may directly code or author the ExD requirements (170) using either or both of: (i) a programming language designed to express ExD requirements (170) in a form readily accessible to relatively non-technical users (for example, an XML-type language); and/or (ii) a programming language which may be of a more technical or "compact" nature than XML, but which is employed internally by the BIRD (200) for certain data or code representations.

In an alternative embodiment, in addition to the calendar interface (1090) per se, multiple dialog boxes or other user-interface means may be employed by the authorized user (AU) to define various aspects of the ExD criteria (170). For example, dialog boxes or a wizard-style system may be employed, prompting a user for appropriate entries for various ExD criteria (170), such as location labels (1094), AWOL relaxation criteria (1096), and other item usage parameters (1098).

The order of steps employed in method 1000.D is exemplary only, and should not be construed as limiting. Some of the steps may be performed in different orders, or in parallel, with substantially the same or similar results.

In an embodiment, the method 1000.D may be performed in conjunctions with other methods described above, or other methods within the scope and spirit of the present system and method, for ascertaining usage expectations (600). For example, additional methods may be employed by the BIRD (200) to determine elements of iteMetrics (154).

FIG. 10K

4th Exemplary Calendar for Defining Usage Expectations

FIG. 10K illustrates an exemplary software-based calendar (1090) which may be employed by an authorized user (AU) of a BIRD (200) to define, or help define, usage expectations (600) for an item. The calendar (1090) may, for example, be employed in conjunction with exemplary method 1000.D discussed above in conjunction with FIG. 10J.

The calendar (1090) enables the authorized user (AU) to formalize and edit his or her ExD criteria (170) via a software interface which is readily familiar to most contemporary computer users. The calendar (600), when populated with appropriate data by the authorized user (AU), contains multiple elements such as:

- a location schedule for the item (100); such an item location schedule may, for many items (100), coincide for substantial parts of the day with the authorized user's location schedule (though at other times, the item (100) may be expected to be in storage and so not necessarily with the authorized user (AU)); and
- various additional data, discussed further below, pertaining to expected item usage.

Calendar Data Entry:

Multiple elements of item-related data are illustrated as being displayed on the calendar (1090). However, it will be understood by persons skilled in the relevant arts that, in an embodiment, for the authorized user (AU) to enter data into the calendar (1090) may required the use of additional user interface widgets, such as various dialog boxes, which are not illustrated in the figure. In an alternative embodiment, calendar data entry may be accomplished via direct input onto the calendar (1090) itself, either text boxes, radio buttons, check boxes, and other GUI widgets (not shown); or via touch-screen interface; or via voice interface; or via other means known in the art.

Calendar Elements

Calendar (1090):

The calendar (1090) itself may employ any number of digital/GUI formats, well known-in the art, to represent time and date information (1091). In many cases, a digital calendar (1090) will have multiple different views to show scheduling information for years, months, multiple days, single days, etc. The calendar display may be user-configurable in various ways. Shown in FIG. 10K is an exemplary display of a single date (1091.1). While not shown in the figure, the calendar (1090) may contain options which enable the authorized user (AU) to indicate that a schedule for a single day is generally applicable across multiple days, over an extended period of time. For example, a course schedule for a single day of the week may be applicable over an entire semester.

Detection Contexts (123) and Detection Subcontexts (123.SB):

The item (100), either when with the authorized user (AU) or in storage, may be expected to be in various home base or daily life locations (140.HB, 140.DL) and possibly various zones (140.Z) at specific times during the day. The calendar's time-of-day elements (1091.2), in conjunction with location-labels/zone-labels (1094), enable the authorized user (AU) to define time-and-location based detection contexts (123) and detection subcontexts (123.SB). As discussed above (see FIG. 10J), a detection subcontext (123.SB) is a more fine-grained division of a detection context (123). A detection subcontext (123.SB) may for example be associated with either: (i) a zone (140.Z) within a home base location (140.HB) or daily life (140.DL) location, and/or (ii) a division of a block of time (for example, a duration of time spent at one location (140.HB, 140.DL, 140.Z)) into smaller blocks of time.

As already discussed above (see FIG. 10J), the location labels (1094.1) and/or zone labels (1094.2) enable an authorized user (AU) to define the expected item home-base/daily-life/zone locations (140.HB, 140.DL, 140.Z) (an aspect of the users ExD criteria (170)) in conventional language. A BIRD (200) or configuration computer (335, 340) may employ suitable location databases to translate the location/zone labels (1094) into internal designations of locations (as GPS coordinates, location beacon parameters (1507), or similar), suitable for detection by the BIRD sensors (210) and analysis by BIRD logic (500).

AWOL Relaxation Criteria (1096):

In an embodiment, the user may designate AWOL relaxation criteria (1096). In an embodiment, these criteria specify an amount of time, or a percentage of time, that the BIRDed-item may be outside of a detection context or subcontext (123, 123.SB). On the exemplary calendar (1090), an exemplary format for AWOL relaxation criteria (1096) takes the form:

AWOL: n×m Min where: (i) n=how many times an item (100) may be outside the detection context (123, 123.SB) without the item being considered displaced/anomalous (503.0/503.2), and (ii) m=the maximum number of minutes the item (100) may outside the detection context (123, 123.SB) on each ‘n’ occasion, without the item being considered displaced/anomalous (503.0/503.2). The format shown is exemplary only, and other formats may be employed for AWOL relaxation criteria (1096) within the scope and spirit of the present system and method.

Other Item Usage Parameters (1098):

As noted above (see FIG. 10J), in an embodiment the authorized user (AU) may be able to enter, via the calendar (1090) and associated data entry tools (for example, dialog boxes), other item usage parameters (1098). For example, the authorized user (AU) may be able to indicate, via the calendar (1090), whether he or she expects the item (100) will typically be on-person (138.OnP) or off-person (138.OffP) when the item is within a given detection context (123) and/or subcontext (123.SB). Similarly, the authorized user (AU) may be able to indicate via the calendar (1090) whether it is expected that the item (100) will be out-of-pocket or in-pocket (or in other enclosed spaces, such as a carrier item (100.C), for example, a purse, briefcase, or backpack). Other parameters related to the authorized user’s expected item usage may be reflected as well via the authorized user’s calendar entries.

In an embodiment, different entries may be made on the calendar for item usage parameters (1098) for multiple different items (100). In an embodiment, a set of default item usage parameters (1098.1) may be entered for item usage throughout a detection context (123), while overriding item usage parameters (1098.2) may be established for detection subcontexts (123.SB).

Mapping ExD Criteria to Usage Expectations:

In an embodiment, BIRD navigation (1000) is configured to map various colloquial, or “common language” expressions of item usage (expressive of the user’s ExD criteria (170)) into forms suitable for use internally as usage expectations (600). Further, the BIRD (200) may be configured to extend the user’s ExD criteria (170) by applying suitable logical inferences about relations or interactions between the user and various items (100) and/or logical inferences about relations or interactions among the items (100) themselves. The BIRD (200) or configuration computer (335) may also be configured to solicit additional information from the authorized user (AU) as needed.

For example, if the user indicates that an item (100) is “In Backpack”, the BIRD navigation (1000) may determining that the item is likely to be shielded from light; and further, BIRD navigation (1000) may determine if the item (100) will be on-person (138.OnP) or off-person (138.OffP) depending on whether the backpack (100.C), which is functioning as a container item (1700), is itself on-person (138.OnP) or off-person (138.OffP). Similarly, if the authorized user (AU) indicates an item (100) will be “on desk,” then in an embodiment BIRD navigation (1000) may be configured to determine that the item is both off-person (138.OffP), exposed to light, and (typically) motionless. If an item’s expected behavior is flagged by the authorized user (AU) as “indeterminate,” then in an embodiment BIRD navigation (1000) may be configured to prompt the user, via dialog boxes, or wizard-style software, for possible ranges or possibilities of item usage.

FIG. 11A

Exemplary Plot of Sensor Data

FIG. 11A is a plot (1100) of exemplary sensor data (700) which may be recorded by a BIRD (200) for an associated item (100) over a 24 hour period (which may be a training period or a period of routine field usage of the BIRDed-item (102)). The plot (1100) may be used as part of a display available to a user of the BIRD (200).

Data shown on the exemplary plot (1100) for the 24 hour period includes a line graph of ambient temperature (1102) surrounding the item (100); ambient light intensity (1104) impinging on the item (100); the velocity (1106) of the item; named locations (1108) where the item (100) is found; and actual item usage locations (104.L) as shown by (representative) GPS coordinates (1110). The named locations (1108) may be identified by the BIRD (200) via direct entry by the authorized user (AU), through associations with the GPS coordinates (1110) as previously established by a user via a dialog box (not shown), and/or through downloads from a location database. Though not shown in the figure, some location coordinates may be identified via references to location beacons (1507) or other means, rather than through GPS coordinates.

Vertical slices (1114) through the plot (1100) correspond to times when the item (100) is in specified named locations (1108), some or all of which may for example be home base locations (140.HB). Each vertical slice (1114) captures sensor data (700) for that time slice.

Some named locations (1108) may be represented by abbreviations (1108.*abr*), for example “Tr” for travel, or “L1” and “L2” for various other locations (104.L). In an embodiment, a legend (not shown) may identify detailed information about the named locations (1108), including the location abbreviations (1108.*abr*). In an alternative embodiment, other display or GUI means may be used to provide additional information about the locations (104.L); for example, moving a cursor over a named location (1108) or location abbreviation (1108.*abr*) may bring up a display box with additional information.

The time of day (1112) is shown in hours along the horizontal axis of the plot.

In an embodiment, the plot (1100) may have other features or elements, for example, controls which enable the authorized user (AU) to "zoom in" (enlarge) parts of the plot or otherwise changes the scale of the plot.

FIG. 11B

Exemplary "Define Detection Context" Dialog Box

FIG. 11B is a drawing of an exemplary Define Detection Context dialog box (1120). The dialog box (1120) may be shown on the display (282.D) of a BIRD (200) or on an associated configuration computer (335). The dialog box (1120) may be used by a user to define a detection context (123) based on previously recorded BIRD sensor data (700), such as sensor data recorded during a training session.

The Define Detection Context dialog box (1120) includes a plot (1100) of sensor data (700), already discussed above in conjunction with FIG. 11A.

A detection context (123) is defined using the dialog box (1120). The context name is selected using a Context Name drop-down list box (1124), and possibly an associated New Context Name dialog box (not shown) accessed via the [[New Context Name]] button (1125). The context is defined by one or more types of sensor readings (location, time, sensor ranges), which are selected via check boxes (1126).

Once the sensor or sensor types are selected by the user, various GUI means may be employed to indicate specific data or ranges of data, which determine and define the detection context (123). For example, in an embodiment, on-screen bracket pairs (1122) may be used to select or highlight ranges of data. Show in the figure are a first pair of brackets (1122.1), which select the location named "My Condo" in the morning hours, and a second pair of brackets (1122.2), which select the location named "My Condo" in the evening hours. The brackets may be moved about on screen using a mouse or other navigation device or method (touchscreen, voice command, and so one) and a cursor (not shown). Bracket pairs (1122) may be added using an [[Add Bracket Pair]] button (1128), which may also present the user with various bracket-related options.

Once one or more bracket pairs (1122) have been placed on screen and used to define a location and/or range of time for the detection context (123), the detection context (123) may be saved by the user.

FIG. 11C

Exemplary "Define Item Use by Sensor Boundaries" Dialog Box

FIG. 11C is a drawing of an exemplary Define Item Use By Sensor Boundaries dialog box (1140). The dialog box (1140) may be shown on the display (282.D) of a BIRD (200) or on an associated configuration computer (335). An authorized user (AU) may employ the dialog box (1140) to define extant/normal item states (503.1/503.3) or displaced/anomalous item states (503.0/503.2) based on previously recorded BIRD sensor data (700), such as data recorded during a training session.

The Define Item Use By Sensor Boundaries dialog box (1140) includes a plot (1100) of sensor data (700), already discussed above in conjunction with FIG. 11A.

In the dialog box (1140), the user selects a detection context (123) which will be defined, by using the Context drop down list-box (1150).

The user indicates which sensors (210), of the available sensors, will be employed to determine extant/normal (503.1/503.3) or displaced/anomalous (503.0/503.2) states, by checking or unchecking the Use Sensors check boxes (1152). In the example shown, the Light Intensity sensor (210.Opt) and Velocity sensor (210.M) are selected, and so these sensor readings are available on the plot (1100) to indicate preferred sensor readings or preferred sensor data ranges. Since the Temperature sensor (210.T) is not selected, the temperature data is visible but grayed out (not available for use) on plot 1100. This list of sensors (210) shown is exemplary only, and other sensors (210) may be listed as well.

The ((Define Usage)) radio buttons (1154) are employed by the user to indicate how the selected range(s) of sensor data are to be interpreted, for example, as Normal Item Use, Anomalous Item Use, or possibly as an intermediate Anomaly Alert Level, such as Suspect Item Use. The usages shown are exemplary only, and other usages may be listed as well. For example, specific types of displaced/anomalous (503.0/503.2) states lost (503.0.1), misplaced (503.0.2), stolen (503.0.4), misappropriated (503.0.3), wandering (503.0.5), and other anomalous usages (503.2), may be included among the radio button options.

Sensor data plot 1100, already discussed above, is used to define data values or ranges of values for normal usage or for anomalous usage. Boundary Markers (1142, 1144) are employed for this purpose. Boundary Markers (1142, 1144) are GUI elements which a user may move and position on screen using, for example, a mouse and Boundary Position Cursors (1148), or other screen control means and methods (such as touch screen).

For example, the Boundary Marker 1142.1 is the marker used to indicate where the light level should be 100% of the time. Since Normal usage is currently selected, the user has indicated (through the position of Boundary Marker 1142.1) that light intensity should always be from 0 up to the level indicated by Boundary Marker 1142.1. If the light intensity exceeds this level, that is considered an indication of an anomalous environment for the item (100). The user can select this level based on the plot of past illumination (1104), and in the present case the user has chosen to place the Boundary Marker 1142.1 slightly above the peak values that were previously recorded for light intensity (1104).

Similarly, the Boundary Marker 1144.1 is the marker used to indicate where the light level should be 90% of the time. Since Normal usage is currently selected, the user has indicated (through the position of Boundary Marker 1144.1) that light intensity should be from 0 up to the level indicated by Boundary Marker 1144.1 for at least 90% of the time. If the BIRD (200) determines that the light intensity exceeds this level for more than 90% of some monitoring time window, that is considered an indication of an anomalous environment for the item (100).

The exact length of the monitoring time window is configured elsewhere (in some dialog box not shown). For example, the BIRD (200) may configured with a two hour monitoring window. In that case if the illumination level exceeds the indicated level (shown by boundary marker 1144.1) for more than 10% of any continuous two hour interval, a normal environment no longer prevails, and an anomaly is signaled.

The user can select the level indicated by marker 1144.1 based on the plot of past illumination (1104), and in the present case the user has chosen to place the Boundary Marker 1144.1 slightly below the peak values that were previously recorded for light intensity (1104).

Similar considerations apply to configuring the Boundary Markers (1142.2, 1144.2) for the velocity of the item (100). Here again, the user employs the velocity plot (1106) as a guide to determining the appropriate height (that is, the velocity limit values for normal item behavior) when setting the position of the Boundary Markers (1142.2, 1144.2). In the example shown, the user has indicated, via the markers, that the peak velocity values (associated with travel (Tr)) are not appropriate values for the current context (1150), which is the Home context.

An [[Assign]] button (1156) enables the user to assign the selected boundary values.

FIG. 12A

Exemplary Elements of Pattern Recognition

As discussed above, the BIRD (200) may employ multiple algorithms, methods, and criteria to characterize extant/normal (503.1/503.3) item usage and environments and to distinguish extant/normal (503.1/503.3) item usage and environments from displaced/anomalous (503.0/503.2) item usage/environments. One such method of distinguishing extant/normal (503.1/503.3) from displaced/anomalous (503.0/503.2) is to identify patterns, trends, and correlations in sensor data (700).

FIG. 12A provides several exemplary plots of exemplary sensor data (700) from various BIRD sensors (210), which can be used as the basis to identify patterns, trends, and correlations. These plots can be used individually, or in conjunction with each other.

Motion Histogram

An exemplary Item Motion Histogram (1205) summarizes item motion activity. For each hour of the day, the plot indicates the percentage of time the item (100) is not in motion at all, the percentage of time the item (100) is in motion from 1% to 50% of the hour, and the percentage of time the item (100) is in motion from 51% to 100% of the hour. The plot (1205) provides baseline values, and is assumed to be based on an average of usage over an extended time, such as a training period when the item (100) was maintained deliberately in extant/normal usage (503.1/503.3) by the user. (In the exemplary histogram (1205), the training period was ten days.) In an embodiment, a BIRD internal data structure (not shown) representing the plot (1205) may include a reliability rating, such as a standard deviation factor, for each bar of the histogram. The motion histogram (1205) constructed during the training period may be considered a part of the item's usage expectations (600), and is stored in the BIRD (200) in memory (206).

In regular field usage, and as per step 455 of exemplary method 400 (FIG. 4C, above), similar motion histogram data may be constructed dynamically, hour-by-hour, over the course of a day. Such a dynamically created histogram (not shown in the figure) is an element of processed sensor data (700.P), and may further be considered an element of the item's usage data (700.U). As per step 460 of exemplary method 400, the BIRD (200) may compare the field-use, dynamically created histogram (part of the usage data (700.U)) against the stored usage expectation histogram (1205). If the BIRD (200) detects-over the course of a particular hour-any significant variation between the two histograms, this may be indicative of displaced/anomalous usage (503.0/503.2) of the item (100).

Light Exposure Plot

An Average Light Exposure Plot (1210) summarizes light exposure for the item (100). For each hour of the day, the plot indicates the average amount of light impinging on the item (100). The plot (1210) provides baseline values, and is assumed to be based on an average of usage over an extended time, such as a training period when the item (100) was maintained deliberately in normal usage by the user. In an embodiment, a data structure representing the plot (1210) may include a reliability rating or variability data, such secondary plots indicating a reasonable expected range above and below the primary data plot. The Light Exposure plot (1210) constructed during the training period may be considered a part of the item's usage expectations (600), and is stored in the BIRD (200) in memory (206).

In regular field usage, and as per step 455 of exemplary method 400 (FIG. 4C, above), a similar plot may be constructed dynamically over the course of a day. Such a dynamically created Light Exposure plot (not shown in the figure) is an element of processed sensor data (700.P), and may further be considered an element of the item's usage data (700.U). As per step 460 of exemplary method 400, the BIRD (200) may compare the field-use, dynamically created Light Exposure plot (part of the usage data (700.U)) against the stored Light Exposure plot (121*o*). If the BIRD (200) detects—over the course of a some period of time—any significant variation between the two plots, this may be indicative of displaced/anomalous usage (503.0/503.2) of the item (100).

In addition, the stored plot (1210) may also be used to determine trend data over a time interval, for example that light exposure should generally trend upwards or downwards at certain times of day. Significant variations from these trends during field use may again be indicative of a displaced/anomalous state (503.0/503.2) of the item (100).

Light/Motion Correlation

A Light Motion Correlation Plot (1215) summarizes the average correlation between item motion as shown in plot 1205 and light exposure as shown in plot 1210 for the item (100). For example, data for the hour of 0300-0400 (vertical line 1217) shows both that the item (100) is normally not in motion and that the item (100) is normally in darkness. The is likely indicative of an item which is not in-use during evening hours, and may be in storage during those hours (or the room lights are simply dark at night). The data for motion and light exposure are strongly correlated.

For both the hours of 1000-1100 (vertical line 1220) and 1900-2000 (vertical line 1225), both the item motion (1205) and the item light exposure (1210) have roughly average, widely distributed values. Yet a fine-grained correlation analysis of sensor data (700) (fine-grained values not illustrated in the figure), recorded by the BIRD during the training period, reveals that motion and light values are strongly correlated for the hour of 1000-1100 (1220); and also reveals that motion and light values are strongly anti-correlated for the hour of 1900-2000 (1225). In this case, correlation analysis of the sensor data (700) from the training period reveals distinct patterns for each respective hour. During field use, variations from these correlations, when detected by the BIRD (200) (during step 460 of exemplary method 400), may be indicative of displaced/anomalous usage (503.0/503.2) or a displaced/anomalous environment for the item (100) associated with the BIRD (200).

FIG. 12B

Resolving Possible Ambiguities

In an embodiment, a BIRD (200) has logic for anticipating, preventing, and/or resolving possible ambiguities which may arise or could arise during BIRD training or BIRD field use. FIG. 12B provides an exemplary illustration of two exemplary detection contexts (123.10, 123.20), and two exemplary associated usage expectations (600.10, 600.11), for which ambiguities could potentially arise.

Detection context 123.10 is defined to apply when the BIRD (200) and its associated item (100) are in-use between noon and 3 p.m. in a location A. For simplicity of illustration, a very simple usage expectation (600.10) has been defined to be in-use for detection context (123.10), namely: if the item (100) is outside of location A, the BIRD (200) asserts a possibly displaced/anomalous item state (503.0/503.2) (such as the item being lost, misplaced, misappropriated, wandering, or stolen).

Detection context 123.20 is defined to apply when the BIRD (200) and its associated item (100) are in-use between 3 p.m. and 6 p.m. in a location B. Again for simplicity of illustration, a simple usage expectation (600.12) has been defined to be in use for detection context (123) B, namely: if the item (100) is outside of location B, the BIRD (200) asserts a possibly displaced/anomalous item state (503.0/503.2) (such as the item being lost, misplaced, misappropriated, wandering, or stolen).

An actual item usage (1284) could occur. In actual item usage (1284), the time is 2:50 p.m. (and so, between noon and 3 p.m.), but the BIRD (200) and associated item (100) are in location B. The situation is ambiguous because it is not clear if detection context 1 (123.10) is applicable, or if detection context 2 (123.20) is applicable. Consequently, it is not clear if usage expectation 600.10 or usage expectation 600.12 should be used to assess the normal/anomalous condition of the item (100).

Numerous possible strategies and algorithms may be employed by a BIRD (200) to anticipate and possibly prevent such ambiguities, or to render ambiguities resolvable if and when they occur. Exemplary ambiguity resolution strategies include, for example and without limitation:

Prioritizing Either Location or Time Frame for Detection Contexts:

In an embodiment, a detection context (123) may be defined in terms of either a location where an item (100) is expected to be used, or a time frame (date, date range, time range (105) on the clock) when an item (100) is expected to be used, or both location and time frame. In an embodiment, the BIRD (200) may either recommend or require the following: if a detection context (123) is defined in terms of both location and time frame, then the user must prioritize one over the other.

In the example shown in FIG. 12B, suppose the user has prioritized time frame over location (and assume this applies to both detection context 1 (123.10) and detection context 2 (123.20). Then in actual usage 1284, since time frame is the priority—and since the BIRD (200) and item (100) are in-use between noon and 3 p.m.—detection context 1 (123.10) applies. Usage expectation 600.10 for detection context 1 (123.10) indicates that if the item (100) is outside location A, the item usage is to be flagged as possibly displaced/anomalous (503.0/503.2). Since the item (100) is, in fact, in location B (out of location A), the BIRD (200) will signal or report displaced/anomalous item usage (503.0/503.2).

It will be noted that, with such a priority scheme, it may still be meaningful for the user to specify a detection context (123) in terms of both a higher priority time frame and a lower priority location. For example, it may be that during a given time frame (say, noon to 3 p.m.), the item may be in extant/normal (503.1/503.3) use in any of several expected locations (144.L) (for example, location B or location C). The user may elect to specify different usage expectations (600) for each location. Therefore, the user may still define a first detection context (123) based on expected item usage between noon and 3 p.m., if the item is in location B; and also define a second detection context (123) based on expected item usage between noon and 3 p.m., if the item is in location C. The two different detection contexts (123) may, for example, be applicable on different days of the week.

In an embodiment, an authorized user (AU) may also be able to specify that the lower priority elements of a detection context (123) are to be understood as implicit usage expectations (600) as well, relative to higher priority elements. For example, and again referring to detection context 1 (123.10) from FIG. 12B: The detection context (123.10) is defined in terms of both the time (noon to 1500 hours) and the location (Location A). Assume the detection context time is considered higher priority than the detection context location; then it may be considered inherent in the detection context definition that if the BIRDed-item (102) is outside of location A during the hours of noon to 1500, the item (100) is AWOL (128). (And similarly for detection context 123.20, it may be considered inherent in the detection context definition that if the item is outside of Location B between 1500 and 1800 hours, the item (100) is considered AWOL (128).)

It will be understood by persons skilled in the art that the details of both detection context definitions (123) and usage expectation definitions (600), as well as the interactions and relations of context definitions (123) and usage expectations (600), may be implementation dependent.

Implied Time Prioritization by Detection Context Overlap:

In an embodiment, a BIRD (200) may be configured to allow, or may be configured to require, that any adjacent detection contexts (123) have some degree of overlap. By "adjacent" is meant any two detection contexts (123) which are immediately adjacent in time and/or in space. By "overlap" is meant that the two detection contexts (123) be defined so that there is at least some partial commonality either to their time frames or their expected locations (144.L), or both. The "overlap" of detection contexts (123) takes into account that it is sometimes not feasible to define item usage in absolutely strict terms by either time frames or expected locations (144.L).

Referring again to the example of FIG. 12B, an item which is typically used in location A from 1500 to 1800 may—on some specific occasion, and in actual use—be used from, say, 1505 hours to 1755 hours in location A, and then be in use in location B the rest of the time. More generally, the item (100) may be in transit (along with the user) from A to B at times approximately surrounding 1500 hours.

In an embodiment, the usage overlap may be established in the definition of the detection context (123). In an alternative embodiment, usage overlap may be established via the usage expectations (600). In an alternative embodiment, usage overlap may be established via a combination of the detection context (123) definition(s) and the usage expectations (600).

Referring again to the example of FIG. 12B, consider the following revised detection context (123) definitions, along with revised usage expectations:

Detection Context 1: Item Location A, 1200 to 1505

U.s. 600.10: If item inside of location A, usage is normal.

Detection Context 2: Item Location B, 1455 to 1800

U.S. 600.12: If item inside of location B, usage is normal.

Because of the overlap in the time portion of the detection contexts (123.10, 123.20) the BIRD logic (500) allows that, during the time frame from 1455 to 1505, either of detection context 1 (123.10) and detection context 2 (123.20) can be applied. If the BIRD (200) detects that, between 1455 and 1505 hours, the item (100) is in either location A or location B, then the item usage is considered to be normal.

Suppose however, as per usage 1284 in FIG. 12B, the item is found to be at location B at 1450 hours. The BIRD logic (500) can be programmed to recognize that the user has already made allowance for a possibly ambiguous location, but only during the overlap time frame of 1455 to 1505 hours. Outside of this ten minute overlap window, the BIRD logic (500) may be designed to recognize that the overlapping time frames indicate that time is the priority factor in choosing between detection contexts. Since the time of 1450 hours is only meaningful within detection context 1 (123.10), the appropriate usage expectation (600) is usage expectation 600.10. Since the item is not in location A, item usage is displaced/anomalous (503.0/503.2).

Alerting User During BIRD Configuration of Possible Ambiguities:

During BIRD configuration by the authorized user (AU), and/or training of the BIRD (200) during a training period, BIRD logic (500) may be configured to analyze both detection context definitions (123) and usage expectations (600). This analysis may entail determining if, for example, the context definitions (123) and/or usage expectations (600) are under-specified, which may result in potential ambiguities in the field. If the potential for ambiguities is detected, the user may be alerted that the potential for ambiguities exists, and the BIRD (200) may prompt for suitable additional criteria for the usage expectations (600).

Employing/Requiring Additional Usage Expectations for Ambiguity Resolution:

Potential ambiguities in detection context definitions (123) and/or usage expectations (600) may be resolved by the inclusion of additional usage expectations (600), or refinements of existing expectations (600), as required. In the example of FIG. 12B, and as already discussed above, specifying a priority of either time or location is one way to resolve the potential ambiguities. Adding additional elements to the usage expectations (600) may also resolve or minimize ambiguities.

In the example of FIG. 12B, usage expectation 600.0 could be extended as, "If item is outside of location A for more than five minutes, usage is anomalous." Similarly, usage expectation 600.6 could be extended as, "If item is outside of location B for more than five minutes, usage is anomalous." These combined expectations now indicate that from 1200 to 1500 hours the item (100) can be outside of location A (and be in location B) for up to five minutes, with detection context 1 (123.10) still being applicable and not requiring or suggesting that detection context 2 (123.20) be invoked.

Signaling/Reporting Upon Real-Time Ambiguity Detection:

In real-time field operation, BIRD logic (500) may arrive at ambiguities in the detection process, for example being unable to determine an appropriate detection context (123) (that is, being unable to determine which usage expectations to apply to the current real-time environment). In such an event, the BIRD may be configured to signal or report both a possibly displaced/anomalous state (503.0/503.2), and also that an ambiguity problem has been detected. The authorized user (AU) (or other signal/message recipient) may then determine if the item is really in an displaced/anomalous state (503.0/503.2) or not, and may also address the ambiguities in the usage expectations (600) or detection context definitions (123).

FIG. 12C

Detection Context and Usage Expectation Example

FIG. 12C illustrates three exemplary detection contexts (123) and four sets of usage expectations (600), as they might be employed and interact in an exemplary embodiment of the present system and method.

The exemplary detection contexts (123) may be applicable to a particular BIRDed-item (102) belong to an authorized user (AU) who regularly commutes, for example, between a job (or jobs), and a home or two. A first detection context (123.11) may be applicable for a home and job in the state of Maryland, where the authorized user (AU) may typically spend her time during the even numbered weeks of the year. A second detection context (123.22) may be suited for the authorized user's home and job in the state of New York, where she typically spends her time during odd-numbered weeks of the year.

For this authorized user, New York and Maryland may be considered her two overall, encompassing daily life locations (140.DL), where she spends much of her life. Because these states are so large, it may make sense for the authorized user (AU) to associate these locations with detection contexts (123). A third, default detection context (123.33) is also defined for those times when the authorized user (AU) is not in New York and also is not in Maryland, but has the BIRDed-item (102) in her possession; or possibly, when the authorized user (AU) is in those states, but the BIRDed-item (102) has been left behind elsewhere, or is otherwise lost or stolen.

For the detection contexts illustrated, BIRD logic (500) may be broadly configured as follows:

When the authorized user (AU) is in Maryland, with her BIRDed-item (102) during an even-numbered week, the first detection context (123.11) applies. Assuming that her BIRDed-item (100) is otherwise subject to consistent, expected environments and usage (144) within Maryland—then the item is extant (503.1).

Similarly, when the authorized user (AU) is in New York, with her BIRDed-item (102) during an odd-numbered week, the second detection context (123.22) applies. Assuming that her BIRDed-item (100) is otherwise subject to consistent, expected environments and usage (144) within New York—then the item is extant (503.1).

If the BIRDed-item (102) is not in Maryland during an even-numbered week, or not in New York during an odd-numbered week, then BIRD logic (500) may be configured with several possible responses. Just one set of exemplary responses is indicated here, but persons skilled in the art will recognize that other BIRD logic (500) choices are possible as well:

(i) If the BIRDed-item (102) is in neither of the states of New York nor Maryland, then the default detection context three (123.33) will apply.

(ii) If the BIRDed-item (102) is in Maryland, but during an odd-numbered week (when it should be in New York), then the detection context for New York will be deemed applicable. The associated usage expectations (600.22) and/or BIRD logic (500) will likely self-assess the item as diverted (503.0).

(iii) If the BIRDed-item (102) is in New York, but during an even-numbered week (when it should be in Maryland), then the detection context for Maryland will be deemed applicable. The associated usage expectations (600.22) and/or BIRD logic (500) will likely self-assess the item as diverted (503.0).

The logic of items (i), (ii), and (iii) above can also be summarized this way:

(a) If the BIRDed-item (102) is in either New York or Maryland, then either detection context one (123.11) or detection context two (123.22) applies, but the choice is based on the week number (that is, the date/time), not on the state. This reflects that the BIRDed-item (102) is expected to be in specific states during specific weeks. Displaced/anomalous states (503.0/503.2) are assessed based on where the item (100) is expected to be as determined by the actual date and time (104.T).

(b) In the event that the BIRDed-item (102) is in neither of New York nor Maryland, then and only then does the default detection context three (123.33) apply.

For each detection context (123) suitable usage expectations (600) can be assigned as appropriate, providing more specific details on expected environments (144). For example, expected locations (144.L) within Maryland, along with associated dates/times, are indicated in usage expectations (600.11). Similarly, expected locations (144.L) within New York, again along with associated dates/times, are indicated in usage expectations (600.22).

Authorized user iteMetrics (154) may be indicated in a separate set of usage expectations (600.44), which may be applicable across all detection contexts (123). Similarly, a general set of usage expectations (600.33) may be defined, and may be applicable to all detection contexts (123).

Still other sets of usage expectations, for example (600.55), may also be defined or identified, and may be deemed applicable only to some detection contexts (123) and not others (for example, to detection contexts 123.22 and 123.33, but not 123.11).

FIGS. 1A, 2F, 13A-13C, 17A-17G, 18A-18C

Active Items and Passive Items

Passive Items

Discussed above are elements of an exemplary BIRD (200) which, in an embodiment, is designed to be separate from an item (100) and attached to the item (100) by a mechanical tether or coupling (202, 203, 202.C). The mechanical link or tether (202, 203, 202.C) may also have active electrical or optical properties for purposes of ascertaining link presence and integrity, and possibly other purposes.

In an alternative embodiment, the BIRD (200) may be integrated in whole or in part into the structure of the item (100) (see for example FIG. 2F, above, elements 200B, 200F, 200C, 200D, 200E), so that the BIRDed-item (102) is an integrated unit. In an alternative embodiment, a BIRD (200) need not be physically separate from a passive item (100.Pass). Further examples of integration of BIRD elements into items which are conventionally passive are presented in conjunction with FIGS. 17A-17G and 18A-18C, discussed further below.

Typically, however, in embodiments discussed above, the BIRD (200) is connected to an item (100)—or is integrated into an item (100)—which has, as its primary or essential functions and properties, ones that are largely mechanical and/or static in nature. (By "static" is meant items (100) with are without moving parts, or even with moving parts the items are unchanged or substantially unchanged in practical use.) Such items (100), discussed above, which are fundamentally mechanical/static in nature, typically makes little or no use of electricity. Many exemplary such items can be listed, including standard (non-RF and non-infrared) house keys and car keys (100.K), wallets (100.W), some toys (100.T), many recreational items (100.R), and other items illustrated in FIGS. 1A, 2F, and other figures above.

Such an item (100) may also be referred to as a passive item (100.Pass) (illustrated in FIGS. 1A and 2F and in other figures throughout this document).

In an embodiment, elements of a BIRD (200) may be distributed between a passive item (100.Pass) and a structurally separate BIRD (200). For example, sensors (210) and/or some or all processing elements (204, 206, 208, etc.) may be structurally integrated into a passive item (100.Pass), while other processing elements (204, 206, 208, etc.) and signaling elements (230), ports (226), communications elements (240), and user interface elements (280, 282) may be in a separate BIRD housing (250). Communications between the passive item (100.Pass) and the BIRD (200) may be maintained via radio frequency link or via wires (202.W) (see FIG. 2G) within the mechanical link or tether (202, 203, 202.C). Other distributions of elements between the passive item (100.Pass) and the BIRD (200) may be envisioned as well.

In some instances, the introduction of BIRD processing or sensor elements in the passive item (100.Pass) may suggest or lend itself to the introduction of feature improvements in the passive item (100.Pass), whereby the passive item utilizes the processor, memory, sensors, etc., for determinations not strictly related to determinations that the item (100.Pass) is in a displaced/anomalous state (503.0/503.2). For example, a processor (204), memory (206), and sensors (210) may be used in sporting goods (100.R) to help evaluate athletic usage and performance, or may be utilized inside a briefcase (100.B) or other carrying case (1700) to determine that certain smaller items (100) are contained within. Several exemplary such applications are discussed in conjunction with FIGS. 17A-17H and 18A-18C, below.

Active Items

In additional to passive items (100.Pass), embodiments of the present system and method may also be implemented in active Items (100.Act). Active items are defined generally as being a portable object, device, or package, typically though not always meant to be carried on or moved along by a person, which inherently incorporates elements associated with either of:

(i) data processing, and/or (ii) internal sensing . . .

. . . as part of the object's normal, conventional, or essential operations. These inherent elements typically include an item microprocessor, an item memory, item timing/calendar elements, a bus, a power supply, possibly either internal or external sensors, and other elements typically required for data processing functions. As will be discussed further below, in an embodiment of the present system and method, some of these active item elements may co-function as a BIRD's processor (204), memory (206), clock (208), sensors (210), bus (214), power elements (281), and so on.

Typical of such active items (100.Act) are not only the presence of these processing elements, but the fact that the processing elements are often put to distinctive, respective idiosyncratic usage by different respective human users of the processing elements. For example, for a cell phone, different users will tend to maintain a distinctive list of phone numbers called, or web addresses or e-mail addresses which are accessed; and different users will have different usage expectations in terms of frequency and timing of when and how they use their cell phone.

Active item BIRDs (ABIRDs):

In this document, in the discussion above which has preceded this point, the term "item (100)" has typically been illustrated with respect to passive items (100.Pass). However, persons skilled in the art will appreciate that a stand-alone BIRD (200) can be tethered to, and used with, active items (100.Act) as well. As will be discussed in detail further below, an active item (100.Act) may have associated with it a separate BIRD (200)—now referred to as an active item BIRD (200.Act) or ABIRD (200.Act)—the two of which are typically linked by an active connection (202.Act). The active connection (202.Act) is typically both mechanical in nature and also electrical and/or optical for purposes of data transport.

In an alternative embodiment, however, an active item (100.Act) and an active item BIRD (200.Act) may be completely integrated into one structural and functional unit.

In figures below, and for the sake of technical completeness, an active item (100.Act) is often illustrated with an embedded/integrated BIRD element (200.Act.I). In the figures, the embedded BIRD element (200.Act.I) may be illustrated as lying "on top" of the active item (100.Act), or on the surface of the active item (100.Act). However, it will be understood that in typical embodiments, the embedded BIRD element (200.Act.I) is actually distributed and integrated into the interior electronics of the active item (100.Act).

It will be further understood that, in some embodiments, the standard components of the BIRD (200.Act.I), such as the microprocessor (204), memory (206), timing elements (208), bus (214), and other elements, may be shared with the active item (100.Act). For example, a common processor (204) may perform both the standards functions of a cell phone (100.CP) and also the functions associated with BIRD (200) environmental detection and analysis. In an alternative embodiment, two separate processors (204), separate memory (206), or other separate elements may be employed for the active item (100.Act) and the BIRD (200) processing.

Electrical Items

There are some items (100) with some electrical features, such as for example a flashlight, electronic keys, remote controls for TVs, many electrical tools (electric drills, electric saws, etc.), and similar items. Such items may, in some sense, still be considered passive, in that they typically have either no processing, memory, sensing, or logical capabilities; or have only minimal processing capabilities for very limited purposes of mechanical control or other simple control functions.

One the one hand, such items (which may for convenience be referred to as electrical Items) are not fundamentally oriented towards data processing in the manner associated with computers or cell phones. However, the electrical features of such devices, along with whatever processing abilities they have for control purposes, still lend themselves to monitoring and data assessment by a BIRD (200). Equally important, such inherent electrical capabilities and limited processing abilities may still lend themselves to appropriate definitions of usage expectations (600) and the recording of usage data (700.U). For example, even for a flashlight, a user may be able to define detection contexts (123) where the user expects the flashlight to be on or off. Similar, suitable sensors (210) may be able to provide data to the BIRD (200) as to when the flashlight is on or off. As such, and for purposes of this document, even such electrical items may be considered to be active items (100.Act), provided suitable sensors (210) can provide the BIRD's processor (204) with appropriate data to support BIRD functions and analyses.

FIG. 13A

Exemplary Active Items

FIG. 13A is a drawing of several exemplary active items (100.Act) with either an associated external-active-item-BIRD (200.Act.E) or internal-active-item-BIRD (200.Act.I).

External Active Item BIRDS

The exemplary active items include a digital camera (100.Act.CM), an electronic testing device such as an oscilloscope (100.Act.T), and a medical testing device such as an EKG or ECG (100.Act.M). Each such active item (100.Act) is linked to an external-active-item-BIRD (100.Act.E) via an active-item-to-BIRD-active-link (202.Act). In an embodiment, the active-link (100.Act) provides for: mechanical connection; detection of separation between the active item (100.Act) and the external-active-item-BIRD (200.Act.E); and for data transfer (1308) between the active item (100.Act) and the external-active-item-BIRD (200.Act.E).

The data transfer (1308), which may be one-way or two-way, enables the active item (100.Act) to report to the external-active-item-BIRD (200.Act.E) on the electronically definable/monitorable activities or uses of the active item (100.Act). This data can be used by the external-active-item-BIRD (200.Act.E) as additional means to distinguish extant/normal (503.1/503.3) from displaced/anomalous (503.0/503.2) states for the active item (100.Act), as discussed further below (see FIG. 13C). The data transfer (1308) may also be employed by the external-active-item-BIRD (200.Act.E) to modify the behavior of the active item (100.Act), particularly if the external-active-item-BIRD (200.Act.E) detects displaced/anomalous item behavior or a displaced/anomalous item environment (503.0/503.2).

ABIRDS:

Active item BIRDs (200.Act) may be referred to in general as ABIRDs (200.Act). An external active item BIRD (200.Act.E) may be referred to as an external ABIRD (200.Act.E). The combination of an active item (100.Act), linked with an external ABIRD (200.Act.E) via a active connection (202.Act), may be referred to as an ABIRDed-item (102.Act.E).

Internal Active Item BIRDS

The exemplary active items shown in FIG. 13A also include a cell phone (100.Act.CP) (labeled elsewhere in this document with reference number "340," when used as a configuration computer; see for example FIG. 3D); a remote control (100.Act.RC); a weapon with active electronics, for example, a taser (100.Act.W); a laptop computer or tablet computer (100.Act.LC) (labeled elsewhere in this document with reference number ("330" or "345," see for example FIGS. 3D and 3E); electronic keys (100.Act.ECK); and a global positioning system (100.Act.GPS); each with an associated, respective internal-active-item-BIRD (200.Act.I).

In an embodiment, and as noted above, it is understood that the internal-active-item-BIRD (200.Act.I) is actually distributed and integrated into the electronics of the active item (100.Act), generally into the interior of the active item (100.Act). However, some components of the internal BIRD (200.Act.I) may be on the surface of the active item (100.Act). For example, some sensors (210) may be on the surface of the active item (100.Act).

It will be understood as well that the data communications (1308) between the functional elements of the active item (100.Act) and the internal-active-item-BIRD (200.Act.I) are accomplished internally, for example via a common or shared bus (214); or via an electronic link between a first bus dedicated to the active item (100.Act) per se, and a second internal ABIRD bus (214).

ABIRD:

An internal active item BIRD (200.Act.I) may be referred to as an internal ABIRD (200.Act.I). The combination of an active item (100.Act), with an integrated, internal ABIRD (200.Act.I), may be referred to as an ABIRDed-item (102.Act.I).

It will be understood that the allocations shown in the figure of BIRDs (200) which are internal or external to the active items (100.Act) are exemplary and for purposes of illustration only. In an embodiment, any active item (100.Act)

may be linked to an external-ABIRD (200.Act.E) via suitable ports and other connectors on the active item (100.Act). Similarly, many active items (100.Act), both currently known and those to be designed in the future, can be specifically designed to have an internal ABIRD (200.Act.I).

Summary

For brevity in discussion below, both an external-ABIRD (200.Act.E) and an internal-ABIRD (200.Act.I) will be referred to as an ABIRD (200.Act).

A BIRD (200) and an active-item-BIRD (ABIRD) (200.Act) are substantially the same in components and operations, except that in some embodiments an ABIRD (200.Act) has additional capabilities:

(i) to receive from an active item (100.Act) additional information about the item's internal operations (1382), internal states (503.Act), or processing statuses (501.Act), which (possibly along with other environmental data) help distinguish extant/normal item states (503.1/503.3) from displaced/anomalous item states (503.0/503.2) based on the internal item states; and/or (ii) to modify the active item's internal operations (1382) and/or processing states (503.Act) based on determinations of displaced/anomalous item states (503.0/503.2).

Again, and as noted above, an active item (100.Act) with an integrated, internal ABIRD (200.Act.I) will generally be referred to simply as an ABIRDed-Item (102.Act.I). When necessary, the integrated BIRD components or BIRD functionality of the active item (100.Act) are distinguished as the ABIRD components or ABIRD functionality (200.Act) of the active item (100.Act).

FIG. 13B

Exemplary Active Portable Item Reporting Device

Shown in FIG. 13B are elements of an active-item-BIRD (200.Act) or ABIRD, for short, which may be either an external ABIRD (200.Act.E) or an internal ABIRD (200.Act.I), with some variations on configuration in each case (as discussed immediately below). As noted above, if the active-item-BIRD (200.Act) is integrated into the active item (100.Act), then the integrated unit may be referred to as an ABIRDed-item (102.Act.I).

Many of the elements of the ABIRD (200.Act) are the same as those already discussed above in conjunction with FIG. 2A, above. These include the processor (204); the main memory (206.M); the clock/calendar/timer (208); the environmental sensors (210); the bus (214); battery(s) (216); the communications interface, ports, transceivers, and signaling elements (220, 226, 230, 240); the local I/O interface and I/O elements (280, 282, 284, 286); and secondary memory (206.S) and removable storage unit (206.RSU).

External ABIRD

If the active item BIRD (200.Act) is an external ABIRD (200.Act.E), then in an embodiment it has an active item port (1305). The active item port (1305) is configured for connection and data transfer with an external active item (100.Act.E). In an embodiment, the active item port (1305) may be a conventional USB/Firewire port (226) or other local signaling (230). In an alternative embodiment, a unique or custom port may be employed. The port (1305) may support item-link integrity detection (224).

Internal ABIRD

If the ABIRD (200.Act) is integrated into the item (100.Act), many elements may have shared functionality or dual functionality, providing support for both the operations conventionally associated with the active item and the operations associated with a BIRD (200). For example, the processor (204) and memory (206) in a cell phone (100.Act.CP) may support all the conventional communications and data processing activities of a conventional cell phone, and may additionally support the extant/normal (503.1/503.3) versus displaced/anomalous (503.0/503.2) item determinations of the ABIRD (200.Act.I).

Redundant Active Item Monitoring and Analysis Module (RAIMA):

In an embodiment, an internal ABIRD (200.Act.I) may also have a Redundant Active Item Monitoring And Analysis module (1310), or RAIMA (1310). The RAIMA elements (1310) are designed to provide redundancy in view of a variety of circumstances that can affect BIRD performance, and/or to provide additional support for BIRD analysis in the context of active items (100.Act). The RAIMA (1310) may include, for example and without limitation:

- An additional processor (1310.P) in addition to the primary microprocessor 204. In an embodiment, the additional processor (1310.P) is a relatively low power, low speed processor which is kept in operation even when the active item (100.Act) is turned off the by user, and the primary processor (204) is therefore not available. The additional processor (1310.P) would be low power, low speed, have reduced processing capabilities, etc., compared to the same parameters for the primary processor (204). The additional processor (1310.P) has sufficient processing capabilities for essential BIRD monitoring functions, which may vary depending on the type of active item (100.Act). For example, the additional processor (1310.P) may be sufficient to monitor location, motion, and ambient light, and based on these make displaced/anomalous item state (503.0/503.2) assessments (the same or similar to those that would be made for a passive item (100.Pass)).

In an alternative embodiment, the additional processor (1310.P) may actually be the same processor as the primary processor (204), but in a lower power mode with reduced speed, and possibly with some modules within the primary processor (204) (for example, advanced graphics modules, some math pipelines, etc.) shut down.

The RAIMA (1310) may also include dedicated random access memory (RAM) or similar (1310.M), which again is available when the rest of the active item (100.Act) is shut down. In an embodiment, the RAM may be incorporated into the additional processor (1310.P), for example as cache memory.

- Dedicated firmware (1310.F) with BIRD operating instructions, to help prevent "hacking" of the BIRD subsystem, and to ensure BIRD operational functionality when the rest of the active item (100.Act) is shut down.
- Dedicated sensors (1310.S). Various sensors may be employed to monitor the internal condition of the active item (100.Act). In particular, sensors may be employed to detect any unauthorized tampering with the dedicated active item elements (1320) (which are defined and discussed further immediately below).
- Advanced battery/power control (1310.B). Numerous elements of battery usage, including the presence of a standard battery (216.S) and secure emergency battery (216.E), have already been discussed above. Also discussed above are elements of power monitoring and power control by power monitor (218). An active item (100.Act) may have additional elements of advance battery/power control (1310.B). For example, in the event that the ABIRD (200.Act) determines that the item (100.Act) is lost (503.0.1), misplaced (503.0.2), misappropriated (503.0.3), or stolen (503.0.4), the ABIRD (200.Act) may direct that the active item (100.Act) reduce or terminate power to its non-BIRD-related elements (1320), discussed immediately below.

Dedicated Item-Specific Elements

Also shown in FIG. 13B, for completeness, are dedicated active item elements (1320) which may be part of an ABIRDed-item (102.Act.I) with an internal ABIRD (200.Act). These elements (1320) are not, strictly speaking, part of the internal ABIRD functionality per se, which is suggested by the shading and dotted line in the figure; but the elements (1320) will be integrated into the physical structure and body of an internal-ABIRDed-item (102.Act.I). The exact nature of the dedicated active item elements (1320) will vary depending on the particular nature of the active item (100.Act).

For example, in a cell phone (100.Act.CP), the dedicated active item elements (1320) may include elements of the user interface which are not required for or utilized by ABIRD operations (for example, a headset jack and supporting internal electronics, or advanced graphics features not needed by an ABIRD). In a GPS (100.Act.GPS), the dedicated active item elements (1320) may include algorithms related to guiding a user to a desired location, algorithms related to presenting a map to a user, and specialized communications transceivers which are not utilized as elements of ABIRD communications for signaling or alerting to displaced/anomalous (503.0/503.2) item states.

In an electronic weapon such as a taser (100.Act.W), any and all elements which are present solely for the purpose of energizing or operating the weapon as a stun device (or other weapon) would be considered as dedicated active item elements (1320). In a laptop computer (100.Act.LC), elements of a high fidelity sound system—anything in excess of that required for BIRD signaling—would be considered dedicated active item elements (1320), as might components associated with advanced graphics that may not be useful for BIRD signaling or GUI purposes (or be in excess of what a stand-alone BIRD (200) would need. In medical test equipment (100.Act.M), any components specifically dedicated to monitoring of the human body (and which are not in dual use for, say, ABIRD biometrics (152, 282.D), or are more advanced than needed for ABIRD biometrics (152, 282.D)) would be considered dedicated active item elements (1320).

Some elements may be viewed or understood in a dual sense, as being part of or used by the internal ABIRD (200.Act.I), but also as being present in embodiments which are in some sense "beyond" conventional BIRD requirements for a stand-alone BIRD (200) or external ABIRD (102.Act.E). For example, in an embodiment, a BIRD (200) may employ a display (282.D) of relatively minimal size or moderate display resolution; this may be because an authorized user (AU) may typically be expected to require limited data from the BIRD display, on limited occasions, and equally because a stand-alone BIRD (200) may be deliberately designed with weight and size considerations in mind.

By contrast, an active item (100.Act) (such a cell phone or a tablet computer) may be designed with a larger (or much larger) display than a stand-alone BIRD (200) or external ABIRD (200.Act.E). When an internal ABIRD (100.Act.I) is integrated into the design of such an active item (100.Act), the internal ABIRD (100.Act.I) will typically use the active item's display for its own display (282.D). However, the use of such a large display, or high resolution display, may be seen as being mandated by the requirements of the active item (100.Act), and not by the requirements of the integrated ABIRD (200.Act.I) per se. Similar considerations may apply to many other shared elements (full-size keyboard, processor size, speed and power, memory requirements, secondary memory, and so on), where the active item (100.Act) may require substantially more expanded features and system demands (size, speed, weight, power consumption) than would the same elements in a standalone BIRD (200) or even a stand-alone, external ABIRD (200.Act.E).

In FIG. 13B, the dedicated active item elements (1320) are illustrated as sharing a common bus (214) with the internal ABIRD elements. In an alternative embodiment, the dedicated active item elements (1320), possibly along with other elements of the active item (100.Act) may have their own separate bus from the ABIRD bus (214); in this event the ABIRDed-item (102.Act.I) will have suitable hardware means to share data between the two buses, and more generally to share data between the elements of the active item (100.Act) and the internal ABIRD (200.Act.I).

Monitoring of Dedicated Active Item Elements by the BIRD:

In an embodiment, dedicated active item elements (1320) may not be regarded as part of internal ABIRD operations—that is, such elements may not participate in any of the ABIRD sensing, analysis, or signaling/reporting operations per se. However, operational data from and pertaining to dedicated active item elements (1320) may be utilized as part of ABIRD analysis. Put another way, the dedicated active item elements (1320)—in addition to serving their primary functional role in the active item (100.Act)—also may be viewed as a kind of additional sensors (210); only in this context, what they "sense" is the choice of their usage by a human owner or operator of the active item (100.Act). This is discussed further below, in conjunction with FIGS. 13C and 13D.

Additionally, the operations (1382) and internal states (503.Act) of dedicated active item elements (1320) may be actively modified by the internal ABIRD operations, especially if displaced/anomalous (503.0/503.2) environments or activity are detected.

Further Regarding Sensors and Active Item Elements

In some cases, the active item (100.Act) and its internal ABIRD (200.Act.I) may share environmental sensors (210). For example, many active items (100.Act) now include sensors for location determination (210.L), optical sensors (210.Opt), a camera (210.C) or video camera (210.V), a motion sensor/acceleration sensor (210.M), and/or possibly other sensors. That is, in an embodiment, and for some active items (100.Act), some or all of the sensors (210) used by the active item (100.Act) may also be used by the internal ABIRD (200.Act.I) for normal/anomalous item context determinations. For example, a cell phone (100.Act.CP) or a GPS (100.Act.GPS) may be provisioned with a location sensor (210.L) employed by the authorized user (AU) to determine his or her location, or to navigate to a desired location, etc. The same location sensor (210.L) may be employed by the internal BIRD elements (200.Act.I) and processing to help determine displaced/anomalous (503.0/503.2) item environments or usage, as described in detail throughout this document.

In some cases, the ABIRD (200.Act.I) may employ a dedicated sensor (1310S) which is supplemental to one of the primary sensors (210), but which provides similar functionality.

For example, consider a cell phone (100.Act.CP) or a GPS (100.Act.GPS) which employs standard GPS functionality and circuits to determine location. In some cases, due to environmental factors, the cell phone (100.Act.CP) or GPS (100.Act.GPS) may be shielded from access to the GPS satellite system. For example, a cell phone (100.Act.CP) or GPS (100.Act.GPS) may lose access to GPS satellite data when inside a building or parking facility, or similar. In other cases, GPS data may not have been modified or updated to reflect recent modifications to road routes or other pertinent location data. The internal ABIRD (200.Act.I) of the cell phone (100.Act.CP) or GPS (100.Act.GPS) may therefore incorporate a secondary location sensor (210.L), perhaps one based on internal data streams (1507) from a building itself (see discussion associated with FIG. 15A, below), to supplement GPS data. A secondary location sensor (210.L) may also include identifying actual locations (104.L) based on an up-to-date imaging database of a local environment (104). Other secondary location determination means are discussed elsewhere in this document.

For another example, a cell phone camera may function as an optical sensor (230.P) for the internal ABIRD (200.Act.I). However, when the cell phone (100.Act.CP) is shut down, the camera functionality may no longer be available. Therefore, the ABIRDed-cell phone (102.Act.I) may incorporate a secondary light sensor (210.Opt), possibly less sophisticated and of lower power consumption than the cell phone camera, as a supplemental optical sensor (210.Opt). The supplemental optical sensor (210.Opt) is provided to determine extant/normal (503.1/503.3) or displaced/anomalous (503.0/503.2) item usage relying on power from the secondary, dedicated BIRD battery (216.E). (For example, the supplemental optical sensor (210.Opt) can help determine if the cell phone (100.Act.CP) is in the dark, possibly stored away inadvertently, at a time when it should be in usage and out in the light.)

ABIRD and Active Item Operational Usage

In operation, the usage of an ABIRDed-item (102.Act) is substantially the same or similar to that for a BIRDed-item (102) (that is, a BIRD (200) with a passive item (100.Pass)), with some appropriate modifications:

With reference to method 300 (FIG. 3A), the ABIRD (100.Act) may be configured for expected item behavior and/or anomalous item behavior (step 304) via authorized user (AU) input. With reference to method 306 (FIG. 3B), the ABIRD (100.Act) may be configured via a training session.

With reference to method 320 (FIG. 3C), step 322 (coupling the item (100.Act) and ABIRD (200.Act.I)) is not applicable for an internal ABIRD (200.Act.I), since the internal ABIRD (100.Act.I) and active item (100.Act) are physically integrated. Environmental monitoring (324), routine usage (326) of the item (100.Act) by the user, and signaling (328) by the ABIRD (200.Act.I) remain applicable to both an internal ABIRD (200.Act.I) and an external ABIRD (200.Act.E).

In practical application, an ABIRD (200.Act) would often be configured to report to some primary reporting device, for example, a user's cell phone (100.Act.CP). However, if an ABIRDed-item (102.Act) which is displaced (503.0) or otherwise anomalous (503.2), is itself the primary reporting device—for example, the cell phone (100.Act.CP)—then the user must have previously programmed the cell phone (100.Act.CP) to report to an alternate reporting device (for example, to send an e-mail, which the user may access using any computer (345, 355) which provides access to their e-mail service).

As per FIG. 3D, the active item (100.Act) may be configured via a suitable configuration computer (335). However, if the active item (100.Act) has a sufficiently complex and suitable user interface—for example, a cell phone (100.Act.CP), or a laptop or tablet computer (100.Act.LC), the configuration may be done in part or in whole directly via the interface of the active item (100.Act).

As per FIG. 3E, the active item (100.Act) may report anomalies to a variety of different reporting centers (335, 340, 345, 355, 365, 1400), as well as using the local signaling (230).

Method 400, shown in FIG. 4A, remains applicable. Method 430, shown in FIG. 4C, remains substantially applicable, both for active items (100.Act) with an external ABIRD (200.Act.E) and for active items with integrated ABIRDs (200.Act.I).

Active Items, Usage Expectations, and Usage Data:

However, for an active item (100.Act), the details of usage expectations (600), discussed above in conjunction with FIGS. 6A-6F, will have additional elements (see FIG. 13C, below). Similarly, for an active item (100.Act), sensor data (700), processed sensor data (700.P), and usage data (700.U) may all contain additional elements pertaining to the internal operations (1382) and internal states (503.Act) of the active item (100.Act). Further, for an active item (100.Act), both the process of defining usage expectations (600) (see FIGS. 10A-10K and other figures above), and the BIRD logic (500) for comparing usage data (700.U) with usage expectations (600) may have additional elements. See again FIGS. 13C and 13D, below. Finally. BIRD song (1000) may have additional elements as well.

FIG. 13C

Exemplary Monitoring and Analysis of Active Item Usage

FIG. 13C depicts several exemplary ABIRDed-items (102.Act) already discussed above. (Illustrated in FIG. 13C are only ABIRDed-items (102.Act.I) with internal ABIRDs (200.Act.I), but the figure and discussion are applicable as well to ABIRDed-items (102.Act.E) with external ABIRDs (200.Act.E).)

Active Item Evaluations and Active Item Statuses

Along with each ABIRDed-item (102.Act) is a list of exemplary active item operations evaluations (1350) which can be evaluated to distinguish, or help distinguish, extant/normal (503.1/503.3) active item usage from displaced/anomalous (503.0/503.2) active item usage. In an embodiment, many of these operations evaluations (1350) may reflect aspects of item usage which are strongly correlated with the authorized user's habits and preferences for utilizing the active item technology; consequently, the usage expectations (600) associated with these active item operations evaluations (1350) may be viewed as an aspect of the active item's iteMetrics (154), and in particular the psyIteMetrics (158).

While not specifically shown in FIG. 13C, it will be understood that the active item operations evaluations (1350) will typically have associated with them active item statuses (501.Act), which in turn reflect internal operations features (1382) and internal active item states (503.Act). These statuses (501.Act) will be based on comparisons between the active item internal operations/states (1382/503.Act) and the applicable usage expectations (600).

For example, an evaluation (1350) of whether an active item (100.Act) is properly on when expected may have several associated on-off statuses (501.Act) (for example, "On-OK," "On-Unexpected," "Off-OK," "Off-Unexpected), which in turn reflect associated power on-off states (503.Act). For another example, an evaluation (1350) of whether a cell phone (100.Act.CP) is being used properly may have such status values (501.Act) as "Expected Outgoing Calls," "Unexpected Outgoing Calls," "Expected Incoming Calls," "Unexpected Incoming Calls," and so on. More generally, exemplary status values may take the form of "Consistent With Past Usage or Expected Usage," or "Inconsistent With Past Usage or Expected Usage." See FIG. 13D for additional discussion.

Distinguishing Extant from Displaced Active Item Usage

In an embodiment, the ABIRD (200.Act) elements of the active item (100.Act) may be configured to distinguish extant/normal usage (503.1/503.3) from displaced/anomalous usage (503.0/503.2) based solely an the internal statuses (501.Act) determined from the active item's internal operations evaluations (1350). In an alternative embodiment, the ABIRD (200.Act) may be configured to distinguish extant/normal usage (503.1/503.3) from displaced/anomalous usage (503.0/503.2) based on a combination of:

(i) the active item's internal operations statuses (501.Act); and (ii) sensor data (700) pertaining to the external environment and user usage of the active item (100.Act) such as item motion, location, light exposure, sound exposure, external temperature, and similar environmental data, as already discussed above.

Exemplary Active Item Operations Evaluations

Generic active item operations evaluations (1352) for item usage, which are likely to be applicable for many different types of active items (100.Act), include, for example and without limitation:

- Times of day and/or days of the week when the item is powered on or off;
- The percentage of time that the item is powered on or off, which may vary depending on the part of the week, day, or month;
- The frequency of active item usage by the user at different times of day, times of the month, etc. (since an active item (100.Act) may be powered on, but not be in active use);
- Average, maximum, and minimum power consumption at different times, and other patterns of power consumption;
- Features or operations which are typically used, most used, least used, etc.;
- Correlations of power on/off with specific expected locations (144.L);
- Correlations of specific uses with specific expected locations (144.L);
- Correlations of specific usage with item motion:
- Correlations of specific usage with other environmental factors;
- Correlation of power consumption with environmental factors;
- Major/unauthorized hardware or firmware changes (SAM card replacement, hard drive replacement, BIOS chip replacement, etc.).

Exemplary active item operations evaluations (1350) for item-specific usage are also listed for a cell phone (1355), laptop or tablet computer (1360), GPS (1365), and an electronic weapon (1370). The active item parameters listed are exemplary only, and should not be construed as limiting in any way.

Establishing Active Item Usage Expectations

In partial analogy with methods 1000.A, 1000.B, 1000.C and 1000.D discussed above, the expected usage (600) of an ABIRDed-item (102.Act) can be defined or determined in a number of ways which include, for example and without limitation:

- Having specific, expected usage parameters directly defined or entered by a user (via one or more dialog boxes, "wizard" guided data entry, etc.);
- Having the usage of the item (100.Act) monitored during a user-defined training period of time;
- Having usage or some usages of the item monitored while the user puts the active item (100.Act) to use in some specific detection context(s); and
- Associating certain usages of the active item (100.Act) with detection contexts (123) and detection subcontexts (123.SB) as established by a user via a calendar (1090).

In an embodiment, extant/normal usage (503.1/503.3), and usage expectations (600) in general, may also be determined by taking a data "snapshot" of certain user-selected, stored operating parameters at a given time. Examples include lists of phone numbers stored on a cell phone (100.Act.CP), files recently used or accessed on a personal computer (100.Act.LC), web sites accessed on the item's web browser, etc. The snapshot may be taken at a time indicated by the user, or may be taken and updated periodically at intervals determined by the user or by default settings.

Supplemental Usage Expectations and Waveform Usage Expectations for Active Items Parameters and algorithms for distinguishing extant/normal (503.1/503.3) from displaced/anomalous item usage (503.0/503.2) for an ABIRDed-item (102.Act) may also be established via supplemental usage expectations (600.S), already discussed above in conjunction with FIG. 6C. Three exemplary supplemental usage expectations (600.S) are presented here, in pseudocode form:

```
(1) if overall active_item usage or activity is 50% greater or 50%
less than expected usage, over a period of one hour or longer, then
signal possible anomalous usage;
(2) if more than 20% of numbers dialed on a cell phone, over a period
of one hour or longer, are not phone numbers previously stored on the
internal phone directory, then signal possible anomalous usage;
(3) if taser weapon discharged more than twice in one day, then signal
possible anomalous usage.
```

Other such supplemental usage expectations (600.S) may be envisioned as well. The pseudocode shown is exemplary only, and many other examples of suitable code may be envisioned. The pseudocode may in practice be implemented via any number of known programming languages, including for example and without limitation C, C++, Java, Pearl, and others. The code, once translated into executable form, would be run on the processor (204) of the ABIRD (200.Act).

Various aspects of active item usage—times and dates of usage, power consumption, usage of specific features, and so on—may also be plotted (in partial analogy with plots shown in FIG. 11A, discussed above) and otherwise stored as waveforms, waveform coefficients, and other mathematically dense or compressed representations. Usage contexts, and normal (503.3) or anomalous (503.2) states, may be defined with respect to the plotted data (in partial analogy with plots shown in FIGS. 11B and 11C, discussed above) or waveform data. Correlations among active item usage factors, or between active item usage and other environmental factors, may also be identified and determined in partial analogy with FIG. 12, discussed above.

Modification of Active item Operations in Response to Displacement/Anomaly Determination If an ABIRD (200.Act) determines that its associated active item (100.Act) may be displaced (503.0) (lost, misplaced, misappropriated, wandering, or stolen) or otherwise anomalous (503.2), the ABIRD (200.ACT) may be programmed to modify or limit internal operations features (1382) or states (503.Act) of the active item (100.Act). Some of these modifications may be related to device security. For example, if an ABIRD (200.Act) determines that its associated cell phone (100.CP) is displaced (503.0), the ABIRD (200.Act) may shut down all calling and e-mail features of the phone; or, in a more limited response, the ABIRD (200.Act) may permit calls and e-mails to be made (or permit calls and e-mails, but only to a limited set of pre-designated destinations); but may prevent access to, or prevent editing of, the phone's directory of called numbers and other such stored data.

Similarly, if an ABIRD (200.Act) determines that a GPS (100.GPS) has been displaced (503.0), the ABIRD (200.Act) may prevent access to the list of previously visited locations or travel routes for the GPS (100.GPS). This helps ensure that only an authorized user (AU) may access vital data stored on these active devices.

In such cases, an authorized user (AU) may restore access by entering a suitable pass code (152), biometric identification (152), or apply a similar security or identification feature which signals the active item (100.Act) that control is being restored by an appropriate party.

FIG. 13D

Exemplary Active Item Statuses, Operations Features, and States

FIG. 13D presents a Table 1380 which lists exemplary active item statuses (501.Act); some exemplary associated internal operations features (1382); exemplary status values (1385) for the active item statuses (501.Act); and exemplary associated internal states (503.Act) of the active item (100.Act). All of these elements may contribute to the ability of BIRD logic (500) to make the active item operations evaluations (1350) discussed in conjunction with FIG. 13C, above. In addition, the ABIRD (200.Act) may be configured, as part of BIRD song (900), to modify various active item internal states (503.Act) in response to both status determinations (501.Act) and assessments of the overall state (503) of the active item (100.Act).

FIG. 14A

First Exemplary Item Team

FIGS. 14A-14I pertain to item teams (1400), among other elements of the present system and method. It will be understood, in discussion associated with these figures, that references to items (100) may include references to active items (100.Act); references to BIRDs (200) may include references to active item BIRDs (ABIRDs) (200.Act); and references to BIRDed-items (102) may include references to ABIRDed-items (102.Act). Put another way, an item team (1400) may include both passive items (100.pass) and/or active items (100.Act).

Item Teams

An item team (1400) is a group of two or more items (100), with each item (100) having associated sensing/processing technology—typically, a BIRD (200)—for self-assessment of extant/normal (503.1/503.3) versus displaced/anomalous usage (503.0/503.2), where:

(i) the BIRDed-items (102) will typically be carried about or transported about in close proximity to each other over a sustained period in time; and (ii) the BIRDed-items (102) are configured not only for self-monitoring, but also for mutual monitoring, data exchanged, and/or item support.

In an embodiment, the items (100) in the item team (1400) are mobile as a group, and are carried on the person and/or put in use in close proximity to the person who is the authorized owner/user of the item team (1400). In the latter embodiment, the items (100) in the item team (1400) may move substantially in tandem for all or much of the time.

In an embodiment, a single member of an item team (1400) may be a BIRDed-item (102) which consists of one of:

- a passive item (100.Pass) tethered to an associated BIRD (200), or have integrated BIRD technology (200);
- an active item (100.Act) tethered to an associated external ABIRD (100.Act.E); or
- an active item (100.Act) with integrated ABIRD elements and functionality (100.Act.I).

AltMon Items:

In an embodiment, an item team (1400) may include some alternatively-monitored (altMon) Items (100.altM). AltMon items (100.altM) are items (100) which lack overall BIRD (200) technology, but which have passive or semi-passive elements (for example, RFID tags or some sensors (210)), which enable other BIRDed-items (102) in the item team (1400) to maintain some monitoring on the altMon items (100.altM). (See FIG. 14I, below.) Where appropriate, an altMon item (100.altM) may include RFID-tagged items (100.RFID). For convenience and simplicity, most of the discussion of item teams (1400) in FIGS. 14A-14I treats the teams as consisting of BIRDed-items (102), it being understood that altMon items (100.altM) (and in particular, RFID-tagged items (100.RFID)) may be included as well.

Single Person and Multi-Person:

An item team (1400) may consist of BIRDed-items (102) which are typically to be carried about by a single person. Alternatively, an item team (1400) or an extended item team (1400) may consist of items which are to be carried about by a group of people, where the people in the group typically engage in shared activities (work, recreation, etc.) in relatively close physical proximity to each other. For example, members of a police unit or a team of firemen may carry multiple BIRDed-items (102), all of which may be part of an extended item team.

Item Team BIRD and Item Team Member:

In the discussion below, reference it made to item team BIRDs (200.IT). An item team BIRD (200.IT) is technology the same or substantially similar to BIRDs (200) already discussed, at length, above in this document (and discussed further below); but which has been configured or enabled with any additional functionality (software and/or hardware) necessary to support item team (1400) operations. An item team member (102.IT) is a BIRDed-item (102) that is part of an item team (1400); that is, an item team member (102.IT) is the combination of an item (100.IT) which is part of an item team along with the item's associated item team BIRD (200.IT).

Elements of an Exemplary Item Team

FIG. 14A is a drawing of elements of a first exemplary item team (1400.1).

The item team (1400.1) includes a purse (100.IT.P) with an associated or embedded item team BIRD (200.IT.P); a set of keys (100.IT.K) with an associated item team BIRD (200.IT.K); a wallet (100.IT.W) with an associated or embedded item team BIRD (200.IT.W); and a cell phone (100.Act.CP) with internal ABIRD components and functionality (200.IT.CP).

The items (100.IT) in the item team are generally not connected or coupled to each other by any mechanical connection, wire, or tether. However, each BIRD (200.IT) in the item team maintains communications with all other BIRDs (200.IT) in the item team through RF data transmission links (1405) or other wireless links (1405). In an embodiment, the RF links (1405) are short-range, low power links using packet-based communications, for example using the unlicensed bands and such technologies as WiFi or Bluetooth.

In an alternative embodiment, other forms of communications links (1405) may be employed other than RF, such as infrared or other optical links. However, RF links are generally preferred for their ability to penetrate most common material objects, and in particular their ability to penetrate clothing, at short ranges.

FIG. 14B

Exemplary Item Team Configuration and Setup

FIG. 14B is a drawing which illustrates exemplary elements of configuration and setup for the first exemplary item team (1400.1).

In an embodiment, the item team (1400.1) is configured via a configuration computer (335). Each respective BIRD (200.IT) in the item team (1400.1) is connected to the configuration computer (335) via a respective data link (337.A, 337.B, 337.C, 337.D). In an embodiment, because critical security data is communicated via the data links (337), the data links (337) are highly secure. For example, the data links (337) may be wired links (rather than wireless links, which are inherently more subject to third-party monitoring as compared to wired links). The data links (337) may further be direct local wired links, for example, local connections in a home base (140.HB) (home setting or office) setting, such as a USB cable connections or Ethernet connections, possibly with no intervening network cloud or network elements.

In an alternative embodiment, if a wireless connection or network-based connection is employed for the data links (337) (for example, for user convenience or for various operational necessities), significant measures are preferred to ensure data security, such as encryption and password protections.

The data links (337) are used to upload configuration and setup data (1415, 1417, 1419) from the configuration PC (335) to the BIRDs (200.IT).

In an embodiment, each BIRD (200.IT) for each of the items (100.IT) in the item team (1400.1) typically receives the configuration and setup data (1415, 1417, 1419) for all the members (102.IT) of the item team (1400.1).

Put another way: Each BIRD (200.IT) receives the configuration and setup data 1415, 1417, 1419) for itself and also for all the other members of the item team (1400.1). In an embodiment, this enables each member (102.IT) of the item team (1400.1) to both identify and assess the status/state (501/503) of all other members of the item team (1400), with respect to the requirements for each member (100.IT) of the item team.

In an embodiment, the configuration and setup data (1415, 1417, 1419) which is uploaded includes:

- Transient or semi-transient validation strings (1415) for each BIRD (200.IT). Each BIRD (200.IT) will have a non-transient, or permanent identifier as well (not shown in the figure). The permanent identifier will be a series of bytes, for example an IP address or some other unique byte sequence, which uniquely identifies each BIRDed-item (102.IT). The permanent identifier may be publicly available, or readily intercepted and determined when the BIRDs (200.IT) are in wireless communication with each other (discussed further below).

By contrast, the transient/semi-transient validation strings (1415) are uniquely generated by the configuration computer (335). The transient validation strings (1415) are intended to allow the members (102.IT) of the item team (1400.1) to reliably and uniquely verify each other's identities when the item (1400.1) is in the field, that is, in use beyond the authorized user's home base (typically, where the configuration PC is located). The transient validation strings (1415) are configured to enable the members (102.IT) of the item team (1400.1) to mutually verify identities in a manner which cannot be readily spoofed or hacked by unauthorized users (UU). More details about the use of the transient/semi-transient validation strings (1415) are presented immediately below.

- Item team evaluations (1417) for each BIRD (200.IT). The item team evaluations (1417) are criteria which are used by item team members (102.IT) to determine when other item team members may be displaying indications of displaced/anomalous (503.0/503.2) behavior or usage. Exemplary item team evaluations (1417) are discussed in conjunctions with FIG. 14D, below. In an embodiment, item team evaluations (1417) may include the conventional usage expectations (600) for each item team member (102.IT).
- Anomaly responses (1419) for each BIRD (200.IT). These are the responses each item team member should take in response to indications of displaced/anomalous (503.0/503.2) behavior/environment for any other members of the item team (1400.1).

In an embodiment, item evaluation criteria (1417) and anomaly responses (1419) are typically configured or programmed at least in part by an authorized item team user. The configuration or programming are substantially analogous to those discussed above for individual items (100) with associated BIRDs (200), with suitable modifications and extensions for items (100.IT) viewed as members of an item team (1400).

By contrast, and as discussed further below, the validation strings (1415) are extended strings of random bytes or random numbers, and would typically be generated entirely automatically via software on the configuration computer (335).

In alternative embodiment, some or all of the BIRDs (200.IT) in the item team (1400.1) may generate their own validation strings (1415), but would still exchange these strings with other members of the item team (1400.1) via the configuration computer 335 and/or secure data links (337).

FIG. 14C

Exemplary Item Team Field Communications

FIG. 14C is a drawing which illustrates exemplary elements of data communications between members of the first exemplary item team (1400.1). These data communications would typically occur once the item team members (102.IT) are no longer coupled with the configuration computer (335), and are instead carried about by a user engaging in daily activities (that is, "in the field").

Data communications (1430) occurs between the BIRD (200.IT.K) associated with the keys (100.IT.K), and the other members of the item team (1400.1). The other members of the item team (1400.1)—apart from the keys—constitute a first subset (1400.1.S1) of the item team (1400.1). The first subset includes the purse (100.IT.P), the wallet (100.IT.W), and the cell phone (100.Act.CP), and each of their respective associated BIRDs (200.IT).

Data communications (1430) occur in two directions (1405.R, 1405.T) which, in an embodiment, are in general substantially simultaneous:

- Received data communications (1405.R) is data received by the BIRD (200.IT.K) associated with the keys (100.IT.K) from the members of subset 1400.1.S1. Such data would include data (1430P) transmitted from the BIRD (200.IT.P) associated with the purse (100.IT.P); data (1430.CP) transmitted from the BIRD (200.IT.CP) associated with the cell phone (100.IT.CP); and data (1430.W) transmitted from the BIRD (200.IT.W) associated with the wallet (100.IT.W).
- Transmitted data communications (1405.T) is data transmitted by the BIRD (200.IT.K) associated with the keys (100.IT.K), which is intended for reception by the members of subset 1400.1.S1. The transmitted data is labeled in the figure as 1430.K.

For brevity, reference is made below to data "transmitted by the keys (100.IT.K)" or "data received by the keys (100.IT.K)", it being understood that the data is actually transmitted by, or received by, the BIRD (200.IT.K) associated with the keys (100.IT.K). In an embodiment, reception (1405.R) and transmission (1405.T) are substantially concurrent activities; and further, that reception does not necessarily trigger or induce transmission, though in some instances it may; and similarly transmission does not necessarily trigger or induce listening for packets, though in some cases it may.

In an embodiment, the data (1430.K) transmitted by the keys (100.IT.K) is a sequential time series of data records (1431). In an embodiment, the records (1431) are transmitted at intervals short enough that if a displaced/anomalous (503.0/503.2) behavior or environment occurs for the keys (100.IT.K), the other members (1400.1.S1) of the item team (1400.1) can recognize and signal the anomaly within a time frame which is useful for the authorized user (AU) or owner of the item team (1400.1). For example, data records (1431) in the time series (1430.K) may be transmitted once each second, or once every five seconds. Other time frames, longer or shorter, may be envisioned as well.

Any one data record (1431) may include, for example and without limitation:

- The permanent identifier for the item (100.IT), already discussed above. In the exemplary embodiment shown, the permanent identifier is the combination of an Item Team ID (which applies to all members of the item team (1400.1)), and the Item ID. The exemplary values shown in the figure for the Item Team ID and Item ID, "Sally1" and "Keys", respectively, are representative only, and should not be construed as limiting.
- A sequence number, which identifies the order of the record (1431) among the sequence of records in the time series (1430.K).
- A sequential element, such as a bit or byte, from the validation string (1415) for the keys (100.IT.K). As discussed further below, the series of bits or bytes from the validation string (1415) enables each member of the item team (1400.1.S1) to validate the identify of the other team members (100.IT)
- The time of transmission.
- Current sensor data (700.R) from the item, such as its location, motion, and currently received illumination (shown in the figure with exemplary numbers in arbitrary units).

Other data (1430) may be transmitted as well. For example, battery power levels may be transmitted, so that item team members (100.IT) can notify each other when their battery power is dropping below an acceptable level.

Similar considerations apply to other data communications between members (102.IT) of the item team (1400.1) For example, data communications (1432) occurs between the purse (100.IT.P) and the other members (1400.1.S2) of the item team (1400.1). Data communications (1434) occur between the cell phone (100.Act.CP) and the other members (1400.1.S3) of the item team (1400.1). Data communications (1436) occur between the wallet (100.IT.W) and the other members (1400.1.S4) of the item team (1400.1)

The data structure of the data records (1431) transmitted by each item will be the same or substantially similar, except that some items (100.IT) may be characterized by unique or item-specific sensor data (700). For example, an active item (100.Act) such as a cell phone (100.Act.CP) may transmit operational data of a type that would not be applicable for passive items (100.IT.Pass).

As discussed further below, the data (1430) received by each item team member (102.IT) concerning the other item team members, can be used by each item team member to determine whether other members of the item team (1400.1)—or the team as a whole—are being subject to displaced/anomalous states (503.0/503.2). In addition, the integrity of the communications links (1405) themselves can be an indication of item state and item team integrity.

Field values shown (for "Item Team ID," "Item ID," "Sequence," "Validation," "Time," "Location," "Motion." "Illumination." etc.) are exemplary only, and do not necessarily conform to any established standards or conventions for such data. Persons skilled in the relevant arts will recognize that a variety of identifiers may be used for such fields as "Item Team ID" or "Item ID," and that any number of notation systems are known and may be used for such data as time, location, acceleration, velocity, light intensity, etc.

Validation Strings

As noted above, and for brevity, this document sometimes refers below to data "transmitted by an item (100.IT)" or to the "digital signature of an item (100.IT)", or makes similar references to data elements associated with an item (100.IT), it being understood that the digital content is actually generated by and/or associated with the BIRD (200.IT) associated with the item (100.IT). Elsewhere, the item (100.IT) and associated BIRD (200.IT) may simply be referred to as an item team member (102.IT), with similar references to associated data transmission or data elements.

In an embodiment, one use of item teams (1400) is to provide additional security against item theft (for example, pick-pocketing of items). In an embodiment, and to enhance the reliability of the method, it is important that a potential pick-pocket not be able to spoof the digital signature of an item team member (102.IT). In turn, to prevent spoofing, an electronic scanning or monitoring device in the vicinity of an item team (1400) should not be able to fully identify the electronic signature of the items (100.IT) in the item team (1400).

There are various means and algorithms that may be employed to prevent or inhibit determination of an item's electronic identification even when that identification is broadcast openly. Various such means and methods may be compatible with the present system and method, and the present system and method is not limited to the use of validation strings (1415). However, validation strings (1415), already discussed above, are one such means.

In an embodiment, a validation string (1415) is an extended string of bits or bytes which is random or semi-random. Each item team member (102.IT) either is assigned its own unique validation string (1415), or else self-generates such a unique validation string. In an embodiment, each item team member (102.IT) receives a new validation string (1415), different from the previously used string, during a configuration session prior to each field use of the item (100.IT). In an alternative embodiment, each item team member (102.IT) may receive a validation string (1415) which is long enough to last through multiple field uses of the item (100.IT).

In an alternative embodiment, a validation string (1415) may have to be recycled (reused) during a single field use of the item team (1400) (for example, during a single day). However, the practical usage of the item team (1400)—wherein the item team (1400) may be "on the go," that is, subject to extended changes in location—may be such that a person attempting to "hack" the items (100.IT) would not have a sufficiently extended time exposure to the item team (1400) to obtain the full validation strings (1415).

In an embodiment, a unique random validation string (1415) is generated by the configuration computer (335) which is used to configure an item team member (100.IT) prior to field use. The validation string (1415) is uploaded from the configuration computer (355) to the BIRD (200.IT) associated with the item team member (100.IT), as discussed above (see FIG. 14B). The validation string (1415) for a given item (100.IT) is also uploaded to the other members of the item team (1400) during the same configuration process. Each member of the item team (1400) has not only its own validation string (1415), but also the validation strings for all the other item team members; therefore, each member of the item team (1400) can validate the data transmissions (1405.R) it receives from the other item team members.

Field Use of the Validation String

During field use, each item team member (100.IT) transmits, in sequential order, the bits or bytes from its unique validation string (1415). In an embodiment, these bits or bytes are included as part of (that is, part of a field within) the sequential time series (1430) of data records (1431), already discussed above.

If a validation string (1415) was short enough that it would repeat in a detectable time, then the validation string (1415) could be detected and identified by an external, third-party monitoring device (that is, a device not part of the item team), which is an undesirable outcome. For example, suppose the validation string was just sixty (60) bytes in length, and suppose an item (100.IT) transmitted a data record (1431) every second; suppose also that each data record included one byte in sequence of the sixty bytes of the validation string (1415). Then in just one minute, the item (100.IT) would transmit its entire validation string (1415), and would need to recycle the validation string (1415) in the next minute. A third-party RF monitoring device nearby could detect the repeated pattern of the validation string (1415) in just two minutes (or even less), and could then spoof the identity of the item (100.IT).

In order to prevent detection and spoofing of a validation string (1415), the validation string should be long enough—that is, it should have a sufficient number of bits or bytes—that the validation string does not need to be re-used, or recycled, within any realistic listening time frame. For example, for an item team (1400) that will be used in a relatively localized setting over an entire working day (such as an office), the validation strings (1415) should not repeat for at least eight hours. (Potentially, if a third-party monitoring device might be maintained on site by some unfriendly party, the validation strings (1415) should not repeat for much longer time frames, perhaps days, weeks, or longer.)

In an embodiment, suppose each item team member (102.IT) transmits a data record (1431) every second, with each data record (1431) containing one byte from the validation string (1415). Then to avoid identification and spoofing of a validation string (1415), the validation string should contain at least:

$$1\ \text{byte/second} \times 3600\ \text{seconds/hour} \times 8\ \text{hours} = 28{,}800\ \text{bytes}$$

Longer validation strings (1415) can be envisioned as well. For example, a validation string (1415) based on one byte per second and good for an entire month of continuous item use would be approximately 3 Megabytes, which is easily within the storage capabilities of contemporary device memories (206). Even an item (100.IT) storing not only its own validation string, but those of other items in an item team (1400), may need to store only several tens of megabytes of item team data for extended usage.

In an alternative embodiment, the validation strings (1415) could be much shorter than the length characterized above. Each item team member (102.IT) could also have an algorithm designed to permutate the elements of the validation strings (1415), so that new validation strings (1415) could be dynamically generated "on the fly." Associated with the permutation algorithm would be unique, randomly generated permutation parameters; the permutation parameters are commonly shared by the entire item team, so that each member of the item team (1400) can generate the updated validation strings (1415) used by all other members of the item team. While this embodiment requires less memory than the extended length validation string (1415) described above, it requires greater use of the BIRD's processor (204). It is also essential that the permutation algorithm be sufficiently complex that it, and/or the associated permutation parameters, cannot be decoded by any nearby monitoring devices.

In an embodiment, and to further forestall spoofing and/or hacking of the validation strings (1415), access to and modification of the validation strings (1415) in BIRD memory (206) may be controlled, both for upload and download. Various means may be employed to control and limit access to/modification of the validation strings (1415) including, for example and without limitation: password protection; and storage in a special, separate area of memory with hard-wired limits on memory access and control. For example, upload and modification may be through a special hard-wired port for use by the configuration computer (335), with no direct access via wireless signaling. Access to the validation string (1415) may be limited by control circuitry to prevent release of bytes any faster than the authorized transmission speed (for example, one byte per second), and to ensure that release of bytes is strictly sequential.

FIG. 14D

Exemplary Item Team Behavior Evaluations

FIG. 14D lists exemplary item team evaluations (1417) for exemplary item team (1400.1). The list is representative only, and should in no way be construed as limiting.

The item team evaluations (1417) are criteria which item team members (102.IT) can use to assess the state of other item team members, to support an assessment of whether or not an item team member (102.IT) is likely in extant/normal (503.1/503.3) or displaced/anomalous (503.0/503.2) usage. In particular, the item team evaluations (1417) may be used, among other purposes, to determine if an item team member (102.IT) is significantly out of proximity to other members of the item team (1400). Such a proximity change determination may indicate that an item team member (102.IT) has been displaced (503.0).

Many item team evaluations (1417) are generic evaluations (1440), in the sense that they could apply to more than one type of item team member (100.IT). Below, the term suspect item team member refers to any member (100.IT.S) of the team (1400) whose signaling is deemed potentially anomalous (503.2) by other item team members (100.IT). These generic evaluations include, for example and without limitation:

- Received signal strength (RSSI) of an item team member (102.IT.S) is lower than the received signal strength from other item team members, or lower than an expected RSSI for that item team member (102.IT.S); a reduced RSSI may indicate the suspect item team member (102.IT.S) has been removed to some distance from the rest of the team (1400);
- One or more item team members (102.IT) determine no signal is arriving from another item team member (102.IT.S); this may indicate the suspect item team member (102.IT.S) has been left behind, been stolen, or has been improperly or unexpectedly powered down;
- Low battery warning from an item team member (102.IT.S);
- Arrival time delay in packet from an item team member (102.IT.S) as compared to packet arrival time from other team members (102.IT); this may indicate unexpected motion or displacement by the suspect team member which is sending the delayed packed;
- Persistent dropped packets by an item team member (102.IT.S); this may indicate the suspect team member (102.IT.S) has been moved or left behind, and/or is shielded from other item team members by some unexpected physical element;
- An item team member (102.IT.S) is in a significantly different location(s) from other item team members; unless it is known (through user signaling, or rescheduling) that an item team member should be removed at a distance from the others, this is an inherently suspect situation;
- An item team member (102.IT.S) is in a significantly different state of motion from other item team members (102.IT); again, unless it is known (through user signaling, or rescheduling) that an item team member should be moving differently from the others, this is an inherently suspect situation;
- Erroneous validation field (1415) from an item team member (102.IT.S); this may indicate an attempt by third-party technology at spoofing;
- Number of distinct item locations crosses a specified threshold (for example, multiple item team members (102.IT) are distributed across more than one distinct location (104.L), or across more than two distinct locations (104.L));
- Significant differences in sensor readings which are expected to have substantially similar values; for example, one item team member (102.IT.S) detects much more sound or less sound than another team member (102.IT.S), or one item detects much more or less light than another, when both items are expected to be out in the open use by the user.

Other exemplary item team evaluations (1417) may include, for example and without limitation cell phone evaluations (1442), keys evaluations (1444), wallet evaluations (1446), and purse evaluations (1448) as shown in the figure.

Item Team Evaluation Parameters

It will be noted that significant processing logic and parameter specification may be required during a configuration stage to establish suitable thresholds and criteria for determining anomalous states (503.2) among item team members (102.IT). For example, it may not always be expected that all item team members (102.IT) will always be in identical usage or identical locations (104.L).

Regarding, for example, exemplary item team (1400.1), there may be times when the keys (100.IT.K), the wallet (100.IT.W), and the cell phone (100.Act.CP) may all be carried inside the purse (100.IT.P). However, at intervals, any one item of the keys (100.IT.K), the wallet (100.IT.W), and/or the cell phone (100.Act.CP) are likely to be removed by the authorized user (AU) for temporary usage; the removed item team member(s) (102.IT) is (are) put into a different state of motion, somewhat different location, and subject to other environmental variations from the other item team members (102.IT). Suitable criteria can be defined for allowable variations, both in intensity and time duration, for variable sensor readings between item team members (102.IT). For example, a maximum distance can be established, beyond which no item team member (102.IT) is expected to "wander" from the other members of the item team (1400.1) in normal use. Similarly, a maximum time can be established for the amount of time that each item team member (102.IT) might reasonably be expected to be in active use by the owner, and so removed from the purse (100.IT.P).

FIG. 14E

Exemplary Method for Item Team Self-Monitoring

FIG. 14E is a flowchart of an exemplary method (1450) for self-monitoring and mutual monitoring by team members (102.IT) of an item team (1400).

The method begins with step 1454. In step 1454, each item team member (102.IT) receive item team evaluation criteria (1417) and anomaly responses (1419) for itself and all other item team members. In step 1458, each item team member (100.IT) receives a unique validation string (1415) for itself, also receives the unique validation strings for all other members of the item team (1400).

Steps 1454 and 1458 constitute a configuration phase of the method 1450. In an embodiment, and as discussed above, the received item team evaluation criteria (1417), anomaly responses (1419), and validation strings (1415) are uploaded from a configuration computer (335). In an alternative embodiment, the members (102.IT) of the item team (1400) may be directly linked to each other for mutual data uploads/downloads.

Following the configuration phase (1454, 1458), field use of the item members (102.IT) begins, as the items (100.IT) are typically carried about and put to use by an authorized user (AU).

In step 1462, and in substantial similarity to steps 445 and 450 of method 430, the BIRDs (200.IT) associated with the items (100.IT) initiate and continue environmental monitoring. For each BIRD (200.IT), this includes receiving data from its sensors (210), receiving data regarding dedicated active item elements (1320) for its active item members (100.Act.IT) (if any), and updating the historical and environmental data log (488).

In step 1466, the item team members (102.IT) begin an exchange of data packets (1430), typically at some regularly scheduled interval, for example, every second. Other intervals, longer and shorter, may be envisioned as well.

In step 1470, each item team member (102.IT) analyzes and compares received data from all item team members, including its own self-data in the analysis. In an embodiment, the analysis is accomplished via BIRD logic (500) running on the BIRD processor (204), and is based on the previously uploaded item team evaluation criteria (1417) as well as item-specific usage expectations (600). In an embodiment, mutual evaluations by item team members may be based not only on the data in the data packets (1430), but also on the signal strength, signal quality, signal timing, and data integrity of the received data packets themselves.

In step 1474, each item team member (102.IT) determines if its own condition is indicative of being displaced/anomalous (503.0/503.2), either based on its own inherent requirements or in relation to the condition of other item team members.

- By inherent requirements is here meant the kinds of requirements contained in an item's own usage expectations (600), which would apply (as discussed at length at length above) even for an item (100) in total isolation (that is, when not part of an item team (1400)).
- A determination of a possible displaced/anomalous state (503.0/503.2) in relation to the condition of other team members means a determination that an item's self-data readings are inconsistent with those of other members of the item team (1400). For example, an item team member (102.IT) may determine that its state of motion or its location is no longer consistent with the state of motion, or location, of the remaining members of the item team (1400). Or an item team member (102.1T) may determine that the intensity of light it is receiving or the volume of sound it detects is not consistent with that detected by other members of the item team (1400), in a detection context (123) for which these measurements should be mutually consistent across team members (102.IT).

If in step 1474, a determination is made by an item team member (102.IT) that its self-conditions are possibly displaced/anomalous (503.0/503.2), then the method continues in part with step 1478, and also, substantially in parallel, with step 1482. In step 1478, the item team member (102.IT) reports or signals a state of self-anomaly and also may take adaptive measures based on the anomaly response rules (1419) or other item-specific rules incorporated into BIRD song (900).

If in step 1474, a determination is made by an item team member (102.IT) that its self-conditions are not displaced/anomalous (503.0/503.2), then the method continues with step 1482. In step 1482, the item team member (102.IT) analyzes that current and historical data received from other members of the item team (1400), once again based on the item team evaluation criteria (1417). The item team member (102.IT) then determines, according to the item team evaluation criteria (1417), if another member (102.IT) of the item team (1400) is potentially in a state of displaced/anomalous usage (503.0/503.2).

If in step 1482, a determination is made by an item team member (102.IT) that the conditions of another item (100.IT) in the item team (1400) are possibly displaced/anomalous (503.0/503.2), then the method continues with step 1486. In step 1486, the item team member (102.IT) reports or signals a state of displacement/anomaly (503.0/503.2) for the other item (100.IT) and also may take adaptive measures based on the anomaly response rules (1419).

From either step 1482 or 1486, the method continues with a return to step 1462, continued environmental monitoring.

In an embodiment, steps 1474 (self-anomaly determining) and steps 1482 (determination of anomaly for other items) may occur substantially in parallel. In some instances, processing and analysis may yield an initially ambiguous result, suggesting that one or more items (100.IT) of the item team (1400) are in a displaced/anomalous usage (503.0/503.2) as compared with others items (100.IT), but it being unclear which items (if any) remain in extant/normal usage (503.1/503.3) vs. those items which are in displaced/anomalous usage (503.0/503.2). Advanced processing logic may be developed and employed to resolve such uncertainties, with varying degrees of probabilistic results.

In an embodiment, members (102.IT) of the item team (1400) may be assigned priority roles in assessing or determining the possible displaced/anomalous states (503.0/503.2) of other items (100.IT) in the team (1400).

FIG. 14F

Second Exemplary Item Team and Items-Attached-To-Person

A potential challenge or concern with an item team (1400) is that all the members of an item team (1400) may be affected by the same displacement/anomalous event, influence, or environment. For example, if all the smaller items of item team (1400.1) are, at some time, contained in the purse (100.IT.P), and if the purse is lost (503.0.1), misplaced (503.0.2), misappropriated (503.0.3), wandering (503.0.5), or stolen (503.0.4), the user may no longer have any local reporting device to alert her to the displacement. (This is particularly true if the cell phone (100.IT.CP) was intended as the main personal or local reporting device.)

Item-Attached-To-Person:

In an embodiment, a solution to this is to have at least one BIRDed-item (102.IT) of the item team (1400) which is likely to be kept with the user, but which is kept apart from the other elements of the item team (1400). In an embodiment, this distinctive BIRDed-item (102.IT) may be designed to be worn by the user, and may be referred to an item-attached-to-person (102.ATP).

FIG. 14F is a drawing of elements of a second exemplary item team (1400.2).

As with the first exemplary item team (1400.1), the second exemplary item team (1400.2) includes a purse (100.IT.P) with an associated or embedded item team BIRD (200.IT.P); a set of keys (100.IT.K) with an associated item team BIRD (200.IT.K); a wallet (100.IT.W) with an associated or embedded item team BIRD (200.IT.W); and a cell phone (100.Act.CP) with internal ABIRD components and functionality (200.IT.CP).

Items-Free-From-Person:

These BIRDed-items (purse, keys, wallet, cell phone (102.IT.P/K/W/CP)) are generally carried loosely by a person in hand, in a pocket, in the purse, etc., and may also be left lying about on a desk or in a drawer when on "standby" use; collectively, they are herein referred to as Items-free-from-person (102.FFP). BIRDed-items which are free from a person (102.FFP) may still be carried about by the authorized user (AU), or be in-pocket or otherwise attached to the person intermittently or in a transitory way; but such items-free-from-person (102.FFP) may also normally be picked up and carried, and then put down again or set aside, by the authorized user (AU), in the course of normal, typical, or routine usage.

However, some other BIRDed-items (102) are generally worn on a person, and are usually kept on the person throughout an active day or working day, possibly from the time a person gets up and dresses until they retire for the evening. Such items, as noted above, are referred to generally herein as Items-attached-to-person (102.ATP). In an embodiment, a characteristic of such items-attached-to-person (102.ATP) may be that they include, as an integral structural element, a part or component which holds the item in close and sustained proximity to the authorized user (AU); or alternatively, that such an item (102.ATP) in routine use is held securely to the authorized user (AU) by some means such as a strap or belt.

Such BIRDed-items-attached-to-person (102.ATP) may include, for example and without limitation: a wristwatch (100.Act.WrW) (assumed here to be an electronic watch with processor), and jewelry such as a necklace (100.IT.N). Shown in FIG. 14F are an exemplary wristwatch (100.Act.WrW) with an associated, embedded BIRD (200.IT.WRWT), and an exemplary necklace (100.IT.NL) with an exemplary pendant, the pendant having an embedded BIRD (200.IT.NL). (In a stroke of fashion genius, the exemplary pendant happens to be designed to look appealingly like an icon for an exemplary BIRD (200), that is, a gray rectangle with a grid of rectangular lines, with the image of a bird superimposed. With such seductive design, it will surely sell by the millions. (Get yours now while supplies last. Dial 1-800 . . . ))

A user may wear one such item-attached-to-person (102.ATP), or may wear more than one. As before, each BIRD (200.IT) in the item team (1400.2) maintains communications with all other BIRDs (200.IT) in the item team through data transmission links (1405). In addition to communications between the free-from-person items (102.FFP), this includes also communication between each of the free-from-person items (102.FFP) and the item(s) attached to person (102.ATP).

The items-attached-to-person (102.ATP), such as the wristwatch (100.IT.WRWT) or the necklace (100.IT.NL) are typically kept on the person, and so are less likely to be lost or misplaced in the course of a day. They are also less likely to be stolen, and if stolen—that is, if blatantly ripped off the person's body—the authorized owner is likely to notice immediately even without the added benefits of BIRD sensing and notification.

Because the items-attached-to-person (102.ATP) are assumed to remain in close and continuous contact with the owner's body while in the field, location and motion sensing data (700) from the items-attached-to-person (102.ATP) may generally provide baseline user coordinates and motion data for other sensors (210) attached to other item team members (102.IT).

In an embodiment, one of more of the items-attached-to-person (102.ATP) may have reduced or customized BIRD elements and functionality, specifically focused on items (100) which are physically in intimate contact with the human body through most of the day. An item-attached-to-person (102.ATP) may also have reduced or customized BIRD elements and functionality to maintain small size, small weight, or reduced power consumption with associated extension of battery life.

In an embodiment, an item-attached-to-person (102.ATP) may function as a principal reporting item (102.PRI), discussed further below in conjunction with FIG. 15B. In an embodiment, an item-attached-to-person (102.ATP) may have modified or additional sensors (210), and/or sensor data filtering elements, to take into account the sustained close proximity to the human body.

For example, in an embodiment, an item-attached-to-person (102.ATP) may have two temperature sensing elements (210.T) on facing sides, one to detect body temperature, and another to detect ambient air temperature. In an embodiment, an item-attached-to-person (102.ATP) may have two audio sensors (210.AI and/or 210.AC) and/or may have suitable audio filtering hardware/software, in order to distinguish bodily sounds such as respiration, heartbeat, and/or voice from ambient environmental sounds. In an embodiment, an item-attached-to-person (102.ATP) may have suitable means for motion sensing (210.M), including suitable signal filtering, to distinguish the movement of a person's center of mass from other body movements, such as the swinging of an arm (for a wristwatch BIRD (200.IT.WRWT)) or the movement of a person's chest which is indicative of respiration (for a necklace/pendant BIRD (200.IT.NL)).

Items-Attached-To-Person and Biometric/Biomedical Monitoring

BIRD's (200) for items attached to a person (102.ATP) may also include biometric or biomedical sensors, for example, sensors to monitor pulse, blood pressure, respiration, and body temperature. Such BIRD's (200) may use the additional biometric sensors as another means to distinguish extant/normal item usage (503.1/503.3) from displaced/anomalous usage (503.0/503.2) (especially in the event that such items-attached-to-person (102.ATP) are in fact stolen). Such BIRD's (200) may also be used to warn the owner of any unexpected and potentially dangerous biomedical states which may be indicative of potential heart attack, heat stroke, or other forms of physiological distress. As elements of extended item teams (1400.EIT) (see FIGS. 14G-14H, below), such BIRDs (200.IT) with biomedical monitoring capabilities can also provide warnings to other persons on an extended team of persons that a team member is potentially in need of medical assistance.

FIG. 14G

Third Exemplary Item Team and Extended Item Teams

In an embodiment, an item team (1400) is confined to items used by a single authorized user (AU). In an alternative embodiment, an item team (1400) may also be distributed over multiple persons who typically work in substantial proximity to each other. The items (100.IT) in such a team may be referred to as extended team Items (100.EIT), belonging to an extended item team (1400.EIT). The combination of the item (100.EIT) and an associated extended item team BIRD (200.EIT) may be referred to as an extended item team member (102.EIT).

In an embodiment, an extended item team member (102.EIT) may have parameters and anomaly determination functions directed both towards a local or personal item team (1400) (as discussed above), and also towards the extended item team (1400.EIT). In an embodiment, and for purposes of an extended item (1400.EIT), the concept of "items" in the team (1400.EIT) may also be more broadly construed than elsewhere in this document, and may include, for example and without limitation:

- persons (100.EIT.PO) who together form a human team and use the team items (100.EIT); and
- supporting animals (100.EIT.PD).

FIG. 14G shows elements of an extended item team (1400.3), which is directed towards law enforcement officers. The items in the extended item team (1400.3) include a police car (100.EIT.PC), two police officers (100.EIT.PO(1/2)), a police dog (100.EIT.PD), an active weapon (100.Act.W), a police revolver (100.EIT.PR), and other police items (100.EIT.PI) such as a vest, badge, communications device, and similar.

Exemplary item team usage criteria (1417.3) for the exemplary extended item team (1400.3) are also listed in FIG. 14G. Not included in FIG. 14G is the usage of extended item team members (102.EIT) to provide monitoring of, and possible team warnings, concerning biometric indications of possible physical or medical distress.

In an embodiment, the BIRDs (200.EIT) embedded in or attached to items (100.EIT) may have special sensors (210) and or/special processors (204) or special processing capabilities which are custom-indicated or designed for the team mission(s). For example, in an embodiment, audio content sensors (210.AC) and/or specialized audio signal processors (204) from multiple police BIRDs (200.EIT) may be configured to identify the sound of gunfire. By using advanced signal processing, applied to the sound of gunshots as heard by different BIRDs (200.EIT) at different locations, it may be possible to quickly narrow down a location or direction of the gunfire, and so to find a criminal. In an embodiment, the BIRDs (200.IT) associated with the extended item team (1400.3) for the police may have audio sensors (210.AC) with enhanced directional sensing capabilities, to help identify the direction of gunfire or other pertinent ambient sounds.

FIG. 14H

Fourth and Fifth Exemplary Extended Item Teams

FIG. 14H is a drawing of two other exemplary extended item teams (1400.EIT).

A fourth exemplary item team (1400.4) is associated with a group of hikers in an outdoor terrain. Extended item team determinations appropriate for such a team may include whether or not all the hikers remain within an expected proximity to each other; whether or not any hiker is in one place or motionless for more than a threshold period of time; whether or not a hiker is exposed to extremes of temperature for longer than a recommended time period; and whether or not a hiker is prone (lying down) at a time or place other than expected. If the BIRDed-items (102.IT) worn or utilized by the hikers provide biometric measurements of pulse, respiration, body temperature, or other biometric indicators, the items (102.IT) may also signal warnings if any hikers show signs of medical distress.

A fifth exemplary item team (1400.5) is associated with a group of mountain climbers. Extended item team determinations appropriate for such a team may be similar to those for the group of hikers and their item team (1400.4), already discussed above. Additional determinations appropriate for mountain climbers may pertain to the altitude of a climber, a rate of acceleration in the vertical direction for a climber, and the integrity of rope or other items associated with mountain climbing.

Whole-Item-Team Anomaly Detection

Described throughout this document, above, are numerous exemplary BIRD logic algorithms (500) and exemplary usage expectations (600) to determine a possibility that an item (100) is displaced (503.0) (lost, misplaced, misappropriated, wandering, or stolen) or otherwise in an anomalous state (503.2). In an embodiment, in addition to employing such algorithms (500) and usage expectations (600), an item team (1400) may employ addition usage expectations (600) to determine the extant/normal (503.1/503.3) vs. displaced/anomalous (503.0/503.2) state of the item team as a whole. Some exemplary, whole item-team usage expectations (600) may include, for example and without limitation:

- Required team members: The item team (1400) may be configured to include an established set of required, specific items. By mutual RF query, the team (1400) may determine that one or more specific items are not being carried as part of the team.
- Optional team members: The item team (1400) may be configured to identify additional, optional items which are sometimes carried and sometimes not. The team may be configured—either via user configuration, or via automated learning—to determine times, places, or other detection context (123) criteria which indicate when a particular item (100.IT) should be carried. The team may then be configured to identify and flag occasions/contexts when an optional item should be present, but is not. In an exemplary embodiment, the team (1400) may identify and flag when an optional item that was recently carried with the team is not being carried with the team.
- Number of items: The constituents of an item team (1400) may be fluid, with no one fixed set of items being carried. However, there may be a typical number of items to be carried with the team. The team can flag if more or fewer items are present.
- Amount of Item activity: The item team (1400) can monitor activity usage of each item within the team, and can flag when a particular item is experiencing an unusual period of lower activity than normal, or higher activity than normal.

User-Initiated Item Location Tracking or Status Checks

In an embodiment, a BIRDed-item (102) is generally configured to self-assess as being lost or misplaced even if the authorized user (AU) has not yet noticed the absence of the BIRDed-item (102). Sometimes, however, an authorized user (AU) may notice the absence of an expected item (100) before the BIRDed-item (102) has self-assessed as being lost (503.0.1), misplaced (503.0.2), stolen (503.0.4), etc.

In an embodiment, a BIRD (200) such as one associated with a cell phone (100.Act.CP) or an item-attached-to-person (102.ATP), may be configured to make user-initiated contact with other members (102.IT) of an associated item team (1400). For example, the authorized user (AU) may attempt to send a signal from his or her cell phone (100.Act.CP) to the a target team member (102.IT) which the user has identified as being lost (503.0.1) or misplaced (503.0.2) (or possibly misappropriated (503.0.3) or stolen (503.0.4)). If the target team member (102.IT) is within range of the communication, the target team member (102.IT) may be configured to then report its current, specific location (104.L) to the cell phone (100.Act.CP); the mapping features of the cell phone (100.Act.CP) may then guide the authorized user (AU) to the target member (102.IT) of the item team (1400).

Similar protocols may also enable an authorized user (AU) to make other types of status checks of item team members (102.IT), via a cell phone (100.Act.CP), item-attached-to-person (102.ATP), or even a configuration computer (335) with suitable remote communications capabilities.

FIG. 14I

RFID Support for Item Teams

In an embodiment, some items (100.IT) in an item team (1400) may be monitored in whole or in part via RFID tags (1409). This may provide, among other benefits, a means to include some items (100) in an item team (1400) where the full functionality of a BIRD (200) is not required, is too costly, or is not appropriate for reasons of size or weight or other considerations. The RFID tag (1409) provides proximity data, and possibly other data, for the minimally-monitored item (100.altM), and more specifically, the RFID-tagged item (100.RFID), with which it is associated or coupled. However, actual determination of a displaced/anomalous state (**503.0/

503.2) of the RFID-tagged item (100.RFID) is not performed by the RFID tag (1409), but rather by a BIRD (200.IT) associated with another item (100.IT) of the item team (1400). Put another way: an item (100) with only an RFID tag (1409) attached is not equipped for a self-assessment of its own state as extant/normal (503.1/503.3) on the one hand, or displaced/anomalous (503.0/503.2) on the other hand. However, if included within the scope of an item team (1400), the RFID-tagged item (1303) may have the assessment made on its behalf by another BIRDed-item (102.IT) within suitable range.

FIG. 14I is an illustration of an exemplary item team (1400.6) which is partly implemented using RFID tags (1409).

In the exemplary item team (1400.6), the purse (100.IT.P), the keys (100.IT.P), and the cell phone (100.Act.CP) maintain item team functionality through the use of attached or integrated BIRDs (200.IT.P, 200.IT.K, 200.IT.CP). The purse, keys, and cell phone maintain item team interaction through RF links (1405). These elements have been discussed above, and the discussion will not be repeated here.

Also included in the exemplary item team (1400.6) are a wallet (100.IT.RFID.W) and eye glasses (100.IT.RFID.S), which do not have associated or integrated BIRDS (200). However, both items have RFID tags (1409.1, 1409.2). The wallet (100.IT.RFID.W) has RFID Tag 1 (1409.1), which may be built into the wallet as part of its construction, or may be attached to the wallet by an authorized user (AU). Similarly, the glasses (100.IT.RFID.S) have RFID Tag 2 (1409.2), which may for example be built into the frame of the glasses, or may be attached to the frame by the authorized user (AU). (The RFID tags 1409 shown in the figure—and in particular, the RFID tag (1409.2) associated with the glasses (100.IT.S)—are not necessarily drawn to scale, and are shown in symbolic form only. Tags (1409) are available which can be readily incorporated, inconspicuously, into the frames of many eye glasses, as well as into wallets.)

At least one of the BIRDs (200.IT) associated with the item team (1400.6) will have RFID interrogator technology. For example, in item team (1400.6), the BIRD (200.IT.P) associated with the purse (100.IT.P) has built-in RFID interrogatory technology (210.RFID) (not shown; see discussion associated with FIG. 2A, above, for more discussion of RFID sensors/interrogators in BIRDs).

Using its RFID interrogator (210.RFID), the purse (100.IT.P) and associated BIRD (200.IT.P) can periodically interrogate (that is, "ping") both the wallet (100.IT.RFID.W) and glasses (100.IT.RFID.S). The RFID interrogator (210.RFID) transmits RFID signals (1407) to determine whether or not these items are within RFID-pinging range of the purse (100.IT.P). If the wallet (100.IT.W) or glasses (100.IT.S) fail to return a suitable signal when pinged, the BIRD (200.IT.P) may identify the wallet or glasses as possibly being in a displaced (503.0) or anomalous (503.2) condition.

In an embodiment, the BIRD (200.IP) with the RFID interrogator may be the principal reporting item (102.PRI), as discussed further below in conjunction with FIG. 15B.

In an embodiment, in addition to using standard RFID tags (1409), an item team (1400) may also employ WISP (wireless identification and sensing platform) RFID tags to obtain data such as temperature, acceleration, and sound and/or light intensity for the item (100.IT.RFID) to which the WISP RFID tag is attached. Such data may be put to additional uses in assessing the state of either the item (100.IT.RFID) to which the WISP RFID tag is attached, or the state of the entire item team (1400), or both.

Additional Item Team Embodiments

BIRDed-Item with RFID Tag Backup

In embodiments of item teams (1400) above, team members (100.IT) are equipped with either a BIRD (200) (to establish a BIRDed item (102.IT)) or an RFID tag (1409) to create an alternatively-monitored item (100.altM). In an alternative embodiment, an item (100.IT) may have an associated BIRD (200) to establish a BIRDed-item (102); but the item (100) may also have an RFID tag (1409) or other technology suitable for at least minimal monitoring of the item (100.IT) by the item team (1400). The RFID tag (1409) (or other technology suitable for minimal monitoring) may be used, for example, to provide redundancy and backup in case of BIRD failure.

Common Usage Specification Data

In an embodiment, many members (100.IT) of an item team (1400) may tend to share significant elements of their usage expectations (600). In an embodiment, such shared usage expectations (600) may be stored on a common data processing technology, for example, on a configuration computer (335). The shared usage expectations (600) may be custom edited for individual items (100.IT), and may be downloaded from the common data processing technology to the individual item team members (100.IT) as appropriate.

Systems without Full BIRD Technology, but with Partial Item Team Functionality

In an embodiment, two or more conventional communications oriented devices, such as for example cell phones or PDAs—which are conventionally implemented without any of (or without most of) the other BIRD-specific technologies and algorithms discussed throughout this document—may be still configured to function similarly, in part, to a BIRD item team (1400). The conventional communication technologies may do so by using their available technology to implement a subset of BIRD item team functionality. The items so assembled, and so operating, may be referred to as a pseudo-item-team.

In a first such exemplary embodiment, two communications devices may be configured to maintain substantially continuous, real-time communication of their locations. (The communications device locations may be determined via GPS or other existing locationing systems.) The communications devices may be configured such that when a first device determines the second device is beyond a predefined, acceptable distance, the first device determines that displaced/anomalous usage (503.0/503.2) may be in progress for the second device or for itself.

In a second such exemplary embodiment, two communications devices may be configured to maintain substantially continuous, real-time communication of their motions (as determined via internal motion sensors or fine-grained use of location sensors, or other means). The communications devices may be configured such that when a first device determines the second device is engaged in substantially different motion from itself, displaced/anomalous usage (503.0/503.2) may be in progress.

In a third such exemplary embodiment, the two communications devices may be configured to maintain substantially continuous, real-time, direct radio frequency (RF) communications; "direct communications" are RF interactions which are not mediated through a third-party communications infrastructure (for example, not mediated through a cell phone network nor through the internet). The devices may be configured to maintain such direct communications through a device-to-device protocol, or at a device-to-device transmission level, which results in a relatively limited inter-device communications range (for example, a few dozen yards, no more than a kilometer or a mile, etc.). Protocols such as Bluetooth or WiFi may be employed for these purposes. The communications devices may be configured such that when a first device determines the second device is no longer in communication, or when signal strength or signal quality has fallen below a pre-defined level, a determination is made of possible displaced/anomalous usage (503.0/503.2).

In a fourth exemplary embodiment, one (or more) member (s) of the pseudo-item-team may have RFID readers, while at least one other item of the pseudo-item-team may be equipped with an attached RFID tag. The RFID reader may periodically interrogate the RFID-tagged item. If an appropriate RFID signature is received in reply, the reader determines that the item (100) remains in appropriate range. If the appropriate RFID signature is not received, the reader determines that displaced/anomalous usage (503.0/503.2) of the RFID-tagged item may be in progress.

FIG. 15A

Integration with Location Beacons and Location Data Streams

A BIRDed-item (102), whether operating by itself or as part of an item team (1400), may have its operations enhanced by drawing on data from external data sources (1507). Some data sources (1505) may be non-local, for example, data drawn from a wireless internet connection or other wireless connections, or satellite-based, which may provide location information (for example, GPS), weather information, or similar data. Other data steams (1507) may be drawn from localized, area-specific data streams, for example RF or infrared data streams which may be broadcast from item-proximate location beacons (1507). The location beacons (1507) are envisioned as being integrated into buildings, facilities, transportation devices, storage units, and so on.

Beacons, Locations with Beacons, and Beacon Data Streams:

FIG. 15A is an illustration of various exemplary locations (104.L)—here labeled as "1505"—that are sources of external location data streams (1507), including physical location beacons (1507). The locations (1505) and sources (1507) illustrated are exemplary only, and should not be in any way construed as limiting.

Terminology:

Below in this document, the label "1505" is used to refer both to: (i) locations (104.L) with location beacons (1507), and (ii) other data stream resources (for example, internet data services and data service providers). Both the physical broadcast elements (beacons) and their location data streams (with actual location data content) are referenced as "1507." Data may be radio frequency, but may be transmitted by other means as well, such as infrared light, etc.

In an embodiment, a BIRD (200) is a passive receiver of location data (1507). In an alternative embodiment, a BIRD (200) may work interactively with a location beacon (1507), both broadcasting data to a beacon (1507) and receiving data from a beacon (1507), to optimize the identification of the BIRD's location.

To reduce visual clutter in FIG. 15A, only some of the locations and data sources (1505) are illustrated with beacons (1507), but it may be assumed that beacons (1507) are associated with all the locations/sources (1505).

The exemplary locations (104.L) that are data sources (1505) with location beacons (1507) include:

- Business or shops with environment reporting elements (1505.B1-B5). A BIRD (200) may use these to determine its location even if other data sources (such as GPS) are unavailable. In addition, the local reporting elements may include specific information not available via GPS, such as specific businesses within a building, or specific floors, specific departments, etc.
- Similar examples include specific hospital departments (1505.H1-H4) or other medical facility departments which may provide data streams, or specific warehouses or storage facilities (1505.S1-S3) at a storage center.

Such department, floor, unit, or other zones—(140.Z)—within-a-facility data streams may provide specific information which enables a BIRD (200) to determine if it is in an appropriate environment or not. For example, an item (100) designated for use in a specific facility may be authorized or intended for use in some departments or sections, but not in others.

- Lockers, such school lockers (1505.L1-L4) with wireless environment reporting elements, may self-identify to a BIRD (200). This may help a BIRDed-item (102) to determine if it has "drifted"—accidentally, or otherwise—into the possession or control of a student other than an authorized student. Dorm rooms (not illustrated) may also be equipped with similar wireless self-identification. Even rooms in a private home or apartment may be equipped with wireless self-identification, to help determine the precise location of a misplaced item.
- Weather data streams (1505.W) may be employed to help an item (100) determine if it may be subject, in the imminent future, to in element conditions in its current environment.
- Exits and Entrances with environment reporting elements (1505.EE) help a BIRD (200) determine when it is leaving or entering a facility. If the item (100.IT) is part of an item team (1400), the item (100.IT) is potentially alerted that other team members (102.IT) should possibly be leaving or arriving at the same time. (See the discussion of loss/theft prediction, below, in conjunction with FIGS. 16A-16B.)

In one implementation of the environmental reporting system, an entrance/exit may be augmented with a plurality of RF elements, either active RF transmitters or passive RFID tags; in either implementation, some RF elements are deliberately positioned inside a building or facility, while others are positioned outside the building or facility. This supports a BIRD (200) in determining a direction of its transit, from outside to inside, or vice versa.

- Security cameras with environment reporting elements (1505.SC) can serve as additional or supplemental location reporting elements. In addition, a security camera (1505.SC) may be configured to transmit, to nearby BIRDs (200), the images being recorded by the camera (1505.SC). With some fine-tuned, possibly two-way location detection and determination, a camera (1505.SC) can send to a BIRDed-item (102) an image of the current-user as the user comes within the view of the camera.

User Identification Assessment:

In an embodiment, a BIRD (200) may be configured with image-processing software which compares the image sent to it by the security camera (1505.SC) with a pre-programmed image of an authorized user (AU) of the BIRDed-item (102). If the two images do not match, the BIRD (200) may take appropriate action to signal that the item (100) may possibly be in the hands of an unauthorized user (UU).

In an alternative embodiment, image processing tasks may be off-loaded to the security camera (1505.SC) or supporting computers (not shown). The camera (1505.SC) may send a request to a BIRD (200), requesting an image or images of the authorized user (AU) of the BIRDed-item (102). Upon receiving the image(s), the camera (1505.SC) (or supporting processor) compares the image(s) of the authorized user (AU) with the image of the person actually in view of the camera (1505.SC). In an embodiment, if the two images do not match, the camera (1505.SC) can send a signal or message to appropriate authorities that a possibly unauthorized possessor of an item (100) is in view. In an embodiment, an ABIRDed-item (102.Act) may also be configured to receive security notifications from authorized public devices, telling the ABIRDed-item (102.Act) to take appropriate security measures.

Transportation (roads) with environment reporting elements (1505.T) can serve as additional or supplemental location reporting elements. In addition, the roadway communications system may report on other pertinent data, such as local traffic speeds. If a BIRDed-item (102) determines that it is on a road, but moving much slower than the reported local traffic speed, that may be an indication that the car or driver is in distress. Or a roadway may signal that it is entirely clear, but a BIRDed-item (102) may determine it is completely stationary (139.Stat) or even motionless for more than some expected period of time. This may again indicate a car or driver in distress, and may result in the transmission of an emergency signal.

Environmental reporting elements may also be used for error checking and calibration of BIRD sensors (210). For example, the temperature reported by BIRD sensors (210.T) may be compared to localized temperature reporting, motion sensors (210.M) may be compared against data reported by highway or automotive sensors, and diverse location sensors (210.L) may be cross-checked against each other.

Other possible location-specific, active data sources (1505) which may support a BIRDed-item (102) include, for example and without limitation:

- Airport locations and facilities with environment reporting elements (1505.A1-A2)
- Luggage handling facilities with environment reporting elements (1505.A2)
- Buses with environment reporting elements (1505.MTB)
- Bus stops with environment reporting elements (1505.MTBS)
- Trains with environment reporting elements (1505.MTT)
- Train stations with environment reporting elements (1505.MTTS)

FIG. 15B

Exemplary Principal Reporting Item

In an embodiment, at least one member (102.IT) of an item team (1400) may be configured as a principal reporting item (102.PRI) of the item team (1400). In an embodiment, the principal reporting item (102.PRI) is an active item (100.Act), which may also be an item-attached-to-person (102.ATP). The purpose of the principal reporting item (102.PRI) is to have at least one team member (102.IT) which is likely to remain within the control of an authorized owner or user, and to remain functional, even if other items (100.IT) in the item team (1400) have become separated from the authorized owner, or otherwise display signs of displaced/anomalous (503.0/503.2) environment, usage, or ownership.

In addition to being an item-attached-to-person (102.ATP), a principal reporting item (102.PRI) will typically benefit from having an internal ABIRD (200.Act.I). In an embodiment, the principal reporting item (102.PRI) will have low power usage and corresponding long battery life. In an embodiment, the principal reporting item (102.PRI) is configured to have local signaling (230) which is highly likely to draw the attention of the authorized user (AU) in the event that some other item (100.IT) in the item team (1400) provides indications of a possible anomaly. For example, the principal reporting item (102.PRI) may have a vibrator signaling element (230.V) which is in direct contact with the authorized user's skin.

In an embodiment, then, and in summary the principal reporting item (102.PRI):

(1) is an active item (100.Act);

(2) is an item-attached-to-person (102.ATP);

(3) incorporates an internal ABIRD (200.Act.I); and . . .

(4) is designated as a primary device for monitoring other members (100.IT) of the item team (1400).

It will be noted that, in such an embodiment, the principal reporting item (102.PRI) is also an ABIRDed-item (102.Act.I) with an internal ABIRD (200.Act.I).

Exemplary Principal Reporting Item and Environmental Interactions

FIG. 15B is a drawing of three different exemplary interactions (1510, 1525, 1530) between a principal reporting item (102.PRI) and either an environment with a data stream (1505) and/or other members (100.IT) of an item team (1400).

Exemplary interaction 1510 illustrates how a principal reporting item (102.PRI) may interact with data streams from a public transportation system. The exemplary principal reporting item (102.PRI) illustrated is a wristwatch (100.Act.WrW) with a dedicated BIRD display (282.D). When the authorized user (AU) steps on board a bus (1505.MTP), a data stream from the bus (1505.MTP) signals the wristwatch (100.Act.WrW) that it is on board the bus.

Additionally, an active news data stream or weather data stream may signal the wristwatch (100.Act.WrW) that it is currently raining. Based on pre-programmed usage expectations (600), and specifically in view of the fact that it is raining, the wristwatch (100.Act.WrW) is programmed to "assume" that the authorized user (AU) is carrying an umbrella (100.S). (If the user has an umbrella (100.S) with an associated BIRD (200), the umbrella (100.S) may be part of an item team which is actively signaling its presence to the wristwatch (100.Act.WrW).)

When the bus (1505.MTP) approaches a bus stop (1505.MTBS), either the bus (1505.MTP) or the bus stop (1505.MTBS) provide a signal, telling the wristwatch (100.Act.WrW) of the approach to the bus stop. In an embodiment, at each approach to a bus stop, the wristwatch (100.Act.WrW) may signal the user to "Take Umbrella." In an alternative embodiment, the wristwatch has been preprogrammed (100.Act.WrW) by the user to know the bus stop(s) at which the user is likely to get off the bus. The wristwatch (100.Act.WrW) only signals the user to "Take Umbrella" at the user's likely stop(s). In an alternative embodiment, the wristwatch (100.Act.WrW), and/or other members of the item team (1400), maintain an ongoing observation of the user's movement patterns over time; the watch and/or other members of the item team (1400) determine which bus stop(s) are the ones the user is most likely to use to exit from the bus. The watch (100.Act.WrW) then signals the user to "Take Umbrella" at those stops.

In an alternative embodiment, the watch (100.Act.WrW) may detect or determine its presence on the bus not through a data stream, but through other sensor parameter determinations, such as changing location (mapped to stored bus route (s)), velocity, and acceleration determinations). Even data from an audio sensor (210A), such as identification of bus engine sounds, may contribute to a determination of presence onboard a bus. Similarly, the arrival or approach to a bus stop may be determined via location determinations via GPS or similar.

Exemplary interaction 1525 illustrates how a principal reporting item (102.PRI) may interact with data streams from entrances or exits to a facility, such as a building or section/wing/department of a building. The exemplary principal reporting item (102.PRI)—again, in this instance, a wristwatch (100.Act.WTCH)—is pre-programmed or pre-configured to remind the user to take certain items (100), such as a purse, keys, cell phone, and wallet. (Illustrated are successive stages of a scrolling message to the user.) The messaging may be employed whether or not the listed items (100) have BIRDs (200) associated with them.

Exemplary interaction 1530 illustrates how a principal reporting item (102.PRI) may interact with another member (100.IT) of an item team (1400), and possibly with local data streams (1505). An authorized user (AU) with her watch (100.Act.WrW) and cell phone (100.Act.CP) may visit a first business facility (1505.B1), for example a veterinary office. Upon picking up her dog (D), the authorized user (AU) is so happy to have her dog (D) back from the vet, she forgets her cell phone (100.Act.CP).

The authorized user (AU) walks her dog (D) down the street. By the time she is in the vicinity of a second business (1505.B4), the cell phone (100.Act.CP) and/or the watch (100.Act.WrW) may determine in any of several ways that the cell phone has been left behind. For example, the cell phone (100.Act.CP) may make an auto-determination that it has been lost (503.0.1), based on methods discussed at length earlier in this document. Alternatively, the cell phone (100.Act.CP) may determine based on location data, or based on a data stream from the veterinarians' office (1505.B1), that it is at the veterinarian's office; while the watch (100.Act.WrW) determines based on location data, or based on a data stream from the nearby business (1505.B4), that it is no longer at the veterinarians' office.

Once it has been determined that the cell phone (100.Act.CP) and the watch (100.Act.WrW) are no longer at the same location, the watch signals the authorized user (AU) that she has forgotten the cell phone (100.Act.CP) at the vet's office (1505.B1). (Not illustrated is how unhappy is the dog (D) to return to the veterinarian's office (1505.B1) for even a short time.)

Anomalous Item Anticipation, Prediction and/or Prevention

One general goal of the present system and method is identifying when an item (100) is in a possibly displaced/anomalous state (503.0/503.2) (anomalous usage, anomalous environmental context, and/or anomalous internal operations or conditions), which may for example indicate the item is lost (503.0.1), misplaced (503.0.2), misappropriated (503.0.3), wandering (503.0.5), or stolen (503.0.4). System and method elements directed to this goal are discussed at length throughout this document. However, in an embodiment, the system and method seeks to anticipate and prevent an item (100) from being displaced (503.0) (lost, misplaced, misappropriated, wandering, or stolen) or otherwise entering into an anomalous state, usage, or environment (503.2).

FIG. 16A

Exemplary Elements of Lost Item Anticipation/Prediction/Prevention

Some elements directed towards the anticipation and prevention of a extant/normal item state (503.1/503.3) have already been discussed immediately above, in conjunction with FIG. 15B. FIG. 16A presents drawings of further exemplary elements associated with the anticipation, prediction, and/or prevention of displaced/anomalous item states (503.0/503.2), usage, or entrance into an anomalous environment.

In FIG. 16A, BIRDed-item (102) represents any item (100) in combination or association with a BIRD (200). The BIRDed-item (102) may be any of: a passive item (100.Pass) physically tethered to an associated BIRD (200), or with an integrated BIRD (200); or an active item (100.Act) tethered to an external-active-item-BIRD (200.Act.E); or an active item (100.Act) with an integrated, internal-active-item-BIRD (200.Act.I).

Certain factors are likely to be associated with the anticipation or prediction that a BIRDed-item item (102) which is not currently lost (503.0.1), misplaced (503.0.2), misappropriated (503.0.3), wandering (503.0.5), or stolen (503.0.4) may become lost (503.0.1), misplaced (503.0.2), misappropriated (503.0.3), wandering (503.0.5), or stolen (503.0.4). These factors include, for example, and without limitation, elements related to:

- date/time: the time of day, week, month, or year, as determined by the BIRD's clock/calendar/timer (208);
- environment: the current external ambient environment (104), as determined by sensors (210) or data streams (1505), such as a weather data stream (1505.W):
- location: the current location of the item (102) as determined via location sensors (210.L), possibly in combination with location data streams (1505);
- motion: the current state of motion of the item (102) as determined by motion sensors (210.M);
- visible or hidden: whether an item is stored outside (in plain view) of a storage compartment or container, making it a visible item (102.*v*); or whether the item is stored in some internal storage compartment or container (hidden from view), making it a hidden item (102.*h*), as determined by an optical sensor/camera (210.Opt/C/V), a temperature sensor (210.T), an electromagnetic sensor (210.E), a data stream (1505), or other means.

An authorized user (AU) or other BIRD administrator can configure suitable BIRD song (900) (for example, via usage expectations (600)), to be run on processor (204)) to trigger warnings or alerts (372, 374) if an BIRDed-item (102) appears to be at risk of becoming displaced (503.0) or otherwise found in an anomalous state (503.2).

Locker Example

Illustrated in FIG. 16A is a locker (1505.L). Lockers may be either in a state of being open or closed. Suppose a user (not shown) approaches the locker and opens it. Then items (102.*v*) within the locker are visible to the user; the user can see the items (102.*v*), and immediately identify those items he or she should have in possession on their person. However, if a locker is closed, the items (102.*h*) in the locker are internal and hidden from view. The visible items (102.*v*) and the hidden items (102.*h*) can self-identify as being in-view or hidden, based for example on the amount of light detected by their respective optical sensors or cameras (210.C). If the locker (1505.L) is configured with intelligent electronics, the hidden items (102.*h*) may also self-identify as being in-view or hidden, based for example on a signal sent to them by locker (1505.L), indicating that the locker door is closed.

As the authorized user (AU) approaches the locker or is in proximity to the locker (1505.L), a principal reporting item (102.PRI) (not shown) which is worn by the user, and also items in the locker (102.*h*/102.*v*), can mutually self-identify each other. Suppose the user then leaves proximity of the locker (1505.L); this may be determined by location monitoring or by a data stream (1505.L) associated with the locker, or by other means.

For items which are visible (102.*v*), it may be determined, through BIRD logic (500) and appropriate usage expectations (600), that no warning will be issued of possible displaced/anomalous usage (503.0/503.2).

However, for items which are hidden from view (102.*h*), BIRD logic (500) in conjunction with appropriate usage expectations (600) may trigger an advisory to the authorized user (AU), via the principal reporting item (102.PRI), that there is some risk he or she is about to leave behind an item (102.*h*).

Suitable detail may be included in the usage expectations (600) to indicate that an amount of time the locker (1505.L) was open, or how recently the locker was open, may influence the determination of whether to issue an advisory to the user.

Other Exemplary Visible and Hidden Item Contexts

Similar considerations apply to hidden items (102.*h*) and visible items (102.*v*) which may potentially be stored in other kinds of storage units or compartments, such as a dresser (1505.D), which may include internal, drawer-associated data streams to help identify specific drawers. Similar considerations might apply to desks, filing cabinets, and other storage systems (not shown).

Transportation Context Examples

Discussed above, in association with FIG. 15B, was the use of data streams in conjunction with entrances and exits (1505.EE), and with transportation such as metro buses with environment reporting elements (1505.MTB), metro bus stops with environment reporting elements (1505.MTBS), metro trains with environmental reporting elements (1505.MTT), and metro train stations with environment reporting elements (1505.MTTS). The reporting elements (1505) can assist BIRDs (200) in identifying their exact location, and providing other pertinent environmental data. If data streams (1505) are not available, a BIRD (200) may compensate to varying degrees via analysis of data from the sensors (210).

In either case, suitable usage expectations (600) may be employed, either within a single BIRD (200) or across the members (102.IT) of an item team (1400), to determine a likelihood that certain items (102) are at risk of becoming displaced (503.0) or otherwise subject to an anomalous state (503.2). Suitable warnings may then be issued to a user.

Typically contexts where a user is at risk of leaving an item behind include, for example and without limitation: mass transit or mass transit stops (1505.MTB/MTBS/MTT/MTTS) where person gets off a bus or metro; and entrances and exits (1505.EE), particularly if/when a member (102.IT) of an item team (1400) is separated by more than a configurable distance from other members (102.IT) which are clustered together.

Configuring a BIRD for Anomalous Item Anticipation

In programming or configuring a BIRD (200) for anomalous item anticipation/advisory, a user may be assisted by various GUI means, for example, a configuration wizard. For example, a wizard could present a survey to an authorized user (AU), with the survey including various questions about item usage, and also about the user's habits. Exemplary survey questions might include, for example and without limitation:

Do you most tend to forget items when: (a) leaving home, (b) leaving work, (c) leaving your car, (d) leaving public transportation, (e) leaving a friend's home, (f) leaving theaters or sporting events, (g) leaving school, (h) leaving public places intended for the consumption of food and/or beverages?

Do you most tend to forget items: (a) in the mornings, (b) during the afternoons, or (c) during the evenings?

Based in whole or in part on user responses to these questions and similar questions, the wizard could then program or fine-tune usage expectations (600) for anomalous item anticipation/advisory.

FIG. 16B

Exemplary Elements of Lost Item Anticipation/Prediction/Prevention

FIG. 16B presents a table of exemplary prediction usage factors (1620) which may be a basis for, and/or an element of, usage expectations (600) to predict a possibility of future BIRDed-item (102) loss/misplacement. Accompanying the usage factors (1620) are exemplary data sources (1625) for defining or determining the values, limits, or boundaries of the prediction usage factors (1620). The prediction usage factors listed (1620), as well as the possible data sources (1625), are exemplary only, and should not be construed as limiting in any way. The exemplary prediction usage factors (1620) may include:

General Item Usage and Character Factors (1630)

User-specified high risk: Any item (102) which a user believes they may easily lose, misplace, or risk having stolen may be flagged or specified by the user as an item with a higher probability of loss, misplacement, or theft. The higher probability may then lower the threshold at which other applicable factors trigger an advisory to the user to keep an eye on the item.

Hand carried vs. container carried: Items (102) hand-carried vs. carried in pocket or purse. In an embodiment, items which are carried in a pocket, purse, backpack, or similar container item (1700) are less likely to be lost (503.0.1) or misplaced (503.0.2) (unless, the carrying element (1700), such as the purse (100.P), is itself misplaced). Items which are sometimes or generally carried in hand are more likely to be set down "for a moment," only to be forgotten when a user moves on to some other location. In an alternative embodiment, a user may specify that the container-carried items are at higher risk.

Frequency of being carried with the authorized user: Items (102) may be distinguished between those which are carried on-person (138.OnP) regularly, versus those which a person only carries occasionally. A user may specify which type of item (102) they think they are more likely to lose or forget, or the BIRD (200) may make such a determination by analysis of user/item behavior over time.

Frequency of use when on-person: Items (102) may be distinguished between those which are used constantly (when on-person (138.OnP)) versus those which are used infrequently (even when on-person (138.OnP)). A user may specify which type of item they think they are more likely to lose or forget, or the BIRD (200) may make such a determination by analysis of user/item behavior over time.

Item size: Items (102) may be distinguished between those which are large versus those which are small. A user may specify which type of item they think they are more likely to lose or forget, or the BIRD (200) may make such a determination by analysis of user/item behavior over time.

General usage vs. context-specific usage: Items (102) may be distinguished between those which are used routinely versus those only in conjunction with specific contexts or events (for example, rain, snow, hot weather, visits to special expected locations (144.L), etc.). A user may specify which type of item they think they are more likely to lose or forget, or the BIRD (200) may make such a determination by analysis of user/item behavior over time.

Item Location and Context Factors (1635)

The probability or risk that an BIRDed-item (102) may be lost or misplaced by a user, or stolen or misappropriated by another person, may be influenced by, among other factors:

Approach by the user to entrances or exits;

Removal or insertion of the item (102) into storage;

Occasions when the user leaves or boards a car or mass transit;

Occasions when the user enters or exits specific locations (104.L);

Low ambient light levels;

Very active, busy, or crowded environments (which may be determined by, among other elements, ambient sound levels recorded by the BIRD audio sensors (210A1, 210AC) and various visual cues recorded by the BIRD cameras (210.C, 210.V));

The time of day;

Whether the user is indoors vs. outdoors.

Current Item Usage and Recent Item Usage Factors (1640)

The probability or risk that a BIRDed-item (102) may be lost or misplaced by a user, or stolen or misappropriated, may be influenced by, among other elements:

If the item (102) is being used more than usual or less than usual. This can be based on a comparison by the BIRD (200) of current usage with stored analysis of long-term sensor data;

If the item (102) is being used at unexpected times;

If the item (102) is being used at unexpected locations (104.L).

Current Item Storage or Placement (1645).

The probability or risk that a BIRDed-item (102) may be lost or misplaced by the user, or stolen or misappropriated, may be influenced by, among other elements:

A member (102.IT) of an item team (1400) which is stored separately from other items in the team may be at elevated risk to be forgotten by a user;

An item team member (102.IT) which is used separately from other items in the item team (1400) may be at an elevated risk to be forgotten by a user.

An item (102) set down on a table, or otherwise left stationary (139.Stat) or even motionless, may be at an elevated risk to be forgotten by a user.

An item (102) which is set aside while in use may be at an elevated risk to be forgotten by a user.

Current State or Situation of the Owner or Authorized User (1650)

The probability or risk that a BIRDed-item (102) may be lost or misplaced by the authorized user (AU) may be influenced by, among other elements:

Possible lack of sleep for the user; This may be determined by the BIRD (200) in part via extended, ongoing usage of item(s) by the user, without an interval for the user to rest.

Possible informal social environment or otherwise distracting environment: This may be determined by the BIRD (200) in part via analysis of motion data and acceleration data (a staggering user is a possibly forgetful user), optical data and audio data (for example, visual and auditory data indicative of locations of alcohol consumption), and possibly chemical sensor data. Expected locations (144.L) which are known to present informal social environments may also be preprogrammed by the user or by other parties.

Additional Considerations

It will be recognized that specific criteria, usage expectations (600), suitable parameters, and parameter thresholds for predicting a possibility of item loss or misplacement will necessarily vary from item to item. It will also be recognized that, generally speaking, some or all of the criteria which may be applicable to item loss prediction may also be applied to determinations that an item (100) has already been lost (503.0.1), misplaced (503.0.2), misappropriated (503.0.3), is wandering (503.0.5), or is stolen (503.0.4). In general, however, usage expectations (600) and specific data thresholds will tend to be different for loss prediction vs. lost/misplaced/stolen determinations.

In some instances, a single prediction usage factor (1620) ("PREDUS") may be configured (via usage expectations (600)) to serve as a critical prediction factor. A critical prediction factor is one which, if satisfied by environmental conditions, will be sufficient by itself to trigger the BIRD (200) to present an advisory to an authorized user (AU) to manually check the state of an item.

For example, a critical prediction factor may refer to a stored list of certain mass transit stops (train or bus stops) where the user is likely to exit from mass transit. The critical PREDUS may indicate that, any time the user is commuting and is approaching one of the stops on the list, the BIRD (200) will issue an advisory reminding the user to take certain items, such as a purse or cell phone.

In other cases, usage expectations (600) may require a combination of PREDUS factors (1620) to trigger an advisory to a user to manually check an item.

An example of a combination of prediction usage factors (1620) is presented here, in pseudocode form:

```
item_list = (cell phone, keys, wallet)
for count = 1 to size_of(item_list);
    current_item = item_list(count);
    if (!colocated_with_user(current_item)) &
        leaving_time(current_time_of_day, leave_time,
        time_range) & user_movement(approaching_exit));
    then item_loss_risk_advisory(current_item);
next count;
```

The pseudocode fragment first defines a list of items. In the code sample shown, the items are specifically identified. However, items may be identified by other means, such as selecting all small items, all items which are often not carried in pocket or purse, or similar criteria.

The pseudocode fragment then evaluates each item in the list in turn. For each item, the pseudocode determines if the item is not currently collocated with the user.

If:
(i) the item is not currently collocated with the user; and
(ii) the current time of day falls within a specified range of the time the user leaves a location; and
(iii) the user is currently approaching the exit; then:
an advisory is issued that the item is at risk of being lost or misplaced.

The issued advisory may take the form of a sound or visual signal issued directly by the BIRDed-item (102) at risk of being lost (503.0.1) or misplaced (503.0.2); if the item (102) is part of an item team (1400), the issued advisory may in addition or in the alternative take the form of a sound or visual signal provided by a principal reporting item (102.PRI) which is reliably worn by the authorized user (AU).

The pseudocode shown is exemplary only, and many other examples of suitable code may be envisioned. The pseudocode may in practice be implemented via any number of known programming languages, including for example and without limitation C, C++, Java, Pearl, and others.

Methods for Predicting Possible Item Misplacement, Loss, or Theft

In an embodiment, the processes or methods by which a BIRDed-item (102) may identify itself as being at risk of becoming lost (503.0.1), misplaced (503.0.2), misappropriated (503.0.3), wandering (503.0.5), or stolen (503.0.4) is similar to the processes by which the BIRDed-item (102) identifies itself as already being lost (503.0.1), misplaced (503.0.2), misappropriated (503.0.3), wandering (503.0.5), or stolen (503.0.4), but with suitable modifications.

With reference to method 300 (FIG. 3A) and method 306 (FIG. 3B), the BIRDed-item (102) is configured for expected item behavior and/or environments or behaviors which signal a risk of being displaced/anomalous (503.0/503.2). With reference to method 320 (FIG. 3C), step 322 (coupling the item (100) and BIRD (200)) is applicable if the BIRD (200) is a separate physical unit from its associated item (100). Environmental monitoring (324), item usage by the user (326), and signaling by the BIRD (328) remain applicable. The configuration of the BIRD (200) for item anticipation/prediction may take place at the time the BIRD (200) is configured to determine that the item (100) has been lost (503.0.1), misplaced (503.0.2), misappropriated (503.0.3), wandering (503.0.5), or stolen (503.0.4), or the configuration may take place at a different time.

As per FIG. 3D, the item (100) may be configured via a suitable configuration computer (335). However, if an active item (100.Act) has a sufficiently complex and suitable user interface—for example, a cell phone (100.Act.CP) or a laptop or tablet computer (100.Act.LC), the configuration may be done in part or in whole directly via the interface of the active item (100.Act). As per FIG. 3E, the item (100) may report a risk of being lost (503.0.1), misplaced (503.0.2), misappropriated (503.0.3), wandering (503.0.5), or stolen (503.0.4) to a variety of different reporting centers (335, 340, 345, 355, 365, 1400), as well as using the local signaling (230).

Process diagram 400, summary method descriptions 420, and method 430, shown in FIGS. 4A-4C respectively, remain substantially applicable. The logic for item loss prediction may be viewed as an extension of BIRD logic (500).

However, in an embodiment, for prediction of item loss/misplacement/theft, method step 440 will entail receiving prediction usage factors (1620). In an alternative embodiment, prediction usage factors (1620) may be viewed as an element of usage expectations (600). Also, for item loss/misplacement/theft prediction, step 460 and associated usage expectations (600) will entail comparing analyzed item usage data (700.U) with one or more prediction usage factors (1620).

Predictive Advisory/Signaling Variations

In operational use, when BIRD logic (500) identifies a risk that an item may become displaced (503.0), BIRD song (900) may issue local signal (372) in the form or warnings or advisories to the authorized user (AU). However, certain BIRD song (900) advisories to a user, warning them of a risk of possible item loss or misplacement, may become routine and commonplace. For example, if BIRD song (900) advises an authorized user (AU) to take certain items (100) every time the user approaches a certain stop on the train, the user may wind up hearing and/or seeing the same advisory every day. With such constant repetition, there is a risk that the user will become acclimated to such a repetitive advisory, and so tend to ignore the advisory.

In an embodiment, BIRD song (900) tracks the kinds of advisories it issues to a user regarding risk of item loss, item misplacement, etc. If BIRD song (900) determines it is issuing an advisory on a routine basis (daily, for example), then in an embodiment BIRD song (900) may change the advisory. For example, if tones or music are part of the advisory, a different tone or music could be selected, possibly at random, each time the same advisory is issued. If a synthesized spoken warning is used, the sentence structure and/or the voice of the speaker could be changed on successive advisories. If vibration from the BIRD (200) is used as part of the signaling, the intensity, frequency, and pattern of vibration may be varied from one advisory to the next. These variations will help keep the user attuned to the advisories, so the advisories are less likely to be ignored.

In an alternative embodiment, the user may configure the advisories to vary in a desired way or after a designated number of repetitions of the same advisory.

Integrated Item-Specific Sensors

Discussed above in this document are systems and methods for BIRDs (200) which serve the general function of identifying an item's environment, activity, usage or operations as extant/normal (503.1/503.3) or displaced/anomalous (503.0/503.2). Discussed above is the integration of such BIRD elements into items (100) which are primarily mechanical or structural in nature, that is, passive items (100.Pass). Also discussed is the integration of BIRD elements and functionality into active items (100.Act), that is, items which inherently employ processors (204), memory (206), and other electronics associated with data processing.

In some instances, some passive items (100.Pass) may benefit from the inclusion and integration of item-specific sensors (210) which detect specific mechanical and/or structural states or usages of the passive item (100.Pass). Some passive items (100.Pass) may also benefit from the inclusion and integration of item-specific sensors (210) which detect other items (100) carried within or on the passive item (100.Pass). Several exemplary such passive items (100.Pass), with suitable item-specific sensor elements (210.1S), are discussed immediately below.

At the time of preparation of this document, there are some items (100) which are conventionally passive items (100.Pass). With the passage of time, some of these items (100.Pass) may increasingly include various processor-based technologies (including, for example, the BIRD (200) itself). The present discussion will remain applicable to such items (100.Pass) as they transition to the role of active items (100.Act).

Personal Item Transport Containers and Item Teams

FIGS. 17A-17H, below, provide a more detailed discussion of personal item transport containers (100.C), which are relabeled here for purposes of discussion as personal item transport containers (1700). It will be noted that, in an embodiment, such container items (1700), along with the items (102.IT) which they may contain and monitor, may constitute item teams (1400) as already discussed above (see FIGS. 14A-14I and other figures throughout this document).

In turn, the container items (1700) themselves may constitute team members (102.IT) of still larger item teams (1400) (see in particular FIG. 17H, below).

To avoid excessive and possibly confusing "label density" in figures which already contain numerous elements and labels, the item teams (1400) associated with FIGS. 17A-17H are not specifically labeled as such in the drawings. Similarly, the contained items (100), though possibly being item team members (102.IT) and/or extended item team members (102.EIT), are not labeled as such in FIGS. 17A-17H.

FIG. 17A

Personal Item Transport Container with Item-Specific Sensors

FIG. 17A is an illustration of an exemplary personal item transport container (1700) (previously labeled 100.C, see FIG. 1A above), in this case an exemplary briefcase (100.B) with exemplary integrated BIRD or BIRD elements (200.C). Other personal item transport containers (1700) may include luggage (100.LG), toolkits (100.TK), and backpacks (100.Bkpk); purses (100.P), and wallets (100.W). In particular, discussed further below in FIGS. 17F-17G are two additional exemplary personal item transport containers, a wallet (100.W) and a backpack (100.C.Bkpck), both of which are typically used to carry or transport other, still smaller personal items (100).

For convenience—and in particular for purposes of discussion associated with FIGS. 17A-17G—such items previously labeled (100.C) will be collectively labeled as here as "personal item transport containers (1700)." Such items may also be referred to, for short, as "container items (1700)." (The goal is to help distinguish, in the text, those items (1700) which do the containing from those items (100) which are contained within.)

In an embodiment, the exemplary BIRD elements (200.C) which are integrated into the structure of the briefcase (1700) (but are not shown in detail in the figure) may include a processor (204); a memory (206); a clock/calendar/timer (208); various general environmental sensors (210) for sensing wallet location, motion, light exposure, surface pressure on the wallet, etc.; a bus (214); communications elements (220, 240, 242); local signaling (230); one or more batteries (216); item-specific sensors (210.IS); and other elements discussed in conjunction with various BIRD embodiments throughout this document. In an alternative embodiment, some or all of the typical sensors (210) pertaining to external environmental sensing may be omitted, and mainly or only internal sensors (210.IS) for internal item location may be employed. In an embodiment, the sensors may include an RFID interrogator (210.RFID); such an embodiment is discussed in further detail below in conjunction with FIGS. 17B-17E.

Shown in FIG. 17A are exemplary item-specific sensors (210.1S), including:

Pocket sensors (210.IS.P)—These detect whether or not pockets within the briefcase (100.B) contain smaller items (100). Sensors (210.IS.P) may include pressure sensors, optical sensors, and possibly other means, for example, electromagnetic/RF coupling with active items (100.Act) which may be stored in the pockets (see FIGS. 17B-17E, below). In an embodiment, RFID sensing is used to detect items (100) within the briefcase (100.B). This is discussed further below.

Lock sensor(s) (210.IS.L)—Detect whether or not a lock on the briefcase is locked or unlocked.

Clasp sensor(s) (210.IS.C)—Detect whether or not a clasp on the briefcase is closed or not.

Hinge/Joint Sensor(s) (210.IS.H)—Detect the open or closed state of the briefcase, and the angle of opening.

Suitable usage expectations (600) may be configured to determine whether the usage of pockets, clasps, locks, and possibly other suitcase elements is consistent, and whether or not the usage is appropriate for the current detection context (123). For example, the BIRD logic/BIRD song (500/900) for the briefcase (1700) may be configured to signal an alert if the briefcase is closed by a user when certain pockets (which are expected to contain items (100)) do not contain items. Similarly, the briefcase (1700) may be configured to signal an alert if the briefcase is closed and in-motion, but one or more of the locks or clasps are not set properly.

In an embodiment, the briefcase (1700) may also be configured to detect, and signal an alert, if an active item (100.Act) remains powered on when the briefcase is closed and in-motion (which may result in the active item (100.Act) suffering unnecessary drain of its battery). In alternative embodiment, the briefcase (1700) may be configured to send a signal to BIRDed-items (100) within, signaling the item's BIRDs (200) (and/or an associated active item (100.Act), if applicable), to either shut down or reduce power when the briefcase is closed.

In an embodiment, a photoelectric material (not shown) on the surface of the briefcase (100.B) may be employed to provide electricity, both for battery charging and to supplement the battery (216) in the event the briefcase is lost, misplaced, misappropriated, wandering, or stolen for an extended period of time.

Similar sensors (210), and similar BIRD logic/BIRD song (500/900), are applicable for such other containers items (1700) as luggage (100.LG), toolkits (100.TK), purses (100.P), and other "baggage-type" items which are used by a person to carry smaller items about.

FIG. 17B

RFID and BIRD Sensing for Internal Item Tracking for Personal Item Transport Containers (I)

Personal Item Transport Container, General Definition

Sealable Containers:

In an embodiment, a personal item transport container (1700) is generally defined as a container which is closed or closeable, to create a substantially sealed off separation between an internal/inside environment (1702) and an external/outside (1704) environment.

Unsealed Containers:

In an alternative embodiment, a personal item transport container (1700) may not be sealable; an example might be a wallet (100.W), a shopping cart, or a carrying bag lacking a zipper or similar closure, which may still be employed to carry or transport other items (100).

Transport Vehicles:

In an alternative embodiment, a personal item transport container (1700) may be a compartment of a vehicle, such as the trunk or glove compartment of a car or truck, or even the passenger compartment of the car or truck.

General Internal Sensing Elements

As discussed throughout this document, a BIRD (200.C) may be associated with any personal item transport containers (1700) in order to help the BIRDed-transport-container (102) to self-identify as possibly being displaced (503.0) (lost, misplaced, misappropriated, stolen, wandering) or being otherwise in an anomalous state (503.2).

In an embodiment (as already discussed above in part in conjunction with FIG. 17A, and again below with respect to FIGS. 17F-17G), it also possible to place internal sensors (210.IS) inside of such personal item transport containers (1700), where the internal sensors (210.IS) help determine if smaller items (100) are appropriately carried within. (For discussion and development purposes, a container item (1700) may be referred to as a "mother BIRD," and the items (100) meant to be carried within a "chicklets" or "eggs." However, such terminology is not employed further herein.)

Pocket Sensors:

In an embodiment, the internal sensors (210.IS) of a personal item transport container (1700) may be associated with specific pockets or pouches within the container (1700), and the sensors (210.IS) may be used to detect the presence of an item (100) within the pocket or pouch. (See for example FIG. 17A, above.)

RFID Sensors:

In an alternative embodiment, the RFID sensing can be employed to determine if a personal item transport container (1700) contains one or more other items (100) that are expected to be contained within.

BIRD-To-BIRD Communications:

In an alternative embodiment, the integrated BIRD (200.C) of a container item (1700) may be configured to communicate with other BIRDed-items (102) which are expected to be held within the container item (1700). In such an embodiment, the container item (1700) and the BIRDed-items (102) within become another variation on item teams (1400) (see FIGS. 14A-14I and 15B above, and other figures throughout this document).

In an alternative embodiment, combinations of pocket sensors, RFID technology, and BIRD-to-BIRD communications may be employed to track and monitor items (100) within the container item (1700).

Exemplary Personal Item Transport Container

FIG. 17B shows an exemplary representation of a personal item transport container (1700). The personal item transport container (1700) illustrated in FIG. 17B is representative of a briefcase (100.B), but the discussion here is applicable to other personal item transport containers (1700) as well. In an embodiment, the personal item transport container (1700) has an associated or integrated BIRD (200.C), which may for example be built into a wall of the personal item transport container (1700). In an embodiment, the BIRD (200.C) includes an RFID interrogator (210.RFID).

In an embodiment, the personal item transport container (1700) may have as part of its outer wall or enclosure an RF shielding element (1706), such as a metallic foil or a metallic mesh (1706), to insulate items (100) and RF elements which are inside the personal item transport container (1700) from outside RF interference and sources. In an embodiment, the BIRD (200.C) may have an RFID antenna (240.RFID) which is configured to direct RFID queries substantially towards the interior cavity or space of the personal item transport container (1700) (that is, the antenna may be directional). In an embodiment, the RFID elements (the shielding (1706) and/or the RFID antenna(s) (240.RFID)) may be incorporated into a compartment or subunit within the container item (1700).

In an embodiment, the personal item transport container (1700) may have additional RFID internal antennas (240.RFID) situated at various points along its inner enclosure, coupled to the BIRD (200.C) via suitable wires, bus (214) or similar (not shown in the figure), and designed to ensure that the entire interior cavity (1702) of the personal item transport container (1700) can obtain suitable exposure to an RFID interrogation signal. ("Suitable exposure" is defined as an RF signal which is sufficiently strong to activate any RFID tag, no matter where placed in the interior of the personal item transport container (1700)).

In an embodiment, the personal item transport container (1700) may have one or more additional antennas (240.RFID.Ext) which are mounted on or coupled to the exterior of the personal item transport container (1700), and which are coupled to the BIRD (200.C). These exterior antennas (240.RFID.Ext) are configured to detect items which are in the space exterior (1704) to the personal item transport container (1700), but which are in possibly intended to be carried within the personal item transport container (1700).

In an alternative embodiment, the personal item transport container (1700) may be equipped with only some elements/components of a general BIRD (200), BIRD logic (210), or general BIRD functionality. However, the personal item transport container (1700) will include at a minimum the RFID interrogator (210.RFID), and sufficient processing (204), memory (206), power (216), user interface elements (220, 230, 226, 240, 242, and/or 280/282) to implement the elements of RFID operations described herein (see further discussion immediately below).

FIG. 17C

RFID and BIRD Sensing for Internal Item Tracking for Personal Item Transport Containers (II)

FIG. 17C shows another view of the exemplary personal item transport container (1700) illustrated in FIG. 17B. In this view, the personal item transport container (1700) contains a user-interface element, which in an embodiment may be in the form of a touch screen display (282.D), and which may also provide for user local input (282.L). The display (282.D) may, for example, be mounted into an interior inner wall of the briefcase (1700).

Shown are two exemplary BIRDed-items (102.2, 102.3) (represented via the double-diamond shapes). Also shown are four exemplary altMon items (100.altM), which may be any kind of portable items (100) which may be carried in the personal item transport container (1700). Specific representative altMon items (100.altM)—a writing pad (100.X), a shirt (100.Y), a calculator (100.Z), and a pen (100.W)—are shown in the figure to help aid understanding. These are entirely exemplary, and any items (100) of suitable size and portability may be envisioned. These four exemplary items (100.W/X/Y/Z) are not part of the personal item transport container (1700). However, to take advantage of the RFID capabilities of the personal item transport container (1700), there is an associated RFID tag (1409)—labeled in the figure as Tag W, Tag X, Tag Y, and Tag Z-attached to each respective item (100.W, 100.X, 100.Y, 100.Z).

All such RFID-tagged items (100.W/X/Y/Z, and other items (100) with RFID tags) may also be referred to as RFID-tagged items (100.RFID).

RFID Operations

In an exemplary embodiment, the display (282.D) may offer an authorized user (AU) of the personal item transport container (1700) four options:

(1) Upload Briefcase Expected-Item-List—

This option enables the user to upload, into the container's BIRD (200.C), a list of expected items (1715) (see FIG. 17E) which are expected to be found in the container (1700). The upload may be, for example, from a configuration computer (335), and may be accomplished via a wireless connection (337) or via a wired connection (337) using a port (not shown) on the container (1700).

The list (1715) to be uploaded would identify an item (100) meant to be carried in the container (1700); this identification is via either of: (i) the electronic product code (EPC) or similar code of an RFID tag (1409) attached to the item (100); or (ii) a BIRD ID code such as the Item Team ID and Item ID for each BIRDed-item (102.IT) associated with an item team (1400) (see for example FIG. 14C, above).

In an embodiment of the present system and method, an RFID tag (1409) would also store text descriptive of the item (100), or even an image of the item (100). In an alternative embodiment, the RFID tag (1409) would only store the EPC, while an associated descriptive text and/or image for the item (100) may be uploaded from the configuration computer (335) and stored in the container's BIRD (200.C).

(2) Determine Briefcase Expected-Item-List Based on Current Items—

This option enables the user to establish the list of items (1715) which are expected to be in the container, based on the items (100) which are actually present in the container (1700). In an embodiment, after selection of option (2), the display (282.D) may prompt the user through a series of steps to be taken. For example, the steps may entail (i) Make sure all items (100) which are expected to be in the container are actually placed within the container (1700); (ii) close the container; (iii) wait a specified period of time for the container (1700) to perform an RFID scan and/or a query of all BIRDed-items (102) in the interior of the container (1700) for items (100) present.

In an embodiment, the scan is conducted automatically once the container (1700) is closed. (A latch sensor (210.IS.L) or hinge sensor (210.IS.H), not shown, may determine when the container (1700) is closed.) In an alternative embodiment, once the user closes the container (1700), a button or other user interface element on the exterior of the container (1700) may be used to initiate the RFID scan. In an alternative embodiment, the RFID scan may be performed even when the container (1700) is still open.

(3) Edit Briefcase Expected-Item-List—

This option may present the user with an editing interface to manually edit or modify the list of expected items (1715). In an embodiment, the personal item transport container (1700) with its integrated BIRD (200.C) may be able to store more than one possible list of expected items (1715), suitable for different uses or different occasions of use of the container (1700). The Edit briefcase expected-item-list option may provide access to the several lists (1715) which have been stored by the container's BIRD (200.C).

(4) Check for Missing Items—

This option performs an RFID scan and/or a BIRD-to-BIRD query of the interior of the container (1700): the container's BIRD (200.C) then compares a found-item-list (1717) of the items identified through the scan (see FIG. 17E) with the expected-item-list (1715). The result is a another list (not shown in FIG. 17C), displayed to the user, of (i) items (100) which are expected to be in the container (1700) but are not;

(ii) items (100) which are in the container but were not expected to be; and (iii) items outside the container (1700) but detected by the external RFID scan.

It will be apparent to person's skilled in the relevant arts that selecting any of options (1), (2), (3), and/or (4) may result in the container's BIRD (200.C) presenting, via the display (282.D), additional instructions for the user, additional options for the user, and/or additional information. Further, the options illustrated are exemplary only, and fewer options, more options, or different options than those illustrated may be presented.

The process described above is exemplary only, and is in no way limiting. Determination of items (100) in the container may be augmented or supplemented with other means, including for example and without limitation:

- the use of internal pocket, pouch, hinge, and clasp sensors (100.IS), as described above;
- internal sensors designed to communicate with active items (100.Act) via wired connections or via RF links other than RFID (for example, WiFi, Bluetooth, etc); and
- cameras mounted internally to the personal item transport container (1700), and designed to photograph and visually identify items (100) within the container (1700).

FIG. 17D

RFID and BIRD Sensing for Internal Item Tracking for Personal Item Transport Containers (III)

FIG. 17D shows another view of the exemplary personal item transport container (1700) illustrated in FIGS. 17B and 17C. In this view, the personal item transport container (1700) is closed (the lid covers the bottom). A display/local input (282.D/282.L) is embedded in the exterior lid for viewing and user input when the container (1700) is closed. This display/local input (282.D/282.L) may be in addition to or in the alternative to the interior display/local input (282.D/282.L) shown in FIG. 17C.

Inside the Container:

The BIRD (200.C) components remain embedded in the structure of the container (1700), but are shown as partly superimposed on top for ease of visualization. Similarly, several items (100) are inside (1702) the transport container (1700), including BIRDed-item (102.2); the calculator (100.Z); the pen (100.W); and an unexpected item, a book (100.UI) with an RFID tag (Tag UI). These items are stored within the personal item transport container (1700), but are illustrated as partly superimposed on top for ease of visualization.

Outside the Container:

Also illustrated are three items which are external (1704) to the transport container (1700): the writing tablet (100.X), which is within RFID proximity (1704.1) to the container (1700); the shirt (100.Y) which is outside (1704.2) of the RFID range of the RFID technology of the container (1700) and BIRD (200.C); and the BIRDed-item (102.3). It will be noted, however, that in an embodiment, the BIRDed-item (102.3) may itself have RFID capabilities; in such an embodiment, BIRDed-item (102.3) may itself detect the shirt (100.Y), and relay the information about the detected shirt to the container (1700).

Display Contents:

Shown in the figure are two different display contents (1708, 1710), both of which may be shown on the display/local input (282.D/282.L). (In an embodiment, the two different display contents (1708, 1710) are displayed at different moments in time; in an alternative embodiment, both display contents (1708, 1710) may fit on the display at the same time, and be displayed at the same moment in time.)

The first display contents (1708) shown on the display/local input (282.D/282.L) at a first point in time lists action options for the user, where the authorized user (AU) has selected the fourth option: "(4) Check for missing items." The options shown are the same as those discussed above in conjunction with FIG. 17D.

Missing Item Check

In an embodiment, when the user selects the option "(4) Check for missing items", the RFID interrogator (210.RFID) of the BIRD (200.C) initiates an RFID scan of the interior of the container (1700). If the RFID interrogator (210.RFID) is suitably configured, it may initiate a scan as well of the area which is external to and surrounding the container (1700). At the same time, the container's BIRD (200.C) also attempts to initiate contact, or to update an established contact, with any contained BIRDed-items (102) and/or nearby BIRDed-items (102).

RFID Scan:

Due to either or both of the directional nature of the RFID antennas (240.RFID) and the shielding (1706) of the container (1700), the container's BIRD (200.C) is configured to distinguish between RFID-tagged items (100.RFID) which are in the interior (1702) of the container (1700), and RFID-tagged items (100.RFID) which are located external (1704) to the container (1700). The container (1700) not only performs the RFID scan, but the BIRD logic (500) compares the scan results (1717) with the stored expected-item-list (1715) (see FIG. 17E, below).

Extended RFID Detection Range Via External BIRDs:

As noted above (see FIG. 2A), in an embodiment some BIRDed-items (102.3) which are exterior (1704) to the container (1700) may have an RFID interrogator sensor (210.RFID); during an RFID scan, the container (1700) may query any outside BIRDs (102.3), and have them initiate their own RFID sweep or scan if the outside BIRD(s) (102.3) have such capabilities. Such BIRDs (200), which are external (1704) to the container (1700) but with RFID capabilities, may effectively function to extend the RFID range of the container (1700).

BIRD Query:

In an embodiment, the container's BIRD (200.C) may determine which BIRDed-items (102) are contained within, and which are not, based on the nature of RF contact. For example, the container's shielding (1706) may prevent interior RF signals from reaching BIRDed-items (102) outside the container (1700). As a result, the container (1700) may have separate interior and exterior antennas (not illustrated); depending on which antenna (interior or exterior) establishes contact with a BIRDed item (102), the container's BIRD (200.C) may thereby determine that a BIRDed-item (102.2) is interior (1702) to the container (1700), or that a BIRDed-item (102.3) is exterior (1704) to the container (1700).

In an alternative embodiment, BIRDed-items (102.2, 102.3) may use light intensity measurements or other means to determine if they are inside a container or not, and return a report to the container's BIRD (200.C). In an alternative embodiment, fine-grained location determinations may be employed to determine if a BIRDed-item (102.2, 102.3) is interior (1702) or exterior (1704) to the container (1700). Other interior/exterior determination methods may be employed as well.

Item Check Results:

The resulting output (1717) (see FIG. 17E) indicates which expected items (100.RFID, 102) are inside (1702) the container (1700), and which are outside (1704). An exemplary contents report (1710) is shown on the display/local input (282.D/282.L) (see again FIG. 17E). The contents report (1710) indicates that three expected items, the calculator, the pen, and item 102.2 were found within the container (1700). A fourth expected item, the notepad, was not found within the container (1700), but was identified as being nearby (within RFID pinging range). A fifth expected item 102.3 was also identified as being outside the container (1700). A sixth expected item, the bowling shirt, was not found within the container (1700) and was not identified as being within RFID pinging range. (In this exemplary case, presumable the outside BIRDed-item (102.3) either lacks RFID capabilities; or the outside BIRDed-item (102.3) has RFID sensing capabilities, but was also out of range of the shirt (100.Y). Finally, an additional unknown item, tagged with RFID Tag UI, was identified as being within the container (1700).

With this information in hand, the authorized user (AU) is in a position to locate (or at least, attempt to locate) the missing items (100), and also to determine if the unknown item (100) in the container (1700) really, properly belongs in the personal item transport container (1700). (If "yes", the item can be added to a stored expected-item-list.)

FIG. 17E

Flow Chart of RFID Internal Item Tracking for Personal Item Transport Containers FIG. 17E presents a flowchart 1720 of an exemplary method for a personal item transport container (1700) to self-assess if appropriate contents are present, or are not present, in the container (1700). In an embodiment, the method depends upon the presence of various sensors (1700) to determine the contents of the container (1700). For example, the sensors (210) may be an RFID interrogator (210.RFID) working in conjunction with RFID-tagged items (100.RFID), as discussed above; or may be other kinds of item-specific sensors (210.IS), as also discussed in conjunction with various figures above; or the sensing may entail BIRD-to-BIRD communications among item team members (1400).

The method 1720 include steps which may be performed by an authorized user (AU) of the container (1700), steps which may be performed by a BIRD (200.C) integrated into or associated with the container (1700), or a combination of user-performed and BIRD-performed steps. For convenience. FIG. 17E also includes several exemplary lists or displays (1715, 1717, 1710) which may be employed or generated by the method 1720.

The method 1720 begins with step 1722. Step 1722 entails establishing or configuring a list, the Expected-Item-List (1715), which lists items (100) that are to be stored or transported in the container (1700). In different embodiments, step 1722 may be implemented in different ways, including for example and without limitation alternate paths 1722.A or 1722.B:

In step 1722.A, the authorized user (AU) creates or edits the expected-item-list (1715) by the use of a list editor, such as a standard text editor, or a custom dialog box or list creation wizard (not illustrated). In an embodiment, the list editor may for example be presented and accessed through a configuration computer (335), which then uploads the expected-item-list (1715) to the BIRD (200.C) associated with the container (1700). In an alternative embodiment the list editor may be accessed directly on a user interface/display (282.D/282.L) associated with the container (1700).

In either case, step 1722.A entails creating or editing the expected-item-list (1715). The list (1715) contains data sufficient to identify the items which are expected to be in the container (1700), as those items would be sensed or detected by the sensors (210) of the BIRD (200.C) associated with the container (1700).

In an embodiment, associated with the sensor parameters for each item (100) is also descriptive text for each item. The exemplary expected-item-list (1715) includes a list of items (100) which are associated with RFID tags, each RFID tag having an associated serial number. Persons skilled in the relevant arts will recognize that an actual tag serial number would be a more extended string than the single-letter alphanumeric strings shown. In the expected-item-list (1715) each RFID tag is associated with a text string descriptive of an item (100). For example, RFID tag X is associated with a writing tablet, RFID tag Y is associated with a bowling shirt, and RFID tags Z and W are associated with a calculator and a pen, respectively.

The list (1715) also includes BIRDed-items (102) which are expected to be stored and/or transported in the container item (102). For purposes of illustration the items are identified by label numbers only (102.2, 102.3); persons skilled in the art will appreciate that in application, descriptive labels would be employed, possibly along with suitable internal BIRD identification numbers or other internal BIRD IDs.

In an alternate embodiment, step 1722 may be implemented by step 1722.B, which has two sub-step, 1722.B.1 and 1722.B.2.

In step 1722.B.1, the authorized user (AU) places in the container the items (100) which are expected to be carried in the container (1700). Typically, step 1722.B.1 would be accomplished in the normal course of placing items (100) in the container (1700) prior to transport. For example, the authorized user (AU) places the items (100) in a briefcase prior to the user taking the briefcase on a trip. Similarly, items (100) may be placed in containers (1700) such as a suitcase or backpack prior to taking the suitcase or the backpack on a trip.

In step 1722.B.2 the authorized user (AU) initiates a contents scan of the container (1700) by the integrated BIRD (200.C). The BIRD (200.C) has associated integrated sensors (210.IS), such as for example pocket sensors (210.IS.P) or an RFID interrogator (210.RFID), along with communications capabilities (220, 240, 242) suitable for BIRD-to-BIRD communications. These sensors and communications capabilities are configured to determine the items (100) held within the container (1700). The BIRD (200.C) performs the scan of the container to generate the list of found items (1717) stored within.

In an embodiment, the items (100) scanned may contain not only an identification code, such as RFID code, but the RFID tags associated with the items (100) may also contain a text description of the item. Similarly, BIRDed-items (102) may have their own stored descriptive names or labels. In an alternative embodiment, the authorized user (AU) separately uses a list editor, already described above, to edit a list (1715) of tags or to edit a list (1715) of other identifying parameters for each item (100), in order to associate text descriptions with each item (100) in the container (1700).

Step 1724, which follow step 1722, entails general usage of the container (1700) and the items (100) within by a user. Typically, if the container (1700) is normally closed or sealed when in transit, the user will close the container (such as closing a briefcase and latching the cover closed, or closing a suitcase or a backpack by closing a zipper or similar closure elements associated with the container (1700)). Typically the user will carry or otherwise move the container (1700) to a destination, for example by carrying it, rolling it about if the container is wheeled, or carrying it on the authorized user's back. In the course of use, the container (1700) may be opened or closed as needed, and items (100) may be removed and returned as needed.

At step 1726 the authorized user (AU) has finished using the container and the items within—for example, at the completion of a business meeting when items (100) are returned to a briefcase (1700), or at the end of a vacation when packing up the luggage (1700)—and the user is planning to move to another destination. The authorized user (AU) wishes to ascertain that all the items (100) which were originally in the container (1700) are still in the container (1700). In other words, the user wishes to ascertain that no items (100) are being left behind, and possibly that no additional items (100) have been inadvertently placed in the container.

As initiated by the user, the container's BIRD (200.C) performs another scan of the interior (1702) container (1700), as well as possibly a scan of areas exterior (1704) to the container (1700). For example, the container's BIRD (200.C) may scan the interior (1702) of the container (1700) using an RFID interrogator scan, and the BIRD (200.C) may also scan an area or space surrounding (1704) the container (1700), again using an RFID scanner (210.RFID). BIRD-to-BIRD communications may also be employed for interior (1702) and exterior (1704) scans for BIRDed-items (102). The BIRD (200.C) may also employ other sensing means (210), such as the testing whether certain items (100) are present in pockets in the container (1700), or detecting items (100) in the container or surrounding the container by an interior optical scan within image matching protocols.

In an alternative embodiment, the container (1700) may be configured to automatically initiate scans of items (100) based on any of several criteria, such as when the container (1700) is opened or closed, or at scheduled time intervals, or based on other criteria or triggers.

The result of step 1726 is a list of found items (1717). The found items list (1717) indicates which items (100) are found inside (1702) the container (1700) and which items (100) are found outside (1704) the container (1700).

In step 1728 the BIRD (200.C) compares the found items list (1717) with the expected-items-list (1715). The BIRD (200.C) determines which items (100) in the expected-items-list (1715) are not present in the found items list (1717). The BIRD (200.C) also determines which items (100) in the found items list (1717) are present in that list, but are not in the expected-items-list (1715). These latter items (100) may be items which may have been inadvertently packed away, or may be new items that should be added to a revised or amended expected-items-list (1715).

In step 1730, and based on the results of the comparison step 1728, the BIRD (200.C) generates the contents report (1710) which includes discrepancies between the found items (1717) and the expected-items-list (1715). An exemplary report (1710) is shown in FIG. 17E. Based on the report (1710) the user of the container (1700) can determine which items (100) may need to be found that are not present in the container (1700), as well as which items have been added to the container (1700), and whether those items should be present or not. Additional operations (not shown) may be available to the user, such as updating the expected-items-list (1715) (or generating a new, alternative list (1715)) to reflect the current contents of the container (1700).

FIG. 17F

Wallet with Item-Specific Sensors and as Container Item

FIG. 17F is an illustration of another exemplary container item (1700), in this case an exemplary wallet (100.W) with an exemplary integrated BIRD or BIRD elements (200.C). Like other container items (1700), a wallet (100.W) is designed and configured to carry other items (100), typically including driver's licenses, other forms of personal identification, medical ID cards, credit cards and bank cards (100.CrC), family or other personal photographs, and of course paper money. Other small items may be carried in a wallet (100.W) as well.

In an embodiment, a wallet (100.W), viewed as a container item (1700), may employ its integrated BIRD elements (200.C) for purposes of tracking other items (100) which should be contained within the wallet. These wallet's BIRD or BIRD elements (200.C), which are integrated into the structure of the wallet (100.W) (but are not shown in detail in the figure) may include elements previously discussed throughout this document: a processor (204); a memory (206); a clock/calendar/timer (208): various general environmental sensors (210) for sensing wallet location, motion, light exposure, surface pressure on the wallet, etc.; a bus (214); communications elements (220, 240, 242); local signaling (230); one or more batteries (216); item-specific sensors (210.IS); and other elements discussed in conjunction with various BIRD embodiments throughout this document. In an embodiment, the wallet's sensors (210) may include an RFID interrogator (210.RFID).

In an alternative embodiment, some or all of the sensors (210) typically pertaining to external environmental sensing may be omitted, and mainly or only internal sensors (210.IS) for internal item location, and/or an RFID interrogator (210.RFID), may be employed.

Shown in FIG. 17F are exemplary item-specific sensors (210.IS), including:

- Pocket sensors (210.IS.P)—These detect whether or not pockets or folds within the wallet (100.W) contain smaller items (100). Sensing means may include pressure sensors, optical sensors, and possibly other means. For example, electromagnetic/RF coupling with credit cards (100.CrC) which may be stored in the wallet (1700) may determine if a credit card which should be extant (503.1) (that is, present in the wallet) is, in fact, extant (503.1) or not. In an embodiment, RFID sensing may be used to detect items (100) within the wallet (100.W). This is discussed further below.
- Clasp sensor(s) (210.IS.C)—Detect whether or not a clasp on the wallet (100.W) is closed or not.
- Hinge/Fold sensor (210.IS.H)—Determine when the wallet is folded open or closed.
- RFID sensor (210.RFID)—The RFID sensor may be employed in a manner similar to that already discussed above, in conjunction with FIGS. 17A-17F. Items (100) carried in the wallet, such as ID cards, bank cards, credit cards (100.CrC), may have attached or embedded RFID tags (either provided by the card vendor, or attached by the authorized user (AU)). Shown in the figure are two exemplary credit cards (100.CrC) with attached RFI D tags (1409).

As with the briefcase (1700/100.B), discussed above in conjunction with FIGS. 17A-17C, the wallet (1700/100.W) may be configured with a list (1715) of credit cards (100.CrC) and other items (100) which are expected to be in the wallet. The wallet (1700) may then use the RFID interrogator (210.RFID) to determine if the RFID-tagged items (100.RFID) are in fact present in the wallet (1700). In an embodiment, if the wallet (1700) lacks a sufficiently large built-in user interface for such detailed configuration, the wallet (1700) may be configured via a configuration computer (335) or cell phone (340).

In an embodiment, the wallet (1700/100.W) may have a flexible mesh RF shielding (1706)—similar to that on the briefcase (1700/100.B)—to help distinguish RFID responses from items (100.RFID) tucked into the wallet versus RFID responses from items (100.RFID) which are nearby, but not suitably tucked into the wallet.

Wallet Usage Expectations:

Suitable usage expectations (600) may be configured to determine whether the usage of pockets, clasps, and possibly other wallet elements is consistent, and whether or not the usage is appropriate for the current date, time of day, location, and so forth. For example, the wallet (100.W) may be configured to signal an alert if the wallet is closed by a user when certain pockets (which are expected to contain items (100)) do not contain items; or, for example, do not contain expected credit cards or bank cards.

Additional Embodiments

In an embodiment, a photoelectric material (not shown) on the surface of the wallet (100.W) may be employed to provide electricity, both for battery charging and to supplement the battery (216) in case the wallet is misplaced for an extended period of time. In an embodiment, a piezoelectric material (not shown) may be embedded in the wallet (100.W) to generate electricity from pressure applied by the human body (as for example when the wallet is in a user's pocket). This may be used both to charge and supplement the battery (216). Similar sensors, and similar sensor data processing/analysis, are applicable for such items as purse-belts and utility-belts which are used by a person to carry smaller items about.

FIG. 17G

Backpack with Item-Specific Sensors and as Container Item

FIG. 17G is an illustration of another exemplary container item (1700), in this case an exemplary backpack (100.R.Bkpck) with an exemplary integrated BIRD or BIRD elements (200.C). Like other container items (1700), a backpack (100.C.Bkpck) is designed and configured to carry other items (100); since backpacks (100.Bkpk) are used in diverse contexts, from camping to school contexts to general public life contexts, they may be commonly used to carry diverse items. A few representative possible BIRDed-items (102), ABIRDed-items (102.Act), and RFID-tagged items (100.RFID) are illustrated in FIG. 17G.

As with other container items (1700) discussed above, the integrated BIRD or BIRD elements (200.C) may include, for example and without limitation: a processor (204); a memory (206); a clock/calendar/timer (208); various general environmental sensors (210) for sensing backpack location, motion, light exposure, etc.; a bus (214); communications elements (220, 240, 242); local signaling (230); one or more batteries (216); item-specific sensors (210.IS); and other elements discussed in conjunction with various figures in this document. In an alternative embodiment, some or all of the sensors (210) typically pertaining to external environmental sensing may be omitted, and mainly or only internal sensors (210.IS) for internal item location may be employed.

Sensing and Tracking Stored or Contained Items

In an embodiment, and in its role as a container item (1700), the backpack (100.Bkpk) may also employ a variety of sensors (210) to detect the presence of items stored, or meant to be stored, within the backpack (100.Bkpk). The sensing means and methods, including: (i) pocket or pouch sensors; (ii) RFID sensing; and (iii) BIRD-to-BIRD communications, may be the same or substantially similar to that discussed above in conjunctions with the exemplary briefcase (100.B) and exemplary wallet (100.W) (see FIGS. 17A-17F).

Additional Item-Specific Sensing

The motion sensor (210.M) and the location sensor (210.L) may both be put to use for purposes described in detail elsewhere in this document, for example, to determine if the backpack (100.Bkpk) is lost (503.0.1), misplaced (503.0.2), misappropriated (503.0.3), wandering (503.0.5), or stolen (503.0.4). In addition, however, the motion sensor (210.M) and location sensor (210.L) may also be employed, possibly along with other sensors (210), to determine a status of a hiker who is using the backpack (100.Bkpk). The sensors may help determine if the hiker is maintaining an expected pace, if the hiker is following an expected route, if the hiker appears to be staying in one place for a longer-than-expected time, etc.

Other sensors, such as altimeter (210Alt) and orientation sensor (210.N), may also help determine if the hiker is in expected locations (144.L), or if possibly the hiker is in a state of distress. For example, if the orientation sensor (210.N) detects the hiker as being in a prone position at a time when the hiker is expected to be mostly awake and standing, this may indicate a state of distress.

Pressure sensors (210BP), located on the back of the backpack (100.Bkpk), may help determine if the backpack is in contact with a hiker, camper, or other authorized user (AU).

Height sensor (210.Hght) may determine the height of the backpack (100.Bkpk) on the users back, which may in turn be useful for ergonomic determinations of whether the backpack (100.Bkpk) is properly positioned on the user's back.

A zipper sensor (210.IS.Z) may determine whether or not the backpack's zipper is properly closed.

As already alluded to above, a pocket sensor (210.IS.P) may determine whether or not a smaller item (100) is contained in a pocket of the backpack (100.Bkpk).

A buckle sensor (210.IS.BU) may determine if a buckle on a strap is appropriately fastened or attached.

Multiple cameras (210.C) may be employed for various purposes, including secondary location determination, nearby threat assessments (bears in parks, muggers in urban areas), and also to assess the status of other human members of team of people who may be working or engaged in recreation together.

Suitable BIRD logic (500) and usage expectations (600) may be employed to determine if the backpack (100.Bkpk) is carrying expecting items (102/102.Act/100.RIFD), as well as determining if there is any anomaly or problem for the authorized user (AU) of the backpack (100.Bkpk).

FIG. 17H

Transport Vehicle with Transit-Specific Sensors, and as Container Item

Person-Scaled Items vs. Motorized Transport Items

Disclosed throughout much of this document are items (100) which are typically small enough and/or light enough to be either handheld, carried on a person, or easily propelled by an un-aided person pulling, pushing on, or lifting the item (100) (in the case of for example luggage (100.LG) or a stroller (100.H)). Typically, such items are smaller than or no larger than, and also typically lighter than, the physical size/weight of a person who may carry or use the item (100). For convenience, such items (100) may be referred to as person-scaled items (100.*psi*). As also discussed throughout this document, such items (100.*psi*) may be readily displaced (503.0), meaning the items may be lost (503.0.1), misplaced (503.0.2), misappropriated (503.0.3), stolen (503.0.4), or be in a states of wandering (503.0.5) with their authorized owners. A BIRD (200), as discussed throughout this document, is a technology which may be employed to help such person-scaled items (100.*psi*) to self assess as either being extant (503.1) or displaced (503.0).

Most of the exemplary items (100) shown in FIG. 1A, above, would be representative of person-scaled items (100.*psi*) (though the baby carriage (100.H) may encroach upon a reasonable size limit, and some power saws (100.L) may similarly tax the size and/or weight limit). Similarly, many portable active items (100.Act), such as cell phones (340, 100.Act.CP) and laptop/tablet computers (345, 100.Act.LC) would also be representative of person-scaled items (100.*psi*).

As further discussed above, some person-scaled items (100.*psi*), such as purses (100.P), wallets (100.W), briefcases (100.B), and similar items, may also be viewed as personal item transport containers (1700), or simply container items (1700). Such container items (1700) are designed for containing and transporting other smaller items, typically person-scaled items (100.*psi*). Such container items (1700) may be configured with a BIRD (200), which in an embodiment is capable of identifying items (100.*psi*) which should be present in the container (1700) but are not present; and equally, of identifying items (100.*psi*) which may in fact be present in the container (1700) but were not expected to be present.

There exist some technologies which share some significant characteristics with person scaled items (100.*psi*), as previously discussed above throughout this document, but which also differ in some significant ways. In particular there are large-scale, motorized transportation technologies (100.Tr), such as automobiles, motorcycles, trucks and buses, and even airplanes and boats, which share some significant qualities with person-scaled items (100.*psi*) as already discussed, but which differ in important ways as well.

Exemplary Motorized Transportation Technology

Illustrated in FIG. 17H is a motorized transportation technology (100.Tr), specifically an automobile (100.Tr.A), which may also be viewed as a container item (1700).

The automobile (100.Tr.A) differs from the person scaled items (100.*psi*) discussed herein in the very obvious sense that it is certainly not hand-held, nor is it transportable on a person. Further—and apart from the rare event of laboriously pushing a stalled vehicle to the side of the road—the automobile (100.Tr.A) is generally not pushed or pulled by a person. To the contrary, it is a person who would sit within an automobile (100.Tr.A), and employ the automobile (100.Tr.A) for purposes of personal transport both for the person and for items (100) the person wishes to retain. Even the smallest motorized transportation technology (100.Tr) (for example, a motor scooter), generally has the a size and weight which is of approximately the same scale as a human being. Typically, a motorized transportation technology (100.Tr) is much larger and much more massive than a person.

Transport Vehicles as Container Item

In an embodiment, transport vehicles (100.Tr) may be viewed as personal item transport containers (1700). As illustrated in FIG. 17H, a car's trunk functions as a transport container (1700) for person-scaled items (100.*psi*). Other compartments within the vehicle (100.Tr.A) may also be viewed as transport containers (1700), including the overall passenger compartment (not shown in the figure) and the glove compartment (also not illustrated in the figure).

The automobile (100.Tr.A) is illustrated with a BIRD (200.C) within the container space (1700) of the trunk, but it will be understood that this is for convenience of illustration only. Elements of a BIRD (200.C) may be distributed throughout the vehicle (100.Tr.A), including having appropriate sensors (210) in or near the container spaces. The BIRD (200.C) may be configured to use various kinds of sensors (210, 210.RFID, 210.C) and communications elements (220, 240, 242) in order to monitor and communicate with BIRDed-items (102) and RFID-tagged items (100.RFID).

As with other container items (1700) discussed above, the automobile's BIRD (200.C) may be configured to store one or more lists of expected items (100), and to determine if those expected items (100) are, or are not present when they should be. Similarly, the BIRD (200.C) may also detect the presence of BIRDed-items (102) and/or RFID-tagged items (100.RFID) which are present when they should not be. Optical sensing and item recognition via one or more cameras (210.C) (not shown in the figure) may extend the capability to identify items (100) which lack both BIRDs (200) and RFID tags (1409).

Transport Vehicles and Extant/Displaced Discrimination

There are other distinctions as well between transport vehicles (100.TR) and person-scaled items (100.*psi*), with respect to ways in which a motorized transportation vehicle (100.Tr) may be extant (503.1) or displaced (503.0). Unlike smaller items (100.*psi*), which can often slip readily out of view or out of sight, or be hidden under other items (100) or papers, etc., transportation vehicles (100.Tr) are not so readily lost from direct line of sight (though on occasion, and from certain angles, they may be hidden from view behind larger vehicles).

Generally, however, an automobile (100.Tr.A) may certainly be extant (503.1), that is present when and where it is expected to be at a given time. Further, an automobile (100.Tr.A) may also be displaced (503.0) in some respects as previously discussed, but not in other respects.

Many of the elements of BIRD technology already discussed above may be employed in conjunction with an automobile (100.Tr.A). In particular, a BIRD (200) associated with an automobile may be provided with usage expectations (600) which are consistent with the authorized user's normal usage of the vehicle. In the event that the vehicle is stolen, the BIRD (200) may be able to identify the stolen status, and send appropriate signal (372) to the authorized user (AU) and/or appropriate authorities.

Lost/Misplaced Vehicle:

In conventional English terminology, an automobile is sometimes said to be "lost" if, for example, a driver has parked their car and then later forgotten where the vehicle is located. However, "loss", as applied to an automobile, tends to blur or merge into the concept of "misplaced," as used elsewhere herein.

The term "lost," as used herein, typically means that a person-scaled item (100.*psi*) has been left behind at some location (104.L) which is not a home base location (140.HB), and often may be identified only as possibly being broadly within the authorized user's daily life location(s) (140.DL). "Misplaced," as used herein, typically refers to an person-scaled item (100.*psi*) which has been left lying around someplace within a home base location (140.HB).

In the sense in which people typically speak of "losing" an automobile (100.Tr.A), a typical instance is a situation where the automobile has been parked somewhere in a large parking lot, and the authorized user (AU) has forgotten exactly where in the lot the car was parked. The general storage or sitting location of the vehicle (100.Tr.A) is known—it's somewhere in the lot (or perhaps, parked on one of a few local streets)—but the more specific location needed for the driver to get to the vehicle is not known.

Thus, what might be conventionally termed a "lost car" may, in the present parlance, be better referred to as a "misplaced" car (100.Tr.A). Whichever parlance is employed, the following will be apparent to persons skilled in the art: If a car (100.Tr.A) is equipped with a BIRD (200), suitable BIRD logic (500) for identifying the BIRDed-car (102) as possibly lost/misplaced may need to be modified in some respects from the parallel BIRD logic (500) for lost (503.0.1) or misplaced (503.0.2) person-scaled items (100.Tr.A).

For example: In an embodiment, a BIRD (200) associated with small items (100.*psi*) is generally configured to self-assess as being lost (503.0.1) or misplaced (503.0.2) even if the authorized user (AU) has not yet noticed the absence of the item (100.*psi*). By contrast, a BIRD (200) associated with a transport vehicle (100.Tr) may, in informal language, have a higher threshold of patience, waiting longer before it would assess itself as being lost/misplaced (503.0.1/503.0.2). The BIRD logic (500) may be configured to assume that the authorized user (AU) will quickly notice if he or she has "lost" their vehicle.

Vehicle/Cell-Phone Link for Vehicle Location and Management:

In an embodiment, an automobile's BIRD (200), as an element of a larger item team (1400), may be configured to assist in the event that the authorized user (AU) identifies his or her automobile (100.Tr.A) as being lost/misplaced in a parking facility (or on the nearby streets, and so on). In particular, the authorized user (AU) may send a signal (possibly in the form of a conventional cellular phone call) from his or her cell phone (100.Act.CP) to the car (100.Tr.A). The automobile's BIRD (200) may be configured to then report its current, specific location (104.L) to the cell phone (100.Act.CP): the mapping features of the cell phone (100.Act.CP) may then guide the authorized user (AU) to the vehicle (100.Tr.A).

Misappropriation:

An automobile (100.Tr.A) is also unlikely to be casually or inadvertently misappropriated. Recall, that "misappropriated" typically refers to a case where a friend or family member, or other associate of the authorized user (AU), has inadvertently picked up an item (100) and carried it away. People do not typically drive away a friend's car inadvertently. And even a family member, including teenagers, should typically know better than to "accidentally" drive off with mom or dad's car.

Borrowing:

However, with suitable iteMetrics (154) and matching interior sensors (210), the automobile (100.Tr.A) may be able to distinguish various authorized users (AU), including distinguishing a primary driver (such as a parent) from borrowing drives (such as teenagers). Should a borrower drive off with a parental car, the BIRD (200) within the automobile (100.Tr.A) may be able to identify the driver and provide suitable responses, such as for example alerting the parents that the automobile (100.Tr.A) has been borrowed (503.1.2), and possibly reporting on driving activity and locations.

Theft:

Automobiles (100.Tr.A), unfortunately, may certainly be stolen just a smaller items may be. BIRD logic (500) and BIRD song (900), as well as corresponding usage expectations (600), for addressing automobile theft may be substantially similar to that for smaller items (100.*psi*), with some suitable adaptations. For example, the morphIteMetrics (156) for distinguishing an authorized driver from an unauthorized driver may take into account authorized driver height and weight (as measured by sensors (210) in the passenger compartment), and possibly also employ direct facial recognition; psyIteMetrics (158) may take into account numerous aspects of an authorized user's style of driving, including typical velocities, accelerations, and other measurable, definable elements of driving behavior. At the same time, the overall usage expectations (600) may include data pertaining to when and where the automobile (100.Tr.A) is expected to be parked or to be in transit (that is, typical detection contexts (123); and also general daily life locations (140.DL) for the vehicle, home base locations (140.HB) for the vehicle, and typical commuting routes (140.CR) for the automobile (100.Tr.A).

In the event that an automobile's BIRD (200) flags a possible theft of the vehicle, the BIRD (200) may be configured to demand suitable user authentication. For example, in an embodiment, the BIRD (200) may first demand a vocal password authentication, and possibly employ voice print identification as well. Suitable BIRD song (900) for theft may include standard notifications (messages) (374) to the authorized user (AU) and to appropriate authorities. However, BIRD song (900) may include further adaptations, such as limiting the speed of the automobile (100.Tr.A) or preventing refueling of the automobile (100.Tr.A). In an embodiment, BIRD song (900) may determine a driving context in order to determine that minimum safe speed for the vehicle (which may vary, for example, between a highway and local roads). In an embodiment, the BIRD (200) may be configured to sound an alarm or set off lights flashing to notify other nearby drivers and authorities of the stolen vehicle. Other such provisions may be provided as well.

Wandering:

An automobile (100.Tr.A) is unlikely to be wandering (503.0.5) in the sense previously defined in this document. Wandering (503.0.5), recall, entails inadvertently carrying an item (100) outside of authorized bounds, such as removing an item by accident from the workplace (for example, because the item (100) has been forgotten in the authorized user's pocket, purse, or briefcase). One rarely if ever drives a car without realizing that one has actually, in fact, driven the car.

FIG. 18A

Recreational/Sporting Goods Items with Item-Specific Sensors

FIG. 18A is an illustration of an exemplary recreation item (100.R), in this case a tennis racquet (100.R.TR), with exemplary integrated BIRD elements (200). These elements, which are integrated into the structure of the racquet (100.R.TR) (but are not shown in detail in the figure) include all elements necessary for BIRD functionality, such as a processor (204), memory (206), a clock/calendar/timer (208), various general environmental sensors (210), a bus (214), one or more batteries (216), communications elements and signaling elements (220, 226, 230, 240, 242), and other elements discussed in conjunction with FIG. 2A and various other figures in this document. Where it would not otherwise interfere with structural or functional requirements, the racquet (100.R.TR) may also employ surface photovoltaic materials to generate extra electricity.

The use of item-specific sensors (210.IS) with sports equipment has multiple benefits which include, for example and without limitation:

- Identifying motions of the equipment which is specific to a particular user. This helps an embedded BIRD (200) to determine, in accordance with iteMetrics (154), if the item of sports equipment (100.R) is, or is not, being used by an authorized user (AU).
- Assuming the equipment (100.R) is being used by an authorized user (AU), the sensor data can help the authorized user (AU) analyze and possibly improve their game play.

Shown in FIG. 18A are exemplary item-specific sensors (210.IS) for the tennis racquet (100.R.TR), including:

- Acceleration sensor (210.IS.A)—Records for later analysis the motion of the player's racquet (100.R.TR), and permits a player (with suitable computer support) to compare the strength of their hitting with that of other players. While one accelerometer is shown, additional accelerometers may be employed as well.
- Fine-grained location sensor (210.IS.FGL)—In an embodiment, this sensor may rely in whole or in part on environment reporting elements (1505) on the tennis court (not shown in this figure), which transmit highly localized court location data. In an alternative embodiment, the fine-grained location sensor may rely on GPS or other sources of location data. The fine-grained location sensor(s) (210.IS.FLG) further supports analysis of the motion of the tennis player's racquet (100.R.TR), and contributes to analysis of game play. The tennis racquet (100.R.TR) may have more than one fine-grained location sensor (210.IS.FGL) to contribute to determinations of racquet rotational movement and torque. The degree of resolution of location determination may vary in different embodiments, but would ideally be on the order of an inch, or a centimeter, or even shorter distances.

Additional fine-grained location sensors (210.IS.FGL) (not shown) may be employed, and be worn by the tennis player on his or her shirt or belt, or embedded with the player's shoes. A combination of such sensors (210.IS.FGL) enables the tennis player, with suitable computer support, to recreate in great detail the player's movement on the court. Such location sensors would be useful for visual/graphical reconstruction and analysis of the tennis player's game, and may supplement any direct video recordings of the game.

- String tension sensor(s) (210.IS.ST)—This sensor determines changes in the string tension as the racquet hits the ball. This data may be used to determine how hard the player is hitting the tennis ball. In addition, the deployment of such tension sensors (210.IS.ST) around the circumference of the racquet's head may permit determination of where on the strings the head hit the tennis ball. This may further contribute to reconstruction and analysis of game play.

Since the weight of a tennis racquet (100.R.TR) itself is clearly important—with light weight usually being preferred—preferred embodiments of sensors (210.IS) and other BIRD components for the racquet will typically employ extremely lightweight, albeit possibly more expensive components.

In an embodiment, and as noted above, a photoelectric material (not shown) on the surface of the racquet (100.R.TR) may be employed to provide electricity for the BIRD. This may permit the battery (260) in the racquet to be removed during game play, reducing weight.

The illustration and discussion of a tennis racquet (100.R.TR) is exemplary only, and should not be construed in any way as limiting. BIRDs (200) with suitable item specific sensors (210.IS) may be integrated into other sporting equipment, including for example and without limitation: Hockey sticks, skates (ice skates and roller skates), baseball bats, football helmets and pads, athletic shoes in general, and even into balls such as tennis balls, basketballs, baseballs, footballs, and similar.

The integration of BIRD elements into sporting goods (100.R) requires careful structural design consideration to maintain light weight overall, and further to maintain careful balance and equal, or at least symmetric, distribution of BIRD-element weight throughout the item (100.R).

FIG. 18B

Child Care Equipment with Item-Specific Sensors

As any parent recognizes, among those "items" most at risk of being found in an anomalous state are those smallish, loud, hungry, endlessly demanding, sometimes joyful, sometimes irritable organic items known as "children." The BIRD (200) is not a sufficiently adaptable technology to alleviate all such anomalous states of a child (and what fun would parenting be if it was?), but a BIRD (200) has its child-specific applications in some contexts.

It is well known that children should not be left in a car unattended, particularly if the temperatures are very hot or very cold outside, since a child can either suffer from heat or cold exposure. However, there are documented occasions when a parent has left a child alone in a car seat in a parked car; in some cases children have died as a consequence. (Typically, this is actually an accident—a parent removes multiple bags of groceries from a car, and gets so engrossed in putting away the groceries, they forget the child.) Incredibly, there have also been instances where a parent has actually left a child seat—with the child strapped in—on the roof or trunk of a car, and then driven off with the undoubtedly mystified child still on top of the car.

Fortunately, where human intelligence fails, or possibly was never present to begin with, a microprocessor can sometimes fill the void.

FIG. 18B is a drawing of an exemplary personal safety system (1800) which includes an exemplary child safety seat (100.H.CSS) with exemplary integrated BIRD elements (200). These elements, which are integrated into the structure of the seat (100.H.CSS) include all elements necessary for BIRD functionality (not all shown in the figure), such as a processor (204); memory (206); a clock/calendar/timer (208); a bus (214); one or more batteries (216); remote communications transceiver(s) (240); local signaling (230); and various general environmental sensors (210), including a location sensor (210.L), a temperature sensor (210.T), an audio sensor (210.AI/C), and a motion sensor (210.M).

In an embodiment, the BIRD's sensors (210) may also include a buckle sensor (210.BU) configured to determine if the child seat belt buckle is fastened; one or more seat pressure sensor(s) (210.SP) specifically situated and configured to detect the weight of a child in the child seat; and a wind velocity/pressure sensor (210.WV-P).

In operation, either or both of the pressure sensor(s) (210.SP) and the buckle sensor (210.BU) are configured, with suitable support from the processor (204) and other BIRD elements, to determine if a child is extant (503.1) in the child seat (100.H.CSS). Additional data may be provided via the audio sensor (210.AC), which may detect typical sounds a child might make. Optical sensor recognition, or other means of identifying the presence of the child in the seat (100.H.CSS), may be employed as well.

Usage expectations (600) are configured to determine the presence of a child (via the sensors (210)), and further to analyze various environmental conditions:

- If a child is extant (503.1) in the child seat (100.H.CSS), and BIRD logic (500) determines that the seat has been motionless for longer than a pre-set amount of time, BIRD song (900) initiates a warning or message that a child may have been left in a car which is parked. In an embodiment, the BIRD (200) may also be configured with an RF link with the car's door locks; upon determination of the potential danger to the child, the BIRD (200) may send a signal to automatically unlock the car doors, so a third party adult outside the car can rescue the child without smashing the car's windows.
- If a child is extant (503.1) in the child seat (100.H.CSS), and the usage expectations (600) determines that the ambient temperature within the vehicle has risen above a safe level, or fallen below a safe level, the BIRD (200.H.CS) initiates a warning or message that the child is in danger due to temperature exposure.

The child seat (100.H.CSS) may be part of an item team (1400) which includes the car (100.Tr.A) (see FIG. 17H). In an embodiment, the BIRD (200) may be configured so that upon determination of the potential danger to the child, the BIRD (200) can send a signal to automatically unlock the car doors. In an embodiment, the BIRD (200) may be configured so that upon determination of the potential danger to the child, the BIRD (200) can activate the car's heating or cooling system, as appropriate.

- If a child is extant (503.1) in the child seat (100.H.CSS), and the BIRD (200) determines that the wind blowing past the child is above an acceptable velocity and/or pressure, the BIRD (200) initiates a warning or message that the child and child seat may have been left on the roof of the car. In an embodiment, the BIRD (200) may also signal that the child's parent or guardian is even more in need of supervision than the child.

FIG. 18C

Eye Glasses with Item-Specific Sensors, and Other Special Considerations for Eye Glasses With increasing miniaturization of components, many items (100) which are small or compact readily lend themselves to the incorporation of BIRD (200) technology, embedded into their structure. Hardware elements necessary to implement BIRD technology can readily be embedded in the frame (1860) of eyeglasses (100.S.G). This is suggested in FIG. 18C with the BIRD icon associated with the glasses shown in the figure. Eyeglasses (100.S.G) lend themselves to additional customizations as well.

Additional Means/Methods of Self-Assessment for Items Subject to Being Covered, Obstructed, or Otherwise Hidden by Other Physical Objects Eyeglasses (100.S.G) are a type of item (100) which readily lend themselves to being set down on a table or desk, or similar. In addition, eyeglasses (100.S.G) tend to be set down with a fairly predictable or reliable spatial orientation. For example, if a user removes his or her glasses, but keeps them open, the glasses are mostly likely to be set down on a table in one of two orientations, either with the lower part of the frame (1860.L) resting on the table, or the upper part of the frame (1860.U) resting on the table.

Eyeglasses (100.S.G), along with other items which may be set on a table, also—unfortunately—lend themselves to getting lost or misplaced by being covered with other items or objects. For example, a near-sighted user may wear glasses (100.S.G) while reading a newspaper or magazine (1870); the reader may get up to take a break from reading, setting down the glasses (100.S.G), and then setting the newspaper or magazine (1870) on top of the glasses. If enough time passes, then when the user later searches for their glasses (100.S.G), he or she has forgotten that the glasses (100.S.G) are under the newspaper/magazine (1870). This effectively renders the glasses (100.S.G) as being misplaced (if in the home, or a home base location (140.HB)), or lost (if the glasses are left behind outside a home base location (140.HB), for example at some public facility).

In an embodiment, the eyeglasses (100.S.G) are configured to determine when they are covered by another object, such as a newspaper or magazine. FIG. 18C illustrates, in a cross-sectional perspective view, an enlarged portion (1862) of the eyeglass frame (1860). In an embodiment, the frame portion (1862) has on top a light-emitting source (1864) such as a photodiode, which can emit light; and also has on top a photodetector (210.Opt) such as a photoresistor or photocell.

In an embodiment, the light emitting source (1864) and the photodetector (210.Opt) are placed so that the photodetector ordinarily is not exposed to light from the light-emitting source (1864). (For example, the light-emitting source (1864) and the photodetector (210.Opt) may be substantially flush with the upper surface of the frame (1860.U), or slightly recessed into the upper surface (1860.U); other configurations may be employed as well.)

However, if the glasses (100.S.G) are covered with a newspaper or magazine (1870) (illustrated in inset 1872, and not drawn to scale), the light (1866) from the light-emitting source (1864) reflects off of the paper or magazine (1870); the reflected light (1868) is detected by the photodetector (210.Opt). BIRD logic (500) and/or usage expectations (600) configure the BIRD (200) to determine that the eyeglasses (100.S.G) are covered. Possibly in combination with other usage criteria (for example, that the eyeglasses have been covered for a certain amount of time, etc.), this triggers the BIRD (200) to issue an alert or message to the user.

In an embodiment, the light-emitting source (1864) and photodetector (210.Opt) may be configured to emit/detect light of a specified frequency. In an embodiment, the specified frequency may be a frequency which is not visible to the user, such as an infrared frequency. In an embodiment, the light-emitting source (1864) may be configured to emit the light in a specific pattern, such as an on-off pattern with a specified timing, so that the photodetector (210.Opt), in combination with BIRD logic (500) and/or usage expectations (600), knows to "look" for the specified light pattern. In an embodiment, and to conserve power, the light-emitting source (1864) may only begin to emit light after the eyeglasses (100.S.G) have been stationary (139.Stat) for longer than a stationary limit (133).

In an embodiment (not illustrated), two photodetectors may be employed. A first photodetector (210.Opt) may be positioned on the frame (1860) to be proximate to the light-emitting source (1864), while a second photodetector (210.Opt) may be positioned on the frame (1860) to be more remote from the light emitting source (1864). The second, remote photodetector (210.Opt) may be used to determine that overall light received at the glasses has been reduced (due to a newspaper, magazine, etc., covering the glasses); while the first, proximate photodetector (210.Opt) detects the reflected light (1868) from the local light emitting source (1864). The contrast in light detection states between the two photodetectors (210.Opt) may aid the BIRD logic (500) in determining the covered state of the eyeglasses (100.S.G).

In an alternative embodiment, the light-emitting source (1864) and/or photodetector (210.Opt) may have placements on the frame (1860) other than or in addition to the placements shown in the figure. For example, the light-emitting source (1864) and/or photodetector (210.Opt) may be placed on the bottom of the frame (1860L) or one or both sides of the frame (1860.S). In an embodiment, additional or alternative means, such as suitably placed surface pressure sensors (210.SP) (not shown in this figure), may be used to determine when the eyeglasses (100.S.G) are covered.

Eye Glasses as Visual Item Diary Recorder

In an embodiment, eye glasses (100.S.G) are equipped with a miniaturized camera (210.C) or video camera (210.V). The camera (210.C/V) is configured to continually capture images of the scene out in front of the glasses (100.S.G), essentially capturing a video diary of everything seen by the authorized user (AU) (eyeglass wearer) for as long as the glasses are worn. In an embodiment, if each captured image is stored as a JPEG file of 200 Kbytes, and if an image is captured just once every five seconds, then images for a continuous 18 hours of eye glass use could be stored in just 2.6 Mbytes of memory, an amount of memory which can be readily stored in the frame of a pair of glasses. In an alternative embodiment, if each image is stored using 0.5 Mbytes per image (allowing either a larger viewing area and/or higher image resolution), and if an image is captured once every second, the storage requirement for a continuous 18 hours of eye glass use still comes to only 13.3 Mbytes. Lower or higher image capture sizes and frame rates may be envisioned as well (no pun(s) intended).

In an embodiment, the captured images may be downloaded from the eyeglasses to a configuration computer (335) or other processing device. In an embodiment, the configuration computer (335) or other processing device is configured with image processing software capable of comparing images of a given item, even when the item is viewed from different angles.

In the course of day, a user may lose an item (100) other than the glasses (100.S.G), setting it down and forgetting where the item was placed. If the item (100) lacks associated BIRD technology, or if the BIRD (200) associated with the item for some reason fails to flag the item as lost and aid in the item's recovery, the daily video diary from the glasses may assist in lost item recovery, through a process summarized here. In an embodiment:

(i) The user downloads from their eyeglasses (100.S.G), to the configuration computer (335), the daily video diary;

(ii) The user employs video viewing software on the configuration computer (335) to scan through the video diary, identifying the last time and place the lost item (100) was seen. This may aid the user in tracking down and recovering the lost item (100).

In an alternative embodiment of this process:

(i) The user downloads from their eyeglasses (100.S.G), to the configuration computer (335), the daily video diary;

(ii) The user activates suitably configured image processing and comparison software—for ease of exposition, refer to this software are Lost Item Finder—on the configuration computer (335).

(iii) Using the Lost Item Finder software, the user opens an image file containing an image of the lost item, or some similar item. In an embodiment, the Lost Item Finder software may contain a library of still images of common items. For example, if the user has lost a cell phone (100.Act.CP), the Lost Item Finder software may already contain images of well known cell phones. The user may select a cell phone image.

(iv) The Lost Item Finder software searches through the daily video diary, and identifies the last frame or frames where the lost item (100) was seen.

(v) The Lost Item Finder software identifies the time that the lost item (100) was last scene, and further presents to the user the image of the lost item, in the context where it was last seen. This may aid the user in tracking down and recovering the lost item.

More On BIRD Configuration and Usage

Figures and discussion throughout this document address the configuration, operations, and usage of a BIRD (200). In an embodiment, BIRDs (200) broadly come in four forms:

- Discrete, self-contained BIRDs (200.Pass) designed to be attached to passive items (100.Pass);
- BIRDs (200) integrated into otherwise passive items (100.Pass);
- Discrete, self-contained BIRDs (200) designed to be connected with active items (100.Act);
- BIRDs (200) integrated into items which are inherently active items (100.Act).

All four types of BIRDs will have broad design similarities in terms of essential functional units and operational components. However, implementation details—for example, processor (204) type, speed, and power; amount of memory (206) required; specific sensor choices (210); choices of ports (226), local signaling (230), and remote transceivers (240), etc.—may vary.

In an embodiment, a BIRD (200) will have built-in BIRD logic (500) for defining, recognizing, analyzing, and interpreting environmental data as extant/normal (503.1/503.3) or displaced/anomalous (503.0/503.2). Substantial response logic (signaling and/or reporting), that is, BIRD song (900) will be built in as well.

BIRDs (200) may also be designed with various default options for the types of items (100) they might attached to, and default types of expected, normal usage.

For example, an Office BIRD (200) may be intended or targeted for use by typical office workers, and also be intended for attachment to typical consumer items carried on a person, such as keys (100.K), wallets (100.W), purses (100.P), and possibly active items such as cell phones (100.Act.CP). Such an Office BIRD (200) may include options for the user to select one of these items (and others) as the target item (100) for attachment. The Office BIRD may also come preconfigured with typical usage expectations (600) based on an assumption of, say, 9-to-5 office hours, a 45 minute commute to the office by car, and standard workdays at work with standard weekends and holidays off. Specific, default usage expectations (600) for keys (100.K), wallets (100.W), etc., may be based on studies or surveys that have been conducted with test users of the BIRD technology. Such profiles will reflect that the users, for example, used their keys for a given percentage of the day, kept their keys in the purses or pockets for the rest of the day, or otherwise reflect how the test users naturally put their items (100) to use. In an embodiment, such default user profiles may even be fine-tuned according to certain standard user profile elements, such as age, gender, and even personality type (based, for example, on Myers-Briggs profiles or similar).

A purchaser of a BIRD (200)—that is, a consumer who uses a BIRD may create their own item profiles (that is, usage expectations (600) for their items) from scratch, using the various exemplary methods discussed above (see for examples FIGS. 10A-10K, and other figures throughout this document), and other methods which may be envisioned as well. Alternatively, a user may adopt the factory-provided, default item profiles, and modify them for their personal needs, again through the application of the various exemplary methods discussed above. In either case, the user will be provided with suitable software and interfaces, which may run on the BIRD (200) and/or on a configuration computer (335), to suitably adapt a BIRD (200) to their particular needs.

BIRD Training

Additional Embodiments

Some of the configuration methods discussed above require the authorized user (AU) to let the BIRD (200) learn about normal item usage during a configuration time period which may, for example, run several days or several weeks. The authorized user (AU) will typically configure a BIRD (200) during this initial training period, during which time it will be recommended that the authorized user (AU) make a careful effort to not lose or misplace an item (100), and equally to keep a watch on the item (100) to ensure that it is not stolen or misappropriated.

In the event that the item (100) is lost or misplaced during the configuration time, the software provided with the BIRD (200) may be configured to allow for the "editing out"—that is, the redaction or cutting—of sensor data (700) collected by the BIRD (200) during the time it was lost or misplaced. Alternatively, the software may provide a means for the user to identify that time period as one in which the item (100) was lost (503.0.1) or misplaced (503.0.2); in that event, the BIRD (200) can use the sensor data (700) collected during the anomalous time period to help distinguish between extant/normal (503.1/503.3) and displaced/anomalous (503.0/503.2) usage.

Stored User Identification for Lost Items

In an embodiment, a BIRD (200) may be configured to store identification and contact information for the BIRDed-item (102). This information may be made accessible to persons other than the authorized user (AU), in the event that the BIRDed-item (102) is lost (503.0.1), and then found by a Good Samaritan. In an embodiment, the BIRD (200) may be configured with a variety of access control features for the identification and contact information.

For example, in an embodiment, the BIRD (200) may be configured so that full contact information may only be accessible to authorities (such as the police) with specialized access codes for BIRDs (200).

In an embodiment, a BIRD (200) may be configured to place phone calls via the cell phone network, or to send e-mails over the internet, or to make other network connections. The BIRD (200) may be further configured so that a good Samaritan, upon finding the BIRDed-item (200), may be able to initiate a BIRD-to-authorized-user phone call or e-mail (or similar network contact), without however actually revealing any identification or contact information to the Good Samaritan.

Other Anomalous Conditions/Contexts

Throughout the discussion above, exemplary uses of a BIRD (200) to self-identify an associated item (100) which is in an undesired state have largely focused on identifying the item (100) as being displaced (503.0), that is, lost (503.0.1), misplaced (503.0.2), misappropriated (503.0.3), wandering (503.0.5), or stolen (503.0.4). However, a BIRD (200) may be used to identify other anomalous item states (503) as well.

General Configuration Considerations

In general terms, a BIRD (200) may be configured to identify an associated item (100) as being in other undesirable states (in addition to, or apart from, being lost (503.0.1), misplaced (503.0.2), misappropriated (503.0.3), wandering (503.0.5), or stolen (503.0.4)) using methods the same or substantially similar to those already identified above.

In an embodiment, an authorized user (AU) or system administrator first identifies a category of condition which the user/administrator considers to be anomalous (503.2) for the item. The anomaly possibility may be associated with a particular user, a particular detection context (typically a given location and/or an indicated time frame). (Exemplary possible anomalies are described immediately below.) The authorized user (ALT)/system administrator then identifies or predicts particular, sensed environmental conditions and/or item states (503) which can be detected via the BIRD's sensors (210), and which may be indicative of the anomaly. The states or conditions are programmed into the BIRD (200) as usage expectations (600). The authorized user (AU) or administrator associates appropriate BIRD logic (900) signal (372) or reports (374) with the usage expectations (600).

In an embodiment, default usage expectations (600) may be factory programmed into the BIRD (200), but may be edited or modified by the authorized user (AU) or system administrator.

In an alternative embodiment, the BIRD (200) may be trained or configured to recognize anomalous conditions by deliberately exposing the BIRDed-item (102) to those conditions during a training period. The authorized user (AU) or system administrator again configures the BIRD (200) with appropriate signal (372) or reports (374) that are to be issued in response to the trained, anomalous states (503.2).

In an embodiment, a BIRD (200) may be configured to detect only anomalous item states (503.2) other than the state of an item being displaced (503.0) (lost, misplaced, misappropriated, wandering, or stolen). In an alternative embodiment, a BIRD (200) can serve dual or multiple uses, being configured to detect displaced item states (503.0), but also being configured to detect additional anomalous item states (503.2) as well.

Exemplar Anomalous Conditions: Inappropriate Item Usage

A BIRD (200) may be configured to determine that, even if its associated item (100) is likely extant (503.1) rather than displaced (503.0), the item (100) is still being used in a way which is possibly anomalous (503.2). This may be useful in various contexts and for various applications, including situations in secure, threat-charged environments.

For example, police officers and prison guards may carry batons. A baton may be used at times to subdue and/or defend against prisoners or other hostile persons. In an embodiment, a baton with an embedded/integrated BIRD (200) can detect motions of the baton indicative of the baton being put to use, such as abrupt and rapid swinging motions, and other motions which may be signatures of a baton for use in physical conflict/defense. The baton with integrated BIRD (200) may be configured to emit an alarm signal, immediately alerting other nearby officers or guards that a colleague may be in danger. The baton with integrated BIRD (200) may also be configured to transmit an emergency report to an emergency control center (355).

In an embodiment, the baton may include an audio sensor (210.AC/AI) and/or image sensor (210.C, 210.V) to convey to the emergency control center (355) environmental data for the baton. In an embodiment, the baton's BIRD (200) may have iteMetric training to recognize the particular style of emergency use of the baton associated with the baton's authorized user (AU) (that is, a style or pattern of swinging or other offensive/defensive movements). In the event the baton is acquired and used by an unauthorized user (UU), the BIRD (200) may be able to identify the anomalous usage style (that is, anomalous style of swinging or other offensive/defensive motions) of the unauthorized user (UU), further signaling that the authorized user (AU) may have lost control of the baton.

For another example, a power tool, such as a chain saw or circular saw, may also be equipped with embedded/integrated BIRDs (200). A usage expectation (600) for the saw may indicated that if: (i) the saw is active (that is, the blade is in motion), but (ii) the saw as a whole is motionless for more than a designated period of time, this may indicate an anomalous state (503.2). (For example, the active saw may have been left unattended, posing a possible danger to any persons, such as children, who may be nearby. Or, the user of the saw may have been injured by the saw, and is incapacitated.) In either event, the saw may issue appropriate signal (372) and messages (374).

Other, tool-appropriate usage expectations may be defined for other types of tools, both manual tools and hand-held. Analogous safety considerations and other considerations may apply to defining or specifying usage expectations (600) for a wide variety of other household and industrial items (100) with associated BIRDs (200), including for example and without limitation: kitchen appliances, cleaning tools and appliances, and yard tools and appliances.

Exemplary Anomalous Conditions: Threatening, Hostile, or Unsuitable Environment

A BIRD (200) may be configured to determine if an item (100) is in a threatening, hostile, or unsuitable environment, which may damage the BIRD (200) and its associated item (100), or which may be dangerous to the person possessing the item (100). This may be particularly useful for items (100) which are used in dangerous exploratory, industrial, or security contexts, where an authorized user (AU) may be continually exposed to environmental risks.

For example, a person working in a known dangerous environment may have a BIRD (200) configured to alert the authorized user (AU) if the user wanders in a zone or region known to be particularly dangerous. In a mining environment or in a chemical factory, a BIRD (200) may be configured to report if known dangerous chemicals or vapors are detected beyond an acceptable concentration.

An authorized user (AU) may be a police officer. The officer may have multiple items (100) with multiple BIRDs (200), all having a camera (210.C). One or more of the BIRDs (200) may, in normal use, be exposed to light (that is, not hidden within a pocket or similar). In that event, the BIRDs (200), either alone or in cooperation as an item team (1400), may be configured to recognize hostile persons, for example based on detection of guns or knives in hand, detection of known "gang" tattoos or clothing signatures, or similar criteria. In this way, one or more BIRDs (200) may provide a police officer with electronic "eyes" behind their heads and backs, increasing police officer safety. If a police officer or other law enforcement person is engaged in pursuit of a specific known felon or suspect, the BIRDs (200) may be programmed for facial recognition of the particular individual being sought. Other forms of recognition, such as sound and voice recognition, may be employed as well.

In regions prone to earthquakes, a BIRD's processor (204) may be programmed to use data from the motion sensor (210.M) and/or vibration sensor (210.B) to provide early warning detection of a possible earthquake. If authorized by the BIRD's authorized user (AU), a BIRD (200) may participate as part of a wide area team (1400) of BIRDs (200) which share motion and vibration data, creating a wide-area early warning system for earthquakes.

Shared, Cloud-Based, Distributed, or Delegated Processing

The present document is entitled "System And Method For Item Self-Assessment As Being Extant Or Displaced." Consistent with the title, discussion above has generally been directed towards embodiments wherein a BIRD (200), which is substantially collocated with an item (100), enables the BIRDed-item (102) to self assess its state as extant/borrowed/normal (503.1/503.1.2/503.3), or as displaced (503.0) (lost, misplaced, misappropriated, wandering, or stolen), or otherwise being in an anomalous state (503.2). The self-assessment capability is generally associated with the on-board processor (204) of the BIRD (200), which can analyze the appropriate sensor data (700) to make the appropriate extant/normal (503.1/503.3) vs. displaced/anomalous (503.0/503.2) assessments.

However, in an alternative embodiment, a BIRD (200) may rely in part or in whole on shared, cloud-based, distributed, and/or delegated processing to arrive at appropriate extant/normal (503.1/503.3) vs. displaced/anomalous (503.0/503.2) assessments.

In an embodiment, a BIRD (200) may employ remote communications transceivers (242) to communicate data with other local BIRDS (200), for example other members of an item team (1400), or with remote data processing units/centers (335, 345, 355, 365). The BIRD (200) may share, off-load, or delegate to processors associated with an item team (1400) or to processors associated with remote data processing centers (335, 345, 355, 365) some or all tasks associated with extant/normal (503.1/503.3) vs. displaced/anomalous (503.0/503.2) determinations. The BIRD (200) may then receive back from the remote processor(s) conclusory data, or additional support, for its local extant/normal (503.1/503.3) vs. displaced/anomalous (503.0/503.2) assessments. Similarly, as a member of an item team (1400), the BIRD (200) may support similar assessments by other members of the item team (1400).

The assessment methods employed by remote processors may be the same or substantially similar to those disclosed throughout this application. However, the addition of further processors may enable or support faster or more detailed processing of some data. For example, various iteMetric determinations (such as facial recognition or user-identity assessments based on motion) may be enhanced with the support of remote processing.

Non-Equivalence of Local vs. Remote Processing

In an embodiment, remote data processing (or other off-loaded data processing) is not fully equivalent to local data processing by the BIRD's on-board processor (204), even if the item state evaluation methods are the same or substantially similar. For example, to be effective, remote data processing of BIRD sensor data (700) may require substantially sustained wireless communications between the BIRD (200) and the remote data processing units/centers (335, 345, 355, 365) and/or item team members (1400). Such sustained wireless communications may place a greater drain on the BIRD's battery (216), reducing the overall field life of the battery (216).

Additionally, the requirement for sustained wireless communications may result in the BIRDed-item (102) becoming more vulnerable to operational failure if the BIRDed-item (102) is in an environment which isolates the BIRD (200) from wireless communications. The risk of compromise of item data privacy may be an additional undesirable aspect of off-loaded, remote, and/or cloud-based processing support for the BIRD (200). Even the fact of "announcing" its presence in an environment, via the broadcast of RF signals, may in some contexts be an undesirable outcome of off-loaded, remote, and/or cloud-based processing support for the BIRD (200).

There may be other significant, practical, operation distinctions as well between local processing by the BIRD (200) versus off-loaded, remote, and/or cloud-based processing.

In an embodiment, the BIRD (200) may be configured to rely principally upon its local process (204); but may also be configured, under special circumstances to seek out additional (remote or cloud-based processor) support when deemed necessary. For example, in an embodiment, the BIRDed-item (102), upon making a determination (based on various factors) that it may be displaced (503.0), may then seek remote processing support for such tasks as signal processing involved in image-based identification of the environment, or in current user identification.

Geographic Area Assessments Based on Multiple Items

In an embodiment, a LARC (355) or other centralized item support center may receive on-going data streams from multiple items (100).

In an exemplary application, data servers at the LARC (355) may receive data streams from multiple items (100) within a circumscribed geographic area, all indicative of some possibility that the items (100) may have been removed from their authorized owners. The LARC (355) may make an assessment of heightened theft probability. In response, the LARC (355) may broadcast, to BIRDed-items (102) within the geographic area, instructions or suggestions to modify threshold parameters for lost item state (503.0.1). Similarly, the LARC (355) may also broadcast a direct warning (to the BIRDed-item (102) or via cell phone or similar) to authorized owners in the area to be aware of possible item theft.

In another exemplary application, data servers at the LARC (355) may receive data streams from multiple items (100) within a very localized area, indicative of all the items not being with their authorized owners. Or, alternatively, the LARC (355) may determine that multiple items (100) in a highly localized area have ceased transmitting their data. Based on such an assessment, the LARC (355) may determine a possibility that stolen items (100) are being stored at a specific location, and the LARC (355) may advise appropriate authorities to this possibility.

FIG. 19

BIRD Data Privacy and Data Sharing

Data privacy, as well as data sharing, are important considerations for many modern information processing technologies. FIG. 19 illustrates an exemplary Item Data Privacy Options dialog box (1900) enabling a user of a BIRD (200) to control data privacy for a BIRD (200) and its associated item (100) and user.

A first section (1902) of the Item Data Privacy Options dialog box (1900) includes options for determining how usage data (700.U) is retained for the BIRD (200). A second section (1908) of the dialog box (1900) contains similar data retention options for all members of an item team (1400) of which the BIRD (200) is a member. A check box enables the user to determine whether or not item team settings override settings for the individual BIRD (200).

A third section (1910) of the dialog box, pertaining to data sharing, enables the authorized user (AU) to determine whether item data or event events collected by the BIRD (200) will be shared with various external services, other users, and/or item teams.

A final sharing section (1912) of the dialog box (1900) enables the authorized user (AU) to determine to what extent, if any, the BIRDed-item (102) will participate in, or drown in—depending on one's values and views of such things—the greatest or most greatly irritating first invention of the 21$^{st}$ century: digital social networking. May the Powers That Created The Universe help us all.

There was a time when, if any item (100) was lost, it was lost somewhere in the village; and perhaps an individual, that is, a member of the village and the owner of the item (100), could even trust that some other member of the village would find the item (100) and return it to the rightful owner. Social networking meant sitting on the porch with the kin and friends, or maybe going to the local church dance. Of course, this was back in a time when items (100) were not generally labeled with numbers, and for that matter, neither were people. It was a time when a tweet was something done by a bird and not a cell phone, and for that matter, people appreciated birds not for their microprocessors but rather for their morning songs, their glorious plumage, and their soaring flight. Better still, there was enough peace and quiet so that the members of the village could actually hear all the natural bird song without having to go to a park or to a zoo.

Life was simpler back then, and more peaceful. But, less profitable.

CONCLUSION

As will be appreciated by persons skilled in the relevant art(s), while the present teachings, systems, and methods are described in conjunction with various embodiments, it is not intended that the present teachings, systems, and methods be limited to such embodiments. On the contrary, the present teachings, systems, and methods encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

More generally, and with respect to methods, software, and hardware, many of the elements described herein could, in alternative embodiments of the present systems and methods, be configured differently within the scope and spirit of the present invention. In addition, additional elements, or a different organization of the various elements, could still implement the overall effect and intent of the present systems and methods.

What is claimed is:

1. A method for a device to self-assess a state of a portable item as being one of extant and displaced, the device configured for use when the device is in sustained collocation with the portable item, the method comprising:

storing in a memory of the device:

a detection context which comprises at least a date and time interval; and at least one item usage expectation which is associated with the detection context and which:

comprises at least a description of an environmental phenomena which an environmental sensor of the device is configured to detect, wherein said environmental phenomena is at least an expected location where the portable item is expected to be during the date and time interval of the associated detection context;

is indicative of a first possible state of the portable item as being extant, wherein the portable item is subject to an expected environment which is associated with the detection context; and is indicative of a second possible state of the portable item as being displaced, wherein the portable item is subject to another environment, said another environment being other than the expected environment which is associated with the detection context;

wherein the date and time interval and the associated expected location are locally stored at the portable item;

obtaining, via the environmental sensor, usage data for the portable item, wherein the usage data is indicative of a substantially current environment of the portable item;

comparing via a hardware processor of the device the usage data with the at least one item usage expectation;

assessing by the hardware processor, via the comparing, whether the portable item is extant or displaced; and wherein in response to the assessment, at least, signaling an alert that the portable item is displaced upon detecting that the portable item is not located at the expected location during the associated date and time interval.

2. The method of claim 1, wherein being extant comprises the portable item being at or within the expected location during the date and time interval of the detection context.

3. The method of claim 1, wherein the usage expectation further comprises identity-related data indicative of an authorized user of the portable item, wherein the portable item is expected to be associated with the authorized user during the date and time interval of the detection context.

4. The method of claim 1, wherein:

being extant comprises the portable item having an expected personal motion status; and being displaced comprises the portable item having another personal motion status which is other than the expected personal motion status.

5. The method of claim 1, wherein:

being extant comprises the portable item being one of possessed by an authorized user and most recently having been possessed by the authorized user; and being displaced further comprises the portable item being one of possessed by an unauthorized user and most recently having been possessed by the unauthorized user.

6. The method of claim 1, wherein the at least one item usage expectation for the expected environment comprises at least one of:

(a) the expected location;

(b) a personal motion status;

(c) an on-person/off-person status; and (d) identity-related sensed data indicative of an authorized user associated with the portable item.

7. The method of claim 6, wherein:

the at least one usage expectation for the expected environment comprises at least two of elements (a), (b), (c) and (d), and;

the assessing by the hardware processor, via the comparison, of whether the item is extant or displaced comprises assessing at least one subsidiary state of being displaced from among a plurality of subsidiary states;

wherein said plurality comprises at least two of a lost state, a misplaced state, a misappropriated state, a stolen state, and a state of wandering; and wherein the misappropriated state is indicative that the portable item is in accidental use by an unauthorized user who is an associate of the authorized user.

8. The method of claim 1, wherein the environmental phenomena comprises at least one of:

(a) the location of the portable item;

(b) a personal motion of the portable item;

(c) a light intensity impinging on the portable item;

(d) a sound intensity impinging on the portable item;

(e) an identifiable image property of an environment surrounding the portable item;

(f) an identifiable sound property of the environment surrounding the portable item;

(g) a temperature of the environment surrounding the portable item;

(h) a moisture or humidity of the environment surrounding the portable item;

(i) an electromagnetic energy of the environment surrounding the portable item;

(j) a chemical in the environment surrounding the portable item; and (k) a physiological property of a person in proximity to the portable item.

9. The method of claim 8, wherein the expected environment comprises two or more of elements (a), (b), (c), (d), (e), (f), (g), (h), (i), (j) and (k); and;

the assessing by the hardware processor, via the comparison, of whether the item is extant or displaced comprises assessing at least one subsidiary state of being displaced from among a plurality of subsidiary states;

wherein said plurality comprises at least two of a lost state, a misplaced state, a misappropriated state, a stolen state, and a wandering state;

wherein the state of being misappropriated is indicative that the portable item is in accidental use by an unauthorized user who is an associate of the authorized user.

10. The method of claim 1, wherein the at least one usage expectation for the expected environment further comprises an expected internal status of the item.

11. The method of claim 1, wherein the assessing further comprises:

distinguishing, via the hardware processor a plurality of mutually exclusive possible displaced states of the portable item, said possible displaced states comprising:

a lost state;

a misplaced state; and a wandering state.

12. The method of claim 11, further comprising distinguishing via the hardware processor among the states of the portable item as being extant, the lost state, the misplaced state, or the wandering state by:

determining based on data from a location sensor of the device and a clock/calendar/timer of the device, whether the portable item has a status of being absent without leave (AWOL), wherein the portable item is other than present at an expected home base location associated with the detection context, during the date and time interval of the detection context;

determining, based on data from at least one sensor of the portable item whether the item has one of a status of being on-person and off-person;

upon a determination that the portable item has a status of being off-person, determining a motion status wherein:

if the portable item has the status of being off-person for one of less than and equal to an allowed time limit, then the portable item has a motion status of being stationary; and if the portable item has the status of being off-person for greater than the allowed time limit, then the portable item has a motion status of being stagnant; and based on the determination of the AWOL status, the on-person/off-person status, and the motion status, assessing whether the portable item is in a state of being extant, lost, misplaced, or wandering.

13. The method of claim 12, wherein the assessing further comprises:

distinguishing, via the hardware processor, a plurality of additional mutually exclusive possible displaced states of the portable item, said additional mutually exclusive possible displaced states comprising one of:

a misappropriated state indicative that the portable item is in accidental use by an unauthorized user of the portable item who is an associate of an authorized user of the portable item; and a stolen state;

wherein:

the lost state, the misplaced state, and the wandering state reflect the portable item being associated with the authorized user of the portable item; and the misappropriated state and the stolen state reflect the portable item being associated with a person who is other than the authorized user.

14. The method of claim 1, wherein the assessing further comprises:

distinguishing via the hardware processor, a plurality of possible displaced states of the portable item, said possible displaced states comprising at least one of:

a lost state;

a misplaced state;

a misappropriated state indicative that the portable item is in accidental use by an unauthorized user who is an associate of the authorized user;

a stolen state; and a wandering state.

15. The method of claim 14, wherein the distinguishing comprises:

comparing, via the hardware processor of the device the usage data with a set of usage expectations that pertain to a set of expected item statuses of the portable item, the set of expected item statuses comprising at least two of:
an absent without leave status;
a personal motion status;
an expected location status; and
a set of identity-related sensed data indicative of an authorized user of the item.

16. The method of claim 1, wherein the assessing further comprises:
distinguishing, via the hardware processor, a state of being borrowed, the borrowed state being a subsidiary state of the extant state, wherein said borrowed state is characterized by the portable item being possessed by a secondary authorized user who is other than a primary authorized user.

17. The method of claim 1, wherein said detection context is selected from among a plurality of detection contexts by a comparison of a schedule of detection contexts of said item with a current date and time.

18. A non-transitory, physical storage medium storing processor-executable code, which when executed by a hardware processor of a processor-based device associated with a portable item, assesses a state of the portable item, the processor-executable code comprising:
first executable code to store in a memory of the device:
a detection context which comprises at least a date and time interval; and
at least one item usage expectation which is associated with the detection context and which:
comprises at least a description of an environmental phenomena which an environmental sensor of the device is configured to detect, wherein said environmental phenomena is at least an expected location where the portable item is expected to be during the date and time interval of the associated detection context;
is indicative of a first possible state of the portable item as being extant, wherein the portable item is subject to an expected environment which is associated with the detection context; and
is indicative of a second possible state of the portable item as being displaced, wherein the portable item is subject to another environment, said another environment being other than the expected environment which is associated with the detection context;
wherein the date and time interval and the associated expected location are stored locally at the portable time;
second executable code to obtain, via the environmental sensor, usage data for the portable item, wherein the usage data is indicative of a substantially current environment of the portable item;
third executable code to compare, via a hardware processor of the device, the usage data with the at least one item usage expectation;
fourth executable code to assess, by the hardware processor, via the comparing, whether the portable item is extant or displaced; and
fifth executable code which, in response to the assessment, signals an alert that the portable item is displaced upon detecting the portable item is not located at the expected location during the associated date and time interval.

19. The non-transitory, physical storage medium of claim 18, further comprising:
fifth executable code to select said detection context from among a plurality of detection contexts by a comparison of a schedule of detection contexts of said portable item with a current date and time.

20. A device configured to be operated while substantially collocated with a portable item, and configured to self-assess a state of the portable item, comprising:
a hardware processor;
a memory; and
an environmental sensor;
wherein:
the memory stores executable code that, when executed by the hardware processor, causes the device to store a detection context and store an item usage expectation associated with the detection context, wherein:
said detection context comprises at least a date and time interval; and
said associated item usage expectation comprises an expected environment which the environmental sensor is configured to detect, wherein said expected environment comprises at least a location where the portable item is expected to be during the date and time interval of the detection context; and wherein:
said usage expectation is indicative of a first possible state of the portable item as being extant, wherein the portable item is subject to the expected environment associated with the detection context; and
said usage expectation is indicative of a second possible state of the portable item as being displaced, wherein the item is other than subject to the expected environment associated with the detection context;
wherein the date and time interval and the associated expected location are locally stored at the portable item;
the environmental sensor is configured to obtain usage data for the portable item, wherein the usage data is indicative of a substantially current environment of the portable item;
the hardware processor is configured to perform a comparison of the usage data with the stored item usage expectation;
the hardware processor is configured to assess, via the comparison, whether the item is one of extant or displaced; and
wherein in response to the assessment, the hardware processor is configured to at least signal an alert that the portable item is displaced upon detecting the portable item is not located at the expected location during the date and time interval of the detection context.

21. The device of claim 20, wherein the device is configured to determine the associated usage expectation based on an historical usage of the portable item by an authorized user of the portable item.

22. The device of claim 20, wherein the device is configured to receive the associated usage expectation from a user interface.

23. The device of claim 20, wherein:
the device is configured to be at least one of coupled to or integrated into an item which has at least one of an internal item sensor and an internal item hardware processor;
the associated item usage expectation further comprises an expected internal operational state of the portable item;
the internal item sensor is configured to obtain a real-time internal operational status of the portable item; and the internal item hardware processor is configured to perform the self-assessment that the portable item is extant or displaced based on at least one of:

a comparison of the real-time internal operational status of the portable item with the expected internal operational state; and a combination of:

the comparison of the real-time internal operational status with the expected internal operational state; and the comparison of the usage data with the expected environment of the item usage expectation.

24. The device of claim 23, wherein the hardware processor is configured to alter an internal item state associated with the internal operational status of the portable item in response to the self-assessment that the portable item is displaced.

25. The device of claim 20, further comprising a primary power source and a secondary power source, both of which are structurally integrated into the device, wherein:

the secondary power source is configured to sustain essential power in the event the primary power source is at least one of failed and is disabled.

26. The device of claim 20, further comprising:

a coupling configured to sustain the substantial collocation of the device and the portable item; and a link integrity detector configured to monitor an integrity of the coupling.

27. The device of claim 20, wherein the hardware processor is configured to select said detection context from among a plurality of detection contexts by a comparison of a schedule of detection contexts of said portable item with a current date and time.

28. A method to assess a state of a portable item as being extant or being displaced, the method comprising:

storing locally, at the portable item, in a memory which is configured for use when coupled with or embedded within the portable item, a schedule comprising a plurality of date and time intervals associated with a use or storage of the portable item during said plurality of date and time intervals;

storing locally, at the portable item, in the memory a plurality of respective usage expectations associated with the plurality of date and time intervals, wherein each respective usage expectation comprises an expected location where the portable item is expected to be during the associated date and time interval;

determining via a hardware processor, which is coupled with the memory and configured for use when coupled with or embedded within the portable item, a specific current date and time interval corresponding to a real-time current date and time;

determining via the hardware processor the respective usage expectation associated with the specific current date and time interval;

receiving in real time from one or more environmental sensors, which are coupled with the hardware processor, configured for use when coupled with or embedded within the portable item, and configured at least for location detection, a current location for the portable item;

comparing, via the hardware processor, the current location with the expected location comprising the respective usage expectation;

assessing by the hardware processor, based on the comparison, whether during the during the current date and time interval the portable item is located within the expected location;

evaluating by the hardware processor a relative likelihood that the portable item is extant or displaced, wherein:

assessing that the portable item is located within the expected location indicates a likelihood that the portable item is extant;

assessing that the portable item is not located within the expected location indicates a likelihood that the portable item is displaced; and in response to the assessment, at least, signaling via the hardware processor an alert that the portable item is displaced upon detecting the portable item is not located at the expected location during the associated date and time interval.

29. The method of claim 28, wherein:

at least one respective usage expectation comprises a plurality of locations, said plurality of locations comprising:

the expected location for the portable item; and an allowed location where the portable item is allowed to be the during the associated date and time interval, said allowed location being a region that is larger than the expected location and that contains the expected location;

and wherein the method further comprises:

comparing via the hardware processor the current location with the plurality of location(s) comprising the at least one usage expectation;

assessing via the hardware processor, based on the comparison, whether during the current date and time interval the portable item is at least one of:

located within the expected location, and located with the allowed location; and evaluating via the hardware processor a relative likelihood that the portable item is extant or displaced, wherein:

an assessment that that portable item is located within the expected location is indicative of a likelihood that the portable item is extant, as indicated by a first probability that the portable item is extant rather than displaced;

an assessment that the portable item is not located within the expected location but is located within the allowed location is also indicative of the likelihood that the portable item is extant, as indicated by a second probability that the portable item is extant rather than displaced, wherein the second probability is of a lower probability than the first probability likelihood; and an assessment that the portable item is not located within the expected location and is further not located within the allowed location is indicative of a likelihood that the portable item is displaced.

30. The method of claim 28, further comprising:

storing locally at the portable item, in the memory, a second plurality of respective second usage expectations associated with the plurality of date and time intervals, wherein:

each second usage expectation comprises a second expected environmental condition for the portable item which is for a type of environmental condition other than for location; and sensing, via the one or more environmental sensors which are associated with the portable item a second environmental condition of the portable item, wherein:

the sensed second environmental condition pertains to the same type of environmental condition which is other than location as the second plurality of respective second usage expectations;

retrieving from the memory a second current usage expectation associated with the specific current date and time interval;

comparing via the hardware processor:

the sensed second environmental condition; and the second expected environmental condition of the current second usage expectation; and assessing by the hardware processor the relative likelihood that the portable item is extant or displaced, based on:

the assessing of whether the portable item is located within the expected location; and an assessing of whether the sensed second environmental condition is substantially in conformance with the second expected environmental condition.

31. The method of claim 28, further comprising:

sensing via the one or more environmental sensors a supplemental environmental data which is indicative of a possession of or usage of the portable item by an authorized use of the portable item;

determining via the hardware processor, based on the supplemental environmental data, that the portable item is at least one of:

on-person of the authorized user of the portable item;

has been on-person of the authorized user within a specified time period immediately prior to the current time; and has been used by, possessed by, or in control of the authorized user within the specified time period immediately prior to the current time; and based on the determining, assessing an increased likelihood that the portable item is extant and a decreased likelihood that the portable item is displaced, wherein:

said relative changes in likelihoods are relative to the likelihoods assessed based only on the determinations of whether the portable item is located within the expected location.

32. The method of claim 28, further comprising:

storing locally at the portable item, in the memory, a second plurality of respective second usage expectations associated with the plurality of date and time intervals, wherein each second usage expectation comprises:

a profile of sensor data obtainable from the one or more environmental sensors, said profiles defining on-person/off-person statuses, said on-person/off-person statuses being indicative of the portable item being:

on the person of a user;

off the person of a user for up to an allowed amount of time whereby the item is stationary; or off-person of a user for longer than the allowed amount of time whereby the item is stagnant;

storing locally at the portable item, in the memory, a third plurality of respective third usage expectations associated with the plurality of date and time intervals, wherein each third usage expectation comprises sensor criteria for an Absent WithOut Leave (AWOL) status, said AWOL status being indicative that:

the item is not within the expected location where the portable item is expected to be at the current date and time; and the portable item is within a home base location or daily life location where it is allowed to be at some points in time;

comparing an historical and current real-time sensor data with:

the usage expectations for expected location;

the usage expectations for the item being on-person, stationary, or stagnant; and the usage expectations for the portable item being AWOL or not AWOL;

based on the comparing, distinguishing by the hardware processor an appropriate current item sub-state from a plurality of item sub-states of being extant or displaced, the plurality of sub-states comprising:

the extant state, wherein said portable item is present when and where the portable item is expected to be and the portable item is not stagnant;

a lost state, wherein said portable item is not present when and where the portable item is expected to be, the portable item is not anywhere within any of its expected, localized storage locations or home base locations, and the portable item is stagnant;

a misplaced state, wherein said portable item is at least one of:

present when and where the portable item is expected to be, but stagnant, and not present when and where the portable item is expected to be, but is somewhere within one of the portable item's expected, localized storage locations or home base locations, and the portable item is stationary or stagnant; and at least one of a stolen state and a wandering state, wherein said portable item is in possession of a user, but is not present when and where the portable item is expected to be.

33. The method of claim 32, further comprising:

storing locally at the portable item, in the memory, a profile of itemetric data obtainable from the one or more environmental sensors which is indicative of an authorized user of the portable item;

comparing the historical and current real-time sensor data with:

the profile of itemetric data which is indicative of the authorized user; and the usage expectations for expected location; the usage expectations for the item being on-person, stationary, or stagnant; and the usage expectations for the portable item being AWOL or not AWOL;

based on the comparing, distinguishing an appropriate item sub-state from a plurality of item sub-states of being extant or displaced, the plurality of sub-states comprising:

the extant state, wherein said portable item is:

present when and where it is expected to be;

is at least one of on-person of the authorized user, in possession of the authorized user, or under control by the authorized user; and is not stagnant;

a lost state, wherein said portable item is not present when and where the portable item is expected to be, is not in possession of the authorized user but was last in possession of the authorized user, is generally not anywhere within any of its expected, localized storage locations or home base locations, and is stagnant;

a misplaced state, wherein said portable item is not present when and where the portable item is expected to be, is not in possession of the authorized user but was last in possession of the authorized user, is somewhere within one of the portable item's expected, localized storage locations or home base locations, and is stationary or stagnant;

a stolen state, wherein said portable item is in possession of an unauthorized user or was last in possession of the unauthorized user, wherein said unauthorized user is any user other than the authorized user; and a wandering state, wherein said portable item is in possession of the authorized user, and is not present when and where it is expected to be.

34. The method of claim 33, further comprising:

storing locally at the portable item, in the memory, a profile of itemetric data obtainable from the one or more environmental sensors which is indicative of at least two of:

a primary authorized user of the portable item;

a secondary authorized user of the portable item who is thereby a borrower of the portable item; and a known associate of the primary authorized user of the portable item who is other than the secondary authorized user;

comparing the historical and current real-time sensor data with:

the profile of itemetric data which is indicative of the at least two of the primary authorized user, the secondary authorized user who is a potential borrower, and the known associate who is other than the secondary user;

the usage expectations for expected location; the usage expectations for the item being on-person, stationary, or stagnant; and the usage expectations for the portable item being AWOL or not AWOL;

based on the comparing, distinguishing an appropriate item sub-state from a plurality of item sub-states of being extant or displaced, the plurality of sub-states comprising:

an extant with a primary user state, wherein said portable item is:

present when and where the portable item is expected to be; and is at least one of is on-person of the primary authorized user, in possession of the primary authorized user, or under control by the primary authorized user;

a borrowed state, wherein said portable item is:

present when and where the portable item is expected to be;

is at least one of is on-person of the secondary authorized user, in possession of the secondary authorized user, or under control by the secondary authorized user; and is not stagnant;

a lost state, wherein said portable item is not present when and where the portable item is expected to be; is not in possession of the authorized user, the borrower, or the known associate; is not anywhere within any of its expected, localized storage locations or home base locations; and is not stagnant;

a misplaced state, wherein said portable item is not present when and where the portable item is expected to be; is not in possession of the authorized user but was last in possession of the authorized user, the borrower, or the known associate; is somewhere within one of the portable item's expected, localized storage locations or home base locations; and is stationary or stagnant;

a misappropriated state, wherein said portable item is in possession of the known associate of the primary authorized user who is other than the secondary authorized user;

a stolen state, wherein said portable item is in possession of an unauthorized user or was last in possession of the unauthorized user, wherein said unauthorized user is any user other than the authorized user, the borrower, or the known associate; and a wandering state, wherein said portable item is in possession of the authorized user or the borrower, and is not present when and where the portable item is expected to be.

35. The method of claim 28, further comprising:

storing locally at the portable item, in the memory, a usage data associated with the item, said usage data comprising at least an historical record of sensor data associated with the item; and defining via the hardware processor, based on the usage data, at least a respective usage expectation of the plurality of usage expectations, and associated with a respective date and time interval.

36. The method of claim 35, further comprising:

defining the respective usage expectation associated with the respective date and time interval based on detection of a substantially consistent pattern of historical usage of the portable item during a plurality of date and time intervals.

37. An electronic system configured to be operated while being at least one of coupled to, attached to, or embedded within a portable item, and further configured to assess a state of the portable item; said electronic system comprising a memory, a hardware processor, and one or more environmental sensors including at least a first sensor configured for location detection of the portable item, wherein:

the memory stores first executable code that, when executed by the hardware processor, causes the device to store locally, at the portable item:

a schedule comprising a plurality of date and time intervals associated with a use or storage of the portable item during said date and time intervals;

a plurality of respective usage expectations associated with the plurality of date and time intervals, wherein each respective usage expectation comprises an expected location where the portable item is expected to be during the associated date and time interval;

the one or more environmental sensors are configured to obtain an environmental data (700.R) for the portable item; and and the hardware processor is configured to:

identify in real-time a current date and time interval, from among the plurality of date and time intervals on the schedule, which corresponds to a current real-time date and time;

identify the respective usage expectation associated with the current date and time interval;

receive in real time from the first sensor a current location for the portable item;

compare the current location with the expected location comprising the respective usage expectation;

assess, based on the comparison, whether during the during the current date and time interval the portable item is located within the expected location; and evaluate a relative likelihood that the portable item is extant or displaced, wherein:

if the hardware processor assesses that the portable item is located within the expected location, the hardware processor assesses a likelihood that the portable item is extant; and if the hardware processor assesses that the portable item is not located within the expected location, the hardware processor assesses a likelihood that the portable item is displaced, wherein in response to the assessment, at least, signaling an alert that the portable item is displaced upon detecting the portable item is not located at the expected location during the associated date and time interval.

38. A non-transitory, physical storage medium storing processor-executable code, which when executed by a hardware processor of a processor-based device associated with a portable item, assesses a state of the portable item, the processor-executable code comprising:

first executable code to store locally, at the portable item, in a memory of the hardware-processor-based device a schedule comprising a plurality of date and time intervals associated with a use or storage of the portable item during said date and time intervals;

second executable code to store locally, at the portable item, in the memory of the hardware-processor-based device a plurality of respective usage expectations associated with the plurality of date and time intervals, wherein each respective usage expectation comprises an expected location where the portable item is expected to be during the associated date and time interval;

third executable code to identify in real-time a current date and time interval, from among the plurality of date and time intervals on the schedule, which corresponds to a current real-time date and time;

fourth executable code to identify via the hardware processor the respective usage expectation associated with the current date and time interval;

fifth executable code to receive in real time from a first sensor configured for location detection of the portable item a current location for the portable item;

sixth executable code to compare, via the hardware processor, the current location with the expected location comprising the respective usage expectation which corresponds to the current real-time date and time;

seventh executable code to assess, via the hardware-processor, based on the comparison, whether during the during the current date and time interval the portable item is located within the expected location;

eighth executable code to evaluate, via the hardware-processor, a relative likelihood that the portable item is extant or displaced; and ninth executable code to determine that:

if the hardware-processor evaluates that the portable item is located within the expected location, the hardware-processor will assess a likelihood that the portable item is extant;

if the hardware-processor evaluates that the portable item is not located within the expected location, the hardware-processor will assess a likelihood that the portable item is displaced; and tenth executable code which, responsive to the assessment of the likelihood that the portable item is displaced, signals an alert that the portable item is displaced upon detecting that the portable item is not located at the expected location during the associated date and time interval.

39. A device configured to operate while substantially collocated with a portable item, and configured to assess a state of the portable item as being one of present and displaced, comprising:

a hardware processor, a memory, a timer, and an environmental sensor;

wherein:

the memory stores first executable code that, when executed by the hardware processor, causes the device to store locally, at the portable item:

a detection context comprising an event that spans a duration in time starting at a first specified time and ending at a second specified time that is later than the first specified time; and an item usage expectation that is associated with the detection context, and that comprises a description of an expected usage of the portable item during the time span of the event, wherein:

the description comprises an expected environmental condition resulting from the expected usage of the portable item during the time span of the event, including at least an expected location where the portable item is expected to be during the time span of the event; and the expected environmental condition is indicative of at least two possible states of the portable item during the event:

a first state of being present, and;

a second state of being displaced, said displaced state comprising at least one of that the item is lost, stolen, misplaced, or misappropriated, wherein the misappropriated state is indicative that the portable item is in accidental use by an unauthorized user who is an associate of the authorized user;

the environmental sensor comprises a location sensor configured to obtain real-time location data for the portable item;

the timer is configured to determine that a current real-time is consistent with the time span of the event of the stored detection context, wherein the stored detection context thereby defines a current detection context with an associated current item usage expectation;

the hardware processor is configure to compare the real-time environmental data with the environmental condition described in the current item usage expectation; and during the time frame of the current detection context, the hardware processor is configured to assess, via the comparing, either that:

the real-time environmental data is consistent with the current item usage expectation, wherein the portable item is present, or the real-time environmental data is inconsistent with the current item usage expectation, wherein the portable item is displaced, wherein in response to an assessment that the portable item is displaced the hardware processor at least signals an alert that the portable item is lost, stolen, misplaced or misappropriated upon detecting the portable item is not located at the expected location during the associated date and time interval.

40. The device of claim 39, wherein the item usage expectation further comprises an environmental condition that is indicative that:

the first state of being present during the event indicates that either:

the portable item is on-person of an authorized user during the event or the portable item is under the proximate physical control of the authorized user during the event, or;

the location of the portable item is an appropriate location for storage of the portable item during the event; and the second state of being displaced during the event indicates that:

the portable item is not on-person of the authorized user during the event and the portable item is not under the proximate physical control of the authorized user during the event, and;

the portable item is not in the appropriate location for storage during the event.

41. The device of claim 39, wherein:

the environmental sensor further comprises a motion sensor;

the stored first executable code further comprises code that, when executed by the hardware processor, causes the device to:

store locally at the portable item, in the memory, an item motion usage expectation that comprises an expected motion or expected pattern of motion of the portable item during the event;

the motion sensor is configured to obtain a real-time motion data for the portable item;

the hardware processor is configured to compare the real-time motion with the item motion usage expectation; and the hardware processor is configured to assess, via the comparing, either that:

the motion of the portable item conforms to the item motion expectation, wherein the hardware processor assesses that the item is respectively present or is displaced based upon whether or not the portable item is located or is not located at the expected location; or the motion of the portable item does not conform to the item motion expectation, wherein the hardware processor assesses that the item is displaced.

42. The device of claim 39, wherein:

the environmental sensor further comprises a motion sensor configured to obtain a real-time motion data for the portable item;

the stored first executable code comprises code that, when executed by the hardware processor, causes the device to:

store locally at the portable item, in the memory, an item usage expectation that comprises:

an expected motion or expected pattern of motion of the portable item during the event; and the expected location where the portable item is expected to be located during the event; and the hardware processor is configured to:

compare the real-time motion with the item motion usage expectation;

compare the current location with the expected location where the item is expected to be located during the event; and assess via the two comparisons either that:

the portable item is present, based on an assessment both that the portable item is located at the expected location during the event, and the motion of the portable item conforms to the item motion usage expectation;

or the portable item is displaced, based on either or both of an assessment that:

that the motion of the portable item does not conform to the item motion usage expectation; or that the portable item is not located at the expected location during the event.

43. The device of claim 39, further comprising a communications element, wherein:

the memory stores second executable code that, when executed by the hardware processor, causes the device to device to store locally at the portable item, in the memory, communications parameters suitable to convey a message to a designated recipient in the event the portable item is displaced; and upon the assessment by the hardware processor that the portable item is displaced, the communications element is configured to utilize the stored communications parameters to convey an alert message to the designated recipient.

44. The device of claim 39, wherein:

the first executable code directs the hardware processor to store the stored detection context and the stored item usage specification via at least one of:

receiving data parameters descriptive of the detection context and the item usage expectation, said data parameters received via a device data interface configured for such data reception; and analyzing sensor data pertaining to an historical usage of the portable item to determine the data parameters descriptive of the detection context and the item usage specification.

45. The device of claim 39, further comprising a user interface, wherein:

said first executable code further directs the hardware processor to store locally at the portable item, in the memory, a schedule for the portable item, said schedule comprising:

a plurality of events for the portable item; and a plurality of respective usage expectation associated with each of said events;

whereby the device assesses the state of present or the state of displaced for the portable item throughout the plurality of events on the schedule.

* * * * *